US012781157B2

(12) United States Patent
DiCosimo et al.

(10) Patent No.: US 12,781,157 B2
(45) Date of Patent: *Nov. 3, 2026

(54) GLUCAN FIBER COMPOSITIONS FOR USE IN LAUNDRY CARE AND FABRIC CARE

(71) Applicant: Nutrition & Biosciences USA 4, Inc., Rochester, NY (US)

(72) Inventors: Robert DiCosimo, Chadds Ford, PA (US); Qiong Cheng, Wilmington, DE (US); Rakesh Nambiar, West Chester, PA (US); Jayme L. Paullin, West Chester, PA (US); Mark S. Payne, Exton, PA (US); Jahnavi Chandra Prasad, Wilmington, DE (US); Zheng You, Hoffman Estates, IL (US)

(73) Assignee: NUTRITION & BIOSCIENCES USA 4, INC., Wilmington, DE (US)

( * ) Notice: Subject to any disclaimer, the term of this patent is extended or adjusted under 35 U.S.C. 154(b) by 118 days.

This patent is subject to a terminal disclaimer.

(21) Appl. No.: 18/621,556

(22) Filed: Mar. 29, 2024

(65) Prior Publication Data

US 2025/0154438 A1 May 15, 2025

Related U.S. Application Data

(63) Continuation of application No. 17/587,419, filed on Jan. 28, 2022, now Pat. No. 11,946,023, which is a continuation of application No. 16/416,318, filed on May 20, 2019, now abandoned, which is a continuation of application No. 15/765,538, filed as application No. PCT/US2016/060820 on Nov. 7, 2016, now Pat. No. 10,876,074.

(60) Provisional application No. 62/255,155, filed on Nov. 13, 2015.

(51) Int. Cl.

| | |
|---|---|
| ***C11D 1/00*** | (2006.01) |
| ***B08B 3/04*** | (2006.01) |
| ***C11D 3/00*** | (2006.01) |
| ***C11D 3/22*** | (2006.01) |
| ***C11D 3/386*** | (2006.01) |

(52) U.S. Cl.
CPC .............. *C11D 3/222* (2013.01); *C11D 3/001* (2013.01)

(58) Field of Classification Search
CPC .. C11D 1/00; C11D 3/22; C11D 3/222; C11D 3/223; C11D 3/225; C11D 3/227; C11D 3/386; C11D 17/041; B08B 3/04
See application file for complete search history.

(56) References Cited

U.S. PATENT DOCUMENTS

| | | | | |
|---|---|---|---|---|
| 10,876,074 B2 * | 12/2020 | DiCosimo | .............. | C11D 3/222 |
| 11,946,023 B2 * | 4/2024 | DiCosimo | .............. | C11D 3/222 |
| 2015/0240278 A1 * | 8/2015 | Nagy | ...................... | C12P 19/16 435/97 |

* cited by examiner

*Primary Examiner* — Brian P Mruk

(57) ABSTRACT

An enzymatically produced α-glucan oligomer/polymer compositions is provided. The enzymatically produced α-glucan oligomer/polymers can be derivatized into α-glucan ether compounds. The α-glucan oligomers/polymers and the corresponding α-glucan ethers are cellulose and/or protease resistant, making them suitable for use in fabric care and laundry care applications. Methods for the production and use of the present compositions are also provided.

23 Claims, No Drawings

Specification includes a Sequence Listing.

GLUCAN FIBER COMPOSITIONS FOR USE IN LAUNDRY CARE AND FABRIC CARE

CROSS-REFERENCE TO RELATED APPLICATION

This application is a continuation of U.S. application Ser. No. 17/587,419 (filed Jan. 28, 2022, now U.S. Pat. No. 11,946,023), which is a continuation of U.S. application Ser. No. 16/416,318 (filed May 20, 2019, now abandoned), which is a continuation of U.S. application Ser. No. 15/765,538 (filed Apr. 3, 2018, now U.S. Pat. No. 10,876,074), which is the National Stage application of International Application No. PCT/US16/60820 (filed Nov. 7, 2016), which claims the benefit of priority of U.S. Provisional Application No. 62/255,155 (filed Nov. 13, 2015), all of which prior applications are incorporated herein by reference in their entirety.

INCORPORATION BY REFERENCE OF THE SEQUENCE LISTING

The official copy of the sequence is submitted electronically via EFS-Web or Patent Center as a file named CL6276USPCN3_SequenceListing2.xml created on Jan. 29, 2025 and having a size of about 434 kilobytes. The sequence listing contained in this file is part of the specification and herein incorporated by reference in its entirety.

FIELD OF THE DISCLOSURE

This disclosure relates to oligosaccharides, polysaccharides, and derivatives thereof. Specially, the disclosure pertains to certain α-glucan polymers, derivatives of these α-glucans such as α-glucan ethers, and their use in fabric care and laundry care applications.

BACKGROUND

Driven by a desire to find new structural polysaccharides using enzymatic syntheses or genetic engineering of microorganisms, researchers have discovered oligosaccharides and polysaccharides that are biodegradable and can be made economically from renewably sourced feedstocks.

Various saccharide oligomer compositions have been reported in the art. For example, U.S. Pat. No. 6,486,314 discloses an α-glucan comprising at least 20, up to about 100,000 α-anhydroglucose units, 38-48% of which are 4-linked anhydroglucose units, 17-28% are 6-linked anhydroglucose units, and 7-20% are 4,6-linked anhydroglucose units and/or gluco-oligosaccharides containing at least two 4-linked anhydroglucose units, at least one 6-linked anhydroglucose unit and at least one 4,6-linked anhydroglucose unit. U.S. Patent Appl. Pub. No. 2010-0284972A1 discloses a composition for improving the health of a subject comprising an α-(1,2)-branched α-(1,6) oligodextran. U.S. Patent Appl. Pub. No. 2011-0020496A1 discloses a branched dextrin having a structure wherein glucose or isomaltooligosaccharide is linked to a non-reducing terminus of a dextrin through an α-(1,6) glycosidic bond and having a DE of 10 to 52. U.S. Pat. No. 6,630,586 discloses a branched maltodextrin composition comprising 22-35% (1,6) glycosidic linkages; a reducing sugars content of <20%; a polymolecularity index (Mp/Mn) of <5; and number average molecular weight (Mn) of 4500 g/mol or less. U.S. Pat. No. 7,612,198 discloses soluble, highly branched glucose polymers, having a reducing sugar content of less than 1%, a level of α-(1,6) glycosidic bonds of between 13 and 17% and a molecular weight having a value of between $0.9\times10^5$ and $1.5\times10^5$ daltons, wherein the soluble highly branched glucose polymers have a branched chain length distribution profile of 70 to 85% of a degree of polymerization (DP) of less than 15, of 10 to 14% of DP of between 15 and 25 and of 8 to 13% of DP greater than 25.

Poly α-1,3-glucan has been isolated by contacting an aqueous solution of sucrose with a glucosyltransferase (gtf) enzyme isolated from *Streptococcus salivarius* (Simpson et al., *Microbiology* 141:1451-1460, 1995). U.S. Pat. No. 7,000,000 disclosed the preparation of a polysaccharide fiber using an *S. salivarius* gtfJ enzyme. At least 50% of the hexose units within the polymer of this fiber were linked via α-1,3-glycosidic linkages. The disclosed polymer formed a liquid crystalline solution when it was dissolved above a critical concentration in a solvent or in a mixture comprising a solvent. From this solution continuous, strong, cotton-like fibers, highly suitable for use in textiles, were spun and used.

Development of new glucan polysaccharides and derivatives thereof is desirable given their potential utility in various applications. It is also desirable to identify glucosyltransferase enzymes that can synthesize new glucan polysaccharides, especially those with mixed glycosidic linkages, and derivatives thereof. The materials would be attractive for use in fabric care and laundry care applications to alter rheology, act as a structuring agent, provide a benefit (preferably a surface substantive effect) to a treated fabric, textile and/or article of clothing (such as improved fabric hand, improved resistance to soil deposition, etc.). Many applications, such as laundry care, often include enzymes such as cellulases, proteases, amylases, and the like. As such, the glucan polysaccharides are preferably resistant to cellulase, amylase, and/or protease activity.

SUMMARY

In one embodiment, a fabric care composition is provided comprising:

a. an α-glucan oligomer/polymer composition comprising:
   i. at least 75% α-(1,3) glycosidic linkages;
   ii. less than 25% α-(1,6) glycosidic linkages;
   iii. less than 10% α-(1,3,6) glycosidic linkages;
   iv. a weight average molecular weight of less than 5000 Daltons;
   v. a viscosity of less than 0.25 Pascal second (Pa·s) at 12 wt % in water 20° C.;
   vi. a solubility of at least 20% (w/w) in water at 25° C.; and
   vii. a polydispersity index of less than 5; and
b. at least one additional fabric care ingredient.

In another embodiment, a laundry care composition is provided comprising:

a. an α-glucan oligomer/polymer composition comprising:
   i. at least 75% α-(1,3) glycosidic linkages;
   ii. less than 25% α-(1,6) glycosidic linkages;
   iii. less than 10% α-(1,3,6) glycosidic linkages;
   iv. a weight average molecular weight of less than 5000 Daltons;
   v. a viscosity of less than 0.25 Pascal second (Pa·s) at 12 wt % in water 20° C.;
   vi. a solubility of at least 20% (w/w) in water at 25° C.; and
   vii. a polydispersity index of less than 5; and
b. at least one additional laundry care ingredient.

In another embodiment, the additional ingredient in the above fabric care composition or the above laundry care composition is at least one cellulase, at least one protease, or a combination thereof.

In another embodiment, the fabric care composition or the laundry care composition comprises 0.01 to 90% wt % of the soluble α-glucan oligomer/polymer composition.

In another embodiment, the fabric care composition or the laundry care composition comprises at least one additional ingredient comprising at least one of surfactants (anionic, nonionic, cationic, or zwitterionic), enzymes (proteases, cellulases, polyesterases, amylases, cutinases, lipases, pectate lyases, perhydrolases, xylanases, peroxidases, and/or laccases in any combination), detergent builders, complexing agents, polymers (in addition to the present α-glucan oligomers/polymers and/or α-glucan ethers), soil release polymers, surfactancy-boosting polymers, bleaching systems, bleach activators, bleaching catalysts, fabric conditioners, clays, foam boosters, suds suppressors (silicone or fatty-acid based), anti-corrosion agents, soil-suspending agents, anti-soil redeposition agents, dyes, bactericides, tarnish inhibiters, optical brighteners, perfumes, saturated or unsaturated fatty acids, dye transfer inhibiting agents, chelating agents, hueing dyes, calcium and magnesium cations, visual signaling ingredients, anti-foam, structurants, thickeners, anti-caking agents, starch, sand, gelling agents, and any combination thereof.

In another embodiment, a fabric care and/or laundry care composition is provided wherein the composition is in the form of a liquid, a gel, a powder, a hydrocolloid, an aqueous solution, granules, tablets, capsules, single compartment sachets, multi-compartment sachets or any combination thereof.

In another embodiment, the fabric care composition or the laundry care composition is packaged in a unit dose format.

Various glucan ethers may be produced from the present α-glucan oligomers/polymers. In another embodiment, an α-glucan ether composition is provided comprising:

i. at least 75% α-(1,3) glycosidic linkages;
ii. less than 25% α-(1,6) glycosidic linkages;
iii. less than 10% α-(1,3,6) glycosidic linkages;
iv. a weight average molecular weight of less than 5000 Daltons;
v. a viscosity of less than 0.25 Pascal second (Pa·s) at 12 wt % in water 20° C.;
vi. a solubility of at least 20% (w/w) in water at 25° C.; and
vii. a polydispersity index of less than 5; wherein the glucan ether composition has a degree of substitution (DoS) with at least one organic group of about 0.05 to about 3.0.

The α-glucan ether compositions may be used in a fabric care and/or laundry care formulation comprising enzymes such as a cellulases and proteases. In another embodiment, glucan ether composition is cellulase resistant, protease resistant, amylase resistant or any combination thereof.

The α-glucan ether compositions may be used in a fabric care and/or laundry care and/or personal care compositions. In another embodiment, a personal care composition, fabric care composition or laundry care composition is provided comprising the above α-glucan ether compositions.

In another embodiment, a method for preparing an aqueous composition is provided, the method comprising: contacting an aqueous composition with the above glucan ether composition wherein the aqueous composition comprises at least one cellulase, at least one protease, at least one amylase or any combination thereof.

In another embodiment, a method of treating an article of clothing, textile or fabric is provided comprising:

a. providing a composition selected from
  i. the above fabric care composition;
  ii. the above laundry care composition;
  iii. the above glucan ether composition;
  iv. the α-glucan oligomer/polymer composition comprising:
    a. at least 75% α-(1,3) glycosidic linkages;
    b. less than 25% α-(1,6) glycosidic linkages;
    c. less than 10% α-(1,3,6) glycosidic linkages;
    d. a weight average molecular weight of less than 5000 Daltons;
    e. a viscosity of less than 0.25 Pascal second (Pa·s) at 12 wt % in water 20° C.;
    f. a solubility of at least 20% (w/w) in water at 25° C.; and
    g. a polydispersity index of less than 5; and
  v. any combination of (i) through (iv);
b. contacting under suitable conditions the composition of (a) with a fabric, textile or article of clothing whereby the fabric, textile or article of clothing is treated and receives a benefit; and
c. optionally rinsing the treated fabric, textile or article of clothing of (b).

In another embodiment of the above method, the α-glucan oligomer/polymer composition or the α-glucan ether composition is a surface substantive.

In a further embodiment of the above method, the benefit is selected from the group consisting of improved fabric hand, improved resistance to soil deposition, improved colorfastness, improved wear resistance, improved wrinkle resistance, improved antifungal activity, improved stain resistance, improved cleaning performance when laundered, improved drying rates, improved dye, pigment or lake update, and any combination thereof.

In another embodiment, a method to produce a glucan ether composition is provided comprising:

a. providing an α-glucan oligomer/polymer composition comprising:
  i. at least 75% α-(1,3) glycosidic linkages;
  ii. less than 25% α-(1,6) glycosidic linkages;
  iii. less than 10% α-(1,3,6) glycosidic linkages;
  iv. a weight average molecular weight of less than 5000 Daltons;
  v. a viscosity of less than 0.25 Pascal second (Pa·s) at 12 wt % in water 20° C.;
  vi. a solubility of at least 20% (w/w) in water at 25° C.; and
  vii. a polydispersity index of less than 5;
b. contacting the α-glucan oligomer/polymer composition of (a) in a reaction under alkaline conditions with at least one etherification agent comprising an organic group; whereby an α-glucan ether is produced has a degree of substitution (DoS) with at least one organic group of about 0.05 to about 3.0; and
c. optionally isolating the α-glucan ether produced in step (b).

A textile, yarn, fabric or fiber may be modified to comprise (e.g., blended or coated with) the above α-glucan oligomer/polymer composition or the corresponding α-glucan ether composition. In another embodiment, a textile, yarn, fabric or fiber is provided comprising:

a. an α-glucan oligomer/polymer composition comprising:
  i. at least 75% α-(1,3) glycosidic linkages;
  ii. less than 25% α-(1,6) glycosidic linkages;

iii. less than 10% α-(1,3,6) glycosidic linkages;
iv. a weight average molecular weight of less than 5000 Daltons;
v. a viscosity of less than 0.25 Pascal second (Pa·s) at 12 wt % in water 20° C.;
vi. a solubility of at least 20% (w/w) in water at 25° C.; and
vii. a polydispersity index of less than 5;

b. a glucan ether composition comprising
i. at least 75% α-(1,3) glycosidic linkages;
ii. less than 25% α-(1,6) glycosidic linkages;
iii. less than 10% α-(1,3,6) glycosidic linkages;
iv. a weight average molecular weight of less than 5000 Daltons;
v. a viscosity of less than 0.25 Pascal second (Pa·s) at 12 wt % in water 20° C.;
vi. a solubility of at least 20% (w/w) in water at 25° C.; and
vii. a polydispersity index of less than 5;
wherein the glucan ether composition has a degree of substitution (DoS) with at least one organic group of about 0.05 to about 3.0; or c. any combination thereof.

BRIEF DESCRIPTION OF THE BIOLOGICAL SEQUENCES

The following sequences comply with 37 C.F.R. §§ 1.821-1.825 ("Requirements for Patent Applications Containing Nucleotide Sequences and/or Amino Acid Sequence Disclosures—the Sequence Rules") and are consistent with World Intellectual Property Organization (WIPO) Standard ST.25 (2009) and the sequence listing requirements of the European Patent Convention (EPC) and the Patent Cooperation Treaty (PCT) Rules 5.2 and 49.5(a-bis), and Section 208 and Annex C of the Administrative Instructions. The symbols and format used for nucleotide and amino acid sequence data comply with the rules set forth in 37 C.F.R. § 1.822.

SEQ ID NO: 1 is a polynucleotide sequence of a terminator sequence.

SEQ ID NO: 2 is a polynucleotide sequence of a linker sequence.

SEQ ID NO: 3 is the amino acid sequence of the *Streptococcus salivarius* Gtf-J glucosyltransferase as found in GENBANK® gi: 47527.

SEQ ID NO: 4 is the polynucleotide sequence encoding the *Streptococcus salivarius* mature Gtf-J glucosyltransferase.

SEQ ID NO: 5 is the amino acid sequence of *Streptococcus salivarius* Gtf-J mature glucosyltransferase (referred to herein as the "7527" glucosyltransferase" or "GTF7527")).

SEQ ID NO: 6 is the amino acid sequence of *Streptococcus salivarius* Gtf-L glucosyltransferase as found in GENBANK® gi: 662379.

SEQ ID NO: 7 is the nucleic acid sequence encoding a truncated *Streptococcus salivarius* Gtf-L (GENBANK® gi: 662379) glucosyltransferase.

SEQ ID NO: 8 is the amino acid sequence of a truncated *Streptococcus salivarius* Gtf-L glucosyltransferase (also referred to herein as the "2379 glucosyltransferase" or "GTF2379").

SEQ ID NO: 9 is the amino acid sequence of the *Streptococcus mutans* NN2025 Gtf-B glucosyltransferase as found in GENBANK® gi: 290580544.

SEQ ID NO: 10 is the nucleic acid sequence encoding a truncated *Streptococcus mutans* NN2025 Gtf-B (GENBANK® gi: 290580544) glucosyltransferase.

SEQ ID NO: 11 is the amino acid sequence of a truncated *Streptococcus mutans* NN2025 Gtf-B glucosyltransferase (also referred to herein as the "0544 glucosyltransferase" or "GTF0544").

SEQ ID NOs: 12-13 are the nucleic acid sequences of primers.

SEQ ID NO: 14 is the amino acid sequence of the *Streptococcus sobrinus* Gtf-I glucosyltransferase as found in GENBANK® gi: 450874.

SEQ ID NO: 15 is the nucleic acid sequence encoding a truncated *Streptococcus sobrinus* Gtf-I (GENBANK® gi: 450874) glucosyltransferase.

SEQ ID NO: 16 is the amino acid sequence of a truncated *Streptococcus sobrinus* Gtf-I glucosyltransferase (also referred to herein as the "0874 glucosyltransferase" or "GTF0874").

SEQ ID NO: 17 is the amino acid sequence of the *Streptococcus* sp. C150 Gtf-S glucosyltransferase as found in GENBANK® gi: 495810459 (previously known as GENBANK® gi: 322373279)

SEQ ID NO: 18 is the nucleic acid sequence encoding a truncated *Streptococcus* sp. C150 gtf-S (GENBANK® gi: 495810459) glucosyltransferase.

SEQ ID NO: 19 is the amino acid sequence of a truncated *Streptococcus* sp. C150 Gtf-S glucosyltransferase (also referred to herein as the "0459 glucosyltransferase", "GTF0459", "3279 glucosyltransferase" or "GTF3279").

SEQ ID NO: 20 is the nucleic acid sequence encoding the *Paenibacillus humicus* mutanase (GENBANK® gi: 257153265 where GENBANK® gi: 257153264 is the corresponding polynucleotide sequence) used in Example 12 for expression in *E. coli* BL21(DE3).

SEQ ID NO: 21 is the amino acid sequence of the mature *Paenibacillus humicus* mutanase (GENBANK® gi: 257153264; referred to herein as the "3264 mutanase" or "MUT3264") used in Example 12 for expression in *E. coli* BL21(DE3).

SEQ ID NO: 22 is the amino acid sequence of the *Paenibacillus humicus* mutanase as found in GENBANK® gi: 257153264).

SEQ ID NO: 23 is the nucleic acid sequence encoding the *Paenibacillus humicus* mutanase used in Example 13 for expression in *B. subtilis* host BG6006.

SEQ ID NO: 24 is the amino acid sequence of the mature *Paenibacillus humicus* mutanase used in Example 13 for expression in *B. subtilis* host BG6006. As used herein, this mutanase may also be referred to herein as "MUT3264".

SEQ ID NO: 25 is the amino acid sequence of the *B. subtilis* AprE signal peptide used in the expression vector that was coupled to various enzymes for expression in *B. subtilis*.

SEQ ID NO: 26 is the nucleic acid sequence encoding the *Penicillium marneffei* ATCC® 18224™ mutanase.

SEQ ID NO: 27 is the amino acid sequence of the *Penicillium marneffei* ATCC® 18224™ mutanase (GENBANK® gi: 212533325; also referred to herein as the "3325 mutanase" or "MUT3325").

SEQ ID NO: 28 is the nucleic acid sequence encoding the *Aspergillus nidulans* FGSC A4 mutanase.

SEQ ID NO: 29 is the amino acid sequence of the *Aspergillus nidulans* FGSC A4 mutanase (GENBANK® gi: 259486505; also referred to herein as the "6505 mutanase" or "MUT6505").

SEQ ID NOs: 30-52 are the nucleic acid sequences of various primers used in Example 17.

SEQ ID NO: 53 is the nucleic acid sequence encoding a *Hypocrea tawa* mutanase.

SEQ ID NO: 54 is the amino acid sequence of the *Hypocrea tawa* mutanase as disclosed in U.S. Patent Appl. Pub. No. 2011-0223117A1 (also referred to herein as the "*H. tawa* mutanase").

SEQ ID NO: 55 is the nucleic acid sequence encoding the *Trichoderma konilangbra* mutanase.

SEQ ID NO: 56 is the amino acid sequence of the *Trichoderma konilangbra* mutanase as disclosed in U.S. Patent Appl. Pub. No. 2011-0223117A1 (also referred to herein as the "*T. konilangbra* mutanase").

SEQ ID NO: 57 is the nucleic acid sequence encoding the *Trichoderma reesei* RL-P37 mutanase.

SEQ ID NO: 58 is the amino acid sequence of the *Trichoderma reesei* RL-P37 mutanase as disclosed in U.S. Patent Appl. Pub. No. 2011-0223117A1 (also referred to herein as the "*T. reesei* 592 mutanase").

SEQ ID NO: 59 is the polynucleotide sequence of plasmid pTrex3.

SEQ ID NO: 60 is the nucleic acid sequence encoding a truncated *Streptococcus oralis* glucosyltransferase (GENBANK® gi:7684297).

SEQ ID NO: 61 is the amino acid sequence of the truncated *Streptococcus oralis* glucosyltransferase encoded by SEQ ID NO: 60, and which is referred to herein as "GTF4297".

SEQ ID NO: 62 is the nucleic acid sequence encoding a truncated version of a *Streptococcus mutans* glucosyltransferase (GENBANK® gi:3130088).

SEQ ID NO: 63 is the amino acid sequence of the truncated *Streptococcus mutans* glucosyltransferase encoded by SEQ ID NO: 62, which is referred to herein as "GTF0088".

SEQ ID NO: 64 is the nucleic acid sequence encoding a truncated version of a *Streptococcus mutans* glucosyltransferase (GENBANK® gi:24379358).

SEQ ID NO: 65 is the amino acid sequence of the truncated *Streptococcus mutans* glucosyltransferase encoded by SEQ ID NO: 64, which is referred to herein as "GTF9358".

SEQ ID NO: 66 is the nucleic acid sequence encoding a truncated version of a *Streptococcus gallolyticus* glucosyltransferase (GENBANK® gi:32597842).

SEQ ID NO: 67 is the amino acid sequence of the truncated *Streptococcus gallolyticus* glucosyltransferase encoded by SEQ ID NO: 66, which is referred to herein as "GTF7842".

SEQ ID NO: 68 is the amino acid sequence of a *Lactobacillus reuteri* glucosyltransferase as found in GENBANK® gi:51574154.

SEQ ID NO: 69 is the nucleic acid sequence encoding a truncated version of the *Lactobacillus reuteri* glucosyltransferase (GENBANK® gi:51574154).

SEQ ID NO: 70 is the amino acid sequence of the truncated *Lactobacillus reuteri* glucosyltransferase encoded by SEQ ID NO: 69, which is referred to herein as "GTF4154".

SEQ ID NO: 71 is the amino acid sequence of a *Streptococcus downei* GTF-S glucosyltransferase as found in GENBANK® gi: 121729 (precursor with the native signal sequence) also referred to herein as "GTF1729".

SEQ ID NO: 72 is the amino acid sequence of a *Streptococcus criceti* HS-6 GTF-S glucosyltransferase as found in GENBANK® gi: 357235604 (precursor with the native signal sequence) also referred to herein as "GTF5604". The same amino acid sequence is reported under GENBANK® gi:4691428 for a glucosyltransferase from *Streptococcus criceti*. As such, this particular amino acid sequence is also referred to herein as "GTF1428".

SEQ ID NO: 73 is the amino acid sequence of a *Streptococcus criceti* HS-6 glucosyltransferase derived from GENBANK® gi: 357236477 (also referred to herein as "GTF6477") where the native signal sequence was substituted with the AprE signal sequence for expression in *Bacillus subtilis.*

SEQ ID NO: 74 is the amino acid sequence of a *Streptococcus criceti* HS-6 glucosyltransferase derived from GENBANK® gi: 357236477 (also referred to herein as "GTF6477-V1" or "357236477-V1") where the native signal sequence was substituted with the AprE signal sequence for expression in *Bacillus subtilis* and contains a single amino acid substitution.

SEQ ID NO: 75 is the amino acid sequence of a *Streptococcus salivarius* M18 glucosyltransferase derived from GENBANK® gi: 345526831 (also referred to herein as "GTF6831") where the native signal sequence was substituted with the AprE signal sequence for expression in *Bacillus subtilis.*

SEQ ID NO: 76 is the amino acid sequence of a *Lactobacillus animalis* KCTC 3501 glucosyltransferase derived from GENBANK® gi: 335358117 (also referred to herein as "GTF8117") where the native signal sequence was substituted with the AprE signal sequence for expression in *Bacillus subtilis.*

SEQ ID NO: 77 is the amino acid sequence of a *Streptococcus gordonii* glucosyltransferase derived from GENBANK® gi: 1054877 (also referred to herein as "GTF4877") where the native signal sequence was substituted with the AprE signal sequence for expression in *Bacillus subtilis.*

SEQ ID NO: 78 is the amino acid sequence of a *Streptococcus sobrinus* glucosyltransferase derived from GENBANK® gi: 22138845 (also referred to herein as "GTF8845") where the native signal sequence was substituted with the AprE signal sequence for expression in *Bacillus subtilis.*

SEQ ID NO: 79 is the amino acid sequence of the *Streptococcus downei* glucosyltransferase as found in GENBANK® gi: 121724.

SEQ ID NO: 80 is the nucleic acid sequence encoding a truncated *Streptococcus downei* (GENBANK® gi: 121724) glucosyltransferase.

SEQ ID NO: 81 is the amino acid sequence of the truncated *Streptococcus downei* glucosyltransferase encoded by SEQ ID NO: 80 (also referred to herein as the "1724 glucosyltransferase" or "GTF1724").

SEQ ID NO: 82 is the amino acid sequence of the *Streptococcus dentirousetti* glucosyltransferase as found in GENBANK® gi: 167735926.

SEQ ID NO: 83 is the nucleic acid sequence encoding a truncated *Streptococcus dentirousetti* (GENBANK® gi: 167735926) glucosyltransferase.

SEQ ID NO: 84 is the amino acid sequence of the truncated *Streptococcus dentirousetti* glucosyltransferase encoded by SEQ ID NO: 83 (also referred to herein as the "5926 glucosyltransferase" or "GTF5926").

SEQ ID NO: 85 is the amino acid sequence of the dextran dextrinase (EC 2.4.1.2) expressed by a strain *Gluconobacter oxydans* referred to herein as "DDase" (see JP2007181452 (A)).

SEQ ID NO: 86 is the nucleic acid sequence encoding the GTF0459 amino acid sequence of SEQ ID NO: 19.

SEQ ID NO: 87 is the nucleic acid sequence encoding a truncated form of GTF0470, a GTF0459 homolog.

SEQ ID NO: 88 is the amino acid sequence encoded by SEQ ID NO: 87.

SEQ ID NO: 89 is the nucleic acid sequence encoding a truncated form of GTF07317, a GTF0459 homolog.

SEQ ID NO: 90 is the amino acid sequence encoded by SEQ ID NO: 89.

SEQ ID NO: 91 is the nucleic acid sequence encoding a truncated form of GTF1645, a GTF0459 homolog.

SEQ ID NO: 92 is the amino acid sequence encoded by SEQ ID NO: 91.

SEQ ID NO: 93 is the nucleic acid sequence encoding a truncated form of GTF6099, a GTF0459 homolog.

SEQ ID NO: 94 is the amino acid sequence encoded by SEQ ID NO: 93.

SEQ ID NO: 95 is the nucleic acid sequence encoding a truncated form of GTF8467, a GTF0459 homolog.

SEQ ID NO: 96 is the amino acid sequence encoded by SEQ ID NO: 95.

SEQ ID NO: 97 is the nucleic acid sequence encoding a truncated form of GTF8487, a GTF0459 homolog.

SEQ ID NO: 98 is the amino acid sequence encoded by SEQ ID NO: 97.

SEQ ID NO: 99 is the nucleic acid sequence encoding a truncated form of GTF06549, a GTF0459 homolog.

SEQ ID NO: 100 is the amino acid sequence encoded by SEQ ID NO: 99.

SEQ ID NO: 101 is the nucleic acid sequence encoding a truncated form of GTF3879, a GTF0459 homolog.

SEQ ID NO: 102 is the amino acid sequence encoded by SEQ ID NO: 101.

SEQ ID NO: 103 is the nucleic acid sequence encoding a truncated form of GTF4336, a GTF0459 homolog.

SEQ ID NO: 104 is amino acid sequence encoded by SEQ ID NO: 103.

SEQ ID NO: 105 is the nucleic acid sequence encoding a truncated form of GTF4491, a GTF0459 homolog.

SEQ ID NO: 106 is the amino acid sequence encoded by SEQ ID NO: 105.

SEQ ID NO: 107 is the nucleic acid sequence encoding a truncated form of GTF3808, a GTF0459 homolog.

SEQ ID NO: 108 is the amino acid sequence encoded by SEQ ID NO: 107.

SEQ ID NO: 109 is the nucleic acid sequence encoding a truncated form of GTF0974, a GTF0459 homolog.

SEQ ID NO: 110 is the amino acid sequence encoded by SEQ ID NO: 109.

SEQ ID NO: 111 is the nucleic acid sequence encoding a truncated form of GTF0060, a GTF0459 homolog.

SEQ ID NO: 112 is the amino acid sequence encoded by SEQ ID NO: 111.

SEQ ID NO: 113 is the nucleic acid sequence encoding a truncated form of GTF0487, a GTF0459 non-homolog.

SEQ ID NO: 114 is the amino acid sequence encoded by SEQ ID NO: 113.

SEQ ID NO: 115 is the nucleic acid sequence encoding a truncated form of GTF5360, a GTF0459 non-homolog.

SEQ ID NO: 116 is the amino acid sequence encoded by SEQ ID NO: 115.

SEQ ID NOs: 117, 119, 121, and 123 are nucleotide sequences encoding T5 C-terminal truncations of GTF0974, GTF4336, GTF4491, and GTF3808, respectively.

SEQ ID NOs: 118, 120, 122, and 124 are amino acid sequences of T5 C-terminal truncations of GTF0974, GTF4336, GTF4491, and GTF3808, respectively.

SEQ ID NO: 125 is the nucleotide sequence encoding a T5 C-terminal truncation of GTF0459.

SEQ ID NO: 126 is the amino acid sequence encoded by the nucleotide sequence of SEQ ID NO: 125.

SEQ ID NO: 127 is the nucleotide sequence encoding a T4 C-terminal truncation of GTF0974.

SEQ ID NO: 128 is the amino acid sequence encoded by the nucleotide sequence of SEQ ID NO: 127.

SEQ ID NO: 129 is the nucleotide sequence encoding a T4 C-terminal truncation of GTF4336.

SEQ ID NO: 130 is the amino acid sequence encoded by the nucleotide sequence of SEQ ID NO: 129.

SEQ ID NO: 131 is the nucleotide sequence encoding a T4 C-terminal truncation of GTF4491.

SEQ ID NO: 132 is the amino acid sequence encoded by the nucleotide sequence of SEQ ID NO: 131.

SEQ ID NO: 133 is the nucleotide sequence encoding a T6 C-terminal truncation of GTF0459.

SEQ ID NO: 134 is the amino acid sequence encoded by SEQ ID NO: 133.

SEQ ID NO: 135 is the nucleotide sequence encoding a T1 C-terminal truncation of GTF0974.

SEQ ID NO: 136 is the amino acid sequence encoded by SEQ ID NO: 135.

SEQ ID NO: 137 is the nucleotide sequence encoding a T2 C-terminal truncation of GTF0974.

SEQ ID NO: 138 is the amino acid sequence encoded by SEQ ID NO: 137.

SEQ ID NO: 139 is the nucleotide sequence encoding a T6 C-terminal truncation of GTF0974.

SEQ ID NO: 140 is the amino acid sequence encoded by SEQ ID NO: 139.

SEQ ID NO: 141 is the nucleotide sequence encoding a T1 C-terminal truncation of GTF4336.

SEQ ID NO: 142 is the amino acid sequence encoded by SEQ ID NO: 141.

SEQ ID NO: 143 is the nucleotide sequence encoding a T2 C-terminal truncation of GTF4336.

SEQ ID NO: 144 is the amino acid sequence encoded by SEQ ID NO; 143.

SEQ ID NO: 145 is the nucleotide sequence encoding a T6 C-terminal truncation of GTF4336.

SEQ ID NO: 146 is the amino acid sequence encoded by SEQ ID NO: 145.

SEQ ID NO: 147 is the nucleotide sequence encoding a T1 C-terminal truncation of GTF4991.

SEQ ID NO: 148 is the amino acid sequence encoded by SEQ ID NO: 147.

SEQ ID NO: 149 is the nucleotide sequence encoding a T2 C-terminal truncation of GTF4991.

SEQ ID NO: 150 is the amino acid sequence encoded by SEQ ID NO: 149.

SEQ ID NO: 151 is the nucleotide sequence encoding a T6 C-terminal truncation of GTF4991.

SEQ ID NO: 152 is the amino acid sequence encoded by SEQ ID NO: 151.

DETAILED DESCRIPTION

In this disclosure, a number of terms and abbreviations are used. The following definitions apply unless specifically stated otherwise.

As used herein, the articles "a", "an", and "the" preceding an element or component are intended to be nonrestrictive regarding the number of instances (i.e., occurrences) of the element or component. Therefore “a”, “an”, and “the” should be read to include one or at least one, and the singular word form of the element or component also includes the plural unless the number is obviously meant to be singular.

As used herein, the term “comprising” means the presence of the stated features, integers, steps, or components as referred to in the claims, but that it does not preclude the presence or addition of one or more other features, integers, steps, components or groups thereof. The term “comprising” is intended to include embodiments encompassed by the terms “consisting essentially of” and “consisting of”. Similarly, the term “consisting essentially of” is intended to include embodiments encompassed by the term “consisting of”.

As used herein, the term “about” modifying the quantity of an ingredient or reactant employed refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term “about” also encompasses amounts that differ due to different equilibrium conditions for a composition resulting from a particular initial mixture. Whether or not modified by the term “about”, the claims include equivalents to the quantities.

Where present, all ranges are inclusive and combinable. For example, when a range of “1 to 5” is recited, the recited range should be construed as including ranges “1 to 4”, “1 to 3”, “1-2”, “1-2 & 4-5” “1-3 & 5”, and the like.

As used herein, the term “obtainable from” shall mean that the source material (for example, sucrose) is capable of being obtained from a specified source, but is not necessarily limited to that specified source.

As used herein, the term “effective amount” will refer to the amount of the substance used or administered that is suitable to achieve the desired effect. The effective amount of material may vary depending upon the application. One of skill in the art will typically be able to determine an effective amount for a particular application or subject without undo experimentation.

As used herein, the term “isolated” means a substance in a form or environment that does not occur in nature. Non-limiting examples of isolated substances include (1) any non-naturally occurring substance, (2) any substance including, but not limited to, any host cell, enzyme, variant, nucleic acid, protein, peptide or cofactor, that is at least partially removed from one or more or all of the naturally occurring constituents with which it is associated in nature; (3) any substance modified by the hand of man relative to that substance found in nature; or (4) any substance modified by increasing the amount of the substance relative to other components with which it is naturally associated.

The terms “percent by volume”, “volume percent”, “vol %” and “v/v %” are used interchangeably herein. The percent by volume of a solute in a solution can be determined using the formula: [(volume of solute)/(volume of solution)]×100%.

The terms “percent by weight”, “weight percentage (wt %)” and “weight-weight percentage (% w/w)” are used interchangeably herein. Percent by weight refers to the percentage of a material on a mass basis as it is comprised in a composition, mixture, or solution.

The terms “increased”, “enhanced” and “improved” are used interchangeably herein. These terms refer to a greater quantity or activity such as a quantity or activity slightly greater than the original quantity or activity, or a quantity or activity in large excess compared to the original quantity or activity, and including all quantities or activities in between. Alternatively, these terms may refer to, for example, a quantity or activity that is at least 1%, 2%, 3%, 4%, 5%, 6%, 7%, 8%, 9%, 10%, 11%, 12%, 13%, 14%, 15%, 16%, 17%, 18%, 19% or 20% more than the quantity or activity for which the increased quantity or activity is being compared.

As used herein, the term “isolated” means a substance in a form or environment that does not occur in nature. Non-limiting examples of isolated substances include (1) any non-naturally occurring substance, (2) any substance including, but not limited to, any host cell, enzyme, variant, nucleic acid, protein, peptide or cofactor, that is at least partially removed from one or more or all of the naturally occurring constituents with which it is associated in nature; (3) any substance modified by the hand of man relative to that substance found in nature; or (4) any substance modified by increasing the amount of the substance relative to other components with which it is naturally associated.

As used herein, term “water soluble” will refer to the present glucan oligomer/polymer compositions that are soluble at 20 wt % or higher in pH 7 water at 25° C.

As used herein, the terms “soluble glucan fiber”, “α-glucan fiber”, “α-glucan polymer”, “α-glucan oligosaccharide”, “α-glucan polysaccharide”, “α-glucan oligomer”, “α-glucan oligomer/polymer”, “α-glucan polymer”, and “soluble glucan fiber composition” refer to the present α-glucan polymer composition (non-derivatized; i.e., not an α-glucan ether) comprised of water soluble glucose oligomers having a glucose polymerization degree of 3 or more. The present soluble glucan polymer composition is enzymatically synthesized from sucrose (α-D-Glucopyranosyl β-D-fructofuranoside; CAS #57-50-1) obtainable from, for example, sugarcane and/or sugar beets. In one embodiment, the present soluble α-glucan polymer composition is not alternan or maltoalternan oligosaccharide.

As used herein, “weight average molecular weight” or “$M_w$” is calculated as $M_w=\Sigma N_iM_i^2/\Sigma N_iM_i$; where $M_i$ is the molecular weight of a chain and $N_i$ is the number of chains of that molecular weight. The weight average molecular weight can be determined by technics such as static light scattering, small angle neutron scattering, X-ray scattering, and sedimentation velocity.

As used herein, “number average molecular weight” or “$M_n$” refers to the statistical average molecular weight of all the polymer chains in a sample. The number average molecular weight is calculated as $M_n=\Sigma N_iM_i/\Sigma N_i$ where $M_i$ is the molecular weight of a chain and $N_i$ is the number of chains of that molecular weight. The number average molecular weight of a polymer can be determined by technics such as gel permeation chromatography, viscometry via the (Mark-Houwink equation), and colligative methods such as vapor pressure osmometry, end-group determination or proton NMR.

As used herein, “polydispersity index”, “PDI”, “heterogeneity index”, and “dispersity” refer to a measure of the distribution of molecular mass in a given polymer (such as a glucose oligomer) sample and can be calculated by dividing the weight average molecular weight by the number average molecular weight ($PDI=M_w/M_n$).

It shall be noted that the terms “glucose” and “glucopyranose” as used herein are considered as synonyms and used interchangeably. Similarly the terms “glucosyl” and “glucopyranosyl” units are used herein are considered as synonyms and used interchangeably.

As used herein, "glycosidic linkages" or "glycosidic bonds" will refer to the covalent the bonds connecting the sugar monomers within a saccharide oligomer (oligosaccharides and/or polysaccharides). Example of glycosidic linkage may include α-linked glucose oligomers with 1,6-α-D-glycosidic linkages (herein also referred to as α-D-(1,6) linkages or simply "α-(1,6)" linkages); 1,3-α-D-glycosidic linkages (herein also referred to as α-D-(1,3) linkages or simply "α-(1,3)" linkages; 1,4-α-D-glycosidic linkages (herein also referred to as α-D-(1,4) linkages or simply "α-(1,4)" linkages; 1,2-α-D-glycosidic linkages (herein also referred to as α-D-(1,2) linkages or simply "α-(1,2)" linkages; and combinations of such linkages typically associated with branched saccharide oligomers.

As used herein, the terms "glucansucrase", "glucosyltransferase", "glucoside hydrolase type 70", "GTF", and "GS" will refer to transglucosidases classified into family 70 of the glycoside-hydrolases typically found in lactic acid bacteria such as *Streptococcus, Leuconostoc, Weisella* or *Lactobacillus* genera (see Carbohydrate Active Enzymes database; "CAZy"; Cantarel et al., (2009) *Nucleic Acids Res* 37:D233-238). The GTF enzymes are able to polymerize the D-glucosyl units of sucrose to form homooligosaccharides or homopolysaccharides. Glucosyltransferases can be identified by characteristic structural features such as those described in Leemhuis et al. (*J. Biotechnology* (2013) 162: 250-272) and Monchois et al. (*FEMS Micro. Revs*. (1999) 23:131-151). Depending upon the specificity of the GTF enzyme, linear and/or branched glucans comprising various glycosidic linkages may be formed such as α-(1,2), α-(1,3), α-(1,4) and α-(1,6). Glucosyltransferases may also transfer the D-glucosyl units onto hydroxyl acceptor groups. A non-limiting list of acceptors include carbohydrates, alcohols, polyols or flavonoids. Specific acceptors may also include maltose, isomaltose, isomaltotriose, and methyl-α-D-glucan. The structure of the resultant glucosylated product is dependent upon the enzyme specificity. A non-limiting list of glucosyltransferase sequences is provided as amino acid SEQ ID NOs: 3, 5, 6, 8, 9, 11, 14, 16, 17, 19, 61, 63, 65, 67, 68, 70, 72, 73, 74, 75, 76, 77, 78, 79, 81, 82, 84, 88, 90, 92, 94, 96, 98, 100, 102, 104, 106, 108, 110, and 112. In one aspect, the glucosyltransferase is expressed in a truncated and/or mature form. Non-limiting examples of truncated glucosyltransferase amino acid sequences include SEQ ID NOs: 118, 120, 122, 124, 126, 128, 130, 132, 134, 136, 138, 140, 142, 144, 146, 148, 150, and 152.

As used herein, the term "isomaltooligosaccharide" or "IMO" refers to a glucose oligomers comprised essentially of α-D-(1,6) glycosidic linkage typically having an average size of DP 2 to 20. Isomaltooligosaccharides can be produced commercially from an enzymatic reaction of α-amylase, pullulanase, β-amylase, and α-glucosidase upon corn starch or starch derivative products. Commercially available products comprise a mixture of isomaltooligosaccharides (DP ranging from 3 to 8, e.g., isomaltotriose, isomaltotetraose, isomaltopentaose, isomaltohexaose, isomaltoheptaose, isomaltooctaose) and may also include panose.

As used herein, the term "dextran" refers to water soluble α-glucans comprising at least 95% α-D-(1,6) glycosidic linkages (typically with up to 5% α-D-(1,3) glycosidic linkages at branching points). Dextrans often have an average molecular weight above 1000 kDa. As used herein, enzymes capable of synthesizing dextran from sucrose may be described as "dextransucrases" (EC 2.4.1.5).

As used herein, the term "mutan" refers to water insoluble α-glucans comprised primarily (50% or more of the glycosidic linkages present) of 1,3-α-D glycosidic linkages and typically have a degree of polymerization (DP) that is often greater than 9. Enzymes capable of synthesizing mutan or α-glucan oligomers comprising greater than 50% 1,3-α-D glycosidic linkages from sucrose may be described as "mutansucrases" (EC 2.4.1.-) with the proviso that the enzyme does not produce alternan.

As used herein, the term "alternan" refers to α-glucans having alternating 1,3-α-D glycosidic linkages and 1,6-α-D glycosidic linkages over at least 50% of the linear oligosaccharide backbone. Enzymes capable of synthesizing alternan from sucrose may be described as "alternansucrases" (EC 2.4.1.140).

As used herein, the term "reuteran" refers to soluble α-glucan comprised 1,4-α-D-glycosidic linkages (typically >50%); 1,6-α-D-glycosidic linkages; and 4,6-disubstituted α-glucosyl units at the branching points. Enzymes capable of synthesizing reuteran from sucrose may be described as "reuteransucrases" (EC 2.4.1.-).

As used herein, the terms "α-glucanohydrolase" and "glucanohydrolase" will refer to an enzyme capable of hydrolyzing an α-glucan oligomer. As used herein, the glucanohydrolase may be defined by the endohydrolysis activity towards certain α-D-glycosidic linkages. Examples may include, but are not limited to, dextranases (EC 3.2.1.11; capable of endohydrolyzing α-(1,6)-linked glycosidic bonds), mutanases (EC 3.2.1.59; capable of endohydrolyzing α-(1,3)-linked glycosidic bonds), and alternanases (EC 3.2.1.-; capable of endohydrolytically cleaving alternan). Various factors including, but not limited to, level of branching, the type of branching, and the relative branch length within certain α-glucans may adversely impact the ability of an α-glucanohydrolase to endohydrolyze some glycosidic linkages.

As used herein, the term "dextranase" (α-1,6-glucan-6-glucanohydrolase; EC 3.2.1.11) refers to an enzyme capable of endohydrolysis of 1,6-α-D-glycosidic linkages (the linkage predominantly found in dextran). Dextranases are known to be useful for a number of applications including the use as ingredient in dentifrice for prevention of dental caries, plaque and/or tartar and for hydrolysis of raw sugar juice or syrup of sugar canes and sugar beets. Several microorganisms are known to be capable of producing dextranases, among them fungi of the genera *Penicillium, Paecilomyces, Aspergillus, Fusarium, Spicaria, Verticillium, Helminthosporium* and *Chaetomium*; bacteria of the genera *Lactobacillus, Streptococcus, Cellvibrio, Cytophaga, Brevibacterium, Pseudomonas, Corynebacterium, Arthrobacter* and *Flavobacterium*, and yeasts such as *Lipomyces starkeyi*. Food grade dextranases are commercially available. An example of a food grade dextrinase is DEXTRANASE® Plus L, an enzyme from *Chaetomium erraticum* sold by Novozymes A/S, Bagsvaerd, Denmark.

As used herein, the term "mutanase" (glucan endo-1, 3-α-glucosidase; EC 3.2.1.59) refers to an enzyme which hydrolytically cleaves 1,3-α-D-glycosidic linkages (the linkage predominantly found in mutan). Mutanases are available from a variety of bacterial and fungal sources. A non-limiting list of mutanases is provided as amino acid sequences 21, 22, 24, 27, 29, 54, 56, and 58.

As used herein, the term "alternanase" (EC 3.2.1.-) refers to an enzyme which endo-hydrolytically cleaves alternan (U.S. Pat. No. 5,786,196 to Cote et al.).

As used herein, the term "wild type enzyme" will refer to an enzyme (full length and active truncated forms thereof) comprising the amino acid sequence as found in the organism from which it was obtained and/or annotated. The enzyme (full length or catalytically active truncation thereof) may be recombinantly produced in a microbial host cell. The enzyme is typically purified prior to being used as a processing aid in the production of the present soluble α-glucan oligomer/polymer composition. In one aspect, a combination of at least two wild type enzymes simultaneously present in the reaction system is used in order to obtain the present α-glucan polymer composition. In another aspect, under certain reaction conditions (for example, a reaction temperature around 47° C. to 50° C.) it may be possible to use a single wild type glucosyltransferase to produce the present soluble α-glucan polymer (see Examples 37 and 41). In another aspect, the present method comprises a single reaction chamber comprising at least one glucosyltransferase capable of forming a soluble α-glucan polymer composition comprising 50% or more α-(1,3) glycosidic linkages (such as a mutansucrase) and at least one α-glucanohydrolase having endohydrolysis activity for the α-glucan synthesized from the glucosyltransferase(s) present in the reaction system.

As used herein, the terms "substrate" and "suitable substrate" will refer to a composition comprising sucrose. In one embodiment, the substrate composition may further comprise one or more suitable acceptors, such as maltose, isomaltose, isomaltotriose, and methyl-α-D-glucan, to name a few. In one embodiment, a combination of at least one glucosyltransferase capable for forming glucose oligomers is used in combination with at least one α-glucanohydrolase in the same reaction mixture (i.e., they are simultaneously present and active in the reaction mixture). As such the "substrate" for the α-glucanohydrolase is the glucose oligomers concomitantly being synthesized in the reaction system by the glucosyltransferase from sucrose. In one aspect, a two-enzyme method (i.e., at least one glucosyltransferase (GTF) and at least one α-glucanohydrolase) where the enzymes are not used concomitantly in the reaction mixture is excluded, by proviso, from the present methods.

As used herein, the terms "suitable enzymatic reaction mixture", "suitable reaction components", "suitable aqueous reaction mixture", and "reaction mixture", refer to the materials (suitable substrate(s)) and water in which the reactants come into contact with the enzyme(s). The suitable reaction components may be comprised of a plurality of enzymes. In one aspect, the suitable reaction components comprises at least one glucansucrase enzyme. In a further aspect, the suitable reaction components comprise at least one glucansucrase and at least one α-glucanohydrolase.

As used herein, "one unit of glucansucrase activity" or "one unit of glucosyltransferase activity" is defined as the amount of enzyme required to convert 1 μmol of sucrose per minute when incubated with 200 g/L sucrose at pH 5.5 and 37° C. The sucrose concentration was determined using HPLC.

As used herein, "one unit of dextranase activity" is defined as the amount of enzyme that forms 1 μmol reducing sugar per minute when incubated with 0.5 mg/mL dextran substrate at pH 5.5 and 37° C. The reducing sugars were determined using the PAHBAH assay (Lever M., (1972), A New Reaction for Colorimetric Determination of Carbohydrates, *Anal. Biochem.* 47, 273-279).

As used herein, "one unit of mutanase activity" is defined as the amount of enzyme that forms 1 μmol reducing sugar per minute when incubated with 0.5 mg/mL mutan substrate at pH 5.5 and 37° C. The reducing sugars were determined using the PAHBAH assay (Lever M., supra).

As used herein, the term "enzyme catalyst" refers to a catalyst comprising an enzyme or combination of enzymes having the necessary activity to obtain the desired soluble α-glucan polymer composition. In certain embodiments, a combination of enzyme catalysts may be required to obtain the desired soluble glucan polymer composition. The enzyme catalyst(s) may be in the form of a whole microbial cell, permeabilized microbial cell(s), one or more cell components of a microbial cell extract(s), partially purified enzyme(s) or purified enzyme(s). In certain embodiments the enzyme catalyst(s) may also be chemically modified (such as by pegylation or by reaction with cross-linking reagents). The enzyme catalyst(s) may also be immobilized on a soluble or insoluble support using methods well-known to those skilled in the art; see for example, *Immobilization of Enzymes and Cells*; Gordon F. Bickerstaff, Editor; Humana Press, Totowa, NJ, USA; 1997.

The term "resistance to enzymatic hydrolysis" will refer to the relative stability of the present materials (α-glucan oligomers/polymers and/or the corresponding α-glucan ether compounds produced by the etherification of the present α-glucan oligomers/polymers) to enzymatic hydrolysis. The resistance to hydrolysis will be particular important for use of the present materials in applications wherein enzymes are often present, such as in fabric care and laundry care applications. In one embodiment, the α-glucan oligomers/polymers and/or the corresponding α-glucan ether compounds produced by the etherification of the present α-glucan oligomers/polymers are resistant to cellulases (i.e., cellulase resistant). In another embodiment, the α-glucan oligomers/polymers and/or the corresponding α-glucan ether compounds produced by the etherification of the present α-glucan oligomers/polymers are resistant to proteases (i.e., protease resistant). In another embodiment, the α-glucan oligomers/polymers and/or the corresponding α-glucan ether compounds produced by the etherification of the present α-glucan oligomers/polymers are resistant to amylases (i.e., amylase resistant). In a preferred aspect, α-glucan oligomers/polymers and/or the corresponding α-glucan ether compounds produced by the etherification of the present α-glucan oligomers/polymers are resistant to multiple classes of enzymes (combinations of cellulases, proteases, and/or amylases). Resistance to any particular enzyme will be defined as having at least 50%, preferably at least 60, 70, 80, 90, 95 or 100% of the materials remaining after treatment with the respective enzyme. The % remaining may be determined by measuring the supernatant after enzyme treatment using SEC-HPLC. The assay to measure enzyme resistance may using the following: A sample of the soluble material (e.g., 100 mg to is added to 10.0 mL water in a 20-mL scintillation vial and mixed using a PTFE magnetic stir bar to create a 1 wt % solution. The reaction is run at pH 7.0 at 20° C. After the fiber is complete dissolved, 1.0 mL (1 wt % enzyme formulation) of cellulase (PURADEX® EGL), amylase (PURASTAR® ST L) or protease (SAVINASE® 16.0 L) is added and the solution is mixed for 72 hrs at 20° C. The reaction mixture is heated to 70° C. for 10 minutes to inactivate the added enzyme, and the resulting mixture is cooled to room temperature and centrifuged to remove any precipitate. The supernatant is analyzed by SEC-HPLC for recovered oligomers/polymers and compared to a control where no enzyme was added to the reaction mixture. Percent changes in area counts for the respective oligomers/polymers may be used to test the relative resistance of the materials to the respective enzyme treatment. Percent changes in area count for total ≥DP3$^+$ fibers will be used to assess the relative amount of materials remaining after treatment with a particular enzyme. Materials having a percent recovery of at least 50%, preferably at least 60, 70, 80, 90, 95 or 100% will be considered "resistant" to the respective enzyme treatment (e.g., "cellulase resistant", "protease resistant" and/or "amylase resistant").

The terms "α-glucan ether compound", "α-glucan ether composition", "α-glucan ether", and "α-glucan ether derivative" are used interchangeably herein. An α-glucan ether compound herein is the present α-glucan polymer that has been etherified with one or more organic groups such that the compound has a degree of substitution (DoS) with one or more organic groups of about 0.05 to about 3.0. Such etherification occurs at one or more hydroxyl groups of at least 30% of the glucose monomeric units of the α-glucan polymer.

An α-glucan ether compound is termed an "ether" herein by virtue of comprising the substructure—$C_G$—O—C—, where "—$C_G$—" represents a carbon atom of a glucose monomeric unit of an α-glucan ether compound (where such carbon atom was bonded to a hydroxyl group [—OH] in the α-glucan polymer precursor of the ether), and where "—C—" is a carbon atom of the organic group. Thus, for example, with regard to a glucose monomeric unit (G) involved in -1,3-G-1,3- within an ether herein, $C_G$ atoms 2, 4 and/or 6 of the glucose (G) may independently be linked to an OH group or be in ether linkage to an organic group. Similarly, for example, with regard to a glucose monomeric unit (G) involved in -1,3-G-1,6- within an ether herein, $C_G$ atoms 2, 4 and/or 6 of the glucose (G) may independently be linked to an OH group or be in ether linkage to an organic group. Also, for example, with regard to a glucose monomeric unit (G) involved in -1,6-G-1,6- within an ether herein, $C_G$ atoms 2, 3 and/or 4 of the glucose (G) may independently be linked to an OH group or be in ether linkage to an organic group. Similarly, for example, with regard to a glucose monomeric unit (G) involved in -1,6-G-1,3- within an ether herein, $C_G$ atoms 2, 3 and/or 4 of the glucose (G) may independently be linked to an OH group or be in ether linkage to an organic group.

It would be understood that a "glucose" monomeric unit of an α-glucan ether compound herein typically has one or more organic groups in ether linkage. Thus, such a glucose monomeric unit can also be referred to as an etherized glucose monomeric unit.

The α-glucan ether compounds disclosed herein are synthetic, man-made compounds. Likewise, compositions comprising the present α-glucan polymer are synthetic, man-made compounds.

An "organic group" group as used herein can refer to a chain of one or more carbons that (i) has the formula —$C_nH_{2n+1}$ (i.e., an alkyl group, which is completely saturated) or (ii) is mostly saturated but has one or more hydrogens substituted with another atom or functional group (i.e., a "substituted alkyl group"). Such substitution may be with one or more hydroxyl groups, oxygen atoms (thereby forming an aldehyde or ketone group), carboxyl groups, or other alkyl groups. Thus, as examples, an organic group herein can be an alkyl group, carboxy alkyl group, or hydroxy alkyl group. An organic group herein may thus be uncharged or anionic (an example of an anionic organic group is a carboxy alkyl group).

A "carboxy alkyl" group herein refers to a substituted alkyl group in which one or more hydrogen atoms of the alkyl group are substituted with a carboxyl group. A "hydroxy alkyl" group herein refers to a substituted alkyl group in which one or more hydrogen atoms of the alkyl group are substituted with a hydroxyl group.

The phrase "positively charged organic group" as used herein refers to a chain of one or more carbons ("carbon chain") that has one or more hydrogens substituted with another atom or functional group (i.e., a "substituted alkyl group"), where one or more of the substitutions is with a positively charged group. Where a positively charged organic group has a substitution in addition to a substitution with a positively charged group, such additional substitution may be with one or more hydroxyl groups, oxygen atoms (thereby forming an aldehyde or ketone group), alkyl groups, and/or additional positively charged groups. A positively charged organic group has a net positive charge since it comprises one or more positively charged groups.

The terms "positively charged group", "positively charged ionic group" and "cationic group" are used interchangeably herein. A positively charged group comprises a cation (a positively charged ion). Examples of positively charged groups include substituted ammonium groups, carbocation groups and acyl cation groups.

A composition that is "positively charged" herein is repelled from other positively charged substances, but attracted to negatively charged substances.

The terms "substituted ammonium group", "substituted ammonium ion" and "substituted ammonium cation" are used interchangeably herein. A substituted ammonium group herein comprises structure I:

(I)

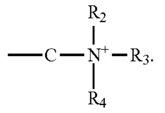

$R_2$, $R_3$ and $R_4$ in structure I each independently represent a hydrogen atom or an alkyl, aryl, cycloalkyl, aralkyl, or alkaryl group. The carbon atom (C) in structure I is part of the chain of one or more carbons ("carbon chain") of the positively charged organic group. The carbon atom is either directly ether-linked to a glucose monomer of the α-glucan polymer, or is part of a chain of two or more carbon atoms ether-linked to a glucose monomer of the α-glucan polymer/oligomer. The carbon atom in structure I can be —$CH_2$—, —CH— (where a H is substituted with another group such as a hydroxy group), or —C— (where both H's are substituted).

A substituted ammonium group can be a "primary ammonium group", "secondary ammonium group", "tertiary ammonium group", or "quaternary ammonium" group, depending on the composition of $R_2$, $R_3$ and $R_4$ in structure I. A primary ammonium group herein refers to structure I in which each of $R_2$, $R_3$ and $R_4$ is a hydrogen atom (i.e., —C—$NH_3^+$). A secondary ammonium group herein refers to structure I in which each of $R_2$ and $R_3$ is a hydrogen atom and $R_4$ is an alkyl, aryl, or cycloalkyl group. A tertiary ammonium group herein refers to structure I in which $R_2$ is a hydrogen atom and each of $R_3$ and $R_4$ is an alkyl, aryl, or cycloalkyl group. A quaternary ammonium group herein refers to structure I in which each of $R_2$, $R_3$ and $R_4$ is an alkyl, aryl, or cycloalkyl group (i.e., none of $R_2$, $R_3$ and $R_4$ is a hydrogen atom).

A quaternary ammonium α-glucan ether herein can comprise a trialkyl ammonium group (where each of $R_2$, $R_3$ and $R_4$ is an alkyl group), for example. A trimethylammonium group is an example of a trialkyl ammonium group, where each of $R_2$, $R_3$ and $R_4$ is a methyl group. It would be understood that a fourth member (i.e., $R_1$) implied by "quaternary" in this nomenclature is the chain of one or more carbons of the positively charged organic group that is ether-linked to a glucose monomer of the present α-glucan polymer/oligomer.

An example of a quaternary ammonium α-glucan ether compound is trimethylammonium hydroxypropyl α-glucan. The positively charged organic group of this ether compound can be represented as structure II:

(II)

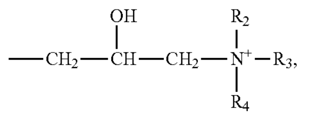

where each of $R_2$, $R_3$ and $R_4$ is a methyl group. Structure II is an example of a quaternary ammonium hydroxypropyl group.

A "halide" herein refers to a compound comprising one or more halogen atoms (e.g., fluorine, chlorine, bromine, iodine). A halide herein can refer to a compound comprising one or more halide groups such as fluoride, chloride, bromide, or iodide. A halide group may serve as a reactive group of an etherification agent.

When referring to the non-enzymatic etherification reaction, the terms "reaction", "reaction composition", and "etherification reaction" are used interchangeably herein and refer to a reaction comprising at least α-glucan polymer and an etherification agent. These components are typically mixed (e.g., resulting in a slurry) and/or dissolved in a solvent (organic and/or aqueous) comprising alkali hydroxide. A reaction is placed under suitable conditions (e.g., time, temperature) for the etherification agent to etherify one or more hydroxyl groups of the glucose units of α-glucan polymer/oligomer with an organic group, thereby yielding an α-glucan ether compound.

The term "alkaline conditions" herein refers to a solution or mixture pH of at least 10, 11 or 12. Alkaline conditions can be prepared by any means known in the art, such as by dissolving an alkali hydroxide in a solution or mixture.

The terms "etherification agent" and "alkylation agent" are used interchangeably herein. An etherification agent herein refers to an agent that can be used to etherify one or more hydroxyl groups of one or more glucose units of the present α-glucan polymer/oligomer with an organic group. An etherification agent thus comprises an organic group.

The term "degree of substitution" (DoS) as used herein refers to the average number of hydroxyl groups substituted in each monomeric unit (glucose) of the present α-glucan ether compound. Since there are at most three hydroxyl groups in a glucose monomeric unit in an α-glucan polymer/oligomer, the degree of substitution in an α-glucan ether compound herein can be no higher than 3.

The term "molar substitution" (M.S.) as used herein refers to the moles of an organic group per monomeric unit of the present α-glucan ether compound. Alternatively, M.S. can refer to the average moles of etherification agent used to react with each monomeric unit in the present α-glucan oligomer/polymer (M.S. can thus describe the degree of derivatization with an etherification agent). It is noted that the M.S. value for the present α-glucan may have no upper limit. For example, when an organic group containing a hydroxyl group (e.g., hydroxyethyl or hydroxypropyl) has been etherified to α-glucan, the hydroxyl group of the organic group may undergo further reaction, thereby coupling more of the organic group to the α-glucan oligomer/polymer.

The term "crosslink" herein refers to a chemical bond, atom, or group of atoms that connects two adjacent atoms in one or more polymer molecules. It should be understood that, in a composition comprising crosslinked α-glucan ether, crosslinks can be between at least two α-glucan ether molecules (i.e., intermolecular crosslinks); there can also be intramolecular crosslinking. A "crosslinking agent" as used herein is an atom or compound that can create crosslinks.

An "aqueous composition" herein refers to a solution or mixture in which the solvent is at least about 20 wt % water, for example, and which comprises the present α-glucan oligomer/polymer and/or the present α-glucan ether compound derivable from etherification of the present α-glucan oligomer/polymer. Examples of aqueous compositions herein are aqueous solutions and hydrocolloids.

The terms "hydrocolloid" and "hydrogel" are used interchangeably herein. A hydrocolloid refers to a colloid system in which water is the dispersion medium. A "colloid" herein refers to a substance that is microscopically dispersed throughout another substance. Therefore, a hydrocolloid herein can also refer to a dispersion, emulsion, mixture, or solution of α-glucan oligomer/polymer and/or one or more α-glucan ether compounds in water or aqueous solution.

The term "aqueous solution" herein refers to a solution in which the solvent is water. The present α-glucan oligomer/polymer and/or the present α-glucan ether compounds can be dispersed, mixed, and/or dissolved in an aqueous solution. An aqueous solution can serve as the dispersion medium of a hydrocolloid herein.

The terms "dispersant" and "dispersion agent" are used interchangeably herein to refer to a material that promotes the formation and stabilization of a dispersion of one substance in another. A "dispersion" herein refers to an aqueous composition comprising one or more particles (e.g., any ingredient of a personal care product, pharmaceutical product, food product, household product, or industrial product disclosed herein) that are scattered, or uniformly scattered, throughout the aqueous composition. It is believed that the present α-glucan oligomer/polymer and/or the present α-glucan ether compounds can act as dispersants in aqueous compositions disclosed herein.

The term "viscosity" as used herein refers to the measure of the extent to which a fluid or an aqueous composition such as a hydrocolloid resists a force tending to cause it to flow. Various units of viscosity that can be used herein include centipoise (cPs) and Pascal-second (Pa·s). A centipoise is one one-hundredth of a poise; one poise is equal to $0.100\ kg \cdot m^{-1} \cdot s^{-1}$. Thus, the terms "viscosity modifier" and "viscosity-modifying agent" as used herein refer to anything that can alter/modify the viscosity of a fluid or aqueous composition.

The term "shear thinning behavior" as used herein refers to a decrease in the viscosity of the hydrocolloid or aqueous solution as shear rate increases. The term "shear thickening behavior" as used herein refers to an increase in the viscosity of the hydrocolloid or aqueous solution as shear rate increases. "Shear rate" herein refers to the rate at which a progressive shearing deformation is applied to the hydrocolloid or aqueous solution. A shearing deformation can be applied rotationally.

The term "contacting" as used herein with respect to methods of altering the viscosity of an aqueous composition refers to any action that results in bringing together an aqueous composition with the present α-glucan polymer composition and/or α-glucan ether compound. "Contacting" may also be used herein with respect to treating a fabric, textile, yarn or fiber with the present α-glucan polymer and/or α-glucan ether compound to provide a surface substantive effect. Contacting can be performed by any means known in the art, such as dissolving, mixing, shaking, homogenization, spraying, treating, immersing, flushing, pouring on or in, combining, painting, coating, applying, affixing to and otherwise communicating an effective amount of the α-glucan polymer composition and/or α-glucan ether compound to an aqueous composition and/or directly to a fabric, fiber, yarn or textile to achieve the desired effect.

The terms "fabric", "textile", and "cloth" are used interchangeably herein to refer to a woven or non-woven material having a network of natural and/or artificial fibers. Such fibers can be thread or yarn, for example.

A "fabric care composition" herein is any composition suitable for treating fabric in some manner. Examples of such a composition include non-laundering fiber treatments (for desizing, scouring, mercerizing, bleaching, coloration, dying, printing, bio-polishing, anti-microbial treatments, anti-wrinkle treatments, stain resistance treatments, etc.), laundry care compositions (e.g., laundry care detergents), and fabric softeners.

The terms "heavy duty detergent" and "all-purpose detergent" are used interchangeably herein to refer to a detergent useful for regular washing of white and colored textiles at any temperature. The terms "low duty detergent" or "fine fabric detergent" are used interchangeably herein to refer to a detergent useful for the care of delicate fabrics such as viscose, wool, silk, microfiber or other fabric requiring special care. "Special care" can include conditions of using excess water, low agitation, and/or no bleach, for example.

The term "adsorption" herein refers to the adhesion of a compound (e.g., the present α-glucan polymer/oligomer and/or the present α-glucan ether compounds derived from the present α-glucan polymer/oligomers) to the surface of a material.

The terms "cellulase" and "cellulase enzyme" are used interchangeably herein to refer to an enzyme that hydrolyzes β-1,4-D-glucosidic linkages in cellulose, thereby partially or completely degrading cellulose. Cellulase can alternatively be referred to as "β-1,4-glucanase", for example, and can have endocellulase activity (EC 3.2.1.4), exocellulase activity (EC 3.2.1.91), or cellobiase activity (EC 3.2.1.21). A cellulase in certain embodiments herein can also hydrolyze β-1,4-D-glucosidic linkages in cellulose ether derivatives such as carboxymethyl cellulose. "Cellulose" refers to an insoluble polysaccharide having a linear chain of β-1,4-linked D-glucose monomeric units.

As used herein, the term "fabric hand" or "handle" is meant people's tactile sensory response towards fabric which may be physical, physiological, psychological, social or any combination thereof. In one embodiment, the fabric hand may be measured using a PhabrOmeter® System for measuring relative hand value (available from Nu Cybertek, Inc. Davis, CA) (American Association of Textile Chemists and Colorists (AATCC test method "202-2012, Relative Hand Value of Textiles: Instrumental Method").

As used herein, "pharmaceutically-acceptable" means that the compounds or compositions in question are suitable for use in contact with the tissues of humans and other animals without undue toxicity, incompatibility, instability, irritation, allergic response, and the like, commensurate with a reasonable benefit/risk ratio.

As used herein, the term "oligosaccharide" refers to polymers typically containing between 3 and about 30 monosaccharide units linked by α-glycosidic bonds.

As used herein the term "polysaccharide" refers to polymers typically containing greater than 30 monosaccharide units linked by α-glycosidic bonds.

As used herein, "personal care products" means products used in the cosmetic treatment hair, skin, scalp, and teeth, including, but not limited to shampoos, body lotions, shower gels, topical moisturizers, toothpaste, tooth gels, mouthwashes, mouthrinses, anti-plaque rinses, and/or other topical treatments. In some particularly preferred embodiments, these products are utilized on humans, while in other embodiments, these products find cosmetic use with non-human animals (e.g., in certain veterinary applications).

As used herein, an "isolated nucleic acid molecule", "isolated polynucleotide", and "isolated nucleic acid fragment" will be used interchangeably and refer to a polymer of RNA or DNA that is single- or double-stranded, optionally containing synthetic, non-natural or altered nucleotide bases. An isolated nucleic acid molecule in the form of a polymer of DNA may be comprised of one or more segments of cDNA, genomic DNA or synthetic DNA.

The term "amino acid" refers to the basic chemical structural unit of a protein or polypeptide. The following abbreviations are used herein to identify specific amino acids:

| Amino Acid | Three-Letter Abbreviation | One-Letter Abbreviation |
|---|---|---|
| Alanine | Ala | A |
| Arginine | Arg | R |
| Asparagine | Asn | N |
| Aspartic acid | Asp | D |
| Cysteine | Cys | C |
| Glutamine | Gln | Q |
| Glutamic acid | Glu | E |
| Glycine | Gly | G |
| Histidine | His | H |
| Isoleucine | Ile | I |
| Leucine | Leu | L |
| Lysine | Lys | K |
| Methionine | Met | M |
| Phenylalanine | Phe | F |
| Proline | Pro | P |
| Serine | Ser | S |
| Threonine | Thr | T |
| Tryptophan | Trp | W |
| Tyrosine | Tyr | Y |
| Valine | Val | V |
| Any amino acid or as defined herein | Xaa | X |

It would be recognized by one of ordinary skill in the art that modifications of amino acid sequences disclosed herein can be made while retaining the function associated with the disclosed amino acid sequences. For example, it is well known in the art that alterations in a gene which result in the production of a chemically equivalent amino acid at a given site, but do not affect the functional properties of the encoded protein are common. For the purposes of the present disclosure, substitutions are defined as exchanges within one of the following five groups:

1. Small aliphatic, nonpolar or slightly polar residues: Ala, Ser, Thr (Pro, Gly);
2. Polar, negatively charged residues and their amides: Asp, Asn, Glu, Gln;
3. Polar, positively charged residues: His, Arg, Lys;

4. Large aliphatic, nonpolar residues: Met, Leu, Ile, Val (Cys); and
5. Large aromatic residues: Phe, Tyr, and Trp.

Thus, a codon for the amino acid alanine, a hydrophobic amino acid, may be substituted by a codon encoding another less hydrophobic residue (such as glycine) or a more hydrophobic residue (such as valine, leucine, or isoleucine). Similarly, changes which result in substitution of one negatively charged residue for another (such as aspartic acid for glutamic acid) or one positively charged residue for another (such as lysine for arginine) can also be expected to produce a functionally equivalent product. In many cases, nucleotide changes which result in alteration of the N-terminal and C-terminal portions of the protein molecule would also not be expected to alter the activity of the protein. Each of the proposed modifications is well within the routine skill in the art, as is determination of retention of biological activity of the encoded products.

As used herein, the term "codon optimized", as it refers to genes or coding regions of nucleic acid molecules for transformation of various hosts, refers to the alteration of codons in the gene or coding regions of the nucleic acid molecules to reflect the typical codon usage of the host organism without altering the polypeptide for which the DNA codes.

As used herein, "synthetic genes" can be assembled from oligonucleotide building blocks that are chemically synthesized using procedures known to those skilled in the art. These building blocks are ligated and annealed to form gene segments that are then enzymatically assembled to construct the entire gene. "Chemically synthesized", as pertaining to a DNA sequence, means that the component nucleotides were assembled in vitro. Manual chemical synthesis of DNA may be accomplished using well-established procedures, or automated chemical synthesis can be performed using one of a number of commercially available machines. Accordingly, the genes can be tailored for optimal gene expression based on optimization of nucleotide sequences to reflect the codon bias of the host cell. The skilled artisan appreciates the likelihood of successful gene expression if codon usage is biased towards those codons favored by the host. Determination of preferred codons can be based on a survey of genes derived from the host cell where sequence information is available.

As used herein, "gene" refers to a nucleic acid molecule that expresses a specific protein, including regulatory sequences preceding (5' non-coding sequences) and following (3' non-coding sequences) the coding sequence. "Native gene" refers to a gene as found in nature with its own regulatory sequences. "Chimeric gene" refers to any gene that is not a native gene, comprising regulatory and coding sequences that are not found together in nature. Accordingly, a chimeric gene may comprise regulatory sequences and coding sequences that are derived from different sources, or regulatory sequences and coding sequences derived from the same source, but arranged in a manner different from that found in nature. "Endogenous gene" refers to a native gene in its natural location in the genome of an organism. A "foreign" gene refers to a gene not normally found in the host organism, but that is introduced into the host organism by gene transfer. Foreign genes can comprise native genes inserted into a non-native organism, or chimeric genes. A "transgene" is a gene that has been introduced into the genome by a transformation procedure.

As used herein, "coding sequence" refers to a DNA sequence that codes for a specific amino acid sequence. "Suitable regulatory sequences" refer to nucleotide sequences located upstream (5' non-coding sequences), within, or downstream (3' non-coding sequences) of a coding sequence, and which influence the transcription, RNA processing or stability, or translation of the associated coding sequence. Regulatory sequences may include promoters, translation leader sequences, RNA processing site, effector binding sites, and stem-loop structures.

As used herein, the term "operably linked" refers to the association of nucleic acid sequences on a single nucleic acid molecule so that the function of one is affected by the other. For example, a promoter is operably linked with a coding sequence when it is capable of affecting the expression of that coding sequence, i.e., the coding sequence is under the transcriptional control of the promoter. Coding sequences can be operably linked to regulatory sequences in sense or antisense orientation.

As used herein, the term "expression" refers to the transcription and stable accumulation of sense (mRNA) or antisense RNA derived from the nucleic acid molecule of the disclosure. Expression may also refer to translation of mRNA into a polypeptide.

As used herein, "transformation" refers to the transfer of a nucleic acid molecule into the genome of a host organism, resulting in genetically stable inheritance. In the present disclosure, the host cell's genome includes chromosomal and extrachromosomal (e.g., plasmid) genes. Host organisms containing the transformed nucleic acid molecules are referred to as "transgenic", "recombinant" or "transformed" organisms.

As used herein, the term "sequence analysis software" refers to any computer algorithm or software program that is useful for the analysis of nucleotide or amino acid sequences. "Sequence analysis software" may be commercially available or independently developed. Typical sequence analysis software will include, but is not limited to, the GCG suite of programs (Wisconsin Package Version 9.0, Accelrys Software Corp., San Diego, CA), BLASTP, BLASTN, BLASTX (Altschul et al., *J. Mol. Biol.* 215:403-410 (1990)), and DNASTAR (DNASTAR, Inc. 1228 S. Park St. Madison, WI 53715 USA), CLUSTALW (for example, version 1.83; Thompson et al., *Nucleic Acids Research,* 22(22):4673-4680 (1994)), and the FASTA program incorporating the Smith-Waterman algorithm (W. R. Pearson, *Comput. Methods Genome Res.*, [Proc. Int. Symp.](1994), *Meeting Date* 1992, 111-20. Editor(s): Suhai, Sandor. Publisher: Plenum, New York, NY), Vector NTI (Informax, Bethesda, MD) and Sequencher v. 4.05. Within the context of this application it will be understood that where sequence analysis software is used for analysis, that the results of the analysis will be based on the "default values" of the program referenced, unless otherwise specified. As used herein "default values" will mean any set of values or parameters set by the software manufacturer that originally load with the software when first initialized.

Structural and Functional Properties of the Soluble α-Glucan Oligomer/Polymer Composition The present soluble α-glucan oligomer/polymer composition was prepared from sucrose (e.g., cane sugar) using one or more enzymatic processing aids that have essentially the same amino acid sequences as found in nature (or active truncations thereof) from microorganisms which having a long history of exposure to humans (microorganisms naturally found in the oral cavity or found in foods such a beer, fermented soybeans, etc.). The soluble oligomers/polymers have low viscosity (enabling use in a broad range of applications), The present soluble α-glucan oligomer/polymer composition is characterized by the following combination of parameters:

a. at least 75% α-(1,3) glycosidic linkages;
b. less than 25% α-(1,6) glycosidic linkages;
c. less than 10% α-(1,3,6) glycosidic linkages;
d. a weight average molecular weight ($M_w$) of less than 5000 Daltons;
e. a viscosity of less than 0.25 Pascal second (Pa·s) at 12 wt % in water 20° C.;
f. a solubility of at least 20% (w/w) in pH 7 water at 25° C.; and g. a polydispersity index (PDI) of less than 5.

In one embodiment, the present soluble α-glucan oligomer/polymer composition comprises at least 75%, preferably at least 80%, more preferably at least 85%, even more preferably at least 90%, and most preferably at least 95% α-(1,3) glycosidic linkages.

In another embodiment, in addition to the α-(1,3) glycosidic linkage embodiments described above, the present soluble α-glucan oligomer/polymer composition further comprises less than 25%, preferably less than 10%, more preferably 5% or less, and even more preferably less than 1% α-(1,6) glycosidic linkages.

In another embodiment, in addition to the α-(1,3) and α-(1,6) glycosidic linkage content embodiments described above, the present soluble α-glucan oligomer/polymer composition further comprises less than 10%, preferably less than 5%, and most preferably less than 2.5% α-(1,3,6) glycosidic linkages.

In a preferred embodiment, the present soluble α-glucan oligomer/polymer composition comprises 93 to 97% α-(1,3) glycosidic linkages and less than 3% α-(1,6) glycosidic linkages and has a weight-average molecular weight corresponding to a DP of 3 to 7 mixture. In a further preferred embodiment, the present soluble α-glucan oligomer/polymer composition comprises about 95% α-(1,3) glycosidic linkages and about 1% α-(1,6) glycosidic linkages and has a weight-average molecular weight corresponding to a DP of 3 to 7 mixture. In a further aspect of the above embodiment, the present soluble α-glucan oligomer/polymer composition further comprises 1 to 3% α-(1,3,6) linkages; preferably about 2% α-(1,3,6) linkages.

In another embodiment, in addition to the above mentioned glycosidic linkage content embodiments, the present soluble α-glucan oligomer/polymer composition further comprises less than 5%, preferably less than 1%, and most preferably less than 0.5% α-(1,4) glycosidic linkages.

In another embodiment, in addition the above mentioned glycosidic linkage content embodiments, the present α-glucan oligomer/polymer composition comprises a weight average molecular weight ($M_w$) of less than 5000 Daltons, preferably less than 2500 Daltons, more preferably between 500 and 2500 Daltons, and most preferably about 500 to about 2000 Daltons.

In another embodiment, in addition to any of the above features, the present α-glucan oligomer/polymer composition comprises a viscosity of less than 250 centipoise (0.25 Pascal second (Pa·s), preferably less than 10 centipoise (cP) (0.01 Pascal second (Pa·s)), preferably less than 7 cP (0.007 Pa·s), more preferably less than 5 cP (0.005 Pa·s), more preferably less than 4 cP (0.004 Pa·s), and most preferably less than 3 cP (0.003 Pa·s) at 12 wt % in water at 20° C.

In addition to any of the above embodiments, the present soluble α-glucan oligomer/polymer composition has a solubility of at least 20% (w/w), preferably at least 30%, 40%, 50%, 60%, or 70% in pH 7 water at 25° C.

Compositions Comprising α-Glucan Oligomer/Polymers and/or α-Glucan Ethers

Depending upon the desired application, the present α-glucan oligomer/polymer composition and/or derivatives thereof (such as the present α-glucan ethers) may be formulated (e.g., blended, mixed, incorporated into, etc.) with one or more other materials and/or active ingredients suitable for use in laundry care, textile/fabric care, and/or personal care products. As such, the present disclosure includes compositions comprising the present glucan oligomer/polymer composition. The term "compositions comprising the present glucan oligomer/polymer composition" in this context may include, for example, aqueous formulations comprising the present glucan oligomer/polymer, rheology modifying compositions, fabric treatment/care compositions, laundry care formulations/compositions, fabric softeners, personal care compositions (hair, skin and oral care), and the like.

The present glucan oligomer/polymer composition may be directed as an ingredient in a desired product or may be blended with one or more additional suitable ingredients (ingredients suitable for fabric care applications, laundry care applications, and/or personal care applications). As such, the present disclosure comprises a fabric care, laundry care, or personal care composition comprising the present soluble α-glucan oligomer/polymer composition, the present α-glucan ethers, or a combination thereof. In one embodiment, the fabric care, laundry care or personal care composition comprises 0.01 to 99 wt % (dry solids basis), preferably 0.1 to 90 wt %, more preferably 1 to 90%, and most preferably 5 to 80 wt % of the glucan oligomer/polymer composition and/or the present α-glucan ether compounds.

In one embodiment, a fabric care composition is provided comprising:

a. an α-glucan oligomer/polymer composition comprising:
   i. at least 75% α-(1,3) glycosidic linkages;
   ii. less than 25% α-(1,6) glycosidic linkages;
   iii. less than 10% α-(1,3,6) glycosidic linkages;
   iv. a weight average molecular weight of less than 5000 Daltons;
   v. a viscosity of less than 0.25 Pascal second (Pa·s) at 12 wt % in water 20° C.;
   vi. a solubility of at least 20% (w/w) in water at 25° C.; and
   vii. a polydispersity index of less than 5; and
b. at least one additional fabric care ingredient.

In another embodiment, a laundry care composition is provided comprising:

a) an α-glucan oligomer/polymer composition comprising:
   i. at least 75% α-(1,3) glycosidic linkages;
   ii. less than 25% α-(1,6) glycosidic linkages;
   iii. less than 10% α-(1,3,6) glycosidic linkages;
   iv. a weight average molecular weight of less than 5000 Daltons;
   v. a viscosity of less than 0.25 Pascal second (Pa·s) at 12 wt % in water 20° C.;
   vi. a solubility of at least 20% (w/w) in water at 25° C.; and
   vii. a polydispersity index of less than 5; and
b) at least one additional laundry care ingredient.

In another embodiment, an α-glucan ether derived from the present α-glucan oligomer/polymer composition is provided comprising:

1) at least 75% α-(1,3) glycosidic linkages;
2) less than 25% α-(1,6) glycosidic linkages;
3) less than 10% α-(1,3,6) glycosidic linkages;
4) a weight average molecular weight of less than 5000 Daltons;
5) a viscosity of less than 0.25 Pascal second (Pa·s) at 12 wt % in water 20° C.;
6) a solubility of at least 20% (w/w) in water at 25° C.; and
7) a polydispersity index of less than 5; wherein the composition has a degree of substitution (DoS) with at least one organic group of about 0.05 to about 3.0.

In a further embodiment to any of the above embodiments, the glucan ether composition has a degree of substitution (DoS) with at least one organic group of about 0.05 to about 3.0.

In a further embodiment to any of the above embodiments, the glucan ether composition comprises at least one organic group wherein the organic group is a carboxy alkyl group, hydroxy alkyl group, or an alkyl group.

In a further embodiment to any of the above embodiments, the at least one organic group is a carboxymethyl, hydroxypropyl, dihydroxypropyl, hydroxyethyl, methyl, or ethyl group.

In a further embodiment to any of the above embodiments, the at least one organic group is a positively charged organic group.

In a further embodiment to any of the above embodiments, the glucan ether is a quaternary ammonium glucan ether.

In a further embodiment to any of the above embodiments, the glucan ether composition is a trimethylammonium hydroxypropyl glucan.

In a further embodiment to any of the above embodiments, an organic group may be an alkyl group such as a methyl, ethyl, propyl, butyl, pentyl, hexyl, heptyl, octyl, nonyl, or decyl group, for example.

In a further embodiment to any of the above embodiments, the organic group may be a substituted alkyl group in which there is a substitution on one or more carbons of the alkyl group. The substitution(s) may be one or more hydroxyl, aldehyde, ketone, and/or carboxyl groups. For example, a substituted alkyl group may be a hydroxy alkyl group, dihydroxy alkyl group, or carboxy alkyl group.

Examples of suitable hydroxy alkyl groups are hydroxymethyl ($—CH_2OH$), hydroxyethyl (e.g., $—CH_2CH_2OH$, $—CH(OH)CH_3$), hydroxypropyl (e.g., $—CH_2CH_2CH_2OH$, $—CH_2CH(OH)CH_3$, $—CH(OH)CH_2CH_3$), hydroxybutyl and hydroxypentyl groups. Other examples include dihydroxy alkyl groups (diols) such as dihydroxymethyl, dihydroxyethyl (e.g., $—CH(OH)CH_2OH$), dihydroxypropyl (e.g., $—CH_2CH(OH)CH_2OH$, $—CH(OH)CH(OH)CH_3$), dihydroxybutyl and dihydroxypentyl groups.

Examples of suitable carboxy alkyl groups are carboxymethyl ($—CH_2OOOH$), carboxyethyl (e.g., $—CH_2CH_2OOOH$, $—CH(COOH)CH_3$), carboxypropyl (e.g., $—CH_2CH_2CH_2OOOH$, $—CH_2CH(COOH)CH_3$, $—CH(COOH)CH_2CH_3$), carboxybutyl and carboxypentyl groups.

Alternatively still, one or more carbons of an alkyl group can have a substitution(s) with another alkyl group. Examples of such substituent alkyl groups are methyl, ethyl and propyl groups. To illustrate, an organic group can be $—CH(CH_3)CH_2CH_3$ or $—CH_2CH(CH_3)CH_3$, for example, which are both propyl groups having a methyl substitution.

As should be clear from the above examples of various substituted alkyl groups, a substitution (e.g., hydroxy or carboxy group) on an alkyl group in certain embodiments may be bonded to the terminal carbon atom of the alkyl group, where the terminal carbon group is opposite the terminus that is in ether linkage to a glucose monomeric unit in an α-glucan ether compound. An example of this terminal substitution is the hydroxypropyl group $—CH_2CH_2CH_2OH$. Alternatively, a substitution may be on an internal carbon atom of an alkyl group. An example on an internal substitution is the hydroxypropyl group $—CH_2CH(OH)CH_3$. An alkyl group can have one or more substitutions, which may be the same (e.g., two hydroxyl groups [dihydroxy]) or different (e.g., a hydroxyl group and a carboxyl group).

In a further embodiment to any of the above embodiments, the α-glucan ether compounds disclosed herein may contain one type of organic group. Examples of such compounds contain a carboxy alkyl group as the organic group (carboxyalkyl α-glucan, generically speaking). A specific non-limiting example of such a compound is carboxymethyl α-glucan.

In a further embodiment to any of the above embodiments, α-glucan ether compounds disclosed herein can contain two or more different types of organic groups. Examples of such compounds contain (i) two different alkyl groups as organic groups, (ii) an alkyl group and a hydroxy alkyl group as organic groups (alkyl hydroxyalkyl α-glucan, generically speaking), (iii) an alkyl group and a carboxy alkyl group as organic groups (alkyl carboxyalkyl α-glucan, generically speaking), (iv) a hydroxy alkyl group and a carboxy alkyl group as organic groups (hydroxyalkyl carboxyalkyl α-glucan, generically speaking), (v) two different hydroxy alkyl groups as organic groups, or (vi) two different carboxy alkyl groups as organic groups. Specific non-limiting examples of such compounds include ethyl hydroxyethyl α-glucan, hydroxyalkyl methyl α-glucan, carboxymethyl hydroxyethyl α-glucan, and carboxymethyl hydroxypropyl α-glucan.

In a further embodiment to any of the above embodiments, the organic group herein can alternatively be a positively charged organic group. As defined above, a positively charged organic group comprises a chain of one or more carbons having one or more hydrogens substituted with another atom or functional group, where one or more of the substitutions is with a positively charged group.

A positively charged group may be a substituted ammonium group, for example. Examples of substituted ammonium groups are primary, secondary, tertiary and quaternary ammonium groups. Structure I depicts a primary, secondary, tertiary or quaternary ammonium group, depending on the composition of $R_2$, $R_3$ and $R_4$ in structure I. Each of $R_2$, $R_3$ and $R_4$ in structure I independently represent a hydrogen atom or an alkyl, aryl, cycloalkyl, aralkyl, or alkaryl group. Alternatively, each of $R_2$, $R_3$ and $R_4$ in can independently represent a hydrogen atom or an alkyl group. An alkyl group can be a methyl, ethyl, propyl, butyl, pentyl, hexyl, heptyl, octyl, nonyl, or decyl group, for example. Where two or three of $R_2$, $R_3$ and $R_4$ are an alkyl group, they can be the same or different alkyl groups.

A "primary ammonium α-glucan ether compound" herein can comprise a positively charged organic group having an ammonium group. In this example, the positively charged organic group comprises structure I in which each of $R_2$, $R_3$ and $R_4$ is a hydrogen atom. A non-limiting example of such a positively charged organic group is represented by structure II when each of $R_2$, $R_3$ and $R_4$ is a hydrogen atom. An example of a primary ammonium α-glucan ether compound can be represented in shorthand as ammonium α-glucan ether. It would be understood that a first member (i.e., $R_1$)

implied by "primary" in the above nomenclature is the chain of one or more carbons of the positively charged organic group that is ether-linked to a glucose monomer of α-glucan.

A "secondary ammonium α-glucan ether compound" herein can comprise a positively charged organic group having a monoalkylammonium group, for example. In this example, the positively charged organic group comprises structure I in which each of $R_2$ and $R_3$ is a hydrogen atom and $R_4$ is an alkyl group. A non-limiting example of such a positively charged organic group is represented by structure II when each of $R_2$ and $R_3$ is a hydrogen atom and $R_4$ is an alkyl group. An example of a secondary ammonium α-glucan ether compound can be represented in shorthand herein as monoalkylammonium α-glucan ether (e.g., monomethyl-, monoethyl-, monopropyl-, monobutyl-, monopentyl-, monohexyl-, monoheptyl-, monooctyl-, monononyl- or monodecyl-ammonium α-glucan ether). It would be understood that a second member (i.e., $R_1$) implied by "secondary" in the above nomenclature is the chain of one or more carbons of the positively charged organic group that is ether-linked to a glucose monomer of α-glucan.

A "tertiary ammonium α-glucan ether compound" herein can comprise a positively charged organic group having a dialkylammonium group, for example. In this example, the positively charged organic group comprises structure I in which $R_2$ is a hydrogen atom and each of $R_3$ and $R_4$ is an alkyl group. A non-limiting example of such a positively charged organic group is represented by structure II when $R_2$ is a hydrogen atom and each of $R_3$ and $R_4$ is an alkyl group. An example of a tertiary ammonium α-glucan ether compound can be represented in shorthand as dialkylammonium α-glucan ether (e.g., dimethyl-, diethyl-, dipropyl-, dibutyl-, dipentyl-, dihexyl-, diheptyl-, dioctyl-, dinonyl- or didecyl-ammonium α-glucan ether). It would be understood that a third member (i.e., $R_1$) implied by "tertiary" in the above nomenclature is the chain of one or more carbons of the positively charged organic group that is ether-linked to a glucose monomer of α-glucan.

A "quaternary ammonium α-glucan ether compound" herein can comprise a positively charged organic group having a trialkylammonium group, for example. In this example, the positively charged organic group comprises structure I in which each of $R_2$, $R_3$ and $R_4$ is an alkyl group. A non-limiting example of such a positively charged organic group is represented by structure II when each of $R_2$, $R_3$ and $R_4$ is an alkyl group. An example of a quaternary ammonium α-glucan ether compound can be represented in shorthand as trialkylammonium α-glucan ether (e.g., trimethyl-, triethyl-, tripropyl-, tributyl-, tripentyl-, trihexyl-, triheptyl-, trioctyl-, trinonyl- or tridecyl-ammonium α-glucan ether). It would be understood that a fourth member (i.e., $R_1$) implied by "quaternary" in the above nomenclature is the chain of one or more carbons of the positively charged organic group that is ether-linked to a glucose monomer of α-glucan.

Additional non-limiting examples of substituted ammonium groups that can serve as a positively charged group herein are represented in structure I when each of $R_2$, $R_3$ and $R_4$ independently represent a hydrogen atom; an alkyl group such as a methyl, ethyl, or propyl group; an aryl group such as a phenyl or naphthyl group; an aralkyl group such as a benzyl group; an alkaryl group; or a cycloalkyl group. Each of $R_2$, $R_3$ and $R_4$ may further comprise an amino group or a hydroxyl group, for example.

The nitrogen atom in a substituted ammonium group represented by structure I is bonded to a chain of one or more carbons as comprised in a positively charged organic group. This chain of one or more carbons ("carbon chain") is ether-linked to a glucose monomer of α-glucan, and may have one or more substitutions in addition to the substitution with the nitrogen atom of the substituted ammonium group. There can be 1, 2, 3, 4, 5, 6, 7, 8, 9 or 10 carbons, for example, in a carbon chain. To illustrate, the carbon chain of structure II is 3 carbon atoms in length.

Examples of a carbon chain of a positively charged organic group that do not have a substitution in addition to the substitution with a positively charged group include $—CH_2—$, $—CH_2CH_2—$, $—CH_2CH_2CH_2—$, $—CH_2CH_2CH_2CH_2—$ and $—CH_2CH_2CH_2CH_2CH_2—$. In each of these examples, the first carbon atom of the chain is ether-linked to a glucose monomer of α-glucan, and the last carbon atom of the chain is linked to a positively charged group. Where the positively charged group is a substituted ammonium group, the last carbon atom of the chain in each of these examples is represented by the C in structure I.

Where a carbon chain of a positively charged organic group has a substitution in addition to a substitution with a positively charged group, such additional substitution may be with one or more hydroxyl groups, oxygen atoms (thereby forming an aldehyde or ketone group), alkyl groups (e.g., methyl, ethyl, propyl, butyl), and/or additional positively charged groups. A positively charged group is typically bonded to the terminal carbon atom of the carbon chain.

Examples of a carbon chain of a positively charged organic group having one or more substitutions with a hydroxyl group include hydroxyalkyl (e.g., hydroxyethyl, hydroxypropyl, hydroxybutyl, hydroxypentyl) groups and dihydroxyalkyl (e.g., dihydroxyethyl, dihydroxypropyl, dihydroxybutyl, dihydroxypentyl) groups. Examples of hydroxyalkyl and dihydroxyalkyl (diol) carbon chains include $—CH(OH)—$, $—CH(OH)CH_2—$, $—C(OH)_2CH_2—$, $—CH_2CH(OH)CH_2—$, $—CH(OH)CH_2CH_2—$, $—CH(OH)CH(OH)CH_2—$, $—CH_2CH_2CH(OH)CH_2—$, $—CH_2CH(OH)CH_2CH_2—$, $—CH(OH)CH_2CH_2CH_2—$, $—CH_2CH(OH)CH(OH)CH_2—$, $—CH(OH)CH(OH)CH_2CH_2—$ and $—CH(OH)CH_2CH(OH)CH_2—$. In each of these examples, the first carbon atom of the chain is ether-linked to a glucose monomer of the present α-glucan, and the last carbon atom of the chain is linked to a positively charged group. Where the positively charged group is a substituted ammonium group, the last carbon atom of the chain in each of these examples is represented by the C in structure I.

Examples of a carbon chain of a positively charged organic group having one or more substitutions with an alkyl group include chains with one or more substituent methyl, ethyl and/or propyl groups. Examples of methylalkyl groups include $—CH(CH_3)CH_2CH_2—$ and $—CH_2CH(CH_3)CH_2—$, which are both propyl groups having a methyl substitution. In each of these examples, the first carbon atom of the chain is ether-linked to a glucose monomer of the present α-glucan, and the last carbon atom of the chain is linked to a positively charged group. Where the positively charged group is a substituted ammonium group, the last carbon atom of the chain in each of these examples is represented by the C in structure I.

In a further embodiment to any of the above embodiments, the α-glucan ether compounds herein may contain one type of positively charged organic group. For example, one or more positively charged organic groups ether-linked to the glucose monomer of α-glucan may be trimethylammonium hydroxypropyl groups (structure II). Alternatively, α-glucan ether compounds disclosed herein can contain two or more different types of positively charged organic groups.

In a further embodiment to any of the above embodiments, α-glucan ether compounds herein can comprise at least one nonionic organic group and at least one anionic group, for example. As another example, α-glucan ether compounds herein can comprise at least one nonionic organic group and at least one positively charged organic group.

In a further embodiment to any of the above embodiments, α-glucan ether compounds may be derived from any of the present α-glucan oligomers/polymers disclosed herein. For example, the α-glucan ether compound can be produced by ether-derivatizing the present α-glucan oligomers/polymers using an etherification reaction as disclosed herein. In certain embodiments of the disclosed disclosure, a composition comprising an α-glucan ether compound can be a hydrocolloid or aqueous solution having a viscosity of at least about 10 cPs. Alternatively, such a hydrocolloid or aqueous solution has a viscosity of at least about 100, 250, 500, 750, 1000, 1250, 1500, 1750, 2000, 2250, 2500, 3000, 3500, or 4000 cPs (or any value between 100 and 4000 cPs), for example.

Viscosity can be measured with the hydrocolloid or aqueous solution at any temperature between about 3° C. to about 110° C. (or any integer between 3 and 110° C.). Alternatively, viscosity can be measured at a temperature between about 4° C. to 30° C., or about 20° C. to 25° C. Viscosity can be measured at atmospheric pressure (about 760 torr) or any other higher or lower pressure.

The viscosity of a hydrocolloid or aqueous solution disclosed herein can be measured using a viscometer or rheometer, or using any other means known in the art. It would be understood by those skilled in the art that a viscometer or rheometer can be used to measure the viscosity of those hydrocolloids and aqueous solutions of the disclosure that exhibit shear thinning behavior or shear thickening behavior (i.e., liquids with viscosities that vary with flow conditions). The viscosity of such embodiments can be measured at a rotational shear rate of about 10 to 1000 rpm (revolutions per minute) (or any integer between 10 and 1000 rpm), for example. Alternatively, viscosity can be measured at a rotational shear rate of about 10, 60, 150, 250, or 600 rpm.

The pH of a hydrocolloid or aqueous solution disclosed herein can be between about 2.0 to about 12.0. Alternatively, pH can be about 2.0, 3.0, 4.0, 5.0, 6.0, 7.0, 8.0, 9.0, 10.0, 11.0, 12.0; or between 5.0 to about 12.0; or between about 4.0 and 8.0; or between about 5.0 and 8.0.

An aqueous composition herein such as a hydrocolloid or aqueous solution can comprise a solvent having at least about 20 wt % water. In other embodiments, a solvent is at least about 30, 40, 50, 60, 70, 80, 90, or 100 wt % water (or any integer value between 20 and 100 wt %), for example.

In a further embodiment to any of the above embodiments, the α-glucan ether compound disclosed herein can be present in a hydrocolloid or aqueous solution at a weight percentage (wt %) of at least about 0.01%, 0.05%, 0.1%, 0.2%, 0.3%, 0.4%, 0.5%, 0.6%, 0.7%, 0.8%, 0.9%, 1.0%, 1.2%, 1.4%, 1.6%, 1.8%, 2.0%, 2.5%, 3.0%, 3.5%, 4.0%, 4.5%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, or 30%, for example.

In a further embodiment to any of the above embodiments, the hydrocolloid or aqueous solution herein can comprise other components in addition to one or more α-glucan ether compounds. For example, the hydrocolloid or aqueous solution can comprise one or more salts such as a sodium salt (e.g., NaCl, $Na_2SO_4$). Other non-limiting examples of salts include those having (i) an aluminum, ammonium, barium, calcium, chromium (II or III), copper (I or II), iron (II or III), hydrogen, lead (II), lithium, magnesium, manganese (II or III), mercury (I or II), potassium, silver, sodium strontium, tin (II or IV), or zinc cation, and (ii) an acetate, borate, bromate, bromide, carbonate, chlorate, chloride, chlorite, chromate, cyanamide, cyanide, dichromate, dihydrogen phosphate, ferricyanide, ferrocyanide, fluoride, hydrogen carbonate, hydrogen phosphate, hydrogen sulfate, hydrogen sulfide, hydrogen sulfite, hydride, hydroxide, hypochlorite, iodate, iodide, nitrate, nitride, nitrite, oxalate, oxide, perchlorate, permanganate, peroxide, phosphate, phosphide, phosphite, silicate, stannate, stannite, sulfate, sulfide, sulfite, tartrate, or thiocyanate anion. Thus, any salt having a cation from (i) above and an anion from (ii) above can be in a hydrocolloid or aqueous solution, for example. A salt can be present in a hydrocolloid or aqueous solution at a wt % of about 0.01% to about 10.00% (or any hundredth increment between 0.01% and 10.00%), for example.

In a further embodiment to any of the above embodiments, those skilled in the art would understand that in certain embodiments, the α-glucan ether compound can be in an anionic form in a hydrocolloid or aqueous solution. Examples may include those α-glucan ether compounds having an organic group comprising an alkyl group substituted with a carboxyl group. Carboxyl (COOH) groups in a carboxyalkyl α-glucan ether compound can convert to carboxylate ($COO^-$) groups in aqueous conditions. Such anionic groups can interact with salt cations such as any of those listed above in (i) (e.g., potassium, sodium, or lithium cation). Thus, an α-glucan ether compound can be a sodium carboxyalkyl α-glucan ether (e.g., sodium carboxymethyl α-glucan), potassium carboxyalkyl α-glucan ether (e.g., potassium carboxymethyl α-glucan), or lithium carboxyalkyl α-glucan ether (e.g., lithium carboxymethyl α-glucan), for example.

In alternative embodiments to any of the above embodiments, a composition comprising the α-glucan ether compound herein can be non-aqueous (e.g., a dry composition). Examples of such embodiments include powders, granules, microcapsules, flakes, or any other form of particulate matter. Other examples include larger compositions such as pellets, bars, kernels, beads, tablets, sticks, or other agglomerates. A non-aqueous or dry composition herein typically has less than 3, 2, 1, 0.5, or 0.1 wt % water comprised therein.

In certain embodiments the α-glucan ether compound may be crosslinked using any means known in the art. Such crosslinks may be borate crosslinks, where the borate is from any boron-containing compound (e.g., boric acid, diborates, tetraborates, pentaborates, polymeric compounds such as POLYBOR®, polymeric compounds of boric acid, alkali borates), for example. Alternatively, crosslinks can be provided with polyvalent metals such as titanium or zirconium. Titanium crosslinks may be provided, for example, using titanium IV-containing compounds such as titanium ammonium lactate, titanium triethanolamine, titanium acetylacetonate, and polyhydroxy complexes of titanium. Zirconium crosslinks can be provided using zirconium IV-containing compounds such as zirconium lactate, zirconium carbonate, zirconium acetylacetonate, zirconium triethanolamine, zirconium diisopropylamine lactate and polyhydroxy complexes of zirconium, for example. Alternatively still, crosslinks can be provided with any crosslinking agent described in U.S. Pat. Nos. 4,462,917, 4,464,270, 4,477,360 and 4,799,550, which are all incorporated herein by reference. A crosslinking agent (e.g., borate) may be present in an aqueous composition herein at a concentration of about 0.2% to 20 wt %, or about 0.1, 0.2, 0.3, 0.4, 0.5, 1, 2, 3, 4, 5, 6, 7, 8, 9, 10, 15, or 20 wt %, for example.

It is believed that an α-glucan ether compound disclosed herein that is crosslinked typically has a higher viscosity in an aqueous solution compared to its non-crosslinked counterpart. In addition, it is believed that a crosslinked α-glucan ether compound can have increased shear thickening behavior compared to its non-crosslinked counterpart.

In a further embodiment to any of the above embodiments, a composition herein (fabric care, laundry care, personal care, etc.) may optionally contain one or more active enzymes. Non-limiting examples of suitable enzymes include proteases, cellulases, hemicellulases, peroxidases, lipolytic enzymes (e.g., metallolipolytic enzymes), xylanases, lipases, phospholipases, esterases (e.g., arylesterase, polyesterase), perhydrolases, cutinases, pectinases, pectate lyases, mannanases, keratinases, reductases, oxidases (e.g., choline oxidase), phenoloxidases, lipoxygenases, ligninases, pullulanases, tannases, pentosanases, malanases, beta-glucanases, arabinosidases, hyaluronidases, chondroitinases, laccases, metalloproteinases, amadoriases, glucoamylases, arabinofuranosidases, phytases, isomerases, transferases and amylases. If an enzyme(s) is included, it may be comprised in a composition herein at about 0.0001-0.1 wt % (e.g., 0.01-0.03 wt %) active enzyme (e.g., calculated as pure enzyme protein), for example.

A cellulase herein can have endocellulase activity (EC 3.2.1.4), exocellulase activity (EC 3.2.1.91), or cellobiase activity (EC 3.2.1.21). A cellulase herein is an "active cellulase" having activity under suitable conditions for maintaining cellulase activity; it is within the skill of the art to determine such suitable conditions. Besides being able to degrade cellulose, a cellulase in certain embodiments can also degrade cellulose ether derivatives such as carboxymethyl cellulose. Examples of cellulose ether derivatives which are expected to not be stable to cellulase are disclosed in U.S. Pat. Nos. 7,012,053, 7,056,880, 6,579,840, 7,534,759 and 7,576,048.

A cellulase herein may be derived from any microbial source, such as a bacteria or fungus. Chemically-modified cellulases or protein-engineered mutant cellulases are included. Suitable cellulases include, but are not limited to, cellulases from the genera *Bacillus, Pseudomonas, Streptomyces, Trichoderma, Humicola, Fusarium, Thielavia* and *Acremonium*. As other examples, a cellulase may be derived from *Humicola insolens, Myceliophthora thermophila* or *Fusarium oxysporum*; these and other cellulases are disclosed in U.S. Pat. Nos. 4,435,307, 5,648,263, 5,691,178, 5,776,757 and 7,604,974, which are all incorporated herein by reference. Exemplary *Trichoderma reesei* cellulases are disclosed in U.S. Pat. Nos. 4,689,297, 5,814,501, 5,324,649, and International Patent Appl. Publ. Nos. WO92/06221 and WO92/06165, all of which are incorporated herein by reference. Exemplary *Bacillus* cellulases are disclosed in U.S. Pat. No. 6,562,612, which is incorporated herein by reference. A cellulase, such as any of the foregoing, preferably is in a mature form lacking an N-terminal signal peptide. Commercially available cellulases useful herein include CELLUZYME® and CAREZYME® (Novozymes A/S); CLAZINASE® and PURADAX® HA (DuPont Industrial Biosciences), and KAC-500(B)® (Kao Corporation).

Alternatively, a cellulase herein may be produced by any means known in the art, such as described in U.S. Pat. Nos. 4,435,307, 5,776,757 and 7,604,974, which are incorporated herein by reference. For example, a cellulase may be produced recombinantly in a heterologous expression system, such as a microbial or fungal heterologous expression system. Examples of heterologous expression systems include bacterial (e.g., *E. coli, Bacillus* sp.) and eukaryotic systems. Eukaryotic systems can employ yeast (e.g., *Pichia* sp., *Saccharomyces* sp.) or fungal (e.g., *Trichoderma* sp. such as *T. reesei, Aspergillus* species such as *A. niger*) expression systems, for example.

One or more cellulases can be directly added as an ingredient when preparing a composition disclosed herein. Alternatively, one or more cellulases can be indirectly (inadvertently) provided in the disclosed composition. For example, cellulase can be provided in a composition herein by virtue of being present in a non-cellulase enzyme preparation used for preparing a composition. Cellulase in compositions in which cellulase is indirectly provided thereto can be present at about 0.1-10 ppb (e.g., less than 1 ppm), for example. A contemplated benefit of a composition herein, by virtue of employing a poly alpha-1,3-1,6-glucan ether compound instead of a cellulose ether compound, is that non-cellulase enzyme preparations that might have background cellulase activity can be used without concern that the desired effects of the glucan ether will be negated by the background cellulase activity.

A cellulase in certain embodiments can be thermostable. Cellulase thermostability refers to the ability of the enzyme to retain activity after exposure to an elevated temperature (e.g. about 60-70° C.) for a period of time (e.g., about 30-60 minutes). The thermostability of a cellulase can be measured by its half-life (t½) given in minutes, hours, or days, during which time period half the cellulase activity is lost under defined conditions.

A cellulase in certain embodiments can be stable to a wide range of pH values (e.g. neutral or alkaline pH such as pH of ~7.0 to ~11.0). Such enzymes can remain stable for a predetermined period of time (e.g., at least about 15 min., 30 min., or 1 hour) under such pH conditions.

At least one, two, or more cellulases may be included in the composition. The total amount of cellulase in a composition herein typically is an amount that is suitable for the purpose of using cellulase in the composition (an "effective amount"). For example, an effective amount of cellulase in a composition intended for improving the feel and/or appearance of a cellulose-containing fabric is an amount that produces measurable improvements in the feel of the fabric (e.g., improving fabric smoothness and/or appearance, removing pills and fibrils which tend to reduce fabric appearance sharpness). As another example, an effective amount of cellulase in a fabric stonewashing composition herein is that amount which will provide the desired effect (e.g., to produce a worn and faded look in seams and on fabric panels). The amount of cellulase in a composition herein can also depend on the process parameters in which the composition is employed (e.g., equipment, temperature, time, and the like) and cellulase activity, for example. The effective concentration of cellulase in an aqueous composition in which a fabric is treated can be readily determined by a skilled artisan. In fabric care processes, cellulase can be present in an aqueous composition (e.g., wash liquor) in which a fabric is treated in a concentration that is minimally about 0.01-0.1 ppm total cellulase protein, or about 0.1-10 ppb total cellulase protein (e.g., less than 1 ppm), to maximally about 100, 200, 500, 1000, 2000, 3000, 4000, or 5000 ppm total cellulase protein, for example.

In a further embodiment to any of the above embodiments, the α-glucan oligomer/polymers and/or the present α-glucan ethers (derived from the present α-glucan oligomer/polymers) are mostly or completely stable (resistant) to being degraded by cellulase. For example, the percent degradation of the present α-glucan oligomers/polymers and/or α-glucan ether compounds by one or more cellulases is less than 10%, 9%, 8%, 7%, 6%, 5%, 4%, 3%, 2%, or 1%, or is 0%. Such percent degradation can be determined, for example, by comparing the molecular weight of polymer before and after treatment with a cellulase for a period of time (e.g., ~24 hours).

In a further embodiment to any of the above embodiments, hydrocolloids and aqueous solutions in certain embodiments of the disclosure are believed to have either shear thinning behavior or shear thickening behavior. Shear thinning behavior is observed as a decrease in viscosity of the hydrocolloid or aqueous solution as shear rate increases, whereas shear thickening behavior is observed as an increase in viscosity of the hydrocolloid or aqueous solution as shear rate increases. Modification of the shear thinning behavior or shear thickening behavior of an aqueous solution herein is due to the admixture of the α-glucan ether to the aqueous composition. Thus, one or more α-glucan ether compounds can be added to an aqueous composition to modify its rheological profile (i.e., the flow properties of the aqueous liquid, solution, or mixture are modified). Also, one or more α-glucan ether compounds can be added to an aqueous composition to modify its viscosity.

The rheological properties of hydrocolloids and aqueous solutions can be observed by measuring viscosity over an increasing rotational shear rate (e.g., from about 10 rpm to about 250 rpm). For example, shear thinning behavior of a hydrocolloid or aqueous solution disclosed herein can be observed as a decrease in viscosity (cPs) by at least about 5%, 10%, 15%, 20%, 25%, 30%, 35%, 40%, 45%, 50%, 55%, 60%, 65%, 70%, 75%, 80%, 85%, 90%, or 95% (or any integer between 5% and 95%) as the rotational shear rate increases from about 10 rpm to 60 rpm, 10 rpm to 150 rpm, 10 rpm to 250 rpm, 60 rpm to 150 rpm, 60 rpm to 250 rpm, or 150 rpm to 250 rpm. As another example, shear thickening behavior of a hydrocolloid or aqueous solution disclosed herein can be observed as an increase in viscosity (cPs) by at least about 5%, 10%, 15%, 20%, 25%, 30%, 35%, 40%, 45%, 50%, 55%, 60%, 65%, 70%, 75%, 80%, 85%, 90%, 95%, 100%, 125%, 150%, 175%, or 200% (or any integer between 5% and 200%) as the rotational shear rate increases from about 10 rpm to 60 rpm, 10 rpm to 150 rpm, 10 rpm to 250 rpm, 60 rpm to 150 rpm, 60 rpm to 250 rpm, or 150 rpm to 250 rpm.

A hydrocolloid or aqueous solution disclosed herein can be in the form of, and/or comprised in, a textile care product, a laundry care product, a personal care product, a pharmaceutical product, or industrial product. The present α-glucan oligomers/polymers and/or the present α-glucan ether compounds can be used as thickening agents and/or dispersion agents in each of these products. Such a thickening agent may be used in conjunction with one or more other types of thickening agents if desired, such as those disclosed in U.S. Pat. No. 8,541,041, the disclosure of which is incorporated herein by reference in its entirety.

A household and/or industrial product herein can be in the form of drywall tape-joint compounds; mortars; grouts; cement plasters; spray plasters; cement stucco; adhesives; pastes; wall/ceiling texturizers; binders and processing aids for tape casting, extrusion forming, injection molding and ceramics; spray adherents and suspending/dispersing aids for pesticides, herbicides, and fertilizers; fabric care products such as fabric softeners and laundry detergents; hard surface cleaners; air fresheners; polymer emulsions; gels such as water-based gels; surfactant solutions; paints such as water-based paints; protective coatings; adhesives; sealants and caulks; inks such as water-based ink; metal-working fluids; emulsion-based metal cleaning fluids used in electroplating, phosphatizing, galvanizing and/or general metal cleaning operations; hydraulic fluids (e.g., those used for fracking in downhole operations); and aqueous mineral slurries, for example.

In a further embodiment to any of the above embodiments, compositions disclosed herein can be in the form of a fabric care composition. A fabric care composition herein can be used for hand wash, machine wash and/or other purposes such as soaking and/or pretreatment of fabrics, for example. A fabric care composition may take the form of, for example, a laundry detergent; fabric conditioner; any wash-, rinse-, or dryer-added product; unit dose or spray. Fabric care compositions in a liquid form may be in the form of an aqueous composition as disclosed herein. In other aspects, a fabric care composition can be in a dry form such as a granular detergent or dryer-added fabric softener sheet. Other non-limiting examples of fabric care compositions herein include: granular or powder-form all-purpose or heavy-duty washing agents; liquid, gel or paste-form all-purpose or heavy-duty washing agents; liquid or dry fine-fabric (e.g. delicates) detergents; cleaning auxiliaries such as bleach additives, "stain-stick", or pre-treatments; substrate-laden products such as dry and wetted wipes, pads, or sponges; sprays and mists.

A detergent composition herein may be in any useful form, e.g., as powders, granules, pastes, bars, unit dose, or liquid. A liquid detergent may be aqueous, typically containing up to about 70 wt % of water and 0 wt % to about 30 wt % of organic solvent. It may also be in the form of a compact gel type containing only about 30 wt % water.

A detergent composition herein typically comprises one or more surfactants, wherein the surfactant is selected from nonionic surfactants, anionic surfactants, cationic surfactants, ampholytic surfactants, zwitterionic surfactants, semi-polar nonionic surfactants and mixtures thereof. In some embodiments, the surfactant is present at a level of from about 0.1% to about 60%, while in alternative embodiments the level is from about 1% to about 50%, while in still further embodiments the level is from about 5% to about 40%, by weight of the cleaning composition. A detergent will usually contain 0 wt % to about 50 wt % of an anionic surfactant such as linear alkylbenzenesulfonate (LAS), alpha-olefinsulfonate (AOS), alkyl sulfate (fatty alcohol sulfate) (AS), alcohol ethoxysulfate (AEOS or AES), secondary alkanesulfonates (SAS), alpha-sulfo fatty acid methyl esters, alkyl- or alkenylsuccinic acid, or soap. In addition, a detergent composition may optionally contain 0 wt % to about 40 wt % of a nonionic surfactant such as alcohol ethoxylate (AEO or AE), carboxylated alcohol ethoxylates, nonylphenol ethoxylate, alkylpolyglycoside, alkyldimethylamineoxide, ethoxylated fatty acid monoethanolamide, fatty acid monoethanolamide, or polyhydroxy alkyl fatty acid amide (as described for example in WO92/06154, which is incorporated herein by reference).

A detergent composition herein typically comprise one or more detergent builders or builder systems. In some embodiments incorporating at least one builder, the cleaning compositions comprise at least about 1%, from about 3% to about 60% or even from about 5% to about 40% builder by weight of the cleaning composition. Builders include, but are not limited to, the alkali metal, ammonium and alkanolammonium salts of polyphosphates, alkali metal silicates, alkaline earth and alkali metal carbonates, aluminosilicates, polycarboxylate compounds, ether hydroxypolycarboxylates, copolymers of maleic anhydride with ethylene or vinyl methyl ether, 1, 3, 5-trihydroxy benzene-2, 4, 6-trisulphonic acid, and carboxymethyloxysuccinic acid, the various alkali metal, ammonium and substituted ammonium salts of polyacetic acids such as ethylenediamine tetraacetic acid and nitrilotriacetic acid, as well as polycarboxylates such as mellitic acid, succinic acid, citric acid, oxydisuccinic acid, polymaleic acid, benzene 1,3,5-tricarboxylic acid, carboxymethyloxysuccinic acid, and soluble salts thereof. Indeed, it is contemplated that any suitable builder will find use in various embodiments of the present disclosure. Examples of a detergent builder or complexing agent include zeolite, diphosphate, triphosphate, phosphonate, citrate, nitrilotriacetic acid (NTA), ethylenediaminetetraacetic acid (EDTA), diethylenetriaminepentaacetic acid (DTMPA), alkyl- or alkenylsuccinic acid, soluble silicates or layered silicates (e.g., SKS-6 from Hoechst). A detergent may also be unbuilt, i.e., essentially free of detergent builder.

In some embodiments, the builders form water-soluble hardness ion complexes (e.g., sequestering builders), such as citrates and polyphosphates (e.g., sodium tripolyphosphate and sodium tripolyphospate hexahydrate, potassium tripolyphosphate, and mixed sodium and potassium tripolyphosphate, etc.). It is contemplated that any suitable builder will find use in the present disclosure, including those known in the art (See e.g., EP 2 100 949).

In some embodiments, builders for use herein include phosphate builders and non-phosphate builders. In some embodiments, the builder is a phosphate builder. In some embodiments, the builder is a non-phosphate builder. If present, builders are used in a level of from 0.1% to 80%, or from 5 to 60%, or from 10 to 50% by weight of the composition. In some embodiments the product comprises a mixture of phosphate and non-phosphate builders. Suitable phosphate builders include mono-phosphates, di-phosphates, tri-polyphosphates or oligomeric-poylphosphates, including the alkali metal salts of these compounds, including the sodium salts. In some embodiments, a builder can be sodium tripolyphosphate (STPP). Additionally, the composition can comprise carbonate and/or citrate, preferably citrate that helps to achieve a neutral pH composition of the disclosure. Other suitable non-phosphate builders include homopolymers and copolymers of polycarboxylic acids and their partially or completely neutralized salts, monomeric polycarboxylic acids and hydroxycarboxylic acids and their salts. In some embodiments, salts of the above mentioned compounds include the ammonium and/or alkali metal salts, i.e. the lithium, sodium, and potassium salts, including sodium salts. Suitable polycarboxylic acids include acyclic, alicyclic, hetero-cyclic and aromatic carboxylic acids, wherein in some embodiments, they can contain at least two carboxyl groups which are in each case separated from one another by, in some instances, no more than two carbon atoms.

A detergent composition herein can comprise at least one chelating agent. Suitable chelating agents include, but are not limited to copper, iron and/or manganese chelating agents and mixtures thereof. In embodiments in which at least one chelating agent is used, the cleaning compositions of the present disclosure comprise from about 0.1% to about 15% or even from about 3.0% to about 10% chelating agent by weight of the subject cleaning composition.

A detergent composition herein can comprise at least one deposition aid. Suitable deposition aids include, but are not limited to, polyethylene glycol, polypropylene glycol, polycarboxylate, soil release polymers such as polytelephthalic acid, clays such as kaolinite, montmorillonite, atapulgite, illite, bentonite, halloysite, and mixtures thereof.

A detergent composition herein can comprise one or more dye transfer inhibiting agents. Suitable polymeric dye transfer inhibiting agents include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof. Additional dye transfer inhibiting agents include manganese phthalocyanine, peroxidases, polyvinylpyrrolidone polymers, polyamine N-oxide polymers, copolymers of N-vinylpyrrolidone and N-vinylimidazole, polyvinyloxazolidones and polyvinylimidazoles and/or mixtures thereof; chelating agents examples of which include ethylene-diamine-tetraacetic acid (EDTA); diethylene triamine penta methylene phosphonic acid (DTPMP); hydroxy-ethane diphosphonic acid (HEDP); ethylenediamine N,N'-disuccinic acid (EDDS); methyl glycine diacetic acid (MGDA); diethylene triamine penta acetic acid (DTPA); propylene diamine tetracetic acid (PDT A); 2-hydroxypyridine-N-oxide (HPNO); or methyl glycine diacetic acid (MGDA); glutamic acid N,N-diacetic acid (N,N-dicarboxymethyl glutamic acid tetrasodium salt (GLDA); nitrilotriacetic acid (NTA); 4,5-dihydroxy-m-benzenedisulfonic acid; citric acid and any salts thereof; N-hydroxyethylethylenediaminetriacetic acid (HEDTA), triethylenetetraaminehexaacetic acid (TTHA), N-hydroxyethyliminodiacetic acid (HEIDA), dihydroxyethylglycine (DHEG), ethylenediaminetetrapropionic acid (EDTP) and derivatives thereof, which can be used alone or in combination with any of the above. In embodiments in which at least one dye transfer inhibiting agent is used, the cleaning compositions of the present disclosure comprise from about 0.0001% to about 10%, from about 0.01% to about 5%, or even from about 0.1% to about 3% by weight of the cleaning composition.

A detergent composition herein can comprise silicates. In some such embodiments, sodium silicates (e.g., sodium disilicate, sodium metasilicate, and crystalline phyllosilicates) find use. In some embodiments, silicates are present at a level of from about 1% to about 20%. In some embodiments, silicates are present at a level of from about 5% to about 15% by weight of the composition.

A detergent composition herein can comprise dispersants. Suitable water-soluble organic materials include, but are not limited to the homo- or co-polymeric acids or their salts, in which the polycarboxylic acid comprises at least two carboxyl radicals separated from each other by not more than two carbon atoms.

Any cellulase disclosed above is contemplated for use in the disclosed detergent compositions. Suitable cellulases include, but are not limited to *Humicola insolens* cellulases (See e.g., U.S. Pat. No. 4,435,307). Exemplary cellulases contemplated for such use are those having color care benefit for a textile. Examples of cellulases that provide a color care benefit are disclosed in EP0495257, EP0531372, EP531315, WO96/11262, WO96/29397, WO94/07998; WO98/12307; WO95/24471, WO98/08940, and U.S. Pat. Nos. 5,457,046, 5,686,593 and 5,763,254, all of which are incorporated herein by reference. Examples of commercially available cellulases useful in a detergent include CELLUSOFT®, CELLUCLEAN®, CELLUZYME®, and CAREZYME® (Novo Nordisk A/S and Novozymes A/S); CLAZINASE®, PURADAX HA®, and REVITALENZ™ (DuPont Industrial Biosciences); BIOTOUCH® (AB Enzymes); and KAC-500(B)™ (Kao Corporation). Additional cellulases are disclosed in, e.g., U.S. Pat. Nos. 7,595,182, 8,569,033, 7,138,263, 3,844,890, 4,435,307, 4,435,307, and GB2095275.

A detergent composition herein may additionally comprise one or more other enzymes in addition to at least one cellulase. Examples of other enzymes include proteases, cellulases, hemicellulases, peroxidases, lipolytic enzymes (e.g., metallolipolytic enzymes), xylanases, lipases, phospholipases, esterases (e.g., arylesterase, polyesterase), perhydrolases, cutinases, pectinases, pectate lyases, mannanases, keratinases, reductases, oxidases (e.g., choline oxidase, phenoloxidase), phenoloxidases, lipoxygenases, ligninases, pullulanases, tannases, pentosanases, malanases, beta-glucanases, arabinosidases, hyaluronidases, chondroitinases, laccases, metalloproteinases, amadoriases, glucoamylases, alpha-amylases, beta-amylases, galactosidases, galactanases, catalases, carageenases, hyaluronidases, keratinases, lactases, ligninases, peroxidases, phosphatases, polygalacturonases, pullulanases, rhamnogalactouronases, tannases, transglutaminases, xyloglucanases, xylosidases, metalloproteases, arabinofuranosidases, phytases, isomerases, transferases and/or amylasesin any combination.

In some embodiments, the detergent compositions can comprise one or more enzymes, each at a level from about 0.00001% to about 10% by weight of the composition and the balance of cleaning adjunct materials by weight of composition. In some other embodiments, the detergent compositions also comprise each enzyme at a level of about 0.0001% to about 10%, about 0.001% to about 5%, about 0.001% to about 2%, about 0.005% to about 0.5% enzyme by weight of the composition.

Suitable proteases include those of animal, vegetable or microbial origin. In some embodiments, microbial proteases are used. In some embodiments, chemically or genetically modified mutants are included. In some embodiments, the protease is a serine protease, preferably an alkaline microbial protease or a trypsin-like protease. Examples of alkaline proteases include subtilisins, especially those derived from *Bacillus* (e.g., subtilisin, *lentus, amyloliquefaciens*, subtilisin Carlsberg, subtilisin 309, subtilisin 147 and subtilisin 168). Additional examples include those mutant proteases described in U.S. Pat. Nos. RE 34,606, 5,955,340, 5,700,676, 6,312,936, and 6,482,628, all of which are incorporated herein by reference. Additional protease examples include, but are not limited to trypsin (e.g., of porcine or bovine origin), and the *Fusarium* protease described in WO 89/06270. In some embodiments, commercially available protease enzymes that find use in the present disclosure include, but are not limited to MAXATASE®, MAXACAL™, MAXAPEM™ OPTICLEAN®, OPTIMASE®, PROPERASE®, PURAFECT®, PURAFECT® OXP, PURAMAX™, EXCELLASE™, PREFERENZ™ proteases (e.g. P100, P110, P280), EFFECTENZ™ proteases (e.g. P1000, P1050, P2000), EXCELLENZ™ proteases (e.g. P1000), ULTIMASE®, and PURAFAST™ (Genencor); ALCALASE®, SAVINASE®, PRIMASE®, DURAZYM™, POLARZYME®, OVOZYME®, KANNASE®, LIQUANASE®, NEUTRASE®, RELASE® and ESPERASE® (Novozymes); BLAP™ and BLAP™ variants (Henkel Kommanditgesellschaft auf Aktien, Duesseldorf, Germany), and KAP (*B. alkalophilus* subtilisin; Kao Corp., Tokyo, Japan). Various proteases are described in WO95/23221, WO 92/21760, WO 09/149200, WO 09/149144, WO 09/149145, WO 11/072099, WO 10/056640, WO 10/056653, WO 11/140364, WO 12/151534, U.S. Pat. Publ. No. 2008/0090747, and U.S. Pat. Nos. 5,801,039, 5,340,735, 5,500,364, 5,855,625, US RE 34,606, 5,955,340, 5,700,676, 6,312,936, 6,482,628, 8,530,219, and various other patents. In some further embodiments, neutral metalloproteases find use in the present disclosure, including but not limited to the neutral metalloproteases described in WO1999014341, WO1999033960, WO1999014342, WO1999034003, WO2007044993, WO2009058303, WO2009058661. Exemplary metalloproteases include nprE, the recombinant form of neutral metalloprotease expressed in *Bacillus subtilis* (See e.g., WO 07/044993), and PMN, the purified neutral metalloprotease from *Bacillus amyloliquefaciens.*

Suitable mannanases include, but are not limited to those of bacterial or fungal origin. Chemically or genetically modified mutants are included in some embodiments. Various mannanases are known which find use in the present disclosure (See e.g., U.S. Pat. Nos. 6,566,114, 6,602,842, and 6,440,991, all of which are incorporated herein by reference). Commercially available mannanases that find use in the present disclosure include, but are not limited to MANNASTAR®, PURABRITE™, and MANNAWAY®.

Suitable lipases include those of bacterial or fungal origin. Chemically modified, proteolytically modified, or protein engineered mutants are included. Examples of useful lipases include those from the genera *Humicola* (e.g., *H. lanuginosa*, EP258068 and EP305216; *H. insolens*, WO96/13580), *Pseudomonas* (e.g., *P. alcaligenes* or *P. pseudoalcaligenes*, EP218272; *P. cepacia*, EP331376; *P. stutzeri*, GB1372034; *P. fluorescens* and *Pseudomonas* sp. strain SD 705, WO95/06720 and WO96/27002; *P. wisconsinensis*, WO96/12012); and *Bacillus* (e.g., *B. subtilis*, Dartois et al., *Biochemica et Biophysica Acta* 1131:253-360; *B. stearothermophilus*, JP64/744992; *B. pumilus*, WO91/16422). Furthermore, a number of cloned lipases find use in some embodiments, including but not limited to *Penicillium camembertii* lipase (See, Yamaguchi et al., *Gene* 103:61-67 [1991]), *Geotricum candidum* lipase (See, Schimada et al., *J. Biochem.,* 106:383-388 [1989]), and various *Rhizopus* lipases such as *R. delemar* lipase (See, Hass et al., Gene 109:117-113 [1991]), a *R. niveus* lipase (Kugimiya et al., Biosci. Biotech. Biochem. 56:716-719 [1992]) and *R. oryzae* lipase. Additional lipases useful herein include, for example, those disclosed in WO92/05249, WO94/01541, WO95/35381, WO96/00292, WO95/30744, WO94/25578, WO95/14783, WO95/22615, WO97/04079, WO97/07202, EP407225 and EP260105. Other types of lipase polypeptide enzymes such as cutinases also find use in some embodiments, including but not limited to the cutinase derived from *Pseudomonas mendocina* (See, WO 88/09367), and the cutinase derived from *Fusarium solani pisi* (See, WO 90/09446). Examples of certain commercially available lipase enzymes useful herein include M1 LIPASE™, LUMA FAST™, and LIPOMAX™ (Genencor); LIPEX®, LIPOLASE® and LIPOLASE® ULTRA (Novozymes); and LIPASE P™ "Amano" (Amano Pharmaceutical Co. Ltd., Japan).

Suitable polyesterases include, for example, those disclosed in WO01/34899, WO01/14629 and U.S. Pat. No. 6,933,140.

A detergent composition herein can also comprise 2,6-beta-D-fructan hydrolase, which is effective for removal/cleaning of certain biofilms present on household and/or industrial textiles/laundry.

Suitable amylases include, but are not limited to those of bacterial or fungal origin. Chemically or genetically modified mutants are included in some embodiments. Amylases that find use in the present disclosure, include, but are not limited to α-amylases obtained from *B. licheniformis* (See e.g., GB 1,296,839). Additional suitable amylases include those found in WO9510603, WO9526397, WO9623874, WO9623873, WO9741213, WO9919467, WO0060060, WO0029560, WO9923211, WO9946399, WO0060058, WO0060059, WO9942567, WO0114532, WO02092797, WO0166712, WO0188107, WO0196537, WO0210355, WO9402597, WO0231124, WO9943793, WO9943794, WO2004113551, WO2005001064, WO2005003311, WO0164852, WO2006063594, WO2006066594, WO2006066596, WO2006012899, WO2008092919, WO2008000825, WO2005018336, WO2005066338, WO2009140504, WO2005019443, WO2010091221, WO2010088447, WO0134784, WO2006012902, WO2006031554, WO2006136161, WO2008101894, WO2010059413, WO2011098531, WO2011080352, WO2011080353, WO2011080354, WO2011082425, WO2011082429, WO2011076123, WO2011087836, WO2011076897, WO94183314, WO9535382, WO9909183, WO9826078, WO9902702, WO9743424, WO9929876, WO9100353, WO9605295, WO9630481, WO9710342, WO2008088493, WO2009149419, WO2009061381, WO2009100102, WO2010104675, WO2010117511, and WO2010115021.

Suitable amylases include, for example, commercially available amylases such as STAINZYME®, STAINZYME PLUS®, NATALASE®, DURAMYL®, TERMAMYL®, TERMAMYL ULTRA®, FUNGAMYL® and BAN™ (Novo Nordisk A/S and Novozymes A/S); RAPIDASE®, POWERASE®, PURASTAR® and PREFERENZ™ (DuPont Industrial Biosciences).

Suitable peroxidases/oxidases contemplated for use in the compositions include those of plant, bacterial or fungal origin. Chemically modified or protein engineered mutants are included. Examples of peroxidases useful herein include those from the genus *Coprinus* (e.g., *C. cinereus*, WO93/24618, WO95/10602, and WO98/15257), as well as those referenced in WO 2005056782, WO2007106293, WO2008063400, WO2008106214, and WO2008106215. Commercially available peroxidases useful herein include, for example, GUARDZYME™ (Novo Nordisk A/S and Novozymes A/S).

In some embodiments, peroxidases are used in combination with hydrogen peroxide or a source thereof (e.g., a percarbonate, perborate or persulfate) in the compositions of the present disclosure. In some alternative embodiments, oxidases are used in combination with oxygen. Both types of enzymes are used for "solution bleaching" (i.e., to prevent transfer of a textile dye from a dyed fabric to another fabric when the fabrics are washed together in a wash liquor), preferably together with an enhancing agent (See e.g., WO 94/12621 and WO 95/01426). Suitable peroxidases/oxidases include, but are not limited to those of plant, bacterial or fungal origin. Chemically or genetically modified mutants are included in some embodiments.

Enzymes that may be comprised in a detergent composition herein may be stabilized using conventional stabilizing agents, e.g., a polyol such as propylene glycol or glycerol; a sugar or sugar alcohol; lactic acid; boric acid or a boric acid derivative (e.g., an aromatic borate ester).

A detergent composition herein may contain about 1 wt % to about 65 wt % of a detergent builder or complexing agent such as zeolite, diphosphate, triphosphate, phosphonate, citrate, nitrilotriacetic acid (NTA), ethylenediaminetetraacetic acid (EDTA), diethylenetriaminepentaacetic acid (DTMPA), alkyl- or alkenylsuccinic acid, soluble silicates or layered silicates (e.g., SKS-6 from Hoechst). A detergent may also be unbuilt, i.e., essentially free of detergent builder.

A detergent composition in certain embodiments may comprise one or more other types of polymers in addition to the present α-glucan oligomers/polymers and/or the present α-glucan ether compounds. Examples of other types of polymers useful herein include carboxymethyl cellulose (CMC), poly(vinylpyrrolidone) (PVP), polyethylene glycol (PEG), poly(vinyl alcohol) (PVA), polycarboxylates such as polyacrylates, maleic/acrylic acid copolymers and lauryl methacrylate/acrylic acid copolymers.

A detergent composition herein may contain a bleaching system. For example, a bleaching system can comprise an $H_2O_2$ source such as perborate or percarbonate, which may be combined with a peracid-forming bleach activator such as tetraacetylethylenediamine (TAED) or nonanoyloxybenzenesulfonate (NOBS). Alternatively, a bleaching system may comprise peroxyacids (e.g., amide, imide, or sulfone type peroxyacids). Alternatively still, a bleaching system can be an enzymatic bleaching system comprising perhydrolase, for example, such as the system described in WO2005/056783.

A detergent composition herein may also contain conventional detergent ingredients such as fabric conditioners, clays, foam boosters, suds suppressors, anti-corrosion agents, soil-suspending agents, anti-soil redeposition agents, dyes, bactericides, tarnish inhibiters, optical brighteners, or perfumes. The pH of a detergent composition herein (measured in aqueous solution at use concentration) is usually neutral or alkaline (e.g., pH of about 7.0 to about 11.0).

Particular forms of detergent compositions that can be adapted for purposes disclosed herein are disclosed in, for example, US20090209445A1, US20100081598A1, U.S. Pat. No. 7,001,878B2, EP1504994B1, WO2001085888A2, WO2003089562A1, WO2009098659A1, WO2009098660A1, WO2009112992A1, WO2009124160A1, WO2009152031A1, WO2010059483A1, WO2010088112A1, WO2010090915A1, WO2010135238A1, WO2011094687A1, WO2011094690A1, WO2011127102A1, WO2011163428A1, WO2008000567A1, WO2006045391A1, WO2006007911 A1, WO2012027404A1, EP1740690B1, WO2012059336A1, U.S. Pat. No. 6,730,646B1, WO2008087426A1, WO2010116139A1, and WO2012104613A1, all of which are incorporated herein by reference.

Laundry detergent compositions herein can optionally be heavy duty (all purpose) laundry detergent compositions. Exemplary heavy duty laundry detergent compositions comprise a detersive surfactant (10%-40% wt/wt), including an anionic detersive surfactant (selected from a group of linear or branched or random chain, substituted or unsubstituted alkyl sulphates, alkyl sulphonates, alkyl alkoxylated sulphate, alkyl phosphates, alkyl phosphonates, alkyl carboxylates, and/or mixtures thereof), and optionally non-ionic surfactant (selected from a group of linear or branched or random chain, substituted or unsubstituted alkyl alkoxylated alcohol, e.g., C8-C18 alkyl ethoxylated alcohols and/or C6-C12 alkyl phenol alkoxylates), where the weight ratio of anionic detersive surfactant (with a hydrophilic index (Hlc) of from 6.0 to 9) to non-ionic detersive surfactant is greater than 1:1. Suitable detersive surfactants also include cationic detersive surfactants (selected from a group of alkyl pyridinium compounds, alkyl quaternary ammonium compounds, alkyl quaternary phosphonium compounds, alkyl ternary sulphonium compounds, and/or mixtures thereof); zwitterionic and/or amphoteric detersive surfactants (selected from a group of alkanolamine sulpho-betaines); ampholytic surfactants; semi-polar non-ionic surfactants and mixtures thereof.

A detergent herein such as a heavy duty laundry detergent composition may optionally include, a surfactancy boosting polymer consisting of amphiphilic alkoxylated grease cleaning polymers (selected from a group of alkoxylated polymers having branched hydrophilic and hydrophobic properties, such as alkoxylated polyalkylenimines in the range of 0.05 wt %-10 wt %) and/or random graft polymers (typically comprising of hydrophilic backbone comprising monomers selected from the group consisting of: unsaturated C1-C6 carboxylic acids, ethers, alcohols, aldehydes, ketones, esters, sugar units, alkoxy units, maleic anhydride, saturated polyalcohols such as glycerol, and mixtures thereof; and hydrophobic side chain(s) selected from the group consisting of: C4-C25 alkyl group, polypropylene, polybutylene, vinyl ester of a saturated C1-C6 mono-carboxylic acid, C1-C6 alkyl ester of acrylic or methacrylic acid, and mixtures thereof.

A detergent herein such as a heavy duty laundry detergent composition may optionally include additional polymers such as soil release polymers (include anionically end-capped polyesters, for example SRP1, polymers comprising at least one monomer unit selected from saccharide, dicarboxylic acid, polyol and combinations thereof, in random or block configuration, ethylene terephthalate-based polymers and copolymers thereof in random or block configuration, for example REPEL-O-TEX SF, SF-2 AND SRP6, TEXCARE SRA100, SRA300, SRN100, SRN170, SRN240, SRN300 AND SRN325, MARLOQUEST SL), anti-redeposition polymers (0.1 wt % to 10 wt %), include carboxylate polymers, such as polymers comprising at least one monomer selected from acrylic acid, maleic acid (or maleic anhydride), fumaric acid, itaconic acid, aconitic acid, mesaconic acid, citraconic acid, methylenemalonic acid, and any mixture thereof, vinylpyrrolidone homopolymer, and/or polyethylene glycol, molecular weight in the range of from 500 to 100,000 Da); and polymeric carboxylate (such as maleate/acrylate random copolymer or polyacrylate homopolymer).

A detergent herein such as a heavy duty laundry detergent composition may optionally further include saturated or unsaturated fatty acids, preferably saturated or unsaturated C12-C24 fatty acids (0 wt % to 10 wt %); deposition aids in addition to the α-glucan ether compound disclosed herein (examples for which include polysaccharides, cellulosic polymers, poly diallyl dimethyl ammonium halides (DADMAC), and copolymers of DAD MAC with vinyl pyrrolidone, acrylamides, imidazoles, imidazolinium halides, and mixtures thereof, in random or block configuration, cationic guar gum, cationic starch, cationic polyacylamides, and mixtures thereof.

A detergent herein such as a heavy duty laundry detergent composition may optionally further include dye transfer inhibiting agents, examples of which include manganese phthalocyanine, peroxidases, polyvinylpyrrolidone polymers, polyamine N-oxide polymers, copolymers of N-vinylpyrrolidone and N-vinylimidazole, polyvinyloxazolidones and polyvinylimidazoles and/or mixtures thereof; chelating agents, examples of which include ethylene-diamine-tetraacetic acid (EDTA), diethylene triamine penta methylene phosphonic acid (DTPMP), hydroxy-ethane diphosphonic acid (HEDP), ethylenediamine N,N'-disuccinic acid (EDDS), methyl glycine diacetic acid (MGDA), diethylene triamine penta acetic acid (DTPA), propylene diamine tetracetic acid (PDTA), 2-hydroxypyridine-N-oxide (HPNO), or methyl glycine diacetic acid (MGDA), glutamic acid N,N-diacetic acid (N,N-dicarboxymethyl glutamic acid tetrasodium salt (GLDA), nitrilotriacetic acid (NTA), 4,5-dihydroxy-m-benzenedisulfonic acid, citric acid and any salts thereof, N-hydroxyethylethylenediaminetriacetic acid (HEDTA), triethylenetetraaminehexaacetic acid (TTHA), N-hydroxyethyliminodiacetic acid (HEIDA), dihydroxyethylglycine (DHEG), ethylenediaminetetrapropionic acid (EDTP), and derivatives thereof.

A detergent herein such as a heavy duty laundry detergent composition may optionally include silicone or fatty-acid based suds suppressors; hueing dyes, calcium and magnesium cations, visual signaling ingredients, anti-foam (0.001 wt % to about 4.0 wt %), and/or a structurant/thickener (0.01 wt % to 5 wt %) selected from the group consisting of diglycerides and triglycerides, ethylene glycol distearate, microcrystalline cellulose, microfiber cellulose, biopolymers, xanthan gum, gellan gum, and mixtures thereof). Such structurant/thickener would be in addition to the one or more of the present α-glucan oligomers/polymers and/or α-glucan ether compounds comprised in the detergent.

A detergent herein can be in the form of a heavy duty dry/solid laundry detergent composition, for example. Such a detergent may include: (i) a detersive surfactant, such as any anionic detersive surfactant disclosed herein, any non-ionic detersive surfactant disclosed herein, any cationic detersive surfactant disclosed herein, any zwitterionic and/or amphoteric detersive surfactant disclosed herein, any ampholytic surfactant, any semi-polar non-ionic surfactant, and mixtures thereof; (ii) a builder, such as any phosphate-free builder (e.g., zeolite builders in the range of 0 wt % to less than 10 wt %), any phosphate builder (e.g., sodium tri-polyphosphate in the range of 0 wt % to less than 10 wt %), citric acid, citrate salts and nitrilotriacetic acid, any silicate salt (e.g., sodium or potassium silicate or sodium meta-silicate in the range of 0 wt % to less than 10 wt %); any carbonate salt (e.g., sodium carbonate and/or sodium bicarbonate in the range of 0 wt % to less than 80 wt %), and mixtures thereof; (iii) a bleaching agent, such as any photobleach (e.g., sulfonated zinc phthalocyanines, sulfonated aluminum phthalocyanines, xanthenes dyes, and mixtures thereof), any hydrophobic or hydrophilic bleach activator (e.g., dodecanoyl oxybenzene sulfonate, decanoyl oxybenzene sulfonate, decanoyl oxybenzoic acid or salts thereof, 3,5,5-trimethy hexanoyl oxybenzene sulfonate, tetraacetyl ethylene diamine-TAED, nonanoyloxybenzene sulfonate-NOBS, nitrile quats, and mixtures thereof), any source of hydrogen peroxide (e.g., inorganic perhydrate salts, examples of which include mono or tetra hydrate sodium salt of perborate, percarbonate, persulfate, perphosphate, or persilicate), any preformed hydrophilic and/or hydrophobic peracids (e.g., percarboxylic acids and salts, percarbonic acids and salts, perimidic acids and salts, peroxymonosulfuric acids and salts, and mixtures thereof); and/or (iv) any other components such as a bleach catalyst (e.g., imine bleach boosters examples of which include iminium cations and polyions, iminium zwitterions, modified amines, modified amine oxides, N-sulphonyl imines, N-phosphonyl imines, N-acyl imines, thiadiazole dioxides, perfluoroimines, cyclic sugar ketones, and mixtures thereof), and a metal-containing bleach catalyst (e.g., copper, iron, titanium, ruthenium, tungsten, molybdenum, or manganese cations along with an auxiliary metal cations such as zinc or aluminum and a sequestrate such as EDTA, ethylenediaminetetra(methylenephosphonic acid).

Compositions disclosed herein can be in the form of a dishwashing detergent composition. Examples of dishwashing detergents include automatic dishwashing detergents (typically used in dishwasher machines) and hand-washing dish detergents. A dishwashing detergent composition can be in any dry or liquid/aqueous form as disclosed herein, for example. Components that may be included in certain embodiments of a dishwashing detergent composition include, for example, one or more of a phosphate; oxygen- or chlorine-based bleaching agent; non-ionic surfactant; alkaline salt (e.g., metasilicates, alkali metal hydroxides, sodium carbonate); any active enzyme disclosed herein; anti-corrosion agent (e.g., sodium silicate); anti-foaming agent; additives to slow down the removal of glaze and patterns from ceramics; perfume; anti-caking agent (in granular detergent); starch (in tablet-based detergents); gelling agent (in liquid/gel based detergents); and/or sand (powdered detergents).

Dishwashing detergents such as an automatic dishwasher detergent or liquid dishwashing detergent can comprise (i) a non-ionic surfactant, including any ethoxylated non-ionic surfactant, alcohol alkoxylated surfactant, epoxy-capped poly(oxyalkylated) alcohol, or amine oxide surfactant present in an amount from 0 to 10 wt %; (ii) a builder, in the range of about 5-60 wt %, including any phosphate builder (e.g., mono-phosphates, di-phosphates, tri-polyphosphates, other oligomeric-polyphosphates, sodium tripolyphosphate-STPP), any phosphate-free builder (e.g., amino acid-based compounds including methyl-glycine-diacetic acid [MGDA] and salts or derivatives thereof, glutamic-N,N-diacetic acid [GLDA] and salts or derivatives thereof, iminodisuccinic acid (IDS) and salts or derivatives thereof, carboxy methyl inulin and salts or derivatives thereof, nitrilotriacetic acid [NTA], diethylene triamine penta acetic acid [DTPA], B-alaninediacetic acid [B-ADA] and salts thereof), homopolymers and copolymers of poly-carboxylic acids and partially or completely neutralized salts thereof, monomeric polycarboxylic acids and hydroxycarboxylic acids and salts thereof in the range of 0.5 wt % to 50 wt %, or sulfonated/carboxylated polymers in the range of about 0.1 wt % to about 50 wt %; (iii) a drying aid in the range of about 0.1 wt % to about 10 wt % (e.g., polyesters, especially anionic polyesters, optionally together with further monomers with 3 to 6 functionalities—typically acid, alcohol or ester functionalities which are conducive to polycondensation, polycarbonate-, polyurethane- and/or polyurea-polyorganosiloxane compounds or precursor compounds thereof, particularly of the reactive cyclic carbonate and urea type); (iv) a silicate in the range from about 1 wt % to about 20 wt % (e.g., sodium or potassium silicates such as sodium disilicate, sodium meta-silicate and crystalline phyllosilicates); (v) an inorganic bleach (e.g., perhydrate salts such as perborate, percarbonate, perphosphate, persulfate and persilicate salts) and/or an organic bleach (e.g., organic peroxyacids such as diacyl- and tetraacylperoxides, especially diperoxydodecanedioic acid, diperoxytetradecanedioic acid, and diperoxyhexadecanedioic acid); (vi) a bleach activator (e.g., organic peracid precursors in the range from about 0.1 wt % to about 10 wt %) and/or bleach catalyst (e.g., manganese triazacyclononane and related complexes; Co, Cu, Mn, and Fe bispyridylamine and related complexes; and pentamine acetate cobalt (III) and related complexes); (vii) a metal care agent in the range from about 0.1 wt % to 5 wt % (e.g., benzatriazoles, metal salts and complexes, and/or silicates); and/or (viii) any active enzyme disclosed herein in the range from about 0.01 to 5.0 mg of active enzyme per gram of automatic dishwashing detergent composition, and an enzyme stabilizer component (e.g., oligosaccharides, polysaccharides, and inorganic divalent metal salts).

Various examples of detergent formulations comprising at least one α-glucan ether compound (e.g., a carboxyalkyl α-glucan ether such as carboxymethyl α-glucan) are disclosed below (1-19):

1) A detergent composition formulated as a granulate having a bulk density of at least 600 g/L comprising: linear alkylbenzenesulfonate (calculated as acid) at about 7-12 wt %; alcohol ethoxysulfate (e.g., C12-18 alcohol, 1-2 ethylene oxide [EO]) or alkyl sulfate (e.g., C16-18) at about 1-4 wt %; alcohol ethoxylate (e.g., C14-15 alcohol) at about 5-9 wt %; sodium carbonate at about 14-20 wt %; soluble silicate (e.g., $Na_2O$ $2SiO_2$) at about 2-6 wt %; zeolite (e.g., $NaAlSiO_4$) at about 15-22 wt %; sodium sulfate at about 0-6 wt %; sodium citrate/citric acid at about 0-15 wt %; sodium perborate at about 11-18 wt %; TAED at about 2-6 wt %; α-glucan ether up to about 2 wt %; other polymers (e.g., maleic/acrylic acid copolymer, PVP, PEG) at about 0-3 wt %; optionally an enzyme(s) (calculated as pure enzyme protein) at about 0.0001-0.1 wt %; and minor ingredients (e.g., suds suppressors, perfumes, optical brightener, photobleach) at about 0-5 wt %.

2) A detergent composition formulated as a granulate having a bulk density of at least 600 g/L comprising: linear alkylbenzenesulfonate (calculated as acid) at about 6-11 wt %; alcohol ethoxysulfate (e.g., C12-18 alcohol, 1-2 EO) or alkyl sulfate (e.g., C16-18) at about 1-3 wt %; alcohol ethoxylate (e.g., C14-15 alcohol) at about 5-9 wt %; sodium carbonate at about 15-21 wt %; soluble silicate (e.g., $Na_2O$ $2SiO_2$) at about 1-4 wt %; zeolite (e.g., $NaAlSiO_4$) at about 24-34 wt %; sodium sulfate at about 4-10 wt %; sodium citrate/citric acid at about 0-15 wt %; sodium perborate at about 11-18 wt %; TAED at about 2-6 wt %; α-glucan ether up to about 2 wt %; other polymers (e.g., maleic/acrylic acid copolymer, PVP, PEG) at about 1-6 wt %; optionally an enzyme(s) (calculated as pure enzyme protein) at about 0.0001-0.1 wt %; and minor ingredients (e.g., suds suppressors, perfumes, optical brightener, photobleach) at about 0-5 wt %.

3) A detergent composition formulated as a granulate having a bulk density of at least 600 g/L comprising: linear alkylbenzenesulfonate (calculated as acid) at about 5-9 wt %; alcohol ethoxysulfate (e.g., C12-18 alcohol, 7 EO) at about 7-14 wt %; soap as fatty acid (e.g., C16-22 fatty acid) at about 1-3 wt %; sodium carbonate at about 10-17 wt %; soluble silicate (e.g., $Na_2O$ $2SiO_2$) at about 3-9 wt %; zeolite (e.g., $NaAlSiO_4$) at about 23-33 wt %; sodium sulfate at about 0-4 wt %; sodium perborate at about 8-16 wt %; TAED at about 2-8 wt %; phosphonate (e.g., EDTMPA) at about 0-1 wt %; α-glucan ether up to about 2 wt %; other polymers (e.g., maleic/acrylic acid copolymer, PVP, PEG) at about 0-3 wt %; optionally an enzyme(s) (calculated as pure enzyme protein) at about 0.0001-0.1 wt %; and minor ingredients (e.g., suds suppressors, perfumes, optical brightener) at about 0-5 wt %.

4) A detergent composition formulated as a granulate having a bulk density of at least 600 g/L comprising: linear alkylbenzenesulfonate (calculated as acid) at about 8-12 wt %; alcohol ethoxylate (e.g., C12-18 alcohol, 7 EO) at about 10-25 wt %; sodium carbonate at about 14-22 wt %; soluble silicate (e.g., $Na_2O$ $2SiO_2$) at about 1-5 wt %; zeolite (e.g., $NaAlSiO_4$) at about 25-35 wt %; sodium sulfate at about 0-10 wt %; sodium perborate at about 8-16 wt %; TAED at about 2-8 wt %; phosphonate (e.g., EDTMPA) at about 0-1 wt %; α-glucan ether up to about 2 wt %; other polymers (e.g., maleic/acrylic acid copolymer, PVP, PEG) at about 1-3 wt %; optionally an enzyme(s) (calculated as pure enzyme protein) at about 0.0001-0.1 wt %; and minor ingredients (e.g., suds suppressors, perfumes) at about 0-5 wt %.

5) An aqueous liquid detergent composition comprising: linear alkylbenzenesulfonate (calculated as acid) at about 15-21 wt %; alcohol ethoxylate (e.g., C12-18 alcohol, 7 EO; or C12-15 alcohol, 5 EO) at about 12-18 wt %; soap as fatty acid (e.g., oleic acid) at about 3-13 wt %; alkenylsuccinic acid (C12-14) at about 0-13 wt %; aminoethanol at about 8-18 wt %; citric acid at about 2-8 wt %; phosphonate at about 0-3 wt %; α-glucan ether up to about 2 wt %; other polymers (e.g., PVP, PEG) at about 0-3 wt %; borate at about 0-2 wt %; ethanol at about 0-3 wt %; propylene glycol at about 8-14 wt %; optionally an enzyme(s) (calculated as pure enzyme protein) at about 0.0001-0.1 wt %; and minor ingredients (e.g., dispersants, suds suppressors, perfume, optical brightener) at about 0-5 wt %.

6) An aqueous structured liquid detergent composition comprising: linear alkylbenzenesulfonate (calculated as acid) at about 15-21 wt %; alcohol ethoxylate (e.g., C12-18 alcohol, 7 EO; or C12-15 alcohol, 5 EO) at about 3-9 wt %; soap as fatty acid (e.g., oleic acid) at about 3-10 wt %; zeolite (e.g., $NaAlSiO_4$) at about 14-22 wt %; potassium citrate about 9-18 wt %; borate at about 0-2 wt %; α-glucan ether up to about 2 wt %; other polymers (e.g., PVP, PEG) at about 0-3 wt %; ethanol at about 0-3 wt %; anchoring polymers (e.g., lauryl methacrylate/acrylic acid copolymer, molar ratio 25:1, MW 3800) at about 0-3 wt %; glycerol at about 0-5 wt %; optionally an enzyme(s) (calculated as pure enzyme protein) at about 0.0001-0.1 wt %; and minor ingredients (e.g., dispersants, suds suppressors, perfume, optical brightener) at about 0-5 wt %.

7) A detergent composition formulated as a granulate having a bulk density of at least 600 g/L comprising: fatty alcohol sulfate at about 5-10 wt %, ethoxylated fatty acid monoethanolamide at about 3-9 wt %; soap as fatty acid at about 0-3 wt %; sodium carbonate at about 5-10 wt %; soluble silicate (e.g., $Na_2O$ $2SiO_2$) at about 1-4 wt %; zeolite (e.g., $NaAlSiO_4$) at about 20-40 wt %; sodium sulfate at about 2-8 wt %; sodium perborate at about 12-18 wt %; TAED at about 2-7 wt %; α-glucan ether up to about 2 wt %; other polymers (e.g., maleic/acrylic acid copolymer, PEG) at about 1-5 wt %; optionally an enzyme(s) (calculated as pure enzyme protein) at about 0.0001-0.1 wt %; and minor ingredients (e.g., optical brightener, suds suppressors, perfumes) at about 0-5 wt %.

8) A detergent composition formulated as a granulate comprising: linear alkylbenzenesulfonate (calculated as acid) at about 8-14 wt %; ethoxylated fatty acid monoethanolamide at about 5-11 wt %; soap as fatty acid at about 0-3 wt %; sodium carbonate at about 4-10 wt %; soluble silicate (e.g., $Na_2O$ $2SiO_2$) at about 1-4 wt %; zeolite (e.g., $NaAlSiO_4$) at about 30-50 wt %; sodium sulfate at about 3-11 wt %; sodium citrate at about 5-12 wt %; α-glucan ether up to about 2 wt %; other polymers (e.g., PVP, maleic/acrylic acid copolymer, PEG) at about 1-5 wt %; optionally an enzyme(s) (calculated as pure enzyme protein) at about 0.0001-0.1 wt %; and minor ingredients (e.g., suds suppressors, perfumes) at about 0-5 wt %.

9) A detergent composition formulated as a granulate comprising: linear alkylbenzenesulfonate (calculated as acid) at about 6-12 wt %; nonionic surfactant at about 1-4 wt %; soap as fatty acid at about 2-6 wt %; sodium carbonate at about 14-22 wt %; zeolite (e.g., $NaAlSiO_4$) at about 18-32 wt %; sodium sulfate at about 5-20 wt %; sodium citrate at about 3-8 wt %; sodium perborate at about 4-9 wt %; bleach activator (e.g., NOBS or TAED) at about 1-5 wt %; α-glucan ether up to about 2 wt %; other polymers (e.g., polycarboxylate or PEG) at about 1-5 wt %; optionally an enzyme(s) (calculated as pure enzyme protein) at about 0.0001-0.1 wt %; and minor ingredients (e.g., optical brightener, perfume) at about 0-5 wt %.

10) An aqueous liquid detergent composition comprising: linear alkylbenzenesulfonate (calculated as acid) at about 15-23 wt %; alcohol ethoxysulfate (e.g., C12-15 alcohol, 2-3 EO) at about 8-15 wt %; alcohol ethoxylate (e.g., C12-15 alcohol, 7 EO; or C12-15 alcohol, 5 EO) at about 3-9 wt %; soap as fatty acid (e.g., lauric acid) at about 0-3 wt %; aminoethanol at about 1-5 wt %; sodium citrate at about 5-10 wt %; hydrotrope (e.g., sodium toluenesulfonate) at about 2-6 wt %; borate at about 0-2 wt %; α-glucan ether up to about 1 wt %; ethanol at about 1-3 wt %; propylene glycol at about 2-5 wt %; optionally an enzyme(s) (calculated as pure enzyme protein) at about 0.0001-0.1 wt %; and minor ingredients (e.g., dispersants, perfume, optical brighteners) at about 0-5 wt %.

11) An aqueous liquid detergent composition comprising: linear alkylbenzenesulfonate (calculated as acid) at about 20-32 wt %; alcohol ethoxylate (e.g., C12-15 alcohol, 7 EO; or C12-15 alcohol, 5 EO) at about 6-12 wt %; aminoethanol at about 2-6 wt %; citric acid at about 8-14 wt %; borate at about 1-3 wt %; α-glucan ether up to about 2 wt %; ethanol at about 1-3 wt %; propylene glycol at about 2-5 wt %; other polymers (e.g., maleic/acrylic acid copolymer, anchoring polymer such as lauryl methacrylate/acrylic acid copolymer) at about 0-3 wt %; glycerol at about 3-8 wt %; optionally an enzyme(s) (calculated as pure enzyme protein) at about 0.0001-0.1 wt %; and minor ingredients (e.g., hydrotropes, dispersants, perfume, optical brighteners) at about 0-5 wt %.

12) A detergent composition formulated as a granulate having a bulk density of at least 600 g/L comprising: anionic surfactant (e.g., linear alkylbenzenesulfonate, alkyl sulfate, alpha-olefinsulfonate, alpha-sulfo fatty acid methyl esters, alkanesulfonates, soap) at about 25-40 wt %; nonionic surfactant (e.g., alcohol ethoxylate) at about 1-10 wt %; sodium carbonate at about 8-25 wt %; soluble silicate (e.g., $Na_2O$ $2SiO_2$) at about 5-15 wt %; sodium sulfate at about 0-5 wt %; zeolite ($NaAlSiO_4$) at about 15-28 wt %; sodium perborate at about 0-20 wt %; bleach activator (e.g., TAED or NOBS) at about 0-5 wt %; α-glucan ether up to about 2 wt %; optionally an enzyme(s) (calculated as pure enzyme protein) at about 0.0001-0.1 wt %; and minor ingredients (e.g., perfume, optical brighteners) at about 0-3 wt %.

13) Detergent compositions as described in (1)-(12) above, but in which all or part of the linear alkylbenzenesulfonate is replaced by C12-C18 alkyl sulfate.

14) A detergent composition formulated as a granulate having a bulk density of at least 600 g/L comprising: C12-C18 alkyl sulfate at about 9-15 wt %; alcohol ethoxylate at about 3-6 wt %; polyhydroxy alkyl fatty acid amide at about 1-5 wt %; zeolite (e.g., $NaAlSiO_4$) at about 10-20 wt %; layered disilicate (e.g., SK56 from Hoechst) at about 10-20 wt %; sodium carbonate at about 3-12 wt %; soluble silicate (e.g., $Na_2O$ $2SiO_2$) at 0-6 wt %; sodium citrate at about 4-8 wt %; sodium percarbonate at about 13-22 wt %; TAED at about 3-8 wt %; α-glucan ether up to about 2 wt %; other polymers (e.g., polycarboxylates and PVP) at about 0-5 wt %; optionally an enzyme(s) (calculated as pure enzyme protein) at about 0.0001-0.1 wt %; and minor ingredients (e.g., optical brightener, photobleach, perfume, suds suppressors) at about 0-5 wt %.

15) A detergent composition formulated as a granulate having a bulk density of at least 600 g/L comprising: C12-C18 alkyl sulfate at about 4-8 wt %; alcohol ethoxylate at about 11-15 wt %; soap at about 1-4 wt %; zeolite MAP or zeolite A at about 35-45 wt %; sodium carbonate at about 2-8 wt %; soluble silicate (e.g., $Na_2O$ $2SiO_2$) at 0-4 wt %; sodium percarbonate at about 13-22 wt %; TAED at about 1-8 wt %; α-glucan ether up to about 3 wt %; other polymers (e.g., polycarboxylates and PVP) at about 0-3 wt %; optionally an enzyme(s) (calculated as pure enzyme protein) at about 0.0001-0.1 wt %; and minor ingredients (e.g., optical brightener, phosphonate, perfume) at about 0-3 wt %.

16) Detergent formulations as described in (1)-(15) above, but that contain a stabilized or encapsulated peracid, either as an additional component or as a substitute for an already specified bleach system(s).

17) Detergent compositions as described in (1), (3), (7), (9) and (12) above, but in which perborate is replaced by percarbonate.

18) Detergent compositions as described in (1), (3), (7), (9), (12), (14) and (15) above, but that additionally contain a manganese catalyst. A manganese catalyst, for example, is one of the compounds described by Hage et al. (1994, *Nature* 369:637-639), which is incorporated herein by reference.

19) Detergent compositions formulated as a non-aqueous detergent liquid comprising a liquid non-ionic surfactant (e.g., a linear alkoxylated primary alcohol), a builder system (e.g., phosphate), α-glucan ether, optionally an enzyme(s), and alkali. The detergent may also comprise an anionic surfactant and/or bleach system.

In another embodiment, the present α-glucan oligomers/polymers (non-derivatized) may be partially or completely substituted for the α-glucan ether component in any of the above exemplary formulations.

It is believed that numerous commercially available detergent formulations can be adapted to include a poly alpha-1,3-1,6-glucan ether compound. Examples include PUREX® ULTRAPACKS (Henkel), FINISH® QUANTUM (Reckitt Benckiser), CLOROX™ 2 PACKS (Clorox), OXICLEAN MAX FORCE POWER PAKS (Church & Dwight), TIDE® STAIN RELEASE, CASCADE® ACTIONPACS, and TIDE® PODS™ (Procter & Gamble).

In a further embodiment to any of the above embodiments, a personal care composition, a fabric care composition or a laundry care composition is provided comprising the glucan ether composition described in any of the preceeding embodiments.

The present α-glucan oligomer/polymer composition and/or the present α-glucan ether composition may be applied as a surface substantive treatment to a fabric, yarn or fiber. In yet a further embodiment, a fabric, yarn or fiber is provided comprising the present α-glucan oligomer/polymer composition, the present α-glucan ether composition, or a combination thereof.

The α-glucan ether compound disclosed herein may be used to alter viscosity of an aqueous composition. The α-glucan ether compound herein can have a relatively low DoS and still be an effective viscosity modifier. It is believed that the viscosity modification effect of the disclosed α-glucan ether compounds may be coupled with a rheology modification effect. It is further believed that, by contacting a hydrocolloid or aqueous solution herein with a surface (e.g., fabric surface), one or more α-glucan ether compounds and/or the present α-glucan oligomer/polymer composition, the compounds will adsorb to the surface.

In another embodiment, a method for preparing an aqueous composition, the method is provided comprising: contacting an aqueous composition with the present α-glucan ether compound wherein the aqueous composition comprises a cellulase, a protease or a combination thereof.

In another embodiment, a method to produce a glucan ether composition is provided comprising:

a) Providing an α-glucan oligomer/polymer composition comprising:
   i. at least 75% α-(1,3) glycosidic linkages;
   ii. less than 25% α-(1,6) glycosidic linkages;
   iii. less than 10% α-(1,3,6) glycosidic linkages;
   iv. a weight average molecular weight of less than 5000 Daltons;
   v. a viscosity of less than 0.25 Pascal second (Pa·s) at 12 wt % in water 20° C.;
   vi. a solubility of at least 20% (w/w) in water at 25° C.; and
   vii. a polydispersity index of less than 5;
b) contacting the α-glucan oligomer/polymer composition of (a) in a reaction under alkaline conditions with at least one etherification agent comprising an organic group; whereby an α-glucan ether is produced has a degree of substitution (DoS) with at least one organic group of about 0.05 to about 3.0; and
c) optionally isolating the α-glucan ether produced in step (b).

In another embodiment, a method of treating an article of clothing, textile or fabric is provided comprising:

a) providing a composition selected from
   1) a fabric care composition as described above;
   2) a laundry care composition as described above;
   3) an α-glucan ether composition as described above;
   4) an α-glucan oligomer/polymer composition comprising:
      i. at least 75% α-(1, 3) glycosidic linkages;
      ii. less than 25% α-(1,6) glycosidic linkages;
      iii. less than 10% α-(1,3,6) glycosidic linkages;
      iv. a weight average molecular weight of less than 5000 Daltons;
      v. a viscosity of less than 0.25 Pascal second (Pa·s) at 12 wt % in water 20° C.;
      vi. a solubility of at least 20% (w/w) in water at 25° C.; and
      vii. a polydispersity index of less than 5; and
   5) any combination of (i) through (iv).
b) contacting under suitable conditions the composition of (a) with a fabric, textile or article of clothing whereby the fabric, textile or article of clothing is treated and receives a benefit;
c) optionally rinsing the treated fabric or article of clothing of (b).

In a preferred embodiment of the above method, the composition of (a) is cellulase resistant, protease resistant or a combination thereof.

In another embodiment to the above method, the α-glucan oligomer/polymer composition and/or the α-glucan ether composition is a surface substantive.

In another embodiment to any of the above methods, the benefit is selected from the group consisting of improved fabric hand, improved resistance to soil deposition, improved colorfastness, improved wear resistance, improved wrinkle resistance, improved antifungal activity, improved stain resistance, improved cleaning performance when laundered, improved drying rates, improved dye, pigment or lake update, and any combination thereof.

A fabric herein can comprise natural fibers, synthetic fibers, semi-synthetic fibers, or any combination thereof. A semi-synthetic fiber herein is produced using naturally occurring material that has been chemically derivatized, an example of which is rayon. Non-limiting examples of fabric types herein include fabrics made of (i) cellulosic fibers such as cotton (e.g., broadcloth, canvas, chambray, chenille, chintz, corduroy, cretonne, damask, denim, flannel, gingham, jacquard, knit, matelassé, oxford, percale, poplin, plissé, sateen, seersucker, sheers, terry cloth, twill, velvet), rayon (e.g., viscose, modal, lyocell), linen, and TENCEL®; (ii) proteinaceous fibers such as silk, wool and related mammalian fibers; (iii) synthetic fibers such as polyester, acrylic, nylon, and the like; (iv) long vegetable fibers from jute, flax, ramie, coir, kapok, sisal, henequen, abaca, hemp and sunn; and (v) any combination of a fabric of (i)-(iv). Fabric comprising a combination of fiber types (e.g., natural and synthetic) include those with both a cotton fiber and polyester, for example. Materials/articles containing one or more fabrics herein include, for example, clothing, curtains, drapes, upholstery, carpeting, bed linens, bath linens, tablecloths, sleeping bags, tents, car interiors, etc. Other materials comprising natural and/or synthetic fibers include, for example, non-woven fabrics, paddings, paper, and foams.

An aqueous composition that is contacted with a fabric can be, for example, a fabric care composition (e.g., laundry detergent, fabric softener or other fabric treatment composition). Thus, a treatment method in certain embodiments can be considered a fabric care method or laundry method if employing a fabric care composition therein. A fabric care composition herein can effect one or more of the following fabric care benefits: improved fabric hand, improved resistance to soil deposition, improved soil release, improved colorfastness, improved fabric wear resistance, improved wrinkle resistance, improved wrinkle removal, improved shape retention, reduction in fabric shrinkage, pilling reduction, improved antifungal activity, improved stain resistance, improved cleaning performance when laundered, improved drying rates, improved dye, pigment or lake update, and any combination thereof.

Examples of conditions (e.g., time, temperature, wash/rinse volumes) for conducting a fabric care method or laundry method herein are disclosed in WO1997/003161 and U.S. Pat. Nos. 4,794,661, 4,580,421 and 5,945,394, which are incorporated herein by reference. In other examples, a material comprising fabric can be contacted with an aqueous composition herein: (i) for at least about 5, 10, 20, 30, 40, 50, 60, 70, 80, 90, 100, 110, or 120 minutes; (ii) at a temperature of at least about 10, 15, 20, 25, 30, 35, 40, 45, 50, 55, 60, 65, 70, 75, 80, 85, 90, or 95° C. (e.g., for laundry wash or rinse: a "cold" temperature of about 15-30° C., a "warm" temperature of about 30-50° C., a "hot" temperature of about 50-95° C.); (iii) at a pH of about 2, 3, 4, 5, 6, 7, 8, 9, 10, 11, or 12 (e.g., pH range of about 2-12, or about 3-11); (iv) at a salt (e.g., NaCl) concentration of at least about 0.5, 1.0, 1.5, 2.0, 2.5, 3.0, 3.5, or 4.0 wt %; or any combination of (i)-(iv). The contacting step in a fabric care method or laundry method can comprise any of washing, soaking, and/or rinsing steps, for example.

In certain embodiments of treating a material comprising fabric, the present α-glucan oligomers/polymers and/or the present α-glucan ether compound component(s) of the aqueous composition adsorbs to the fabric. This feature is believed to render the compounds useful as anti-redeposition agents and/or anti-greying agents in fabric care compositions disclosed herein (in addition to their viscosity-modifying effect). An anti-redeposition agent or anti-greying agent herein helps keep soil from redepositing onto clothing in wash water after the soil has been removed. It is further contemplated that adsorption of one or more of the present compounds herein to a fabric enhances mechanical properties of the fabric.

Adsorption of the present α-glucan oligomers/polymer and/or the present α-glucan ethers to a fabric herein can be measured following the methodology disclosed in the below Examples, for example. Alternatively, adsorption can be measured using a colorimetric technique (e.g., Dubois et al., 1956, *Anal. Chem.* 28:350-356; Zemljič et al., 2006, *Lenzinger Berichte* 85:68-76; both incorporated herein by reference) or any other method known in the art.

Other materials that can be contacted in the above treatment method include surfaces that can be treated with a dish detergent (e.g., automatic dishwashing detergent or hand dish detergent). Examples of such materials include surfaces of dishes, glasses, pots, pans, baking dishes, utensils and flatware made from ceramic material, china, metal, glass, plastic (e.g., polyethylene, polypropylene, polystyrene, etc.) and wood (collectively referred to herein as "tableware"). Thus, the treatment method in certain embodiments can be considered a dishwashing method or tableware washing method, for example. Examples of conditions (e.g., time, temperature, wash volume) for conducting a dishwashing or tableware washing method herein are disclosed in U.S. Pat. No. 8,575,083, which is incorporated herein by reference. In other examples, a tableware article can be contacted with an aqueous composition herein under a suitable set of conditions such as any of those disclosed above with regard to contacting a fabric-comprising material.

Certain embodiments of a method of treating a material herein further comprise a drying step, in which a material is dried after being contacted with the aqueous composition. A drying step can be performed directly after the contacting step, or following one or more additional steps that might follow the contacting step (e.g., drying of a fabric after being rinsed, in water for example, following a wash in an aqueous composition herein). Drying can be performed by any of several means known in the art, such as air drying (e.g., ~20-25° C.), or at a temperature of at least about 30, 40, 50, 60, 70, 80, 90, 100, 120, 140, 160, 170, 175, 180, or 200° C., for example. A material that has been dried herein typically has less than 3, 2, 1, 0.5, or 0.1 wt % water comprised therein. Fabric is a preferred material for conducting an optional drying step.

An aqueous composition used in a treatment method herein can be any aqueous composition disclosed herein, such as in the above embodiments or in the below Examples. Examples of aqueous compositions include detergents (e.g., laundry detergent or dish detergent) and water-containing dentifrices such as toothpaste.

In another embodiment, a method to alter the viscosity of an aqueous composition is provided comprising contacting one or more of the present α-glucan ether compounds with the aqueous composition, wherein the presence of the one or more α-glucan ether compounds alters (increases or decreases) the viscosity of the aqueous composition.

In a preferred aspect, the alteration in viscosity can be an increase and/or decrease of at least about 1%, 10%, 100%, 1000%, 100000%, or 1000000% (or any integer between 1% and 1000000%), for example, compared to the viscosity of the aqueous composition before the contacting step.

Etherification of the Present α-Glucan Oligomers/Polymers

The following steps can be taken to prepare the above etherification reaction.

The present α-glucan oligomers/polymers are contacted under alkaline conditions with at least one etherification agent comprising an organic group. This step can be performed, for example, by first preparing alkaline conditions by contacting the present α-glucan oligomers/polymers with a solvent and one or more alkali hydroxides to provide a mixture (e.g., slurry) or solution. The alkaline conditions of the etherification reaction can thus comprise an alkali hydroxide solution. The pH of the alkaline conditions can be at least about 11.0, 11.2, 11.4, 11.6, 11.8, 12.0, 12.2, 12.4, 12.6, 12.8, or 13.0.

Various alkali hydroxides can be used, such as sodium hydroxide, potassium hydroxide, calcium hydroxide, lithium hydroxide, and/or tetraethylammonium hydroxide. The concentration of alkali hydroxide in a preparation with the present α-glucan oligomers/polymers and a solvent can be from about 1-70 wt %, 5-50 wt %, 5-10 wt %, 10-50 wt %, 10-40 wt %, or 10-30 wt % (or any integer between 1 and 70 wt %). Alternatively, the concentration of alkali hydroxide such as sodium hydroxide can be at least about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt %. An alkali hydroxide used to prepare alkaline conditions may be in a completely aqueous solution or an aqueous solution comprising one or more water-soluble organic solvents such as ethanol or isopropanol. Alternatively, an alkali hydroxide can be added as a solid to provide alkaline conditions.

Various organic solvents that can optionally be included or used as the main solvent when preparing the etherification reaction include alcohols, acetone, dioxane, isopropanol and toluene, for example. Toluene or isopropanol can be used in certain embodiments. An organic solvent can be added before or after addition of alkali hydroxide. The concentration of an organic solvent (e.g., isopropanol or toluene) in a preparation comprising the present α-glucan oligomers/polymers and an alkali hydroxide can be at least about 10, 15, 20, 25, 30, 35, 40, 45, 50, 55, 60, 65, 70, 75, 80, 85, or 90 wt % (or any integer between 10 and 90 wt %).

Alternatively, solvents that can dissolve the present α-glucan oligomers/polymers can be used when preparing the etherification reaction. These solvents include, but are not limited to, lithium chloride(LiCl)/N,N-dimethyl-acetamide (DMAc), $SO_2$/diethylamine (DEA)/dimethyl sulfoxide (DMSO), LiCl/1,3-dimethy-2-imidazolidinone (DMI), N,N-dimethylformamide (DMF)/N204, DMSO/tetrabutyl-ammonium fluoride trihydrate (TBAF), N-methylmorpholine-N-oxide (NMMO), $Ni(tren)(OH)_2$ [tren¼ tris(2-aminoethyl) amine] aqueous solutions and melts of $LiClO_4{\cdot}3H_2O$, NaOH/urea aqueous solutions, aqueous sodium hydroxide, aqueous potassium hydroxide, formic acid, and ionic liquids.

The present α-glucan oligomers/polymers can be contacted with a solvent and one or more alkali hydroxides by mixing. Such mixing can be performed during or after adding these components with each other. Mixing can be performed by manual mixing, mixing using an overhead mixer, using a magnetic stir bar, or shaking, for example. In certain embodiments, the present α-glucan oligomers/polymers can first be mixed in water or an aqueous solution before it is mixed with a solvent and/or alkali hydroxide.

After contacting the present α-glucan oligomers/polymers, solvent, and one or more alkali hydroxides with each other, the resulting composition can optionally be maintained at ambient temperature for up to 14 days. The term "ambient temperature" as used herein refers to a temperature between about 15-30° C. or 20-25° C. (or any integer between 15 and 30° C.). Alternatively, the composition can be heated with or without reflux at a temperature from about 30° C. to about 150° C. (or any integer between 3° and 150° C.) for up to about 48 hours. The composition in certain embodiments can be heated at about 55° C. for about 30 minutes or about 60 minutes. Thus, a composition obtained from mixing the present α-glucan oligomers/polymers, solvent, and one or more alkali hydroxides with each other can be heated at about 50, 51, 52, 53, 54, 55, 56, 57, 58, 59, or 60° C. for about 30-90 minutes.

After contacting the present α-glucan oligomers/polymers, solvent, and one or more alkali hydroxides with each other, the resulting composition can optionally be filtered (with or without applying a temperature treatment step). Such filtration can be performed using a funnel, centrifuge, press filter, or any other method and/or equipment known in the art that allows removal of liquids from solids. Though filtration would remove much of the alkali hydroxide, the filtered α-glucan oligomers/polymers would remain alkaline (i.e., mercerized α-glucan), thereby providing alkaline conditions.

An etherification agent comprising an organic group can be contacted with the present α-glucan oligomers/polymers in a reaction under alkaline conditions in a method herein of producing the respective α-glucan ether compounds. For example, an etherification agent can be added to a composition prepared by contacting the present α-glucan oligomers/polymers composition, solvent, and one or more alkali hydroxides with each other as described above. Alternatively, an etherification agent can be included when preparing the alkaline conditions (e.g., an etherification agent can be mixed with the present α-glucan oligomers/polymers and solvent before mixing with alkali hydroxide).

An etherification agent herein can refer to an agent that can be used to etherify one or more hydroxyl groups of glucose monomeric units of the present α-glucan oligomers/polymers with an organic group as disclosed herein. Examples of organic groups include alkyl groups, hydroxy alkyl groups, and carboxy alkyl groups. One or more etherification agents may be used in the reaction.

Etherification agents suitable for preparing an alkyl α-glucan ether compound include, for example, dialkyl sulfates, dialkyl carbonates, alkyl halides (e.g., alkyl chloride), iodoalkanes, alkyl triflates (alkyl trifluoromethanesulfonates) and alkyl fluorosulfonates. Thus, examples of etherification agents for producing methyl α-glucan ethers include dimethyl sulfate, dimethyl carbonate, methyl chloride, iodomethane, methyl triflate and methyl fluorosulfonate. Examples of etherification agents for producing ethyl α-glucan ethers include diethyl sulfate, diethyl carbonate, ethyl chloride, iodoethane, ethyl triflate and ethyl fluorosulfonate. Examples of etherification agents for producing propyl α-glucan ethers include dipropyl sulfate, dipropyl carbonate, propyl chloride, iodopropane, propyl triflate and propyl fluorosulfonate. Examples of etherification agents for producing butyl α-glucan ethers include dibutyl sulfate, dibutyl carbonate, butyl chloride, iodobutane and butyl triflate.

Etherification agents suitable for preparing a hydroxyalkyl α-glucan ether compound include, for example, alkylene oxides such as ethylene oxide, propylene oxide (e.g., 1,2-propylene oxide), butylene oxide (e.g., 1,2-butylene oxide; 2,3-butylene oxide; 1,4-butylene oxide), or combinations thereof. As examples, propylene oxide can be used as an etherification agent for preparing hydroxypropyl α-glucan, and ethylene oxide can be used as an etherification agent for preparing hydroxyethyl α-glucan. Alternatively, hydroxyalkyl halides (e.g., hydroxyalkyl chloride) can be used as etherification agents for preparing hydroxyalkyl α-glucan.

Examples of hydroxyalkyl halides include hydroxyethyl halide, hydroxypropyl halide (e.g., 2-hydroxypropyl chloride, 3-hydroxypropyl chloride) and hydroxybutyl halide. Alternatively, alkylene chlorohydrins can be used as etherification agents for preparing hydroxyalkyl α-glucan ethers.

Alkylene chlorohydrins that can be used include, but are not limited to, ethylene chlorohydrin, propylene chlorohydrin, butylene chlorohydrin, or combinations of these.

Etherification agents suitable for preparing a dihydroxyalkyl α-glucan ether compound include dihydroxyalkyl halides (e.g., dihydroxyalkyl chloride) such as dihydroxyethyl halide, dihydroxypropyl halide (e.g., 2,3-dihydroxypropyl chloride [i.e., 3-chloro-1,2-propanediol]), or dihydroxybutyl halide, for example. 2,3-dihydroxypropyl chloride can be used to prepare dihydroxypropyl α-glucan ethers, for example.

Etherification agents suitable for preparing a carboxyalkyl α-glucan ether compounds may include haloalkylates (e.g., chloroalkylate). Examples of haloalkylates include haloacetate (e.g., chloroacetate), 3-halopropionate (e.g., 3-chloropropionate) and 4-halobutyrate (e.g., 4-chlorobutyrate). For example, chloroacetate (monochloroacetate) (e.g., sodium chloroacetate) can be used as an etherification agent to prepare carboxymethyl α-glucan. An etherification agent herein can alternatively comprise a positively charged organic group.

An etherification agent in certain embodiments can etherify α-glucan oligomers/polymers with a positively charged organic group, where the carbon chain of the positively charged organic group only has a substitution with a positively charged group (e.g., substituted ammonium group such as trimethylammonium). Examples of such etherification agents include dialkyl sulfates, dialkyl carbonates, alkyl halides (e.g., alkyl chloride), iodoalkanes, alkyl triflates (alkyl trifluoromethanesulfonates) and alkyl fluorosulfonates, where the alkyl group(s) of each of these agents has one or more substitutions with a positively charged group (e.g., substituted ammonium group such as trimethylammonium). Other examples of such etherification agents include dimethyl sulfate, dimethyl carbonate, methyl chloride, iodomethane, methyl triflate and methyl fluorosulfonate, where the methyl group(s) of each of these agents has a substitution with a positively charged group (e.g., substituted ammonium group such as trimethylammonium). Other examples of such etherification agents include diethyl sulfate, diethyl carbonate, ethyl chloride, iodoethane, ethyl triflate and ethyl fluorosulfonate, where the ethyl group(s) of each of these agents has a substitution with a positively charged group (e.g., substituted ammonium group such as trimethylammonium). Other examples of such etherification agents include dipropyl sulfate, dipropyl carbonate, propyl chloride, iodopropane, propyl triflate and propyl fluorosulfonate, where the propyl group(s) of each of these agents has one or more substitutions with a positively charged group (e.g., substituted ammonium group such as trimethylammonium). Other examples of such etherification agents include dibutyl sulfate, dibutyl carbonate, butyl chloride, iodobutane and butyl triflate, where the butyl group(s) of each of these agents has one or more substitutions with a positively charged group (e.g., substituted ammonium group such as trimethylammonium).

An etherification agent alternatively may be one that can etherify the present α-glucan oligomers/polymers with a positively charged organic group, where the carbon chain of the positively charged organic group has a substitution (e.g., hydroxyl group) in addition to a substitution with a positively charged group (e.g., substituted ammonium group such as trimethylammonium). Examples of such etherification agents include hydroxyalkyl halides (e.g., hydroxyalkyl chloride) such as hydroxypropyl halide and hydroxybutyl halide, where a terminal carbon of each of these agents has a substitution with a positively charged group (e.g., substituted ammonium group such as trimethylammonium); an example is 3-chloro-2-hydroxypropyl-trimethylammonium. Other examples of such etherification agents include alkylene oxides such as propylene oxide (e.g., 1,2-propylene oxide) and butylene oxide (e.g., 1,2-butylene oxide; 2,3-butylene oxide), where a terminal carbon of each of these agents has a substitution with a positively charged group (e.g., substituted ammonium group such as trimethylammonium).

A substituted ammonium group comprised in any of the foregoing etherification agent examples can be a primary, secondary, tertiary, or quaternary ammonium group. Examples of secondary, tertiary and quaternary ammonium groups are represented in structure I, where $R_2$, $R_3$ and $R_4$ each independently represent a hydrogen atom or an alkyl group such as a methyl, ethyl, propyl, or butyl group. Etherification agents herein typically can be provided as a fluoride, chloride, bromide, or iodide salt (where each of the foregoing halides serve as an anion).

When producing the present α-glucan ether compounds with two or more different organic groups, two or more different etherification agents would be used, accordingly. For example, both an alkylene oxide and an alkyl chloride could be used as etherification agents to produce an alkyl hydroxyalkyl α-glucan ether. Any of the etherification agents disclosed herein may therefore be combined to produce α-glucan ether compounds with two or more different organic groups. Such two or more etherification agents may be used in the reaction at the same time, or may be used sequentially in the reaction. When used sequentially, any of the temperature-treatment (e.g., heating) steps disclosed below may optionally be used between each addition. One may choose sequential introduction of etherification agents in order to control the desired DoS of each organic group. In general, a particular etherification agent would be used first if the organic group it forms in the ether product is desired at a higher DoS compared to the DoS of another organic group to be added.

The amount of etherification agent to be contacted with the present α-glucan oligomers/polymers in a reaction under alkaline conditions can be determined based on the DoS required in the α-glucan ether compound being produced. The amount of ether substitution groups on each glucose monomeric unit in α-glucan ether compounds produced herein can be determined using nuclear magnetic resonance (NMR) spectroscopy. The molar substitution (MS) value for α-glucan has no upper limit. In general, an etherification agent can be used in a quantity of at least about 0.05 mole per mole of α-glucan. There is no upper limit to the quantity of etherification agent that can be used.

Reactions for producing α-glucan ether compounds herein can optionally be carried out in a pressure vessel such as a Parr reactor, an autoclave, a shaker tube or any other pressure vessel well known in the art. A reaction herein can optionally be heated following the step of contacting the present α-glucan oligomers/polymers with an etherification agent under alkaline conditions. The reaction temperatures and time of applying such temperatures can be varied within wide limits. For example, a reaction can optionally be maintained at ambient temperature for up to 14 days. Alternatively, a reaction can be heated, with or without reflux, between about 25° C. to about 200° C. (or any integer between 25 and 200° C.). Reaction time can be varied correspondingly: more time at a low temperature and less time at a high temperature.

In certain embodiments of producing carboxymethyl α-glucan ethers, a reaction can be heated to about 55° C. for about 3 hours. Thus, a reaction for preparing a carboxyalkyl α-glucan ether herein can be heated to about 50° C. to about 60° C. (or any integer between 5° and 60° C.) for about 2 hours to about 5 hours, for example. Etherification agents such as a haloacetate (e.g., monochloroacetate) may be used in these embodiments, for example.

Optionally, an etherification reaction herein can be maintained under an inert gas, with or without heating. As used herein, the term "inert gas" refers to a gas which does not undergo chemical reactions under a set of given conditions, such as those disclosed for preparing a reaction herein.

All of the components of the reactions disclosed herein can be mixed together at the same time and brought to the desired reaction temperature, whereupon the temperature is maintained with or without stirring until the desired α-glucan ether compound is formed. Alternatively, the mixed components can be left at ambient temperature as described above.

Following etherification, the pH of a reaction can be neutralized. Neutralization of a reaction can be performed using one or more acids. The term "neutral pH" as used herein, refers to a pH that is neither substantially acidic or basic (e.g., a pH of about 6-8, or about 6.0, 6.2, 6.4, 6.6, 6.8, 7.0, 7.2, 7.4, 7.6, 7.8, or 8.0). Various acids that can be used for this purpose include, but are not limited to, sulfuric, acetic (e.g., glacial acetic), hydrochloric, nitric, any mineral (inorganic) acid, any organic acid, or any combination of these acids.

The present α-glucan ether compounds produced in a reaction herein can optionally be washed one or more times with a liquid that does not readily dissolve the compound. For example, α-glucan ether can typically be washed with alcohol, acetone, aromatics, or any combination of these, depending on the solubility of the ether compound therein (where lack of solubility is desirable for washing). In general, a solvent comprising an organic solvent such as alcohol is preferred for washing an α-glucan ether. The present α-glucan ether product(s) can be washed one or more times with an aqueous solution containing methanol or ethanol, for example. For example, 70-95 wt % ethanol can be used to wash the product. The present α-glucan ether product can be washed with a methanol:acetone (e.g., 60:40) solution in another embodiment.

An α-glucan ether produced in the disclosed reaction can be isolated. This step can be performed before or after neutralization and/or washing steps using a funnel, centrifuge, press filter, or any other method or equipment known in the art that allows removal of liquids from solids. An isolated α-glucan ether product can be dried using any method known in the art, such as vacuum drying, air drying, or freeze drying.

Any of the above etherification reactions can be repeated using an α-glucan ether product as the starting material for further modification. This approach may be suitable for increasing the DoS of an organic group, and/or adding one or more different organic groups to the ether product.

The structure, molecular weight and DoS of the α-glucan ether product can be confirmed using various physiochemical analyses known in the art such as NMR spectroscopy and size exclusion chromatography (SEC).

Personal Care and/or Pharmaceutical Compositions Comprising the Present Soluble Oligomer/Polymer The present glucan oligomer/polymers and/or the present α-glucan ethers may be used in personal care products. For example, one may be able to use such materials as humectants, hydrocolloids or possibly thickening agents. The present α-glucan oligomers/polymers and/or the present α-glucan ethers may be used in conjunction with one or more other types of thickening agents if desired, such as those disclosed in U.S. Pat. No. 8,541,041, the disclosure of which is incorporated herein by reference in its entirety.

Personal care products herein are not particularly limited and include, for example, skin care compositions, cosmetic compositions, antifungal compositions, and antibacterial compositions. Personal care products herein may be in the form of, for example, lotions, creams, pastes, balms, ointments, pomades, gels, liquids, combinations of these and the like. The personal care products disclosed herein can include at least one active ingredient. An active ingredient is generally recognized as an ingredient that causes the intended pharmacological effect.

In certain embodiments, a skin care product can be applied to skin for addressing skin damage related to a lack of moisture. A skin care product may also be used to address the visual appearance of skin (e.g., reduce the appearance of flaky, cracked, and/or red skin) and/or the tactile feel of the skin (e.g., reduce roughness and/or dryness of the skin while improved the softness and subtleness of the skin). A skin care product typically may include at least one active ingredient for the treatment or prevention of skin ailments, providing a cosmetic effect, or for providing a moisturizing benefit to skin, such as zinc oxide, petrolatum, white petrolatum, mineral oil, cod liver oil, lanolin, dimethicone, hard fat, vitamin A, allantoin, calamine, kaolin, glycerin, or colloidal oatmeal, and combinations of these. A skin care product may include one or more natural moisturizing factors such as ceramides, hyaluronic acid, glycerin, squalane, amino acids, cholesterol, fatty acids, triglycerides, phospholipids, glycosphingolipids, urea, linoleic acid, glycosaminoglycans, mucopolysaccharide, sodium lactate, or sodium pyrrolidone carboxylate, for example. Other ingredients that may be included in a skin care product include, without limitation, glycerides, apricot kernel oil, canola oil, squalane, squalene, coconut oil, corn oil, jojoba oil, jojoba wax, lecithin, olive oil, safflower oil, sesame oil, shea butter, soybean oil, sweet almond oil, sunflower oil, tea tree oil, shea butter, palm oil, cholesterol, cholesterol esters, wax esters, fatty acids, and orange oil.

A personal care product herein can also be in the form of makeup or other product including, but not limited to, a lipstick, mascara, rouge, foundation, blush, eyeliner, lip liner, lip gloss, other cosmetics, sunscreen, sun block, nail polish, mousse, hair spray, styling gel, nail conditioner, bath gel, shower gel, body wash, face wash, shampoo, hair conditioner (leave-in or rinse-out), cream rinse, hair dye, hair coloring product, hair shine product, hair serum, hair anti-frizz product, hair split-end repair product, lip balm, skin conditioner, cold cream, moisturizer, body spray, soap, body scrub, exfoliant, astringent, scruffing lotion, depilatory, permanent waving solution, antidandruff formulation, antiperspirant composition, deodorant, shaving product, preshaving product, after-shaving product, cleanser, skin gel, rinse, toothpaste, or mouthwash, for example.

A pharmaceutical product herein can be in the form of an emulsion, liquid, elixir, gel, suspension, solution, cream, capsule, tablet, sachet or ointment, for example. Also, a pharmaceutical product herein can be in the form of any of the personal care products disclosed herein. A pharmaceutical product can further comprise one or more pharmaceutically acceptable carriers, diluents, and/or pharmaceutically acceptable salts. The present α-glucan oligomers/polymers and/or compositions comprising the present α-glucan oligomers/polymers can also be used in capsules, encapsulants, tablet coatings, and as an excipients for medicaments and drugs.

Enzymatic Synthesis of the Soluble α-Glucan Oligomers/Polymer Composition

Methods are provided to enzymatically produce a soluble α-glucan oligomer/polymer composition. In one embodiment, the method comprises the use of at least one recombinantly produced glucosyltransferase belong to glucoside hydrolase type 70 (E.C. 2.4.1.-) capable of catalyzing the synthesis of a digestion resistant soluble α-glucan oligomer/polymer composition using sucrose as a substrate. Glycoside hydrolase family 70 enzymes are transglucosidases produced by lactic acid bacteria such as *Streptococcus, Leuconostoc, Weisella* or *Lactobacillus* genera (see Carbohydrate Active Enzymes database; "CAZy"; Cantarel et al., (2009) *Nucleic Acids Res* 37:D233-238). The recombinantly expressed glucosyltransferases preferably have an amino acid sequence identical to that found in nature (i.e., the same as the full length sequence as found in the source organism or a catalytically active truncation thereof).

GTF enzymes are able to polymerize the D-glucosyl units of sucrose to form homooligosaccharides or homopolysaccharides. Depending upon the specificity of the GTF enzyme, linear and/or branched glucans comprising various glycosidic linkages may be formed such as α-(1,2), α-(1, 3), α-(1, 4) and α-(1, 6). Glucosyltransferases may also transfer the D-glucosyl units onto hydroxyl acceptor groups. A non-limiting list of acceptors may include carbohydrates, alcohols, polyols or flavonoids. The structure of the resultant glucosylated product is dependent upon the enzyme specificity.

In the present disclosure the D-glucopyranosyl donor is sucrose. As such the reaction is:

$$\text{Sucrose+GTF} \rightleftarrows \alpha\text{-D-(Glucose)}_n\text{+D-Fructose+GTF}$$

The type of glycosidic linkage predominantly formed is used to name/classify the glucosyltransferase enzyme. Examples include dextransucrases (α-(1,6) linkages; EC 2.4.1.5), mutansucrases (α-(1, 3) linkages; EC 2.4.1.-), alternansucrases (alternating α(1,3)-α(1,6) backbone; EC 2.4.1.140), and reuteransucrases (mix of α-(1,4) and α-(1,6) linkages; EC 2.4.1.-).

In one aspect, the glucosyltransferase (GTF) is capable of forming glucans having 50% or more α-(1, 3) glycosidic linkages with the proviso that that glucan product is not alternan (i.e., the enzyme is not an alternansucrase). In a preferred aspect, the glucosyltransferase is a mutansucrase (EC 2.4.1.-). As described above, amino acid residues which influence mutansucrase function have previously been characterized. See, A. Shimamura et al. (*J. Bacteriology*, (1994) 176:4845-4850).

The glucosyltransferase is preferably a glucosyltransferase capable of producing a glucan with at least 75% α-(1,3) glycosidic linkages. In certain embodiments, the glucosyltransferase comprises an amino acid sequence selected from the group consisting of SEQ ID NOs: 3, 5, 17, 19, 88, 90, 92, 94, 96, 98, 100, 102, 104, 106, 108, 110, 112, and any combination thereof. However, it should be noted that some wild type sequences may be found in nature in a truncated form. As such, and in a further embodiment, the glucosyltransferase suitable for use may be a truncated form of the wild type sequence. In a further embodiment, the truncated glucosyltransferase comprises a sequence derived from the full length wild type amino acid sequence selected from the group consisting of SEQ ID NOs: 3 and 17. In another embodiment, the glucosyltransferase may be truncated and will have an amino acid sequence selected from the group consisting of SEQ ID NOs: 5 and 19. In another embodiment, the glucosyltransferase comprises SEQ ID NO: 5. In yet another embodiment, the glucosyltransferase is truncated and is derived from SEQ ID NO: 19. In certain other embodiments, the truncated glucosyltransferase comprises an amino acid sequence selected from the group consisting of SEQ ID NOs: 118, 120, 122, 124, 126, 128, 130, 132, 134, 136, 138, 140, 142, 144, 146, 148, 150, and 152. The concentration of the catalyst in the aqueous reaction formulation depends on the specific catalytic activity of the catalyst, and is chosen to obtain the desired rate of reaction. The weight of each catalyst (either a single glucosyltransferase or individually a glucosyltransferase and α-glucanohydrolase) reactions typically ranges from 0.0001 mg to 20 mg per mL of total reaction volume, preferably from 0.001 mg to 10 mg per mL. The catalyst may also be immobilized on a soluble or insoluble support using methods well-known to those skilled in the art; see for example, *Immobilization of Enzymes and Cells*; Gordon F. Bickerstaff, Editor; Humana Press, Totowa, NJ, USA; 1997. The use of immobilized catalysts permits the recovery and reuse of the catalyst in subsequent reactions. The enzyme catalyst may be in the form of whole microbial cells, permeabilized microbial cells, microbial cell extracts, partially-purified or purified enzymes, and mixtures thereof.

The pH of the final reaction formulation is from about 3 to about 8, preferably from about 4 to about 8, more preferably from about 5 to about 8, even more preferably about 5.5 to about 7.5, and yet even more preferably about 5.5 to about 6.5. The pH of the reaction may optionally be controlled by the addition of a suitable buffer including, but not limited to, phosphate, pyrophosphate, bicarbonate, acetate, or citrate. The concentration of buffer, when employed, is typically from 0.1 mM to 1.0 M, preferably from 1 mM to 300 mM, most preferably from 10 mM to 100 mM.

The sucrose concentration initially present when the reaction components are combined is at least 50 g/L, preferably 50 g/L to 600 g/L, more preferably 100 g/L to 500 g/L, more preferably 150 g/L to 450 g/L, and most preferably 250 g/L to 450 g/L. The substrate for the α-glucanohydrolase (when present) will be the members of the glucose oligomer population formed by the glucosyltransferase. As the glucose oligomers present in the reaction system may act as acceptors, the exact concentration of each species present in the reaction system will vary. Additionally, other acceptors may be added (i.e., external acceptors) to the initial reaction mixture such as maltose, isomaltose, isomaltotriose, and methyl-α-D-glucan, to name a few.

The length of the reaction may vary and may often be determined by the amount of time it takes to use all of the available sucrose substrate. In one embodiment, the reaction is conducted until at least 90%, preferably at least 95% and most preferably at least 99% of the sucrose initially present in the reaction mixture is consumed. In another embodiment, the reaction time is 1 hour to 168 hours, preferably 1 hour to 72 hours, and most preferably 1 hour to 24 hours.

Single Enzyme Method (Glucosyltransferase) Using Elevated Reaction Temperature

The optimum temperature for many GH70 family glucosyltransferases is often between 25° C. and 35° C. with rapid inactivation often observed at temperatures exceeding 55° C.-60° C. However, it has been discovered that certain glucosyltransferases may be capable of producing the desired soluble glucan oligomer/polymer composition from sucrose when the reaction is conducted at elevated temperatures (defined herein as a temperature of at least 45° C. yet below the inactivation temperature of the enzyme).

In one aspect, the glucosyltransferase is capable of producing the present glucan oligomer/polymer from sucrose when the reaction is conducted at a temperature of at least 45° C., but below the temperature where the enzyme is thermally inactivated. In a further aspect, the temperature for running the glucosyltransferase reaction is conducted at a temperature of at least 47° C. but less than the inactivation temperature of the specified enzyme. In one aspect, the upper limit of the reaction temperature is equal to or less than 55° C. In another embodiment, the reaction temperature is 47° C. to 52° C. In a further aspect, the glucosyltransferase used in the single enzyme method comprises an amino acid sequence derived from a polypeptide having an amino acid sequence selected from the group consisting of SEQ ID NO: 3 and 5. In a preferred aspect, the glucosyltransferase is derived from the *Streptococcus salivarius* GTFJ glucosyltransferase (GENBANK® gi: 47527; SEQ ID NO: 3). In a further preferred embodiment, the glucosyltransferase is SEQ ID NO: 3 or a catalytically active truncation retaining the glucosyltransferase activity thereof.

Soluble Glucan Oligomer/polymer Synthesis—Reaction Systems Comprising a Glucosyltransferase (GTF) and an α-Glucanohydrolase A method is provided to enzymatically produce the present soluble glucan oligomers/polymers using at least one α-glucanohydrolase in combination (i.e., concomitantly in the reaction mixture) with at least one of the above glucosyltransferases. The simultaneous use of the two enzymes produces a different product profile (i.e., the profile of the soluble oligomer/polymer composition) when compared to a sequential application of the same enzymes (i.e., first synthesizing the glucan polymer from sucrose using a glucosyltransferase and then subsequently treating the glucan polymer with an α-glucanohydrolase). In one embodiment, a glucan oligomer/polymer synthesis method based on sequential application of a glucosyltransferase with an α-glucanohydrolase is specifically excluded.

Similar to the glucosyltransferases, an α-glucanohydrolase may be defined by the endohydrolysis activity towards certain α-D-glycosidic linkages. Examples may include, but are not limited to, dextranases (capable of hydrolyzing α-(1,6)-linked glycosidic bonds; E.C. 3.2.1.11), mutanases (capable of hydrolyzing α-(1, 3)-linked glycosidic bonds; E.C. 3.2.1.59), mycodextranases (capable of endohydrolysis of (1→4)-α-D-glucosidic linkages in α-D-glucans containing both (1→3)- and (1→4)-bonds; EC 3.2.1.61), glucan 1,6-α-glucosidase (EC 3.2.1.70), and alternanases (capable of endohydrolytically cleaving alternan; E.C. 3.2.1.-; see U.S. Pat. No. 5,786,196). Various factors including, but not limited to, level of branching, the type of branching, and the relative branch length within certain α-glucans may adversely impact the ability of an α-glucanohydrolase to endohydrolyze some glycosidic linkages.

In one embodiment, the α-glucanohydrolase is a dextranase (EC 3.2.1.11), a mutanase (EC 3.1.1.59) or a combination thereof. In one embodiment, the dextranase is a food grade dextranase from *Chaetomium erraticum*. In a further embodiment, the dextranase from *Chaetomium erraticum* is DEXTRANASE® PLUS L, available from Novozymes A/S, Denmark.

In another embodiment, the α-glucanohydrolase is at least one mutanase (EC 3.1.1.59). Mutanases useful in the methods disclosed herein can be identified by their characteristic structure. See, e.g., Y. Hakamada et al. (*Biochimie*, (2008) 90:525-533). In one embodiment, the mutanase is one obtainable from the genera *Penicillium, Paenibacillus, Hypocrea, Aspergillus*, and *Trichoderma*. In a further embodiment, the mutanase is from *Penicillium marneffei* ATCC 18224 or *Paenibacillus Humicus*. In one embodiment, the mutanase comprises an amino acid sequence selected from SEQ ID NOs 21, 22, 24, 27, 29, 54, 56, 58, and any combination thereof. In yet a further embodiment, the mutanase comprises an amino acid sequence selected from SEQ ID NO: 21, 22, 24, 27 and any combination thereof. In another embodiment, the above mutanases may be a catalytically active truncation so long as the mutanase activity is retained. The temperature of the enzymatic reaction system comprising concomitant use of at least one glucosyltransferase and at least one α-glucanohydrolase may be chosen to control both the reaction rate and the stability of the enzyme catalyst activity. The temperature of the reaction may range from just above the freezing point of the reaction formulation (approximately 0° C.) to about 60° C., with a preferred range of 5° C. to about 55° C., and a more preferred range of reaction temperature of from about 20° C. to about 47° C.

The ratio of glucosyltransferase to α-glucanohydrolase (v/v) may vary depending upon the selected enzymes. In one embodiment, the ratio of glucosyltransferase to α-glucanohydrolase (v/v) ranges from 1:0.01 to 0.01:1.0. In another embodiment, the ratio of glucosyltransferase to α-glucanohydrolase (units of activity/units of activity) may vary depending upon the selected enzymes. In still further embodiments, the ratio of glucosyltransferase to α-glucanohydrolase (units of activity/units of activity) ranges from 1:0.01 to 0.01:1.0. In one embodiment, a method is provided to produce a soluble α-glucan oligomer/polymer composition comprising:

1. providing a set of reaction components comprising:
   a. sucrose;
   b. at least one glucosyltransferase capable of catalyzing the synthesis of glucan polymers having at least 75% α-(1, 3) glycosidic linkages;
   c. at least one α-glucanohydrolase capable of hydrolyzing glucan polymers having one or more α-(1, 3) glycosidic linkages or one or more α-(1,6) glycosidic linkages; and
   d. optionally one more acceptors; and
2. combining the set of reaction components under suitable aqueous reaction conditions whereby a soluble α-glucan oligomer/polymer composition is produced.

In a preferred embodiment, the at least one glucosyltransferase and the at least one α-glucanohydrolase are concomitantly present in the reaction to produce the soluble α-glucan oligomer/polymer composition.

In one embodiment, the least one glucosyltransferase capable of catalyzing the synthesis of glucan polymers having one or more α-(1, 3) glycosidic linkages is a mutansucrase.

In another embodiment, the at least one α-glucanohydrolase capable of hydrolyzing glucan polymers having one or more α-(1, 3) glycosidic linkages or one or more α-(1,6) glycosidic linkages is an endomutanase.

In a preferred embodiment, the set of reaction components comprises the concomitant use of a mutansucrase and a mutanase.

The method to produce a soluble α-glucan oligomer/polymer may further comprise one or more additional steps to obtain the soluble α-glucan oligomer/polymer composition. As such, and in a further embodiment, a method is provided comprising:

1) providing a set of reaction components comprising:
   i) sucrose;
   ii) at least one glucosyltransferase capable of catalyzing the synthesis of glucan polymers having at least 75% α-(1, 3) glycosidic linkages;
   iii) at least one α-glucanohydrolase capable of hydrolyzing glucan polymers having one or more α-(1, 3) glycosidic linkages or one or more α-(1,6) glycosidic linkages; and
   iv) optionally one more acceptors;
2. combining the set of reaction components under suitable aqueous reaction conditions whereby a product mixture comprising a soluble α-glucan oligomer/polymer composition is produced;
3. isolating the soluble α-glucan oligomer/polymer composition from the product mixture of step 2; and
4. optionally concentrating the soluble α-glucan oligomer/polymer composition.

Methods to Identify Substantially Similar Enzymes Having the Desired Activity

The skilled artisan recognizes that substantially similar enzyme sequences may also be used in the present compositions and methods so long as the desired activity is retained (i.e., glucosyltransferase activity capable of forming glucans having the desired glycosidic linkages or α-glucanohydrolases having endohydrolytic activity towards the target glycosidic linkage(s)). For example, it has been demonstrated that catalytically activity truncations may be prepared and used so long as the desired activity is retained (or even improved in terms of specific activity). In one embodiment, substantially similar sequences are defined by their ability to hybridize, under highly stringent conditions with the nucleic acid molecules associated with sequences exemplified herein. In another embodiment, sequence alignment algorithms may be used to define substantially similar enzymes based on the percent identity to the DNA or amino acid sequences provided herein.

As used herein, a nucleic acid molecule is "hybridizable" to another nucleic acid molecule, such as a cDNA, genomic DNA, or RNA, when a single strand of the first molecule can anneal to the other molecule under appropriate conditions of temperature and solution ionic strength. Hybridization and washing conditions are well known and exemplified in Sambrook, J. and Russell, D., T. *Molecular Cloning: A Laboratory Manual*, Third Edition, Cold Spring Harbor Laboratory Press, Cold Spring Harbor (2001). The conditions of temperature and ionic strength determine the "stringency" of the hybridization. Stringency conditions can be adjusted to screen for moderately similar molecules, such as homologous sequences from distantly related organisms, to highly similar molecules, such as genes that duplicate functional enzymes from closely related organisms. Post-hybridization washes typically determine stringency conditions. One set of preferred conditions uses a series of washes starting with 6×SSC, 0.5% SDS at room temperature for 15 min, then repeated with 2×SSC, 0.5% SDS at 45° C. for 30 min, and then repeated twice with 0.2×SSC, 0.5% SDS at 50° C. for 30 min. A more preferred set of conditions uses higher temperatures in which the washes are identical to those above except for the temperature of the final two 30 min washes in 0.2×SSC, 0.5% SDS was increased to 60° C. Another preferred set of highly stringent hybridization conditions is 0.1×SSC, 0.1% SDS, 65° C. and washed with 2×SSC, 0.1% SDS followed by a final wash of 0.1×SSC, 0.1% SDS, 65° C.

Hybridization requires that the two nucleic acids contain complementary sequences, although depending on the stringency of the hybridization, mismatches between bases are possible. The appropriate stringency for hybridizing nucleic acids depends on the length of the nucleic acids and the degree of complementation, variables well known in the art. The greater the degree of similarity or homology between two nucleotide sequences, the greater the value of Tm for hybrids of nucleic acids having those sequences. The relative stability (corresponding to higher Tm) of nucleic acid hybridizations decreases in the following order: RNA:RNA, DNA:RNA, DNA:DNA. For hybrids of greater than 100 nucleotides in length, equations for calculating Tm have been derived (Sambrook, J. and Russell, D., T., supra). For hybridizations with shorter nucleic acids, i.e., oligonucleotides, the position of mismatches becomes more important, and the length of the oligonucleotide determines its specificity. In one aspect, the length for a hybridizable nucleic acid is at least about 10 nucleotides. Preferably, a minimum length for a hybridizable nucleic acid is at least about 15 nucleotides in length, more preferably at least about 20 nucleotides in length, even more preferably at least 30 nucleotides in length, even more preferably at least 300 nucleotides in length, and most preferably at least 800 nucleotides in length. Furthermore, the skilled artisan will recognize that the temperature and wash solution salt concentration may be adjusted as necessary according to factors such as length of the probe.

As used herein, the term "percent identity" is a relationship between two or more polypeptide sequences or two or more polynucleotide sequences, as determined by comparing the sequences. In the art, "identity" also means the degree of sequence relatedness between polypeptide or polynucleotide sequences, as the case may be, as determined by the match between strings of such sequences. "Identity" and "similarity" can be readily calculated by known methods, including but not limited to those described in: *Computational Molecular Biology* (Lesk, A. M., ed.) Oxford University Press, NY (1988); *Biocomputing: Informatics and Genome Projects* (Smith, D. W., ed.) Academic Press, NY (1993); *Computer Analysis of Sequence Data, Part I* (Griffin, A. M., and Griffin, H. G., eds.) Humana Press, NJ (1994); *Sequence Analysis in Molecular Bioloqy* (von Heinje, G., ed.) Academic Press (1987); and *Sequence Analysis Primer* (Gribskov, M. and Devereux, J., eds.) Stockton Press, NY (1991). Methods to determine identity and similarity are codified in publicly available computer programs. Sequence alignments and percent identity calculations may be performed using the Megalign program of the LASERGENE bioinformatics computing suite (DNASTAR Inc., Madison, WI), the AlignX program of Vector NTI v. 7.0 (Informax, Inc., Bethesda, MD), or the EMBOSS Open Software Suite (EMBL-EBI; Rice et al., *Trends in Genetics* 16, (6):276-277 (2000)). Multiple alignment of the sequences can be performed using the CLUSTAL method (such as CLUSTALW; for example version 1.83) of alignment (Higgins and Sharp, CAB/OS, 5:151-153 (1989); Higgins et al., *Nucleic Acids Res.* 22:4673-4680 (1994); and Chenna et al., *Nucleic Acids Res* 31 (13):3497-500 (2003)), available from the European Molecular Biology Laboratory via the European Bioinformatics Institute) with the default parameters. Suitable parameters for CLUSTALW protein alignments include GAP Existence penalty=15, GAP extension=0.2, matrix=Gonnet (e.g., Gonnet250), protein ENDGAP=−1, protein GAPDIST=4, and KTUPLE=1. In one embodiment, a fast or slow alignment is used with the default settings where a slow alignment is preferred. Alternatively, the parameters using the CLUSTALW method (e.g., version 1.83) may be modified to also use KTUPLE=1, GAP PENALTY=10, GAP extension=1, matrix=BLOSUM (e.g., BLOSUM64), WINDOW=5, and TOP DIAGONALS SAVED=5.

In one aspect, suitable isolated nucleic acid molecules encode a polypeptide having an amino acid sequence that is at least about 20%, preferably at least 30%, 40%, 50%, 60%, 70%, 80%, 85%, 90%, 91%, 92%, 93%, 94%, 95%, 96%, 97%, 98%, or 99% identical to the amino acid sequences reported herein. In another aspect, suitable isolated nucleic acid molecules encode a polypeptide having an amino acid sequence that is at least about 20%, preferably at least 30%, 40%, 50%, 60%, 70%, 80%, 85%, 90%, 91%, 92%, 93%, 94%, 95%, 96%, 97%, 98%, or 99% identical to the amino acid sequences reported herein; with the proviso that the polypeptide retains the respective activity (i.e., glucosyltransferase or α-glucanohydrolase activity).

Methods to Obtain the Enzymatically-Produced Soluble α-Glucan Oligomer/polymer Composition Any number of common purification techniques may be used to obtain the present soluble α-glucan oligomer/polymer composition from the reaction system including, but not limited to centrifugation, filtration, fractionation, chromatographic separation, dialysis, evaporation, precipitation, dilution or any combination thereof, preferably by dialysis or chromatographic separation, most preferably by dialysis (ultrafiltration).

Recombinant Microbial Expression

The genes and gene products of the instant sequences may be produced in heterologous host cells, particularly in the cells of microbial hosts. Preferred heterologous host cells for expression of the instant genes and nucleic acid molecules are microbial hosts that can be found within the fungal or bacterial families and which grow over a wide range of temperature, pH values, and solvent tolerances. For example, it is contemplated that any of bacteria, yeast, and filamentous fungi may suitably host the expression of the present nucleic acid molecules. The enzyme(s) may be expressed intracellularly, extracellularly, or a combination of both intracellularly and extracellularly, where extracellular expression renders recovery of the desired protein from a fermentation product more facile than methods for recovery of protein produced by intracellular expression. Transcription, translation and the protein biosynthetic apparatus remain invariant relative to the cellular feedstock used to generate cellular biomass; functional genes will be expressed regardless. Examples of host strains include, but are not limited to, bacterial, fungal or yeast species such as *Aspergillus, Trichoderma, Saccharomyces, Pichia, Phaffia, Kluyveromyces, Candida, Hansenula, Yarrowia, Salmonella, Bacillus, Acinetobacter, Zymomonas, Agrobacterium, Erythrobacter, Chlorobium, Chromatium, Flavobacterium, Cytophaga, Rhodobacter, Rhodococcus, Streptomyces, Brevibacterium, Corynebacteria, Mycobacterium, Deinococcus, Escherichia, Erwinia, Pantoea, Pseudomonas, Sphingomonas, Methylomonas, Methylobacter, Methylococcus, Methylosinus, Methylomicrobium, Methylocystis, Alcaligenes, Synechocystis, Synechococcus, Anabaena, Thiobacillus, Methanobacterium, Klebsiella*, and *Myxococcus*. In one embodiment, the fungal host cell is *Trichoderma*, preferably a strain of *Trichoderma reesei*. In one embodiment, bacterial host strains include *Escherichia, Bacillus, Kluyveromyces*, and *Pseudomonas*. In a preferred embodiment, the bacterial host cell is *Bacillus subtilis* or *Escherichia coli*.

Large-scale microbial growth and functional gene expression may use a wide range of simple or complex carbohydrates, organic acids and alcohols or saturated hydrocarbons, such as methane or carbon dioxide in the case of photosynthetic or chemoautotrophic hosts, the form and amount of nitrogen, phosphorous, sulfur, oxygen, carbon or any trace micronutrient including small inorganic ions. The regulation of growth rate may be affected by the addition, or not, of specific regulatory molecules to the culture and which are not typically considered nutrient or energy sources.

Vectors or cassettes useful for the transformation of suitable host cells are well known in the art. Typically, the vector or cassette contains sequences directing transcription and translation of the relevant gene, a selectable marker, and sequences allowing autonomous replication or chromosomal integration. Suitable vectors comprise a region 5' of the gene which harbors transcriptional initiation controls and a region 3' of the DNA fragment which controls transcriptional termination. It is most preferred when both control regions are derived from genes homologous to the transformed host cell and/or native to the production host, although such control regions need not be so derived.

Initiation control regions or promoters which are useful to drive expression of the present cephalosporin C deacetylase coding region in the desired host cell are numerous and familiar to those skilled in the art. Virtually any promoter capable of driving these genes is suitable for the present disclosure including but not limited to, CYC1, HIS3, GAL1, GAL10, ADH1, PGK, PHO5, GAPDH, ADC1, TRP1, URA3, LEU2, ENO, TPI (useful for expression in *Saccharomyces*); AOX1 (useful for expression in *Pichia*); and lac, araB, tet, trp, $IP_L$, $IP_R$, T7, tac, and trc (useful for expression in *Escherichia coli*) as well as the amy, apr, npr promoters and various phage promoters useful for expression in *Bacillus*.

Termination control regions may also be derived from various genes native to the preferred host cell. In one embodiment, the inclusion of a termination control region is optional. In another embodiment, the chimeric gene includes a termination control region derived from the preferred host cell.

Industrial Production

A variety of culture methodologies may be applied to produce the enzyme(s). For example, large-scale production of a specific gene product over-expressed from a recombinant microbial host may be produced by batch, fed-batch, and continuous culture methodologies. Batch and fed-batch culturing methods are common and well known in the art and examples may be found in *Biotechnology: A Textbook of Industrial Microbiology* by Wulf Crueger and Anneliese Crueger (authors), Second Edition, (Sinauer Associates, Inc., Sunderland, MA (1990) and *Manual of Industrial Microbiology and Biotechnology*, Third Edition, Richard H. Baltz, Arnold L. Demain, and Julian E. Davis (Editors), (ASM Press, Washington, DC (2010).

Commercial production of the desired enzyme(s) may also be accomplished with a continuous culture. Continuous cultures are an open system where a defined culture media is added continuously to a bioreactor and an equal amount of conditioned media is removed simultaneously for processing. Continuous cultures generally maintain the cells at a constant high liquid phase density where cells are primarily in log phase growth. Alternatively, continuous culture may be practiced with immobilized cells where carbon and nutrients are continuously added and valuable products, by-products or waste products are continuously removed from the cell mass. Cell immobilization may be performed using a wide range of solid supports composed of natural and/or synthetic materials.

Recovery of the desired enzyme(s) from a batch fermentation, fed-batch fermentation, or continuous culture, may be accomplished by any of the methods that are known to those skilled in the art. For example, when the enzyme catalyst is produced intracellularly, the cell paste is separated from the culture medium by centrifugation or membrane filtration, optionally washed with water or an aqueous buffer at a desired pH, then a suspension of the cell paste in an aqueous buffer at a desired pH is homogenized to produce a cell extract containing the desired enzyme catalyst. The cell extract may optionally be filtered through an appropriate filter aid such as celite or silica to remove cell debris prior to a heat-treatment step to precipitate undesired protein from the enzyme catalyst solution. The solution containing the desired enzyme catalyst may then be separated from the precipitated cell debris and protein by membrane filtration or centrifugation, and the resulting partially-purified enzyme catalyst solution concentrated by additional membrane filtration, then optionally mixed with an appropriate carrier (for example, maltodextrin, phosphate buffer, citrate buffer, or mixtures thereof) and spray-dried to produce a solid powder comprising the desired enzyme catalyst. Alternatively, the resulting partially-purified enzyme catalyst solution can be stabilized as a liquid formulation by the addition of polyols such as maltodextrin, sorbitol, or propylene glycol, to which is optionally added a preservative such as sorbic acid, sodium sorbate or sodium benzoate.

When an amount, concentration, or other value or parameter is given either as a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope be limited to the specific values recited when defining a range.

DESCRIPTION OF CERTAIN EMBODIMENTS

In a first embodiment (the “first embodiment”), a soluble α-glucan oligomer/polymer composition is provided, said soluble α-glucan oligomer/polymer composition comprising:

a. at least 75% α-(1,3) glycosidic linkages, preferably at least 80%, more preferably at least 85%, even more preferably at least 90%, and most preferably at least 95% α-(1,3) glycosidic linkages;
b. less than 25% α-(1,6) glycosidic linkages; preferably less than 10%, more preferably 5% or less, and even more preferably less than 1% α-(1,6) glycosidic linkages;
c. less than 10% α-(1,3,6) glycosidic linkages; preferably less than 5%, and most preferably less than 2.5% α-(1,3,6) glycosidic linkages;
d. a weight average molecular weight of less than 5000 Daltons; preferably less than 2500 Daltons, more preferably between 500 and 2500 Daltons, and most preferably about 500 to about 2000 Daltons;
e. a viscosity of less than 0.25 Pascal second (Pa·s), preferably less than 0.01 Pascal second (Pa·s), preferably less than 7 cP (0.007 Pa·s), more preferably less than 5 cP (0.005 Pa·s), more preferably less than 4 cP (0.004 Pa·s), and most preferably less than 3 cP (0.003 Pa·s) at 12 wt % in water at 20° C.
f. a solubility of at least 20% (w/w), preferably at least 30%, 40%, 50%, 60%, or 70%, in water at 25° C.; and
g. a polydispersity index of less than 5.

In second embodiment, a fabric care, laundry care, or aqueous composition is provided comprising 0.01 to 99 wt % (dry solids basis), preferably 10 to 90% wt %, of the soluble α-glucan oligomer/polymer composition described above.

In another embodiment, a method is provided to produce a soluble α-glucan oligomer/polymer composition comprising:

a. providing a set of reaction components comprising:
   i. sucrose;
   ii. at least one glucosyltransferase capable of catalyzing the synthesis of glucan polymers having at least 75%, preferably at least 80%, more preferably at least 85%, even more preferably at least 90%, and most preferably at least 95% α-(1,3) glycosidic linkages;
   iii. at least one α-glucanohydrolase capable of hydrolyzing glucan polymers having one or more α-(1, 3) glycosidic linkages or one or more α-(1,6) glycosidic linkages; and
   iv. optionally one more acceptors;
b. combining under suitable aqueous reaction conditions whereby a product comprising a soluble α-glucan oligomer/polymer composition is produced; and
c. optionally isolating the soluble α-glucan oligomer/polymer composition from the product of step (b); and
d. optionally concentrating the isolated soluble α-glucan oligomer/polymer composition of step (c).

In another embodiment, a method is provided to produce the α-glucan oligomer/polymer composition of the first embodiment comprising:

1. providing a set of reaction components comprising:
   1. sucrose;
   2. at least one glucosyltransferase capable of catalyzing the synthesis of glucan polymers having at least 75%, preferably at least 80%, more preferably at least 85%, even more preferably at least 90%, and most preferably at least 95% α-(1, 3) glycosidic linkages;
   3. at least one α-glucanohydrolase capable of hydrolyzing glucan polymers having one or more α-(1,3) glycosidic linkages or one or more α-(1,6) glycosidic linkages; and
   4. optionally one more acceptors;
2. combining under suitable aqueous reaction conditions the set of reaction components of (a) to form a single reaction mixture, whereby a product mixture comprising glucose oligomers is formed;
3. isolating the soluble α-glucan oligomer/polymer composition of the first embodiment from the product mixture comprising glucose oligomers; and
4. optionally concentrating the soluble α-glucan oligomer/polymer composition.

A composition or method according to any of the above embodiments wherein the soluble α-glucan oligomer/polymer composition comprises less than 5%, preferably less than 1%, and most preferably less than 0.5% α-(1, 4) glycosidic linkages.

A composition or method according to any of the above embodiments wherein the α-glucanohydrolase is an endomutanase and the glucosyltransferase is a mutansucrase.

A composition comprising 0.01 to 99 wt % (dry solids basis) of the present soluble α-glucan oligomer/polymer composition and at least one of the following ingredients: at least one cellulase, at least one protease or a combination thereof.

A method according to any of the above embodiments wherein the isolating step comprises at least one of centrifugation, filtration, fractionation, chromatographic separation, dialysis, evaporation, dilution or any combination thereof.

A method according to any of the above embodiments wherein the sucrose concentration in the single reaction mixture is initially at least 200 g/L upon combining the set of reaction components.

A method according to any of the above embodiments wherein the ratio of glucosyltransferase activity to α-glucanohydrolase activity ranges from 0.01:1 to 1:0.01.

A method according to any of the above embodiments wherein the suitable reaction conditions (for enzymatic glucan synthesis) comprises a reaction temperature between 0° C. and 45° C.

A method according to any of the above embodiments wherein the suitable reaction conditions comprise a pH range of 4 to 8.

A method according to any of the above embodiments wherein a buffer is present and is selected from the group consisting of phosphate, pyrophosphate, bicarbonate, acetate, or citrate. Also provided are methods according to any of the embodiments wherein said at least one glucosyltransferase comprises an amino acid sequence is SEQ ID NOs: 3, 5, 17, 19, 88, 90, 92, 94, 96, 98, 100, 102, 104, 106, 108, 110, 112, or a combination thereof. In other embodiments, the at least one glucosyl transferase is GTF-S, a truncation thereof, a homolog thereof, or a trucation of a homolog thereof. In another embodiment, the glucosyltransferase is a truncation of GTF-S and comprises the amino acid sequence of SEQ ID NO: 126. In other embodiments, the glucosyl transferase is a truncation of a homolog of GTF-S and comprises an amino acid sequence is SEQ ID NO: 118, 120, 122, 124, 128, 130, 132, 134, 136, 138, 140, 142, 144, 146, 146, 148, 150, 152 or a combination thereof. A method according to any of the above embodiments wherein said at least one α-glucanohydrolase is selected from the group consisting of SEQ ID NOs 21, 22, 24, 27, 54, 56, 58, and any combination thereof.

A method according to any of the above embodiments wherein said at least one glucosyltransferase and said at least one α-glucanohydrolase is selected from the combinations of:

1. glucosyltransferase GTF7527 (SEQ ID NO: 3, 5 or a combination thereof) and mutanase MUT3325 (SEQ ID NO: 27)
2. glucosyltransferase GTF7527 (SEQ ID NO: 3, 5 or a combination thereof) and mutanase MUT3264 (SEQ ID NO: 21, 22, 24 or any combination thereof);
3. glucosyltransferase GTF0459 (SEQ ID NO: 17, 19 or a combination thereof) and mutanase MUT3325 (SEQ ID NO: 27); and
4. glucosyltransferase GTF0459 (SEQ ID NO: 17, 19 or a combination thereof) and mutanase MUT3264 (SEQ ID NO: 21, 22, 24 or any combination thereof).

In another embodiment, a method to produce the soluble α-glucan oligomer/polymer composition of the first embodiment is provided comprising:

a. providing a set of reaction components comprising:
   i. sucrose;
   ii. at least one glucosyltransferase capable of catalyzing the synthesis of glucan polymers having one or more α-(1, 3) glycosidic linkages;
   iii. optionally one more acceptors;
b. combining under suitable aqueous reaction conditions the set of reaction components of (a) to form a single reaction mixture, wherein the reaction conditions comprises a reaction temperature greater than 45° C. and less than 55° C., preferably 47° C. to 53° C., whereby a product mixture comprising glucose oligomers is formed;
c. isolating the soluble α-glucan oligomer/polymer composition of claim 1 from the product mixture comprising glucose oligomers; and
d. optionally concentrating the soluble α-glucan oligomer/polymer composition.

A method according to any of the above embodiments wherein the glucosyltransferase is obtained from *Streptococcus salivarius*, preferably having an amino acid sequence selected from SEQ ID NOs: 3, 5 and a combination thereof.

A product produced by any of the above process embodiments; preferably wherein the product produced is the soluble α-glucan oligomer/polymer composition of the first embodiment.

EXAMPLES

Unless defined otherwise herein, all technical and scientific terms used herein have the same meaning as commonly understood by one of ordinary skill in the art to which this disclosure belongs. Singleton, et al., *DICTIONARY OF MICROBIOLOGY AND MOLECULAR BIOLOGY,* 2D ED., John Wiley and Sons, New York (1994), and Hale & Marham, *THE HARPER COLLINS DICTIONARY OF BIOLOGY*, Harper Perennial, N.Y. (1991) provide one of skill with a general dictionary of many of the terms used in this disclosure.

The present disclosure is further defined in the following Examples. It should be understood that these Examples, while indicating preferred embodiments of the disclosure, are given by way of illustration only. From the above discussion and these Examples, one skilled in the art can ascertain the essential characteristics of this disclosure, and without departing from the spirit and scope thereof, can make various changes and modifications of the disclosure to adapt it to various uses and conditions.

The meaning of abbreviations is as follows: "sec" or "s" means second(s), "ms" mean milliseconds, "min" means minute(s), "h" or "hr" means hour(s), "μL" means microliter (s), "mL" means milliliter(s), "L" means liter(s); "mL/min" is milliliters per minute; "μg/mL" is microgram(s) per milliliter(s); "LB" is Luria broth; "μm" is micrometers, "nm" is nanometers; "OD" is optical density; "IPTG" is isopropyl-β-D-thio-galactoside; "g" is gravitational force; "mM" is millimolar; "SDS-PAGE" is sodium dodecyl sulfate polyacrylamide; "mg/mL" is milligrams per milliliters; "N" is normal; "w/v" is weight for volume; "DTT" is dithiothreitol; "BCA" is bicinchoninic acid; "DMAc" is N,N'-dimethyl acetamide; "LiCl" is Lithium chloride; "NMR" is nuclear magnetic resonance; "DMSO" is dimethylsulfoxide; "SEC" is size exclusion chromatography; "GI" or "gi" means GenInfo Identifier, a system used by GENBANK® and other sequence databases to uniquely identify polynucleotide and/or polypeptide sequences within the respective databases; "DPx" means glucan degree of polymerization having "x" units in length; "ATCC" means American Type Culture Collection (Manassas, VA), "DSMZ" and "DSM" will refer to Leibniz Institute DSMZ-German Collection of Microorganisms and Cell Cultures, (Braunschweig, Germany); "EELA" is the Finish Food Safety Authority (Helsinki, Finland;) "CCUG" refer to the Culture Collection, University of Göteborg, Sweden; "Suc." means sucrose; "Gluc." means glucose; "Fruc." means fructose; "Leuc." means leucrose; and "Rxn" means reaction.

General Methods

Standard recombinant DNA and molecular cloning techniques used herein are well known in the art and are described by Sambrook, J. and Russell, D., *Molecular Cloning: A Laboratory Manual*, Third Edition, Cold Spring Harbor Laboratory Press, Cold Spring Harbor, NY (2001); and by Silhavy, T. J., Bennan, M. L. and Enquist, L. W., *Experiments with Gene Fusions*, Cold Spring Harbor Laboratory Cold Press Spring Harbor, NY (1984); and by Ausubel, F. M. et. al., *Short Protocols in Molecular Biology*, $5^{th}$ Ed. Current Protocols and John Wiley and Sons, Inc., N.Y., 2002.

Materials and methods suitable for the maintenance and growth of bacterial cultures are also well known in the art. Techniques suitable for use in the following Examples may be found in *Manual of Methods for General Bacteriology*, Phillipp Gerhardt, R. G. E. Murray, Ralph N. Costilow, Eugene W. Nester, Willis A. Wood, Noel R. Krieg and G. Briggs Phillips, eds., (American Society for Microbiology Press, Washington, DC (1994)), *Biotechnology: A Textbook of Industrial Microbiology* by Wulf Crueger and Anneliese Crueger (authors), Second Edition, (Sinauer Associates, Inc., Sunderland, MA (1990)), and *Manual of Industrial Microbiology and Biotechnology*, Third Edition, Richard H. Baltz, Arnold L. Demain, and Julian E. Davis (Editors), (American Society of Microbiology Press, Washington, DC (2010).

All reagents, restriction enzymes and materials used for the growth and maintenance of bacterial cells were obtained from BD Diagnostic Systems (Sparks, MD), Invitrogen/Life Technologies Corp. (Carlsbad, CA), Life Technologies (Rockville, MD), QIAGEN (Valencia, CA), Sigma-Aldrich Chemical Company (St. Louis, MO) or Pierce Chemical Co. (A division of Thermo Fisher Scientific Inc., Rockford, IL) unless otherwise specified. IPTG, (cat #16758) and triphenyltetrazolium chloride were obtained from the Sigma Co., (St. Louis, MO). Bellco spin flask was from the Bellco Co., (Vineland, NJ). LB medium was from Becton, Dickinson and Company (Franklin Lakes, New Jersey). BCA protein assay was from Sigma-Aldrich (St Louis, MO).

Growth of Recombinant *E. coli* Strains for Production of GTF Enzymes

*Escherichia coli* strains expressing a functional GTF enzyme were grown in shake flask using LB medium with ampicillin (100 μg/mL) at 37° C. and 220 rpm to $OD_{600\ nm}$=0.4-0.5, at which time isopropyl-β-D-thio-galactoside (IPTG) was added to a final concentration of 0.5 mM and incubation continued for 2-4 hr at 37° C. Cells were harvested by centrifugation at 5,000×g for 15 min and resuspended (20%-25% wet cell weight/v) in 50 mM phosphate buffer pH 7.0). Resuspended cells were passed through a French Pressure Cell (SLM Instruments, Rochester, NY) twice to ensure >95% cell lysis. Cell lysate was centrifuged for 30 min at 12,000×g and 4° C. The resulting supernatant (cell extract) was analyzed by the BCA protein assay and SDS-PAGE to confirm expression of the GTF enzyme, and the cell extract was stored at −80° C.

pHYT Vector

The pHYT vector backbone is a replicative *Bacillus subtilis* expression plasmid containing the *Bacillus subtilis* aprE promoter. It was derived from the *Escherichia coli-Bacillus subtilis* shuttle vector pHY320PLK (GENBANK® Accession No. D00946 and is commercially available from Takara Bio Inc. (Otsu, Japan)). The replication origin for *Escherichia coli* and ampicillin resistance gene are from pACYC177 (GENBANK® X06402 and is commercially available from New England Biolabs Inc., Ipswich, MA). The replication origin for *Bacillus subtilis* and tetracycline resistance gene were from pAMalpha-1 (Francia et al., *J Bacteriol.* 2002 September; 184(18):5187-93)).

To construct pHYT, a terminator sequence: 5'-ATAAAAAACGCTCGGTTGCCGCCGGGCGTTTTT-TAT-3' (SEQ ID NO: 1) from phage lambda was inserted after the tetracycline resistance gene.

The entire expression cassette (EcoRI-BamHI fragment) containing the aprE promoter—AprE signal peptide sequence-coding sequence encoding the enzyme of interest (e.g., coding sequences for various GTFs)—BPN' terminator was cloned into the EcoRI and HindIII sites of pHYT using a BamHI-HindIII linker that destroyed the HindIII site. The linker sequence is 5'-GGATCCTGACTGCCT-GAGCTT-3' (SEQ ID NO: 2). The aprE promoter and AprE signal peptide sequence (SEQ ID NO: 25) are native to *Bacillus subtilis*. The BPN' terminator is from subtilisin of *Bacillus amyloliquefaciens*. In the case when native signal peptide was used, the AprE signal peptide was replaced with the native signal peptide of the expressed gene.

Biolistic Transformation of *T. reesei*

A *Trichoderma reesei* spore suspension was spread onto the center ~6 cm diameter of an acetamidase transformation plate (150 μL of a $5\times10^7$-$5\times10^8$ spore/mL suspension). The plate was then air dried in a biological hood. The stopping screens (BioRad 165-2336) and the macrocarrier holders (BioRad 1652322) were soaked in 70% ethanol and air dried. DRIERITE® desiccant (calcium sulfate desiccant; W. A. Hammond DRIERITE® Company, Xenia, OH) was placed in small Petri dishes (6 cm Pyrex) and overlaid with Whatman filter paper (GE Healthcare Bio-Sciences, Pittsburgh, PA). The macrocarrier holder containing the macrocarrier (BioRad 165-2335; Bio-Rad Laboratories, Hercules, CA) was placed flatly on top of the filter paper and the Petri dish lid replaced. A tungsten particle suspension was prepared by adding 60 mg tungsten M-10 particles (microcarrier, 0.7 micron, BioRad #1652266, Bio-Rad Laboratories) to an Eppendorf tube. Ethanol (1 mL) (100%) was added. The tungsten was vortexed in the ethanol solution and allowed to soak for 15 minutes. The Eppendorf tube was microfuged briefly at maximum speed to pellet the tungsten. The ethanol was decanted and washed three times with sterile distilled water. After the water wash was decanted the third time, the tungsten was resuspended in 1 mL of sterile 50% glycerol. The transformation reaction was prepared by adding 25 μL suspended tungsten to a 1.5 mL-Eppendorf tube for each transformation. Subsequent additions were made in order, 2 μL DNA pTrex3 expression vectors (SEQ ID NO: 3; see U.S. Pat. No. 6,426,410), 25 μL 2.5M CaCl2, 10 μL 0.1M spermidine. The reaction was vortexed continuously for 5-10 minutes, keeping the tungsten suspended. The Eppendorf tube was then microfuged briefly and decanted. The tungsten pellet was washed with 200 μL of 70% ethanol, microfuged briefly to pellet and decanted. The pellet was washed with 200 μL of 100% ethanol, microfuged briefly to pellet, and decanted. The tungsten pellet was resuspended in 24 μL 100% ethanol. The Eppendorf tube was placed in an ultrasonic water bath for 15 seconds and 8 μL aliquots were transferred onto the center of the desiccated macrocarriers. The macrocarriers were left to dry in the desiccated Petri dishes.

A Helium tank was turned on to 1500 psi (~10.3 MPa). 1100 psi (~7.58 MPa) rupture discs (BioRad 165-2329) were used in the Model PDS-1000/He™ BIOLISTIC® Particle Delivery System (BioRad). When the tungsten solution was dry, a stopping screen and the macrocarrier holder were inserted into the PDS-1000. An acetamidase plate, containing the target *T. reesei* spores, was placed 6 cm below the stopping screen. A vacuum of 29 inches Hg (~98.2 kPa) was pulled on the chamber and held. The He BIOLISTIC® Particle Delivery System was fired. The chamber was vented and the acetamidase plate removed for incubation at 28° C. until colonies appeared (5 days).

Modified amdS Biolistic Agar (MABA) Per Liter
- Part I, make in 500 mL distilled water ($dH_2O$)
- 1000× salts 1 mL
- Noble agar 20 g
- pH to 6.0, autoclave
- Part II, make in 500 mL $dH_2O$
- Acetamide 0.6 g
- CsCl 1.68 g
- Glucose 20 g
- $KH_2PO_4$15 g
- $MgSO_4 \cdot 7H_2O$ 0.6 g
- $CaCl_2 \cdot 2H_2O$ 0.6 g
- pH to 4.5, 0.2 micron filter sterilize; leave in 50° C. oven to warm, add to agar, mix, pour plates. Stored at room temperature (~21° C.)

1000× Salts Per Liter
- $FeSO_4 \cdot 7H_2O$ 5 g
- $MnSO_4 \cdot H_2O$ 1.6 g
- $ZnSO_4 \cdot 7H_2O$ 1.4 g
- $CoCl_2 \cdot 6H_2O$ 1 g
- Bring up to 1 L $dH_2O$.
- 0.2 micron filter sterilize Determination of the Glucosyltransferase Activity Glucosyltransferase activity assay was performed by incubating 1-10% (v/v) crude protein extract containing GTF enzyme with 200 g/L sucrose in 25 mM or 50 mM sodium acetate buffer at pH 5.5 in the presence or absence of 25 g/L dextran (MW ~1500, Sigma-Aldrich, Cat. #31394) at 37° C. and 125 rpm orbital shaking. One aliquot of reaction mixture was withdrawn at 1 h, 2 h and 3 h and heated at 90° C. for 5 min to inactivate the GTF. The insoluble material was removed by centrifugation at 13,000×g for 5 min, followed by filtration through 0.2 μm RC (regenerated cellulose) membrane. The resulting filtrate was analyzed by HPLC using two Aminex HPX-87C columns series at 85° C. (Bio-Rad, Hercules, CA) to quantify sucrose concentration. The sucrose concentration at each time point was plotted against the reaction time and the initial reaction rate was determined from the slope of the linear plot. One unit of GTF activity was defined as the amount of enzyme needed to consume one micromole of sucrose in one minute under the assay condition.

Determination of the α-Glucanohydrolase Activity

Insoluble mutan polymers required for determining mutanase activity were prepared using secreted enzymes produced by *Streptococcus sobrinus* ATCC® 33478™. Specifically, one loop of glycerol stock of *S. sobrinus* ATCC® 33478™ was streaked on a BHI agar plate (Brain Heart Infusion agar, Teknova, Hollister, CA), and the plate was incubated at 37° C. for 2 days; A few colonies were picked using a loop to inoculate 2×100 mL BHI liquid medium in the original medium bottle from Teknova, and the culture was incubated at 37° C., static for 24 h. The resulting cells were removed by centrifugation and the resulting supernatant was filtered through 0.2 μm sterile filter; 2×101 mL of filtrate was collected. To the filtrate was added 2×11.2 mL of 200 g/L sucrose (final sucrose 20 g/L). The reaction was incubated at 37° C., with no agitation for 67 h. The resulting polysaccharide polymers were collected by centrifugation at 5000×g for 10 min. The supernatant was carefully decanted. The insoluble polymers were washed 4 times with 40 mL of sterile water. The resulting mutan polymers were lyophilized for 48 h. Mutan polymer (390 mg) was suspended in 39 mL of sterile water to make suspension of 10 mg/mL. The mutan suspension was homogenized by sonication (40% amplitude until large lumps disappear, ~10 min in total). The homogenized suspension was aliquoted and stored at 4° C.

A mutanase assay was initiated by incubating an appropriate amount of enzyme with 0.5 mg/mL mutan polymer (prepared as described above) in 25 mM KOAc buffer at pH 5.5 and 37° C. At various time points, an aliquot of reaction mixture was withdrawn and quenched with equal volume of 100 mM glycine buffer (pH 10). The insoluble material in each quenched sample was removed by centrifugation at 14,000×g for 5 min. The reducing ends of oligosaccharide and polysaccharide polymer produced at each time point were quantified by the p-hydroxybenzoic acid hydrazide solution (PAHBAH) assay (Lever M., *Anal. Biochem.*, (1972) 47:273-279) and the initial rate was determined from the slope of the linear plot of the first three or four time points of the time course. The PAHBAH assay was performed by adding 10 μL of reaction sample supernatant to 100 μL of PAHBAH working solution and heated at 95° C. for 5 min. The working solution was prepared by mixing one part of reagent A (0.05 g/mL p-hydroxy benzoic acid hydrazide and 5% by volume of concentrated hydrochloric acid) and four parts of reagent B (0.05 g/mL NaOH, 0.2 g/mL sodium potassium tartrate). The absorption at 410 nm was recorded and the concentration of the reducing ends was calculated by subtracting appropriate background absorption and using a standard curve generated with various concentrations of glucose as standards. A Unit of mutanase activity is defined as the conversion of 1 micromole/min of mutan polymer at pH 5.5 and 37° C., determined by measuring the increase in reducting ends as described above.

Determination of Glycosidic Linkages

One-dimensional $^1H$ NMR data were acquired on a Varian Unity Inova system (Agilent Technologies, Santa Clara, CA) operating at 500 MHz using a high sensitivity cryoprobe. Water suppression was obtained by carefully placing the observe transmitter frequency on resonance for the residual water signal in a "presat" experiment, and then using the "tnnoesy" experiment with a full phase cycle (multiple of 32) and a mix time of 10 ms.

Typically, dried samples were taken up in 1.0 mL of $D_2O$ and sonicated for 30 min. From the soluble portion of the sample, 100 μL was added to a 5 mm NMR tube along with 350 μL $D_2O$ and 100 μL of $D_2O$ containing 15.3 mM DSS (4,4-dimethyl-4-silapentane-1-sulfonic acid sodium salt) as internal reference and 0.29% $NaN_3$ as bactericide. The abundance of each type of anomeric linkage was measured by the integrating the peak area at the corresponding chemical shift. The percentage of each type of anomeric linkage was calculated from the abundance of the particular linkage and the total abundance anomeric linkages from oligosaccharides.

Methylation Analysis

The distribution of glucosidic linkages in glucans was determined by a well-known technique generally named "methylation analysis," or "partial methylation analysis" (see: F. A. Pettolino, et al., *Nature Protocols*, (2012) 7(9): 1590-1607). The technique has a number of minor variations but always includes: 1. methylation of all free hydroxyl groups of the glucose units, 2. hydrolysis of the methylated glucan to individual monomer units, 3. reductive ring-opening to eliminate anomers and create methylated glucitols; the anomeric carbon is typically tagged with a deuterium atom to create distinctive mass spectra, 4. acetylation of the free hydroxyl groups (created by hydrolysis and ring opening) to create partially methylated glucitol acetates, also known as partially methylated products, 5. analysis of the resulting partially methylated products by gas chromatography coupled to mass spectrometry and/or flame ionization detection.

The partially methylated products include non-reducing terminal glucose units, linked units and branching points. The individual products are identified by retention time and mass spectrometry. The distribution of the partially-methylated products is the percentage (area %) of each product in the total peak area of all partially methylated products. The gas chromatographic conditions were as follows: RTx-225 column (30 m×250 μm ID×0.1 μm film thickness, Restek Corporation, Bellefonte, PA, USA), helium carrier gas (0.9 mL/min constant flow rate), oven temperature program starting at 80° C. (hold for 2 min) then 30° C./min to 170° C. (hold for 0 min) then 4° C./min to 240° C. (hold for 25 min), 1 μL injection volume (split 5:1), detection using electron impact mass spectrometry (full scan mode)

Viscosity Measurement

The viscosity of 12 wt % aqueous solutions of soluble oligomer/polymer was measured using a TA Instruments AR-G2 controlled-stress rotational rheometer (TA Instruments—Waters, LLC, New Castle, DE) equipped with a cone and plate geometry. The geometry consists of a 40 mm 2° upper cone and a peltier lower plate, both with smooth surfaces. An environmental chamber equipped with a water-saturated sponge was used to minimize solvent (water) evaporation during the test. The viscosity was measured at 20° C. The peltier was set to the desired temperature and 0.65 mL of sample was loaded onto the plate using an Eppendorf pipette (Eppendorf North America, Hauppauge, NY). The cone was lowered to a gap of 50 μm between the bottom of the cone and the plate. The sample was thermally equilibrated for 3 minutes. A shear rate sweep was performed over a shear rate range of 500-10 $s^{-1}$. Sample stability was confirmed by running repeat shear rate points at the end of the test.

Determination of the Concentration of Sucrose, Glucose, Fructose and Leucrose

Sucrose, glucose, fructose, and leucrose were quantitated by HPLC with two tandem Aminex HPX-87C Columns (Bio-Rad, Hercules, CA). Chromatographic conditions used were 85° C. at column and detector compartments, 40° C. at sample and injector compartment, flow rate of 0.6 mL/min, and injection volume of 10 μL. Software packages used for data reduction were EMPOWER™ version 3 from Waters (Waters Corp., Milford, MA). Calibrations were performed with various concentrations of standards for each individual sugar.

Determination of the Concentration of Oligosaccharides

Soluble oligosaccharides were quantitated by HPLC with two tandem Aminex HPX-42A columns (Bio-Rad). Chromatographic conditions used were 85° C. column temperature and 40° C. detector temperature, water as mobile phase (flow rate of 0.6 mL/min), and injection volume of 10 μL. Software package used for data reduction was EMPOWER™ version 3 from Waters Corp. Oligosaccharide samples from DP2 to DP7 were obtained from Sigma-Aldrich: maltoheptaose (DP7, Cat. #47872), maltohexanose (DP6, Cat. #47873), maltopentose (DP5, Cat. #47876), maltotetraose (DP4, Cat. #47877), isomaltotriose (DP3, Cat. #47884) and maltose (DP2, Cat. #47288). Calibration was performed for each individual oligosaccharide with various concentrations of the standard.

Purification of Soluble Oligosaccharide

Soluble oligosaccharide present in product mixtures produced by the conversion of sucrose using glucosyltransferase enzymes with or without added mutanases as described in the following examples were purified and isolated by size-exclusion column chromatography (SEC). In a typical procedure, product mixtures were heat-treated at 60° C. to 90° C. for between 15 min and 30 min and then centrifuged at 4000 rpm for 10 min. The resulting supernatant was injected onto an ÄKTAprime purification system (SEC; GE Healthcare Life Sciences) (10 mL-50 mL injection volume) connected to a GE HK 50/60 column packed with 1.1 L of Bio-Gel P2 Gel (Bio-Rad, Fine 45-90 μm) using water as eluent at 0.7 mL/min. The SEC fractions (~5 mL per tube) were analyzed by HPLC for oligosaccharides using a Bio-Rad HPX-47A column. Fractions containing >DP2 oligosaccharides were combined and the soluble oligomer/polymer isolated by rotary evaporation of the combined fractions to produce a solution containing between 3% and 6% (w/w) solids, where the resulting solution was lyophilized to produce the soluble oligomer/polymer as a solid product.

Example 1

Construction of Glucosyltransferase (GTF-J) Expression Strain *E. coli* MG1655/pMP52

The polynucleotide sequence encoding the mature glucosyltransferase enzyme (gtf-J; EC 2.4.1.5; SEQ ID NO: 3) from *Streptococcus salivarius* (ATCC® 25975™) as reported in GENBANK® (accession M64111.1; gi:47527) was synthesized using codons optimized for expression in *E. coli* (DNA 2.0, Menlo Park, CA). The nucleic acid product (SEQ ID NO: 4) encoding the mature enzyme (i.e., signal peptide removed and a start codon added; SEQ ID NO: 5) was subcloned into PJEXPRESS404® (DNA 2.0, Menlo Park CA) to generate the plasmid identified as pMP52. The plasmid pMP52 was used to transform *E. coli* MG1655 (ATCC® 47076™) to generate the strain identified as MG1655/pMP52. All procedures used for construction of the glucosyltransferase enzyme expression strain are well known in the art and can be performed by individuals skilled in the relevant art without undue experimentation.

Example 2

Production Of Recombinant Gtf-J In Fermentation

Production of the recombinant mature glucosyltransferase Gtf-J in a fermentor was initiated by preparing a pre-seed culture of the *E. coli* strain MG1655/pMP52, expressing the mature Gtf-J enzyme (GI:47527; "GTF7527"; SEQ ID NO: 5), constructed as described in Example 1. A 10-mL aliquot of the seed medium was added into a 125-mL disposable baffled flask and was inoculated with a 1.0 mL culture of *E. coli* MG1655/pMP52 in 20% glycerol. This culture was allowed to grow at 37° C. while shaking at 300 rpm for 3 h.

A seed culture for starting the fermentor was prepared by charging a 2-L shake flask with 0.5 L of the seed medium. 1.0 mL of the pre-seed culture was aseptically transferred into 0.5 L seed medium in the flask and cultivated at 37° C. and 300 rpm for 5 h. The seed culture was transferred at optical density >2 ($OD_{550}$) to a 14-L fermentor (Braun, Perth Amboy, NJ) containing 8 L of the fermentor medium described above at 37° C.

Cells of *E. coli* MG1655/pMP52 were allowed to grow in the fermentor and glucose feed (50% w/w glucose solution containing 1% w/w $MgSO_4 \cdot 7H_2O$) was initiated when glucose concentration in the medium decreased to 0.5 g/L. The feed was started at 0.36 grams feed per minute (g feed/min) and increased progressively each hour to 0.42, 0.49, 0.57, 0.66, 0.77, 0.90, 1.04, 1.21, 1.41 1.63, 1.92, 2.2 g feed/min respectively. The rate remained constant afterwards. Glucose concentration in the medium was monitored using an YSI glucose analyzer (YSI, Yellow Springs, Ohio). When glucose concentration exceeded 0.1 g/L the feed rate was decreased or stopped temporarily. Induction of glucosyltransferase enzyme activity was initiated, when cells reached an $OD_{550}$ of 70, with the addition of 9 mL of 0.5 M IPTG (isopropyl β-D-1-thiogalacto-pyranoside). The dissolved oxygen (DO) concentration was controlled at 25% of air saturation. The DO was controlled first by impeller agitation rate (400 to 1200 rpm) and later by aeration rate (2 to 10 standard liters per minute, slpm). The pH was controlled at 6.8. $NH_4OH$ (14.5% weight/volume, w/v) and $H_2SO_4$ (20% w/v) were used for pH control. The back pressure was maintained at 0.5 bar. At various intervals (20, 25 and 30 hours), 5 mL of Suppressor 7153 antifoam (Cognis Corporation, Cincinnati, OH) was added into the fermentor to suppress foaming. Cells were harvested by centrifugation 8 h post IPTG addition and were stored at −80° C. as a cell paste.

Example 3

Preparation of Gtf-J Crude Protein Extract from Cell Paste

The cell paste obtained as described in Example 2 was suspended at 150 g/L in 50 mM potassium phosphate buffer (pH 7.2) to prepare a slurry. The slurry was homogenized at 12,000 psi (~82.7 MPa; Rannie-type machine, APV-1000 or APV 16.56; SPX Corp., Charlotte, North Carolina) and the homogenate chilled to 4° C. With moderately vigorous stirring, 50 g of a floc solution (Aldrich no. 409138, 5% in 50 mM sodium phosphate buffer pH 7.0) was added per liter of cell homogenate. Agitation was reduced to light stirring for 15 minutes. The cell homogenate was then clarified by centrifugation at 4500 rpm for 3 hours at 5-10° C. Supernatant, containing Gtf-J enzyme in the crude protein extract, was concentrated (approximately 5×) with a 30 kilodalton (kDa) cut-off membrane. The concentration of total soluble protein in the Gtf-J crude protein extract was determined to be 4-8 g/L using the bicinchoninic acid (BCA) protein assay (Sigma Aldrich).

Example 4

Production Of Gtf-J GI:47527 in *E. coli* TOP10

The plasmid pMP52 (Example 1) was used to transform *E. coli* TOP10 (Life Technologies Corp., Carlsbad, CA) to generate the strain identified as TOP10/pMP52. Growth of the *E. coli* strain TOP10/pMP52 expressing the mature Gtf-J enzyme "GTF7527" (provided as SEQ ID NO: 5) and determination of the GTF activity followed the methods described above.

Example 5

Production of Gtf-L GI:662379 in *E. coli* TOP10

A polynucleotide encoding a truncated version of a glucosyltransferase (Gtf) enzyme identified in GENBANK® as GI:662379 (SEQ ID NO: 6; Gtf-L from *Streptococcus salivarius*) was synthesized using codons optimized for expression in *E. coli* (DNA 2.0, Menlo Park CA). The nucleic acid product (SEQ ID NO: 7) encoding protein "GTF2379" (SEQ ID NO: 8), was subcloned into PJEXPRESS404® (DNA 2.0) to generate the plasmid identified as pMP65. The plasmid pMP65 was used to transform *E. coli* TOP10 (Life Technologies Corp.) to generate the strain identified as TOP10/pMP65. Growth of the *E. coli* strain TOP10/pMP65 expressing the gtf enzyme "2379" (last 4 digits of the respective GI number used) and determination of the GTF activity followed the methods described above.

Example 6

Production of Gtf-B GI:290580544 in *E. coli* TOP10

A polynucleotide encoding a truncated version of a glucosyltransferase enzyme identified in GENBANK® as GI:290580544 (SEQ ID NO: 9; Gtf-B from *Streptococcus mutans* NN2025) was synthesized using codons optimized for expression in *E. coli* (DNA 2.0). The nucleic acid product (SEQ ID NO: 10) encoding protein "GTF0544" (SEQ ID NO: 11) was subcloned into PJEXPRESS404® to generate the plasmid identified as pMP67. The plasmid pMP67 was used to transform *E. coli* TOP10 to generate the strain identified as TOP10/pMP67. Growth of the *E. coli* strain TOP10/pMP67 expressing the Gtf-B enzyme "GTF0544" (SEQ ID NO: 11) and determination of the GTF0544 activity followed the methods described above.

Example 7

Production Of Gtf-I GI:450874 in *E. coli* BL21 DE3

A polynucleotide encoding a glucosyltransferase from *Streptococcus sobrinus*, (ATCC® 27351™) was isolated using polymerase chain reaction (PCR) methods well known in the art. PCR primers were designed based on gene sequence described in GENBANK® accession number BAA14241 and by Abo et al., (*J. Bacteriol*., (1991) 173: 998-996). The 5'-end primer 5'-GGGAATTCCCAGGTTGACGGTAAATATTATTACT-3' (SEQ ID NO: 12) was designed to code for sequence corresponded to bases 466 through 491 of the gtf-I gene. Additionally, the primer contained sequence for an EcoRI restriction enzyme site which was used for cloning purposes.

The 3'-end primer 5'-AGATCTAGTCTTAGTTCCAGCCACGGTACATA-3' (SEQ ID NO: 13) was designed to code for sequence corresponded to the reverse compliment of bases 4749 through 4774 of *S. sobrinus* gene. The reverse PCR primer also included the sequence for an Xbal site, used for cloning purposes. The resulting 4.31 Kb DNA fragment was digested with EcoRI and Xba I restriction enzymes and purified using a Promega PCR Clean-up kit (A9281, Promega Corp., Madison, WI) as recommended by the manufacturer. The DNA fragment was ligated into an *E. coli* protein expression vector (pET24a, Novagen, a divisional of Merck KGaA, Darmstadt, Germany). The ligated reaction was transformed into the BL21 DE3 cell line (New England Biolabs, Ipswich, MA) and plated on solid LB medium (10 g/L, tryptone; 5 g/L yeast extract; 10 g/L NaCl; 14% agar; 100 μg/mL ampicillin) for selection of single colonies.

Transformed *E. coli* BL21 DE3 cells were inoculated to an initial optical density (OD at $600_{nm}$) of 0.025 in LB media and were allowed to grow at 37° C. in an incubator while shaking at 250 rpm. When cultures reached an OD of 0.8-1.0, the gene (SEQ ID NO: 15) encoding the truncated Gtf-I enzyme (SEQ ID NO: 16) was induced by addition of 1 mM IPTG. Induced cultures remained on the shaker and were harvested 3 h post induction. Cells were harvested by centrifugation (25° C., 16,000 rpm) using an Eppendorf centrifuge. Cell pellets were suspended at 0.01 volume in 5.0 mM phosphate buffer (pH 7.0) and cooled to 4° C. on ice. The cells were broken using a bead beater with 0.1 millimeters (mm) silica beads. Cell debris was removed by centrifuged (16,000 rpm for 10 minutes at 4° C.). The crude protein extract (containing soluble Gtf-I ("GTF0874") enzyme) was aliquoted and stored at −80° C.

Example 8

Production of Gtf-I Enzyme GI:450874 in *E. coli* TOP10

The gene encoding a truncated version of a glucosyltransferase enzyme identified in GENBANK® as GI:450874 (SEQ ID NO: 14; Gtf-I from *Streptococcus sobrinus*) was synthesized using codons optimized for expression in *E. coli* (DNA 2.0). The nucleic acid product (SEQ ID NO: 15) encoding the truncated glucosyltransferase ("GTF0874"; SEQ ID NO: 16) was subcloned into PJEXPRESS404® to generate the plasmid identified as pMP53. The plasmid pMP53 was used to transform *E. coli* TOP10 to generate the strain identified as TOP10/pMP53. Growth of the *E. coli* strain TOP10/pMP53 expressing the Gtf-I enzyme "GTF0874" and determination of GTF activity followed the methods described above.

Example 9

Production of Gtf-S Enzyme GI: 495810459 in *E. coli* TOP10

A gene encoding a truncated version of a glucosyltransferase enzyme identified in GENBANK® as GI:495810459 (SEQ ID NO: 17; Gtf-S from *Streptococcus* sp. C150) was synthesized using codons optimized for expression in *E. coli* (DNA 2.0). The nucleic acid product (SEQ ID NO: 18) encoding the truncated glucosyltransferase ("GTF0459"; SEQ ID NO: 19) was subcloned into PJEXPRESS404® to generate the plasmid identified as pMP79. The plasmid pMP79 was used to transform *E. coli* TOP10 to generate the strain identified as TOP10/pMP79. Growth of the *E. coli* strain TOP10/pMP79 expressing the Gtf-S enzyme and determination of the GTF activity followed the methods described above.

Example 10

Production of Gtf-S Enzyme GI: 495810459 in *B. subtilis* BG6006

SG1067-2 is a *Bacillus subtilis* expression strain that expresses a truncated version of the glycosyltransferase Gtf-S ("GTF0459") from *Streptococcus* sp. C150 (GI: 495810459). The *B. subtilis* host BG6006 strain contains 9 protease deletions (amyE::xylRPxylAcomK-ermC, degUHy32, oppA, ΔspoIIE3501, ΔaprE, ΔnprE, Δepr, ΔispA, Δbpr, Δvpr, ΔwprA, Δmpr-ybfJ, ΔnprB). The full length Gtf-A has 1570 amino acids. The N terminal truncated version with 1393 amino acids was originally codon optimized for *E. coli* expression and synthesized by DNA2.0. This N terminal truncated Gtf-S(SEQ ID NO: 19) was subcloned into the NheI and HindIII sites of the replicative *Bacillus* expression pHYT vector under the aprE promoter and fused with the *B. subtilis* AprE signal peptide on the vector. The construct was first transformed into *E. coli* DH10B and selected on LB with ampicillin (100 μg/mL) plates. The confirmed construct pDCQ967 expressing the GTF was then transformed into *B. subtilis* BG6006 and selected on the LB plates with tetracycline (12.5 μg/mL). The resulting *B. subtilis* expression strain SG1067 was purified and one of isolated cultures, SG1067-2, was used as the source of the Gtf-S enzyme. SG1067-2 strain was first grown in LB media containing 10 μg/mL tetracycline, and then subcultured into GrantsII medium containing 12.5 μg/mL tetracycline grown at 37° C. for 2-3 days. The cultures were spun at 15,000 g for 30 min at 4° C. and the supernatant was filtered through 0.22 μm filters. The filtered supernatant containing GTF0459 was aliquoted and frozen at −80° C.

Example 11

Fermentation Of *B. Subtilis* SG1067-2 to Produce Gtf-S GI:495810459

*B. subtilis* SG1067-2 strain (Example 10), expressing GTF0459 (SEQ ID NO: 19), was grown under an aerobic submerged condition by conventional fed-batch fermentation. A nutrient medium contains 0-15% HY-SOY™ (a highly soluble, multi-purpose, enzymatic hydrolysate of soy meal; Kerry Inc., Beloit, WI), 5-25 g/L sodium and potassium phosphate, 0.5-4 g/L magnesium sulfate, and citric acid, ferrous sulfate and manganese sulfate. An antifoam agent, FOAM BLAST® 882 (a food grade polyether polyol defoamer aid; Emerald Performance Materials, LLC, Cuyahoga Falls, OH), of 3-5 mL/L was added to control foaming. 2-L fermentation was fed with 50% w/w glucose feed when initial glucose in batch was non-detectable. The glucose feed rate was ramped over several hours. The fermentation was controlled at 37° C. and 20% DO, and initiated at the initial agitation of 400 rpm. The pH was controlled at 7.2 using 50% v/v ammonium hydroxide. Fermentation parameters such as pH, temperature, airflow, DO % were monitored throughout the entire 2-day fermentation run. The culture broth was harvested at the end of run and centrifuged at 5° C. to obtain supernatant. The supernatant containing GTF0459 was then frozen and stored at −80° C.

Example 11A

Construction of *Bacillus subtilis* Strains Expressing Homolog Genes of GTF0459

A search was carried out to identify sequences homologous to GTF0459. Beginning with the GTF0459 sequence, homologous sequences were identified by carrying out a BLAST search against the non-redundant NCBI protein database as of Sep. 8, 2014. The BLAST run identified about 1100 putative homologs using an e-value cutoff of 1e-10. After filtering for alignments of at least 1000 amino acids in length and sorting based on percentage amino acid sequence identity, 13 homologs were found which were closely related, i.e., had greater than 90% amino acid sequence identity, to GTF0459. The identified homologs were then aligned to the GTF0459 sequence by using CLUSTALW, a standard sequence alignment package for aligning very highly related sequences. The homologous sequences are around 96-97% identical to the amino acid sequence of GTF0459 in the aligned region of 1570 residues. The aligned region extends from amino acid position 1 to 1570 in GTF0459 and positions 1 to 1581 in the GTF0459 homologs. Beyond the 13 identified GTF0459 homologs, the next closest proteins share only about 55% amino acid sequence identity in the aligned region to GTF0459 or any of the 13 identified homologs. The DNA sequences encoding N terminal variable region truncated proteins of GTF0459 and the homologs (SEQ ID NOs. 86 and the odd numbered SEQ ID NOs between 87 and 111) and two non-homologs (<54% aa sequence identity) (SEQ ID NOs. 113, 115) as provided in the table 1 below were synthesized by Genscript. The synthetic genes were cloned into the NheI and HindIII sites of the *Bacillus subtilis* integrative expression plasmid p4JH under the aprE promoter and fused with the *B. subtilis* AprE signal peptide on the vector. In some cases, they were cloned into the SpeI and HindIII sites of the *Bacillus subtilis* integrative expression plasmid p4JH under the aprE promoter without a signal peptide. The constructs were first transformed into *E. coli* DH10B and selected on LB with ampicillin (100 μg/ml) plates. The confirmed constructs expressing the particular GTFs were then transformed into *B. subtilis* host containing 9 protease deletions (amyE::xylRPxylAcomK-ermC, degUHy32, oppA, ΔspoIIE3501, ΔaprE, ΔnprE, Δepr, ΔispA, Δbpr, Δvpr, ΔwprA, Δmpr-ybfJ, ΔnprB) and selected on the LB plates with chloramphenicol (5 ug/ml). The colonies grown on LB plates with 5 μg/ml chloramphenicol were streaked several times onto LB plates with 25 μg/ml chloramphenicol. The resulting *B. subtilis* expression strains were grown in LB medium with 5 μg/ml chloramphenicol first and then subcultured into GrantsII medium grown at 30° C. for 2-3 days. The cultures were spun at 15,000 g for 30 min at 4° C. and the supernatants were filtered through 0.22 um filters. The filtered supernatants were aliquoted and frozen at −80° C.

TABLE 1

GTF0459 and sequences identified during homolog search (GTF numbering based on last four digits of GI number)

| GI number | New GI number | % identity | Source organisms | DNA seq SEQ ID | aa seq SEQ ID |
|---|---|---|---|---|---|
| 322373279 | 495810459; 321278321 | 100.00 | *Streptococcus* sp. C150 | 86 | 19 |
| 488980470 | | 97.41 | *Streptococcus salivarius* K12 | 87 | 88 |
| 488977317 | | 97.56 | *Streptococcus salivarius* PS4 | 89 | 90 |
| 544721645 | | 97.13 | *Streptococcus* sp. HSISS3 | 91 | 92 |
| 544716099 | | 97.27 | *Streptococcus* sp. HSISS2 | 93 | 94 |
| 660358467 | | 96.98 | *Streptococcus salivarius* NU10 | 95 | 96 |
| 340398487 | 503756246 | 96.77 | *Streptococcus salivarius* CCHSS3 | 97 | 98 |
| 490286549 | | 96.41 | *Streptococcus salivarius* M18 | 99 | 100 |
| 544713879 | | 96.62 | *Streptococcus* sp. HSISS4 | 101 | 102 |
| 488974336 | | 96.77 | *Streptococcus salivarius* SK126 | 103 | 104 |
| 387784491 | 504447649 | 96.34 | *Streptococcus salivarius* JIM8777 | 105 | 106 |
| 573493808 | | 96.26 | *Streptococcus* sp. SR4 | 107 | 108 |
| 387760974 | 504445794 | 96.12 | *Streptococcus salivarius* 57.I | 109 | 110 |
| 576980060 | | 96.12 | *Streptococcus* sp. ACS2 | 111 | 112 |
| 495810487 | | 53 | *Streptococcus salivarius* PS4 | 113 | 114 |
| 440355360 | | 48.02 | *Streptococcus mutans* JP9-4 | 115 | 116 |

Example 11B

Construction of *Bacillus subtilis* Strains Expressing C-Terminal Truncations of GTF0459 Homolog Genes Glucosyltransferases usually contain an N terminal variable domain, a middle catalytic domain, and a C-terminal domain containing multiple glucan-binding domains. The GTF0459 homologs identified and expressed in Example 11A all contained an N terminal variable region truncation. This example describes the construction of *Bacillus subtilis* strains expressing individual C-terminal truncations of GTF0459 and GTF0459 homologs (as identified by the last four digits in the GI numbers in table 1 above).

T1 (extending from amino acid positions 179-1086), T2 (extending from amino acid positions 179-1125), T4 (extending from amino acid positions 179-1182), T5 (extending from amino acid positions 179-1183), and T6 (extending from amino acid positions 179-1191) C-terminal truncations were made from the GTF0974, GTF4336, and GTF4491 glucosyltransferases containing N-terminal trunctations as listed in table 1 in Example 11A. A T5 and T6 truncation of GTF0459 (GTF3279) was also produced. A T5 truncation was also made from GTF3808. DNA and protein SEQ ID NOs for the sequences of the truncations as provided in the sequence listing are listed in table 2 below. The DNA fragments encoding GTF0459, the N-terminal truncated homologs, and the C-terminal truncations were PCR amplified from the synthetic gene plasmids by Genscript and cloned into the SpeI and HindIII sites of the *Bacillus subtilis* integrative expression plasmid p4JH under the aprE promoter without a signal peptide. The constructs were first transformed into *E. coli* DH10B and selected on LB with ampicillin (100 μg/ml) plates. The confirmed constructs expressing the particular GTFs were then transformed into *B. subtilis* host containing 9 protease deletions (amyE::xylRPxylAcomK-ermC, degUHy32, oppA, ΔspoIIE3501, ΔaprE, ΔnprE, Δepr, ΔispA, Δbpr, Δvpr, ΔwprA, Δmpr-ybfJ, ΔnprB) and selected on the LB plates with chloramphenicol (CM, 5 μg/ml). The colonies grown on LB plates with 5 μg/ml chloramphenicol were streaked several times onto LB plates with 25 μg/ml chloramphenicol. The resulting *B. subtilis* expression strains were grown in LB medium with 5 μg/ml chloramphenicol first and then subcultured into GrantsII medium grown at 30° C. for 2-3 days. The cultures were spun at 15,000 g for 30 min at 4° C. and the supernatants were filtered through 0.22 um filters. The filtered supernatants were aliquoted and frozen at −80° C.

GTF activity of the strains was analyzed by PAHBAH assay in three separate experiments. Due to minor variations between the experiments, Table 2 lists the activity of the truncated enzymes in the *B. subtilis* host along with the experiment in which the activity was measured. Most of the T1, T2, and T6 truncations decreased the activity of the enzymes, whereas the T4 and T5 C-terminal truncations retained similar activity relative to the respective N terminal-only truncations (NT). The homologs and C-terminal truncations of the homologs maintained activity and produced a similar soluble α-glucan fiber to GTF0459 (see Examples 39A and 39B), suggesting that residues within the catalytic domain retained in the truncations may be a characteristic of enzymes capable of producing the fiber. To identify specific amino acid residues within the catalytic domain that may be involved in producing the soluble α-glucan fiber, we analyzed the crystal structures (PDB Identifiers: 3AIB, 3AIC, and 3HZ3) of the catalytic domains of three glucosyltransferases to identify residues within 8 Angstroms of the bound ligand. 57 residues met that criterion. A motif was generated based on the corresponding 57 amino acids in GTF0459 and each of the identified homologs. The motif was then used to generate a consensus sequence to capture the variability in the catalytic domains of GTF0459 and the identified homologs.

TABLE 2

GTF activity of strains.

| Strain | Enzyme | Experiment Number | Acitivity, U/mL | DNA SEQ ID NO: | Amino Acid SEQ ID NO: |
|---|---|---|---|---|---|
| SG1316 | GTF0974T4 | 2 | 47.2 | 127 | 128 |
| SG1316 | GTF0974T4 | 3 | 33.9 | 127 | 128 |
| SG1317 | GTF0974T5 | 2 | 43.5 | 117 | 118 |
| SG1317 | GTF0974T5 | 3 | 37.7 | 117 | 118 |
| SG1290 | GTF0974NT | 1 | 43.7 | 109 | 110 |
| SG1290 | GTF0974NT | 2 | 53 | 109 | 110 |
| SG1290 | GTF0974NT | 3 | 36.4 | 109 | 110 |
| SG1318 | GTF4336T4 | 2 | 46.4 | 129 | 130 |
| SG1319 | GTF4336T5 | 2 | 43.6 | 119 | 120 |
| SG1291 | GTF4336NT | 1 | 34.5 | 103 | 104 |
| SG1291 | GTF4336NT | 2 | 48.6 | 103 | 104 |
| SG1320 | GTF4491T4 | 2 | 45.3 | 131 | 132 |
| SG1321 | GTF4491T5 | 2 | 50.6 | 121 | 122 |
| SG1292 | GTF4491NT | 1 | 42.3 | 105 | 106 |
| SG1292 | GTF4491NT | 2 | 53.1 | 105 | 106 |
| SG1330 | GTF3808T5 | 3 | 36.2 | 123 | 124 |
| SG1313 | GTF3808NT | 3 | 34.9 | 107 | 108 |
| SG1297 | GTF0459NTnativeT5 | 2 | 52 | 125 | 126 |
| SG1298 | GTF0459NTnativeT6 | 1 | 28.5 | 133 | 134 |
| SG1273 | GTF0459nativeNT | 1 | 26.5 | 86 | 19 |
| SG1273 | GTF0459nativeNT | 2 | 39.4 | 86 | 19 |
| SG1304 | GTF0974T1 | 1 | 18.4 | 135 | 136 |
| SG1305 | GTF0974T2 | 1 | 7.2 | 137 | 138 |
| SG1306 | GTF0974T6 | 1 | 33.7 | 139 | 140 |
| SG1307 | GTF4336T1 | 1 | 9.4 | 141 | 142 |
| SG1308 | GTF4336T2 | 1 | 11.5 | 143 | 144 |
| SG1309 | GTF4336T6 | 1 | 28.9 | 145 | 146 |
| SG1310 | GTF4991T1 | 1 | 23.1 | 147 | 148 |
| SG1311 | GTF4991T2 | 1 | 4.9 | 149 | 150 |
| SG1312 | GTF4991T6 | 1 | 1.7 | 151 | 152 |

Example 11C

Fermentation of *Bacillus Subtilis* Strains Expressing Homologs of GTF0459 or C-Terminal Truncations of GTF0459 Homologs Using Soy Hydrolysate Medium A *B. subtilis* strain expressing each GTF was grown under an aerobic submerged condition by conventional fed-batch fermentation. The nutrient medium contained 1.75-7% soy hydrolysate (Sensient or BD), 5-25 g/L sodium and potassium phosphate, 0.5-4 g/L magnesium sulfate and a solution of 3-10 g/L citric acid, ferrous sulfate and manganese. An antifoam agent, Foamblast 882, at 2-4 mL/L was added to control foaming. A 2-L or 10-L fermentation was fed with 50% w/w glucose feed when initial glucose in batch was non-detectable. The glucose feed rate was ramped over several hours. The fermentation was controlled at 20% DO and temperature of 30° C., and initiated at an initial agitation of 400 rpm. The pH was controlled at 7.2 using 50% v/v ammonium hydroxide. Fermentation parameters such as pH, temperature, airflow, DO % were monitored throughout the entire 2-3 day fermentation run. The culture broth was harvested at the end of run and centrifuged to obtain supernatant containing GTF. The supernatant was then stored frozen at −80° C.

Example 11D

Fermentation of *Bacillus subtilis* Strains Expressing Homologs of GTF0459 or C-Terminal Truncations of GTF0459 Homologs Using Corn Steep Solids Medium A *B. subtilis* strain expressing each GTF was grown under an aerobic submerged condition by conventional fed-batch fermentation. A nutrient medium contained 0.5-2.5% corn steep solids (Roquette), 5-25 g/L sodium and potassium phosphate, a solution of 0.3-0.6 M ferrous sulfate, manganese chloride and calcium chloride, 0.5-4 g/L magnesium sulfate, and a solution of 0.01-3.7 g/L zinc sulfate, cuprous sulfate, boric acid and citric acid. An antifoam agent, Foamblast 882, of 2-4 mL/L was added to control foaming. 2-L fermentation was fed with 50% w/w glucose feed when initial glucose in batch was non-detectable. The glucose feed rate was ramped over several hours. The fermentation was controlled at 20% DO and temperature of either 30° C. or 37° C., and initiated at an initial agitation of 400 rpm. The pH was controlled at 7.2 using 50% v/v ammonium hydroxide. Fermentation parameters such as pH, temperature, airflow, DO % were monitored throughout the entire 2-3 day fermentation run. The culture broth was harvested at the end of run and centrifuged to obtain supernatant containing GTF. The supernatant was then stored frozen at −80° C.

Example 12

Production of Mutanase MUT3264 GI: 257153264 in *E. coli* BL21(DE3)

A gene encoding mutanase from *Paenibacillus humicus* NA1123 identified in GENBANK® as GI:257153264 (SEQ ID NO: 22) was synthesized by GenScript (GenScript USA Inc., Piscataway, NJ). The nucleotide sequence (SEQ ID NO: 20) encoding protein sequence ("MUT3264"; SEQ ID NO: 21) was subcloned into pET24a (Novagen; Merck KGaA, Darmstadt, Germany). The resulting plasmid was transformed into *E. coli* BL21(DE3) (Invitrogen) to generate the strain identified as SGZY6. The strain was grown at 37° C. with shaking at 220 rpm to $OD_{600}$ of ~0.7, then the temperature was lowered to 18° C. and IPTG was added to a final concentration of 0.4 mM. The culture was grown overnight before harvest by centrifugation at 4000 g. The cell pellet from 600 mL of culture was suspended in 22 mL 50 mM KPi buffer, pH 7.0. Cells were disrupted by French Cell Press (2 passages @15,000 psi (103.4 MPa)); cell debris was removed by centrifugation (SORVALL™ SS34 rotor, @13,000 rpm; Thermo Fisher Scientific, Inc., Waltham, MA) for 40 min. The supernatant was analyzed by SDS-PAGE to confirm the expression of the "mut3264" mutanase and the crude extract was used for activity assay. A control strain without the mutanase gene was created by transforming *E. coli* BL21(DE3) cells with the pET24a vector.

Example 13

Production of Mutanase MUT3264 GI: 257153264 in *B. subtilis* Strain BG6006 Strain SG1021-1

SG1021-1 is a *Bacillus subtilis* mutanase expression strain that expresses the mutanase from *Paenibacillus humicus* NA1123 isolated from fermented soy bean natto. For recombinant expression in *B. subtilis*, the native signal peptide was replaced with a *Bacillus* AprE signal peptide (GENBANK® Accession No. AFG28208; SEQ ID NO: 25). The polynucleotide encoding MUT3264 (SEQ ID NO: 23) was operably linked downstream of an AprE signal peptide (SEQ ID NO: 25) encoding *Bacillus* expressed MUT3264 provided as SEQ ID NO: 24. A C-terminal lysine was deleted to provide a stop codon prior to a sequence encoding a poly histidine tag.

The *B. subtilis* host BG6006 strain contains 9 protease deletions (amyE::xylRPxylAcomK-ermC, degUHy32, oppA, ΔspoIIE3501, ΔaprE, ΔnprE, Δepr, ΔispA, Δbpr, Δvpr, ΔwprA, Δmpr-ybfJ, ΔnprB). The wild type mut3264 (as found under GENBANK® GI: 257153264) has 1146 amino acids with the N terminal 33 amino acids deduced as the native signal peptide by the SignalP 4.0 program (Nordahl et al., (2011) *Nature Methods*, 8:785-786).

The mature mut3264 without the native signal peptide was synthesized by GenScript and cloned into the NheI and HindIII sites of the replicative *Bacillus* expression pHYT vector under the aprE promoter and fused with the *B. subtilis* AprE signal peptide (SEQ ID NO: 25) on the vector. The construct was first transformed into *E. coli* DH10B and selected on LB with ampicillin (100 μg/mL) plates. The confirmed construct pDCQ921 was then transformed into *B. subtilis* BG6006 and selected on the LB plates with tetracycline (12.5 μg/mL). The resulting *B. subtilis* expression strain SG1021 was purified and a single colony isolate, SG1021-1, was used as the source of the mutanase mut3264. SG1021-1 strain was first grown in LB containing 10 μg/mL tetracycline, and then sub-cultured into GrantsII medium containing 12.5 μg/mL tetracycline and grown at 37° C. for 2-3 days. The cultures were spun at 15,000 g for 30 min at 4° C. and the supernatant filtered through a 0.22 μm filter. The filtered supernatant containing MUT3264 was aliquoted and frozen at −80° C.

Example 14

Production of Mutanase MUT3325 GI: 212533325

A gene encoding the *Penicillium marneffei* ATCC® 18224™ mutanase identified in GENBANK® as GI:212533325 was synthesized by GenScript (Piscataway, NJ). The nucleotide sequence (SEQ ID NO: 26) encoding protein sequence (MUT3325; SEQ ID NO: 27) was subcloned into plasmid pTrex3 (SEQ ID NO: 59) at SacII and AscI restriction sites, a vector designed to express the gene of interest in *Trichoderma reesei*, under control of CBHI promoter and terminator, with *Aspergillus niger* acetamidase for selection. The resulting plasmid was transformed into *T. reesei* by biolistic injection as described in the general method section, above. The detailed method of biolistic transformation is described in International PCT Patent Application Publication WO2009/126773 A1. A 1 $cm^2$ agar plug with spores from a stable clone TRM05-3 was used to inoculate the production media (described below). The culture was grown in the shake flasks for 4-5 days at 28° C. and 220 rpm. To harvest the secreted proteins, the cell mass was first removed by centrifugation at 4000 g for 10 min and the supernatant was filtered through 0.2 μM sterile filters. The expression of mutanase MUT3325 was confirmed by SDS-PAGE.

The production media component is listed below.

NREL-Trich Lactose Defined

| Formula | Amount | Units |
|---|---|---|
| ammonium sulfate | 5 | g |
| PIPPS | 33 | g |
| BD Bacto casamino acid | 9 | g |
| $KH_2PO_4$ | 4.5 | g |
| $CaCl_2$•$2H_2O$ | 1.32 | g |
| $MgSO_4$•$7H_2O$ | 1 | g |
| *T. reesei* trace elements | 2.5 | mL |
| NaOH pellet | 4.25 | g |
| Adjust pH to 5.5 with 50% NaOH | | |
| Bring volume to | 920 | mL |
| Add to each aliquot: Foamblast | 5 | Drops |
| Autoclave, then add | 80 | mL |
| 20% lactose filter sterilized | | |

*T. reesei* Trace Elements

| Formula | Amount | Units |
|---|---|---|
| citric acid•$H_2O$ | 191.41 | g |
| $FeSO_4$•$7H_2O$ | 200 | g |
| $ZnSO_4$•$7H_2O$ | 16 | g |
| $CuSO_4$•$5H_2O$ | 3.2 | g |
| $MnSO_4$•$H_2O$ | 1.4 | g |
| $H_3BO_3$ (boric acid) | 0.8 | g |
| Bring volume to | 1 | L |

Example 15

Production of MUT3325 by Fermentation

Fermentation seed culture was prepared by inoculating 0.5 L of minimal medium in a 2-L baffled flask with 1.0 mL frozen spore suspension of the MUT3325 expression strain TRM05-3 (Example 14) (The minimal medium was composed of 5 g/L ammonium sulfate, 4.5 g/L potassium phosphate monobasic, 1.0 g/L magnesium sulfate heptahydrate, 14.4 g/L citric acid anhydrous, 1 g/L calcium chloride dihydrate, 25 g/L glucose and trace elements including 0.4375 g/L citric acid, 0.5 g/L ferrous sulfate heptahydrate, 0.04 g/L zinc sulfate heptahydrate, 0.008 g/L cupric sulfate pentahydrate, 0.0035 g/L manganese sulfate monohydrate and 0.002 g/L boric acid. The pH was 5.5.). The culture was grown at 32° C. and 170 rpm for 48 hours before transferred to 8 L of the production medium in a 14-L fermentor. The production medium was composed of 75 g/L glucose, 4.5 g/L potassium phosphate monobasic, 0.6 g/L calcium chloride dehydrate, 1.0 g/L magnesium sulfate heptahydrate, 7.0 g/L ammonium sulfate, 0.5 g/L citric acid anhydrous, 0.5 g/L ferrous sulfate heptahydrate, 0.04 g/L zinc sulfate heptahydrate, 0.00175 g/L cupric sulfate pentahydrate, 0.0035 g/L manganese sulfate monohydrate, 0.002 g/L boric acid and 0.3 mL/L foam blast 882.

The fermentation was first run with batch growth on glucose at 34° C., 500 rpm for 24 h. At the end of 24 h, the temperature was lowered to 28° C. and agitation speed was increased to 1000 rpm. The fermentor was then fed with a mixture of glucose and sophorose (62% w/w) at specific feed rate of 0.030 g glucose-sophorose solids/g biomass/hr. At the end of run, the biomass was removed by centrifugation and the supernatant containing the mutanase was concentrated about 10-fold by ultrafiltration using 10-kD Molecular Weight Cut-Off ultrafiltration cartridge (UFP-10-E-35; GEHealthcare, Little Chalfont, Buckinghamshire, UK). The concentrated protein was stored at −80° C.

Example 16

Production of Mutanase MUT6505 (GI: 259486505)

A polynucleotide encoding the *Aspergillus nidulans* FGSC A4 mutanase identified in GENBANK® as GI:259486505 was synthesized by GenScript (Piscataway, NJ). The nucleotide sequence (SEQ ID NO: 28) encoding protein sequence (MUT6505; SEQ ID NO: 29) was subcloned into plasmid pTrex3, a vector designed to express the gene of interest in *T. reesei*, under control of CBHI promoter and terminator, with *A. niger* acetamidase for selection. The resulting plasmid was transformed into *T. reesei* by biolistic injection. A 1 $cm^2$ agar plug with spores from a stable clone was used to inoculate the production media (ammonium sulfate 5 g/L, PIPPS 33 g/L; BD Bacto casamino acid 9 g/L, $zKH2PO_4$ 4.5 g/L, $CaCl_2$·$2H_2O$ 1.32 g/L, $MgSO_4$·$7H_2O$ 1 g/L, NaOH pellet 4.25 g/L, lactose 1.6 g/L, antifoam 204 0.01%, citric acid·$H_2O$ 0.48 g/L, $FeSO_4$·$7H_2O$ 0.5 g/L, $ZnSO_4$·$7H_2O$ 0.04 g/L, $CuSO_4$·$5H_2O$ 0.008 g/L, $MnSO_4$·$H_2O$ 0.0036 g/L and boric acid 0.002 g/L at pH 5.5.). The culture was grown in the shake flasks for 4-5 days at 28° C. and 220 rpm. To harvest the secreted proteins, the cell mass was first removed by centrifugation at 4000 g for 10 min and the supernatant was filtered through 0.2 μM sterile filters. The expression of MUT6505 was confirmed by SDS-PAGE. The crude protein extract containing MUT6505 was stored at −80° C.

Example 17

Production of *H. tawa*, *T. konilangbra* and *T. reesei* Mutanases

The following describes the methods used to obtain the respective polynucleotide and amino acid sequences for mutanases from *Hypocrea tawa* (SEQ ID NOs: 53 and 54), *Trichoderma konilangbra* (SEQ ID NOs: 55 and 56), and *Trichoderma reesei* (SEQ ID NOs: 57 and 58).

Isolation of Genomic DNA

Fungal cultures of *Trichoderma reesei* 592, *Trichoderma konilangbra* and *Hypocrea tawa* were prepared (see EP2644187A1 and corresponding U.S. Patent Appl. Pub. No 2011-0223117A1 to Kim et al.) by adding 30 mL of sterile YEG broth to three 250-mL baffled Erlenmeyer shaking flasks in the biological hood. A 131-inch (~333 cm) square was cut and removed from each respective fungal culture plate using a sterile plastic loop and placed into the appropriate culture flask. The inoculated flasks were then placed into the 28° C. shaking incubator to grow overnight.

The *T. reesei, T. konilangbra*, and *H. tawa* cultures were removed from the shaking incubator and the contents of each flask were poured into separate sterile 50 mL Sarstedt tubes. The Sarstedt tubes were placed in a table-top centrifuge and spun at 4,500 rpm for 10 min to pellet the fungal mycelia. The supernatants were discarded and a large loopful of each mycelial sample was transferred to a separate tube containing lysing matrix (FASTDNA™). Genomic DNA was extracted from the harvested mycelia using the FASTDNA™ kit (Qbiogene, now MP Biomedicals Inc., Santa Ana, CA) according to the manufacturer's protocol for algae, fungi and yeast. The homogenization time was 25 seconds. The amount and quality of genomic DNA extracted was determined by gel electrophoresis.

Obtaininq Alpha-Qlucanase Polypeptides by PCR

A. *T. reesei*

Putative α-1,3 glucanase genes were identified in the *T. reesei* genome (JGI) by homology. PCR primers for *T. reesei* were designed based on the putative homolog DNA sequences. Degenerate PCR primers were designed for *T. konilangbra* or *H. tawa* based on the putative *T. reesei* protein sequences and other published α-1,3 glucanase protein sequences.

*T. reesei* Specific PCR Primers:

```
SK592:
                                    (SEQ ID NO: 30)
5'-CACCATGTTTGGTCTTGTCCGC-3'

SK593:
                                    (SEQ ID NO: 31)
5'-TCAGCAGTACTGGCATGCTG-3'
```

The PCR conditions used to amplify the putative α-1,3 glucanase from genomic DNA extracted from *T. reesei* strain RL-P37 (U.S. Pat. No. 4,797,361A; NRRL-15709, *Agricultural Research* Service s, USDA, Peoria, Illinois) were as follows:

1. 94° C. for 2 minutes,
2. 94° C. tor 30 seconds,
3. 56° C. for 30 seconds,
4. 72° C. for 3 minutes,
5. return to step 2 for 24 cycles,
6. hold at 4° C.

Reaction samples contained 2 mL of *T. reesei* RL-P37 genomic DNA, 10 mL of the 10× buffer, 2 mL 10 mM dN TPs mixture, 1 mL primers SK592 and SK593 at 20 mM, 1 mL of the PfuUltra high fidelity DNA polymerase (Agilent Technologies, Santa Clara, CA) and 83 mL distilled water.

B. *T. konilangbra* and *H. tawa*

Initial PCR reactions used degenerate primers designed from protein alignments of several homologous sequences. A primary set of degenerate primers, designed to anneal near the 5' and 3' ends, were used in the first PCR reaction to amplify similar sequences to that of an α-1,3 glucanase. Degenerate primers for initial cloning:

*H. tawa* and *T. konilangbra*:

```
MA1F:
                                    (SEQ ID NO: 32)
5'-GTNTTYTGYCAYTTYATGAT-3'

MA2F:
                                    (SEQ ID NO: 33)
5'-GTNTTYTGYACAYTTYATGATHGGNAT-3'

MA4F:
                                    (SEQ ID NO: 34)
5'-GAYTAYGAYGAYGAYATGCARCG-3'

MA5F:
                                    (SEQ ID NO: 35)
5'-GTRCAYTTRCAIGGICCIGGIGGRCARTANCC-3'

MA6R:
                                    (SEQ ID NO: 36)
5'-YTCICCIGGNAGNGGRCANCCRTT-3'

MA7R:
                                    (SEQ ID NO: 37)
5'-RCARTAYTGRCAIGCYGTYGGYGGRCARTA-3'
```

The products of these PCR reactions were then used in a nested PCR using primers designed to attach within the product of the initial PCR fragment, under the same amplification conditions Specific primers for initial cloning:

```
T. konilangbra:
TP1S:
                                    (SEQ ID NO: 38)
5'-CCCCCTGGCCAAGTATGTGT-3'

TP2A:
                                    (SEQ ID NO: 39)
5'-GTACGCAAAGTTGAGCTGCT-3'

TP3S:
                                    (SEQ ID NO: 40)
5'-AGCACATCGCTGATGGATAT-3'

TP3A:
                                    (SEQ ID NO: 41)
5'-AAGTATACGTTGCTTCCGGC-3'

TP4S:
                                    (SEQ ID NO: 42)
5'-CTGACGATCGGACTRCACGT-3'

TP4A:
                                    (SEQ ID NO: 43)
5'-CGTTGTCGACGTAGAGCTGT-3'

H. tawa:
HP2A:
                                    (SEQ ID NO: 44)
5'-ACGATCGGCAGAGTCATAGG-3'

HP3S:
                                    (SEQ ID NO: 45)
5'-ATCGGATTGCATGTCACGAC-3'

HP3A:
                                    (SEQ ID NO: 46)
5'-TACATCCAGACCGTCACCAG-3'

HP4S:
                                    (SEQ ID NO: 47)
5'-ACGTTTGCTCTTGCGGTATC-3'

HP4A:
                                    (SEQ ID NO: 48)
5'-TCATTATCCCAGGCCTAAAA-3'
```

Gel electrophoresis of the PCR products was used to determine whether fragments of expected size were amplified. Single nested PCR products of the expected size were purified using the QIAquick PCR purification kit (QIAGEN). In addition, expected size products were excised and extracted from agarose gels containing multiple product bands and purified using the QIAquick Gel Extraction kit (QIAGEN).

Transformation/Isolate Screening/Plasmid Extraction

PCR products were inserted into cloning vectors using the Invitrogen ZERO BLUNT® TOPO® PCR cloning kit, according to the manufacturer's specifications (Life Technologies Corporation, Carlsbad, CA). The vector was then transformed into ONE SHOT® TOP10 chemically competent *E. coli* cells, according to the manufacturer's recommendation and then spread onto LB plates containing 50 ppm of Kanamycin. These plates were incubated in the 37° C. incubator overnight.

To select transformants that contained the vector and DNA insert, colonies were selected from the plate for crude plasmid extraction. 50 mL of DNA Extraction Solution (100 mM NaCl, 10 mM EDTA, 2 mM Tris pH 7) was added to clean 1.5 mL Eppendorf tubes. In the biological hood, 7-10 individual colonies of each TOPO® transformation clone were numbered, picked and resuspended in the extraction solution. In the chemical hood, 50 mL of Phenol: Chloroform: Isoamyl alcohol was added to each sample and vortexed thoroughly. Tubes were microcentrifuged at maximum speed for 5 minutes, after which 20 mL of the top aqueous layer was removed and placed into a clean PCR tubes. 1 mL of RNase (2 mg/mL) was then added, and samples were mixed and incubated at 37° C. tor 30 minutes. The entire sample volume was then run on a gel to determine the presence of the insert in the TOPO® vector based on difference in size to an empty vector. Once the transformant colonies had been identified, those clones was scraped from the plate and used to inoculate separate 15-mL tubes containing 5 mL of LB/Kanamycin medium (0.0001%). The cultures were placed in the 37° C. shaking incubator overnight.

Samples were removed from the incubator and centrifuged for 6 min at 6,000 rpm using the Sorval centrifuge. The QIAprep Spin Miniprep kit (QIAGEN) and protocol were used to isolate the plasmid DNA, which was then digested to confirm the presence of the insert. The restriction enzyme used was dependent on the sites present in and around the insert sequence. Gel electrophoresis was used to determine fragment size. Appropriate DNA samples were submitted for sequencing (Sequetech, Mountain View, CA).

Cloning the 3' and 5' Ends

All DNA fragments were sequenced. Sequences were aligned and compared to determine nucleotide and amino acid identities using ALIGNX® and CONTIGEXPRESS® (Vector NTI® suite, Life Sciences Corp., Carlsbad, CA). Specific primers were designed to amplify the 3' and 5' portions of each incomplete fragment from *H. tawa* and *T. konilangbra* by extending outward from the known sequence. At least three specific primers each nested within the amplified product of the previous primer set were designed for each template. Amplification of the 5' and 3' sequences was performed using the nested primer sets with the LA PCR In vitro Cloning Kit (Takara Bio Inc., Otsu, Japan)

Fresh genomic DNA was prepared for this amplification. Cultures of *T. konilangbra* and *H. tawa* were prepared by inoculating 30 mL of YEG broth with a 1 square inch section of the appropriate sporulated fungal plate culture in 250-mL baffled Erlenmeyer flasks. The flasks were incubated in the 28° C. shaking incubator overnight. The cultures were harvested by centrifugation in 50-mL Sarstedt tubes at 4,500 rpm for 10 minutes. The supernatant was discarded and the mycelia were stored overnight in a −80° C. freezer. The frozen mycelia were then placed into a coffee grinder along with a few pieces of dry ice. The grinder was run until the entire mixture had a powder like consistency. The powder was then air dried and transferred to a sterile 50-mL Sarstedt tube containing 10 mL of EASY-DNA™ Kit Solution A (Life Sciences Corp.) and the manufacturer's protocol was followed. The concentration of the genomic DNA collected from the extraction was measured using the NanoDrop spectrophotometer. The LA PCR In vitro Cloning Kit cassettes were chosen based on the absence of a particular restriction site within the known DNA sequences, and the manufacturer's instructions were followed. For first PCR run, 1 mL of the ligation DNA sample was diluted in 33.5 mL of sterilized distilled water. Different primers were used depending on the sample and the end fragment desired. For the 5' ends, primers HP4A and TP3A were used for *H. tawa* and *T. konilangbra* respectively, while for the 3' ends primers HP4S and TP3S were used for *H. tawa* and *T. konilangbra*. The PCR mixture was prepared by adding 34.5 mL diluted ligation DNA solution, 5 mL of 10λ LA Buffer II ($Mg^{2+}$), 8 mL dNTPs mixture, 1 mL cassette primer I, 1 mL specific primer 1 (depending on sample and end fragment), and 0.5 mL Takara LA Taq polymerase. The PCR tubes were then placed in a thermocycler following the listed protocol:

1. 94° C. for 10 min,
2. 94° C. for 30 s,
3. 55° C. for 30 s,
4. 72° C. for 4 min, return to step 2 30 times,
5. Hold at 4° C.

A second PCR reaction was prepared by taking 1 mL of the first PCR reaction and diluting the sample in sterilized distilled water to a dilution factor of 1:10,000. A second set of primers nested within the first amplified region were used to amplify the fragment isolated in the first PCR reaction. Primers HP3A and TP4A were used to amplify toward the 5' end of *H. tawa* and *T. konilangbra* respectively, while primers HP3S and TP4S were used to amplify toward the 3' end. The diluted DNA was added to the PCR reaction containing 33.5 mL distilled sterilized water, 5 mL 10×LA Buffer II ($Mg^{2+}$), 8 mL dNTPs mixture, 1 mL of cassette primer 2, 1 mL of specific primer 2 (dependent on sample and fragment, end), 0.5 mL Takara LA Taq, and mixed thoroughly before the PCR run. The PCR protocol was the same as the first reaction, without the initial 94° C. for 10 minutes. After the reaction was complete, the sample was run by gel electrophoresis to determine size and number of fragments isolated. If a single band was present, the sample was purified and sent for sequencing. If no fragment was isolated, a third PCR reaction was performed using the previous protocol for a nested PCR reaction. After running the amplified fragments by gel electrophoresis, the brightest band was excised, purified, and sent for sequencing.

Analysis of Sequence Alignments

Sequences were obtained and analyzed using the Vector NTI suite, including ALIGNX®, and CONTIGEXPRESS®. Each respective end fragment sequence was aligned to the previously obtained fragments of *H. tawa* and *T. konilangbra* to obtain the entire gene sequence. Nucleotide alignments with *T. harzianum* and *T. reesei* sequences revealed the translation start and stop points of the gene of interest in both *H. tawa* and *T. konlangbra*. After the entire gene sequence was identified, specific primers were designed to amplify the entire gene from the genomic DNA. Primers were designed as described earlier, with the exception of adding CACC nucleotide sequence before the translational starting point, for GATEWAY® cloning (Life Sciences Corp.).

Primers for Final Cloning:

```
T. konilangbra:
T1FS:
                                          (SEQ ID NO: 49)
caccatgctaggcattctccg

T1FA:
                                          (SEQ ID NO: 50)
tcagcagtattggcatgccg

H. tawa:
H1FS:
                                          (SEQ ID NO: 51)
CACCATGTTGGGCGTTTTTCG

H1FA:
                                          (SEQ ID NO: 52)
CTAGCAGTATTGRCATGCCG
```

The PCR protocol was followed as previously described with the exception of altering the annealing temperature to 55° C. After a single band was isolated and viewed through gel electrophoresis, the amplified fragment was purified as described earlier and used in the pENTR/D TOPO® (Life Sciences Corp.) transformation, according to the manufacturer's instructions. Chemically competent *E. coli* cells were then transformed as previously described, and transferred to LB plates containing 50 ppm of kanamycin. Following 37° C. incubation overnight, transformants containing the plasmid and insert were selected after crude DNA extraction and plasmid size analysis, as previously described. The selected transformants were scraped from the plate and used to inoculate a fresh 15-mL tube containing 5 mL of LB/Kanamycin medium (0.0001%). Cultures were placed in the 37° C. shaking incubator overnight. Cells were harvested by centrifugation and the plasmid DNA extracted as previously described. Plasmid DNA was digested to confirm the presence of the insert sequence, and then submitted for sequencing. The LR Clonase reaction (Gateway Cloning, Invitrogen (Life Sciences Corp.)) was used, according to manufacturer's instructions, to directionally transfer the insert from the pENTR™/D vector into the destination vector. The destination vector is designed for expression of a gene of interest, in *T. reesei*, under control of the CBH1 promoter and terminator, with *A. niger* acetamidase for selection.

Biolistic Transformation (See General Methods)

Expression of α-1,3 Glucanases by *T. reesei* Transformants

A 1 $cm^2$ agar plug was used to inoculate Proflo seed media. Cultures were incubated at 28° C., with 200 rpm Modified amdS Biolistic agar (MABA) per liter shaking. On the second day, a 10% transfer was aseptically made into Production media. The cultures were incubated at 28° C., with 200 rpm shaking. On the third day, cultures were harvested by centrifugation. Supernatants were sterile filtered (0.2 mm polyethersulfone filter; PES) and stored at 4° C. Analysis by SDS-PAGE identified clones expressing the respective alpha-glucanase genes. The growth conditions for the *T. reesei* transformants followed those used in Example 14.

Example 18

Production of Soluble Oligosaccharides Using Glucosyltransferase GTF-J (GI:47527) with Simultaneous or Sequential Addition of Mutanase Reactions (10 mL total volume) were run with 100 g/L sucrose in 50 mM phosphate buffer (pH 6.8) at 35° C., with mixing supplied by a magnetic stir bar. To each reaction was added 0.3% (v/v) concentrated *E. coli* crude protein extract containing *Streptococcus salivarius* GTF-J (GI: 47527, GTF7527; Example 3). *T. reesei* crude protein extract containing either*T. konilangbra* mutanase or *T. reesei* 592 mutanase (Example 17) was added at 10% (v/v) of final reaction volume to a reaction either simultaneously with addition of crude protein extract containing GTF-J, or 24 h after addition of crude protein extract containing GTF-J. A control reaction was run with no added mutanase. Aliquots were withdrawn at 4 h and either 22 h or 24 h and quenched by heating at 60° C. for 30 min. Insoluble material was removed from heat-treated samples by centrifugation. The resulting supernatant was analyzed by HPLC to determine the concentration of sucrose, glucose, fructose, leucrose and oligosaccharides (Tables 3 and 4); DP3-DP7 yield was calculated based on sucrose conversion.

TABLE 3

Monosaccharide, disaccharide and oligosaccharide concentrations in reactions containing *Streptococcus salivarius* GTF-J and either *T. reesei* 592 or *T. konilangbra* mutanase added with GTF-J at start of reaction.

| Rxn # | mutanase protein crude extract | Time (h) | Suc. (g/L) | Leuc. (g/L) | Gluc. (g/L) | Fruc. (g/L) | DP7 (g/L) | DP6 (g/L) | DP5 (g/L) | DP4 (g/L) | DP3 (g/L) | DP2 (g/L) | DP3-DP7 (g/L) | DP3-DP7 yield (%) | Leuc./Fruc. |
|---|---|---|---|---|---|---|---|---|---|---|---|---|---|---|---|
| 1 | none | 4 | 70.0 | 5.8 | 4.9 | 14.4 | 0.1 | 0.3 | 0.0 | 0.6 | 1.1 | 2.1 | 2.1 | 15 | 0.40 |
| | | 22 | 8.3 | 26.3 | 7.2 | 38.2 | 0.1 | 0.1 | 0.5 | 2.1 | 5.4 | 5.1 | 8.2 | 19 | 0.69 |
| 2 | *T. reesei* | 4 | 33.8 | 9.7 | 23.1 | 32.9 | 1.1 | 1.1 | 1.6 | 0.6 | 5.0 | 5.3 | 9.4 | 30 | 0.29 |
| | 592 | 22 | 14.0 | 17.8 | 23.7 | 41.7 | 0.3 | 0.3 | 0.3 | 1.7 | 7.6 | 8.6 | 10.2 | 25 | 0.43 |
| | mutanase | | | | | | | | | | | | | | |
| 3 | *T. konilangbra* | 4 | 61.8 | 8.0 | 5.7 | 17.6 | 0.8 | 1.2 | 1.8 | 2.4 | 1.4 | 2.5 | 7.6 | 42 | 0.45 |
| | mutanase | 22 | 9.6 | 27.1 | 4.9 | 36.1 | 0.3 | 0.3 | 0.8 | 2.4 | 9.5 | 3.7 | 13.3 | 31 | 0.75 |

TABLE 4

Monosaccharide, disaccharide and oligosaccharide concentrations in reactions containing *Streptococcus salivarius* GTF-J and either *T. reesei* 592 or *T. konilangbra* mutanase added 24 h after GTF-J addition.

| Rxn # | mutanase protein crude extract | Time (h) | Suc. (g/L) | Leuc. (g/L) | Gluc. (g/L) | Fruc. (g/L) | DP7 (g/L) | DP6 (g/L) | DP5 (g/L) | DP4 (g/L) | DP3 (g/L) | DP2 (g/L) | DP3-DP7 (g/L) | DP3-DP7 selectivity (%) | Leuc./ Fruc. |
|---|---|---|---|---|---|---|---|---|---|---|---|---|---|---|---|
| 1 | none | 4 | 8.6 | 26.0 | 7.0 | 38.3 | 0.3 | 0.9 | 0.0 | 1.9 | 2.8 | 4.0 | 5.9 | 14 | 0.68 |
| | | 24 | 9.4 | 26.4 | 6.1 | 38.1 | 0.0 | 0.4 | 0.0 | 1.4 | 2.5 | 5.0 | 4.3 | 10 | 0.69 |
| 2 | *T. reesei* | 4 | 9.8 | 27.4 | 6.0 | 37.7 | 0.4 | 1.7 | 0.0 | 4.8 | 2.6 | 2.8 | 9.5 | 22 | 0.73 |
| | 592 mutanase | 24 | 8.9 | 26.3 | 0.0 | 33.1 | 0.1 | 1.1 | 0.0 | 2.6 | 5.5 | 2.0 | 9.3 | 22 | 0.79 |
| 3 | *T. konilangbra* | 4 | 9.8 | 27.6 | 5.7 | 37.4 | 0.4 | 1.5 | 0.0 | 1.5 | 2.5 | 4.9 | 5.9 | 14 | 0.74 |
| | mutanase | 24 | 9.0 | 26.5 | 0.0 | 34.4 | 0.0 | 0.5 | 0.5 | 2.2 | 6.4 | 8.1 | 9.6 | 22 | 0.77 |

Example 19

Production of Soluble Oligosaccharides Using Glucosyltransferase GTF-J (GI:47527) with Simultaneous or Sequential Addition of Mutanase Reactions (10 mL total volume) were run with 100 g/L sucrose in 50 mM phosphate buffer (pH 6.8) at 30° C., with mixing supplied by a magnetic stir bar. To each reaction was added 0.3% (v/v) concentrated *E. coli* crude protein extract containing *Streptococcus salivarius* GTF-J (GI:47527, GTF7527; Example 3). *B. subtilis* crude protein extract containing *Paenibacillus humicus* mutanase (GI: 257153264, mut3264; Example 12) was added at 10% (v/v) of final reaction volume to a reaction either simultaneously with addition of crude protein extract containing GTF-J, or 24 h after addition of crude protein extract containing GTF-J. A control reaction was run with no added mutanase. Aliquots were withdrawn at either 4 h or 5 h and either 20 h or 21 h and quenched by heating at 60° C. for 30 min. Insoluble material was removed from heat-treated samples by centrifugation. The resulting supernatant was analyzed by HPLC to determine the concentration of sucrose, glucose, fructose, leucrose and oligosaccharides (Tables 5 and 46; DP3-DP7 yield was calculated based on sucrose conversion.

TABLE 5

Monosaccharide, disaccharide and oligosaccharide concentrations in reactions containing *Streptococcus salivarius* GTF-J (GI 47527) and *Paenibacillus humicus* mutanase (GI: 257153264, mut3264) at start of reaction.

| Rxn # | Protein crude extract | Time (h) | Suc. (g/L) | Leuc. (g/L) | Gluc. (g/L) | Fruc. (g/L) | DP7 (g/L) | DP6 (g/L) | DP5 (g/L) | DP4 (g/L) | DP3 (g/L) | DP2 (g/L) | DP3-DP7 (g/L) | Yield DP3-DP7 (%) | Leuc/ Fruc |
|---|---|---|---|---|---|---|---|---|---|---|---|---|---|---|---|
| 1 | none | 5 | 55.3 | 10.4 | 5.1 | 19.1 | 0.2 | 0.5 | 0.0 | 1.3 | 1.5 | 2.6 | 3.5 | 16.5 | 0.54 |
| | | 21 | 6.0 | 27.6 | 6.6 | 38.5 | 0.5 | 1.2 | 0.0 | 2.3 | 3.2 | 4.3 | 7.2 | 16.2 | 0.72 |
| 2 | *Bacillus* | 5 | 51.1 | 10.6 | 8.1 | 22.8 | 0.2 | 0.7 | 0.0 | 1.6 | 2.6 | 3.5 | 5.2 | 22.4 | 0.46 |
| | extract without mutanase | 21 | 7.9 | 27.3 | 6.2 | 40.2 | 0.5 | 1.5 | 0.0 | 3.1 | 3.9 | 4.7 | 8.9 | 20.4 | 0.68 |
| 3 | *Bacillus* | 5 | 40.1 | 12.3 | 7.4 | 28.7 | 0.1 | 1.7 | 0.0 | 5.5 | 3.6 | 3.3 | 11.0 | 38.7 | 0.43 |
| | extract with mut3264 | 21 | 8.7 | 27.0 | 8.5 | 39.8 | 0.1 | 0.2 | 0.6 | 9.9 | 6.8 | 5.9 | 17.7 | 40.9 | 0.68 |

TABLE 6

Monosaccharide, disaccharide and oligosaccharide concentrations in reactions containing *Streptococcus salivarius* GTF-J (GI 47527) and *Paenibacillus humicus* mutanase (GI: 257153264, mut3264), with mutanase added 24 h after start of reaction with GTF-J only.

| Rxn # | Protein crude extract | Time after mutanase addition (h) | Suc. (g/L) | Leuc. (g/L) | Gluc. (g/L) | Fruc. (g/L) | DP7 (g/L) | DP6 (g/L) | DP5 (g/L) | DP4 (g/L) | DP3 (g/L) | DP2 (g/L) | DP3-DP7 (g/L) | Yield DP3-DP7 (%) | Leuc/ Fruc |
|---|---|---|---|---|---|---|---|---|---|---|---|---|---|---|---|
| 1 | none | 4 | 8.6 | 27.7 | 8.8 | 41.0 | 0.5 | 1.3 | 0.0 | 2.5 | 3.4 | 4.6 | 7.7 | 17.8 | 0.68 |
| | | 20 | 9.5 | 30.0 | 5.0 | 40.2 | 0.8 | 1.6 | 0.0 | 2.3 | 3.5 | 4.9 | 8.2 | 19.1 | 0.75 |
| 2 | *Bacillus* | 4 | 10.3 | 24.6 | 14.2 | 38.1 | 0.1 | 0.2 | 0.3 | 3.4 | 3.7 | 5.3 | 7.7 | 18.1 | 0.65 |
| | extract, with mut3264 | 20 | 12.3 | 29.2 | 9.6 | 37.3 | 0.2 | 0.2 | 0.4 | 3.6 | 6.4 | 6.8 | 10.8 | 26.0 | 0.78 |

Example 20

Production of Soluble Oligosaccharides Using Combination of Glucosyltransferase GTF-J (GI:47527) Enzyme and Mutanases Reaction 1 comprised sucrose (100 g/L), *E. coli* concentrated crude protein extract (0.3% v/v) containing GTF-J from *S. salivarius* (GI:47527, GTF7527; Example 3) in 50 mM phosphate buffer, pH 6.0. Reactions 2 and 4 comprised sucrose (100 g/L), *E. coli* concentrated crude protein extract (0.3% v/v) containing GTF-J from *S. salivarius* (Example 3) and either a *T. reesei* crude protein extract (10% v/v) comprising a mutanase from *Penicillium marneffei* ATCC® 18224 (GI:212533325, mut3325; Example 14) or an *E. coli* crude protein extract (10% v/v) comprising a mutanase from *Paenibacillus humicus* (GI:257153264, mut3264; Example 12) in 50 mM phosphate buffer, pH 6.0. Control reactions 3 and 5 used either a *T. reesei* crude protein extract (10% v/v) or an *E. coli* crude protein extract (10% v/v), respectively, that did not contain mutanase. The total volume for each reaction was 10 mL and all reactions were performed at 40° C. with shaking at 125 rpm. Aliquots were withdrawn at 5 h and 24 h and quenched by heating at 95° C. for 5 min. Insoluble material was removed by centrifugation and filtration. The soluble products were analyzed by HPLC to determine the concentration of sucrose, glucose, fructose, leucrose and oligosaccharides (Table 7). The soluble products from each reaction at 24 h were also analyzed by H NMR spectroscopy to determine the anomeric linkages of the oligosaccharides (Table 8).

TABLE 7

Monosaccharide, disaccharide and oligosaccharide concentrations measured by HPLC.

| Rxn # | Protein crude extract | Time (h) | Suc. (g/L) | Leuc. (g/L) | Gluc. (g/L) | Fruc. (g/L) | DP7 (g/L) | DP6 (g/L) | DP5 (g/L) | DP4 (g/L) | DP3 (g/L) | DP2 (g/L) | DP3-DP7 (g/L) | Yield DP3-DP7 (%) | Leuc/ Fruc |
|---|---|---|---|---|---|---|---|---|---|---|---|---|---|---|---|
| 1 | NA | 5 | 50.5 | 8.7 | 6.9 | 20.6 | 0.0 | 0.0 | 0.3 | 0.7 | 1.2 | 2.4 | 2.2 | 8.9 | 0.42 |
| | | 24 | 0.6 | 25.2 | 8.9 | 38.2 | 0.0 | 0.2 | 0.8 | 1.9 | 2.7 | 3.4 | 5.7 | 11.7 | 0.66 |
| 2 | *T. reesei* extract with mut3225 | 5 | 2.9 | 11.6 | 3.2 | 45.1 | 0.1 | 4.3 | 10.2 | 11.6 | 4.8 | 0.6 | 31.0 | 65.6 | 0.26 |
| | | 24 | 3.5 | 13.5 | 0.0 | 44.3 | 0.0 | 0.0 | 7.2 | 12.3 | 10.0 | 4.2 | 29.5 | 62.8 | 0.31 |
| 3 | *T. reesei* extract, no mutanase | 5 | 58.4 | 10.1 | 7.3 | 18.1 | 0.0 | 0.0 | 0.3 | 1.0 | 1.5 | 2.3 | 2.9 | 14.1 | 0.56 |
| | | 24 | 21.2 | 21.6 | 6.5 | 29.1 | 0.0 | 0.0 | 0.6 | 2.1 | 3.1 | 3.8 | 5.8 | 15.0 | 0.74 |
| 4 | *E. coli* extract with mut3264 | 5 | 7.5 | 11.6 | 7.2 | 44.0 | 0.0 | 0.0 | 0.6 | 19.3 | 10.3 | 5.4 | 30.2 | 66.7 | 0.26 |
| | | 24 | 6.3 | 13.1 | 5.0 | 44.9 | 0.0 | 0.0 | 0.0 | 17.4 | 10.4 | 6.8 | 27.8 | 60.8 | 0.29 |
| 5 | *E. coli* extract, no mutanase | 5 | 49.9 | 9.2 | 6.7 | 21.3 | 0.0 | 0.0 | 0.3 | 0.7 | 1.2 | 2.4 | 2.1 | 8.7 | 0.43 |
| | | 24 | 22.0 | 19.5 | 6.2 | 32.0 | 0.0 | 0.0 | 0.6 | 1.3 | 1.9 | 2.8 | 3.8 | 10.0 | 0.61 |

TABLE 8

| Anomeric linkage analysis of soluble oligosaccharides by $^1$H NMR spectroscopy. | | | | | | | |
|---|---|---|---|---|---|---|---|
| Rxn # | Protein Crude Extract | % α-(1, 4) | % α-(1, 3) | % α-(1, 3, 6) | % α-(1, 2, 6) | % α-(1, 2) | % α-(1, 6) |
| 1 | NA | 14.2 | 47.5 | 5.8 | 0.0 | 0.0 | 32.6 |
| 2 | *T. reesei* extract, mut3325 | 2.5 | 93.4 | 0.7 | 0.0 | 0.0 | 3.4 |
| 3 | *T. reesei* extract, no mutanase | 13.8 | 45.8 | 7.8 | 0.0 | 0.0 | 32.5 |
| 4 | *E. coli* extract, mut3264 | 1.4 | 88.3 | 1.8 | 0.0 | 0.0 | 8.5 |
| 5 | *E. coli* extract, no mutanase | 14.0 | 47.7 | 7.2 | 0.0 | 0.0 | 31.1 |

More sucrose was consumed in the first 5 hr of reaction when mutanase was present. Crude extracts from *T. reesei* and *E. coli* strains that don't express mutanase didn't have the synergistic effect on sucrose consumption rate. The leucrose to fructose ratios were significantly lower in the presence of mutanases. The yield of soluble oligosaccharides significantly increased in the presence of mutanase. The percentage of α-(1, 3) linkages in the soluble oligosaccharides was substantially increased by the presence of mutanase.

Example 21

Production of Soluble Oligosaccharides by GTF-L and Mutanases

Reaction 1 comprised sucrose (100 g/L) and an *E. coli* protein crude extract (10% v/v) containing GTF-L from *Streptococcus salivarius* (GI:662379, GTF2379; Example 5) in 50 mM phosphate buffer, pH 6.0. Reactions 2 and 4 comprised sucrose (100 g/L), *E. coli* protein crude extract (10% v/v) containing GTF-L from *Streptococcus salivarius* (Example 5) and either a *T. reesei* crude protein extract (10%, v/v) containing *H. tawa* mutanase (Example 17) or an *E. coli* protein crude extract (10%, v/v) containing *Paenibacillus humicus* (GI:257153264, mut3264; Example 12) in 50 mM phosphate buffer, pH 6.0. Control reactions 3 and 5 used either a *T. reesei* protein crude extract (10% v/v) or an *E. coli* protein crude extract (10% v/v), respectively, that did not contain mutanase. The total volume for each reaction was 10 mL and all reactions were performed at 40° C. with shaking at 125 rpm. Aliquots were withdrawn at 5 h and 24 h and reactions were quenched by heating at 95° C. for 5 min. The insoluble materials were removed by centrifugation and filtration. The soluble product mixture was analyzed by HPLC to determine the concentration of sucrose, glucose, fructose, leucrose and oligosaccharides (Table 9). The soluble product from each reaction at 24 h was also analyzed by $^1$H NMR spectroscopy to determine the linkages present in the oligosaccharides (Table 10).

TABLE 9

Monosaccharide, disaccharide and oligosaccharide concentrations measured by HPLC.

| Rxn # | Protein crude extract | Time (hr) | Suc. (g/L) | Leuc. (g/L) | Gluc. (g/L) | Fruc. (g/L) | DP7 (g/L) | DP6 (g/L) | DP5 (g/L) | DP4 (g/L) | DP3 (g/L) | DP2 (g/L) | DP3-DP7 (g/L) | Yield DP3-DP7 (%) | Leuc/ Fruc |
|---|---|---|---|---|---|---|---|---|---|---|---|---|---|---|---|
| 1 | NA | 5 | 40.3 | 12.9 | 8.1 | 19.9 | 0.3 | 0.5 | 0.8 | 1.2 | 1.5 | 3.6 | 4.3 | 14.9 | 0.65 |
| | | 24 | 5.2 | 27.8 | 8.6 | 34.5 | 1.8 | 2.4 | 3.0 | 3.3 | 3.7 | 6.7 | 14.1 | 30.6 | 0.81 |
| 2 | *T. reesei* extract, H. tawa mutanase | 5 | 28.4 | 17.8 | 25.8 | 44.2 | 0.2 | 0.7 | 1.4 | 2.4 | 6.2 | 8.0 | 11.0 | 31.3 | 0.40 |
| | | 24 | 8.4 | 19.4 | 20.8 | 40.6 | 0.3 | 0.8 | 1.6 | 2.3 | 4.4 | 9.7 | 9.3 | 20.8 | 0.48 |
| 3 | *T. reesei* extract, no mutanase | 5 | 41.9 | 13.3 | 8.5 | 20.7 | 0.3 | 0.6 | 0.9 | 1.3 | 1.6 | 3.8 | 4.6 | 16.2 | 0.64 |
| | | 24 | 5.1 | 28.4 | 8.1 | 34.5 | 1.8 | 2.5 | 2.9 | 3.3 | 3.8 | 7.2 | 14.3 | 30.9 | 0.82 |
| 4 | *E. coli* extract, mut3264 | 5 | 28.4 | 16.7 | 10.6 | 42.6 | 0.7 | 1.2 | 2.4 | 13.2 | 6.9 | 9.0 | 24.3 | 69.6 | 0.39 |
| | | 24 | 3.3 | 19.0 | 8.7 | 40.4 | 0.3 | 1.0 | 2.0 | 6.9 | 6.9 | 13.2 | 17.1 | 36.3 | 0.47 |
| 5 | *E. coli* extract, no mutanase | 5 | 48.1 | 17.1 | 10.4 | 26.2 | 0.00 | 3.5 | 3.5 | 5.8 | 4.7 | 6.3 | 17.5 | 69.2 | 0.65 |
| | | 24 | 5.1 | 28.2 | 8.7 | 34.4 | 1.9 | 2.6 | 3.2 | 3.5 | 3.9 | 6.9 | 15.0 | 32.6 | 0.82 |

TABLE 10

Anomeric linkage analysis of soluble oligosaccharides by $^1$H NMR spectroscopy.

| Rxn # | Protein Crude Extract | % α-(1, 4) | % α-(1, 3) | % α-(1, 3, 6) | % α-(1, 2, 6) | % α-(1, 2) | % α-(1, 6) |
|---|---|---|---|---|---|---|---|
| 1 | NA | 9.7 | 14.3 | 7.2 | 0.0 | 0.0 | 68.8 |
| 2 | *T. reesei* extract, H. tawa mutanase | 12.3 | 23.2 | 5.3 | 0.0 | 0.0 | 59.3 |
| 3 | *T. reesei* extract, no mutanase | 10.2 | 13.3 | 7.4 | 0.0 | 0.0 | 69.1 |
| 4 | *E. coli* extract, mut3264 | 6.3 | 56.4 | 3.1 | 0.0 | 0.0 | 34.3 |
| 5 | *E. coli* extract, no mutanase | 10.0 | 13.8 | 7.5 | 0.0 | 0.0 | 68.8 |

More sucrose was consumed in the first 5 h when mutanase was present. Crude extracts from *T. reesei* and *E. coli* strains that don't express mutanase don't have the synergistic effect on sucrose consumption rate. Less leucrose was produced in the presence of mutanase after 24 h when sucrose consumption was near completion. The leucrose to fructose ratios were significantly lower in the presence of mutanases. The amount of soluble oligosaccharides of DP3 to DP7 significantly increased in the presence of mut3264. More glucose was produced in the reaction with *H. tawa* mutanase than in other reactions. The percentage of α-(1,3) linkages in the soluble oligosaccharides was substantially increased by the presence of mutanase.

Example 22

Production of Soluble Oligosaccharides by GTF-B and Mutanases

Reaction 1 comprised sucrose (100 g/L) and *E. coli* protein crude extract (10% v/v) containing GTF-B from *Streptococcus mutans* NN2025 (GI:290580544, GTF0544; Example 6) in 50 mM phosphate buffer, pH 6.0. Reactions 2 and 4 below comprised sucrose (100 g/L), *E. coli* protein crude extract (10% v/v) containing GTF-B from *Streptococcus mutans* NN2025 (GI:290580544, GTF0544; Example 6) and either a *T. reesei* protein crude extract (10%, v/v) containing *H. tawa* mutanase (Example 17) or an *E. coli* protein crude extract (10%, v/v) containing *Paenibacillus humicus* mutanase (GI:257153264, mut3264; Example 12) in 50 mM phosphate buffer, pH 6.0. Control reactions 3 and 5 used either a *T. reesei* crude protein extract (10% v/v) or an *E. coli* crude protein extract (10% v/v), respectively, that did not contain mutanase. The total volume for each reaction was 10 mL and all reactions were performed at 40° C. with shaking at 125 rpm. Aliquots were withdrawn at 5 h and 24 h and reactions were quenched by heating aliquot samples at 95° C. for 5 min. The insoluble materials were removed by centrifugation and filtration, and the resulting filtrate was analyzed by HPLC to determine the concentration of sucrose, glucose, fructose, leucrose and oligosaccharides (Table 11). The soluble product from each reaction at 24 h was also analyzed by H NMR spectroscopy to determine the linkage of the oligosaccharides (Table 12).

TABLE 11

Monosaccharide, disaccharide and oligosaccharide concentrations measured by HPLC.

| Rxn # | Protein crude extract | Time (hr) | Suc. (g/L) | Leuc. (g/L) | Gluc. (g/L) | Fruc. (g/L) | DP7 (g/L) | DP6 (g/L) | DP5 (g/L) | DP4 (g/L) | DP3 (g/L) | DP2 (g/L) | DP3-DP7 (g/L) | Yield DP3-DP7 (%) | Leuc/ Fruc |
|---|---|---|---|---|---|---|---|---|---|---|---|---|---|---|---|
| 1 | NA | 5 | 77.1 | 3.1 | 2.9 | 14.2 | 0.0 | 0.3 | 0.5 | 0.5 | 0.3 | 0.6 | 1.5 | 13.9 | 0.22 |
| | | 24 | 28.7 | 14.3 | 2.0 | 31.1 | 1.9 | 2.5 | 2.6 | 1.9 | 1.0 | 1.7 | 9.8 | 28.4 | 0.46 |
| 2 | *T. reesei* | 5 | 69.5 | 3.3 | 10.4 | 22.0 | 0.0 | 0.3 | 0.8 | 0.8 | 2.0 | 1.8 | 3.9 | 26.3 | 0.15 |
| | extract, | 24 | 11.6 | 11.5 | 13.1 | 40.4 | 1.1 | 2.3 | 3.0 | 2.2 | 2.4 | 4.3 | 10.9 | 25.5 | 0.29 |
| | H. tawa mutanase | | | | | | | | | | | | | | |
| 3 | *T. reesei* | 5 | 74.6 | 3.1 | 3.0 | 14.1 | 0.0 | 0.3 | 0.5 | 0.5 | 0.3 | 0.7 | 1.6 | 12.8 | 0.22 |
| | extract, | 24 | 30.4 | 14.6 | 3.1 | 29.8 | 2.0 | 2.7 | 2.8 | 2.4 | 1.9 | 2.3 | 11.8 | 35.0 | 0.49 |
| | no mutanase | | | | | | | | | | | | | | |
| 4 | *E. coli* | 5 | 59.4 | 3.2 | 3.0 | 21.8 | 0.2 | 1.0 | 2.0 | 5.2 | 2.5 | 2.6 | 10.8 | 54.6 | 0.15 |
| | extract, | 24 | 5.7 | 11.2 | 1.5 | 43.6 | 2.4 | 5.1 | 5.9 | 6.0 | 4.3 | 5.2 | 23.7 | 51.8 | 0.26 |
| | mut3264 | | | | | | | | | | | | | | |
| 5 | *E. coli* | 5 | 32.3 | 10.9 | 3.5 | 29.8 | 1.1 | 1.5 | 1.4 | 0.9 | 0.5 | 1.0 | 5.4 | 16.5 | 0.36 |
| | extract, | 24 | 0.2 | 19.9 | 1.7 | 38.2 | 2.6 | 2.9 | 2.5 | 1.6 | 0.6 | 1.9 | 10.3 | 21.3 | 0.52 |
| | no mutanase | | | | | | | | | | | | | | |

TABLE 12

Linkage analysis of soluble oligosaccharides in each reaction by $^1$H NMR spectroscopy.

| Rxn # | Protein Crude Extract | % α-(1, 4) | % α-(1, 3) | % α-(1, 3, 6) | % α-(1, 2, 6) | % α-(1, 2) | % α-(1, 6) |
|---|---|---|---|---|---|---|---|
| 1 | NA | 6.3 | 15.4 | 3.0 | 0.0 | 0.0 | 75.3 |
| 2 | *T. reesei* extract, H. tawa mutanase | 3.5 | 15.9 | 5.6 | 0.0 | 0.0 | 75.1 |
| 3 | *T. reesei* extract, no mutanase | 6.4 | 17.8 | 3.3 | 0.0 | 0.0 | 72.5 |
| 4 | *E. coli* extract, mut3264 | 2.1 | 31.9 | 3.4 | 0.0 | 0.0 | 62.7 |
| 5 | *E. coli* extract, no mutanase | 4.8 | 9.4 | 2.7 | 0.0 | 0.0 | 83.1 |

More sucrose was consumed in the first 5 hr when mutanase was present. Crude protein extracts from *T. reesei* that did not express mutanase did not have the synergistic effect on sucrose consumption rate. More oligosaccharides of DP3-DP7 were produced in the presence of mut3264, but not in the presence of *H. tawa* mutanase or the two protein extracts without mutanase. Less leucrose was produced in the presence of mutanase after 24 h when sucrose consumption was near completion. The leucrose to fructose ratios were significantly lower in the presence of mutanases. High concentration of glucose was produced in the presence of the *H. tawa* mutanase. The percentage of α-(1,3) linkages in the soluble oligosaccharides was substantially increased by the presence of mut3264.

Example 23

Production of Soluble Oligosaccharides by GTF-I and MUT3264 Mutanase

Reaction 1 comprised sucrose (100 g/L) and *E. coli* protein crude extract (3% v/v) containing the GTF-I from *Streptococcus sobrinus* (GI:450874, GTF0874; Example 8) in 50 mM phosphate buffer (pH 6.0). Reaction 2 comprised sucrose (100 g/L), *E. coli* protein crude extract (3% v/v) containing GTF-I from *Streptococcus sobrinus* (Example 8) and an *B. subtilis* protein crude extract (10%, v/v) containing *Paenibacillus humicus* mutanase (mut3264, GI:257153264, Example 13) in 50 mM phosphate buffer (pH 6.8). The total volume for each reaction was 10 mL and all reactions were performed at 30° C. with stirring by magnetic stir bar. Aliquots were withdrawn at 5 h, 24 h and 48 h, and reactions were quenched by heating aliquoted samples at 60° C. for 30 min. The insoluble materials were removed by centrifugation, and the resulting supernatant was analyzed by HPLC to determine the concentration of sucrose, glucose, fructose, leucrose and oligosaccharides (Table 13).

TABLE 13

Monosaccharide, disaccharide and oligosaccharide concentrations measured by HPLC.

| Rxn # | Protein crude extract | Time (hr) | Suc. (g/L) | Leuc. (g/L) | Gluc. (g/L) | Fruc. (g/L) | DP7 (g/L) | DP6 (g/L) | DP5 (g/L) | DP4 (g/L) | DP3 (g/L) | DP2 (g/L) | DP3-DP7 (g/L) | Yield DP3-DP7 (%) | Leuc/ Fruc |
|---|---|---|---|---|---|---|---|---|---|---|---|---|---|---|---|
| 1 | none | 5 | 1.6 | 40.8 | 8.9 | 27.5 | 1.5 | 2.5 | 0.0 | 3.0 | 2.6 | 1.6 | 9.6 | 20.6 | 1.48 |
| | | 24 | 1.6 | 37.5 | 11.0 | 33.3 | 1.2 | 0.0 | 2.2 | 2.9 | 3.5 | 4.8 | 9.8 | 21.0 | 1.13 |
| | | 48 | 3.2 | 31.7 | 7.3 | 32.9 | 2.3 | 0.0 | 2.4 | 3.2 | 3.9 | 5.8 | 11.8 | 25.7 | 0.96 |
| 2 | *Bacillis* | 5 | 3.6 | 33.0 | 9.8 | 31.5 | 0.3 | 2.5 | 0.0 | 6.4 | 5.7 | 5.1 | 14.9 | 32.6 | 1.05 |
| | extract | 24 | 6.7 | 32.1 | 11.0 | 33.3 | 0.3 | 0.6 | 1.7 | 4.5 | 5.9 | 8.8 | 13.0 | 29.4 | 0.96 |
| | containing | 48 | 6.5 | 28.2 | 11.8 | 32.1 | 0.5 | 1.2 | 2.7 | 5.6 | 6.2 | 9.2 | 16.2 | 36.6 | 0.88 |
| | mut3264 | | | | | | | | | | | | | | |

Example 24

The Effect of GTF-I Glucosyltransferase and MUT3325 Mutanase Ratios on Oligosaccharides Production Reactions 1-4 comprised sucrose (100 g/L), a *T. reesei* protein crude extract (10% v/v) containing *Penicillium marneffei* ATCC® 18224 mutanase (mut3325); Example 14), and an *E. coli* protein crude extract containing GTF-I from *Streptococcus sobrinus* (GI:450874, GTF0874; Example 8) at one of 0.5%, 2.5%, 5% or 10% (v/v) in 50 mM potassium phosphate buffer at pH 5.4. Reactions 6-9 comprised sucrose (100 g/L), no added MUT3325, and an *E. coli* protein crude extract containing GTF-I from *Streptococcus sobrinus* (GI:450874; Example 4) at one of 0.5%, 2.5%, 5% or 10% (v/v) in 50 mM potassium phosphate buffer at pH 5.4. Reaction 5 contained only sucrose (100 g/L) in the same buffer. All reactions were performed at 37° C. with shaking at 125 rpm. Aliquots (500 μL) were withdrawn from each reaction at 1 h, 5 h and 25 h, and heated at 90° C. for 5 min to stop the reaction. Insoluble materials were removed by centrifugation and filtration. The resulting filtrate was analyzed by HPLC to determine the concentration of sucrose (Suc.), glucose (Gluc.), fructose (Fruc.), leucrose (Leuc.) and oligosaccharides (DP3-7) (Tables 14-16).

TABLE 14

Monosaccharide, disaccharide and oligosaccharide concentrations measured by HPLC (1 h).

| Rxn # | GTF-I % (v/v) | mut3325 % (v/v) | Suc. (g/L) | Leuc. (g/L) | Gluc. (g/L) | Fruc. (g/L) | DP7 (g/L) | DP6 (g/L) | DP5 (g/L) | DP4 (g/L) | DP3 (g/L) | DP2 (g/L) | DP3-DP7 (g/L) | Yield DP3-DP7 (%) |
|---|---|---|---|---|---|---|---|---|---|---|---|---|---|---|
| 1 | 10 | 10 | 42.3 | 11.7 | 3.2 | 25.0 | 0.0 | 6.7 | 1.8 | 5.3 | 0.0 | 0.0 | 13.9 | 49.5 |
| 2 | 5 | 10 | 69.8 | 5.0 | 2.6 | 13.7 | 0.2 | 1.2 | 2.1 | 2.3 | 1.0 | 0.0 | 6.9 | 47.2 |
| 3 | 2.5 | 10 | 84.5 | 1.5 | 1.9 | 7.6 | 0.0 | 0.6 | 1.3 | 1.7 | 0.8 | 0.0 | 4.3 | 57.0 |
| 4 | 0.5 | 10 | 90.4 | 0.0 | 1.0 | 5.1 | 0.0 | 0.4 | 0.9 | 1.4 | 0.7 | 0.0 | 3.3 | 71.6 |
| 5 | 0 | 0 | 99.5 | 0.0 | 0.9 | 0.0 | 0.0 | 0.0 | 0.0 | 0.0 | 0.0 | 0.0 | 0.0 | 0.0 |
| 6 | 10 | 0 | 63.1 | 9.1 | 4.9 | 14.3 | 0.0 | 0.4 | 1.0 | 1.1 | 0.9 | 0.6 | 3.3 | 18.5 |
| 7 | 5 | 0 | 85.4 | 2.6 | 3.7 | 6.3 | 0.0 | 0.0 | 0.2 | 0.4 | 0.4 | 0.3 | 1.1 | 15.2 |
| 8 | 2.5 | 0 | 92.4 | 0.7 | 2.6 | 3.0 | 0.0 | 0.0 | 0.0 | 0.0 | 0.0 | 0.0 | 0.0 | 0.0 |
| 9 | 0.5 | 0 | 97.9 | 0.0 | 1.1 | 0.7 | 0.0 | 0.0 | 0.0 | 0.0 | 0.0 | 0.0 | 0.0 | 0.0 |

TABLE 15

Monosaccharide, disaccharide and oligosaccharide concentrations measured by HPLC (5 h).

| Rxn # | GTF-I % (v/v) | mut3325 % (v/v) | Suc. (g/L) | Leuc. (g/L) | Gluc. (g/L) | Fruc. (g/L) | DP7 (g/L) | DP6 (g/L) | DP5 (g/L) | DP4 (g/L) | DP3 (g/L) | DP2 (g/L) | DP3-DP7 (g/L) | Yield DP3-DP7 (%) |
|---|---|---|---|---|---|---|---|---|---|---|---|---|---|---|
| 1 | 10 | 10 | 0.7 | 27.7 | 3.9 | 38.3 | 0.0 | 2.0 | 4.5 | 5.2 | 3.3 | 0.7 | 14.9 | 30.8 |
| 2 | 5 | 10 | 14.1 | 26.1 | 4.3 | 31.8 | 0.7 | 3.4 | 6.3 | 6.3 | 2.6 | 0.4 | 19.3 | 46.3 |
| 3 | 2.5 | 10 | 59.6 | 9.5 | 3.5 | 16.8 | 0.0 | 1.0 | 3.0 | 3.5 | 1.8 | 0.6 | 9.3 | 47.2 |
| 4 | 0.5 | 10 | 78.1 | 1.3 | 1.7 | 11.2 | 0.0 | 0.6 | 2.3 | 3.3 | 1.8 | 0.2 | 8.0 | 75.3 |
| 5 | 0 | 0 | 99.5 | 0.0 | 1.2 | 0.0 | 0.0 | 0.0 | 0.0 | 0.0 | 0.0 | 0.0 | 0.0 | 0.0 |
| 6 | 10 | 0 | 0.4 | 34.3 | 6.4 | 33.5 | 0.8 | 1.9 | 2.6 | 2.3 | 1.2 | 1.4 | 8.8 | 18.1 |
| 7 | 5 | 0 | 42.6 | 17.9 | 5.8 | 21.6 | 0.2 | 0.9 | 1.7 | 1.6 | 1.1 | 0.6 | 5.5 | 19.5 |
| 8 | 2.5 | 0 | 73.8 | 6.5 | 4.6 | 10.8 | 0.0 | 0.2 | 0.7 | 0.9 | 0.7 | 0.5 | 2.5 | 19.3 |
| 9 | 0.5 | 0 | 94.9 | 0.4 | 2.2 | 2.2 | 0.0 | 0.0 | 0.0 | 0.0 | 0.0 | 0.0 | 0.0 | 0.0 |

TABLE 16

Monosaccharide, disaccharide and oligosaccharide concentrations measured by HPLC (25 h).

| Rxn # | GTF-I % (v/v) | mut3325 % (v/v) | Suc. (g/L) | Leuc. (g/L) | Gluc. (g/L) | Fruc. (g/L) | DP7 (g/L) | DP6 (g/L) | DP5 (g/L) | DP4 (g/L) | DP3 (g/L) | DP2 (g/L) | DP3-DP7 (g/L) | Yield DP3-DP7 (%) |
|---|---|---|---|---|---|---|---|---|---|---|---|---|---|---|
| 1 | 10 | 10 | 4.8 | 29.4 | 2.8 | 34.8 | 0.0 | 0.7 | 1.9 | 4.0 | 6.1 | 6.9 | 12.7 | 27.4 |
| 2 | 5 | 10 | 4.0 | 33.4 | 3.2 | 33.0 | 0.0 | 0.5 | 3.7 | 6.4 | 7.5 | 5.8 | 18.1 | 38.6 |
| 3 | 2.5 | 10 | 2.7 | 33.7 | 4.2 | 33.9 | 0.0 | 1.4 | 5.9 | 8.0 | 6.9 | 4.5 | 22.2 | 46.7 |
| 4 | 0.5 | 10 | 34.4 | 14.6 | 3.6 | 27.1 | 0.0 | 0.8 | 6.0 | 7.8 | 4.9 | 2.5 | 19.4 | 60.8 |
| 5 | 0 | 0 | 98.0 | 0.0 | 1.5 | 0.9 | 0.0 | 0.0 | 0.0 | 0.0 | 0.0 | 0.0 | 0.0 | 0.0 |
| 6 | 10 | 0 | 0.5 | 33.6 | 5.8 | 34.2 | 0.7 | 1.7 | 2.3 | 2.2 | 1.8 | 0.9 | 8.7 | 17.9 |
| 7 | 5 | 0 | 0.4 | 34.8 | 5.7 | 33.1 | 0.8 | 2.0 | 2.6 | 2.3 | 1.5 | 1.6 | 9.2 | 19.0 |
| 8 | 2.5 | 0 | 0.5 | 36.9 | 6.0 | 32.8 | 0.9 | 2.2 | 3.1 | 2.8 | 1.3 | 0.0 | 10.3 | 21.3 |
| 9 | 0.5 | 0 | 74.1 | 7.3 | 4.7 | 10.8 | 0.2 | 0.7 | 1.0 | 0.8 | 0.5 | 0.0 | 3.1 | 24.9 |

A comparison of the data in Tables 14, 15, and 16 shows that sucrose conversion was faster in the presence of mut3325 at all concentrations of GTF-I. The total amount and yield of DP3 to DP7 significantly increased in the reactions in the presence of mut3325. Higher mut3325 to GTF-I ratio resulted in higher yields of DP3-DP7 oligosaccharides.

Example 25

The Effect of the GTF-J Glucosyltransferase and MUT3325 Mutanase Ratios on Oligosaccharides Production The reactions 1-3 below comprised 200 g/L sucrose, varied concentrations of GTF-J (GTF-J from *S. salivarius*; GI:47527, Example 3) (0.6 and 1% v/v) and varied concentrations of mut3325 (*Penicillium marneffei* ATCC® 18224 mutanase; Example 14) (10 and 20%) as indicated in the Table 10. All reactions were performed at 37° C. with tilt shaking at 125 rpm. The reactions were quenched after 16-19 h by heating at 90° C. for 5 min. The insoluble materials were removed by centrifugation and filtration. The soluble product mixture was analyzed by HPLC to determine the concentration of sucrose, glucose, fructose, leucrose and oligosaccharides (Table 17). The data in Table 17 shows that a higher ratio of mut3325 to GTF-J produced a higher yield of soluble DP3 to DP7oligosaccharides.

TABLE 17

Monosaccharide, disaccharide and oligosaccharide concentrations measured by HPLC (25 h).

| Rxn # | GTF-J % (v/v) | mut3325 % (v/v) | Suc. (g/L) | Leuc. (g/L) | Gluc. (g/L) | Fruc. (g/L) | DP7 (g/L) | DP6 (g/L) | DP5 (g/L) | DP4 (g/L) | DP3 (g/L) | DP2 (g/L) | DP3-DP7 (g/L) | Yield DP3-DP7 (%) |
|---|---|---|---|---|---|---|---|---|---|---|---|---|---|---|
| 1 | 1 | 10 | 1.6 | 56.0 | 2.9 | 70.0 | 0 | 0 | 4.0 | 6.1 | 6.8 | 2.6 | 16.9 | 17.5 |
| 2 | 0.6 | 10 | 1.0 | 54.4 | 3.2 | 71.0 | 0 | 0.2 | 7.6 | 8.7 | 8.7 | 2.2 | 25.3 | 26.0 |
| 3 | 0.6 | 20 | 5.1 | 50.0 | 0.0 | 78.2 | 0 | 0.2 | 12.6 | 17.4 | 15.0 | 8.9 | 45.2 | 47.6 |

Example 26

Effect of pH on the Oligosaccharide Production

The reactions 1-3 below comprised of sucrose (100 g/L), gtf-J (0.3% by volume, Example 3) and *E. coli* crude protein extract containing mut3264 mutanase (10% volume, Example 12) at pH 5.0, 6.0 and 6.8. The buffers used for various pH were: 50 mM citrate buffer, pH 5.0; 50 mM phosphate, pH. 6.0 and 50 mM phosphate pH 6.8. The reactions were carried out at 30° C. with shaking at 125 rpm. Aliquots from each reaction were withdrawn at 5 hr, 24 hr, 48 hr and 72 hr and quenched by heating at 90° C. for 5 min. The insoluble materials were removed by centrifugation and filtration. The soluble product mixture was analyzed by HPLC to determine the concentration of sucrose, glucose, fructose, leucrose and oligosaccharides (Table 18). The data in Table 18 shows that DP4 oligosaccharide produced at pH 5.0 and pH 6.8 was further degraded by the mutanase to smaller DPs with prolonged incubation, while no further degradation was observed at pH 6.0.

TABLE 18

Monosaccharide, disaccharide and oligosaccharide concentrations measured by HPLC.

| Rxn # | GTF-J % (v/v) | *E. coli* mut3264 % (v/v) | pH | Time (h) | Suc. (g/L) | Leuc. (g/L) | Gluc. (g/L) | Fruc. (g/L) | DP7 (g/L) | DP6 (g/L) | DP5 (g/L) | DP4 (g/L) | DP3 (g/L) | DP2 (g/L) | DP3-DP7 (g/L) |
|---|---|---|---|---|---|---|---|---|---|---|---|---|---|---|---|
| 1 | 0.3 | 10 | 5.0 | 5 | 46.4 | 12.8 | 3.5 | 30.8 | 0.0 | 0.1 | 0.0 | 13.7 | 7.7 | 4.0 | 21.6 |
| | | | | 24 | 12.2 | 19.1 | 2.2 | 43.9 | 0.0 | 0.0 | 0.0 | 14.7 | 11.9 | 8.7 | 26.6 |
| | | | | 48 | 18.3 | 19.1 | 0.9 | 43.3 | 0.0 | 0.0 | 0.0 | 9.1 | 14.2 | 15.1 | 23.3 |
| | | | | 72 | 25.6 | 22.0 | 2.3 | 43.5 | 0.0 | 0.0 | 0.0 | 4.4 | 13.3 | 18.2 | 17.7 |
| 2 | 0.3 | 10 | 6.0 | 5 | 38.3 | 10.2 | 3.9 | 30.8 | 0.0 | 0.1 | 0.0 | 13.8 | 8.1 | 4.1 | 22.0 |
| | | | | 24 | 9.6 | 19.1 | 4.3 | 41.0 | 0.0 | 0.0 | 0.0 | 14.8 | 11.0 | 8.1 | 25.8 |
| | | | | 48 | 10.7 | 20.5 | 4.7 | 43.5 | 0.0 | 0.0 | 0.0 | 15.0 | 11.5 | 8.5 | 26.5 |
| | | | | 72 | 9.3 | 18.2 | 2.1 | 40.4 | 0.0 | 0.0 | 0.0 | 14.4 | 11.2 | 8.2 | 25.6 |
| 3 | 0.3 | 10 | 6.8 | 5 | 39.2 | 9.4 | 3.6 | 29.0 | 0.0 | 0.1 | 0.0 | 13.4 | 7.2 | 3.7 | 20.8 |
| | | | | 24 | 8.7 | 18.9 | 1.7 | 40.1 | 0.0 | 0.0 | 0.0 | 13.8 | 11.5 | 8.9 | 25.3 |
| | | | | 48 | 13.7 | 19.1 | 0.9 | 40.1 | 0.0 | 0.0 | 0.0 | 8.9 | 12.5 | 13.6 | 21.4 |
| | | | | 72 | 14.3 | 18.6 | 0.1 | 39.0 | 0.0 | 0.0 | 0.0 | 7.7 | 12.7 | 14.3 | 20.4 |

Example 27

Effect of Temperature on the Oligosaccharide Production

The reactions 1-4 below comprised of sucrose (100 g/L), phosphate buffer (50 mM, pH 6.0), GTF-J (0.3% by volume, Example 3) and *E. coli* crude extract of mut3264 mutanase (10% by volume, Example 12). The reactions were carried out at 30° C., 40° C., 50° C. and 60° C. as specified in Table 19 with shaking at 125 rpm. The reactions were quenched after 24 hr by heating at 90° C. for 5 min. The insoluble materials were removed by centrifugation and filtration. The soluble product mixture was analyzed by HPLC to determine the concentration of sucrose, glucose, fructose, leucrose and oligosaccharides (Table 19). The total amount of oligosaccharides of DP3 to DP7 was the highest at 40° C.

TABLE 19

Monosaccharide, disaccharide and oligosaccharide concentrations measured by HPLC.

| Rxn # | GTF-J % (v/v) | *E. Coli* mut3264 % (v/v) | Temp. (° C.) | Time (h) | Suc. (g/L) | Leuc. (g/L) | Gluc. (g/L) | Fruc. (g/L) | DP7 (g/L) | DP6 (g/L) | DP5 (g/L) | DP4 (g/L) | DP3 (g/L) | DP2 (g/L) | DP3-DP7 (g/L) |
|---|---|---|---|---|---|---|---|---|---|---|---|---|---|---|---|
| 1 | 0.3 | 10 | 30 | 24 | 11.0 | 17.3 | 3.9 | 41.2 | 0 | 0.00 | 0 | 15.0 | 11.0 | 7.7 | 26.0 |
| 2 | 0.3 | 10 | 40 | 24 | 7.1 | 12.5 | 5.7 | 46.2 | 0 | 0.00 | 0 | 20.5 | 12.3 | 7.6 | 32.8 |
| 3 | 0.3 | 10 | 50 | 24 | 60.8 | 8.9 | 7.6 | 20.9 | 0 | 0.00 | 0 | 2.4 | 4.5 | 5.3 | 6.9 |
| 4 | 0.3 | 10 | 60 | 24 | 103.5 | 0.0 | 0.4 | 1.2 | 0 | 0.00 | 0 | 0.2 | 0.0 | 0.0 | 0.2 |

Example 28

Effect of MUT6505 Mutanase on the Sucrose Consumption by GTF-J

Various concentrations of a *T. reesei* crude protein extract containing mut6505 (*Aspergillus nidulans* FGSC A4 mutanase GI:259486505; Example 16) as indicated in Table 20 (below) were incubated with 100 g/L sucrose, and 0.3% (v/v) of an *E. coli* crude protein extract containing GTF-J (Example 3) in final volumes of 1 mL. The reactions were incubated at 37° C. with shaking 150 rpm for 3 h. Reactions were quenched by heating at 90° C. for 3 min. The insoluble materials were removed by centrifugation and filtration through 0.2 μm sterile filter. The filtrate was analyzed on HPLC as described in the general methods. The data (Table 20) show that faster sucrose consumption correlates with increased mutanase concentration.

TABLE 20

Effect of mut6505 mutanase on sucrose conversion by GTF-J. 100 g/L sucrose, 0.3% (v/v) GTF-J extract, 37° C., 3 h

| | 10% mut6505 | 4% mut6505 | 1% mut6505 |
|---|---|---|---|
| DP6 | 0.0 | 0.0 | 0.0 |
| DP5 | 0.0 | 0.0 | 0.0 |
| DP4 | 0.3 | 0.2 | 0.0 |
| DP3 | 2.8 | 1.4 | 0.8 |
| DP2 | 3.1 | 2.0 | 1.6 |
| Sucrose | 48.9 | 71.5 | 78.9 |
| Leucrose | 8.7 | 4.8 | 3.1 |
| Glucose | 16.2 | 8.4 | 6.2 |

TABLE 20-continued

Effect of mut6505 mutanase on sucrose conversion by GTF-J. 100 g/L sucrose, 0.3% (v/v) GTF-J extract, 37° C., 3 h

| | 10% mut6505 | 4% mut6505 | 1% mut6505 |
|---|---|---|---|
| Fructose | 23.5 | 12.8 | 9.7 |
| DP2 - DP7 | 6.1 | 3.6 | 2.4 |
| DP3 - DP7 | 3.0 | 1.6 | 0.8 |
| Total | 103.3 | 101.2 | 100.4 |

Example 29

Production of Oligosaccharides by GTF-S and MUT3264

Reactions comprised sucrose (100 g/L), *E. coli* crude protein extract containing GTF-S (*Streptococcus* sp. C150 GI:495810459, GTF0459; Example 9) (10% v/v) in 50 mM phosphate buffer, pH 6.0, or comprised sucrose (100 g/L), *E. coli* crude protein extract containing GTF-S (*Streptococcus* sp. C150 GI:495810459, GTF0459; Example 9) (10% v/v) and *E. coli* crude protein extract containing mut3264 (10% (v/v); Example 12) in 50 mM phosphate buffer, pH 6.0. The total volume for each reaction was 10 mL and all reactions were performed at 37° C. with shaking at 125 rpm. Aliquots were withdrawn at 3, 6, 23 and 26 h and reactions were quenched by heating at 95° C. for 5 min. The insoluble materials were removed by centrifugation and filtration. The filtrate was analyzed by HPLC to determine the concentration of sucrose, glucose, fructose, leucrose and oligosaccharides (Table 21).

TABLE 21

Monosaccharide, disaccharide and oligosaccharide concentrations measured by HPLC.

| Gtf GI | comments | Time, (h) | Suc. (g/L) | Leuc. (g/L) | Gluc. (g/L) | Fruc. (g/L) | DP8+ (g/L) | DP7 (g/L) | DP6 (g/L) | DP5 (g/L) | DP4 (g/L) | DP3 (g/L) | Sum DP3-7 (g/L) | DP2 (g/L) |
|---|---|---|---|---|---|---|---|---|---|---|---|---|---|---|
| GTF0459 | 10% GTF | 3 | 79.1 | 0.7 | 3.5 | 11.8 | 0.0 | 0.3 | 0.5 | 0.7 | 0.9 | 1.3 | 3.6 | 1.2 |
| | | 6 | 58.3 | 1.9 | 4.3 | 22.0 | 4.6 | 1.9 | 1.9 | 1.8 | 1.7 | 1.9 | 9.2 | 1.9 |
| | | 23 | 8.9 | 5.9 | 4.2 | 44.5 | 17.2 | 4.1 | 3.8 | 3.3 | 2.8 | 2.8 | 16.8 | 2.5 |
| | | 26 | 4.6 | 6.5 | 4.3 | 46.8 | 17.7 | 4.3 | 4.0 | 3.5 | 3.0 | 2.8 | 17.5 | 2.6 |
| GTF0459 | 10% GTF + mut3264 | 3 | 77.9 | 0.8 | 4.0 | 12.8 | 0.0 | 0.0 | 3.8 | 0.2 | 2.7 | 2.4 | 5.4 | 2.2 |
| | | 6 | 52.3 | 2.0 | 6.5 | 25.9 | 0.0 | 0.0 | 0.1 | 1.1 | 7.2 | 4.8 | 13.3 | 4.1 |
| | | 23 | 9.4 | 4.9 | 10.1 | 48.3 | 3.8 | 2.1 | 2.2 | 2.0 | 1.8 | 2.1 | 10.2 | 2.2 |
| | | 26 | 9.9 | 4.9 | 10.1 | 48.2 | 0.0 | 0.2 | 0.6 | 1.3 | 13.9 | 10.5 | 26.4 | 10.5 |

Example 30

Isolation of Soluble Oligosaccharide Fiber Produced by the Combination of GTF-J and MUT3264

A 200 mL reaction containing 200 g/L sucrose, *E. coli* concentrated crude protein extract (1.0% v/v) containing GTF-J from *S. salivarius* (GI:47527, GTF7527; Example 3), and *E. coli* crude protein extract (10% v/v) containing *Paenibacillus humicus* mutanase (MUT3264, GI:257153264; Example 12) in distilled, deionized H2O, was stirred at 30° C. for 20 h, then heated to 90° C. for 15 min to inactivate the enzymes. The resulting product mixture was centrifuged and the resulting supernatant analyzed by HPLC for soluble monosaccharides, disaccharides and oligosaccharides, then 88 mL of the supernatant was purified by SEC using BioGel P2 resin (BioRad). The SEC fractions that contained oligosaccharides ≥DP3 were combined and concentrated by rotary evaporation for analysis by HPLC (Table 22).

TABLE 22

Soluble oligosaccharide oligomer/polymer produced by GTF-J/mut3264. 200 g/L sucrose, GTF-J, mut3264, 30° C., 20 h

| | Product mixture, g/L | SEC-purified product, g/L |
|---|---|---|
| DP7 | 0 | 0 |
| DP6 | 0 | 0 |
| DP5 | 0 | 0.4 |
| DP4 | 18.0 | 146.9 |
| DP3 | 11.2 | 26.8 |
| DP2 | 10.1 | 0.0 |
| Sucrose | 8.6 | 0.0 |
| Leucrose | 71.4 | 0.0 |
| Glucose | 11.4 | 0.0 |
| Fructose | 68.3 | 0.0 |
| Sum DP2 – DP7 | 39.3 | 174.1 |
| Sum DP3 – DP7 | 29.2 | 174.1 |

Example 31

Isolation of Soluble Oligosaccharide Fiber Produced by The Combination Of GTF-L And MUT3264

A 100 mL reaction containing 210 g/L sucrose, *E. coli* concentrated crude protein extract (10% v/v) containing GTF-L from *S. salivarius* (GI #662379; Example 5), and *E. coli* crude protein extract (10% v/v) comprising a *Paenibacillus humicus* mutanase (MUT3264, GI:257153264; Example 12) in distilled, deionized $H_2O$, was stirred at 37° C. for 24 h, then heated to 90° C. for 15 min to inactivate the enzymes. The resulting product mixture was centrifuged and the resulting supernatant analyzed by HPLC for soluble monosaccharides, disaccharides and oligosaccharides, then 88 mL of the supernatant was purified by SEC using BioGel P2 resin (BioRad). The SEC fractions that contained oligosaccharides ≥DP3 were combined and concentrated by rotary evaporation for analysis by HPLC (Table 23).

TABLE 23

Soluble oligosaccharide oligomer/polymer produced by GTF-L/mut3264 mutanase. 210 g/L sucrose, GTF-L, mut3264, 37° C., 24 h

| | Product mixture, g/L | SEC-purified product, g/L |
|---|---|---|
| DP7 | 4.6 | 13.6 |
| DP6 | 6.6 | 16.6 |
| DP5 | 8.0 | 20.5 |
| DP4 | 11.7 | 20.2 |
| DP3 | 12.4 | 5.7 |
| DP2 | 22.0 | 1.1 |
| Sucrose | 10.6 | 0.6 |
| Leucrose | 59.0 | 0.0 |
| Glucose | 12.6 | 0.0 |
| Fructose | 71.5 | 0.0 |
| Sum DP2 – DP7 | 65.3 | 77.7 |
| Sum DP3 – DP7 | 43.3 | 76.6 |

Example 32

Isolation of Soluble Oligosaccharide Fiber Produced by the Combination of GTF-J and MUT3325

A 100 mL reaction containing 210 g/L sucrose, *E. coli* concentrated crude protein extract (0.6% v/v) containing GTF-J from *S. salivarius* (GI #47527; Example 3) and *T. reesei* crude protein extract (20% v/v) comprising a mutanase from *Penicillium marneffei* ATCC® 18224 (mut3325, GI:212533325; Example 14) in distilled, deionized $H_2O$, was stirred at 37° C. for 24 h, then heated to 90° C. for 15 min to inactivate the enzymes. The resulting product mixture was centrifuged and the resulting supernatant analyzed by HPLC for soluble monosaccharides, disaccharides and oligosaccharides, then 84 mL of the supernatant was purified by SEC using BioGel P2 resin (BioRad). The SEC fractions that contained oligosaccharides ≥DP3 were combined and concentrated by rotary evaporation for analysis by HPLC (Table 24).

TABLE 24

Soluble oligosaccharide oligomer/polymer produced by GTF-J/mut3325 mutanase. 210 g/L sucrose, GTF-J, mut3325, 37° C., 24 h

| | Product mixture, g/L | SEC-purified product, g/L |
|---|---|---|
| DP7 | 0.0 | 0.0 |
| DP6 | 0.3 | 0.0 |
| DP5 | 14.1 | 60.2 |
| DP4 | 18.8 | 63.9 |
| DP3 | 16.0 | 18.9 |
| DP2 | 3.2 | 0.0 |
| Sucrose | 3.6 | 0.0 |
| Leucrose | 48.6 | 0.0 |
| Glucose | 4.9 | 0.0 |
| Fructose | 78.3 | 0.0 |
| Sum DP2 – DP7 | 52.4 | 143.0 |
| Sum DP3 – DP7 | 49.2 | 143.0 |

Example 33

Isolation of Soluble Oligosaccharide Fiber Produced by the Combination of GTF-I and MUT3325

A 100 mL reaction containing 200 g/L sucrose, *E. coli* protein crude extract (5% v/v) containing the GTF-I from *Streptococcus sobrinus* (GI:450874, Example 8) and *T. reesei* crude protein extract (15% v/v) comprising a mutanase from *Penicillium marneffei* ATCC® 18224 (MUT3325, GI:212533325; Example 14) in distilled, deionized $H_2O$, was stirred at 37° C. for 24 h, then heated to 90° C. for 15 min to inactivate the enzymes. The resulting product mixture was centrifuged and the resulting supernatant analyzed by HPLC for soluble monosaccharides, disaccharides and oligosaccharides, then 87 mL of the supernatant was purified by SEC using BioGel P2 resin (BioRad). The SEC fractions that contained oligosaccharides ≥DP3 were combined and concentrated by rotary evaporation for analysis by HPLC (Table 25).

TABLE 25

Soluble oligosaccharide oligomer/polymer produced by GTF-I/mut3325 mutanase. 200 g/L sucrose, GTF-I, mut3325, 37° C., 24 h

| | Product mixture, g/L | SEC-purified product, g/L |
|---|---|---|
| DP7 | 1.5 | 12.3 |
| DP6 | 4.4 | 16.0 |
| DP5 | 14.5 | 60.5 |
| DP4 | 16.8 | 53.8 |
| DP3 | 12.3 | 15.0 |
| DP2 | 2.3 | 0.0 |
| Sucrose | 4.8 | 0.0 |
| Leucrose | 76.8 | 0.0 |
| Glucose | 6.7 | 0.0 |
| Fructose | 62.3 | 0.2 |
| Sum DP2 – DP7 | 51.7 | 157.6 |
| Sum DP3 – DP7 | 49.4 | 157.6 |

Example 34

Isolation of Soluble Oligosaccharide Fiber Produced by the Combination of GTF-S and MUT3264

A 200 mL reaction containing 210 g/L sucrose, *E. coli* crude protein extract (10% v/v) containing GTF-S from *Streptococcus* sp. C150 (GI:495810459; Example 9), and *E. coli* crude protein extract (10% v/v) comprising a mutanase from *Paenibacillus humicus* (MUT3264, GI:257153264; Example 12) in distilled, deionized $H_2O$, was stirred at 37° C. for 40 h, then stored for 84 h at 4° C. prior to heating to 90° C. for 15 min to inactivate the enzymes. The resulting product mixture was centrifuged and the resulting supernatant analyzed by HPLC for soluble monosaccharides, disaccharides and oligosaccharides, then the supernatant was purified by SEC using BioGel P2 resin (BioRad). The SEC fractions that contained oligosaccharides ≥DP3 were combined and concentrated by rotary evaporation for analysis by HPLC (Table 26).

TABLE 26

Soluble oligosaccharide fiber produced by GTF-S/mut3264 mutanase. 210 g/L sucrose, GTF-S, mut3264, 37° C., 40 h

| | Product mixture, g/L | SEC-purified product, g/L |
|---|---|---|
| DP7 | 10.0 | 22.6 |
| DP6 | 12.4 | 42.2 |
| DP5 | 19.4 | 83.3 |
| DP4 | 19.9 | 74.1 |
| DP3 | 13.4 | 22.6 |
| DP2 | 10.4 | 0 |
| Sucrose | 13.4 | 0 |
| Leucrose | 12.7 | 0 |
| Glucose | 8.9 | 0 |
| Fructose | 95.7 | 0 |
| Sum DP2 – DP7 | 85.5 | 244.8 |
| Sum DP3 – DP7 | 75.1 | 244.8 |

Example 35

Isolation of Soluble Oligosaccharide Fiber Produced by the Combination of GTF-B and MUT3264

A 200 mL reaction containing 100 g/L sucrose, *E. coli* crude protein extract (10% v/v) containing GTF-B from *Streptococcus mutans* NN2025 (GI:290580544; Example 6), and *E. coli* crude protein extract (10% v/v) comprising a mutanase from *Paenibacillus humicus* (MUT3264, GI:257153264; Example 12) in distilled, deionized $H_2O$, was stirred at 37° C. for 24 h, then heated to 90° C. for 15 min to inactivate the enzymes. The resulting product mixture was centrifuged and the resulting supernatant analyzed by HPLC for soluble monosaccharides, disaccharides and oligosaccharides, then 132 mL of the supernatant was purified by SEC using BioGel P2 resin (BioRad). The SEC fractions that contained oligosaccharides ≥DP3 were combined and concentrated by rotary evaporation for analysis by HPLC (Table 27).

TABLE 27

Soluble oligosaccharide oligomer/polymer produced by GTF-B/mut3264 mutanase. 100 g/L sucrose, GTF-B, mut3264, 37° C., 24 h

| | Product mixture, g/L | SEC-purified product, g/L |
|---|---|---|
| DP7 | 2.8 | 11.7 |
| DP6 | 4.0 | 14.0 |
| DP5 | 4.3 | 13.2 |
| DP4 | 3.5 | 9.4 |
| DP3 | 4.4 | 2.4 |
| DP2 | 9.8 | 0.0 |
| Sucrose | 10.3 | 0.2 |
| Leucrose | 15.6 | 0.0 |
| Glucose | 2.9 | 0.0 |
| Fructose | 41.7 | 0.1 |
| Sum DP2 - DP7 | 28.8 | 50.7 |
| Sum DP3 - DP7 | 19.0 | 50.7 |

Example 36

Isolation of Soluble Oligosaccharide Fiber Produced by the Combination of GTF-S and MUT3325

A 600 mL reaction containing 300 g/L sucrose, *B. subtilis* crude protein extract (20% v/v) containing GTF-S from *Streptococcus* sp. C150 (GI:495810459; Example 11), and *T. reesei* crude protein extract (2.5% v/v) comprising a mutanase from *Penicillium marneffei* ATCC® 18224 (MUT3325, GI:212533325; Example 14) in distilled, deionized $H_2O$, was shaken at 125 rpm and 37° C. for 27.5 h, then heated in a microwave oven (1000 Watts) for 4 min to inactivate the enzymes. The resulting product mixture was centrifuged and the resulting supernatant analyzed by HPLC for soluble monosaccharides, disaccharides and oligosaccharides, then entire supernatant was purified by SEC using BioGel P2 resin (BioRad). The SEC fractions that contained oligosaccharides ≥DP3 were combined and concentrated by rotary evaporation for analysis by HPLC (Table 28).

TABLE 28

Soluble oligosaccharide fiber produced by GTF-S/mut3325 mutanase. 300 g/L sucrose, GTF-S, mut3325, 37° C., 24 h

| | Product mixture, g/L | SEC-purified product, g/L |
|---|---|---|
| DP7 | 4.7 | 10.4 |
| DP6 | 16.4 | 31.1 |
| DP5 | 27.1 | 47.5 |
| DP4 | 30.8 | 38.8 |
| DP3 | 25.6 | 30.5 |
| DP2 | 12.8 | 4.1 |
| Sucrose | 14.0 | 2.5 |
| Leucrose | 18.5 | 0.0 |
| Glucose | 13.0 | 1.4 |
| Fructose | 138.2 | 0.4 |
| Sum DP2 - DP7 | 117.5 | 162.4 |
| Sum DP3 - DP7 | 104.7 | 158.3 |

Example 37

Isolation of Soluble Oligosaccharide Fiber Produced by GTF-J

A 3000 mL reaction containing 200 g/L sucrose and *E. coli* concentrated crude protein extract (1.0% v/v) containing GTF-J from *S. salivarius* (GI #47527; Example 3) in distilled, deionized $H_2O$, was shaken at 125 rpm at pH 5.5 and 47° C. for 21 h, then heated to 60° C. for 30 min to inactivate the enzyme. The resulting product mixture was centrifuged and the resulting supernatant was analyzed by HPLC for soluble monosaccharides, disaccharides and oligosaccharides; the supernatant was then concentrated to 900 mL by rotary evaporation and purified by SEC using BioGel P2 resin (BioRad). The SEC fractions that contained oligosaccharides ≥DP3 were combined and concentrated by rotary evaporation for analysis by HPLC (Table 29).

TABLE 29

Soluble oligosaccharide fiber produced by GTF-J. 200 g/L sucrose, GTF-J, 47° C., 24 h

| | Product mixture, g/L | SEC-purified product, g/L |
|---|---|---|
| DP7 | 0.8 | 2.4 |
| DP6 | 1.5 | 6.5 |
| DP5 | 2.9 | 24.0 |
| DP4 | 4.8 | 26.9 |
| DP3 | 6.5 | 10.7 |
| DP2 | 9.1 | 2.1 |
| Sucrose | 0.7 | 1.5 |
| Leucrose | 55.0 | 0.0 |
| Glucose | 11.9 | 0.3 |
| Fructose | 73.6 | 0.6 |
| Sum DP2 - DP7 | 25.6 | 72.6 |
| Sum DP3 - DP7 | 16.5 | 70.5 |

Example 37a

Isolation of Soluble Oligosaccharide Fiber Produced by the Combination of GTF-S Homolog GTF0974 and MUT3325

A 250 mL reaction containing 450 g/L sucrose, *B. subtilis* crude protein extract (5% v/v) containing GTF0974 from *Streptococcus salivarius* 57.1 (GI: 387760974; Examples 11A and 11D), and *T. reesei* crude protein extract UFC (0.075% v/v) comprising a mutanase from *Penicillium marneffei* ATCC® 18224 (MUT3325, GI:212533325; Example 15) in distilled, deionized $H_2O$, was stirred at pH 5.5 and 47° C. for 21 h, then heated to 90° C. for 30 min to inactivate the enzymes. The resulting product mixture was centrifuged and the resulting supernatant analyzed by HPLC for soluble monosaccharides, disaccharides and oligosaccharides (Table 30), then the oligosaccharides were isolated from the supernatant by SEC at 40° C. using Diaion UBK 530 (Na+ form) resin (Mitsubishi). The SEC fractions that contained oligosaccharides ≥DP3 were combined and concentrated by rotary evaporation for analysis by HPLC (Table 30). The combined SEC fractions were diluted to 5 wt % dry solids (DS) and freeze-dried to produce the fiber as a dry solid.

TABLE 30

Soluble oligosaccharide fiber produced by GTF0974/mut3325 mutanase.
450 g/L sucrose, GTF0974, mut3325, 47° C., 21 h

| | Product mixture, g/L | SEC-purified product, g/L | SEC-purified product % (wt/wt DS) |
|---|---|---|---|
| DP7+ | 80.6 | 35.5 | 35.3 |
| DP6 | 34.8 | 19.4 | 19.3 |
| DP5 | 37.0 | 17.9 | 17.8 |
| DP4 | 33.7 | 15.7 | 15.6 |
| DP3 | 18.2 | 8.0 | 8.0 |
| DP2 | 12.1 | 1.8 | 1.8 |
| Sucrose | 10.1 | 0.5 | 0.5 |
| Leucrose | 43.4 | 1.7 | 1.7 |
| Glucose | 6.9 | 0.0 | 0.0 |
| Fructose | 200.2 | 0.0 | 0.0 |
| Sum DP2 - DP7+ | 216.4 | 98.3 | 97.8 |
| Sum DP3 - DP7+ | 204.3 | 96.5 | 96.0 |

Example 37B

Isolation of Soluble Oligosaccharide Fiber Produced by the Combination of GTF-S Homolog GTF4336 and MUT3325

A 250 mL reaction containing 450 g/L sucrose, *B. subtilis* crude protein extract (5% v/v) containing GTF4336 from *Streptococcus salivarius* SK126 (GI: 488974336; Examples 11A and 11D), and *T. reesei* crude protein extract UFC (0.075% v/v) comprising a mutanase from *Penicillium marneffei* ATCC® 18224 (MUT3325, GI:212533325; Example 15) in distilled, deionized $H_2O$, was stirred at pH 5.5 and 47° C. for 21 h, then heated to 90° C. for 30 min to inactivate the enzymes. The resulting product mixture was centrifuged and the resulting supernatant analyzed by HPLC for soluble monosaccharides, disaccharides and oligosaccharides (Table 31), then the oligosaccharides were isolated from the supernatant by SEC at 40° C. using Diaion UBK 530 (Na+ form) resin (Mitsubishi). The SEC fractions that contained oligosaccharides ≥DP3 were combined and concentrated by rotary evaporation for analysis by HPLC (Table 31). The combined SEC fractions were diluted to 5 wt % dry solids (DS) and freeze-dried to produce the fiber as a dry solid.

TABLE 31

Soluble oligosaccharide fiber produced by GTF4336/mut3325 mutanase.
450 g/L sucrose, GTF4336, mut3325, 47° C., 21 h

| | Product mixture, g/L | SEC-purified product, g/L | SEC-purified product % (wt/wt DS) |
|---|---|---|---|
| DP7+ | 87.0 | 21.0 | 21.6 |
| DP6 | 31.6 | 20.5 | 21.2 |
| DP5 | 29.8 | 23.5 | 24.2 |
| DP4 | 23.4 | 20.8 | 21.4 |
| DP3 | 12.8 | 8.4 | 8.6 |
| DP2 | 8.8 | 2.6 | 2.7 |
| Sucrose | 54.7 | 0.2 | 0.2 |
| Leucrose | 35.3 | 0.1 | 0.1 |
| Glucose | 6.9 | 0.0 | 0.0 |
| Fructose | 182.5 | 0.0 | 0.0 |
| Sum DP2 - DP7+ | 193.3 | 96.8 | 99.7 |
| Sum DP3 - DP7+ | 184.5 | 94.2 | 97.0 |

Example 37C

Isolation of Soluble Oligosaccharide Fiber Produced by the Combination of GTF-S Homolog GTF0470 and MUT3325

A 250 mL reaction containing 450 g/L sucrose, *B. subtilis* crude protein extract (5% v/v) containing GTF0470 from *Streptococcus salivarius* K12 (GI: 488980470; Examples 11A and 11 D), and *T. reesei* crude protein extract UFC (0.075% v/v) comprising a mutanase from *Penicillium marneffei* ATCC® 18224 (MUT3325, GI-212533325; Example 15) in distilled, deionized $H_2O$, was stirred at pH 5.5 and 47° C. for 44 h, then heated to 90° C. for 30 min to inactivate the enzymes. The resulting product mixture was centrifuged and the resulting supernatant analyzed by HPLC for soluble monosaccharides, disaccharides and oligosaccharides (Table 32), then the oligosaccharides were isolated from the supernatant by SEC at 40° C. using Diaion UBK 530 (Na+ form) resin (Mitsubishi). The SEC fractions that contained oligosaccharides ≥DP3 were combined and concentrated by rotary evaporation for analysis by HPLC (Table 32). The combined SEC fractions were diluted to 5 wt % dry solids (DS) and freeze-dried to produce the fiber as a dry solid.

TABLE 32

Soluble oligosaccharide fiber produced by GTF0470/mut3325 mutanase.
450 g/L sucrose, GTF0470, mut3325, 47° C., 44 h

| | Product mixture, g/L | SEC-purified product, g/L | SEC-purified product % (wt/wt DS) |
|---|---|---|---|
| DP7+ | 48.3 | 29.3 | 27.4 |
| DP6 | 37.5 | 23.6 | 22.0 |
| DP5 | 39.6 | 23.9 | 22.3 |
| DP4 | 36.7 | 19.6 | 18.3 |

TABLE 32-continued

| Soluble oligosaccharide fiber produced by GTF0470/mut3325 mutanase. 450 g/L sucrose, GTF0470, mut3325, 47° C., 44 h | Product mixture, g/L | SEC-purified product, g/L | SEC-purified product % (wt/wt DS) |
|---|---|---|---|
| DP3 | 17.2 | 7.7 | 7.2 |
| DP2 | 7.7 | 1.9 | 1.8 |
| Sucrose | 10.1 | 0.5 | 0.5 |
| Leucrose | 40.5 | 0.5 | 0.4 |
| Glucose | 6.8 | 0.0 | 0.0 |
| Fructose | 199.6 | 0.0 | 0.0 |
| Sum DP2-DP7+ | 186.9 | 105.9 | 99.0 |
| Sum DP3-DP7+ | 179.2 | 104.0 | 97.2 |

Example 37D

Isolation of Soluble Oligosaccharide Fiber Produced by the Combination of GTF-S Homolog GTF6549 and MUT3325

A 250 mL reaction containing 450 g/L sucrose, *B. subtilis* crude protein extract (7.5% v/v) containing GTF6549 from *Streptococcus salivarius* M18 (GI: 490286549; Examples 11A and 11D), and *T. reesei* crude protein extract UFC (0.075% v/v) comprising a mutanase from *Penicillium marneffei* ATCC® 18224 (MUT3325, GI:212533325; Example 15) in distilled, deionized $H_2O$, was stirred at pH 5.5 and 47° C. for 53 h, then heated to 90° C. for 30 min to inactivate the enzymes. The resulting product mixture was centrifuged and the resulting supernatant analyzed by HPLC for soluble monosaccharides, disaccharides and oligosaccharides (Table 33), then the oligosaccharides were isolated from the supernatant by SEC at 40° C. using Diaion UBK 530 (Na+ form) resin (Mitsubishi). The SEC fractions that contained oligosaccharides ≥DP3 were combined and concentrated by rotary evaporation for analysis by HPLC (Table 33). The combined SEC fractions were diluted to 5 wt % dry solids (DS) and freeze-dried to produce the fiber as a dry solid.

TABLE 33

| Soluble oligosaccharide fiber produced by GTF6549/mut3325 mutanase. 450 g/L sucrose, GTF6549, mut3325, 47° C., 53 h | Product mixture, g/L | SEC-purified product, g/L | SEC-purified product % (wt/wt DS) |
|---|---|---|---|
| DP7+ | 41.9 | 30.1 | 28.4 |
| DP6 | 41.6 | 25.0 | 23.7 |
| DP5 | 41.0 | 22.6 | 21.4 |
| DP4 | 35.9 | 17.9 | 16.9 |
| DP3 | 22.2 | 7.4 | 7.0 |
| DP2 | 10.7 | 1.8 | 1.7 |
| Sucrose | 15.3 | 0.6 | 0.5 |
| Leucrose | 41.2 | 0.3 | 0.3 |
| Glucose | 6.3 | 0.0 | 0.0 |
| Fructose | 193.2 | 0.0 | 0.0 |
| Sum DP2-DP7+ | 193.3 | 104.8 | 99.2 |
| Sum DP3-DP7+ | 182.6 | 103.0 | 97.5 |

Example 37E

Isolation of Soluble Oligosaccharide Fiber Produced by the Combination of GTF-S Homolog GTF4491 and MUT3325

A 250 mL reaction containing 450 g/L sucrose, *B. subtilis* crude protein extract (5% v/v) containing GTF4491 from *Streptococcus salivarius* JIM8777 (GI: 387784491; Examples 11A and 11 D), and *T. reesei* crude protein extract UFC (0.075% v/v) comprising a mutanase from *Penicillium marneffei* ATCC® 18224 (MUT3325, GI-212533325; Example 15) in distilled, deionized $H_2O$, was stirred at pH 5.5 and 47° C. for 22 h, then heated to 90° C. for 30 min to inactivate the enzymes. The resulting product mixture was centrifuged and the resulting supernatant analyzed by HPLC for soluble monosaccharides, disaccharides and oligosaccharides (Table 34), then the oligosaccharides were isolated from the supernatant by SEC at 40° C. using Diaion UBK 530 (Na+ form) resin (Mitsubishi). The SEC fractions that contained oligosaccharides ≥DP3 were combined and concentrated by rotary evaporation for analysis by HPLC (Table 34). The combined SEC fractions were diluted to 5 wt % dry solids (DS) and freeze-dried to produce the fiber as a dry solid.

TABLE 34

| Soluble oligosaccharide fiber produced by GTF4491/mut3325 mutanase. 450 g/L sucrose, GTF4491, mut3325, 47° C., 22 h | Product mixture, g/L | SEC-purified product, g/L | SEC-purified product % (wt/wt DS) |
|---|---|---|---|
| DP7+ | 89.7 | 46.9 | 44.5 |
| DP6 | 30.8 | 18.3 | 17.4 |
| DP5 | 29.2 | 18.2 | 17.3 |
| DP4 | 23.1 | 13.7 | 13.0 |
| DP3 | 11.5 | 5.2 | 4.9 |
| DP2 | 7.4 | 1.8 | 1.7 |
| Sucrose | 17.1 | 0.6 | 0.6 |
| Leucrose | 35.7 | 0.5 | 0.5 |
| Glucose | 8.7 | 0.0 | 0.0 |
| Fructose | 186.3 | 0.0 | 0.0 |
| Sum DP2-DP7+ | 191.6 | 104.1 | 98.9 |
| Sum DP3-DP7+ | 184.2 | 102.3 | 97.2 |

Example 37F

Isolation of Soluble Oligosaccharide Fiber Produced by the Combination of GTF-S Homolog GTF1645 and MUT3325

A 250 mL reaction containing 450 g/L sucrose, *B. subtilis* crude protein extract (5% v/v) containing GTF1645 from *Streptococcus* sp. HSISS3 (GI: 544721645; Example 11A), and *T. reesei* crude protein extract UFC (0.075% v/v) comprising a mutanase from *Penicillium marneffei* ATCC® 18224 (MUT3325, GI:212533325; Example 15) in distilled, deionized $H_2O$, was stirred at pH 5.5 and 47° C. for 46 h, then heated to 90° C. for 30 min to inactivate the enzymes. The resulting product mixture was centrifuged and the resulting supernatant analyzed by HPLC for soluble monosaccharides, disaccharides and oligosaccharides (Table 35), then the oligosaccharides were isolated from the supernatant by SEC at 40° C. using Diaion UBK 530 (Na+ form) resin (Mitsubishi). The SEC fractions that contained oligosaccharides ≥DP3 were combined and concentrated by rotary evaporation for analysis by HPLC (Table 35). The combined SEC fractions were diluted to 5 wt % dry solids (DS) and freeze-dried to produce the fiber as a dry solid.

TABLE 35

Soluble oligosaccharide fiber produced by GTF1645/mut3325 mutanase. 450 g/L sucrose, GTF1645, mut3325, 47° C., 46 h

| | Product mixture, g/L | SEC-purified product, g/L | SEC-purified product % (wt/wt DS) |
|---|---|---|---|
| DP7+ | 0.0 | 15.7 | 15.3 |
| DP6 | 50.8 | 24.7 | 24.2 |
| DP5 | 39.2 | 24.9 | 24.4 |
| DP4 | 39.6 | 23.2 | 22.7 |
| DP3 | 29.8 | 10.6 | 10.4 |
| DP2 | 11.7 | 2.2 | 2.1 |
| Sucrose | 14.3 | 0.6 | 0.6 |
| Leucrose | 30.1 | 0.2 | 0.2 |
| Glucose | 8.2 | 0.0 | 0.0 |
| Fructose | 192.6 | 0.0 | 0.0 |
| Sum DP2-DP7+ | 171.0 | 101.2 | 99.2 |
| Sum DP3-DP7+ | 159.3 | 99.0 | 97.1 |

Example 37G

Isolation of Soluble Oligosaccharide Fiber Produced by the Combination of GTF-S Homolog GTF6099 and MUT3325

A 250 mL reaction containing 450 g/L sucrose, *B. subtilis* crude protein extract (5% v/v) containing GTF6099 from *Streptococcus* sp. HSISS2 (GI: 544716099; Example 11A), and *T. reesei* crude protein extract UFC (0.075% v/v) comprising a mutanase from *Penicillium marneffei* ATCC® 18224 (MUT3325, GI:212533325; Example 15) in distilled, deionized $H_2O$, was stirred at pH 5.5 and 47° C. for 52 h, then heated to 90° C. for 30 min to inactivate the enzymes. The resulting product mixture was centrifuged and the resulting supernatant analyzed by HPLC for soluble mono-saccharides, disaccharides and oligosaccharides (Table 36), then the oligosaccharides were isolated from the supernatant by SEC at 40° C. using Diaion UBK 530 (Na+ form) resin (Mitsubishi). The SEC fractions that contained oligosaccharides ≥DP3 were combined and concentrated by rotary evaporation for analysis by HPLC (Table 36). The combined SEC fractions were diluted to 5 wt % dry solids (DS) and freeze-dried to produce the fiber as a dry solid.

TABLE 36

Soluble oligosaccharide fiber produced by GTF6099/mut3325 mutanase. 450 g/L sucrose, GTF6099, mut3325, 47° C., 52 h

| | Product mixture, g/L | SEC-purified product, g/L | SEC-purified product % (wt/wt DS) |
|---|---|---|---|
| DP7+ | 0.0 | 16.1 | 16.0 |
| DP6 | 57.0 | 23.7 | 23.5 |
| DP5 | 43.9 | 26.3 | 26.1 |
| DP4 | 42.7 | 22.1 | 21.9 |
| DP3 | 29.1 | 9.7 | 9.6 |
| DP2 | 11.9 | 2.1 | 2.1 |
| Sucrose | 15.7 | 0.5 | 0.5 |
| Leucrose | 34.4 | 0.2 | 0.2 |
| Glucose | 7.6 | 0.0 | 0.0 |
| Fructose | 190.9 | 0.0 | 0.0 |
| Sum DP2-DP7+ | 184.6 | 99.9 | 99.3 |
| Sum DP3-DP7+ | 172.8 | 97.8 | 97.2 |

Example 37H

Isolation of Soluble Oligosaccharide Fiber Produced by the Combination of GTF-S Homolog GTF7317 and MUT3325

A 250 mL reaction containing 450 g/L sucrose, *B. subtilis* crude protein extract (5% v/v) containing GTF7317 from *Streptococcus salivarius PS*4 (GI: 488977317; Example 11A), and *T. reesei* crude protein extract UFC (0.075% v/v) comprising a mutanase from *Penicillium marneffei* ATCC® 18224 (MUT3325, GI-212533325; Example 15) in distilled, deionized $H_2O$, was stirred at pH 5.5 and 47° C. for 46 h, then heated to 90° C. for 30 min to inactivate the enzymes. The resulting product mixture was centrifuged and the resulting supernatant analyzed by HPLC for soluble mono-saccharides, disaccharides and oligosaccharides (Table 37), then the oligosaccharides were isolated from the supernatant by SEC at 40° C. using Diaion UBK 530 (Na+ form) resin (Mitsubishi). The SEC fractions that contained oligosaccharides ≥DP3 were combined and concentrated by rotary evaporation for analysis by HPLC (Table 37). The combined SEC fractions were diluted to 5 wt % dry solids (DS) and freeze-dried to produce the fiber as a dry solid.

TABLE 37

Soluble oligosaccharide fiber produced by GTF7317/mut3325 mutanase. 450 g/L sucrose, GTF7317, mut3325, 47° C., 46 h

| | Product mixture, g/L | SEC-purified product, g/L | SEC-purified product % (wt/wt DS) |
|---|---|---|---|
| DP7+ | 0.0 | 16.5 | 16.0 |
| DP6 | 57.1 | 23.0 | 22.4 |
| DP5 | 43.7 | 25.8 | 25.2 |
| DP4 | 42.6 | 23.2 | 22.6 |
| DP3 | 28.7 | 11.0 | 10.7 |
| DP2 | 11.6 | 2.3 | 2.2 |
| Sucrose | 13.8 | 0.6 | 0.6 |
| Leucrose | 35.8 | 0.3 | 0.3 |
| Glucose | 6.9 | 0.0 | 0.0 |
| Fructose | 192.5 | 0.0 | 0.0 |
| Sum DP2-DP7+ | 183.6 | 101.6 | 99.1 |
| Sum DP3-DP7+ | 172.0 | 99.3 | 96.9 |

Example 37I

Isolation of Soluble Oligosaccharide Fiber Produced by the Combination of GTF-S Homolog GTF8487 and MUT3325

A 250 mL reaction containing 450 g/L sucrose, *B. subtilis* crude protein extract (5% v/v) containing GTF8487 from

*Streptococcus salivarius* CCHSS3 (GI: 340398487; Example 11A), and *T. reesei* crude protein extract UFC (0.075% v/v) comprising a mutanase from *Penicillium marneffei* ATCC® 18224 (MUT3325, GI:212533325; Example 15) in distilled, deionized $H_2O$, was stirred at pH 5.5 and 47° C. for 40 h, then heated to 90° C. for 30 min to inactivate the enzymes. The resulting product mixture was centrifuged and the resulting supernatant analyzed by HPLC for soluble monosaccharides, disaccharides and oligosaccharides (Table 38), then the oligosaccharides were isolated from the supernatant by SEC at 40° C. using Diaion UBK 530 (Na+ form) resin (Mitsubishi). The SEC fractions that contained oligosaccharides ≥DP3 were combined and concentrated by rotary evaporation for analysis by HPLC (Table 38). The combined SEC fractions were diluted to 5 wt % dry solids (DS) and freeze-dried to produce the fiber as a dry solid.

TABLE 38

Soluble oligosaccharide fiber produced by GTF8487/mut3325 mutanase. 450 g/L sucrose, GTF8487, mut3325, 47° C., 40 h

| | Product mixture, g/L | SEC-purified product, g/L | SEC-purified product % (wt/wt DS) |
|---|---|---|---|
| DP7+ | 75.3 | 41.9 | 39.1 |
| DP6 | 33.3 | 19.5 | 18.2 |
| DP5 | 34.8 | 19.7 | 18.4 |
| DP4 | 30.0 | 16.0 | 15.0 |
| DP3 | 13.9 | 6.3 | 5.8 |
| DP2 | 8.2 | 2.1 | 2.0 |
| Sucrose | 10.1 | 0.6 | 0.6 |
| Leucrose | 46.0 | 1.0 | 0.9 |
| Glucose | 6.9 | 0.0 | 0.0 |
| Fructose | 197.8 | 0.0 | 0.0 |
| Sum DP2-DP7+ | 195.5 | 105.5 | 98.5 |
| Sum DP3-DP7+ | 187.3 | 103.4 | 96.5 |

Example 37J

Isolation of Soluble Oligosaccharide Fiber Produced by the Combination of GTF-S Homolog GTF3879 and MUT3325

A 250 mL reaction containing 450 g/L sucrose, *B. subtilis* crude protein extract (15% v/v) containing GTF3879 from *Streptococcus* sp. HSISS4 (GI: 544713879; Example 11A), and *T. reesei* crude protein extract UFC (0.075% v/v) comprising a mutanase from *Penicillium marneffei* ATCC® 18224 (MUT3325, GI:212533325; Example 15) in distilled, deionized $H_2O$, was stirred at pH 5.5 and 47° C. for 52 h, then heated to 90° C. for 30 min to inactivate the enzymes. The resulting product mixture was centrifuged and the resulting supernatant analyzed by HPLC for soluble monosaccharides, disaccharides and oligosaccharides (Table 39), then the oligosaccharides were isolated from the supernatant by SEC at 40° C. using Diaion UBK 530 (Na+ form) resin (Mitsubishi). The SEC fractions that contained oligosaccharides ≥DP3 were combined and concentrated by rotary evaporation for analysis by HPLC (Table 39). The combined SEC fractions were diluted to 5 wt % dry solids (DS) and freeze-dried to produce the fiber as a dry solid.

TABLE 39

Soluble oligosaccharide fiber produce by GTF3879/mut3325 mutanase. 450 g/L sucrose, GTF3879, mut3325, 47° C., 52 h

| | Product mixture, g/L | SEC-purified product, g/L | SEC-purified product % (wt/wt DS) |
|---|---|---|---|
| DP7+ | 31.8 | 23.4 | 22.4 |
| DP6 | 41.3 | 25.6 | 24.4 |
| DP5 | 40.8 | 23.7 | 22.5 |
| DP4 | 36.3 | 19.3 | 18.4 |
| DP3 | 19.9 | 8.8 | 8.4 |
| DP2 | 8.5 | 2.2 | 2.1 |
| Sucrose | 20.8 | 1.1 | 1.1 |
| Leucrose | 37.0 | 0.7 | 0.7 |
| Glucose | 6.8 | 0.0 | 0.0 |
| Fructose | 188.3 | 0.0 | 0.0 |
| Sum DP2-DP7+ | 178.6 | 103.0 | 98.2 |
| Sum DP3-DP7+ | 170.1 | 100.8 | 96.1 |

Example 37K

Isolation of Soluble Oligosaccharide Fiber Produced by the Combination of GTF-S Homolog GTF3808 and MUT3325

A 250 mL reaction containing 450 g/L sucrose, *B. subtilis* crude protein extract (5% v/v) containing GTF3808 from *Streptococcus* sp. SR4 (GI: 573493808; Example 11A), and *T. reesei* crude protein extract UFC (0.075% v/v) comprising a mutanase from *Penicillium marneffei* ATCC® 18224 (MUT3325, GI:212533325; Example 15) in distilled, deionized $H_2O$, was stirred at pH 5.5 and 47° C. for 22 h, then heated to 90° C. for 30 min to inactivate the enzymes. The resulting product mixture was centrifuged and the resulting supernatant analyzed by HPLC for soluble monosaccharides, disaccharides and oligosaccharides (Table 40), then the oligosaccharides were isolated from the supernatant by SEC at 40° C. using Diaion UBK 530 (Na+ form) resin (Mitsubishi). The SEC fractions that contained oligosaccharides ≥DP3 were combined and concentrated by rotary evaporation for analysis by HPLC (Table 40). The combined SEC fractions were diluted to 5 wt % dry solids (DS) and freeze-dried to produce the fiber as a dry solid.

TABLE 40

Soluble oligosaccharide fiber produced by GTF3808/mut3325 mutanase. 450 g/L sucrose, GTF3808, mut3325, 47° C., 22 h

| | Product mixture, g/L | SEC-purified product, g/L | SEC-purified product % (wt/wt DS) |
|---|---|---|---|
| DP7+ | 26.2 | 10.8 | 9.8 |
| DP6 | 31.2 | 19.9 | 18.0 |
| DP5 | 39.0 | 25.9 | 23.5 |
| DP4 | 39.4 | 22.5 | 20.4 |
| DP3 | 27.1 | 10.5 | 9.5 |
| DP2 | 15.5 | 2.4 | 2.2 |
| Sucrose | 15.6 | 0.5 | 0.5 |
| Leucrose | 51.1 | 0.3 | 0.3 |
| Glucose | 6.6 | 0.0 | 0.0 |
| Fructose | 195.1 | 0.0 | 0.0 |
| Sum DP2-DP7+ | 178.4 | 109.3 | 99.2 |
| Sum DP3-DP7+ | 162.9 | 106.9 | 97.0 |

Example 37L

Isolation of Soluble Oligosaccharide Fiber Produced by the Combination of GTF-S Homolog GTF8467 and MUT3325

A 250 mL reaction containing 450 g/L sucrose, *B. subtilis* crude protein extract (5% v/v) containing GTF8467 from *Streptococcus salivarius* NU10 (GI: 660358467; Example 11A), and *T. reesei* crude protein extract UFC (0.075% v/v) comprising a mutanase from *Penicillium marneffei* ATCC® 18224 (MUT3325, GI:212533325; Example 15) in distilled, deionized $H_2O$, was stirred at pH 5.5 and 47° C., for 47 h, then heated to 90° C. for 30 min to inactivate the enzymes. The resulting product mixture was centrifuged and the resulting supernatant analyzed by HPLC for soluble mono-saccharides, disaccharides and oligosaccharides (Table 41), then the oligosaccharides were isolated from the supernatant by SEC at 40° C. using Diaion UBK 530 (Na+ form) resin (Mitsubishi). The SEC fractions that contained oligosaccharides ≥DP3 were combined and concentrated by rotary evaporation for analysis by HPLC (Table 41). The combined SEC fractions were diluted to % wt % dry solids (DS) and freeze-dried to produce the fiber as a dry solid.

TABLE 41

Soluble oligosaccharide fiber produced by GTF8467/mut3325 mutanase. 450 g/L sucrose, GTF8467, mut3325, 47° C., 47 h

| | Product mixture, g/L | SEC-purified product, g/L | SEC-purified product % (wt/wt DS) |
|---|---|---|---|
| DP7+ | 0.0 | 11.1 | 10.5 |
| DP6 | 57.0 | 20.5 | 19.6 |
| DP5 | 37.8 | 30.1 | 28.7 |
| DP4 | 34.3 | 27.2 | 25.9 |
| DP3 | 20.3 | 12.8 | 12.2 |
| DP2 | 7.5 | 2.5 | 2.4 |
| Sucrose | 69.6 | 0.4 | 0.4 |
| Leucrose | 34.0 | 0.2 | 0.2 |
| Glucose | 6.3 | 0.0 | 0.0 |
| Fructose | 178.3 | 0.0 | 0.0 |
| Sum DP2-DP7+ | 156.8 | 104.1 | 99.5 |
| Sum DP3-DP7+ | 149.3 | 101.6 | 97.1 |

Example 37M

Isolation of Soluble Oligosaccharide Fiber Produced by the Combination of GTF-S Homolog GTF0060 and MUT3325

A 250 mL reaction containing 450 g/L sucrose, *B. subtilis* crude protein extract (5% v/v) containing GTF0060 from *Streptococcus* sp. ACS2 (GI: 576980060; Example 11A), and *T. reesei* crude protein extract UFC (0.075% v/v) comprising a mutanase from *Penicillium marneffei* ATCC® 18224 (MUT3325, GI:212533325; Example 15) in distilled, deionized $H_2O$, was stirred at pH 5.5 and 47° C. for 47 h, then heated to 90° C. for 30 min to inactivate the enzymes. The resulting product mixture was centrifuged and the resulting supernatant analyzed by HPLC for soluble mono-saccharides, disaccharides and oligosaccharides (Table 42), then the oligosaccharides were isolated from the supernatant by SEC at 40° C. using Diaion UBK 530 (Na+ form) resin (Mitsubishi). The SEC fractions that contained oligosaccharides ≥DP3 were combined and concentrated by rotary evaporation for analysis by HPLC (Table 42). The combined SEC fractions were diluted to 5 wt % dry solids (DS) and freeze-dried to produce the fiber as a dry solid.

TABLE 42

Soluble oligosaccharide fiber produced by GTF0060/mut3325 mutanase. 450 g/L sucrose, GTF0060, mut3325, 47° C., 47 h

| | Product mixture, g/L | SEC-purified product, g/L | SEC-purified product % (wt/wt DS) |
|---|---|---|---|
| DP7+ | 27.7 | 19.1 | 17.2 |
| DP6 | 41.7 | 28.6 | 27.2 |
| DP5 | 41.9 | 25.8 | 24.5 |
| DP4 | 37.7 | 21.0 | 20.0 |
| DP3 | 22.0 | 9.0 | 8.6 |
| DP2 | 8.4 | 1.9 | 1.8 |
| Sucrose | 23.1 | 0.5 | 0.5 |
| Leucrose | 39.1 | 0.3 | 0.3 |
| Glucose | 5.6 | 0.0 | 0.0 |
| Fructose | 198.6 | 0.0 | 0.0 |
| Sum DP2-DP7+ | 179.5 | 104.4 | 99.3 |
| Sum DP3-DP7+ | 171.1 | 102.5 | 97.5 |

Comparative Example 37N

Isolation of Soluble Oligosaccharide Fiber Produced by the Combination of GTF-S and MUT3325

A 250 mL reaction containing 450 g/L sucrose, *B. subtilis* crude protein extract (5% v/v) containing GTF0459 from *Streptococcus* sp. C150 (GI: 495810459; Examples 11A and 11C), and *T. reesei* crude protein extract UFC (0.075% v/v) comprising a mutanase from *Penicillium marneffei* ATCC® 18224 (MUT3325, GI:212533325; Example 15) in distilled, deionized $H_2O$, was stirred at pH 5.5 and 47° C. for 90 h, then heated to 90° C. for 30 min to inactivate the enzymes. The resulting product mixture was centrifuged and the resulting supernatant analyzed by HPLC for soluble mono-saccharides, disaccharides and oligosaccharides (Table 43), then the oligosaccharides were isolated from the supernatant by SEC at 40° C. using Diaion UBK 530 (Na+ form) resin (Mitsubishi). The SEC fractions that contained oligosaccharides ≥DP3 were combined and concentrated by rotary evaporation for analysis by HPLC (Table 43). The combined SEC fractions were diluted to 5 wt % dry solids (DS) and freeze-dried to produce the fiber as a dry solid.

TABLE 43

Soluble oligosaccharide fiber produced by GTF0459/mut3325 mutanase. 450 g/L sucrose, GTF0459, mut3325, 47° C., 90 h

| | Product mixture, g/L | SEC-purified product, g/L | SEC-purified product % (wt/wt DS) |
|---|---|---|---|
| DP7+ | 24.2 | 29.0 | 27.0 |
| DP6 | 41.2 | 21.5 | 20.0 |
| DP5 | 45.0 | 24.2 | 22.5 |
| DP4 | 40.8 | 20.5 | 19.0 |
| DP3 | 25.7 | 9.4 | 8.7 |
| DP2 | 10.3 | 2.1 | 1.9 |
| Sucrose | 24.1 | 0.5 | 0.5 |

TABLE 43-continued

| Soluble oligosaccharide fiber produced by GTF0459/mut3325 mutanase. 450 g/L sucrose, GTF0459, mut3325, 47° C., 90 h | | | |
|---|---|---|---|
| | Product mixture, g/L | SEC-purified product, g/L | SEC-purified product % (wt/wt DS) |
| Leucrose | 35.9 | 0.4 | 0.3 |
| Glucose | 6.9 | 0.0 | 0.0 |
| Fructose | 198.6 | 0.0 | 0.0 |
| Sum DP2-DP7+ | 197.6 | 106.7 | 99.2 |
| Sum DP3-DP7+ | 187.3 | 104.6 | 97.3 |

Comparative Example 37O

Isolation of Soluble Oligosaccharide Fiber Produced by the Combination of GTF-S Non-Homolog GTF0487 and MUT3325

A 250 mL reaction containing 450 g/L sucrose, *B. subtilis* crude protein extract (20% v/v) containing GTF0487 from *Streptococcus salivarius* PS4 (GI: 495810487; Examples 11A and 11C), and *T. reesei* crude protein extract UFC (0.075% v/v) comprising a mutanase from *Penicillium marneffei* ATCC® 18224 (MUT3325, GI:212533325; Example 15) in distilled, deionized $H_2O$, was stirred at pH 5.5 and 47° C. for 214 h, then heated to 90° C. for 30 min to inactivate the enzymes. The resulting product mixture was centrifuged and the resulting supernatant analyzed by HPLC for soluble monosaccharides, disaccharides and oligosaccharides (Table 44), then the oligosaccharides were isolated from the supernatant by SEC at 40° C. using Diaion UBK 530 (Na+ form) resin (Mitsubishi). The SEC fractions that contained oligosaccharides ≥DP3 were combined and concentrated by rotary evaporation for analysis by HPLC (Table 44). The combined SEC fractions were diluted to 5 wt % dry solids (DS) and freeze-dried to produce the fiber as a dry solid.

TABLE 44

| Soluble oligosaccharide fiber produced by GTF0487/mut3325 mutanase. 450 g/L sucrose, GTF0487, mut0487, 47° C., 214 h | | | |
|---|---|---|---|
| | Product mixture, g/L | SEC-purified product, g/L | SEC-purified product % (wt/wt DS) |
| DP7+ | 6.0 | 21.6 | 30.4 |
| DP6 | 3.9 | 10.2 | 14.4 |
| DP5 | 7.9 | 15.9 | 22.3 |
| DP4 | 9.1 | 13.3 | 18.6 |
| DP3 | 8.2 | 6.3 | 8.8 |
| DP2 | 8.6 | 2.4 | 3.3 |
| Sucrose | 96.9 | 0.6 | 0.9 |
| Leucrose | 18.0 | 0.1 | 0.1 |
| Glucose | 94.9 | 0.2 | 0.3 |
| Fructose | 106.0 | 0.7 | 1.0 |
| Sum DP2-DP7+ | 43.7 | 69.7 | 97.8 |
| Sum DP3-DP7+ | 35.1 | 67.3 | 94.5 |

Comparative Example 37P

Isolation of Soluble Oligosaccharide Fiber Produced by the Combination of GTF-S Non-Homolog GTF5360 and MUT3325

A 250 mL reaction containing 450 g/L sucrose, *B. subtilis* crude protein extract (20% v/v) containing GTF5360 from *Streptococcus mutans* JP9-4 (GI: 440355360; Examples 11A and 11C), and *T. reesei* crude protein extract UFC (0.075% v/v) comprising a mutanase from *Penicillium marneffei* ATCC® 18224 (MUT3325, GI:212533325; Example 15) in distilled, deionized $H_2O$, was stirred at pH 5.5 and 47° C. for 214 h, then heated to 90° C. for 30 min to inactivate the enzymes. The resulting product mixture was centrifuged and the resulting supernatant analyzed by HPLC for soluble monosaccharides, disaccharides and oligosaccharides (Table 45), then the oligosaccharides were isolated from the supernatant by SEC at 40° C. using Diaion UBK 530 (Na+ form) resin (Mitsubishi). The SEC fractions that contained oligosaccharides ≥DP3 were combined and concentrated by rotary evaporation for analysis by HPLC (Table 45). The combined SEC fractions were diluted to 5 wt % dry solids (DS) and freeze-dried to produce the fiber as a dry solid.

TABLE 45

| Soluble oligosaccharide fiber produced by GTF5360/mut3325 mutanase. 450 g/L sucrose, GTF5360, mut3325, 47° C., 214 h | | | |
|---|---|---|---|
| | Product mixture, g/L | SEC-purified product, g/L | SEC-purified product % (wt/wt DS) |
| DP7+ | 33.2 | 48.9 | 46.4 |
| DP6 | 15.1 | 17.7 | 16.8 |
| DP5 | 19.2 | 19.9 | 18.9 |
| DP4 | 16.2 | 11.9 | 11.3 |
| DP3 | 11.2 | 5.0 | 4.8 |
| DP2 | 10.7 | 1.8 | 1.7 |
| Sucrose | 29.5 | 0.2 | 0.2 |
| Leucrose | 56.9 | 0.1 | 0.1 |
| Glucose | 53.5 | 0.0 | 0.0 |
| Fructose | 145.9 | 0.0 | 0.0 |
| Sum DP2-DP7+ | 105.5 | 105.3 | 99.8 |
| Sum DP3-DP7+ | 94.8 | 103.5 | 98.1 |

Example 37Q

Isolation of Soluble Oligosaccharide Fiber Produced by the Combination of C-Terminal Truncated GTF0974-T4 and MUT3325

A 250 mL reaction containing 450 g/L sucrose, *B. subtilis* crude protein extract (0.61% v/v) containing a version of GTF0974 from *Streptococcus salivarius* 57.1 (GI: 387760974; Examples 11A and 11C) having additional C terminal truncations of part of the glucan binding domains (GTF0974-T4, Example 11B), and *T. reesei* crude protein extract UFC (0.11% v/v) comprising a mutanase from *Penicillium marneffei* ATCC® 18224 (MUT3325, GI:212533325; Example 15) in distilled, deionized $H_2O$, was stirred at pH 5.5 and 47° C. for 24 h, then heated to 90° C. for 30 min to inactivate the enzymes. The resulting product mixture was centrifuged and the resulting supernatant analyzed by HPLC for soluble monosaccharides, disaccharides and oligosaccharides (Table 46), then the oligosaccharides were isolated from the supernatant by SEC at 40° C. using Diaion UBK 530 (Na+ form) resin (Mitsubishi). The SEC fractions that contained oligosaccharides ≥DP3 were combined and concentrated by rotary evaporation for analysis by HPLC (Table 46). The combined SEC fractions were diluted to 5 wt % dry solids (DS) and freeze-dried to produce the fiber as a dry solid.

TABLE 46

Soluble oligosaccharide fiber produced by GTF0974-T4/mut3325 mutanase. 450 g/L sucrose, GTF0974-T4, mut3325, 47° C., 24 h

| | Product mixture, g/L | SEC-purified product, g/L | SEC-purified product % (wt/wt DS) |
|---|---|---|---|
| DP7+ | 47.6 | 29.0 | 26.7 |
| DP6 | 41.7 | 25.5 | 23.5 |
| DP5 | 44.4 | 25.6 | 23.6 |
| DP4 | 41.2 | 19.4 | 17.8 |
| DP3 | 23.8 | 7.5 | 6.9 |
| DP2 | 12.0 | 1.7 | 1.5 |
| Sucrose | 11.0 | 0.0 | 0.0 |
| Leucrose | 42.0 | 0.0 | 0.0 |
| Glucose | 6.2 | 0.0 | 0.0 |
| Fructose | 200.6 | 0.0 | 0.0 |
| Sum DP2-DP7+ | 210.7 | 108.7 | 100 |
| Sum DP3-DP7+ | 198.7 | 107.0 | 98.5 |

Example 37R

Isolation of Soluble Oligosaccharide Fiber Produced by the Combination of C-Terminal Truncated GTF0974-T5 and MUT3325

A 250 mL reaction containing 450 g/L sucrose, *B. subtilis* crude protein extract (0.51% v/v) containing a version of GTF0974 from *Streptococcus salivarius* 57.1 (GI: 387760974; Examples 11A and 11C) having additional C terminal truncations of part of the glucan binding domains (GTF0974-T5, Example 11B), and *T. reesei* crude protein extract UFC (0.11% v/v) comprising a mutanase from *Penicillium marneffei* ATCC® 18224 (MUT3325, GI:212533325; Example 15) in distilled, deionized $H_2O$, was stirred at pH 5.5 and 47° C. for 24 h, then heated to 90° C. for 30 min to inactivate the enzymes. The resulting product mixture was centrifuged and the resulting supernatant analyzed by HPLC for soluble monosaccharides, disaccharides and oligosaccharides (Table 47), then the oligosaccharides were isolated from the supernatant by SEC at 40° C. using Diaion UBK 530 (Na+ form) resin (Mitsubishi). The SEC fractions that contained oligosaccharides ≥DP3 were combined and concentrated by rotary evaporation for analysis by HPLC (Table 47). The combined SEC fractions were diluted to 5 wt % dry solids (DS) and freeze-dried to produce the fiber as a dry solid.

TABLE 47

Soluble oligosaccharide fiber produced by GTF0974-T5/mut3325 mutanase. 450 g/L sucrose, GTF0974-T5, mut3325, 47° C., 24 h

| | Product mixture, g/L | SEC-purified product, g/L | SEC-purified product % (wt/wt DS) |
|---|---|---|---|
| DP7+ | 41.0 | 23.9 | 22.2 |
| DP6 | 42.7 | 26.9 | 25.0 |
| DP5 | 44.5 | 27.2 | 25.2 |
| DP4 | 40.3 | 20.6 | 19.1 |
| DP3 | 24.2 | 7.9 | 7.3 |
| DP2 | 11.5 | 1.3 | 1.2 |
| Sucrose | 12.3 | 0.0 | 0.0 |
| Leucrose | 42.0 | 0.0 | 0.0 |
| Glucose | 6.0 | 0.0 | 0.0 |
| Fructose | 201.9 | 0.0 | 0.0 |
| Sum DP2-DP7+ | 204.2 | 107.8 | 100 |
| Sum DP3-DP7+ | 192.7 | 106.5 | 98.8 |

Example 37S

Isolation of Soluble Oligosaccharide Fiber Produced by the Combination of C-Terminal Truncated GTF3808-T5 and MUT3325

A 250 mL reaction containing 450 g/L sucrose, *B. subtilis* crude protein extract (0.77% v/v) containing a version of GTF3808 from 10 *Streptococcus* sp. SR4 (GI: 573493808; Examples 11A and 11C) having additional C terminal truncations of part of the glucan binding domains (GTF3808-T5, Example 11B), and *T. reesei* crude protein extract UFC (0.11% v/v) comprising a mutanase from *Penicillium marneffei* ATCC® 18224 (MUT3325, GI-212533325; Example 15) in distilled, deionized $H_2O$, was stirred at pH 5.5 and 47° C. for 19 h, then heated to 90° C. for 30 min to inactivate the enzymes. The resulting product mixture was centrifuged and the resulting supernatant analyzed by HPLC for soluble monosaccharides, disaccharides and oligosaccharides (Table 48), then the oligosaccharides were isolated from the supernatant by SEC at 40° C. using Diaion UBK 530 (Na+ form) resin (Mitsubishi). The SEC fractions that contained oligosaccharides ≥DP3 were combined and concentrated by rotary evaporation for analysis by HPLC (Table 48). The combined SEC fractions were diluted to 5 wt % dry solids (DS) and freeze-dried to produce the fiber as a dry solid.

TABLE 48

Soluble oligosaccharide fiber produced by GTF3808-T5/mut3325 mutanase. 450 g/L sucrose, GTF3808-T5, mut3325, 47° C., 19 h

| | Product mixture, g/L | SEC-purified product, g/L | SEC-purified product % (wt/wt DS) |
|---|---|---|---|
| DP7+ | 55.7 | 29.2 | 26.5 |
| DP6 | 38.7 | 23.8 | 21.7 |
| DP5 | 42.4 | 25.1 | 22.9 |
| DP4 | 39.3 | 20.5 | 18.7 |
| DP3 | 21.5 | 8.1 | 7.4 |
| DP2 | 11.8 | 1.6 | 1.5 |
| Sucrose | 10.9 | 0.5 | 0.5 |

TABLE 48-continued

| Soluble oligosaccharide fiber produced by GTF3808-T5/mut3325 mutanase. 450 g/L sucrose, GTF3808-T5, mut3325, 47° C., 19 h | Product mixture, g/L | SEC-purified product, g/L | SEC-purified product % (wt/wt DS) |
|---|---|---|---|
| Leucrose | 41.6 | 0.1 | 0.1 |
| Glucose | 6.3 | 0.0 | 0.0 |
| Fructose | 196.1 | 0.0 | 0.0 |
| Sum DP2-DP7+ | 209.3 | 108.3 | 99.4 |
| Sum DP3-DP7+ | 197.6 | 106.7 | 97.9 |

Example 38

Anomeric Linkage Analysis of Soluble Oligosaccharide Fiber Produced by GTF-J and by GTF/Mutanase Combinations Solutions of chromatographically-purified soluble oligosaccharide oligomer/polymers prepared as described in Examples 30 to Example 37 were dried to a constant weight by lyophilization, and the resulting solids analyzed by $^1$H NMR spectroscopy and by GC/MS as described in the General Methods section (above). The anomeric linkages for each of these soluble oligosaccharide oligomer/polymer mixtures are reported in Tables 49 and 50.

TABLE 49

Anomeric linkage analysis of soluble oligosaccharides by $^1$H NMR spectroscopy.

| Example # | GTF/mutanase | % α-(1, 3) | % α-(1, 3, 6) | % α-(1, 2, 6) | % α-(1, 6) |
|---|---|---|---|---|---|
| 30 | GTF 7527/mut3264 | 89.6 | 1.8 | 0.0 | 8.6 |
| 31 | GTF 2379/mut3264 | 60.2 | 3.3 | 0.0 | 36.6 |
| 32 | GTF 7527/mut3325 | 95.2 | 2.0 | 0.0 | 2.8 |
| 33 | GTF 0874/mut3325 | 75.2 | 0.0 | 0.0 | 24.8 |
| 34 | GTF 0459/mut3264 | 88.2 | 5.7 | 0.0 | 6.1 |
| 35 | GTF 0544/mut3264 | 15.0 | 3.4 | 0.0 | 81.6 |
| 36 | GTF 0459/mut3325 | 88.9 | 5.7 | 0.0 | 5.4 |
| 37 | GTF 7527/no mutanase | 74.6 | 9.8 | 0.0 | 15.6 |

TABLE 50

Anomeric linkage analysis of soluble oligosaccharides by GC/MS.

| Example # | GTF/mutanase | % α-(1, 4) | % α-(1, 3) | % α-(1, 3, 6) | % 2, 1 Fruc | % α-(1, 2) | % α-(1, 6) | % α-(1, 3, 4) | % α-(1, 2, 3) | % α-(1, 4, 6) + α-(1, 2, 6) |
|---|---|---|---|---|---|---|---|---|---|---|
| 32 | GTF 7527/mut3325 | 0.4 | 97.1 | 0.6 | 0.0 | 0.6 | 0.9 | 0.1 | 0.2 | 0.1 |
| 34 | GTF 0459/mut3264 | 0.4 | 96.9 | 1.4 | 0.0 | 0.2 | 0.7 | 0.1 | 0.2 | 0.0 |
| 35 | GTF 0544/mut3264 | 0.4 | 24.1 | 2.5 | 1.0 | 0.5 | 70.9 | 0.0 | 0.0 | 0.6 |
| 36 | GTF 0459/mut3325 | 0.5 | 95.0 | 1.7 | 1.1 | 0.5 | 0.9 | 0.0 | 0.0 | 0.2 |
| 37 | GTF7527/no mutanase | 0.9 | 90.8 | 2.2 | 0.0 | 0.4 | 5.0 | 0.1 | 0.4 | 0.2 |

Example 39

Viscosity of Soluble Oligosaccharide Fiber Produced by GTF-J and by GTF/Mutanase Combinations Solutions of chromatographically-purified soluble oligosaccharide oligomer/polymers prepared as described in various Examples were dried to a constant weight by lyophilization, and the resulting solids were used to prepare a 12 wt % solution of soluble oligomer/polymer in distilled, deionized water. The viscosity of the soluble oligomer/polymer solutions (reported in centipoise (cP), where 1 cP=1 millipascal–s (mPa–s)) (Table 51) was measured at 20° C. as described in the General Methods section.

TABLE 51

Viscosity of 12% (w/w) soluble oligosaccharide oligomer/polymer solutions measured at 20° C.

| Example # | GTF/mutanase | viscosity (cP) |
|---|---|---|
| 19 | GTF7527/mut3264 | 1.4 |
| 21 | GTF2379/mut3264 | ND |
| 20 | GTF7527/mut3325 | 2.0 |
| 24 | GTF0874/mut3325 | 1.6 |
| 29 | GTF0459/mut3264 | 1.7 |
| 22 | GTF0544/mut3264 | 6.7 |
| 36 | GTF0459/mut3325 | 1.8 |
| 37 | GTF7527/no mutanase | ND |

(ND = not determined)

Example 40

Preparation of Extracts of Glucosyltransferase (GTF) Enzymes for Fiber Production at Different Temperatures The *Streptococcus salivarius* gtfJ enzyme (SEQ ID NO: 5) used in Examples 1 and 2 was expressed in *E. coli* strain DH10B using an isopropyl beta-D-1-thiogalactopyranoside (IPTG)-induced expression system. Briefly, *E. coli* DH10B cells were transformed to express SEQ ID NO: 5 from a DNA sequence (SEQ ID NO:4) codon-optimized to express the gtfJ enzyme in *E. coli*. This DNA sequence was contained in the expression vector, PJEXPRESS404® (DNA 2.0, Menlo Park CA). The transformed cells were inoculated to an initial optical density (OD at 600 nm) of 0.025 in LB medium (10 g/L Tryptone; 5 g/L yeast extract, 10 g/L NaCl) and allowed to grow at 37° C. in an incubator while shaking at 250 rpm. The cultures were induced by addition of 1 mM IPTG when they reached an $OD_{600}$ of 0.8-1.0. Induced cultures were left on the shaker and harvested 3 hours post induction.

For harvesting gtfJ enzyme (SEQ ID NO: 5), the cells were centrifuged (25° C., 16,000 rpm) in an EPPENDORF® centrifuge, resuspended in 5.0 mM phosphate buffer (pH 7.0) and cooled to 4° C. on ice. The cells were broken using a bead beater with 0.1 mm silica beads, and then centrifuged at 16,000 rpm at 4° C. to pellet the unbroken cells and cell debris. The crude extract (containing soluble gtfJ enzyme, SEQ ID NO: 5) was separated from the pellet and analyzed by Bradford protein assay to determine protein concentration (mg/mL).

The additional gtf enzymes used in Example 41 were prepared as follows. *E. coli* TOP10® cells (Invitrogen, Carlsbad California) were transformed with a PJEXPRESS404®-based construct containing a particular gtf-encoding DNA sequence. Each sequence was codon-optimized to express the gtf enzyme in *E. coli*. Individual *E. coli* strains expressing a particular gtf enzyme were grown in LB medium with ampicillin (100 mg/mL) at 37° C. with shaking to $OD_{600}$=0.4-0.5, at which time IPTG was added to a final concentration of 0.5 mM. The cultures were incubated for 2-4 hours at 37° C. following IPTG induction. Cells were harvested by centrifugation at 5,000×g for 15 minutes and resuspended (20% w/v) in 50 mM phosphate buffer pH 7.0 supplemented with DTT (1.0 mM). Resuspended cells were passed through a French Pressure Cell (SLM Instruments, Rochester, NY) twice to ensure >95% cell lysis. Lysed cells were centrifuged for 30 minutes at 12,000×g at 4° C. The resulting supernatant was analyzed by the BCA protein assay and SDS-PAGE to confirm expression of the gtf enzyme, and the supernatant was stored at −20° C.

Analysis of Reaction Profiles

Periodic samples from reaction mixtures were taken and analyzed using an Agilent 1260C HPLC equipped with a refractive index detector. An Aminex HP-87C column, (Bio-Rad) using deionized water at a flow rate of 0.6 mL/min and 85° C. was used to monitor sucrose and glucose. An Aminex HP-42A column (BioRad) using deionized water at a flow rate of 0.6 mL/min and 85° C. was used to quantitate oligosaccharides from DP2-DP7 which were previously calibrated using malto oligosaccharides.

Example 41

Oligosaccharide Production Using GTF-J at Various Temperatures

The desired amount of sucrose, in some cases glucose, and 20 mM dihydrogen potassium phosphate were dissolved using deionized water and diluted to 750 mL in a 1 L unbaffled jacketed flask that was connected to a Lauda RK20 recirculating chiller. FERMASURE™ (DuPont, Wilmington, DE) was then added (0.5 mL/L reaction), and the pH was adjusted to 5.5 using 5 wt % aqueous sodium hydroxide or 5 wt % aqueous sulfuric acid. The reaction was initiated by the addition of 0.3 vol % of crude enzyme extract (SEQ ID NO: 5) as described in Example 40. Agitation to the reaction mixture was provided using a 4-blade PTFE overhead mechanical mixer at 100 rpm. After the reaction was determined to be complete by either complete consumption of sucrose or no change in sucrose concentration between subsequent measurements, the reaction slurry was filtered to remove the insoluble polymer. Yields of the soluble oligosaccharides were determined by HPLC according to the method in Example 40 and are presented in Table 52.

TABLE 52

Yield of oligosaccharides using gtf-J under various operating conditions.

| T (° C.) | Glucose (g/L, t = 0) | Sucrose (g/L, t = 0) | % sucrose converted | g oligomers/ g sucrose reacted | g leucrose/ g sucrose reacted |
|---|---|---|---|---|---|
| 25 | 0 | 94.9 | 95 | 0.12 | 0.32 |
| 25 | 25.2 | 100.4 | 93 | 0.30 | 0.21 |
| 25 | 0 | 407.9 | 96 | 0.20 | 0.56 |
| 42 | 0 | 94.5 | 99 | 0.13 | 0.26 |
| 47 | 0 | 95.0 | 90 | 0.25 | 0.35 |
| 47 | 25.7 | 101.1 | 92 | 0.39 | 0.15 |
| 47 | 103.4 | 102.1 | 81 | 0.65 | 0.09 |

TABLE 52-continued

Yield of oligosaccharides using gtf-J under various operating conditions.

| T (° C.) | Glucose (g/L, t = 0) | Sucrose (g/L, t = 0) | % sucrose converted | g oligomers/ g sucrose reacted | g leucrose/ g sucrose reacted |
|---|---|---|---|---|---|
| 47 | 26.6 | 255.7 | 94 | 0.26 | 0.23 |
| 47 | 105.2 | 408.4 | 91 | 0.47 | 0.26 |
| 47 | 27.6 | 415.3 | 94 | 0.29 | 0.33 |

These results demonstrate that the yield of soluble oligosaccharides is increased when the reaction is run above 42° C., that the yield of oligosaccharides can be further increased by adding an acceptor molecule, such as glucose, and that the amount of leucrose formed decreases upon addition of an acceptor molecule.

Example 42

Oligosaccharide Production Using Other GTF Enzymes

The desired amount of sucrose and 20 mM dihydrogen potassium phosphate were dissolved using deionized water and transferred to a glass bottle equipped with a polypropylene cap. Fermasure™ (DuPont, Wilmington, DE) was then added (0.5 mL/L reaction), and the pH was adjusted to 5.5 using 5 wt % aqueous sodium hydroxide or 5 wt % aqueous sulfuric acid. The reaction was initiated by the addition of crude enzyme extract as prepared in Example 41. Additional truncated GTFs from the following were tested: *Streptococcus sobrinus* (GTF0874; SEQ ID NO: 16), *Streptococcus downei* (GTF1724; SEQ ID NO: 81), and *Streptococcus dentirousetti* (GTF5926; SEQ ID NO: 84). Agitation to the reaction mixture was provided using either a PTFE stirbar or an Inova 42 incubator shaker, and the reaction was heated either using a block heater or the incubator shaker. After the reaction was determined to be complete by either complete consumption of sucrose or no change in sucrose concentration between subsequent measurements, the reaction slurry was filtered to remove the insoluble polymer. Yield of the soluble oligosaccharides was determined by HPLC according to the method in Example 41 and are presented in Table 53.

TABLE 53

Comparison of oligomer yield using gtf enzymes under various operating conditions.

| Scale (mL) | SEQ ID NO | T (° C.) | Sucrose (g/L, t = 0) | % sucrose converted | g oligomer/ g sucrose reacted | g leucrose/ g sucrose reacted |
|---|---|---|---|---|---|---|
| 100 | SEQ ID NO: 16 | 37 | 146.0 | 97 | 0.24 | 0.39 |
| 10 | SEQ ID NO: 16 | 50 | 149.1 | 95 | 0.30 | 0.24 |
| 100 | SEQ ID NO: 81 | 37 | 146.1 | 99 | 0.25 | 0.33 |
| 10 | SEQ ID NO: 81 | 50 | 149.1 | 99 | 0.33 | 0.24 |
| 100 | SEQ ID NO: 84 | 37 | 145.8 | 74 | 0.21 | 0.29 |
| 10 | SEQ ID NO: 84 | 50 | 149.1 | 99 | 0.30 | 0.28 |

These results demonstrate that behavior described in Example 41 is general to other gtf enzymes.

Example 43

Preparation of a Sodium Carboxymethyl α-Glucan

This Example describes producing the glucan ether derivative, carboxymethyl glucan, using the α-glucan oligomer/polymer composition described herein.

Approximately 1 g of an α-glucan oligomer/polymer composition as described in Examples 30, 32, 33, 34, 36 and 37 is added to 20 mL of isopropanol in a 50-mL capacity round bottom flask fitted with a thermocouple for temperature monitoring and a condenser connected to a recirculating bath, and a magnetic stir bar. Sodium hydroxide (4 mL of a 15% solution) is added drop wise to the preparation, which is then heated to 25° C. on a hotplate. The preparation is stirred for 1 hour before the temperature is increased to 55° C. Sodium monochloroacetate (0.3 g) is then added to provide a reaction, which is held at 55° C. for 3 hours before being neutralized with glacial acetic acid. The material is then collected and analyzed by NMR to determine degree of substitution (DoS) of the solid.

Various DoS samples of carboxymethyl α-glucan are prepared using processes similar to the above process, but with certain modifications such as the use of different reagent (sodium monochloroacetate): α-glucan oligomer/polymer molar ratios, different NaOH:α-glucan oligomer/polymer molar ratios, different temperatures, and/or reaction times.

Example 44

Viscosity Modification Using Carboxymethyl α-Glucan

This Example describes the effect of carboxymethyl α-glucan on the viscosity of an aqueous composition.

Various sodium carboxymethyl glucan samples as prepared in Example 43 are tested. To prepare 0.6 wt % solutions of each of these samples, 0.102 g of sodium carboxymethyl α-glucan is added to DI water (17 g). Each preparation is then mixed using a bench top vortexer at 1000 rpm until completely dissolved.

To determine the viscosity of carboxymethyl α-glucan, each solution of the dissolved α-glucan ether samples is subjected to various shear rates using a Brookfield III+ viscometer equipped with a recirculating bath to control temperature (20° C.). The shear rate is increased using a gradient program which increased from 0.1-232.5 rpm and the shear rate is increased by 4.55 (1/s) every 20 seconds.

Example 45

Preparation of Carboxymethyl Dextran from Solid Dextran

This Example describes producing carboxymethyl dextran for use in Example 46.

Approximately 0.5 g of solid dextran ($M_w$=750000) was added to 10 mL of isopropanol in a 50-mL capacity round bottom flask fitted with a thermocouple for temperature monitoring and a condenser connected to a recirculating bath, and a magnetic stir bar. Sodium hydroxide (0.9 mL of a 15% solution) was added drop wise to the preparation, which was then heated to 25° C. on a hotplate. The preparation was stirred for 1 hour before the temperature was increased to 55° C. Sodium monochloroacetate (0.15 g) was then added to provide a reaction, which was held at 55° C. for 3 hours before being neutralized with glacial acetic acid. The solid material was then collected by vacuum filtration and washed with ethanol (70%) four times, dried under vacuum at 20-25° C., and analyzed by NMR to determine degree of substitution (DoS) of the solid. The solid was identified as sodium carboxymethyl dextran.

Additional sodium carboxymethyl dextran was prepared using dextran of different $M_w$. The DoS values of carboxymethyl dextran samples prepared in this example are provided in Table 54.

TABLE 54

Samples of Sodium Carboxymethyl Dextran Prepared from Solid Dextran

| Product Sample Designation | Dextran $M_w$ | Reagent[a]: Dextran Molar Ratio[b] | NaOH: Dextran Molar Ratio[b] | Reaction Time (hours) | DoS |
|---|---|---|---|---|---|
| 2A | 750000 | 0.41 | 1.08 | 3 | 0.64 |
| 2B | 1750000 | 0.41 | 0.41 | 3 | 0.49 |

[a]Reagent refers to sodium monochloroacetate.
[b]Molar ratios calculated as moles of reagent per moles of dextran (third column), or moles of NaOH per moles of dextran (fourth column).

These carboxymethyl dextran samples were tested for their viscosity modification effects in Example 46.

Example 46 (Comparative)

Effect of Shear Rate on Viscosity of Carboxymethyl Dextran

This Example describes the viscosity, and the effect of shear rate on viscosity, of solutions containing the carboxymethyl dextran samples prepared in Example 46.

Various sodium carboxymethyl dextran samples (2A and 2B) were prepared as described in Example 45. To prepare 0.6 wt % solutions of each of these samples, 0.102 g of sodium carboxymethyl dextran was added to DI water (17 g). Each preparation was then mixed using a bench top vortexer at 1000 rpm until the solid was completely dissolved.

To determine the viscosity of carboxymethyl dextran at various shear rates, each solution of the dissolved dextran ether samples was subjected to various shear rates using a Brookfield III+ viscometer equipped with a recirculating bath to control temperature (20° C.). The shear rate was increased using a gradient program which increased from 0.1-232.5 rpm and the shear rate was increased by 4.55 (1/s) every 20 seconds. The results of this experiment at 14.72 (1/s) are listed in Table 55.

TABLE 55

Viscosity of Carboxymethyl Dextran Solutions at Various Shear Rates

| Sample | Sample Loading (wt %) | Viscosity (cPs) @ 66.18 rpm | Viscosity (cPs) @ 110.3 rpm | Viscosity (cPs) @ 183.8 rpm | Viscosity (cPs) @ 250 rpm |
|---|---|---|---|---|---|
| 2A | 0.6 | 4.97 | 2.55 | 4.43 | 3.88 |
| 2B | 0.6 | 6.86 | 5.68 | 5.28 | 5.26 |

The results summarized in Table 55 indicate that 0.6 wt % solutions of carboxymethyl dextran have viscosities of about 2.5-7 cPs.

Example 47 (Comparative)

Preparation of Carboxymethyl α-Glucan

This Example describes producing carboxymethyl glucan for use in Example 48.

The glucan was prepared as described in Examples 30, 32, 33, 34, 36 or 37.

Approximately 150 g of the α-glucan oligomer/polymer composition is added to 3000 mL of isopropanol in a 500-mL capacity round bottom flask fitted with a thermocouple for temperature monitoring and a condenser connected to a recirculating bath, and a magnetic stir bar.

Sodium hydroxide (600 mL of a 15% solution) is added drop wise to the preparation, which is then heated to 25° C. on a hotplate. The preparation is stirred for 1 hour before the temperature is increased to 55° C. Sodium monochloroacetate is then added to provide a reaction, which is held at 55° C. for 3 hours before being neutralized with 90% acetic acid. The material is then collected and analyzed by NMR to determine degree of substitution (DoS).

Various DoS samples of carboxymethyl α-glucan are prepared using processes similar to the above process, but with certain modifications such as the use of different reagent (sodium monochloroacetate):α-glucan oligomer/polymer molar ratios, different NaOH:α-glucan oligomer/polymer molar ratios, different temperatures, and/or reaction times.

Example 48 (Comparative)

Viscosity Modification Using Carboxymethyl α-Glucan

This Example describes the effect of carboxymethyl α-glucan on the viscosity of an aqueous composition.

Various sodium carboxymethyl glucan samples are prepared as described in Example 47. To prepare 0.6 wt % solutions of each of these samples, 0.102 g of sodium carboxymethyl α-glucan is added to DI water (17 g). Each preparation is then mixed using a bench top vortexer at 1000 rpm until completely dissolved.

To determine the viscosity of carboxymethyl glucan at various shear rates, each solution of the glucan ether samples is subjected to various shear rates using a Brookfield III+ viscometer equipped with a recirculating bath to control temperature (20° C.). The shear rate is increased using a gradient program which increased from 0.1-232.5 rpm and then the shear rate is increased by 4.55 (1/s) every 20 seconds.

Example 49 (Comparative)

Viscosity Modification Using Carboxymethyl Cellulose

This Example describes the effect of carboxymethyl cellulose (CMC) on the viscosity of an aqueous composition.

CMC samples obtained from DuPont Nutrition & Health (Danisco) were dissolved in DI water to prepare 0.6 wt % solutions of each sample.

To determine the viscosity of CMC at various shear rates, each solution of the dissolved CMC samples was subjected to various shear rates using a Brookfield III+ viscometer equipped with a recirculating bath to control temperature (20° C.). The shear rate was increased using a gradient program which increased from 0.1-232.5 rpm and the shear rate was increased by 4.55 (1/s) every 20 seconds. Results of this experiment at 14.72 (1/s) are listed in Table 56.

TABLE 56

Viscosity of CMC Solutions

| Sample | Molecular Weight (Mw) | DoS | Sample Loading (wt %) | Viscosity (cPs) @ 14.9 rpm |
|---|---|---|---|---|
| C3A (BAK 130) | ~130000 | 0.66 | 0.6 | 235.03 |
| C3B (BAK 550) | ~550000 | 0.734 | 0.6 | 804.31 |

Example 50

Creating Calibration Curves for Direct Red 80 and Toluidine Blue O Dyes Using UV Absorption This example discloses creating calibration curves that could be useful for determining the relative level of adsorption of glucan ether derivatives onto fabric surfaces.

Solutions of known concentration (ppm) are made using Direct Red 80 and Toluidine Blue O dyes. The absorbance of these solutions are measured using a LAMOTTE SMART2 Colorimeter at either 520 nm (Direct Red 80) or 620 nm (Toluidine Blue O Dye). The absorption information is plotted in order that it can be used to determine dye concentration of solutions exposed to fabric samples. The concentration and absorbance of each calibration curve are provided in Tables 57 and 58.

TABLE 57

Direct Red 80 Dye Calibration Curve Data

| Dye Concentration (ppm) | Average Absorbance @520 nm |
|---|---|
| 25 | 0.823333333 |
| 22.5 | 0.796666667 |
| 20 | 0.666666667 |
| 15 | 0.51 |
| 10 | 0.37 |
| 5 | 0.2 |

TABLE 58

Toluidine Blue O Dye Calibration Curve Data

| Dye Concentration (ppm) | Average Absorbance @620 nm |
|---|---|
| 12.5 | 1.41 |
| 10 | 1.226666667 |
| 7 | 0.88 |
| 5 | 0.676666667 |
| 3 | 0.44 |
| 1 | 0.166666667 |

Thus, calibration curves were prepared that are useful for determining the relative level of adsorption of poly alpha-1,3-glucan ether derivatives onto fabric surfaces.

Example 51

Preparation of Quaternary Ammonium Glucan

This Example describes how one could produce a quaternary ammonium glucan ether derivative. Specifically, trimethylammonium hydroxypropyl glucan can be produced.

Approximately 10 g of the α-glucan oligomer/polymer composition (prepared as in Examples 30, 32, 33, 34, 36, or 37) is added to 100 mL of isopropanol in a 500-mL capacity round bottom flask fitted with a thermocouple for temperature monitoring and a condenser connected to a recirculating bath, and a magnetic stir bar. 30 mL of sodium hydroxide (17.5% solution) is added drop wise to this preparation, which is then heated to 25° C. on a hotplate. The preparation is stirred for 1 hour before the temperature is increased to 55° C. 3-chloro-2-hydroxypropyl-trimethylammonium chloride (31.25 g) is then added to provide a reaction, which is held at 55° C. for 1.5 hours before being neutralized with 90% acetic acid. The product that forms (trimethylammonium hydroxypropyl glucan) is collected by vacuum filtration and washed with ethanol (95%) four times, dried under vacuum at 20-25° C., and analyzed by NMR and SEC to determine molecular weight and DoS.

Thus, the quaternary ammonium glucan ether derivative, trimethylammonium hydroxypropyl glucan, can be prepared and isolated.

Example 52

Effect of Shear Rate on Viscosity of Quaternary Ammonium Glucan

This Example describes how one could test the effect of shear rate on the viscosity of trimethylammonium hydroxypropyl glucan as prepared in Example 51. It is contemplated that this glucan ether derivative exhibits shear thinning or shear thickening behavior.

Samples of trimethylammonium hydroxypropyl glucan are prepared as described in Example 51. To prepare a 2 wt % solution of each sample, 1 g of sample is added to 49 g of DI water. Each preparation is then homogenized for 12-15 seconds at 20,000 rpm to dissolve the trimethylammonium hydroxypropyl glucan sample in the water.

To determine the viscosity of each 2 wt % quaternary ammonium glucan solution at various shear rates, each solution is subjected to various shear rates using a Brookfield DV III+ Rheometer equipped with a recirculating bath to control temperature (20° C.) and a ULA (ultra low adapter) spindle and adapter set. The shear rate is increased using a gradient program which increases from 10-250 rpm and the shear rate is increased by 4.9 1/s every 20 seconds for the ULA spindle and adapter.

It is contemplated that the viscosity of each of the quaternary ammonium glucan solutions would change (reduced or increased) as the shear rate is increased, thereby indicating that the solutions demonstrate shear thinning or shear thickening behavior. Such would indicate that quaternary ammonium glucan could be added to an aqueous liquid to modify its rheological profile.

Example 53

Adsorption of Quaternary Ammonium Glucan on Various Fabrics

This example discloses how one could test the degree of adsorption of a quaternary ammonium glucan (trimethylammonium hydroxypropyl glucan) on different types of fabrics.

A 0.07 wt % solution of trimethylammonium hydroxypropyl glucan (as prepared in Example 51) is made by dissolving 0.105 g of the polymer in 149.89 g of deionized water. This solution is divided into several aliquots with different concentrations of polymer (Table 59). Other components are added such as acid (dilute hydrochloric acid) or base (sodium hydroxide) to modify pH, or NaCl salt.

TABLE 59

Quaternary Ammonium Glucan Solutions Useful in Fabric Adsorotion Studies

| Amount of NaCl (g) | Amount of Solution (g) | Polymer Concentration (wt %) | Final pH |
|---|---|---|---|
| 0 | 15 | 0.07 | ~7 |
| 0.15 | 14.85 | 0.0693 | ~7 |
| 0.3 | 14.7 | 0.0686 | ~7 |
| 0.45 | 14.55 | 0.0679 | ~7 |
| 0 | 9.7713 | 0.0683 | ~3 |
| 0 | 9.7724 | 0.0684 | ~5 |
| 0 | 10.0311 | 0.0702 | ~9 |
| 0 | 9.9057 | 0.0693 | ~11 |

Four different fabric types (cretonne, polyester, 65:35 polyester/cretonne, bleached cotton) are cut into 0.17 g pieces. Each piece is placed in a 2-mL well in a 48-well cell culture plate. Each fabric sample is exposed to 1 mL of each of the above solutions (Table 59) for a total of 36 samples (a control solution with no polymer is included for each fabric test). The fabric samples are allowed to sit for at least 30 minutes in the polymer solutions. The fabric samples are removed from the polymer solutions and rinsed in DI water for at least one minute to remove any unbound polymer. The fabric samples are then dried at 60° C. for at least 30 minutes until constant dryness is achieved. The fabric samples are weighed after drying and individually placed in 2-mL wells in a clean 48-well cell culture plate. The fabric samples are then exposed to 1 mL of a 250 ppm Direct Red 80 dye solution. The samples are left in the dye solution for at least 15 minutes. Each fabric sample is removed from the dye solution, after which the dye solution is diluted 10×.

The absorbance of the diluted solutions is measured compared to a control sample. A relative measure of glucan polymer adsorbed to the fabric is calculated based on the calibration curve created in Example 50 for Direct Red 80 dye. Specifically, the difference in UV absorbance for the fabric samples exposed to polymer compared to the controls (fabric not exposed to polymer) represents a relative measure of polymer adsorbed to the fabric. This difference in UV absorbance could also be expressed as the amount of dye bound to the fabric (over the amount of dye bound to control), which is calculated using the calibration curve (i.e., UV absorbance is converted to ppm dye). A positive value represents the dye amount that is in excess to the dye amount bound to the control fabric, whereas a negative value represents the dye amount that is less than the dye amount bound to the control fabric. A positive value would reflect that the glucan ether compound adsorbed to the fabric surface.

It is believed that this assay would demonstrate that quaternary ammonium glucan can adsorb to various types of fabric under different salt and pH conditions. This adsorption would suggest that cationic glucan ether derivatives are useful in detergents for fabric care (e.g., as anti-redeposition agents).

Example 54

Adsorption of the Present α-Glucan Fiber Compositions on Various Fabrics

This example discloses how one could test the degree of adsorption of the present α-glucan oligomer/polymer composition (unmodified) on different types of fabrics.

A 0.07 wt % solution of the present α-glucan oligomer/polymer composition (as prepared in Examples 30, 32, 33, 34, 36 or 37) is made by dissolving 0.105 g of the polymer in 149.89 g of deionized water. This solution is divided into several aliquots with different concentrations of polymer (Table 60). Other components are added such as acid (dilute hydrochloric acid) or base (sodium hydroxide) to modify pH, or NaCl salt.

TABLE 60

α-Glucan Fiber Solutions Useful in Fabric Adsorption Studies

| Amount of NaCl (g) | Amount of Solution (g) | Polymer Concentration (wt %) | Final pH |
|---|---|---|---|
| 0 | 15 | 0.07 | ~7 |
| 0.15 | 14.85 | 0.0693 | ~7 |
| 0.3 | 14.7 | 0.0686 | ~7 |
| 0.45 | 14.55 | 0.0679 | ~7 |
| 0 | 9.7713 | 0.0683 | ~3 |
| 0 | 9.7724 | 0.0684 | ~5 |
| 0 | 10.0311 | 0.0702 | ~9 |
| 0 | 9.9057 | 0.0693 | ~11 |

Four different fabric types (cretonne, polyester, 65:35 polyester/cretonne, bleached cotton) are cut into 0.17 g pieces. Each piece is placed in a 2-mL well in a 48-well cell culture plate. Each fabric sample is exposed to 1 mL of each of the above solutions (Table 60) for a total of 36 samples (a control solution with no polymer is included for each fabric test). The fabric samples are allowed to sit for at least 30 minutes in the polymer solutions. The fabric samples are removed from the polymer solutions and rinsed in DI water for at least one minute to remove any unbound polymer. The fabric samples are then dried at 60° C. for at least 30 minutes until constant dryness is achieved. The fabric samples are weighed after drying and individually placed in 2-mL wells in a clean 48-well cell culture plate. The fabric samples are then exposed to 1 mL of a 250 ppm Direct Red 80 dye solution. The samples are left in the dye solution for at least 15 minutes. Each fabric sample is removed from the dye solution, after which the dye solution is diluted 10×.

The absorbance of the diluted solutions is measured compared to a control sample. A relative measure of the α-glucan polymer adsorbed to the fabric is calculated based on the calibration curve created in Example 50 for Direct Red 80 dye. Specifically, the difference in UV absorbance for the fabric samples exposed to polymer compared to the controls (fabric not exposed to polymer) represents a relative measure of polymer adsorbed to the fabric. This difference in UV absorbance could also be expressed as the amount of dye bound to the fabric (over the amount of dye bound to control), which is calculated using the calibration curve (i.e., UV absorbance is converted to ppm dye). A positive value represents the dye amount that is in excess to the dye amount bound to the control fabric, whereas a negative value represents the dye amount that is less than the dye amount bound to the control fabric. A positive value would reflect that the glucan ether compound adsorbed to the fabric surface.

It is believed that this assay would demonstrate that the present α-glucan oligomer/polymer compositions can adsorb to various types of fabric under different salt and pH conditions. This adsorption would suggest that the present α-glucan oligomer/polymer compositions are useful in detergents for fabric care (e.g., as anti-redeposition agents).

Example 55

Adsorption of Carboxymethyl α-Glucan (CMG) on Various Fabrics

This example discloses how one could test the degree of adsorption of an α-glucan ether compound (CMG) on different types of fabrics.

A 0.25 wt % solution of CMG is made by dissolving 0.375 g of the polymer in 149.625 g of deionized water. This solution is divided into several aliquots with different concentrations of polymer (Table 61). Other components are added such as acid (dilute hydrochloric acid) or base (sodium hydroxide) to modify pH, or NaCl salt.

TABLE 61

CMG Solutions Useful in Fabric Adsorption Studies

| Amount of NaCl (g) | Amount of Solution (g) | Polymer Concentration (wt %) | Final pH |
|---|---|---|---|
| 0 | 15 | 0.25 | ~7 |
| 0.15 | 14.85 | 0.2475 | ~7 |
| 0.3 | 14.7 | 0.245 | ~7 |
| 0.45 | 14.55 | 0.2425 | ~7 |
| 0 | 9.8412 | 0.2459 | ~3 |
| 0 | 9.4965 | 0.2362 | ~5 |
| 0 | 9.518 | 0.2319 | ~9 |
| 0 | 9.8811 | 0.247 | ~11 |

Four different fabric types (cretonne, polyester, 65:35 polyester/cretonne, bleached cotton) are cut into 0.17 g pieces. Each piece is placed in a 2-mL well in a 48-well cell culture plate. Each fabric sample is exposed to 1 mL of each of the above solutions (Table 61) for a total of 36 samples (a control solution with no polymer is included for each fabric test). The fabric samples are allowed to sit for at least 30 minutes in the polymer solutions. The fabric samples are removed from the polymer solutions and rinsed in DI water for at least one minute to remove any unbound polymer. The fabric samples are then dried at 60° C. for at least 30 minutes until constant dryness is achieved. The fabric samples are weighed after drying and individually placed in 2-mL wells in a clean 48-well cell culture plate. The fabric samples are then exposed to 1 mL of a 250 ppm Toluidine Blue dye solution. The samples are left in the dye solution for at least 15 minutes. Each fabric sample is removed from the dye solution, after which the dye solution is diluted 10×.

The absorbance of the diluted solutions is measured compared to a control sample. A relative measure of CMG polymer adsorbed to the fabric is calculated based on the calibration curve created in Example 50 for Toluidine Blue dye. Specifically, the difference in UV absorbance for the fabric samples exposed to polymer compared to the controls (fabric not exposed to polymer) represents a relative measure of polymer adsorbed to the fabric. This difference in UV absorbance could also be expressed as the amount of dye bound to the fabric (over the amount of dye bound to control), which is calculated using the calibration curve (i.e., UV absorbance is converted to ppm dye). A positive value represents the dye amount that is in excess to the dye amount bound to the control fabric, whereas a negative value represents the dye amount that is less than the dye amount bound to the control fabric. A positive value would reflect that the CMG polymer adsorbed to the fabric surface.

It is believed that this assay would demonstrate that CMG polymer can adsorb to various types of fabric under different salt and pH conditions. This adsorption would suggest that the present glucan ether derivatives are useful in detergents for fabric care (e.g., as anti-redeposition agents).

Example 56

Effect of Cellulase on Carboxymethyl Glucan (CMG)

This example discloses how one could test the stability of an α-glucan ether, CMG, in the presence of cellulase compared to the stability of carboxymethyl cellulose (CMC). Stability to cellulase would indicate applicability of CMG to use in cellulase-containing compositions/processes such as in fabric care.

Solutions (1 wt %) of CMC ($M_w$=90000, DoS=0.7) or CMG are treated with cellulase or amylase as follows. CMG or CMC polymer (100 mg) is added to a clean 20-mL glass scintillation vial equipped with a PTFE stir bar. Water (10.0 mL) that has been previously adjusted to pH 7.0 using 5 vol % sodium hydroxide or 5 vol % sulfuric acid is then added to the scintillation vial, and the mixture is agitated until a solution (1 wt %) forms. A cellulase or amylase enzyme is added to the solution, which is then agitated for 24 hours at room temperature (~25° C.). Each enzyme-treated sample is analyzed by SEC (above) to determine the molecular weight of the treated polymer. Negative controls are conducted as above, but without the addition of a cellulase or amylase. Various enzymatic treatments of CMG and CMC that could be performed are listed in Table 62, for example.

TABLE 62

Measuring Stability of CMG and CMC Against Degradation by Cellulase or Amylase

| Polymer | Enzyme | Enzyme Type | Enzyme Loading |
|---|---|---|---|
| CMC | none | N/A | — |
| CMC | PURADAX HA 1200E | Cellulase | 1 mg/mL |
| CMC | PREFERENZ S 100 | Amylase | 3 μL/mL |
| CMG | none | N/A | — |
| CMG | PURADAX HA 1200E | Cellulase | 1 mg/mL |
| CMG | PREFERENZ S 100 | Amylase | 3 μL/mL |
| CMG | PURASTAR ST L | Amylase | 3 μL/mL |
| CMG | PURADAX EG L | Cellulase | 3 μL/mL |

It is believed that the enzymatic studies in Table 62 would indicate that CMC is highly susceptible to degradation by cellulase, whereas CMG is more resistant to this degradation. It is also believed that these studies would indicate that both CMC and CMG are largely stable to amylase.

Use of CMC for providing viscosity to an aqueous composition (e.g., laundry or dishwashing detergent) containing cellulase would be unacceptable. CMG on the other hand, given its stability to cellulase, would be useful for cellulase-containing aqueous compositions such as detergents.

Example 57

Effect of Cellulase on Carboxymethyl Glucan (CMG)

This example discloses how one could test the stability of the present α-glucan oligomer/polymer composition (unmodified) in the presence of cellulase compared to the stability of carboxymethyl cellulose (CMC). Stability to cellulase would indicate applicability of the present α-glucan oligomer/polymer composition to use in cellulase-containing compositions/processes, such as in fabric care.

Solutions (1 wt %) of CMC ($M_w$=90000, DoS=0.7) or the present α-glucan oligomer/polymer composition as described in Examples 30, 32, 33, 34, 36 or 37 are treated with cellulase or amylase as follows. The present α-glucan oligomer/polymer composition or CMC polymer (100 mg) is added to a clean 20-mL glass scintillation vial equipped with a PTFE stir bar. Water (10.0 mL) that has been previously adjusted to pH 7.0 using 5 vol % sodium hydroxide or 5 vol % sulfuric acid is then added to the scintillation vial, and the mixture is agitated until a solution (1 wt %) forms. A cellulase or amylase enzyme is added to the solution, which is then agitated for 24 hours at room temperature (~25° C.). Each enzyme-treated sample is analyzed by SEC (above) to determine the molecular weight of the treated polymer. Negative controls are conducted as above, but without the addition of a cellulase or amylase. Various enzymatic treatments of the present α-glucan oligomer/polymer composition and CMC that could be performed are listed in Table 63, for example.

TABLE 63

Measuring Stability of an a-Glucan Fiber Composition and CMC Against Degradation by Cellulase or Amylase

| Polymer | Enzyme | Enzyme Type | Enzyme Loading |
|---|---|---|---|
| CMC | none | N/A | — |
| CMC | PURADAX HA 1200E | Cellulase | 1 mg/mL |
| CMC | PREFERENZ S 100 | Amylase | 3 μL/mL |
| α-GF[1] | none | N/A | — |
| α-GF | PURADAX HA 1200E | Cellulase | 1 mg/mL |
| α-GF | PREFERENZ S 100 | Amylase | 3 μL/mL |
| α-GF | PURASTAR ST L | Amylase | 3 μL/mL |
| α-GF | PURADAX EG L | Cellulase | 3 μL/mL |

[1]α-GF is the present α-glucan fiber.

It is believed that the enzymatic studies in Table 63 would indicate that CMC is highly susceptible to degradation by cellulase, whereas the present α-glucan oligomer/polymer composition is more resistant to this degradation. It is also believed that these studies would indicate that both CMC and the present α-glucan oligomer/polymer composition are largely stable to amylase.

Use of CMC for providing viscosity to an aqueous composition (e.g., laundry or dishwashing detergent) containing cellulase would be unacceptable. The present α-glucan oligomer/polymer composition (unmodified) on the other hand, given its stability to cellulase, would be useful for cellulase-containing aqueous compositions such as detergents.

Example 58

Preparation of Hydroxypropyl α-Glucan

This Example describes producing the glucan ether derivative, hydroxypropyl α-glucan.

Approximately 10 g of the present α-glucan oligomer/polymer composition as prepared in Examples 30, 32, 33, 34, 36 or 37 is mixed with 101 g of toluene and 5 mL of 20% sodium hydroxide. This preparation is stirred in a 500-mL glass beaker on a magnetic stir plate at 55° C. for 30 minutes. The preparation is then transferred to a shaker tube reactor after which 34 g of propylene oxide is added; the reaction is then stirred at 75° C. for 3 hours. The reaction is then neutralized with 20 g of acetic acid and the hydroxypropyl α-glucan formed is collected, washed with 70% aqueous ethanol or hot water, and dried. The molar substitution (MS) of the product is determined by NMR.

Example 59

Preparation of Hydroxyethyl α-Glucan

This Example describes producing the glucan ether derivative, hydroxyethyl poly alpha-1, 3-glucan.

Approximately 10 g of the present α-glucan oligomer/polymer composition as prepared in Examples 30, 32, 33, 34, 36, or 37 is mixed with 150 mL of isopropanol and 40 mL of 30% sodium hydroxide. This preparation is stirred in a 500-mL glass beaker on a magnetic stir plate at 55° C. for 1 hour, and then is stirred overnight at ambient temperature. The preparation is then transferred to a shaker tube reactor after which 15 g of ethylene oxide is added; the reaction is then stirred at 60° C. for 6 hour. The reaction is then allowed to remain in the sealed shaker tube overnight (approximately 16 hours) before it is neutralized with 20.2 g of acetic acid thereby forming hydroxyethyl glucan. The hydroxyethyl glucan solids is collected and is washed in a beaker by adding a methanol:acetone (60:40 v/v) mixture and stirring with a stir bar for 20 minutes. The methanol:acetone mixture is then filtered away from the solids. This washing step is repeated two times prior to drying of the product. The molar substitution (MS) of the product is determined by NMR.

Example 60

Preparation of Ethyl α-Glucan

This Example describes producing the glucan ether derivative, ethyl glucan.

Approximately 10 g of the present α-glucan oligomer/polymer composition as prepared in Examples 30, 32, 33, 34, 36, or 37 is added to a shaker tube, after which sodium hydroxide (1-70% solution) and ethyl chloride are added to provide a reaction. The reaction is heated to 25-200° C. and held at that temperature for 1-48 hours before the reaction is neutralized with acetic acid. The resulting product is collected washed, and analyzed by NMR and SEC to determine the molecular weight and degree of substitution (DoS) of the ethyl glucan.

Example 61

Preparation of Ethyl Hydroxyethyl α-Glucan

This Example describes producing the glucan ether derivative, ethyl hydroxyethyl glucan.

Approximately 10 g of the present α-glucan oligomer/polymer composition as prepared in Examples 30, 32, 33, 34, 36, or 37 is added to a shaker tube, after which sodium hydroxide (1-70% solution) is added. Then, ethyl chloride is added followed by an ethylene oxide/ethyl chloride mixture to provide a reaction. The reaction is slowly heated to 25-200° C. and held at that temperature for 1-48 hours before being neutralized with acetic acid. The product formed is collected, washed, dried under a vacuum at 20-70° C., and then analyzed by NMR and SEC to determine the molecular weight and DoS of the ethyl hydroxyethyl glucan.

Example 62

Preparation of Methyl α-Glucan

This Example describes producing the glucan ether derivative, methyl glucan.

Approximately 10 g of the present α-glucan oligomer/polymer composition as prepared in Examples 30, 32, 33, 34, 36, or 37 is mixed with 40 mL of 30% sodium hydroxide and 40 mL of 2-propanol, and is stirred at 55° C. for 1 hour to provide alkali glucan. This preparation is then filtered, if needed, using a Buchner funnel. The alkali glucan is then mixed with 150 mL of 2-propanol. A shaker tube reactor is charged with the mixture and 15 g of methyl chloride is added to provide a reaction. The reaction is stirred at 70° C. for 17 hours. The resulting methyl glucan solid is filtered and neutralized with 20 mL 90% acetic acid, followed by three 200-mL ethanol washes. The resulting product is analyzed by NMR and SEC to determine the molecular weight and degree of substitution (DoS).

Example 63

Preparation of Hydroxyalkyl Methyl α-Glucan

This Example describes producing the glucan ether derivative, hydroxyalkyl methyl α-glucan.

Approximately 10 g of the present α-glucan oligomer/polymer composition as prepared in Examples 30, 32, 33, 34, 36, or 37 is added to a vessel, after which sodium hydroxide (5-70% solution) is added. This preparation is stirred for 0.5-8 hours. Then, methyl chloride is added to the vessel to provide a reaction, which is then heated to 30-100° C. for up to 14 days. An alkylene oxide (e.g., ethylene oxide, propylene oxide, butylene oxide, etc.) is then added to the reaction while controlling the temperature. The reaction is heated to 25-100° C. for up to 14 days before being neutralized with acid. The product thus formed is filtered, washed and dried. The resulting product is analyzed by NMR and SEC to determine the molecular weight and degree of substitution (DoS).

Example 64

Preparation of Carboxymethyl Hydroxyethyl α-Glucan

This Example describes producing the glucan ether derivative, carboxymethyl hydroxyethyl glucan.

Approximately 10 g of the present α-glucan oligomer/polymer composition as prepared in Examples 30, 32, 33, 34, 36, or 37 is added to an aliquot of a substance such as isopropanol or toluene in a 400-mL capacity shaker tube, after which sodium hydroxide (1-70% solution) is added. This preparation is stirred for up to 48 hours. Then, monochloroacetic acid is added to provide a reaction, which is then heated to 25-100° C. for up to 14 days. Ethylene oxide is then added to the reaction, which is then heated to 25-100° C. for up to 14 days before being neutralized with acid (e.g., acetic, sulfuric, nitric, hydrochloric, etc.). The product thus formed is collected, washed and dried. The resulting product is analyzed by NMR and SEC to determine the molecular weight and degree of substitution (DoS).

Example 65

Preparation of Sodium Carboxymethyl Hydroxyethyl α-Glucan

This Example describes producing the glucan ether derivative, sodium carboxymethyl hydroxyethyl glucan.

Approximately 10 g of the present α-glucan oligomer/polymer composition as prepared in Example 30, 32, 33, 34, 36, or 37 is added to an aliquot of an alcohol such as isopropanol in a 400-mL capacity shaker tube, after which sodium hydroxide (1-70% solution) is added. This preparation is stirred for up to 48 hours. Then, sodium monochloroacetate is added to provide a reaction, which is then heated to 25-100° C. for up to 14 days. Ethylene oxide is then added to the reaction, which is then heated to 25-100° C. for up to 14 days before being neutralized with acid (e.g., acetic, sulfuric, nitric, hydrochloric, etc.). The product thus formed is collected, washed and dried. The resulting product is analyzed by NMR and SEC to determine the molecular weight and degree of substitution (DoS).

Example 66

Preparation of Carboxymethyl Hydroxypropyl α-Glucan

This Example describes producing the glucan ether derivative, carboxymethyl hydroxypropyl glucan.

Approximately 10 g of the present α-glucan oligomer/polymer composition as prepared in Examples 30, 32, 33, 34, 36, or 37 is added to an aliquot of a substance such as isopropanol or toluene in a 400-mL capacity shaker tube, after which sodium hydroxide (1-70% solution) is added. This preparation is stirred for up to 48 hours. Then, monochloroacetic acid is added to provide a reaction, which is then heated to 25-100° C. for up to 14 days. Propylene oxide is then added to the reaction, which is then heated to 25-100° C. for up to 14 days before being neutralized with acid (e.g., acetic, sulfuric, nitric, hydrochloric, etc.). The solid product thus formed is collected, washed and dried. The resulting product is analyzed by NMR and SEC to determine the molecular weight and degree of substitution (DoS).

Example 67

Preparation of Sodium Carboxymethyl Hydroxypropyl α-Glucan

This Example describes producing the glucan ether derivative, sodium carboxymethyl hydroxypropyl glucan.

Approximately 10 g of the present α-glucan oligomer/polymer composition as prepared in Examples 30, 32, 33, 34, 36, or 37 is added to an aliquot of a substance such as isopropanol or toluene in a 400-mL capacity shaker tube, after which sodium hydroxide (1-70% solution) is added. This preparation is stirred for up to 48 hours. Then, sodium monochloroacetate is added to provide a reaction, which is then heated to 25-100° C. for up to 14 days. Propylene oxide is then added to the reaction, which is then heated to 25-100° C. for up to 14 days before being neutralized with acid (e.g., acetic, sulfuric, nitric, hydrochloric, etc.). The product thus formed is collected, washed and dried. The resulting product is analyzed by NMR and SEC to determine the molecular weight and degree of substitution (DoS).

Example 68

Preparation of Potassium Carboxymethyl α-Glucan

This Example describes producing the glucan ether derivative, potassium carboxymethyl glucan.

Approximately 10 g of the present α-glucan oligomer/polymer composition as prepared in Examples 30, 32, 33, 34, 36, or 37 is added to 200 mL of isopropanol in a 500-mL capacity round bottom flask fitted with a thermocouple for temperature monitoring and a condenser connected to a recirculating bath, and a magnetic stir bar. 40 mL of potassium hydroxide (15% solution) is added drop wise to this preparation, which is then heated to 25° C. on a hotplate. The preparation is stirred for 1 hour before the temperature is increased to 55° C. Potassium chloroacetate (12 g) is then added to provide a reaction, which was held at 55° C. for 3 hours before being neutralized with 90% acetic acid. The product formed was collected, washed with ethanol (70%), and dried under vacuum at 20-25° C. The resulting product is analyzed by NMR and SEC to determine the molecular weight and degree of substitution (DoS).

Example 69

Preparation of Lithium Carboxymethyl α-Glucan

This Example describes producing the glucan ether derivative, lithium carboxymethyl glucan.

Approximately 10 g of the present α-glucan oligomer/polymer composition as prepared in Examples 30, 32, 33, 34, 36, or 37 is added to 200 mL of isopropanol in a 500-mL capacity round bottom flask fitted with a thermocouple for temperature monitoring and a condenser connected to a recirculating bath, and a magnetic stir bar. 50 mL of lithium hydroxide (11.3% solution) is added drop wise to this preparation, which is then heated to 25° C. on a hotplate. The preparation is stirred for 1 hour before the temperature is increased to 55° C. Lithium chloroacetate (12 g) is then added to provide a reaction, which is held at 55° C. for 3 hours before being neutralized with 90% acetic acid. The product formed is collected, washed with ethanol (70%), and dried under vacuum at 20-25° C. The resulting product is analyzed by NMR and SEC to determine the molecular weight and degree of substitution (DoS).

Example 70

Preparation of a Dihydroxyalkyl α-Glucan

This Example describes producing a dihydroxyalkyl ether derivative of α-glucan. Specifically, dihydroxypropyl glucan is produced.

Approximately 10 g of the present α-glucan oligomer/polymer composition as prepared in Examples 30, 32, 33, 34, 36, or 37 is added to 100 mL of 20% tetraethylammonium hydroxide in a 500-mL capacity round bottom flask fitted with a thermocouple for temperature monitoring and a condenser connected to a recirculating bath, and a magnetic stir bar (resulting in -9.1 wt % poly alpha-1,3-glucan). This preparation is stirred and heated to 30° C. on a hotplate. The preparation is stirred for 1 hour to dissolve any solids before the temperature is increased to 55° C. 3-chloro-1,2-propanediol (6.7 g) and 11 g of DI water were then added to provide a reaction (containing ~5.2 wt % 3-chloro-1,2-propanediol), which is held at 55° C. for 1.5 hours after which time 5.6 g of DI water is added to the reaction. The reaction is held at 55° C. for an additional 3 hours and 45 minutes before being neutralized with acetic acid. After neutralization, an excess of isopropanol is added. The product formed was collected, washed with ethanol (95%), and dried under vacuum at 20-25° C. The resulting product is analyzed by NMR and SEC to determine the molecular weight and degree of substitution (DoS).

What is claimed is:

1. A composition comprising an alpha-glucan ether, wherein the glycosidic linkages of the alpha-glucan ether comprise:

(i) at least 75% alpha-1,3 glycosidic linkages, (ii) less than 25% alpha-1,6 glycosidic linkages, and (iii) less than 10% alpha-1,3,6 glycosidic linkages, wherein the percent glycosidic linkages of the alpha-glucan are determined by methylation analysis;

wherein the alpha-glucan ether has a degree of substitution (DoS) with at least one organic group that is no higher than 3.0;

wherein the alpha-glucan ether comprises at least one substructure —$C_G$—O—C—, wherein "—$C_G$—" of said substructure represents carbon atom 2, 4, or 6 of a glucose monomeric unit of the alpha-glucan ether, and "—C—" of said substructure represents a carbon atom of said organic group that is in said ether linkage;

and wherein the composition is in the form of a unit dose.

2. The composition of claim 1, wherein said DoS is about 0.05 to about 3.0.

3. The composition of claim 1, wherein the organic group comprises a carboxy alkyl group.

4. The composition of claim 3, wherein the carboxy alkyl group is carboxymethyl.

5. The composition of claim 1, wherein the organic group comprises a hydroxy alkyl group.

6. The composition of claim 5, wherein the hydroxy alkyl group is hydroxypropyl, dihydroxypropyl, or hydroxyethyl.

7. The composition of claim 1, wherein the organic group is an anionic organic group.

8. The composition of claim 1, wherein the organic group is a positively charged organic group.

9. The composition of claim 8, wherein the positively charged organic group is a quaternary ammonium group.

10. The composition of claim 8, wherein the positively charged organic group is a substituted ammonium group.

11. The composition of claim 10, wherein the substituted ammonium group comprises trialkylammonium.

12. The composition of claim 11, wherein the trialkylammonium is trimethylammonium.

13. The composition of claim 1, wherein the alpha-glucan ether is crosslinked.

14. The composition of claim 1, wherein the composition further comprises at least one of a surfactant selected from anionic surfactants, nonionic surfactants, cationic surfactants, or zwitterionic surfactants; enzyme selected from proteases, cellulases, polyesterases, amylases, cutinases, lipases, pectate lyases, perhydrolases, xylanases, peroxidases, or laccases; detergent builder; complexing agent; soil release polymer; surfactancy-boosting polymer; bleaching system; bleach activator; bleaching catalyst; fabric conditioner; clay; foam booster; suds suppressor; anti-corrosion agent; soil-suspending agent; anti-soil redeposition agent; dye; bactericide; tarnish inhibitor; optical brightener; perfume; saturated or unsaturated fatty acid; dye transfer inhibiting agent; chelating agent; hueing dye; calcium or magnesium cation; visual signaling ingredient; anti-foam; structurant; thickener; anti-caking agent; starch; sand; or gelling agent.

15. The composition of claim 1, wherein the unit dose comprises a powder, granule, tablet, capsule, single-compartment sachet, multi-compartment sachet, pad, or sponge.

16. The composition of claim 1, wherein the unit dose comprises a liquid, gel, hydrocolloid, or aqueous solution.

17. The composition of claim 1, wherein the composition is a fabric care composition.

18. The composition of claim 1, wherein the composition is a dishwashing detergent composition.

19. The composition of claim 18, wherein the dishwashing detergent composition is an automatic dishwashing detergent composition.

20. The composition of claim 1, wherein the organic group is an alkyl group.

21. The composition of claim 20, wherein the alkyl group is a methyl.

22. The composition of claim 20, wherein the alkyl group is an ethyl or propyl.

23. A composition comprising an alpha-glucan, wherein the glycosidic linkages of the alpha-glucan comprise:

(i) at least 75% alpha-1,3 glycosidic linkages, (ii) less than 25% alpha-1,6 glycosidic linkages, and (iii) less than 10% alpha-1,3,6 glycosidic linkages, wherein the percent glycosidic linkages of the alpha-glucan are determined by methylation analysis;

and wherein the composition is in the form of a unit dose comprising a powder, granule, tablet, capsule, single-compartment sachet, multi-compartment sachet, pad, or sponge.

* * * * *

SEQUENCE LISTING

```
Sequence total quantity: 152
SEQ ID NO: 1            moltype = DNA  length = 36
FEATURE                 Location/Qualifiers
misc_feature            1..36
                        note = synthetic construct
source                  1..36
                        mol_type = other DNA
                        organism = synthetic construct
SEQUENCE: 1
ataaaaaacg ctcggttgcc gccgggcgtt ttttat                            36

SEQ ID NO: 2            moltype = DNA  length = 21
FEATURE                 Location/Qualifiers
misc_feature            1..21
                        note = synthetic construct
source                  1..21
                        mol_type = other DNA
                        organism = synthetic construct
SEQUENCE: 2
ggatcctgac tgcctgagct t                                            21

SEQ ID NO: 3            moltype = AA  length = 1518
FEATURE                 Location/Qualifiers
source                  1..1518
                        mol_type = protein
                        organism = Streptococcus salivarius
SEQUENCE: 3
MENKIHYKLH KVKKQWVTIA VASVALATVL GGLSVTTSSV SADETQDKTV TQSNSGTTAS  60
LVTSPEATKE ADKRTNTKEA DVLTPAKETN AVETATTTNT QATAEAATTA TTADVAVAAV  120
PNKEAVVTTD APAVTTEKAE EQPATVKAEV VNTEVKAPEA ALKDSEVEAA LSLKNIKNID  180
GKYYYVNEDG SHKENFAITV NGQLLYFGKD GALTSSSTYS FTPGTTNIVD GFSINNRAYD  240
SSEASFELID GYLTADSWYR PASIIKDGVT WQASTAEDFR PLLMAWWPNV DTQVNYLNYM  300
SKVFNLDAKY SSTDKQETLK VAAKDIQIKI EQKIQAEKST QWLRETISAF VKTQPQWNKE  360
TENYSKGGGE DHLQGGALLY VNDSRTPWAN SDYRRLNRTA TNQTGTIDKS ILDEQSDPNH  420
MGGFDFLLAN DVDLSNPVVQ AEQLNQIHYL MNWGSIVMGD KDANFDGIRV DAVDNVDADM  480
LQLYTNYFRE YYGVNKSEAN ALAHISVLEA WSLNDNHYND KTDGAALAME NKQRLALLFS  540
LAKPIKERTP AVSPLYNNTF NTTQRDEKTD WINKDGSKAY NEDGTVKQST IGKYNEKYGD  600
ASGNYVFIRA HDNNVQDIIA EIIKKEINPK SDGFTITDAE MKQAFEIYNK DMLSSDKKYT  660
LNNIPAAYAV MLQNMETITR VYYGDLYTDD GHYMETKSPY YDTIVNLMKS RIKYVSGGQA  720
QRSYWLPTDG KMDNSDVELY RTNEVYTSVR YGKDIMTAND TEGSKYSRTS GQVTLVANNP  780
KLNLDQSAKL NVEMGKIHAN QKYRALIVGT ADGIKNFTSD ADAIAAGYVK ETDSNGVLTF  840
GANDIKGYET FDMSGFVAVW VPVGASDNQD IRVAPSTEAK KEGELTLKAT EAYDSQLIYE  900
GFSNFQTIPD GSDPSVYTNR KIAENVDLFK SWGVTSFEMA PQFVSADDGT FLDSVIQNGY  960
AFADRYDLAM SKNNKYGSKE DLRDALKALH KAGIQAIADW VPDQIYQLPG KEVVTATRTD  1020
GAGRKIADAI IDHSLYVANS KSSGKDYQAK YGGEFLAELK AKYPEMFKVN MISTGKPIDD  1080
SVKLKQWKAE YFNGTNVLER GVGYVLSDEA TGKYFTVTKE GNFIPLQLTG KEKVITGFSS  1140
DGKGITYFGT SGTQAKSAFV TFNGNTYYFD ARGHMVTNSE YSPNGKDVYR FLPNGIMLSN  1200
AFYIDANGNT YLYNSKGQMY KGGYTKFDVS ETDKDGKESK VVKFRYFTNE GVMAKGVTVI  1260
DGFTQYFGED GFQAKDKLVT FKGKTYYFDA HTGNGIKDTW RNINGKWYYF DANGVAATGA  1320
QVINGQKLYF NEDGSQVKGG VVKNADGTYS KYKEGFGELV TNEFFTTDGN VWYYAGANGK  1380
TVTGAQVING QHLYFNADGS QVKGGVVKNA DGTYSKYNAS TGERLTNEFF TTGDNNWYYI  1440
GANGKSVTGE VKIGDDTYFF AKDGKQVKGQ TVSAGNGRIS YYYGDSGKRA VSTWIEIQPG  1500
VYVYFDKNGL AYPPRVLN                                                1518

SEQ ID NO: 4            moltype = DNA  length = 4434
FEATURE                 Location/Qualifiers
source                  1..4434
                        mol_type = unassigned DNA
                        organism = Streptococcus salivarius
SEQUENCE: 4
atggacgaaa cgcaggataa gaccgtgacg cagagcaaca gcggcaccac cgcttccctg  60
gtcactagcc ctgaagccac gaaagaggcg gacaaacgca cgaacactaa agaggccgac  120
gttctgacgc ctgcaaaaga aacgaacgca gtcgagactg cgaccaccac taacacccag  180
gcgacggcgg aggccgccac gaccgcgacc accgcggacg tcgcggtggc tgcggtgccg  240
```

-continued

```
aacaaagaag cggtcgttac cacggatgct ccggcggtca cgaccgagaa agcggaagaa  300
cagccggcta ccgttaaagc agaagtcgtc aatacggaag tgaaagcgcc ggaagcggct  360
ctgaaagaca gcgaggttga ggcagcgctg agcctgaaga acatcaagaa cattgatggc  420
aagtattact atgttaatga ggatggcagc cacaaagaga atttcgctat taccgtgaat  480
ggccagctgc tgtactttgg taaagacggt gcgctgacgt cctctagcac gtattctttt  540
accccaggca ctaccaatat cgtggacggt tttagcatta acaaccgcgc ttacgacagc  600
agcgaggcga gctttgagct gatcgacggt tacttgaccg cagacagctg gtatcgtccg  660
gctagcatca tcaaagatgg tgttacgtgg caagcgtcca ccgccgagga ttttcgtccg  720
ctgctgatgg catggtggcc gaatgtggat acgcaggtga actatttgaa ttacatgtcc  780
aaagttttca acctggacgc gaaatactct agcaccgaca aacaggaaac cctgaaagtg  840
gcagcaaaag acattcaaat caagattgaa caaaagattc aagcggagaa gagcacgcag  900
tggctgcgtg aaactatcag cgcctttgtg aaaacccagc cgcagtggaa caaagaaacc  960
gagaattaca gcaagggtgg tggtgaggac cacctgcaag gtggcgcact gctgtatgtt  1020
aacgacagcc gtaccccttg ggcgaatagc gattaccgtc gtctgaatcg caccgcaacc  1080
aatcagacgg gcacgatcga taagtctatt ctggacgagc agtctgaccc aaaccacatg  1140
ggcggtttcg actttctgct ggcgaacgac gtcgacctga gcaatccggt cgtgcaggct  1200
gagcagctga atcaaatcca ctatctgatg aattggggtt ccattgtgat gggtgacaag  1260
gatgcgaact ttgacggcat tcgtgtcgat gcagttgaca acgtggacgc ggacatgttg  1320
caactgtata ccaattactt ccgtgagtac tacggtgtga acaagagcga agctaacgca  1380
ctggctcaca tcagcgttct ggaggcgtgg agcctgaatg ataatcatta caatgacaag  1440
accgatggtg cggcactggc aatggagaat aagcaacgtc tggcgctgtt gttttcgttg  1500
gcgaaaccga tcaaagagcg taccccggca gtgagcccgc tgtataacaa caccttcaat  1560
accacccagc gtgatgaaaa gaccgattgg attaacaaag acggtagcaa ggcttacaac  1620
gaagatggca cggtcaaaca atcgaccatc ggtaagtaca acgagaaata cggtgacgca  1680
tccggtaact acgttttcat ccgtgcccac gataacaacg tccaggacat catcgccgag  1740
atcatcaaga aagagatcaa cccgaaaagc gacggcttca ccatcaccga cgccgaaatg  1800
aagcaagcct ttgaaatcta taacaaagat atgctgtcga gcgacaaaaa gtataccctg  1860
aataacattc cggcagcgta tgccgtgatg ttgcagaata tggaaacgat tacccgcgtc  1920
tattacggtg atctgtatac ggacgacggt cactacatgg aaaccaaatc tccgtattac  1980
gataccatcg tgaatttgat gaagagccgt atcaagtatg tttcgggtgg ccaggcgcaa  2040
cgtagctatt ggctgccgac cgacggtaag atggacaata gcgacgttga gctgtaccgc  2100
acgaatgagg tttacacgag cgtgcgctat ggtaaggata tcatgaccgc taatgatacc  2160
gaaggctcta agtattcccg caccagcggc caagtcacct tggtcgcgaa caatccgaag  2220
ctgaatctgg accaaagcgc caagttgaat gtggagatgg gcaaaatcca tgcgaatcag  2280
aagtatcgcg cactgattgt cggcactgcg gacggcatta agaactttac ttccgacgcg  2340
gacgccattg cagcgggtta tgtgaaagaa accgatagca acggcgtgct gaccttcggt  2400
gctaacgaca ttaagggcta cgaaacgttt gatatgagcg gtttcgtggc ggtgtgggtt  2460
ccggtgggtg catctgacaa tcaggacatt cgtgttgcgc cgagcaccga ggcaaagaaa  2520
gaaggtgagc tgaccttgaa ggcgacggaa gcgtatgata gccagctgat ttacgaaggc  2580
tttagcaatt tccagacgat cccagatggc agcgatccgt ccgtgtatac gaaccgcaag  2640
attgcggaga acgtggatct gttcaaaagc tggggtgtca ccagctttga gatggcaccg  2700
caatttgtct cggcggatga tggcaccttt ctggatagcg ttattcagaa tggctacgcc  2760
ttcgccgacc gttatgacct ggccatgtcc aagaacaaca agtatggtag caaagaggac  2820
ctgcgtgatg cactgaaagc actgcataag gcgggtattc aagctatcgc agactgggtt  2880
ccagaccaga tctaccagct gccgggcaaa gaagttgtca ccgccacccg tacggatggt  2940
gctggccgta agatcgcaga cgcgattatc gaccattctc tgtatgttgc aaacagcaaa  3000
agcagcggca aagattatca agcaaagtac ggtggcgagt tcctggccga gctgaaagcc  3060
aaatacccgg aaatgttcaa agttaacatg attagcacgg gtaagccgat tgatgactcc  3120
gtgaaattga agcaatggaa agccgagtac ttcaatggca ccaacgtttt ggaacgtggt  3180
gtcggctatg ttctgagcga cgaggcgacc ggtaagtatt tcacggtgac caaagaaggc  3240
aatttcattc cgctgcaact gacgggtaaa gagaaagtta tcacgggttt ctccagcgat  3300
ggtaagggta tcacctattt cggtacgagc ggtacgcagg cgaagtctgc gtttgttacc  3360
ttcaatggta acacctacta tttcgacgcg cgtggccaca tggttaccaa tagcgaatac  3420
agcccgaatg gcaaggacgt ctaccgtttt ctgccgaacg gtatcatgct gagcaatgcg  3480
ttttacattg atgcgaacgg taatacctac ctgtacaact ctaagggtca aatgtacaaa  3540
ggcggttaca cgaaattcga tgtttctgaa acggataagg acggtaaaga gtccaaggtc  3600
gtcaagttcc gctactttac gaacgaaggc gtcatggcca agggtgttac cgtcattgat  3660
ggttttaccc aatacttcgg tgaggacggc tttcaagcga aggataagct ggtcaccttc  3720
aagggcaaga cgtattactt cgacgcacac actggtaatg gtatcaaaga tacctggcgc  3780
aatatcaatg gtaaatggta ctatttcgac gcgaatggcg ttgctgcgac cggtgcgcag  3840
gtgattaacg gccagaaact gtacttcaac gaggatggct cccaagtcaa aggcggcgtg  3900
gttaagaacg cagacggcac ctatagcaaa tacaaagaag gttttggtga gctggttact  3960
aacgagtttt tcacgactga tggcaatgtt tggtactacg ccggtgcaaa tggtaaaacc  4020
gttaccggtg cacaagtgat caacggccaa catttgtact tcaatgcgga cggttcccag  4080
gtgaagggtg gcgttgtcaa gaacgcggat ggcacctaca gcaagtacaa tgctagcact  4140
ggtgaacgtc tgacgaacga gttctttacg accggtgata acaattggta ttacattggc  4200
gcaaacggta agagcgtgac gggtgaggtc aagattggtg atgatactta ctttttcgcg  4260
aaggatggca aacaagttaa aggtcaaacc gtcagcgccg gtaatggtcg cattagctac  4320
tactacggtg acagcggcaa gcgtgcggtt agcacctgga ttgagattca gccgggtgtt  4380
tatgtgtatt tcgacaaaaa cggtttggcg taccctccgc gtgttctgaa ttaa        4434
```

```
SEQ ID NO: 5            moltype = AA  length = 1477
FEATURE                 Location/Qualifiers
source                  1..1477
                        mol_type = protein
                        organism = Streptococcus salivarius
SEQUENCE: 5
MDETQDKTVT QSNSGTTASL VTSPEATKEA DKRTNTKEAD VLTPAKETNA VETATTTNTQ  60
ATAEAATTAT TADVAVAAVP NKEAVVTTDA PAVTTEKAEE QPATVKAEVV NTEVKAPEAA  120
```

-continued

```
LKDSEVEAAL SLKNIKNIDG KYYYVNEDGS HKENFAITVN GQLLYFGKDG ALTSSSTYSF  180
TPGTTNIVDG FSINNRAYDS SEASFELIDG YLTADSWYRP ASIIKDGVTW QASTAEDFRP  240
LLMAWWPNVD TQVNYLNYMS KVFNLDAKYS STDKQETLKV AAKDIQIKIE QKIQAEKSTQ  300
WLRETISAFV KTQPQWNKET ENYSKGGGED HLQGGALLYV NDSRTPWANS DYRRLNRTAT  360
NQTGTIDKSI LDEQSDPNHM GGFDFLLAND VDLSNPVVQA EQLNQIHYLM NWGSIVMGDK  420
DANFDGIRVD AVDNVDADML QLYTNYFREY YGVNKSEANA LAHISVLEAW SLNDNHYNDK  480
TDGAALAMEN KQRLALLFSL AKPIKERTPA VSPLYNNTFN TTQRDEKTDW INKDGSKAYN  540
EDGTVKQSTI GKYNEKYGDA SGNYVFIRAH DNNVQDIIAE IIKKEINPKS DGFTITDAEM  600
KQAFEIYNKD MLSSDKKYTL NNIPAAYAVM LQNMETITRV YYGDLYTDDG HYMETKSPYY  660
DTIVNLMKSR IKYVSGGQAQ RSYWLPTDGK MDNSDVELYR TNEVYTSVRY GKDIMTANDT  720
EGSKYSRTSG QVTLVANNPK LNLDQSAKLN VEMGKIHANQ KYRALIVGTA DGIKNFTSDA  780
DAIAAGYVKE TDSNGVLTFG ANDIKGYETF DMSGFVAVWV PVGASDNQDI RVAPSTEAKK  840
EGELTLKATE AYDSQLIYEG FSNFQTIPDG SDPSVYTNRK IAENVDLFKS WGVTSFEMAP  900
QFVSADDGTF LDSVIQNGYA FADRYDLAMS KNNKYGSKED LRDALKALHK AGIQAIADWV  960
PDQIYQLPGK EVVTATRTDG AGRKIADAII DHSLYVANSK SSGKDYQAKY GGEFLAELKA  1020
KYPEMFKVNM ISTGKPIDDS VKLKQWKAEY FNGTNVLERG VGYVLSDEAT GKYFTVTKEG  1080
NFIPLQLTGK EKVITGFSSD GKGITYFGTS GTQAKSAFVT FNGNTYYFDA RGHMVTNSEY  1140
SPNGKDVYRF LPNGIMLSNA FYIDANGNTY LYNSKGQMYK GGYTKFDVSE TDKDGKESKV  1200
VKFRYFTNEG VMAKGVTVID GFTQYFGEDG FQAKDKLVTF KGKTYYFDAH TGNGIKDTWR  1260
NINGKWYYFD ANGVAATGAQ VINGQKLYFN EDGSQVKGGV VKNADGTYSK YKEGFGELVT  1320
NEFFTTDGNV WYYAGANGKT VTGAQVINGQ HLYFNADGSQ VKGGVVKNAD GTYSKYNAST  1380
GERLTNEFFT TGDNNWYYIG ANGKSVTGEV KIGDDTYFFA KDGKQVKGQT VSAGNGRISY  1440
YYGDSGKRAV STWIEIQPGV YVYFDKNGLA YPPRVLN                          1477

SEQ ID NO: 6           moltype = AA  length = 1449
FEATURE                Location/Qualifiers
source                 1..1449
                       mol_type = protein
                       organism = Streptococcus salivarius
SEQUENCE: 6
MDKKVHYKMH KVKKQWVTIA VTGLSLGAVS AVSLGTNDGV VQADEHTDAT VAIPDITVDT  60
GTVSNDTTAA QDPTTAVAAT NDVATDQATP TATFDLTTDT TNTVAANAVD TVATVGTDRA  120
ATTNDTTATN DTAVDTTNNN TTTDTTTVTD RAATTERRAT GARRGPTGGR RATPVNGNTN  180
NANNTVTVVN NDLPATNNVV TDGPSHIKTI NGKQYYVEDD GTIRKNYVLE RIGGSQYFNA  240
ETGELSNQKE YRFDKNGGTG SSADSTNTNV TVNGDKNAFY GTTDKDIELV DGYFTANTWY  300
RPKEILKDGK EWTASTENDK RPLLTVWWPS KAIQASYLNY MKEQGLGTNQ TYTSFSSQTQ  360
MDQAALEVQK RIEERIAREG NTDWLRTTIK NFVKTQPGWN STSENLDNND HLQGGALLYN  420
NDSRTSHANS DYRLLNRTPT SQTGKHNPKY TKDTSNGGFE FLLANDIDNS NPAVQAEQLN  480
WLHYIMNIGT ITGGSEDENF DGVRVDAVDN VNADLLQIAS DYFKAKYGAD QSQDQAIKHL  540
SILEAWSHND AYYNEDTKGA QLPMDDPMHL ALVYSLLRPI GNRSGVEPLI SNSLNDRSES  600
GKNSKRMANY AFVRAHDSEV QSIIGQIIKN EINPQSTGNT FTLDEMKKAF EIYNKDMRSA  660
NKQYTQYNIP SAYALMLTHK DTVPRVYYGD MYTDDGQYMA QKSPYYDAIE TLLKGRIRYA  720
AGGQDMKVNY IGYGNTNGWD AAGVLTSVRY GTGANSASDT GTAETRNQGM AVIVSNQPAL  780
RLTSNLTINM GAAHRNQAYR PLLLTTNDGV ATYLNDSDAN GIVKYTDGNG NLTFSANEIR  840
GIRNPQVDGY LAVWVPVGAS ENQDVRVAPS KEKNSSGLVY ESNAALDSQV IYEGFSNFQD  900
FVQNPSQYTN KKIAENANLF KSWGITSFEF APQYVSSDDG SFLDSVIQNG YAFTDRYDIG  960
MSKDNKYGSL ADLKAALKSL HAVGISAIAD WVPDQIYNLP GDEVVTATRV NNYGETKDGA  1020
IIDHSLYAAK TRTFGNDYQG KYGGAFLDEL KRLYPQIFDR VQISTGKRMT TDEKITQWSA  1080
KYMNGTNILD RGSEYVLKNG LNGYYGTNGG KVSLPKVVGS NQSTNGDNQN GDGSGKFEKR  1140
LFSVRYRYNN GQYAKNAFIK DNDGNVYYFD NSGRMAVGEK TIDGKQYFFL ANGVQLRDGY  1200
RQNRRGQVFY YDQNGVLNAN GKQDPKPDNN NNASGRNQFV QIGNNVWAYY DGNGKRVTGH  1260
QNINGQELFF DNNGVQVKGR TVNENGAIRY YDANSGEMAR NRFAEIEPGV WAYFNNDGTA  1320
VKGSQNINGQ DLYFDQNGRQ VKGALANVDG NLRYYDVNSG ELYRNRFHEI DGSWYYFDGN  1380
GNAVKGMVNI NGQNLLFDNN GKQIKGHLVR VNGVVRYFDP NSGEMAVNRW VEVSPGWWVY  1440
FDGEGRGQI                                                         1449

SEQ ID NO: 7           moltype = DNA  length = 3744
FEATURE                Location/Qualifiers
source                 1..3744
                       mol_type = unassigned DNA
                       organism = Streptococcus salivarius
SEQUENCE: 7
atgccaagcc acattaagac catcaacggc aaacaatact acgtggagga tgacggtacg  60
attcgcaaga attacgtcct ggagcgtatc ggtggcagcc aatactttaa tgcagaaacc  120
ggtgaactgt ctaatcagaa agagtatcgt ttcgacaaaa atggtggtac tggtagcagc  180
gcggacagca cgaacaccaa cgtgactgtg aacggtgaca aaaacgcatt ttacggtacc  240
acggacaaag acattgagct ggtcgacggc tatttcaccg cgaacacctg gtatcgcccg  300
aaagaaatcc tgaaagacgg caaagaatgg accgccagca cggagaacga taaacgcccg  360
ctgctgaccg tctggtggcc tagcaaagca atccaggcgt cttatctgaa ctacatgaaa  420
gagcaaggcc tgggtaccaa ccaaacgtac acgagcttct ccagccaaac ccaaatggat  480
caagcagccc tggaagtgca aaagcgtatt gaagagcgca tcgcacgcga gggcaatacc  540
gactggctgc gcacgaccat caagaacttc gtgaaaaccc aaccgggttg gaacagcacc  600
tctgaaaatc tggacaataa tgatcatctg caaggtggcg ccctgctgta caataacgac  660
tcccgcacga gccacgcgaa cagcgactat cgcctgctga atcgtacgcc gaccagccag  720
accggcaaac acaatccgaa atacaccaaa gataccagca atggtggttt cgaatttctg  780
ctggcgaacg acatcgataa ctctaatccg gcggttcaag cagagcaact gaactggctg  840
cattacatta tgaacatcgg taccatcacg ggcggttctg aggatgaaaa cttcgacggc  900
gttcgtgttg acgctgtgga taatgtgaat gcggatctgc tgcaaatcgc gagcgactat  960
ttcaaagcaa aatacggtgc tgatcaaagc caagatcagg cgatcaaaca cttgagcatc  1020
```

-continued

```
ctggaagcgt ggtcccataa cgacgcctac tataacgaag ataccaaagg cgcgcagttg  1080
ccgatggatg atccgatgca cctggctctg gtctactcgc tgctgcgtcc gatcggcaat  1140
cgcagcggtg tggaaccgct gatttccaac agcctgaatg accgtagcga gtccggtaag  1200
aacagcaaac gtatggcgaa ctacgcgttc gtacgcgcgc atgatagcga ggtgcaatcg  1260
attattggcc agatcatcaa aaacgagatc aatccgcaaa gcaccggtaa tacgttcacc  1320
ctggatgaga tgaagaaagc gtttgagatt tacaacaagg atatgcgtag cgcgaataag  1380
cagtatacgc agtacaacat cccgagcgcg tatgcgttga tgctgaccca caaggatacc  1440
gttccgcgtg tgtattacgg tgatatgtat acggacgacg gtcagtacat ggcgcaaaag  1500
agcccatact atgatgcgat cgaaacgctg ctgaaaggtc gcatccgcta tgccgcaggt  1560
ggtcaggaca tgaaggtcaa ctatattggt tacggtaaca ctaacggctg ggatgctgcg  1620
ggcgtgctga ccagcgtacg ttatggcacg ggcgcaaata gcgccagcga tacgggtacc  1680
gccgaaacgc gtaatcaagg tatggcagtg attgttagca accaaccggc gctgcgtctg  1740
actagcaatt tgaccattaa catgggtgcc gcacaccgta atcaggctta ccgtccgctg  1800
ctgctgacga ccaacgatgg cgtcgcgacc tatttgaacg atagcgatgc gaatggtatc  1860
gttaagtaca ccgacggtaa tggtaatctg accttctccg caaacgagat tcgtggcatc  1920
cgtaacccgc aagttgatgg ctatctggcc gtctgggttc cggtaggtgc gtcggagaat  1980
caggatgttc gtgtggcgcc gagcaaagag aagaacagct ccggtctggt ttacgagagc  2040
aatgctgccc tggatagcca agttatctac gaaggcttca gcaacttcca ggacttcgtt  2100
cagaatccga gccagtatac caacaaaaag attgcagaga atgcaaattt gttcaaatcc  2160
tggggtatta ccagctttga atttgcgccg cagtacgtga gctcggatga tggtagcttc  2220
ctggacagcg ttattcagaa cggttatgcg tttacggacc gctacgacat tggtatgagc  2280
aaagacaaca aatatggttc gctggcggat ttgaaggcag cactgaagag cttgcatgcc  2340
gttggtatta gcgcaatcgc ggattgggtt cctgatcaga tctacaatct gccaggcgac  2400
gaggtcgtca ccgcaacccg cgttaacaac tacggcgaaa ccaaagatgg tgcaatcatt  2460
gatcactctt tgtacgcggc caaaacccgt actttttggta acgactacca gggtaagtat  2520
ggtggtgcgt tcctggacga gctgaaacgt ctgtatccgc agatctttga ccgcgttcag  2580
atttctaccg gtaagcgcat gaccacggac gagaagatca cccaatggtc tgcaaagtat  2640
atgaacggta cgaacatctt ggaccgtggc tctgaatacg ttttgaagaa tggtctgaat  2700
ggttactatg gcaccaatgg tggcaaagtt tcgctgccga aagttgtggg tagcaatcaa  2760
agcacgaatg gcgacaatca aaacggcgac ggtagcggca agtttgaaaa gcgtctgttc  2820
agcgtgcgtt accgttataa caatggccag tacgcgaaaa atgcctttat caaagataac  2880
gacggcaatg tttactattt cgacaatagc ggtcgtatgg ctgtcggtga gaaaacgatt  2940
gacggcaagc agtacttctt cctggctaat ggcgttcagc tgcgtgacgg ctaccgtcaa  3000
aatcgtcgcg gtcaggtgtt ttactacgac cagaatggtg tgctgaacgc aaacggtaaa  3060
caagacccga agcctgacaa caataacaat gcgagcggcc gtaatcaatt cgtccagatc  3120
ggtaacaacg tgtgggcgta ttatgatggc aatggtaaac gtgtcaccgg tcaccagaac  3180
atcaacggtc aggagttgtt tttcgataac aacggtgtcc aggttaaggg tcgtacggtg  3240
aatgagaacg gtgcaattcg ctactatgac gcgaatagcg gtgagatggc acgcaatcgt  3300
ttcgcggaga ttgaaccggg cgtctgggca tactttaaca atgacggcac cgcagtgaag  3360
ggttctcaga atatcaatgg tcaagacctg tacttcgacc agaacggtcg tcaggtcaag  3420
ggtgcgctgg ccaatgttga tggcaacctg cgctattacg acgttaacag cggtgagctg  3480
taccgtaatc gtttccacga aatcgacggc agctggtatt actttgatgg taacggtaat  3540
gcggtgaagg gtatggtcaa tatcaacggc caaaatctgt tgtttgacaa taacggcaaa  3600
cagattaagg gtcatctggt ccgcgtcaac ggcgtcgtgc gctattttga tccgaactct  3660
ggtgaaatgg cggttaatcg ttgggttgag gtgagcccag gttggtgggt ttactttgac  3720
ggtgaaggtc gtggtcagat ctaa                                          3744

SEQ ID NO: 8            moltype = AA  length = 1247
FEATURE                 Location/Qualifiers
source                  1..1247
                        mol_type = protein
                        organism = Streptococcus salivarius
SEQUENCE: 8
MPSHIKTING KQYYVEDDGT IRKNYVLERI GGSQYFNAET GELSNQKEYR FDKNGGTGSS  60
ADSTNTNVTV NGDKNAFYGT TDKDIELVDG YFTANTWYRP KEILKDGKEW TASTENDKRP  120
LLTVWWPSKA IQASYLNYMK EQGLGTNQTY TSFSSQTQMD QAALEVQKRI EERIAREGNT  180
DWLRTTIKNF VKTQPGWNST SENLDNNDHL QGGALLYNND SRTSHANSDY RLLNRTPTSQ  240
TGKHNPKYTK DTSNGGFEFL LANDIDNSNP AVQAEQLNWL HYIMNIGTIT GGSEDENFDG  300
VRVDAVDNVN ADLLQIASDY FKAKYGADQS QDQAIKHLSI LEAWSHNDAY YNEDTKGAQL  360
PMDDPMHLAL VYSLLRPIGN RSGVEPLISN SLNDRSESGK NSKRMANYAF VRAHDSEVQS  420
IIGQIIKNEI NPQSTGNTFT LDEMKKAFEI YNKDMRSANK QYTQYNIPSA YALMLTHKDT  480
VPRVYYGDMY TDDGQYMAQK SPYYDAIETL LKGRIRYAAG GQDMKVNYIG YGNTNGWDAA  540
GVLTSVRYGT GANSASDTGT AETRNQGMAV IVSNQPALRL TSNLTINMGA AHRNQAYRPL  600
LLTTNDGVAT YLNDSDANGI VKYTDGNGNL TFSANEIRGI RNPQVDGYLA VWVPVGASEN  660
QDVRVAPSKE KNSSGLVYES NAALDSQVIY EGFSNFQDFV QNPSQYTNKK IAENANLFKS  720
WGITSFEFAP QYVSSDDGSF LDSVIQNGYA FTDRYDIGMS KDNKYGSLAD LKAALKSLHA  780
VGISAIADWV PDQIYNLPGD EVVTATRVNN YGETKDGAII DHSLYAAKTR TFGNDYQGKY  840
GGAFLDELKR LYPQIFDRVQ ISTGKRMTTD EKITQWSAKY MNGTNILDRG SEYVLKNGLN  900
GYYGTNGGKV SLPKVVGSNQ STNGDNQNGD GSGKFEKRLF SVRYRYNNGQ YAKNAFIKDN  960
DGNVYYFDNS GRMAVGEKTI DGKQYFFLAN GVQLRDGYRQ NRRGQVFYYD QNGVLNANGK  1020
QDPKPDNNNN ASGRNQFVQI GNNVWAYYDG NGKRVTGHQN INGQELFFDN NGVQVKGRTV  1080
NENGAIRYYD ANSGEMARNR FAEIEPGVWA YFNNDGTAVK GSQNINGQDL YFDQNGRQVK  1140
GALANVDGNL RYYDVNSGEL YRNRFHEIDG SWYYFDGNGN AVKGMVNING QNLLFDNNGK  1200
QIKGHLVRVN GVVRYFDPNS GEMAVNRWVE VSPGWWVYFD GEGRGQI                1247

SEQ ID NO: 9            moltype = AA  length = 1476
FEATURE                 Location/Qualifiers
source                  1..1476
                        mol_type = protein
```

```
                         organism = Streptococcus mutans
SEQUENCE: 9
MDKKVRYKLR KVKKRWVTVS VASAVMTLTT LSGGLVKADS NESKSQISND SNTSVVTANE  60
ESNVTTEATS KQEAASSQTN HTVTTSSSST SVVNPKEVVS NPYTVGETAS NGEKLQNQTT  120
TVDKTSEAAA NNISKQTTEA DTDVIDDSNA ANIQILEKLP NVKEIDGKYY YYDNNGKVRT  180
NFTLIADGKI LHFDETGAYT DTSIDTVNKD IVTTRSNLYK KYNQVYDRSA QSFEHVDHYL  240
TAESWYRPKY ILKDGKTWTQ STEKDFRPLL MTWWPSQETQ RQYVNFMNAQ LGINKTYDDT  300
SNQLQLNIAA ATIQAKIEAK ITTLKNTDWL RQTISAFVKT QSAWNSDSEK PFDDHLQNGA  360
VLYDNEGKLT PYANSNYRIL NRTPTNQTGK KDPRYTADNT IGGYEFLLAN DVDNSNPVVQ  420
AEQLNWLHFL MNFGNIYAND PDANFDSIRV DAVDNVDADL LQIAGDYLKA AKGIHKNDKA  480
ANDHLSILEA WSDNDTPYLH DDGDNMINMD NKLRLSLLFS LAKPLNQRSG MNPLITNSLV  540
NRTDDNAETA AVPSYSFIRA HDSEVQDLIR DIIKAEINPN VVGYSFTMEE IKKAFEIYNK  600
DLLATEKKYT HYNTALSYAL LLTNKSSVPR VYYGDMFTDD GQYMAHKTIN YEAIETLLKA  660
RIKYVSGGQA MRNQQVGNSE IITSVRYGKG ALKAMDTGDR TTRTSGVAVI EGNNPSLRLK  720
ASDRVVVNMG AAHKNQAYRP LLLTTDNGIK AYHSDQEAAG LVRYTNDRGE LIFTAADIKG  780
YANPQVSGYL GVWVPVGAAA DQDVRVAAST APSTDGKSVH QNAALDSRVM FEGFSNFQAF  840
ATKKEEYTNV VIAKNVDKFA EWGVTDFEMA PQYVSSTDGS FLDSVIQNGY AFTDRYDLGI  900
SKPNKYGTAD DLVKAIKALH SKGIKVMADW VPDQMYALPE KEVVTATRVD KYGTPVAGSQ  960
IKNTLYVVDG KSSGKDQQAK YGGAFLEELQ AKYPELFARK QISTGVPMDP SVKIKQWSAK  1020
YFNGTNILGR GAGYVLKDQA TNTYFNISDN KEINFLPKTL LNQDSQVGFS YDGKGYVYYS  1080
TSGYQAKNTF ISEGDKWYYF DNNGYMVTGA QSINGVNYYF LPNGLQLRDA ILKNEDGTYA  1140
YYGNDGRRYE NGYYQFMSGV WRHFNNGEMS VGLTVIDGQV QYFDEMGYQA KGKFVTTADG  1200
KIRYFDKQSG NMYRNRFIEN EEGKWLYLGE DGAAVTGSQT INGQHLYFRA NGVQVKGEFV  1260
TDRHGRISYY DGNSGDQIRN RFVRNAQGQW FYFDNNGYAV TGARTINGQH LYFRANGVQV  1320
KGEFVTDRHG RISYYDGNSG DQIRNRFVRN AQGQWFYFDN NGYAVTGART INGQHLYFRA  1380
NGVQVKGEFV TDRYGRISYY DGNSGDQIRN RFVRNAQGQW FYFDNNGYAV TGARTINGQH  1440
LYFRANGVQV KGEFVTDRYG RISYYDANSG ERVRIN                          1476

SEQ ID NO: 10            moltype = DNA  length = 3942
FEATURE                  Location/Qualifiers
source                   1..3942
                         mol_type = unassigned DNA
                         organism = Streptococcus mutans
SEQUENCE: 10
atgattgacg gcaaatacta ctactatgac aacaacggca aagtacgcac caatttcacg  60
ttgatcgcgg acggtaaaat cctgcatttt gatgaaactg gcgcgtacac cgacactagc  120
attgataccg tgaacaagga tattgtcacg acgcgtagca acctgtataa gaaatacaat  180
caagtgtatg atcgcagcgc gcagagcttc gagcatgttg atcactacct gacggcggaa  240
tcttggtacc gtccgaaata cattctgaaa gatggcaaga cctggaccca gagcaccgag  300
aaggacttcc gtcctctgct gatgacctgg tggccgagcc aggaaacgca gcgccagtat  360
gtcaacttca tgaacgccca gttgggtatc aacaaaacgt acgacgacac cagcaatcag  420
ctgcaattga acatcgctgc tgcaacgatc caagcaaaga tcgaagccaa aatcacgacg  480
ctgaagaaca ccgattggct gcgtcaaacg atcagcgcgt tcgtcaaaac ccaaagcgct  540
tggaatagcg acagcgaaaa gccgtttgat gaccatctgc aaaacggtgc ggttctgtat  600
gataacgaag gtaaattgac gccgtatgcc aatagcaact atcgtattct gaaccgcacg  660
ccgaccaacc agaccggtaa gaaggacccg cgttataccg ccgacaacac gatcggcggc  720
tacgagtttc tgctggccaa cgacgtggat aatagcaacc cggtggttca ggccgagcag  780
ctgaactggc tgcacttcct gatgaacttt ggtaatatct acgcaaacga ccctgacgct  840
aacttcgact ccatccgcgt tgacgctgtc gataatgtgg acgccgatct gttacagatc  900
gcgggtgact atctgaaagc ggcaaagggc atccataaga atgacaaagc ggcgaacgac  960
cacctgtcca ttctggaagc gtggagcgac aatgacactc cgtatctgca tgatgatggc  1020
gacaacatga ttaacatgga taacaaactg cgcctgagcc tgctgttctc cctggcgaaa  1080
ccgctgaatc agcgtagcgg tatgaacccg ttgattacga acagcctggt caaccgtact  1140
gatgataatg ccgaaacggc ggcagtgcca agctactctt ttatccgtgc ccacgatagc  1200
gaggtccagg atttgattcg tgatatcatt aaggctgaga ttaacccgaa cgtcgtcggt  1260
tacagcttca cgatggaaga gattaagaag gcatttgaga tctacaataa ggacctgttg  1320
gccacggaga agaagtatac ccactataac accgcattga gctacgcgtt gctgctgacg  1380
aacaagagca gcgtgccgcg tgtctactat ggtgatatgt ttacggacga tggtcaatac  1440
atggcccaca agaccattaa ctacgaggca atcgaaaccc tgctgaaagc acgtatcaag  1500
tacgtgtccg gtggtcaggc tatgcgcaac cagcaagtgg gtaattcgga gatcatcacc  1560
agcgtgcgtt acggtaaagg tgcgctgaag gcgatggata cgggtgaccg cactacccgt  1620
acctctggtg tggcggtcat tgagggcaac aacccgagct tgcgcctgaa ggcttctgat  1680
cgtgtggttg tgaatatggg tgcggcccac aaaaatcaag cctatcgccc gctgctgttg  1740
acgaccgata acggcattaa ggcctatcac agcgaccaag aagcggcagg cctggtgcgt  1800
tacaccaacg accgtggcga actgatcttt accgcagccg acattaaggg ctacgcaaat  1860
ccgcaagtta gcggctacct gggcgtctgg gtccctgttg gcgcagcagc tgatcaggac  1920
gttcgtgttg cggcgagcac cgcgccaagc acggacggca agagcgttca ccagaacgcg  1980
gctctggaca gccgtgtgat gttcgagggt ttctcgaact tccaggcatt tgctaccaag  2040
aaagaagagt ataccaatgt ggtcatcgct aagaatgtgg ataagttcgc ggagtggggt  2100
gtcaccgatt tcgagatggc tccgcaatac gtttctagca ccgacggtag ctttttggat  2160
agcgtgattc aaaacggtta tgcttttacc gaccgttacg acctgggcat cagcaagccg  2220
aacaaatatg gcaccgcgga cgatctggtt aaagcgatta aggcattgca cagcaaaggc  2280
atcaaagtta tggcggattg ggttccggac cagatgtatg ccctgccgga aaaagaggtt  2340
gtgacggcaa cccgtgttga caaatacggt acgccggtag ctggcagcca gatcaaaaac  2400
acgctgtacg tggtcgatgg taaatctagc ggtaaggacc agcaggcgaa gtacggtggt  2460
gccttcctgg aagagctgca agcgaagtat ccggaactgt tcgcgcgcaa acagattagc  2520
accggtgttc cgatggaccc gagcgtcaag attaagcaat ggagcgcaaa atacttcaac  2580
ggcacgaata tcctgggtcg tggtgctggt tacgtgctga aagatcaggc aaccaacacc  2640
tactttaaca tcagcgacaa taaagagatc aatttcctgc caaagacgtt gctgaaccag  2700
```

-continued

```
gattctcaag ttggctttag ctacgacggt aagggctatg tgtactacag cacctcgggc  2760
taccaggcta aaaacacgtt catcagcgag ggtgacaagt ggtattactt cgacaataac  2820
ggttatatgg ttaccggcgc acagagcatt aatggtgtga actattactt cctgccgaat  2880
ggtttacagc tgcgtgatgc gattctgaaa aatgaggacg gtacgtacgc gtattatggc  2940
aatgatggtc gccgctacga gaatggctat tatcagttta tgagcggtgt ttggcgccat  3000
ttcaataatg gcgagatgtc cgttggtctg accgtcattg acggtcaagt tcaatacttt  3060
gacgagatgg gttaccaggc gaaaggcaaa ttcgttacca ccgcggatgg taagatccgt  3120
tacttcgata agcagagcgg caatatgtat cgtaatcgtt tcattgagaa cgaagagggc  3180
aaatggctgt acctgggtga ggacggcgcg gcagtcaccg gtagccagac gatcaatggt  3240
cagcacctgt attttcgtgc taacggcgtt caggttaagg gtgagttcgt gaccgatcgt  3300
catggccgca tctcttatta cgacggcaac agcggtgatc agatccgcaa ccgtttcgtc  3360
cgcaatgcgc aaggccagtg gttttacttt gacaacaatg gctatgcagt aactggtgct  3420
cgtacgatca acggccagca cctgtatttc cgcgcgaacg gtgttcaggt aaaaggtgag  3480
tttgttacgg accgccacgg ccgcattagc tattatgatg gtaatagcgg tgaccaaatt  3540
cgcaatcgtt tcgtgcgtaa tgcacagggt cagtggttct acttcgacaa taatggttat  3600
gcagtcacgg gtgcacgtac cattaacggc caacacctgt actttcgcgc caatggtgtg  3660
caagtgaaag gcgaatttgt tactgatcgt tatggtcgta tcagctacta tgatggcaat  3720
tctggcgacc aaattcgcaa tcgctttgtt cgtaacgccc aaggtcaatg gttctatttc  3780
gacaacaacg gttacgcggt gaccggtgcc cgcacgatta atggtcaaca cttgtacttc  3840
cgtgccaacg gtgtccaggt gaagggtgaa tttgtgaccg accgctatgg tcgcatttct  3900
tactacgacg caaattccgg tgaacgcgtc cgtatcaatt aa                    3942

SEQ ID NO: 11          moltype = AA  length = 1313
FEATURE                Location/Qualifiers
source                 1..1313
                       mol_type = protein
                       organism = Streptococcus mutans
SEQUENCE: 11
MIDGKYYYYD NNGKVRTNFT LIADGKILHF DETGAYTDTS IDTVNKDIVT TRSNLYKKYN  60
QVYDRSAQSF EHVDHYLTAE SWYRPKYILK DGKTWTQSTE KDFRPLLMTW WPSQETQRQY  120
VNFMNAQLGI NKTYDDTSNQ LQLNIAAATI QAKIEAKITT LKNTDWLRQT ISAFVKTQSA  180
WNSDSEKPFD DHLQNGAVLY DNEGKLTPYA NSNYRILNRT PTNQTGKKDP RYTADNTIGG  240
YEFLLANDVD NSNPVVQAEQ LNWLHFLMNF GNIYANDPDA NFDSIRVDAV DNVDADLLQI  300
AGDYLKAAKG IHKNDKAAND HLSILEAWSD NDTPYLHDDG DNMINMDNKL RLSLLFSLAK  360
PLNQRSGMNP LITNSLVNRT DDNAETAAVP SYSFIRAHDS EVQDLIRDII KAEINPNVVG  420
YSFTMEEIKK AFEIYNKDLL ATEKKYTHYN TALSYALLLT NKSSVPRVYY GDMFTDDGQY  480
MAHKTINYEA IETLLKARIK YVSGGQAMRN QQVGNSEIIT SVRYGKGALK AMDTGDRTTR  540
TSGVAVIEGN NPSLRLKASD RVVVNMGAAH KNQAYRPLLL TTDNGIKAYH SDQEAAGLVR  600
YTNDRGELIF TAADIKGYAN PQVSGYLGVW VPVGAAADQD VRVAASTAPS TDGKSVHQNA  660
ALDSRVMFEG FSNFQAFATK KEEYTNVVIA KNVDKFAEWG VTDFEMAPQY VSSTDGSFLD  720
SVIQNGYAFT DRYDLGISKP NKYGTADDLV KAIKALHSKG IKVMADWVPD QMYALPEKEV  780
VTATRVDKYG TPVAGSQIKN TLYVVDGKSS GKDQQAKYGG AFLEELQAKY PELFARKQIS  840
TGVPMDPSVK IKQWSAKYFN GTNILGRGAG YVLKDQATNT YFNISDNKEI NFLPKTLLNQ  900
DSQVGFSYDG KGYVYYSTSG YQAKNTFISE GDKWYYFDNN GYMVTGAQSI NGVNYYFLPN  960
GLQLRDAILK NEDGTYAYYG NDGRRYENGY YQFMSGVWRH FNNGEMSVGL TVIDGQVQYF  1020
DEMGYQAKGK FVTTADGKIR YFDKQSGNMY RNRFIENEEG KWLYLGEDGA AVTGSQTING  1080
QHLYFRANGV QVKGEFVTDR HGRISYYDGN SGDQIRNRFV RNAQGQWFYF DNNGYAVTGA  1140
RTINGQHLYF RANGVQVKGE FVTDRHGRIS YYDGNSGDQI RNRFVRNAQG QWFYFDNNGY  1200
AVTGARTING QHLYFRANGV QVKGEFVTDR YGRISYYDGN SGDQIRNRFV RNAQGQWFYF  1260
DNNGYAVTGA RTINGQHLYF RANGVQVKGE FVTDRYGRIS YYDANSGERV RIN         1313

SEQ ID NO: 12          moltype = DNA  length = 34
FEATURE                Location/Qualifiers
misc_feature           1..34
                       note = primer
source                 1..34
                       mol_type = other DNA
                       organism = synthetic construct
SEQUENCE: 12
gggaattccc aggttgacgg taaatattat tact                             34

SEQ ID NO: 13          moltype = DNA  length = 32
FEATURE                Location/Qualifiers
misc_feature           1..32
                       note = primer
source                 1..32
                       mol_type = other DNA
                       organism = synthetic construct
SEQUENCE: 13
agatctagtc ttagttccag ccacggtaca ta                               32

SEQ ID NO: 14          moltype = AA  length = 1590
FEATURE                Location/Qualifiers
source                 1..1590
                       mol_type = protein
                       organism = Streptococcus sobrinus
SEQUENCE: 14
MEKNVRFKMH KVKKRWVTLS VASATMLASA LGASVASADT DTASDDSNQA VVTGDQTTNN  60
QATDQTSIAA TATSEQSAST DAATDQASAA EQTQGTTAST DTAAQTTTNA NEAKWVPTEN  120
```

-continued

```
ENQGFTDEML AEAKNVATAE SDSIPSDLAK MSNVKQVDGK YYYYDQDGNV KKNFAVSVGD  180
KIYYFDETGA YKDTSKVDAD KSSSAVSQNA TIFAANNRAY STSAKNFEAV DNYLTADSWY  240
RPKSILKDGK TWTESGKDDF RPLLMAWWPD TETKRNYVNY MNKVVGIDKT YTAETSQADL  300
TAAAELVQAR IEQKITSENN TKWLREAISA FVKTQPQWNG ESEKPYDDHL QNGALLFDNQ  360
TDLTPDTQSN YRLLNRTPTN QTGSLDSRFT YNPNDPLGGY DFLLANDVDN SNPVVQAEQL  420
NWLHYLLNFG SIYANDADAN FDSIRVDAVD NVDADLLQIS SDYLKAAYGI DKNNKNANNH  480
VSIVEAWSDN DTPYLHDDGD NLMNMDNKFR LSMLWSLAKP LDKRSGLNPL IHNSLVDREV  540
DDREVETVPS YSFARAHDSE VQDIIRDIIK AEINPNSFGY SFTQEEIEQA FKIYNEDLKK  600
TDKKYTHYNV PLSYTLLLTN KGSIPRVYYG DMFTDDGQYM ANKTVNYDAI ESLLKARMKY  660
VSGGQAMQNY QIGNGEILTS VRYGKGALKQ SDKGDATTRT SGVGVVMGNQ PNFSLDGKVV  720
ALNMGAAHAN QEYRALMVST KDGVATYATD ADASKAGLVK RTDENGYLYF LNDDLKGVAN  780
PQVSGFLQVW VPVGAADDQD IRVAASDTAS TDGKSLHQDA AMDSRVMFEG FSNFQSFATK  840
EEEYTNVVIA NNVDKFVSWG ITDFEMAPQY VSSTDGQFLD SVIQNGYAFT DRYDLGMSKA  900
NKYGTADQLV KAIKALHAKG LKVMADWVPD QMYTFPKQEV VTVTRTDKFG KPIAGSQINH  960
SLYVTDTKSS GDDYQAKYGG AFLDELKEKY PELFTKKQIS TGQAIDPSVK IKQWSAKYFN  1020
GSNILGRGAD YVLSDQVSNK YFNVASDTLF LPSSLLGKVV ESGIRYDGKG YIYNSSATGD  1080
QVKASFITEA GNLYYFGKDG YMVTGAQTIN GANYFFLENG TALRNTIYTD AQGNSHYYAN  1140
DGKRYENGYQ QFGNDWRYFK DGNMAVGLTT VDGNVQYFDK DGVQAKDKII VTRDGKVRYF  1200
DQHNGNAATN TFIADKTGHW YYLGKDGVAV TGAQTVGKQK LYFEANGQQV KGDFVTSDEG  1260
KLYFYDVDSG DMWTDTFIED KAGNWFYLGK DGAAVTGAQT IRGQKLYFKA NGQQVKGDIV  1320
KGTDGKIRYY DAKSGEQVFN KTVKAADGKT YVIGNDGVAV DPSVVKGQTF KDASGALRFY  1380
NLKGQLVTGS GWYETANHDW VYIQSGKALT GEQTINGQHL YFKEDGHQVK GQLVTGTDGK  1440
VRYYDANSGD QAFNKSVTVN GKTYYFGNDG TAQTAGNPKG QTFKDGSDIR FYSMEGQLVT  1500
GSGWYENAQG QWLYVKNGKV LTGLQTVGSQ RVYFDENGIQ AKGKAVRTSD GKIRYFDENS  1560
GSMITNQWKF VYGQYYYFGN DGARIYRGWN                                 1590

SEQ ID NO: 15           moltype = DNA  length = 4308
FEATURE                 Location/Qualifiers
source                  1..4308
                        mol_type = unassigned DNA
                        organism = Streptococcus sobrinus
SEQUENCE: 15
atggttgacg gcaaatacta ctattatgat caggacggta acgtaaagaa gaatttcgcg  60
gtgagcgttg gtgacaaaat ctactacttc gatgaaactg gtgcatataa ggataccagc  120
aaagtggacg ccgacaagag cagcagcgcg gttagccaaa acgcgaccat ctttgcggcg  180
aataaccgtg cgtacagcac ctctgcaaag aattttgaag cggtggataa ctacctgacc  240
gcagacagct ggtatcgtcc gaaatccatc ctgaaggacg gcaaaacctg gaccgagagc  300
ggtaaggatg atttccgtcc actgctgatg gcatggtggc ctgacaccga aactaagcgc  360
aactacgtga actatatgaa taaagtggtc ggtattgaca agacgtacac tgcggaaacg  420
tcgcaagcgg atttgaccgc agcggcggag ctggttcaag cgcgtatcga gcagaagatt  480
accagcgaaa acaacaccaa atggctgcgc gaagcaatct ccgcgttcgt taagacgcag  540
cctcagtgga acggcgagtc cgaaaagccg tatgacgatc acttgcagaa cggtgcgctg  600
ctgtttgata accaaaccga cctgacgcca gacacccaaa gcaattaccg tttgctgaac  660
cgtaccccga ccaatcagac tggtagcctg gatagccgtt ttacgtataa tccgaatgac  720
ccgttgggcg gctacgattt cttgctggcg aacgacgttg acaatagcaa tccggtcgtc  780
caggctgaac agttgaactg gctgcattat ctgctgaact ttggctctat ttacgctaac  840
gatgccgacg ccaatttga cagcattcgc gttgatgccg tcgataatgt cgatgctgat  900
ctgctgcaaa tcagcagcga ttacctgaaa gcagcgtatg gcatcgacaa gaataacaag  960
aatgcgaaca accatgttag catcgtcgaa gcgtggagcg acaatgatac cccgtatttg  1020
cacgacgatg gcgataatct gatgaacatg gacaacaaat ttcgcctgtc catgctgtgg  1080
agcctggcaa agccgctgga caaacgtagc ggtttgaacc cgctgattca caatagcctg  1140
gtggaccgcg aggtggacga tcgtgaagtg gaaaccgtgc cgtcctacag ctttgctcgt  1200
gcacatgata gcgaggtgca ggacatcatc cgtgacatta tcaaggctga gattaaccca  1260
aatagctttg gttatagctt cactcaagaa gagatcgagc aagcctttaa gatttacaac  1320
gaggatttga agaaaacgga caagaaatac acccactaca atgtgccgct gagctacacc  1380
ctgctgctga ccaacaaggg cagcatcccg cgtgtgtact atggtgatat gttcaccgat  1440
gatggccaat acatggcaaa caagaccgtc aactacgacg caatcgagag cctgctgaaa  1500
gcccgtatga aatatgtcag cggtggccaa gcaatgcaga actatcaaat tggtaatggc  1560
gagattttga ccagcgtgcg ctatggtaaa ggtgccctga agcagagcga taagggtgac  1620
gcgacgacgc gcactagcgg tgttggcgtg gttatgggta atcagccgaa cttctccctg  1680
gacggtaaag ttgtggccct gaatatgggt gcggcccatg cgaatcaaga ataccgtgca  1740
ctgatggtca gcactaaaga cggtgtggca acttacgcaa ccgatgctga cgcatccaaa  1800
gcgggcctgg tcaagcgtac cgacgagaac ggctacctgt acttcctgaa tgatgatctg  1860
aagggcgtcg cgaaccctca ggtttccggc ttcttgcaag tgtgggttcc agttggtgcc  1920
gccgatgacc aggacattcg cgtcgccgcc agcgacacgg cgagcacgga tggtaaaagc  1980
ctgcatcaag atgcggcgat ggacagccgc gtcatgtttg agggtttcag caattttcaa  2040
tccttcgcga ccaaagaaga agaatacacg aatgttgtta tcgcgaacaa tgtcgataag  2100
ttcgttagct ggggtatcac cgattttgaa atggctccgc agtatgttag cagcaccgac  2160
ggtcagttct tggacagcgt catccagaat ggctatgcgt ttactgatcg ctatgatctg  2220
ggtatgtcca aggcgaacaa gtatggcacg gcagaccaac tggttaaggc aatcaaagcc  2280
ctgcacgcta aaggcctgaa agttatggcg gactgggtcc cggatcaaat gtacaccttt  2340
ccaaaacagg aagttgtgac cgttacccgc accgacaaat tcggtaaacc gatcgccggc  2400
tctcaaatca atcacagctt gtatgtgacc gacaccaaat ccagcggcga cgactaccaa  2460
gcgaagtacg gcggtgcctt cctggatgaa ctgaaagaaa agtacccgga actgttcacg  2520
aaaaagcaaa ttagcacggg ccaagcgatt gatccgagcg tgaaaatcaa gcagtggagc  2580
gcaaaatact tcaatggttc gaatatcctg ggtcgcggtg cggactatgt gctgagcgac  2640
caggtcagca ataagtattt caacgtggcg agcgacacct tgttcctgcc gtccagcctg  2700
ctgggcaagg tcgtggagag cggcattcgt tacgacggca agggttacat ctacaacagc  2760
tccgcgaccg gcgatcaggt caaagcgtct ttcattacgg aagccggtaa cctgtattac  2820
```

```
ttcggcaaag acggttacat ggttactggt gcccagacga ttaatggcgc caactacttc  2880
ttcctggaaa acggtacggc actgcgtaat acgatttaca ccgatgctca aggtaatagc  2940
cactattacg cgaatgatgg caaacgctat gaaaatggct atcaacagtt cggtaacgat  3000
tggcgctact ttaaagatgg taacatggca gtcggcctga ccacggttga tggcaacgtg  3060
caatactttg acaaagacgg cgtccaggca aaggataaga ttatcgtcac ccgtgatggc  3120
aaggtccgtt acttcgatca gcacaacggt aacgcggcga ccaacacgtt cattgctgat  3180
aaaactggcc attggtatta cctgggtaaa gatggcgtcg cggtgactgg cgcccagacc  3240
gtcggcaaac aaaaactgta cttcgaggcc aacggtcaac aagttaaagg tgactttgtt  3300
acgtccgatg agggcaaact gtatttctat gacgttgatt ctggtgacat gtggacggac  3360
accttcatcg aggataaggc gggcaactgg ttctatttgg gcaaggatgg tgcggcagtt  3420
acgggtgccc aaacgattcg cggtcagaag ctgtacttca aggccaatgg tcaacaggtc  3480
aagggtgaca ttgttaaggg caccgacggt aaaatccgct actatgatgc aaaatccggt  3540
gaacaggtgt tcaacaaaac ggtgaaagct gcggatggca aaacgtatgt tatcggtaat  3600
gatggtgtcg cggtggaccc tagcgtggtt aaaggtcaaa cctttaagga cgcttcgggc  3660
gctctgcgtt tctacaactt gaagggtcaa ctggtcactg gcagcggctg gtatgaaacc  3720
gcgaaccatg actgggttta cattcagtcc ggcaaggcac tgaccggcga acagaccatt  3780
aacggtcaac acctgtattt caaagaagat ggtcaccaag tcaagggtca gttggtcacg  3840
ggcaccgatg gtaaagtgcg ttactatgac gccaacagcg gtgaccaagc attcaacaag  3900
agcgtcactg tgaatggtaa aacctattac tttggcaacg atggtacggc gcagactgct  3960
ggcaacccga agggtcagac gttcaaggat ggctccgaca tccgtttttta ctctatggaa  4020
ggccaactgg tgaccggctc gggttggtac gagaacgcgc aaggccagtg gctgtatgtg  4080
aaaaacggta aggtgctgac tggtctgcaa accgttggca gccagcgtgt ttacttcgac  4140
gagaatggta ttcaggccaa gggcaaagca gtgcgtacca gcgatggcaa aattcgttat  4200
ttcgacgaaa acagcggcag catgatcacg aatcaatgga agttcgtcta tggtcagtat  4260
tactactttg gtaacgacgg tgcacgtatt taccgtggtt ggaactaa             4308

SEQ ID NO: 16          moltype = AA  length = 1435
FEATURE                Location/Qualifiers
source                 1..1435
                       mol_type = protein
                       organism = Streptococcus sobrinus
SEQUENCE: 16
MVDGKYYYYD QDGNVKKNFA VSVGDKIYYF DETGAYKDTS KVDADKSSSA VSQNATIFAA  60
NNRAYSTSAK NFEAVDNYLT ADSWYRPKSI LKDGKTWTES GKDDFRPLLM AWWPDTETKR  120
NYVNYMNKVV GIDKTYTAET SQADLTAAAE LVQARIEQKI TSENNTKWLR EAISAFVKTQ  180
PQWNGESEKP YDDHLQNGAL LFDNQTDLTP DTQSNYRLLN RTPTNQTGSL DSRFTYNPND  240
PLGGYDFLLA NDVDNSNPVV QAEQLNWLHY LLNFGSIYAN DADANFDSIR VDAVDNVDAD  300
LLQISSDYLK AAYGIDKNNK NANNHVSIVE AWSDNDTPYL HDDGDNLMNM DNKFRLSMLW  360
SLAKPLDKRS GLNPLIHNSL VDREVDDREV ETVPSYSFAR AHDSEVQDII RDIIKAEINP  420
NSFGYSFTQE EIEQAFKIYN EDLKKTDKKY THYNVPLSYT LLLTNKGSIP RVYYGDMFTD  480
DGQYMANKTV NYDAIESLLK ARMKYVSGGQ AMQNYQIGNG EILTSVRYGK GALKQSDKGD  540
ATTRTSGVGV VMGNQPNFSL DGKVVALNMG AAHANQEYRA LMVSTKDGVA TYATDADASK  600
AGLVKRTDEN GYLYFLNDDL KGVANPQVSG FLQVWVPVGA ADDQDIRVAA SDTASTDGKS  660
LHQDAAMDSR VMFEGFSNFQ SFATKEEEYT NVVIANNVDK FVSWGITDFE MAPQYVSSTD  720
GQFLDSVIQN GYAFTDRYDL GMSKANKYGT ADQLVKAIKA LHAKGLKVMA DWVPDQMYTF  780
PKQEVVTVTR TDKFGKPIAG SQINHSLYVT DTKSSGDDYQ AKYGGAFLDE LKEKYPELFT  840
KKQISTGQAI DPSVKIKQWS AKYFNGSNIL GRGADYVLSD QVSNKYFNVA SDTLFLPSSL  900
LGKVVESGIR YDGKGYIYNS SATGDQVKAS FITEAGNLYY FGKDGYMVTG AQTINGANYF  960
FLENGTALRN TIYTDAQGNS HYYANDGKRY ENGYQQFGND WRYFKDGNMA VGLTTVDGNV  1020
QYFDKDGVQA KDKIIVTRDG KVRYFDQHNG NAATNTFIAD KTGHWYYLGK DGVAVTGAQT  1080
VGKQKLYFEA NGQQVKGDFV TSDEGKLYFY DVDSGDMWTD TFIEDKAGNW FYLGKDGAAV  1140
TGAQTIRGQK LYFKANGQQV KGDIVKGTDG KIRYYDAKSG EQVFNKTVKA ADGKTYVIGN  1200
DGVAVDPSVV KGQTFKDASG ALRFYNLKGQ LVTGSGWYET ANHDWVYIQS GKALTGEQTI  1260
NGQHLYFKED GHQVKGQLVT GTDGKVRYYD ANSGDQAFNK SVTVNGKTYY FGNDGTAQTA  1320
GNPKGQTFKD GSDIRFYSME GQLVTGSGWY ENAQGQWLYV KNGKVLTGLQ TVGSQRVYFD  1380
ENGIQAKGKA VRTSDGKIRY FDENSGSMIT NQWKFVYGQY YYFGNDGARI YRGWN      1435

SEQ ID NO: 17          moltype = AA  length = 1570
FEATURE                Location/Qualifiers
source                 1..1570
                       mol_type = protein
                       organism = Streptococcus sp.
SEQUENCE: 17
MKKNWVTIGV TALSMVTVAG GTLLEDQQVQ ADEQNAANQS GDSSQDLLRE ASATTNDTAT  60
TVAPTISADA NTASVNIPVA DATNTTTAAT DRAAAPTTTA ATVDTNSGQA APSTNVQAAA  120
ADTSATPTDT NTNTNASVTA TDRAVATDTA NTEARTPSRR ALAETREANT NTSTGIQWIN  180
GKQYYVNSDG SVRKNFVFEQ DGKSYYFDAE TGALATKSQD EFSTEPIKAA VDFSSGNQLY  240
KNDNKSLDQL DTFITADAWY RPKSILKDGK TWTASTEADK RPLLMVWWPD KSTQVNYLNY  300
MQNQGLGAGS FSTNSSQESL NLAAKAVQTK IEERIAREGN TNWLRTSIDQ FIKTQPGWNS  360
STENSSYDHL QGGQLLFNNS KGDTGNRTSY ANSDYRLLNR TPTNQSGTRK YFKDNSIGGL  420
EFLLANDIDN SNPAVQAEQL NWLHFMMNIG SIMANDPTAN FDGLRVDALD NVDADLLQIA  480
SDYFKAVYGV DKSEANAIKH LSYLEAWSAN DPYYNKDTKG AQLPIDNALR NALTNLLMRD  540
KNTRMQLGDM TAFMNSSLNP RGANDKNGER MANYIFTRAH DTEAQTIIQR IIRDRINPNL  600
FGYNFTRDEI KKAFEIYNAD INTAHKTYAS YNLPSVYALM LTNKDSVTRV YYGDLYREDG  660
HYMAKKTPYF DAIDTLLRAR IKYVAGGQDM EVKKVGNDGL LTSVRYGKGA NNSTDWGTTE  720
TRTQGMGVIL TNNYDFRLGS NETVTMNMGR AHRNQLYRPL LLTTKDGLAT YLNDSDVPSN  780
LLKRTDWNGN LTFNANDVFG VENVQVSGYL GVWVPVGAKA NQDARTQPSN RANSDGQVYK  840
SSAALDSQVM YEAFSNFQAF ADDQPELYMN RVLAKNTDLL KAWGVTSVGL PPQYVSSKDG  900
TFLDSTIDNG YAFDDRYDMA LSQNNKYGSL EDLLNVLRAL HKDGIQAIAD WVPDQIYNLP  960
```

-continued

```
GKEVVNATRV NGYGYHQQGY QIVDQAYVAN TRTDGTDYQG RYGGAFLDEL KAKYPSIFNR  1020
VQISNGKQLP TNEKITKWSA KYFNGTNILG RGINYVLRDD KTNQYFNTSA NGQLLPTPLR  1080
DTGAITSTQV FQRRGQDVYF LRDNQVIKNE FVQDGNGNWY YFGADGKMTK GAQNINSKDY  1140
YFFDNGVQLR NALRRASNGY TYYYGLDGAM IKNAFVDFDD KHQQVRAFTT QGTMVVGNLH  1200
WSGHHFYFDR ETGIQAKDRI VRTDDGKLHY YVAQTGDMGR NVFATDSRTG KRYYFDADGN  1260
TVTGSRVIDG KTYYFNQDGS VGTAYSNRAD SIIFENGKAR YITPAGEIGR SIFVYNPATK  1320
AWNYFDKEGN RVTGRQYIDG NLYYFKEDGS QVKGAIVEEN GIKYYYEPGS GILASGRYLQ  1380
VGDDQWIYFK HDGSLAIGQV RADGGYLKYF DKNGIQVKGQ TIVEDGHTYY YDADSGALVT  1440
SSFAEIAPNQ WAYFNTEGQA LKGKWTINGK EYYFDQNGIQ YKGKAVKVGS RYKYYDENDG  1500
QPVTNRFAQI EPNVWAYFGA DGYAVTGEQV INGQHLYFDQ SGRQVKGAYV TVNGQRRYYD  1560
ANTGEYIPGR                                                        1570

SEQ ID NO: 18          moltype = DNA  length = 4182
FEATURE                Location/Qualifiers
source                 1..4182
                       mol_type = unassigned DNA
                       organism = Streptococcus sp.
SEQUENCE: 18
atgatcaatg gcaaacagta ctatgtaaat tcggacggta gcgtgcgtaa gaatttcgtt  60
tttgaacagg atggtaagag ctactacttt gacgcggaaa ctggcgcgct ggccactaaa  120
agccaagatg aatttagcac ggagccgatt aaagcagcag tggacttctc tagcggcaac  180
cagctgtaca aaaatgacaa caaatcgctg gatcagctgg atacgtttat caccgctgac  240
gcatggtacc gccctaagtc tattctgaag gatggcaaaa cctggaccgc gtctaccgaa  300
gctgataagc gtccgttgct gatggtgtgg tggccggaca agtccaccca agttaactac  360
ctgaactaca tgcagaacca gggtttgggt gcgggtagct tcagcaccaa tagcagccaa  420
gaatccctga atctggctgc gaaagcagtt cagaccaaga tcgaagaacg catcgcacgt  480
gagggtaaca ccaattggct gcgtaccagc attgaccaat tcattaagac gcagccaggc  540
tggaacagca gcactgagaa tagcagctat gatcacttgc agggtggtca actgctgttc  600
aataacagca aaggtgatac gggtaaccgc accagctatg cgaatagcga ctatcgtctg  660
ctgaaccgta ccccaactaa tcaaagcggc acccgtaagt actttaagga taattccatc  720
ggtggtctgg aatttctgct ggcaaacgac atcgacaaca gcaaccctgc cgttcaggcg  780
gagcagctga actggctgca cttcatgatg aacattggtt ctatcatggc gaatgacccg  840
acggcgaact ttgatggttt gcgtgtggac gcgttggata acgtggatgc ggacctgttg  900
cagatcgcga gcgattactt caaggcagtc tacggtgttg ataaatccga ggcgaatgcg  960
atcaagcacc tgagctatct ggaggcgtgg agcgccaatg acccgtatta caacaaggat  1020
accaaaggcg cgcaactgcc gattgacaac gcgctgcgca acgcactgac caacctgttg  1080
atgcgtgaca agaatacgcg catgcagctg ggtgacatga cggcgtttat gaatagctct  1140
ctgaacccac gtggtgcgaa tgacaaaaac ggcgagcgta tggcgaatta catttcacc  1200
cgcgcacacg ataccgaggc gcagaccatc attcagcgta ttatccgcga tcgtatcaat  1260
ccgaacctgt ttggctacaa tttcacccgc gatgaaatca aaaaggcgtt tgagatctac  1320
aacgcggaca ttaacacggc gcataagacg tacgcgagct acaatctgcc gtccgtctac  1380
gcactgatgc tgacgaataa ggacagcgtg acccgtgtgt attacggtga cctgtatcgt  1440
gaggacggtc actacatggc caagaaaacg ccttatttcg atgcaatcga taccctgctg  1500
cgtgcgcgca tcaaatacgt ggcgggtggt caagacatgg aggtgaagaa agttggtaat  1560
gacggcttgc tgacgagcgt ccgctatggc aagggtgcga acaatagcac cgactggggc  1620
acgactgaaa cccgtaccca aggtatgggc gttatcctga cgaacaacta tgatttccgc  1680
ctgggcagca acgaaaccgt cacgatgaac atgggccgtg cgcatcgcaa tcagctgtat  1740
cgtccgctgc tgctgacgac caaggatggt ctggccacgt acctgaatga tagcgacgtg  1800
ccttcgaatt tgctgaaacg cacggactgg aatggtaact tgacctttaa tgccaacgat  1860
gtgtttggtg tagagaacgt ccaggtcagc ggttacctgg gtgtttgggt accggttggt  1920
gctaaagcta accaggatgc gcgtacccaa ccgagcaacc gtgcgaacag cgatggtcag  1980
gtctataagt cgtctgcggc attggacagc caggtcatgt atgaggcgtt tagcaatttt  2040
caggcatttg cggacgatca accggaactg tacatgaacc gcgttctggc gaagaacacc  2100
gatctgctga aagcgtgggg cgttactagc gttggcttgc cgccacaata cgttagcagc  2160
aaagacggca ccttcctgga tagcactatt gataacggct atgcgttcga tgatcgttac  2220
gacatggcgc tgagccagaa caacaaatac ggttctctgg aggacttgct gaacgttctg  2280
cgcgctctgc acaaagacgg tattcaggcg attgcggact gggtcccgga tcaaatctac  2340
aatttgccgg gtaaagaggt tgttaatgcg acgcgtgtta acggttacgg ttaccatcag  2400
cagggctacc agattgttga ccaggcgtac gttgcaaaca cccgtacgga tggtaccgat  2460
tatcagggtc gttacggtgg tgcttttctg gacgaactga aggcgaagta cccgagcatt  2520
ttcaatcgtg tccagattag caacggtaaa cagctgccaa ccaatgagaa aatcacgaaa  2580
tggtccgcga aatacttcaa tggcacgaac atcctgggcc gtggtattaa ctatgtgctg  2640
cgcgacgaca agaccaatca gtatttcaac accagcgcaa acggccaact gctgccgacg  2700
ccactgcgcg acaccggtgc catcaccagc acgcaagttt tccagcgtcg tggccaagac  2760
gtctattttc tgcgtgataa ccaggttatc aaaaacgagt ttgtgcaaga tggtaacggt  2820
aattggtact acttcggtgc cgacggtaaa atgacgaagg gtgcacaaaa catcaatagc  2880
aaggattact atttcttcga taatggcgtc cagctgcgta atgcgctgcg tcgcgcgtcc  2940
aatggttaca cctactatta tggcctggac ggtgccatga tcaagaacgc tttcgtcgat  3000
tttgatgata agcaccaaca ggtgcgtgcg tttactacgc agggcacgat ggtggtcggt  3060
aatttgcact ggagcggtca ccacttctat tttgaccgcg aaacgggtat ccaagccaaa  3120
gaccgcattg tgcgtaccga tgatggcaag ctgcactatt atgtcgcaca aaccggcgat  3180
atgggccgca atgtgtttgc gaccgacagc cgcacgggca agcgctatta ctttgatgcg  3240
gacggcaaca ccgttacggg ctcccgtgtc atcgacggca agacctacta cttcaaccag  3300
gacggttcgg tcggtaccgc gtacagcaat cgtgcggata gcattatctt tgagaatggc  3360
aaggctcgct atatcactcc ggctggcgag attggccgtt ccatttttgt ctacaacccg  3420
gcgaccaaag cgtggaatta cttcgacaag gaaggtaacc gtgtcaccgg tcgtcagtat  3480
attgacggca atctgtacta ctttaaagag gacggctccc aagtgaaagg tgcgattgtt  3540
gaagagaacg gtatcaagta ctactacgaa ccgggcagcg gtatcctggc gagcggtcgt  3600
tatctgcaag tcggtgacga ccaatggatc tacttcaaac acgacggtag cctggcgatc  3660
```

```
ggtcaggttc gtgcagacgg tggttacttg aaatactttg ataagaatgg catccaggtc  3720
aagggccaaa ccattgtgga ggatggtcat acctattact acgatgccga ctccggtgct  3780
ctggtgacct ctagcttcgc ggagattgct ccgaaccagt gggcctactt caataccgag  3840
ggccaagccc tgaagggcaa atggaccatc aatggtaaag agtactattt tgatcagaac  3900
ggcattcagt ataaaggcaa ggcagttaag gtcggcagcc gttacaaata ctatgacgag  3960
aatgacggtc aaccggtcac taaccgtttt gcccagattg agccgaacgt ctgggcgtac  4020
tttggtgccg atggctacgc agttactggc gaacaggtga ttaatggcca gcacctgtac  4080
ttcgatcagt cgggtcgtca ggttaaaggt gcgtacgtca ccgtgaatgg tcaacgtcgt  4140
tactacgacg caaacacggg tgaatacatt ccgggtcgtt aa                    4182
```

```
SEQ ID NO: 19           moltype = AA  length = 1393
FEATURE                 Location/Qualifiers
source                  1..1393
                        mol_type = protein
                        organism = Streptococcus sp.
SEQUENCE: 19
MINGKQYYVN SDGSVRKNFV FEQDGKSYYF DAETGALATK SQDEFSTEPI KAAVDFSSGN  60
QLYKNDNKSL DQLDTFITAD AWYRPKSILK DGKTWTASTE ADKRPLLMVW WPDKSTQVNY  120
LNYMQNQGLG AGSFSTNSSQ ESLNLAAKAV QTKIEERIAR EGNTNWLRTS IDQFIKTQPG  180
WNSSTENSSY DHLQGGQLLF NNSKGDTGNR TSYANSDYRL LNRTPTNQSG TRKYFKDNSI  240
GGLEFLLAND IDNSNPAVQA EQLNWLHFMM NIGSIMANDP TANFDGLRVD ALDNVDADLL  300
QIASDYFKAV YGVDKSEANA IKHLSYLEAW SANDPYYNKD TKGAQLPIDN ALRNALTNLL  360
MRDKNTRMQL GDMTAFMNSS LNPRGANDKN GERMANYIFT RAHDTEAQTI IQRIIRDRIN  420
PNLFGYNFTR DEIKKAFEIY NADINTAHKT YASYNLPSVY ALMLTNKDSV TRVYYGDLYR  480
EDGHYMAKKT PYFDAIDTLL RARIKYVAGG QDMEVKKVGN DGLLTSVRYG KGANNSTDWG  540
TTETRTQGMG VILTNNYDFR LGSNETVTMN MGRAHRNQLY RPLLLTTKDG LATYLNDSDV  600
PSNLLKRTDW NGNLTFNAND VFGVENVQVS GYLGVWVPVG AKANQDARTQ PSNRANSDGQ  660
VYKSSAALDS QVMYEAFSNF QAFADDQPEL YMNRVLAKNT DLLKAWGVTS VGLPPQYVSS  720
KDGTFLDSTI DNGYAFDDRY DMALSQNNKY GSLEDLLNVL RALHKDGIQA IADWVPDQIY  780
NLPGKEVVNA TRVNGYGYHQ QGYQIVDQAY VANTRTDGTD YQGRYGGAFL DELKAKYPSI  840
FNRVQISNGK QLPTNEKITK WSAKYFNGTN ILGRGINYVL RDDKTNQYFN TSANGQLLPT  900
PLRDTGAITS TQVFQRRGQD VYFLRDNQVI KNEFVQDGNG NWYYFGADGK MTKGAQNINS  960
KDYYFFDNGV QLRNALRRAS NGYTYYYGLD GAMIKNAFVD FDDKHQQVRA FTTQGTMVVG  1020
NLHWSGHHFY FDRETGIQAK DRIVRTDDGK LHYYVAQTGD MGRNVFATDS RTGKRYYFDA  1080
DGNTVTGSRV IDGKTYYFNQ DGSVGTAYSN RADSIIFENG KARYITPAGE IGRSIFVYNP  1140
ATKAWNYFDK EGNRVTGRQY IDGNLYYFKE DGSQVKGAIV EENGIKYYYE PGSGILASGR  1200
YLQVGDDQWI YFKHDGSLAI GQVRADGGYL KYFDKNGIQV KGQTIVEDGH TYYYDADSGA  1260
LVTSSFAEIA PNQWAYFNTE GQALKGKWTI NGKEYYFDQN GIQYKGKAVK VGSRYKYYDE  1320
NDGQPVTNRF AQIEPNVWAY FGADGYAVTG EQVINGQHLY FDQSGRQVKG AYVTVNGQRR  1380
YYDANTGEYI PGR                                                    1393
```

```
SEQ ID NO: 20           moltype = DNA  length = 3351
FEATURE                 Location/Qualifiers
source                  1..3351
                        mol_type = unassigned DNA
                        organism = Paenibacillus humicus
SEQUENCE: 20
atggctagcg cagcaggagg cgcgaatctg acgctcggca aaaccgtcac cgccagcggc  60
cagtcgcaga cgtacagccc cgacaatgtc aaggacagca atcagggaac ttactgggaa  120
agcacgaaca acgccttccc gcagtggatc caagtcgacc ttggcgccag cacgagcatc  180
gaccagatcg tgctcaaact tccgtccgga tgggagactc gtacgcaaac gctctcgata  240
cagggcagcg cgaacggctc gacgttcacg aacatcgtcg gatcggccgg gtatacattc  300
aatccatccg tcgccggcaa cagcgtcacg atcaacttca gcgctgccag cgcccgctac  360
gtccgcctga atttcacggc caatacgggc tggccagcag gccagctgtc ggagcttgag  420
atctacggag cgacggcgcc aacgcctact cccacgccta ctccaacacc aacgccaacg  480
ccaacaccaa cgccaacccc tacagtaacc cctgcgcctt cggccacgcc gactccgact  540
cctccggcag gcagcaacat cgccgtaggg aaatcgatta cagcctcttc cagcacgcag  600
acctacgtag ctgcaaatgc aaatgacaac aatacatcca cctattggga gggaggaagc  660
aacccgagca cgctgactct cgatttcggt tccaaccaga gcatcacttc cgtcgtcctc  720
aagctgaatc cggcttcgga atgggggact cgcacgcaaa cgatccaagt tcttggagcg  780
gatcagaacg ccggctcctt cagcaatctc gtctctgccc agtcctatac gttcaatccc  840
gcaaccggca atacggtgac gattccggtc tccgcgacgg tcaagcgcct ccagctgaac  900
attacggcga actccggcgc ccctgccggc cagattgccg agttccaagt gttcggcacg  960
ccagcgccta atccggactt gaccattacc ggcatgtcct ggactccgtc ttctccggtc  1020
gagagcggcg acattacgct gaacgccgtc gtcaagaaca tcggaactgc agctgcaggc  1080
gccacgacgg tcaatttcta cctgaacaac gaactcgccg gcaccgctcc ggtaggcgcg  1140
cttgcggcag gagcttctgc aaatgtatcg atcaatgcag gcgccaaagc agccgcaacg  1200
tatgcggtaa gcgccaaagt cgacgagagc aacgccgtca tcgagcagaa tgaaggcaac  1260
aacagctact cgaacccgac taacctcggt gtagcgccgg tgtccagctc cgacctcgtc  1320
gccgtgacgt catggtcgcc gggcacgccg tcgcagggag cggcggtcgc atttaccgtc  1380
gcgcttaaaa atcagggtac gctggcttcc gccggcggag cccatcccgt aaccgtcgtt  1440
ctgaaaaacg ctgccggagc gacgctgcaa accttcacgg gcacctacac aggttccctg  1500
gcagcaggcg catccgcgaa tatcagcgtg ggcagctgga cggcagcgag cggcacctat  1560
accgtctcga cgacggtagc cgctgacggc aatgaaattc cggccaagca aagcaacaat  1620
acgagcagcg cgagcctcac ggtctactcg gcgcgcggcg ccagcatgcc gtacagccgt  1680
tacgacacgg aggatgcggt gctcggcggc ggagctgtcc tgagaacggc gccgacgttc  1740
gatcagtcgc tcatcgcttc cgaagcatcg ggacagaaat acgccgcact tccgtccaac  1800
ggctccagcc tgcagtggac cgtccgtcaa ggccagggcg gtgcaggcgt cacgatgcgc  1860
ttcacgatgc ccgacacgag cgacggcatg ggccagaacg gctcgctcga cgtctatgtc  1920
```

-continued

```
aacggaacca aagccaaaac ggtgtcgctg acctcttatt acagctggca gtatttctcc  1980
ggcgacatgc cggctgacgc tccgggcggc ggcaggccgc tcttccgctt cgacgaagtc  2040
cacttcaagc tggatacggc gttgaagccg ggagacacga tccgcgtcca gaagggcggt  2100
gacagcctgg agtacggcgt cgacttcatc gagatcgagc cgattccggc agcggttgcc  2160
cgtccggcca actcggtgtc cgtcaccgaa tacggcgctg tcgccaatga cggcaaggat  2220
gatctcgccg ccttcaaggc tgccgtgacc gcagcggtag cggccggaaa atccctctac  2280
atcccggaag gcaccttcca cctgagcagc atgtgggaga tcggctcggc caccagcatg  2340
atcgacaact tcacggtcac gggtgccggc atctggtata cgaacatcca gttcacgaat  2400
cccaatgcat cgggcggcgg catctccctg agaatcaaag gaaagctgga tttcagcaac  2460
atctacatga actccaacct gcgttcccgt tacgggcaga acgccgtcta caaaggcttt  2520
atggacaatt tcggcactaa ttcgatcatc catgacgtct gggtcgagca tttcgaatgc  2580
ggcatgtggg tcggcgacta cgcccatact cctgcgatct atgcgagcgg gctcgtcgtg  2640
gaaaacagcc gcatccgcaa caatcttgcc gacggcatca acttctcgca gggaacgagc  2700
aactcgaccg tccgcaacag cagcatccgc aacaacggcg atgacggcct cgccgtctgg  2760
acgagcaaca cgaacggcgc tccggccggc gtgaacaaca ccttctccta caacacgatc  2820
gagaacaact ggcgcgcggc ggccatcgcc ttcttcggcg gcagcggcca caaggctgac  2880
cacaactaca tcatcgactg tgtcggcggc tccggcatcc ggatgaatac ggtgttccca  2940
ggctaccact tccagaacaa caccggcatc accttctcgg atacgacgat catcaacagc  3000
ggcaccagcc aggatctgta caacggcgag cgcggagcga ttgatctgga agcatccaac  3060
gacgcgatca aaaacgtcac cttcaccaac atcgacatca tcaatgccca gcgcgacggc  3120
gttcagatcg gctatggcgg cggcttcgag aacatcgtgt tcaacaacat cacgatcgac  3180
ggcaccggcc gcgacgggat atcgacatcc cgcttctcgg gacctcatct tggcgcagcc  3240
atctatacgt acacgggcaa cggctcggcg acgttcaaca acctggtgac ccggaacatc  3300
gcctatgcag gcggcaacta catccagagc gggttcaacc tgacgatcta a           3351
```

```
SEQ ID NO: 21          moltype = AA  length = 1116
FEATURE                Location/Qualifiers
source                 1..1116
                       mol_type = protein
                       organism = Paenibacillus humicus
SEQUENCE: 21
MASAAGGANL TLGKTVTASG QSQTYSPDNV KDSNQGTYWE STNNAFPQWI QVDLGASTSI  60
DQIVLKLPSG WETRTQTLSI QGSANGSTFT NIVGSAGYTF NPSVAGNSVT INFSAASARY  120
VRLNFTANTG WPAGQLSELE IYGATAPTPT PTPTPTPTPT PTPTPTPTVT PAPSATPTPT  180
PPAGSNIAVG KSITASSSTQ TYVAANANDN NTSTYWEGGS NPSTLTLDFG SNQSITSVVL  240
KLNPASEWGT RTQTIQVLGA DQNAGSFSNL VSAQSYTFNP ATGNTVTIPV SATVKRLQLN  300
ITANSGAPAG QIAEFQVFGT PAPNPDLTIT GMSWTPSSPV ESGDITLNAV VKNIGTAAAG  360
ATTVNFYLNN ELAGTAPVGA LAAGASANVS INAGAKAAAT YAVSAKVDES NAVIEQNEGN  420
NSYSNPTNLV VAPVSSSDLV AVTSWSPGTP SQGAAVAFTV ALKNQGTLAS AGGAHPVTVV  480
LKNAAGATLQ TFTGTYTGSL AAGASANISV GSWTAASGTY TVSTTVAADG NEIPAKQSNN  540
TSSASLTVYS ARGASMPYSR YDTEDAVLGG GAVLRTAPTF DQSLIASEAS GQKYAALPSN  600
GSSLQWTVRQ GQGGAGVTMR FTMPDTSDGM GQNGSLDVYV NGTKAKTVSL TSYYSWQYFS  660
GDMPADAPGG GRPLFRFDEV HFKLDTALKP GDTIRVQKGG DSLEYGVDFI EIEPIPAAVA  720
RPANSVSVTE YGAVANDGKD DLAAFKAAVT AAVAAGKSLY IPEGTFHLSS MWEIGSATSM  780
IDNFTVTGAG IWYTNIQFTN PNASGGGISL RIKGKLDFSN IYMNSNLRSR YGQNAVYKGF  840
MDNFGTNSII HDVWVEHFEC GMWVGDYAHT PAIYASGLVV ENSRIRNNLA DGINFSQGTS  900
NSTVRNSSIR NNGDDGLAVW TSNTNGAPAG VNNTFSYNTI ENNWRAAAIA FFGGSGHKAD  960
HNYIIDCVGG SGIRMNTVFP GYHFQNNTGI TFSDTTIINS GTSQDLYNGE RGAIDLEASN  1020
DAIKNVTFTN IDIINAQRDG VQIGYGGGFE NIVFNNITID GTGRDGISTS RFSGPHLGAA  1080
IYTYTGNGSA TFNNLVTRNI AYAGGNYIQS GFNLTI                            1116
```

```
SEQ ID NO: 22          moltype = AA  length = 1146
FEATURE                Location/Qualifiers
source                 1..1146
                       mol_type = protein
                       organism = Paenibacillus humicus
SEQUENCE: 22
MRIRTKYMNW MLVLVLIAAG FFQAAGPIAP ATAAGGANLT LGKTVTASGQ SQTYSPDNVK  60
DSNQGTYWES TNNAFPQWIQ VDLGASTSID QIVLKLPSGW ETRTQTLSIQ GSANGSTFTN  120
IVGSAGYTFN PSVAGNSVTI NFSAASARYV RLNFTANTGW PAGQLSELEI YGATAPTPTP  180
TPTPTPTPTP TPTPTPTVTP APSATPTPTP PAGSNIAVGK SITASSSTQT YVAANANDNN  240
TSTYWEGGSN PSTLTLDFGS NQSITSVVLK LNPASEWGTR TQTIQVLGAD QNAGSFSNLV  300
SAQSYTFNPA TGNTVTIPVS ATVKRLQLNI TANSGAPAGQ IAEFQVFGTP APNPDLTITG  360
MSWTPSSPVE SGDITLNAVV KNIGTAAAGA TTVNFYLNNE LAGTAPVGAL AAGASANVSI  420
NAGAKAAATY AVSAKVDESN AVIEQNEGNN SYSNPTNLVV APVSSSDLVA VTSWSPGTPS  480
QGAAVAFTVA LKNQGTLASA GGAHPVTVVL KNAAGATLQT FTGTYTGSLA AGASANISVG  540
SWTAASGTYT VSTTVAADGN EIPAKQSNNT SSASLTVYSA RGASMPYSRY DTEDAVLGGG  600
AVLRTAPTFD QSLIASEASG QKYAALPSNG SSLQWTVRQG QGGAGVTMRF TMPDTSDGMG  660
QNGSLDVYVN GTKAKTVSLT SYYSWQYFSG DMPADAPGGG RPLFRFDEVH FKLDTALKPG  720
DTIRVQKGGD SLEYGVDFIE IEPIPAAVAR PANSVSVTEY GAVANDGKDD LAAFKAAVTA  780
AVAAGKSLYI PEGTFHLSSM WEIGSATSMI DNFTVTGAGI WYTNIQFTNP NASGGGISLR  840
IKGKLDFSNI YMNSNLRSRY GQNAVYKGFM DNFGTNSIIH DVWVEHFECG MWVGDYAHTP  900
AIYASGLVVE NSRIRNNLAD GINFSQGTSN STVRNSSIRN NGDDGLAVWT SNTNGAPAGV  960
NNTFSYNTIE NNWRAAAIAF FGGSGHKADH NYIIDCVGGS GIRMNTVFPG YHFQNNTGIT  1020
FSDTTIINSG TSQDLYNGER GAIDLEASND AIKNVTFTNI DIINAQRDGV QIGYGGGFEN  1080
IVFNNITIDG TGRDGISTSR FSGPHLGAAI YTYTGNGSAT FNNLVTRNIA YAGGNYIQSG  1140
FNLTIK                                                             1146
```

```
SEQ ID NO: 23          moltype = DNA  length = 3426
```

-continued

```
FEATURE                Location/Qualifiers
source                 1..3426
                       mol_type = unassigned DNA
                       organism = Paenibacillus humicus
SEQUENCE: 23
gtgagaagca aaaaattgtg gatcagcttg ttgtttgcgt taacgttaat ctttacgatg  60
gcgttcagca acatgtctgc tagcgcagca ggaggcgcga atctgacgct cggcaaaacc  120
gtcaccgcca gcggccagtc gcagacgtac agccccgaca atgtcaagga cagcaatcag  180
ggaacttact gggaaagcac gaacaacgcc ttcccgcagt ggatccaagt cgaccttggc  240
gccagcacga gcatcgacca gatcgtgctc aaacttccgt ccggatggga gactcgtacg  300
caaacgctct cgatacaggg cagcgcgaac ggctcgacgt tcacgaacat cgtcggatcg  360
gccgggtata cattcaatcc atccgtcgcc ggcaacagcg tcacgatcaa cttcagcgct  420
gccagcgccc gctacgtccg cctgaatttc acggccaata cgggctggcc agcaggccag  480
ctgtcggagc ttgagatcta cggagcgacg gcgccaacgc ctactcccac gcctactcca  540
acaccaacgc caacgccaac accaacgcca accoctacag taacccctgc gccttcggcc  600
acgccgactc cgactcctcc ggcaggcagc aacatcgccg tagggaaatc gattacagcc  660
tcttccagca cgcagaccta cgtagctgca aatgcaaatg acaacaatac atccacctat  720
tgggagggag gaagcaaccc gagcacgctg actctcgatt tcggttccaa ccagagcatc  780
acttccgtcg tcctcaagct gaatccggct tcggaatggg ggactcgcac gcaaacgatc  840
caagttcttg gagcggatca gaacgccggc tccttcagca atctcgtctc tgcccagtcc  900
tatacgttca atcccgcaac cggcaatacg gtgacgattc cggtctccgc gacggtcaag  960
cgcctccagc tgaacattac ggcgaactcc ggcgcccctg ccggccagat tgccgagttc  1020
caagtgttcg gcacgccagc gcctaatccg gacttgacca ttaccggcat gtcctggact  1080
ccgtcttctc cggtcgagag cggcgacatt acgctgaacg ccgtcgtcaa gaacatcgga  1140
actgcagctg caggcgccac gacggtcaat ttctacctga acaacgaact cgccggcacc  1200
gctccggtag gcgcgcttgc ggcaggagct tctgcaaatg tatcgatcaa tgcaggcgcc  1260
aaagcagccg caacgtatgc ggtaagcgcc aaagtcgacg agagcaacgc cgtcatcgag  1320
cagaatgaag gcaacaacag ctactcgaac ccgactaacc tcgtcgtagc gccggtgtcc  1380
agctccgacc tcgtcgccgt gacgtcatgg tcgccgggca cgccgtcgca gggagcggcg  1440
gtcgcattta ccgtcgcgct taaaaatcag ggtacgctgg cttccgccgg cggagcccat  1500
cccgtaaccg tcgttctgaa aaacgctgcc ggagcgacgc tgcaaacctt cacgggcacc  1560
tacacaggtt ccctggcagc aggcgcatcc gcgaatatca gcgtgggcag ctggacggca  1620
gcgagcggca cctataccgt ctcgacgacg gtagccgctg acggcaatga aattccggcc  1680
aagcaaagca acaatacgag cagcgcgagc ctcacggtct actcggcgcg cggcgccagc  1740
atgccgtaca gccgttacga cacggaggat gcggtgctcg gcggcggagc tgtcctgaga  1800
acggcgccga cgttcgatca gtcgctcatc gcttccgaag catcgggaca gaaatacgcc  1860
gcacttccgt ccaacggctc cagcctgcag tggaccgtcc gtcaaggcca gggcggtgca  1920
ggcgtcacga tgcgcttcac gatgcccgac acgagcgacg gcatgggcca gaacggctcg  1980
ctcgacgtct atgtcaacgg aaccaaagcc aaaacggtgt cgctgacctc ttattacagc  2040
tggcagtatt tctccggcga catgccggct gacgctccgg gcggcggcag gccgctcttc  2100
cgcttcgacg aagtccactt caagctggat acggcgttga agccgggaga cacgatccgc  2160
gtccagaagg gcggtgacag cctggagtac ggcgtcgact tcatcgagat cgagccgatt  2220
ccggcagcgg ttgcccgtcc ggccaactcg gtgtccgtca ccgaatacgg cgctgtcgcc  2280
aatgacggca aggatgatct cgccgccttc aaggctgccg tgaccgcagc ggtagcggcc  2340
ggaaaatccc tctacatccc ggaaggcacc ttccacctga gcagcatgtg ggagatcggc  2400
tcggccacca gcatgatcga caacttcacg gtcacgggtg ccggcatctg gtatacgaac  2460
atccagttca cgaatcccaa tgcatcgggc ggcggcatct ccctgagaat caaaggaaag  2520
ctggatttca gcaacatcta catgaactcc aacctgcgtt cccgttacgg gcagaacgcc  2580
gtctacaaag gctttatgga caatttcggc actaattcga tcatccatga cgtctgggtc  2640
gagcatttcg aatgcggcat gtgggtcggc gactacgccc atactcctgc gatctatgcg  2700
agcgggctcg tcgtggaaaa cagccgcatc cgcaacaatc ttgccgacgg catcaacttc  2760
tcgcagggaa cgagcaactc gaccgtccgc aacagcagca tccgcaacaa cggcgatgac  2820
ggcctcgccg tctggacgag caacacgaac ggcgctccgg ccggcgtgaa caacaccttc  2880
tcctacaaca cgatcgagaa caactggcgc gcggcggcca tcgccttctt cggcggcagc  2940
ggccacaagg ctgaccacaa ctacatcatc gactgtgtcg gcggctccgg catccggatg  3000
aatacggtgt tcccaggcta ccacttccag aacaacaccg gcatcacctt ctcggatacg  3060
acgatcatca acagcggcac cagccaggat ctgtacaacg gcgagcgcgg agcgattgat  3120
ctggaagcat ccaacgacgc gatcaaaaac gtcaccttca ccaacatcga catcatcaat  3180
gcccagcgcg acggcgttca gatcggctat ggcggcggct tcgagaacat cgtgttcaac  3240
aacatcacga tcgacggcac cggccgcgac gggatatcga catcccgctt ctcgggacct  3300
catcttggcg cagccatcta tacgtacacg ggcaacggct cggcgacgtt caacaacctg  3360
gtgacccgga acatcgccta tgcaggcggc aactacatcc agagcgggtt caacctgacg  3420
atctaa                                                            3426

SEQ ID NO: 24          moltype = AA  length = 1141
FEATURE                Location/Qualifiers
source                 1..1141
                       mol_type = protein
                       organism = Paenibacillus humicus
SEQUENCE: 24
MRSKKLWISL LFALTLIFTM AFSNMSASAA GGANLTLGKT VTASGQSQTY SPDNVKDSNQ  60
GTYWESTNNA FPQWIQVDLG ASTSIDQIVL KLPSGWETRT QTLSIQGSAN GSTFTNIVGS  120
AGYTFNPSVA GNSVTINFSA ASARYVRLNF TANTGWPAGQ LSELEIYGAT APTPTPTPTP  180
TPTPTPTPTP TPTVTPAPSA TPTPTPPAGS NIAVGKSITA SSSTQTYVAA NANDNNTSTY  240
WEGGSNPSTL TLDFGSNQSI TSVVLKLNPA SEWGTRTQTI QVLGADQNAG SFSNLVSAQS  300
YTFNPATGNT VTIPVSATVK RLQLNITANS GAPAGQIAEF QVFGTPAPNP DLTITGMSWT  360
PSSPVESGDI TLNAVVKNIG TAAAGATTVN FYLNNELAGT APVGALAAGA SANVSINAGA  420
KAAATYAVSA KVDESNAVIE QNEGNNSYSN PTNLVVAPVS SSDLVAVTSW SPGTPSQGAA  480
VAFTVALKNQ GTLASAGGAH PVTVVLKNAA GATLQTFTGT YTGSLAAGAS ANISVGSWTA  540
```

-continued

```
ASGTYTVSTT VAADGNEIPA KQSNNTSSAS LTVYSARGAS MPYSRYDTED AVLGGGAVLR  600
TAPTFDQSLI ASEASGQKYA ALPSNGSSLQ WTVRQGQGGA GVTMRFTMPD TSDGMGQNGS  660
LDVYVNGTKA KTVSLTSYYS WQYFSGDMPA DAPGGGRPLF RFDEVHFKLD TALKPGDTIR  720
VQKGGDSLEY GVDFIEIEPI PAAVARPANS VSVTEYGAVA NDGKDDLAAF KAAVTAAVAA  780
GKSLYIPEGT FHLSSMWEIG SATSMIDNFT VTGAGIWYTN IQFTNPNASG GGISLRIKGK  840
LDFSNIYMNS NLRSRYGQNA VYKGFMDNFG TNSIIHDVWV EHFECGMWVG DYAHTPAIYA  900
SGLVVENSRI RNNLADGINF SQGTSNSTVR NSSIRNNGDD GLAVWTSNTN GAPAGVNNTF  960
SYNTIENNWR AAAIAFFGGS GHKADHNYII DCVGGSGIRM NTVFPGYHFQ NNTGITFSDT  1020
TIINSGTSQD LYNGERGAID LEASNDAIKN VTFTNIDIIN AQRDGVQIGY GGGFENIVFN  1080
NITIDGTGRD GISTSRFSGP HLGAAIYTYT GNGSATFNNL VTRNIAYAGG NYIQSGFNLT  1140
I                                                                 1141

SEQ ID NO: 25          moltype = AA  length = 26
FEATURE                Location/Qualifiers
source                 1..26
                       mol_type = protein
                       organism = Bacillus subtilis
SEQUENCE: 25
MRSKKLWISL LFALTLIFTM AFSNMS                                      26

SEQ ID NO: 26          moltype = DNA  length = 1308
FEATURE                Location/Qualifiers
source                 1..1308
                       mol_type = unassigned DNA
                       organism = Penicillium marneffei
SEQUENCE: 26
atgaagcaaa ccacttccct cctcctctca gccatcgcgg caaccagcag cttcagcgga  60
ctaacagccg ctcaaaaact cgcctttgcg cacgtcgtcg tcggcaacac tgcagcacac  120
acccaatcca cctgggaaag cgacattact ctcgcccata actccggtct agatgccttt  180
gccttgaacg gtggattccc cgatggcaac atccccgcac aaatcgccaa cgcttttgcg  240
gcttgtgaag ccctttcaaa tggcttcaag ctattcattt cgtttgacta cctcggtggt  300
ggtcagccct ggcctgcctc agaggttgtg tctatgctga agcagtatgc cagttccgat  360
tgttatttgg cctatgatgg caagcccttt gtctcaactt ttgagggcac cggaaatatt  420
gcggattggg cgcacggagg tcccattcgg tcggcggtgg atgtttactt tgtgccggat  480
tggacgagtt tggggcctgc tgggattaag tcgtatctcg acaatatcga tggatttttc  540
agctggaaca tgtggcctgt aggtgcggcc gatatgaccg acgagcctga tttcgaatgg  600
ctcgatgcaa ttgggtccga caagacgtac atgatgggcg tttcgccatg gttcttccac  660
agtgcaagcg gaggcaccga ctgggtctgg cgtggtgatg acctctggga tgaccgatgg  720
attcaagtca cctgcgtcga ccctcaattt gtccaggtcg tcacatggaa cgactggggt  780
gaatcctcct acatcggccc cttcgtgacc gctagcgaag tccccgccgg ctcattagcc  840
tacgtcgaca acatgtcaca ccaaagcttc cttgacttct tgcctttcta catcgccacc  900
ttcaaaggcg acacattcaa catctcccgc gaccagatgc aatactggta ccgcctcgca  960
cccgccgcag caggcagcgc gtgcggcgta tacggcaatg atcccgatca aggccagact  1020
accgttgacg tcaactccat cgttcaggac aaggtgtttt tcagtgcttt gttgacggct  1080
gatgctactg taacggtgca gattggtagt aatgctgcgg tttcatatga tggtgttgct  1140
ggtatgaacc actggagtca ggactttaat ggccagaccg gcgcggttac gtttagtgtt  1200
gtcaggggtg gcgctacagt taagagtggt attggagccg agattacggc ttcgacttcg  1260
ttgtcgaatg ggtgcactaa ttacaaccct tgggttggta gtttctaa              1308

SEQ ID NO: 27          moltype = AA  length = 435
FEATURE                Location/Qualifiers
source                 1..435
                       mol_type = protein
                       organism = Penicillium marneffei
SEQUENCE: 27
MKQTTSLLLS AIAATSSFSG LTAAQKLAFA HVVVGNTAAH TQSTWESDIT LAHNSGLDAF  60
ALNGGFPDGN IPAQIANAFA ACEALSNGFK LFISFDYLGG GQPWPASEVV SMLKQYASSD  120
CYLAYDGKPF VSTFEGTGNI ADWAHGGPIR SAVDVYFVPD WTSLGPAGIK SYLDNIDGFF  180
SWNMWPVGAA DMTDEPDFEW LDAIGSDKTY MMGVSPWFFH SASGGTDWVW RGDDLWDDRW  240
IQVTCVDPQF VQVVTWNDWG ESSYIGPFVT ASEVPAGSLA YVDNMSHQSF LDFLPFYIAT  300
FKGDTFNISR DQMQYWYRLA PAAAGSACGV YGNDPDQGQT TVDVNSIVQD KVFFSALLTA  360
DATVTVQIGS NAAVSYDGVA GMNHWSQDFN GQTGAVTFSV VRGGATVKSG IGAEITASTS  420
LSNGCTNYNP WVGSF                                                  435

SEQ ID NO: 28          moltype = DNA  length = 1929
FEATURE                Location/Qualifiers
source                 1..1929
                       mol_type = unassigned DNA
                       organism = Aspergillus nidulans
SEQUENCE: 28
atgaagctca gcacatttct ctctgctctg ggagctcttc cccagctgat ctcggctgcc  60
ccgaatgcag tcgctaacaa acccaggcag tcctcggacg accggcttgt ctttgctcac  120
ttcatgattg gaatcgtcag caaccgcaat tccgcagccg actacgacga tgatatgaaa  180
cgtgccaagt ctctcggaat cgatgctttc gcgttgaaca tcggggttga tccctacacc  240
gaccagcaac tcaatctcgc ctatcagtcc gctgccaaca atgacatgaa agtcttcata  300
tcgttcgatt tcaactggta taacaccggc caaggatacc aggttgggca gaagatcgcc  360
caatacgcga acctcccagc gcagcttaag gtcgacggca aagtctttgt ctcctcgttt  420
gcaggggacg gtcttgatat cgcggcgatg cgtcaggccg ccggacagga catctactgg  480
gctccaaact accatccaga gtacggcact aacctggatg gtgtcgatgg cttgctcaat  540
```

-continued

```
tggatggctt ggcctaatga tggcaacaac aaggcaccgc gtcctggagc ctccgtttcg  600
gtggaagagg gcgatgagat gtatatcaga actggaaagg actacattgc tcctgcttct  660
ccctggttct tcacccattt cggccctgaa gtcccgtaca gcaagaactg ggtcttccct  720
ggagatttgt tgtggtatga ccgctggcag caactgttga ccatgggccc acgattcatc  780
gagatcgtca cctggaacga ttacggcgag tcgcactata tcggcccatt gagctcacct  840
cacactgatg atggggcatc caagtgggtg aatgacatgc cccatgatgg atggatggat  900
atgtctaagc cgttcatcgc cgcgtacaag gacggcgcca cctcggttga tgactatatc  960
accgaagacc ttctcgtgta ctggtatcgc ccggctcccc gtgatgtcaa ctgcgatgcc  1020
acagatactt gcatggtccc cgccaacaat gccagtggca attacttcta tggccgcccg  1080
aatggctggg aaacgatgga agacgctgtg ttcgtggtca ccaccctgac tgagcccgcc  1140
actgtgacgg tcaattctgg aggcaatgtc gaggtctttg atgcgcccgc tggagccagc  1200
gctttcaagg tcccgatggg cgtgggctcg caggcgtttt cgctcagtcg taacggacag  1260
gtcatccagt cggatatcag tcttctgccc atcattgatg gctgcgtttg cggactgtac  1320
aatttcaatc cttacgttgg gtctctcccg ccgagtccta ttgactctct cgagcccgca  1380
ggtctctaca gtctcacgca aggccttcat gtacaaacgt gtttgccaac gccttcactc  1440
ggcaagacaa ccccaacacc gcctccaggc tggggagctg ctccaacgac tacaaggacc  1500
tcgtctacaa ccggcacgac cggcacaact acaagaacca cgcggacgac cacgcgcacc  1560
acgacgacga gaccaaccac cagtaccagc actagcacaa ccaccaggac aacgacaacc  1620
accagaccaa ccacaaccac ccggacgacg acaaccacaa acccaaccgg cggcaccgga  1680
aatgtctgcg tcgccggcac aggaccgggc aactatgtcg gtctatgcag tttctgctgc  1740
aacttcggtt actgccctcc aggaccatgc acctgtacgg cctatggagc gcccgtgccg  1800
acgccgccga cgacgggtgt ccggggtgtg ccgctgccgt ggctggagaa ctataactcg  1860
tacctggggc tatgcagctt tgcttgtgat cacggatact gtccgccgac tgcctgccag  1920
gttgcttaa                                                          1929

SEQ ID NO: 29           moltype = AA  length = 642
FEATURE                 Location/Qualifiers
source                  1..642
                        mol_type = protein
                        organism = Aspergillus nidulans
SEQUENCE: 29
MKLSTFLSAL GALPQLISAA PNAVANKPRQ SSDDRLVFAH FMIGIVSNRN SAADYDDDMK  60
RAKSLGIDAF ALNIGVDPYT DQQLNLAYQS AANNDMKVFI SFDFNWYNTG QGYQVGQKIA  120
QYANLPAQLK VDGKVFVSSF AGDGLDIAAM RQAAGQDIYW APNYHPEYGT NLDGVDGLLN  180
WMAWPNDGNN KAPRPGASVS VEEGDEMYIR TGKDYIAPAS PWFFTHFGPE VPYSKNWVFP  240
GDLLWYDRWQ QLLTMGPRFI EIVTWNDYGE SHYIGPLSSP HTDDGASKWV NDMPHDGWMD  300
MSKPFIAAYK DGATSVDDYI TEDLLVYWYR PAPRDVNCDA TDTCMVPANN ASGNYFYGRP  360
NGWETMEDAV FVVTTLTEPA TVTVNSGGNV EVFDAPAGAS AFKVPMGVGS QAFSLSRNGQ  420
VIQSDISLLP IIDGCVCGLY NFNPYVGSLP PSPIDSLEPA GLYSLTQGLH VQTCLPTPSL  480
GKTTPTPPPG WGAAPTTTRT SSTTGTTGTT TRTTRTTTRT TTTRPTTSTS TSTTTRTTTT  540
TRPTTTTRTT TTTNPTGGTG NVCVAGTGPG NYVGLCSFCC NFGYCPPGPC TCTAYGAPVP  600
TPPTTGVRGV PLPWLENYNS YLGLCSFACD HGYCPPTACQ VA                     642

SEQ ID NO: 30           moltype = DNA  length = 22
FEATURE                 Location/Qualifiers
misc_feature            1..22
                        note = primer
source                  1..22
                        mol_type = other DNA
                        organism = synthetic construct
SEQUENCE: 30
caccatgttt ggtcttgtcc gc                                           22

SEQ ID NO: 31           moltype = DNA  length = 20
FEATURE                 Location/Qualifiers
misc_feature            1..20
                        note = primer
source                  1..20
                        mol_type = other DNA
                        organism = synthetic construct
SEQUENCE: 31
tcagcagtac tggcatgctg                                              20

SEQ ID NO: 32           moltype = DNA  length = 20
FEATURE                 Location/Qualifiers
misc_feature            1..20
                        note = primer
misc_difference         3
                        note = n is a, c, g, or t
source                  1..20
                        mol_type = other DNA
                        organism = synthetic construct
SEQUENCE: 32
gtnttytgyc ayttyatgat                                              20

SEQ ID NO: 33           moltype = DNA  length = 27
FEATURE                 Location/Qualifiers
misc_feature            1..27
                        note = primer
```

-continued

```
misc_difference        3
                       note = n is a, c, g, or t
misc_difference        25
                       note = n is a, c, g, or t
source                 1..27
                       mol_type = other DNA
                       organism = synthetic construct
SEQUENCE: 33
gtnttytgya cayttyatga thggnat                                            27

SEQ ID NO: 34          moltype = DNA  length = 23
FEATURE                Location/Qualifiers
misc_feature           1..23
                       note = primer
source                 1..23
                       mol_type = other DNA
                       organism = synthetic construct
SEQUENCE: 34
gaytaygayg aygayatgca rcg                                                23

SEQ ID NO: 35          moltype = DNA  length = 32
FEATURE                Location/Qualifiers
misc_feature           1..32
                       note = primer
modified_base          12
                       mod_base = i
modified_base          15
                       mod_base = i
modified_base          18
                       mod_base = i
modified_base          21
                       mod_base = i
misc_difference        30
                       note = n is a, c, g, or t
source                 1..32
                       mol_type = other DNA
                       organism = synthetic construct
SEQUENCE: 35
gtrcayttrc anggnccngg nggrcartan cc                                      32

SEQ ID NO: 36          moltype = DNA  length = 24
FEATURE                Location/Qualifiers
misc_feature           1..24
                       note = primer
modified_base          4
                       mod_base = i
modified_base          7
                       mod_base = i
misc_difference        10
                       note = n is a, c, g, or t
misc_difference        13
                       note = n is a, c, g, or t
misc_difference        19
                       note = n is a, c, g, or t
source                 1..24
                       mol_type = other DNA
                       organism = synthetic construct
SEQUENCE: 36
ytcnccnggn agnggrcanc crtt                                               24

SEQ ID NO: 37          moltype = DNA  length = 30
FEATURE                Location/Qualifiers
misc_feature           1..30
                       note = primer
modified_base          13
                       mod_base = i
source                 1..30
                       mol_type = other DNA
                       organism = synthetic construct
SEQUENCE: 37
rcartaytgr cangcygtyg gyggrcarta                                         30

SEQ ID NO: 38          moltype = DNA  length = 20
FEATURE                Location/Qualifiers
misc_feature           1..20
                       note = primer
source                 1..20
                       mol_type = other DNA
                       organism = synthetic construct
```

-continued

```
SEQUENCE: 38
ccccctggcc aagtatgtgt                                          20

SEQ ID NO: 39          moltype = DNA  length = 20
FEATURE                Location/Qualifiers
misc_feature           1..20
                       note = primer
source                 1..20
                       mol_type = other DNA
                       organism = synthetic construct
SEQUENCE: 39
gtacgcaaag ttgagctgct                                          20

SEQ ID NO: 40          moltype = DNA  length = 20
FEATURE                Location/Qualifiers
misc_feature           1..20
                       note = primer
source                 1..20
                       mol_type = other DNA
                       organism = synthetic construct
SEQUENCE: 40
agcacatcgc tgatggatat                                          20

SEQ ID NO: 41          moltype = DNA  length = 20
FEATURE                Location/Qualifiers
misc_feature           1..20
                       note = primer
source                 1..20
                       mol_type = other DNA
                       organism = synthetic construct
SEQUENCE: 41
aagtatacgt tgcttccggc                                          20

SEQ ID NO: 42          moltype = DNA  length = 20
FEATURE                Location/Qualifiers
misc_feature           1..20
                       note = primer
source                 1..20
                       mol_type = other DNA
                       organism = synthetic construct
SEQUENCE: 42
ctgacgatcg gactrcacgt                                          20

SEQ ID NO: 43          moltype = DNA  length = 20
FEATURE                Location/Qualifiers
misc_feature           1..20
                       note = primer
source                 1..20
                       mol_type = other DNA
                       organism = synthetic construct
SEQUENCE: 43
cgttgtcgac gtagagctgt                                          20

SEQ ID NO: 44          moltype = DNA  length = 20
FEATURE                Location/Qualifiers
misc_feature           1..20
                       note = primer
source                 1..20
                       mol_type = other DNA
                       organism = synthetic construct
SEQUENCE: 44
acgatcggca gagtcatagg                                          20

SEQ ID NO: 45          moltype = DNA  length = 20
FEATURE                Location/Qualifiers
misc_feature           1..20
                       note = primer
source                 1..20
                       mol_type = other DNA
                       organism = synthetic construct
SEQUENCE: 45
atcggattgc atgtcacgac                                          20

SEQ ID NO: 46          moltype = DNA  length = 20
FEATURE                Location/Qualifiers
misc_feature           1..20
                       note = primer
source                 1..20
                       mol_type = other DNA
```

```
                       organism = synthetic construct
SEQUENCE: 46
tacatccaga ccgtcaccag                                              20

SEQ ID NO: 47          moltype = DNA  length = 20
FEATURE                Location/Qualifiers
misc_feature           1..20
                       note = primer
source                 1..20
                       mol_type = other DNA
                       organism = synthetic construct
SEQUENCE: 47
acgtttgctc ttgcggtatc                                              20

SEQ ID NO: 48          moltype = DNA  length = 20
FEATURE                Location/Qualifiers
misc_feature           1..20
                       note = primer
source                 1..20
                       mol_type = other DNA
                       organism = synthetic construct
SEQUENCE: 48
tcattatccc aggcctaaaa                                              20

SEQ ID NO: 49          moltype = DNA  length = 21
FEATURE                Location/Qualifiers
misc_feature           1..21
                       note = primer
source                 1..21
                       mol_type = other DNA
                       organism = synthetic construct
SEQUENCE: 49
caccatgcta ggcattctcc g                                            21

SEQ ID NO: 50          moltype = DNA  length = 20
FEATURE                Location/Qualifiers
misc_feature           1..20
                       note = primer
source                 1..20
                       mol_type = other DNA
                       organism = synthetic construct
SEQUENCE: 50
tcagcagtat tggcatgccg                                              20

SEQ ID NO: 51          moltype = DNA  length = 21
FEATURE                Location/Qualifiers
misc_feature           1..21
                       note = primer
source                 1..21
                       mol_type = other DNA
                       organism = synthetic construct
SEQUENCE: 51
caccatgttg ggcgtttttc g                                            21

SEQ ID NO: 52          moltype = DNA  length = 20
FEATURE                Location/Qualifiers
misc_feature           1..20
                       note = primer
source                 1..20
                       mol_type = other DNA
                       organism = synthetic construct
SEQUENCE: 52
ctagcagtat tgrcatgccg                                              20

SEQ ID NO: 53          moltype = DNA  length = 1908
FEATURE                Location/Qualifiers
source                 1..1908
                       mol_type = unassigned DNA
                       organism = Hypocrea tawa
SEQUENCE: 53
atgttgggcg tttttcgccg cctcgggctc ggctcccttg ccgccgcagc tctgtcttct  60
ctcggcactg ccgctcccgc caatgttgct attcggtctc tcgaggaacg tgcttcttct  120
gccgaccgtc tcgtattctg tcacttcatg attggtattg ttggtgaccg tggcagctcg  180
gcagactatg atgatgatat gcaacgtgcc aaagccgctg gcattgacgc cttcgctctg  240
aatatcggcg ttgacggcta taccgaccag cagcttgggt atgcctatga ctctgccgat  300
cgtaatggca tgaaagtctt catttcattc gatttcaatt ggtggagccc cggcaatgca  360
gttggtgttg gccagaagat tgcgcagtat gccaaccgtc ccgcccagct atatgtcgat  420
aaccgtccat tcgcctcttc cttcgctggt gacggtctgg atgtaaatgc gttgcgcaat  480
gctgcaggct ccaacgttta ctttgtgccc aacttccacc ctggtcaatc ttctccctca  540
```

```
aacattgacg gcgccctgaa ctggatggcc tgggataatg atggaaacaa caaggcaccc  600
aagcaaggcc agacagtcac ggtggcagac ggcgacaacg cctacaagaa ttggttaggt  660
ggcaagcctt acctagcacc tgtctcacct tggtttttca cccatttcgg ccccgaagtt  720
tcatattcca agaactgggt tttcccaggt ggtgctctga tctataaccg gtggcaacag  780
gtcttgcagc aaggcttccc catggttgag attgttacat ggaatgacta cggcgagtct  840
cactacgtcg gcccacttaa gtctaagcat ttcgacgatg gcaactccaa atgggtcaat  900
gatatgcccc atgatggatt cctggatctt tcaaagccgt tcattgctgc ttataagaac  960
agggatactg acatctccaa gtatgttcag aatgagcagc ttgtctactg gtaccgccgc  1020
aacttaaagg cactggactg cgacgccacc gacaccacct ctaaccgccc ggctaataat  1080
ggaagcggta attactttat gggacgccct gatggttggc aaaccatgga tgatactgtt  1140
tatgttgccg cacttctcaa gactgccggt tctgttacgg tcacgtctgg cggcaccact  1200
caaacgttcc agggcaacgc cggagccaac ctcttccaaa tcccagccag catcggccag  1260
caaaagtttg ctctaactcg taacggtcag accgtcttta gcggaacctc attgatggat  1320
atcaccaacg tttgctcttg cggtatctac aacttcaacc catatgtggg taccattcct  1380
gccggcttcg acgaccctct tcaggctgac ggtcttttct ctttgaccat cggattgcat  1440
gtcacgactt gtcaggccaa gccatctctt ggaaccaatc ctcctgtcac ttctggccct  1500
gtgtcctcgc ttccagcttc ctccactacc cgcgcatcct cgcctcctgt ttcttcaact  1560
cgcgtctctt cccccccctgt ctcttcccct ccagttactt ctcgcacctc ttcttctcct  1620
ccccctccgg ccagcagcac gccgtcatcg ggtcaggttt gcgttgccgg aaccgttgct  1680
gacggcgagt ctggcaacta catcggcctg tgccaattca gctgcaacta cggttactgc  1740
ccaccaggac cgtgcaagtg caccgccttt ggcgctccca tctcgccacc ggcaagcaat  1800
gggcgcaatg gctgccctct accgggcgaa ggagatggtt atctgggcct gtgcagtttc  1860
agttgtaacc ataattactg ccccccaacg gcatgccaat actgctag               1908
```

```
SEQ ID NO: 54          moltype = AA  length = 635
FEATURE                Location/Qualifiers
source                 1..635
                       mol_type = protein
                       organism = Hypocrea tawa
SEQUENCE: 54
MLGVFRRLGL GSLAAAALSS LGTAAPANVA IRSLEERASS ADRLVFCHFM IGIVGDRGSS  60
ADYDDDMQRA KAAGIDAFAL NIGVDGYTDQ QLGYAYDSAD RNGMKVFISF DFNWWSPGNA  120
VGVGQKIAQY ANRPAQLYVD NRPFASSFAG DGLDVNALRN AAGSNVYFVP NFHPGQSSPS  180
NIDGALNWMA WDNDGNNKAP KQGQTVTVAD GDNAYKNWLG GKPYLAPVSP WFFTHFGPEV  240
SYSKNWVFPG GALIYNRWQQ VLQQGFPMVE IVTWNDYGES HYVGPLKSKH FDDGNSKWVN  300
DMPHDGFLDL SKPFIAAYKN RDTDISKYVQ NEQLVYWYRR NLKALDCDAT DTTSNRPANN  360
GSGNYFMGRP DGWQTMDDTV YVAALLKTAG SVTVTSGGTT QTFQGNAGAN LFQIPASIGQ  420
QKFALTRNGQ TVFSGTSLMD ITNVCSCGIY NFNPYVGTIP AGFDDPLQAD GLFSLTIGLH  480
VTTCQAKPSL GTNPPVTSGP VSSLPASSTT RASSPPVSST RVSSPPVSSP PVTSRTSSSP  540
PPPASSTPSS GQVCVAGTVA DGESGNYIGL CQFSCNYGYC PPGPCKCTAF GAPISPPASN  600
GRNGCPLPGE GDGYLGLCSF SCNHNYCPPT ACQYC                            635
```

```
SEQ ID NO: 55          moltype = DNA  length = 1884
FEATURE                Location/Qualifiers
source                 1..1884
                       mol_type = unassigned DNA
                       organism = Trichoderma konilangbra
SEQUENCE: 55
atgctaggca ttctccgccg tctcgcgctc ggcgccctcg ccgccgcggc cctctctcct  60
ctcgtcgtcg ccgcgcctgc caatgtcgcc atccgctccc tcgaggaacg ggcgagtagc  120
gcagacaggc tcgtgttctg ccacttcatg attgggatat gcggtgatcg cggctccagc  180
actgattatg acgacgatat gcaaagggcc aaggcagcgg gcatcgacgc gtttgcgttg  240
aacattggcg tcgatggata cacggaccag cagctcaact ttgcgtacga cgccgccgac  300
cgcgccggga tgaaggtgtt catctccttc gacttcaact ggtggagccc cggcaacgca  360
gtaggcgtcg gccagaagat tgcccaatac gcgtcgcggc ccgcacagct ctacgtcgac  420
aaccggccct ttgcgtcgtc gtttgccggc gatggccttg acgtgaatgc gctgcgcaac  480
gccgccggaa gcaacgtata ctttgtgccc aacttccacc ccgggcagtc ctccccgtca  540
accatcgacg gggccctcaa ctggatggcc tgggacaatg acggaaacaa caaggccccc  600
aagcccggcc gcaacgtcac cgtcgccgac ggcgacaact cgtaccgtag ctggctgggc  660
ggcaagccct acctggcccc cgtttcgccc tggttcttca cccacttcgg ccccgaggtt  720
tccttcagca agaactgggt cttcccgggc ggctcgctcc tctacgaccg ctggcaggac  780
gtgctgcrcc agggccccga aatggtcgag atcatcacct ggaacgatta cggtgagagc  840
cactacaccg ggcccctcaa aagtcgccac tatgacgacg gaaactcgaa atggaccaac  900
gacatgccgc acgacggatt cctggacctg tcgaaaccgt ttatagcggc gtacaagaac  960
cgcgacacga acgtggcacg gtacgtccag tccgaccagc tcgtctactg gtacagaagg  1020
acgctcaagg ggctggactg cgacgcgact gacacgacgt caaaccggcc cgcgaacaac  1080
gccagcggca actacttcat gggccggccc gacgggtggc agacgatgga cgacaccgtg  1140
tacgtggtgg cgctrctcac ggccgcggga actgtgacgg tgacgtccgg cggggccacc  1200
cagacgttcc agggcaccrc cggagccaac ctgttcgagg tcccggccaa cctgggccag  1260
cagaagtttg ccctgtcccg caacgggcag accgtcttca gcagcacatc gctgatggat  1320
atcgctaatg tgtgcccgtg cggcctctac aacttcaacc cgtatgtcgg gactgtcccg  1380
cccggttttg acgacccgct gcaggctgat ggccttgcgt cgctgacgat cggactgcac  1440
gtcacgacct gtcaggccag accctccctg ggaacgaacc cgcccatcac ttccggcccc  1500
ggctcctcgg tgcccgcttc aaccacccgc tcgacttctc cgcccggttc cacgagccgc  1560
ttctcgtcga ccccggtttc gtcccgctcc atctcttcga cgccaccggt cagcacgccg  1620
ccccctggcc aagtatgtgt ggccggcaca gtcgctgacg gccagtcggg caactatatt  1680
ggcctatgca acttcagctg caacttcggc tactgtcctc ccggcccttg caagtgcacc  1740
gcctttggcg ctcccatcaa cccaccggcg accaatgggc gaaacggatg ccccttgcct  1800
ggagaggatg atagttactt gggcctctgc agcttcagtt gcaaccataa ctactgccct  1860
```

```
ccgacggcat gccaatactg ctga                                       1884

SEQ ID NO: 56          moltype = AA  length = 627
FEATURE                Location/Qualifiers
SITE                   263
                       note = MISC_FEATURE - Xaa = Arg or His
SITE                   407
                       note = MISC_FEATURE - Xaa = Thr or Ala
source                 1..627
                       mol_type = protein
                       organism = Trichoderma konilangbra
SEQUENCE: 56
MLGILRRLAL GALAAAALSP LVVAAPANVA IRSLEERASS ADRLVFCHFM IGICGDRGSS  60
TDYDDDMQRA KAAGIDAFAL NIGVDGYTDQ QLNFAYDAAD RAGMKVFISF DFNWWSPGNA  120
VGVGQKIAQY ASRPAQLYVD NRPFASSFAG DGLDVNALRN AAGSNVYFVP NFHPGQSSPS  180
TIDGALNWMA WDNDGNNKAP KPGRNVTVAD GDNSYRSWLG GKPYLAPVSP WFFTHFGPEV  240
SFSKNWVFPG GSLLYDRWQD VLXQGPEMVE IITWNDYGES HYTGPLKSRH YDDGNSKWTN  300
DMPHDGFLDL SKPFIAAYKN RDTNVARYVQ SDQLVYWYRR TLKGLDCDAT DTTSNRPANN  360
ASGNYFMGRP DGWQTMDDTV YVVALLTAAG TVTVTSGGAT QTFQGTXGAN LFEVPANLGQ  420
QKFALSRNGQ TVFSSTSLMD IANVCPCGLY NFNPYVGTVP PGFDDPLQAD GLASLTIGLH  480
VTTCQARPSL GTNPPITSGP GSSVPASTTR STSPPGSTSR FSSTPVSSRS ISSTPPVSTP  540
PPGQVCVAGT VADGQSGNYI GLCNFSCNFG YCPPGPCKCT AFGAPINPPA TNGRNGCPLP  600
GEDDSYLGLC SFSCNHNYCP PTACQYC                                     627

SEQ ID NO: 57          moltype = DNA  length = 1869
FEATURE                Location/Qualifiers
source                 1..1869
                       mol_type = unassigned DNA
                       organism = Trichoderma reesei
SEQUENCE: 57
atgtttggtc ttgtccgccg actcggggtc ggcgcccttg tcgccgcagc cctttcctcc  60
ctcgctgccg ccgcgccagc caacgtcgcc atccgctccc tcgaggaacg ggctagcagc  120
gcagatagac ttgtgttttg ccactttatg attgggatat gtggtgatcg cacctccagt  180
accgattatg atgatgatat gcagcgagcc aaggccgcgg gcattgacgc ctttgccctt  240
aacattggtg tcgacggata cacggaccag cagctcaact ttgcctacga cgccgctgat  300
cgcgccggga tgaaggtgtt catctccttt gacttcaact ggtggagccc cggcaacgcg  360
gcaggcgtcg gccagaagat tgcccaatat gcgtcgcggc ccgcacagct ctacgtcgac  420
aaccgtccct ttgcatcgtc gtttgccggt gacggccttg acgtgaatac gctgcggaat  480
gcggccggca gcaacgtgta ctttgtgccc aacttccacc ccgggcagtc gtcgccgtcc  540
accatcgacg gggctctgaa ctggatggcc tgggacaacg acggcaacaa caaggccccc  600
aagcccggcc aaaacgtcac agtcgccgac ggcgacaact cctaccgcag ctggctcgcc  660
ggcaagccct acctcgcccc cgtctcgccc tggttcttca cccacttcgg cccagaggta  720
tcgtacagta agaactgggt cttccctggc ggctccctgt ggtacgaccg ctggcaggac  780
gtgctgcgcc agggcttcga gatggtcgaa atcgtcacct ggaacgatta cggtgagagc  840
cactacacgg ggcccctgga aagtcgacac tatgacgacg gaaactcgaa atggaccaac  900
gacatgccgc acgacggctt cctggacctg gcgaagccat tcattgccgc gtacaagaac  960
cgcgacacgg acgtggcgcc ctacatccag aatgagcagc tgatctactg gtatcggcgg  1020
aatctcaagg ggctggactg cgacgcgacc gacacgacgt cgaaccgccc ggcgaacaac  1080
ggcagcggca actacttcat gggtcggccc gacgggtggc agacgatgga cgacacggtg  1140
tatgtggtgg cgctgctcaa gagcgcgggc acggtgacgg tgacgtcggg cggcgccacg  1200
cagacgttcc agggcaccgc cggcgccaac ctgttcgagg tcccagccaa ccttgggcag  1260
cagaagtttg ccctgtcccg caacgggcag accgtcttca gcagcacgtc gctgatggat  1320
atcaccaatg tgtgcccgtg cggcatctac aacttcaacc cgtatgtcgg gactgtgccc  1380
gctggctttg acgacccgct cgggcccgat ggccttgctt ctttgacaat cggactgcac  1440
gtcacgactt gtcaggccaa gccgtcgctg gggaccaacc cgcccatcac ttccggcccc  1500
ggctcctcgg tgcccgtttc cactccgccc ggttccacga cccgcttctc gtcaacgccg  1560
gtttcatctc gctccagctc gtccacgccg ccggttagca cgccgccgcc tggccaagtc  1620
tgtgtcgccg gtacggtggc tgacggccag tccggcaact atattggcct ctgcaacttc  1680
agctgcaact tcgggtactg tccccccgga ccctgcaagt gcactgccta cggcgctccg  1740
atcaacccac cagcaacgaa tggggcgaaat gggtgcccct tgcctggaga agacgatagt  1800
tatctgggcc tctgcagctt cagctgcaac cacaattact gtccgccaac agcatgccag  1860
tactgctga                                                        1869

SEQ ID NO: 58          moltype = AA  length = 622
FEATURE                Location/Qualifiers
source                 1..622
                       mol_type = protein
                       organism = Trichoderma reesei
SEQUENCE: 58
MFGLVRRLGV GALVAAALSS LAAAAPANVA IRSLEERASS ADRLVFCHFM IGICGDRTSS  60
TDYDDDMQRA KAAGIDAFAL NIGVDGYTDQ QLNFAYDAAD RAGMKVFISF DFNWWSPGNA  120
AGVGQKIAQY ASRPAQLYVD NRPFASSFAG DGLDVNTLRN AAGSNVYFVP NFHPGQSSPS  180
TIDGALNWMA WDNDGNNKAP KPGQNVTVAD GDNSYRSWLA GKPYLAPVSP WFFTHFGPEV  240
SYSKNWVFPG GSLWYDRWQD VLRQGFEMVE IVTWNDYGES HYTGPLESRH YDDGNSKWTN  300
DMPHDGFLDL AKPFIAAYKN RDTDVAPYIQ NEQLIYWYRR NLKGLDCDAT DTTSNRPANN  360
GSGNYFMGRP DGWQTMDDTV YVVALLKSAG TVTVTSGGAT QTFQGTAGAN LFEVPANLGQ  420
QKFALSRNGQ TVFSSTSLMD ITNVCPCGIY NFNPYVGTVP AGFDDPLGPD GLASLTIGLH  480
VTTCQAKPSL GTNPPITSGP GSSVPVSTPP GSTTRFSSTP VSSRSSSTP PVSTPPPGQV  540
CVAGTVADGQ SGNYIGLCNF SCNFGYCPPG PCKCTAYGAP INPPATNGRN GCPLPGEDDS  600
```

```
YLGLCSFSCN HNYCPPTACQ YC                                         622

SEQ ID NO: 59          moltype = DNA  length = 8616
FEATURE                Location/Qualifiers
misc_feature           1..8616
                       note = plasmid pTrex
source                 1..8616
                       mol_type = other DNA
                       organism = synthetic construct
SEQUENCE: 59
aagcttaact agtacttctc gagctctgta catgtccggt cgcgacgtac gcgtatcgat  60
ggcgccagct gcaggcggcc gcctgcagcc acttgcagtc ccgtggaatt ctcacggtga  120
atgtaggcct tttgtagggt aggaattgtc actcaagcac ccccaacctc cattacgcct  180
cccccataga gttcccaatc agtgagtcat ggcactgttc tcaaatagat tggggagaag  240
ttgacttccg cccagagctg aaggtcgcac aaccgcatga tatagggtcg gcaacggcaa  300
aaaagcacgt ggctcaccga aaagcaagat gtttgcgatc taacatccag gaacctggat  360
acatccatca tcacgcacga ccactttgat ctgctggtaa actcgtattc gccctaaacc  420
gaagtgcgtg gtaaatctac acgtgggccc ctttcggtat actgcgtgtg tcttctctag  480
gtgccattct tttcccttcc tctagtgttg aattgtttgt gttggagtcc gagctgtaac  540
tacctctgaa tctctggaga atggtggact aacgactacc gtgcacctgc atcatgtata  600
taatagtgat cctgagaagg ggggtttgga gcaatgtggg actttgatgg tcatcaaaca  660
aagaacgaag acgcctcttt tgcaaagttt tgtttcggct acggtgaaga actggatact  720
tgttgtgtct tctgtgtatt tttgtggcaa caagaggcca gagacaatct attcaaacac  780
caagcttgct cttttgagct acaagaacct gtggggtata tatctagagt tgtgaagtcg  840
gtaatcccgc tgtatagtaa tacgagtcgc atctaaatac tccgaagctg ctgcgaaccc  900
ggagaatcga gatgtgctgg aaagcttcta gcgagcggct aaattagcat gaaaggctat  960
gagaaattct ggagacggct tgttgaatca tggcgttcca ttcttcgaca agcaaagcgt  1020
tccgtcgcag tagcaggcac tcattcccga aaaaactcgg agattcctaa gtagcgatgg  1080
aaccggaata atataatagg caatacattg agttgcctcg acggttgcaa tgcaggggta  1140
ctgagcttgg acataactgt tccgtacccc acctcttctc aacctttggc gtttccctga  1200
ttcagcgtac ccgtacaagt cgtaatcact attaacccag actgaccgga cgtgttttgc  1260
ccttcatttg gagaaataat gtcattgcga tgtgtaattt gcctgcttga ccgactgggg  1320
ctgttcgaag cccgaatgta ggattgttat ccgaactctg ctcgtagagg catgttgtga  1380
atctgtgtcg ggcaggacac gcctcgaagg ttcacggcaa gggaaaccac cgatagcagt  1440
gtctagtagc aacctgtaaa gccgcaatgc agcatcactg gaaaatacaa accaatggct  1500
aaaagtacat aagttaatgc ctaaagaagt catataccag cggctaataa ttgtacaatc  1560
aagtggctaa acgtaccgta atttgccaac ggcttgtggg gttgcagaag caacggcaaa  1620
gccccacttc cccacgtttg tttcttcact cagtccaatc tcagctggtg atcccccaat  1680
tgggtcgctt gtttgttccg gtgaagtgaa agaagacaga ggtaagaatg tctgactcgg  1740
agcgttttgc atacaaccaa gggcagtgat ggaagacagt gaaatgttga cattcaagga  1800
gtatttagcc agggatgctt gagtgtatcg tgtaaggagg tttgtctgcc gatacgacga  1860
atactgtata gtcacttctg atgaagtggt ccatattgaa atgtaagtcg gcactgaaca  1920
ggcaaaagat tgagttgaaa ctgcctaaga tctcgggccc tcgggccttc ggcctttggg  1980
tgtacatgtt tgtgctccgg gcaaatgcaa agtgtggtag gatcgaacac actgctgcct  2040
ttaccaagca gctgagggta tgtgataggc aaatgttcag gggccactgc atggtttcga  2100
atagaaagag aagcttagcc aagaacaata gccgataaag atagcctcat taaacggaat  2160
gagctagtag gcaaagtcag cgaatgtgta tatataaagg ttcgaggtcc gtgcctccct  2220
catgctctcc ccatctactc atcaactcag atcctccagg agacttgtac accatctttt  2280
gaggcacaga aacccaatag tcaaccgcgg actgcgcatc atgtatcgga agttggccgt  2340
catctcggcc ttcttggcca cacctcgtgc tagactaggc gcgccgcgcg ccagctccgt  2400
gcgaaagcct gacgcaccgg tagattcttg gtgagcccgt atcatgacgg cggcgggagc  2460
tacatggccc cgggtgattt attttttttg tatctacttc tgaccctttt caaatatacg  2520
gtcaactcat ctttcactgg agatgcggcc tgcttggtat tgcgatgttg tcagcttggc  2580
aaattgtggc tttcgaaaac acaaaacgat tccttagtag ccatgcattt taagataacg  2640
gaatagaaga aagaggaaat taaaaaaaaa aaaaaaacaa acatcccgtt cataacccgt  2700
agaatcgccg ctcttcgtgt atcccagtac cagtttattt tgaatagctc gcccgctgga  2760
gagcatcctg aatgcaagta acaaccgtag aggctgacac ggcaggtgtt gctagggagc  2820
gtcgtgttct acaaggccag acgtcttcgc ggttgatata tatgtatgtt tgactgcagg  2880
ctgctcagcg acgacagtca agttcgccct cgctgcttgt gcaataatcg cagtggggaa  2940
gccacaccgt gactcccatc tttcagtaaa gctctgttgg tgtttatcag caatacacgt  3000
aatttaaact cgttagcatg gggctgatag cttaattacc gtttaccagt gccatggttc  3060
tgcagctttc cttggcccgt aaaattcggc gaagccagcc aatcaccagc taggcaccag  3120
ctaaacccta taattagtct cttatcaaca ccatccgctc ccccgggatc aatgaggaga  3180
atgaggggga tgcggggcta aagaagccta cataaccctc atgccaactc ccagtttaca  3240
ctcgtcgagc caacatcctg actataagct aacacagaat gcctcaatcc tgggaagaac  3300
tggccgctga taagcgcgcc cgcctcgcaa aaaccatccc tgatgaatgg aaagtccaga  3360
cgctgcctgc ggaagacagc gttattgatt tcccaaagaa atcggggatc ctttcagagg  3420
ccgaactgaa gatcacagag gcctccgctg cagatcttgt gtccaagctg gcggccggag  3480
agttgacctc ggtggaagtt acgctagcat tctgtaaacg ggcagcaatc gcccagcagt  3540
tagtagggtc ccctctacct ctcagggaga tgtaacaacg ccaccttatg ggactatcaa  3600
gctgacgctg gcttctgtgc agacaaactg cgcccacgag ttcttccctg acgccgctct  3660
cgcgcaggca agggaactcg atgaatacta cgcaaagcac aagagacccg ttggtccact  3720
ccatggcctc cccatctctc tcaaagacca gcttcgagtc aaggtacacc gttgccccta  3780
agtcgttaga tgtccctttt tgtcagctaa catatgccac cagggctacg aaacatcaat  3840
gggctacatc tcatggctaa acaagtacga cgaaggggac tcggttctga caaccatgct  3900
ccgcaaagcc ggtgccgtct tctacgtcaa gacctctgtc ccgcagaccc tgatggtctg  3960
cgagacagtc aacaacatca tcgggcgcac cgtcaaccca cgcaacaaga actggtcgtg  4020
cggcggcagt tctggtggtg agggtgcgat cgttgggatt cgtggtggcg tcatcggtgt  4080
aggaacggat atcggtggct cgattcgagt gccggccgcg ttcaacttcc tgtacggtct  4140
```

```
aaggccgagt catgggcggc tgccgtatgc aaagatggcg aacagcatgg agggtcagga  4200
gacggtgcac agcgttgtcg ggccgattac gcactctgtt gagggtgagt ccttcgcctc  4260
ttccttcttt tcctgctcta taccaggcct ccactgtcct cctttcttgc tttttatact  4320
atatacgaga ccggcagtca ctgatgaagt atgttagacc tccgcctctt caccaaatcc  4380
gtcctcggtc aggagccatg gaaatacgac tccaaggtca tccccatgcc ctggcgccag  4440
tccgagtcgg acattattgc ctccaagatc aagaacggcg ggctcaatat cggctactac  4500
aacttcgacg gcaatgtcct tccacaccct cctatcctgc gcggcgtgga aaccaccgtc  4560
gccgcactcg ccaaagccgg tcacaccgtg accccgtgga cgccatacaa gcacgatttc  4620
ggccacgatc tcatctccca tatctacgcg gctgacggca gcgccgacgt aatgcgcgat  4680
atcagtgcat ccggcgagcc ggcgattcca aatatcaaag acctactgaa cccgaacatc  4740
aaagctgtta acatgaacga gctctgggac acgcatctcc agaagtggaa ttaccagatg  4800
gagtaccttg agaaatggcg ggaggctgaa gaaaaggccg ggaaggaact ggacgccatc  4860
atcgcgccga ttacgcctac cgctgcggta cggcatgacc agttccggta ctatgggtat  4920
gcctctgtga tcaacctgct ggatttcacg agcgtggttg ttccggttac ctttgcggat  4980
aagaacatcg ataagaagaa tgagagtttc aaggcggtta gtgagcttga tgccctcgtg  5040
caggaagagt atgatccgga ggcgtaccat ggggcaccgg ttgcagtgca ggttatcgga  5100
cggagactca gtgaagagag gacgttggcg attgcagagg aagtggggaa gttgctggga  5160
aatgtggtga ctccatagct aataagtgtc agatagcaat ttgcacaaga aatcaatacc  5220
agcaactgta aataagcgct gaagtgacca tgccatgcta cgaaagagca gaaaaaaacc  5280
tgccgtagaa ccgaagagat atgacacgct tccatctctc aaaggaagaa tcccttcagg  5340
gttgcgtttc cagtctagac acgtataacg gcacaagtgt ctctcaccaa atgggttata  5400
tctcaaatgt gatctaagga tggaaagccc agaatatcga tcgcgcgcag atccatatat  5460
agggcccggg ttataattac ctcaggtcga cgtcccatgg ccattcgaat tcgtaatcat  5520
ggtcatagct gtttcctgtg tgaaattgtt atccgctcac aattccacac aacatacgag  5580
ccggaagcat aaagtgtaaa gcctggggtg cctaatgagt gagctaactc acattaattg  5640
cgttgcgctc actgcccgct ttccagtcgg gaaacctgtc gtgccagctg cattaatgaa  5700
tcggccaacg cgcggggaga ggcggtttgc gtattgggcg ctcttccgct tcctcgctca  5760
ctgactcgct gcgctcggtc gttcggctgc ggcgagcggt atcagctcac tcaaaggcgg  5820
taatacggtt atccacagaa tcaggggata acgcaggaaa gaacatgtga gcaaaaggcc  5880
agcaaaaggc caggaaccgt aaaaaggccg cgttgctggc gtttttccat aggctccgcc  5940
cccctgacga gcatcacaaa aatcgacgct caagtcagag gtggcgaaac ccgacaggac  6000
tataaagata ccaggcgttt ccccctggaa gctccctcgt gcgctctcct gttccgaccc  6060
tgccgcttac cggatacctg tccgcctttc tcccttcggg aagcgtggcg ctttctcata  6120
gctcacgctg taggtatctc agttcggtgt aggtcgttcg ctccaagctg ggctgtgtgc  6180
acgaaccccc cgttcagccc gaccgctgcg ccttatccgg taactatcgt cttgagtcca  6240
acccggtaag acacgactta tcgccactgg cagcagccac tggtaacagg attagcagag  6300
cgaggtatgt aggcggtgct acagagttct tgaagtggtg gcctaactac ggctacacta  6360
gaagaacagt atttggtatc tgcgctctgc tgaagccagt taccttcgga aaaagagttg  6420
gtagctcttg atccggcaaa caaaccaccg ctggtagcgg tggttttttt gtttgcaagc  6480
agcagattac gcgcagaaaa aaaggatctc aagaagatcc tttgatcttt tctacggggt  6540
ctgacgctca gtggaacgaa aactcacgtt aagggatttt ggtcatgaga ttatcaaaaa  6600
ggatcttcac ctagatcctt ttaaattaaa aatgaagttt taaatcaatc taaagtatat  6660
atgagtaaac ttggtctgac agttaccaat gcttaatcag tgaggcacct atctcagcga  6720
tctgtctatt tcgttcatcc atagttgcct gactccccgt cgtgtagata actacgatac  6780
gggagggctt accatctggc cccagtgctg caatgatacc gcgagaccca cgctcaccgg  6840
ctccagattt atcagcaata aaccagccag ccggaagggc cgagcgcaga agtggtcctg  6900
caactttatc cgcctccatc cagtctatta attgttgccg ggaagctaga gtaagtagtt  6960
cgccagttaa tagtttgcgc aacgttgttg ccattgctac aggcatcgtg gtgtcacgct  7020
cgtcgtttgg tatggcttca ttcagctccg gttcccaacg atcaaggcga gttacatgat  7080
cccccatgtt gtgcaaaaaa gcggttagct ccttcggtcc tccgatcgtt gtcagaagta  7140
agttggccgc agtgttatca ctcatggtta tggcagcact gcataattct cttactgtca  7200
tgccatccgt aagatgcttt tctgtgactg gtgagtactc aaccaagtca ttctgagaat  7260
agtgtatgcg gcgaccgagt tgctcttgcc cggcgtcaat acgggataat accgcgccac  7320
atagcagaac tttaaaagtg ctcatcattg gaaaacgttc ttcggggcga aaactctcaa  7380
ggatcttacc gctgttgaga tccagttcga tgtaacccac tcgtgcaccc aactgatctt  7440
cagcatcttt tactttcacc agcgtttctg ggtgagcaaa aacaggaagg caaaatgccg  7500
caaaaaaggg aataagggcg acacggaaat gttgaatact catactcttc ctttttcaat  7560
attattgaag catttatcag ggttattgtc tcatgagcgg atacatattt gaatgtattt  7620
agaaaaataa acaaataggg gttccgcgca catttccccg aaaagtgcca cctgacgtct  7680
aagaaaccat tattatcatg acattaacct ataaaaatag gcgtatcacg aggccctttc  7740
gtctcgcgcg tttcggtgat gacggtgaaa acctctgaca catgcagctc ccggagacgg  7800
tcacagcttg tctgtaagcg gatgccggga gcagacaagc ccgtcagggc gcgtcagcgg  7860
gtgttggcgg gtgtcggggc tggcttaact atgcggcatc agagcagatt gtactgagag  7920
tgcaccataa aattgtaaac gttaatattt tgttaaaatt cgcgttaaat ttttgttaaa  7980
tcagctcatt ttttaaccaa taggccgaaa tcggcaaaat cccttataaa tcaaaagaat  8040
agcccgagat agggttgagt gttgttccag tttggaacaa gagtccacta ttaaagaacg  8100
tggactccaa cgtcaaaggg cgaaaaaccg tctatcaggg cgatggccca ctacgtgaac  8160
catcacccaa atcaagtttt ttggggtcga ggtgccgtaa agcactaaat cggaacccta  8220
aagggagccc ccgatttaga gcttgacggg gaaagccggc gaacgtggcg agaaaggaag  8280
ggaagaaagc gaaaggagcg ggcgctaggg cgctggcaag tgtagcggtc acgctgcgcg  8340
taaccaccac acccgccgcg cttaatgcgc cgctacaggg cgcgtactat ggttgctttg  8400
acgtatgcgg tgtgaaatac cgcacagatg cgtaaggaga aaataccgca tcaggcgcca  8460
ttcgccattc aggctgcgca actgttggga agggcgatcg gtgcgggcct cttcgctatt  8520
acgccagctg gcgaaagggg gatgtgctgc aaggcgatta agttgggtaa cgccagggtt  8580
ttcccagtca cgacgttgta aaacgacggc cagtgc                            8616
```

```
SEQ ID NO: 60          moltype = DNA  length = 4047
FEATURE                Location/Qualifiers
source                 1..4047
```

-continued

```
                        mol_type = unassigned DNA
                        organism = Streptococcus oralis
SEQUENCE: 60
atgatcgacg gcaaaaacta ctacgtacag gatgatggca cggtaaagaa gaatttcgcg  60
gtagaactga atggtcgtat cctgtatttt gatgcagaaa ccggcgctct ggttgatagc  120
aacgagtatc agttccaaca gggtacgagc agcctgaaca atgaattttc tcagaagaac  180
gcattctatg gtacgaccga taaggatatt gagactgtgg atggctacct gaccgcagat  240
agctggtatc gcccgaaatt catcctgaag gatggcaaga cgtggaccgc gagcacggaa  300
acggatctgc gtccgctgtt gatggcatgg tggccggaca agcgtaccca aatcaactat  360
ctgaactaca tgaaccagca gggtctgggt gcgggtgcgt ttgagaacaa agtggagcag  420
gccctgctga cgggtgcaag ccaacaggta caacgcaaga tcgaagagaa gattggtaaa  480
gagggtgata ccaagtggct gcgcaccctg atgggtgcgt tcgtgaaaac gcaaccaaac  540
tggaatatca aaaccgagtc tgaaacgacc ggcacgaaaa aggaccatct gcaaggcggt  600
gcactgctgt atacgaacaa cgagaaatcc ccgcacgcgg acagcaaatt tcgtctgctg  660
aatcgtaccc cgaccagcca aaccggcacg ccgaagtatt tcatcgacaa gtctaacggt  720
ggctacgaat ttctgctggc gaacgatttt gacaatagca atcctgcggt acaagctgag  780
cagctgaatt ggctgcacta catgatgaac tttggcagca ttgttgcgaa tgatccgacc  840
gcgaatttcg acggcgttcg tgtggatgct gttgataacg tcaatgcgga cttgttgcaa  900
attgcaagcg attactttaa gagccgttac aaagtcggtg agagcgaaga agaagcgatc  960
aagcacctgt ccatcctgga agcatggagc gataacgacc cggactacaa caaagatacc  1020
aagggtgcac agttggcgat tgataacaaa ctgcgcctga gcctgctgta ctctttcatg  1080
cgtaatctga gcatccgtag cggtgttgaa ccgacgatta ccaatagcct gaatgaccgt  1140
tccagcgaaa agaagaacgg cgagcgtatg gcaaattaca tcttcgtgcg tgcccacgat  1200
agcgaggtcc aaacggtgat cgccgacatc attcgcgaaa acatcaatcc gaacaccgac  1260
ggcctgacgt ttacgatgga cgagctgaag caggcattca agatttacaa cgaggacatg  1320
cgcaaggcgg acaaaaagta tacccagttt aacattccta ccgcacacgc gctgatgctg  1380
tctaataagg attctattac ccgcgtgtac tatggtgatc tgtatactga cgatggtcag  1440
tacatggaga agaaaagccc gtatcacgat gcgattgacg ctctgctgcg tgcacgtatt  1500
aaatacgtcg cgggtggcca ggatatgaaa gtgacctata tgggcgtgcc gcgtgaagcg  1560
gataagtgga gctataacgg cattctgacc agcgtgcgct atggcacggg cgctaacgaa  1620
gccacggatg agggcactgc ggaaacgcgc acgcaaggta tggcagtgat tgcgagcaat  1680
aatccaaatc tgaaactgaa tgaatgggac aagttgcaag tcaacatggg tgcggcgcat  1740
aagaatcaat attaccgtcc ggttctgctg accactaagg acggtatcag ccgttatctg  1800
accgatgaag aagtgcctca gagcctgtgg aaaaagacgg acgcaaacgg tattctgacc  1860
ttcgacatga atgatattgc tggctacagc aacgtgcaag ttagcggtta cctggccgtc  1920
tgggtcccgg tcggtgcgaa ggcggatcaa gatgcgcgca cgaccgcatc caagaagaaa  1980
aatgcgtcgg gtcaggtgta cgaaagcagc gcggctctgg atagccagct gatttacgaa  2040
ggtttcagca actttcaaga ctttgccact cgcgatgatc agtacacgaa caaggtcatt  2100
gcgaaaaacg tgaatctgtt caaagaatgg ggtgtgacca gcttcgagct gccgccgcag  2160
tacgtgagca gccaagatgg cacctttctg gacagcatta tccaaaacgg ctatgcattt  2220
gaagaccgtt acgatatggc gatgagcaag aataacaagt atggtagcct gaaagacctg  2280
ttgaacgcgc tgcgcgcact gcacagcgtc aacattcaag caatcgccga ttgggtgccg  2340
gaccaaattt acaacttgcc gggcaaagag gtggtgaccg caactcgtgt caacaactac  2400
ggcacctacc gtgagggtgc tgaaatcaaa gaaaagctgt atgtcgccaa tagcaagacc  2460
aacgaaaccg atttccaagg taaatacggt ggtgcgttcc tggatgagct gaaggcgaag  2520
tacccggaga ttttcgagcg tgtccaaatc agcaacggcc aaaagatgac taccgatgaa  2580
aagatcacca aatggagcgc gaaatacttt aatggcacca atattctggg tcgtggcgcg  2640
tactatgtcc tgaaagattg ggccagcaat gattacctga cgaaccgtaa cggcgagatt  2700
gttttgccga agcaactggt taacaagaat agctataccg gctttgtcag cgacgcgaac  2760
ggcacgaagt tctattctac ctctggctac caggcgaaga acagcttcat tcaagacgaa  2820
aacggtaatt ggtattactt tgacaaacgt ggttatctgg ttacgggcgc acacgagatt  2880
gatggcaagc atgtctactt cctgaaaaac ggtatccaac tgcgtgacag catccgtgag  2940
gatgagaacg gtaatcaata ctattacgac cagaccggcg cacaagtgct gaaccgttac  3000
tacacgacgg acggtcagaa ttggcgctat ttcgatgcga aaggtgttat ggcacgcggc  3060
ctggtaaaga ttggtgacgg ccaacagttt ttcgatgaaa acggttacca ggtcaagggc  3120
aagattgtta gcgcaaaaga cggcaagctg cgctactttg ataaagactc tggcaatgct  3180
gtcattaatc gtttcgcgca gggtgacaat ccgagcgact ggtactattt cggtgtggaa  3240
tttgctaaac tgacgggttt gcaaaagatc ggccagcaga cgctgtattt tgaccaagac  3300
ggtaagcaag tcaaaggtaa gatcgtaact ctgtcggaca aaagcattcg ttacttcgat  3360
gccaacagcg gtgaaatggc ggttggcaag ttcgcggaag gtgcaaagaa tgagtggtat  3420
tatttcgata aaaccggcaa agcggttact ggtttgcaga aaattggtaa gcagaccctg  3480
tactttgacc aggacggtaa acaggttaaa ggcaaggttg tcacgctggc tgataaaagc  3540
atccgctact tcgacgcaga ctccggcgag atggcggtcg gtaagtttgc agagggtgcg  3600
aagaacgagt ggtactattt tgatcagact ggcaaggccg tgactggttt gcaaaagatt  3660
gacaagcaaa ccttgtactt cgaccaggac ggtaaacaag tcaagggtaa gattgtgacg  3720
ttgagcgaca agtcgatccg ttactttgat gctaatagcg gtgagatggc tactaacaaa  3780
ttcgtcgagg gctcgcagaa tgaatggtac tacttcgatc aagcgggtaa ggctgttacg  3840
ggcttgcaac aggtcggtca gcaaactctg tacttcaccc aggatggtaa gcaagtgaag  3900
ggtaaggtcg tggacgtgaa cggtgtttct cgttatttcg acgcaaactc cggtgacatg  3960
gctcgttcta aatggattca actggaagat ggcagctgga tgtatttcga ccgtgacggt  4020
cgtggccaga attttggccg taactaa                                     4047

SEQ ID NO: 61           moltype = AA  length = 1348
FEATURE                 Location/Qualifiers
source                  1..1348
                        mol_type = protein
                        organism = Streptococcus oralis
SEQUENCE: 61
MIDGKNYYVQ DDGTVKKNFA VELNGRILYF DAETGALVDS NEYQFQQGTS SLNNEFSQKN  60
```

-continued

AFYGTTDKDI ETVDGYLTAD SWYRPKFILK DGKTWTASTE TDLRPLLMAW WPDKRTQINY 120
LNYMNQQGLG AGAFENKVEQ ALLTGASQQV QRKIEEKIGK EGDTKWLRTL MGAFVKTQPN 180
WNIKTESETT GTKKDHLQGG ALLYTNNEKS PHADSKFRLL NRTPTSQTGT PKYFIDKSNG 240
GYEFLLANDF DNSNPAVQAE QLNWLHYMMN FGSIVANDPT ANFDGVRVDA VDNVNADLLQ 300
IASDYFKSRY KVGESEEEAI KHLSILEAWS DNDPDYNKDT KGAQLAIDNK LRLSLLYSFM 360
RNLSIRSGVE PTITNSLNDR SSEKKNGERM ANYIFVRAHD SEVQTVIADI IRENINPNTD 420
GLTFTMDELK QAFKIYNEDM RKADKKYTQF NIPTAHALML SNKDSITRVY YGDLYTDDGQ 480
YMEKKSPYHD AIDALLRARI KYVAGGQDMK VTYMGVPREA DKWSYNGILT SVRYGTGANE 540
ATDEGTAETR TQGMAVIASN NPNLKLNEWD KLQVNMGAAH KNQYYRPVLL TTKDGISRYL 600
TDEEVPQSLW KKTDANGILT FDMNDIAGYS NVQVSGYLAV WVPVGAKADQ DARTTASKKK 660
NASGQVYESS AALDSQLIYE GFSNFQDFAT RDDQYTNKVI AKNVNLFKEW GVTSFELPPQ 720
YVSSQDGTFL DSIIQNGYAF EDRYDMAMSK NNKYGSLKDL LNALRALHSV NIQAIADWVP 780
DQIYNLPGKE VVTATRVNNY GTYREGAEIK EKLYVANSKT NETDFQGKYG GAFLDELKAK 840
YPEIFERVQI SNGQKMTTDE KITKWSAKYF NGTNILGRGA YYVLKDWASN DYLTNRNGEI 900
VLPKQLVNKN SYTGFVSDAN GTKFYSTSGY QAKNSFIQDE NGNWYYFDKR GYLVTGAHEI 960
DGKHVYFLKN GIQLRDSIRE DENGNQYYYD QTGAQVLNRY YTTDGQNWRY FDAKGVMARG 1020
LVKIGDGQQF FDENGYQVKG KIVSAKDGKL RYFDKDSGNA VINRFAQGDN PSDWYYFGVE 1080
FAKLTGLQKI GQQTLYFDQD GKQVKGKIVT LSDKSIRYFD ANSGEMAVGK FAEGAKNEWY 1140
YFDKTGKAVT GLQKIGKQTL YFDQDGKQVK GKVVTLADKS IRYFDADSGE MAVGKFAEGA 1200
KNEWYYFDQT GKAVTGLQKI DKQTLYFDQD GKQVKGKIVT LSDKSIRYFD ANSGEMATNK 1260
FVEGSQNEWY YFDQAGKAVT GLQQVGQQTL YFTQDGKQVK GKVVDVNGVS RYFDANSGDM 1320
ARSKWIQLED GSWMYFDRDG RGQNFGRN 1348

SEQ ID NO: 62 moltype = DNA length = 3804
FEATURE Location/Qualifiers
source 1..3804
mol_type = unassigned DNA
organism = Streptococcus mutans
SEQUENCE: 62
atggtcaatg gcaaatacta ctactacaaa gaggacggta cgttgcagaa gaactacgca 60
ctgaacatta acggcaagac ctttttcttt gacgagactg gcgccctgag caataacacc 120
ctgccgagca agaaaggtaa catcaccaat aacgacaata ccaatagctt cgcgcaatac 180
aatcaggtgt attcgacgga tgcagcgaac ttcgaacatg tcgatcacta cctgacggcg 240
gagtcctggt atcgcccgaa gtatattctg aaagatggca agacgtggac tcagtccacg 300
gagaaagatt ttcgcccgtt gttgatgacc tggtggccgg atcaggaaac ccagcgtcag 360
tatgtaaact atatgaatgc ccagctgggt attcaccaga cctacaacac ggcgaccagc 420
ccgttgcaac tgaatctggc ggcacagacg atccagacca agattgaaga gaagatcacg 480
gcggagaaga acactaattg gctgcgtcaa acgatttcgg cctttgtcaa aacccagagc 540
gcgtggaact cggacagcga aaaaccgttt gacgatcatc tgcaaaaggg tgcactgctg 600
tactctaaca atagcaagtt gacctctcaa gctaatagca actaccgtat tctgaaccgt 660
accccaacca accaaaccgg caagaaagat ccgcgttata ccgctgaccg taccatcggt 720
ggttatgagt tcttgctggc gaacgatgtg gataatagca atcctgttgt tcaagcggaa 780
cagctgaact ggctgcactt cctgatgaac tttggcaata tctatgcaaa cgaccctgac 840
gccaactttg acagcatccg tgtagacgcc gtggacaacg tggatgcaga tttgttgcaa 900
atcgctggtg actatctgaa ggctgcaaag ggcatccata agaacgacaa agcagcgaac 960
gaccacctgt cgatcctgga agcatggagc tataatgaca ccccgtatct gcacgacgac 1020
ggtgacaaca tgatcaatat ggacaaccgt ctgcgtctga gcctgctgta tagcctggcg 1080
aagccgttga accagcgttc gggcatgaac ccgctgatca cgaacagcct ggttaaccgt 1140
accgatgaca acgcagaaac cgcagcggtc ccgagctaca gctttatccg tgcacacgat 1200
agcgaggttc aagacctgat tcgtaacatt attcgtgctg agattaatcc gaacgtcgtc 1260
ggttatagct tcacgatgga agagatcaag aaggcctttg agatttacaa caaggatctg 1320
ctggcgacgg aaaagaaata cacccactat aacaccgcgc tgagctacgc gctgctgctg 1380
accaataaga gcagcgttcc gcgtgtgtat tacggtgata tgtttactga cgacggtcag 1440
tacatggcac ataaaacgat caactacgag gctatcgaaa cgctgttgaa ggcgcgcatt 1500
aagtacgtgt ctggtggcca agcgatgcgt aatcaacagg tgggtaatag cgaaatcatt 1560
acgagcgtcc gctatggcaa gggcgcactg aaagcgacgg ataccggcga tcgtaccacg 1620
cgcaccagcg gcgttgcggt tattgaaggc aataacccga gcctgcgctt gaaggcgagc 1680
gaccgcgtcg ttgttaacat gggtgcagca cacaagaacc aggcatatcg tccgctgttg 1740
ctgaccactg ataatggcat caaagcgtat cacagcgatc aggaagctgc gggcctggtg 1800
cgctatacca atgatcgtgg tgaattgatc ttcacggcag ctgacattaa aggttatgca 1860
aatccgcaag tcagcggtta tctgggcgtc tgggtgccgg tcggcgcagc ggctgatcaa 1920
gacgtgcgtg tggccgcgag caccgcgcca tcgaccgacg gtaaaagcgt gcaccagaat 1980
gcggcgctgg acagccgtgt catgtttgag ggttttagca actttcaagc ctttgcaacg 2040
aagaaagaag agtacaccaa cgtcgtcatc gcgaagaacg tcgataagtt cgcggaatgg 2100
ggcgttaccg atttcgaaat ggcaccgcag tatgtgtcta gcaccgatgg ctcgtttctg 2160
gattccgtga tccaaaatgg ttatgcattt accgaccgct atgacctggg cattagcaag 2220
ccgaataagt atggtacggc ggatgatctg gttaaagcga tcaaggcgct gcattctaaa 2280
ggtattaagg ttatggccga ctgggttcca gatcagatgt atgctttccc ggaaaaagaa 2340
gtggtgacgg ccacccgcgt ggacaaatat ggtacgccgg tcgcgggcag ccagatcaaa 2400
aacactctgt atgtcgtgga tggcaaaagc tccggtaaag atcagcaagc gaaatatggc 2460
ggtgccttcc tggaagagtt gcaggcgaaa tacccggaac tgttcgcgcg taagcagatc 2520
agcactggtg ttccgatgga cccgagcgtg aagattaaac aatggtccgc gaaatacttt 2580
aacggcacga acatcctggg tcgtggtgcc ggctacgtgc tgaaagacca ggcaacgaat 2640
acgtacttta gcttggtgtc cgacaatacg tttctgccga agtctctggt caacccgaac 2700
cacggtacga gcagctctgt gaccggcctg gtgttcgatg gtaagggcta cgtgtactac 2760
tctaccagcg gttaccaggc caagaatacg ttcatcagcc tgggtaacaa ctggtattac 2820
ttcgacaata acggttacat ggtcacgggt gcgcagagca tcaacggtgc caactactat 2880
tttctgagca acggcattca gctgcgtaat gcgatttacg acaatggcaa taaggttctg 2940
agctactacg gtaatgacgg tcgtcgttat gagaatggct attacctgtt tggccaacag 3000

```
tggcgctact ttcaaaatgg tattatggcc gtcggtctga cccgtgtcca cggtgcggtg  3060
cagtattttg acgccagcgg cttccaagcc aagggccagt tcatcaccac tgcggacggt  3120
aaactgcgtt actttgaccg tgacagcggc aaccaaatca gcaatcgttt tgttcgtaac  3180
agcaagggtg aatggttttt gttcgatcat aacggcgtgg cggttaccgg caccgttact  3240
ttcaatggtc aacgtctgta ctttaagccg aacggtgttc aggcaaaggg tgagttcatt  3300
cgcgacgcgg atggtcactt gcgttactac gaccctaatt ccggtaatga ggttcgtaac  3360
cgtttcgtcc gcaactctaa gggcgaatgg ttcctgtttg accacaatgg catcgcagtc  3420
accggcgctc gtgtggtcaa cggccaacgc ttgtacttca aaagcaatgg cgtccaagct  3480
aagggtgagc tgattaccga acgtaagggc cgtattaagt attatgatcc taacagcggt  3540
aacgaagtgc gtaaccgcta cgtccgcacc agcagcggta attggtacta ttttggtaac  3600
gatggttacg cgctgatcgg ctggcatgtt gttgagggtc gtcgtgtgta ctttgatgag  3660
aacggtgtct atcgttacgc gagccacgac cagcgtaatc attggaacta cgactatcgt  3720
cgcgatttcg gtcgtggtag cagctccgct atccgtttcc gccatagccg taacggcttt  3780
ttcgacaact tcttccgctt ctaa                                          3804

SEQ ID NO: 63          moltype = AA  length = 1267
FEATURE                Location/Qualifiers
source                 1..1267
                       mol_type = protein
                       organism = Streptococcus mutans
SEQUENCE: 63
MVNGKYYYYK EDGTLQKNYA LNINGKTFFF DETGALSNNT LPSKKGNITN NDNTNSFAQY  60
NQVYSTDAAN FEHVDHYLTA ESWYRPKYIL KDGKTWTQST EKDFRPLLMT WWPDQETQRQ  120
YVNYMNAQLG IHQTYNTATS PLQLNLAAQT IQTKIEEKIT AEKNTNWLRQ TISAFVKTQS  180
AWNSDSEKPF DDHLQKGALL YSNNSKLTSQ ANSNYRILNR TPTNQTGKKD PRYTADRTIG  240
GYEFLLANDV DNSNPVVQAE QLNWLHFLMN FGNIYANDPD ANFDSIRVDA VDNVDADLLQ  300
IAGDYLKAAK GIHKNDKAAN DHLSILEAWS YNDTPYLHDD GDNMINMDNR LRLSLLYSLA  360
KPLNQRSGMN PLITNSLVNR TDDNAETAAV PSYSFIRAHD SEVQDLIRNI IRAEINPNVV  420
GYSFTMEEIK KAFEIYNKDL LATEKKYTHY NTALSYALLL TNKSSVPRVY YGDMFTDDGQ  480
YMAHKTINYE AIETLLKARI KYVSGGQAMR NQQVGNSEII TSVRYGKGAL KATDTGDRTT  540
RTSGVAVIEG NNPSLRLKAS DRVVVNMGAA HKNQAYRPLL LTTDNGIKAY HSDQEAAGLV  600
RYTNDRGELI FTAADIKGYA NPQVSGYLGV WVPVGAAADQ DVRVAASTAP STDGKSVHQN  660
AALDSRVMFE GFSNFQAFAT KKEEYTNVVI AKNVDKFAEW GVTDFEMAPQ YVSSTDGSFL  720
DSVIQNGYAF TDRYDLGISK PNKYGTADDL VKAIKALHSK GIKVMADWVP DQMYAFPEKE  780
VVTATRVDKY GTPVAGSQIK NTLYVVDGKS SGKDQQAKYG GAFLEELQAK YPELFARKQI  840
STGVPMDPSV KIKQWSAKYF NGTNILGRGA GYVLKDQATN TYFSLVSDNT FLPKSLVNPN  900
HGTSSSVTGL VFDGKGYVYY STSGYQAKNT FISLGNNWYY FDNNGYMVTG AQSINGANYY  960
FLSNGIQLRN AIYDNGNKVL SYYGNDGRRY ENGYYLFGQQ WRYFQNGIMA VGLTRVHGAV  1020
QYFDASGFQA KGQFITTADG KLRYFDRDSG NQISNRFVRN SKGEWFLFDH NGVAVTGTVT  1080
FNGQRLYFKP NGVQAKGEFI RDADGHLRYY DPNSGNEVRN RFVRNSKGEW FLFDHNGIAV  1140
TGARVVNGQR LYFKSNGVQA KGELITERKG RIKYYDPNSG NEVRNRYVRT SSGNWYYFGN  1200
DGYALIGWHV VEGRRVYFDE NGVYRYASHD QRNHWNYDYR RDFGRGSSSA IRFRHSRNGF  1260
FDNFFRF                                                             1267

SEQ ID NO: 64          moltype = DNA  length = 3864
FEATURE                Location/Qualifiers
source                 1..3864
                       mol_type = unassigned DNA
                       organism = Streptococcus mutans
SEQUENCE: 64
atgattgacg gcaaatacta ctacatcggc agcgacggtc agccaaagaa gaattttgcg  60
ttgacggtta acaataaagt cctgtatttt gacaagaaca cgggtgcgct gaccgacacc  120
agccaatatc agttcaaaca aggtctgacg aagctgaaca acgactacac ccctcacaat  180
cagattgtca actttgaaaa tactagcctg gaaactattg ataactatgt tactgccgac  240
tcttggtatc gtccgaaaga cattctgaag aacggtaaga cgtggaccgc gtcctctgag  300
agcgatctgc gtccgctgct gatgtcctgg tggcctgata agcagaccca gatcgcatac  360
ctgaactaca tgaaccaaca aggcttgggc actggcgaga actataccgc tgatagctct  420
caagagagcc tgaacctggc ggcacaaacc gttcaagtca aaatcgaaac caagatcagc  480
caaacgcaac agactcagtg gctgcgtgac atcattaact ctttcgttaa gacgcaaccg  540
aactggaata gccaaaccga gtctgacacg agcgctggtg aaaaagatca tttgcagggc  600
ggtgccctgc tgtatagcaa ttcggacaaa accgcatacg caaatagcga ctatcgtctg  660
ctgaaccgta ccccgaccag ccagactggt aagccgaaat acttcgagga caatagcagc  720
ggtggttacg acttcctgtt ggcaaacgat attgataatt ccaatccggt ggtgcaggct  780
gagcagctga attggctgca ttacctgatg aattacggta gcattgtcgc aaatgacccg  840
gaagcgaatt tcgatggtgt ccgtgttgac gcggtggata acgtgaacgc agacctgttg  900
cagatcgcaa gcgattatct gaaagcccat tatggtgttg ataagagcga gaagaatgcg  960
atcaaccacc tgagcatcct ggaagcgtgg tctgacaacg acccacagta taacaaagac  1020
accaaaggtg cccagctgcc gatcgacaac aaactgcgtc tgtcgttgct gtacgcactg  1080
acccgtccgc tggagaagga tgcaagcaac aaaaatgaga ttcgtagcgg tctggagccg  1140
gttattacca attccctgaa taatcgttcc gctgagggca agaactctga acgcatggcg  1200
aattacatct tcatccgtgc tcacgattct gaagttcaaa cggtgatcgc aaagatcatc  1260
aaagcgcaga ttaacccgaa aacggatggc ctgaccttca ccctggatga gctgaaacag  1320
gcgttcaaaa tctataacga ggatatgcgc caggcgaaga agaagtatac ccagagcaat  1380
atcccgacgg catacgccct gatgctgagc aataaggact ccatcacgcg cctgtattac  1440
ggtgatatgt acagcgatga tggccaatac atggcgacca aatccccgta ctacgatgcg  1500
attgacaccc tgctgaaggc gcgcattaag tatgccgctg gcggtcagga tatgaagatc  1560
acctacgttg agggtgacaa aagccacatg gactgggact atacgggtgt cctgacgagc  1620
gttcgctacg gcacgggcgc aaacgaagcg accgaccagg gcagcgaagc taccaagacg  1680
caaggtatgg ccgtcatcac ttctaacaac ccgtccctga agctgaatca gaacgacaag  1740
```

-continued

```
gtcattgtca atatgggcac cgctcacaaa aatcaggaat accgtccgtt gctgctgacc  1800
accaaagacg gtctgaccag ctacaccagc gacgccgctg ccaagagcct gtaccgtaaa  1860
acgaacgata agggcgagtt ggtgttcgat gcaagcgaca ttcagggcta tctgaatccg  1920
caagtgagcg gttacctggc tgtttgggtg cctgtgggtg cgagcgacaa ccaggatgtg  1980
cgtgtcgcgg ccagcaataa agccaatgcg accggccaag tctatgaaag cagcagcgca  2040
ctggatagcc aactgattta tgagggtttt tccaactttc aggacttcgt caccaaggat  2100
tctgattaca ccaataaaaa gatcgcgcaa aatgtccagc tgtttaagag ctggggcgtc  2160
accagctttg agatggctcc gcaatacgtc agcagcgagg acggcagctt tttggacagc  2220
attatccaga acggctatgc gttcgaggat cgttacgacc tggcgatgag caaaaacaac  2280
aaatacggct cccagcagga catgatcaac gcggttaagg cgctgcataa gagcggtatc  2340
caagtgatcg cggactgggt cccggatcaa atctacaatt tgccgggtaa agaggtcgtc  2400
accgcgaccc gtgtgaacga ctacggcgag tatcgcaagg actccgaaat caaaaacacc  2460
ctgtacgccg ccaacaccaa aagcaacggt aaagattatc aagcaaagta cggtggcgcc  2520
tttttgagcg agctggccgc caaatatccg agcatcttta accgcactca gattagcaat  2580
ggcaagaaga tcgacccgtc tgaaaagatc accgcctgga aggccaaata cttcaatggt  2640
acgaacattt tgggtcgcgg cgttggttac gtcttgaaag acaatgccag cgacaagtat  2700
tttgagctga agggcaatca gacttatctg ccgaagcaaa tgacgaataa agaagcctcg  2760
actggtttcg ttaatgacgg caatggtatg accttttaca gcacgagcgg ttatcaagcg  2820
aagaacagct tcgttcagga cgcaaaaggc aactggtact actttgacaa caatggccac  2880
atggtttacg gtctgcaaca tctgaacggc gaggtgcaat acttcctgag caatggcgtg  2940
caactgcgtg aatccttctt ggaaaatgcc gacggcagca aaaactattt cggtcacctg  3000
ggcaaccgtt atagcaatgg ttactacagc ttcgataatg atagcaaatg gcgctatttc  3060
gatgcgagcg gtgttatggc agtgggtctg aaaactatta acggtaacac ccagtatttc  3120
gatcaagacg gctaccaagt gaagggtgca tggattaccg gcagcgatgg taagaagcgt  3180
tacttcgacg acggtagcgg caatatggca gttaatcgct ttgctaacga caagaatggc  3240
gattggtatt acctgaatag cgacggtatt gcactggtgg gtgttcagac catcaacggc  3300
aaaacgtatt actttggcca agatggtaaa caaatcaaag gcaaaatcat taccgataat  3360
ggtaaactga aatactttct ggcgaacagc ggtgagctgg cgcgtaacat ttttgcgacc  3420
gacagccaga acaactggta ttacttcggc tcggatggtg ttgcggttac gggttcgcag  3480
acgattgcgg gtaaaaagtt gtactttgcg tccgacggta aacaggtgaa gggtagcttt  3540
gttacttaca atggtaaagt gcactattac catgcggaca gcggcgaact gcaagtcaac  3600
cgtttcgagg cggataaaga cggtaattgg tactatctgg acagcaacgg tgaggcactg  3660
acgggtagcc agcgtatcaa tggtcaacgt gtgtttttca cccgcgaggg caaacaggtt  3720
aagggtgatg tcgcgtatga tgaacgcggc ttgctgcgct attacgacaa aaacagcggt  3780
aatatggtgt acaacaaggt ggtcacgctg gcgaacggtc gtcgtattgg tattgaccgc  3840
tggggtattg ctcgctatta ctaa                                        3864
```

```
SEQ ID NO: 65          moltype = AA  length = 1287
FEATURE                Location/Qualifiers
source                 1..1287
                       mol_type = protein
                       organism = Streptococcus mutans
SEQUENCE: 65
MIDGKYYYIG SDGQPKKNFA LTVNNKVLYF DKNTGALTDT SQYQFKQGLT KLNNDYTPHN  60
QIVNFENTSL ETIDNYVTAD SWYRPKDILK NGKTWTASSE SDLRPLLMSW WPDKQTQIAY  120
LNYMNQQGLG TGENYTADSS QESLNLAAQT VQVKIETKIS QTQQTQWLRD IINSFVKTQP  180
NWNSQTESDT SAGEKDHLQG GALLYSNSDK TAYANSDYRL LNRTPTSQTG KPKYFEDNSS  240
GGYDFLLAND IDNSNPVVQA EQLNWLHYLM NYGSIVANDP EANFDGVRVD AVDNVNADLL  300
QIASDYLKAH YGVDKSEKNA INHLSILEAW SDNDPQYNKD TKGAQLPIDN KLRLSLLYAL  360
TRPLEKDASN KNEIRSGLEP VITNSLNNRS AEGKNSERMA NYIFIRAHDS EVQTVIAKII  420
KAQINPKTDG LTFTLDELKQ AFKIYNEDMR QAKKKYTQSN IPTAYALMLS NKDSITRLYY  480
GDMYSDDGQY MATKSPYYDA IDTLLKARIK YAAGGQDMKI TYVEGDKSHM DWDYTGVLTS  540
VRYGTGANEA TDQGSEATKT QGMAVITSNN PSLKLNQNDK VIVNMGTAHK NQEYRPLLLT  600
TKDGLTSYTS DAAAKSLYRK TNDKGELVFD ASDIQGYLNP QVSGYLAVWV PVGASDNQDV  660
RVAASNKANA TGQVYESSSA LDSQLIYEGF SNFQDFVTKD SDYTNKKIAQ NVQLFKSWGV  720
TSFEMAPQYV SSEDGSFLDS IIQNGYAFED RYDLAMSKNN KYGSQQDMIN AVKALHKSGI  780
QVIADWVPDQ IYNLPGKEVV TATRVNDYGE YRKDSEIKNT LYAANTKSNG KDYQAKYGGA  840
FLSELAAKYP SIFNRTQISN GKKIDPSEKI TAWKAKYFNG TNILGRGVGY VLKDNASDKY  900
FELKGNQTYL PKQMTNKEAS TGFVNDGNGM TFYSTSGYQA KNSFVQDAKG NWYYFDNNGH  960
MVYGLQHLNG EVQYFLSNGV QLRESFLENA DGSKNYFGHL GNRYSNGYYS FDNDSKWRYF  1020
DASGVMAVGL KTINGNTQYF DQDGYQVKGA WITGSDGKKR YFDDGSGNMA VNRFANDKNG  1080
DWYYLNSDGI ALVGVQTING KTYYFGQDGK QIKGKIITDN GKLKYFLANS GELARNIFAT  1140
DSQNNWYYFG SDGVAVTGSQ TIAGKKLYFA SDGKQVKGSF VTYNGKVHYY HADSGELQVN  1200
RFEADKDGNW YYLDSNGEAL TGSQRINGQR VFFTREGKQV KGDVAYDERG LLRYYDKNSG  1260
NMVYNKVVTL ANGRRIGIDR WGIARYY                                     1287
```

```
SEQ ID NO: 66          moltype = DNA  length = 4068
FEATURE                Location/Qualifiers
source                 1..4068
                       mol_type = unassigned DNA
                       organism = Streptococcus gallolyticus
SEQUENCE: 66
atgatcgacg gcaaatacta ctatattgac gaggacggta acgtaaagaa gaatttcgcg  60
attacggtgg atggtcagtt gctgtacttc gacgctgaaa cgggtgctct gaccagcacg  120
tccacctata gcttctccga gggcctgact aatctggtcg ataacttcag cattaacaac  180
cagtcctacg acagcaccga agagtcgttt gagctgatcg acggttacct gaccgtcaat  240
acttggtacc gtccgaccaa aattctggaa aacggtgaaa cctgggtcga tagcaccgaa  300
acggatttcc gtccgctgct gatggcctgg tggccggatg ttgacaccca aattgactac  360
ttgaactaca tgagcgatta cttcgatctg ggtacgacct atagcgctga cgattcccaa  420
```

```
gcgagcctga atctggcagc tgaggcggtt caggtgaaaa ttgaacaaga aattacccgt  480
caagagaaca ccgcctggct gcgcgagatc atctctagct ttgttaccac ccaggataaa  540
tggaatatca ataccgagaa tgagggcacc gaccatctgc aaggtggtgc cctgctgtac  600
gttaacagcg acttgactcc gtgggcaaac agcgattatc gcctgctgaa ccgcaccccg  660
acgtaccaga cgggtgagac taattacttt aaagcagatc gtactggtgg ctacgaattt  720
ctgctggcaa atgacgtgga taattctaac ccggtcgttc aagccgaaca gttgaaccag  780
ctgtactact tgatgaattg gggctctatt gtattcggtg atgacgacgc caattttgat  840
ggcgtgcgtg ttgacgcggt ggacaatgtg aacgctgacc tgttgcagat ttacacgaac  900
ctgttcgaag cggcgtatgg tgttaacgag tctgaggcgc aggccctggc tcacattagc  960
atcctggaag cgtggtctta taacgacccg gactacaacc acgacacgaa tggcgctgcc  1020
ctggcaatcg acaatggtct gcgtctgagc tttctgtact ctttgacgcg ccctacggac  1080
gagcgcagcg gtttggagcc actgatcacc tctgagattg gcctgaccga tcgttccgag  1140
gactctgcat acggtgacac catgccgagc tatgttttcg tccgtgcaca tgacagcgag  1200
gttcagacca ttattgcgag cattatcgca gaacagatca acccggaaac cgatggctat  1260
accttcaccc tggacgagct gaaccaggcg tttgagattt acaacgcgga tatgaacagc  1320
gtggataaag agtatacgca ttacaatatc ccggctgcgt atagcctgct gctgaccaac  1380
atggaaagcg tcccgcgtgt ttactacggt gacctgtata cggataacgg tcagtacatg  1440
gcgactaaga gcccgtatta tgaccagatc accaccctgc tgcaagcgcg cattcgttac  1500
gcggcgggtg gccaatctat ggctgttacg tactacaccc ctgcgtcgag catgtctacc  1560
gacaatgcgg atagcgtcct gaatgagact ggtgtgctga cttctgtgcg ttacggctat  1620
ggcatcatga ccgccgacca agaggccacg gacgactccg ttctgacctc tggtattgtt  1680
actattatca gcaacaaccc taatttgcag ctggatgatt ccgaagtgat tgcagtccag  1740
gttggtgtgg cgcacgctgg tcagtattat cgtccgctgt tgtacccgac ggcggatggt  1800
ctgcaaagct acctgaacga tagcgatacc gacattacta agctggtcga tgataatggt  1860
tatatctact ttacggcaga tgagattaaa ggctacgaaa cggttgacat gaatggctac  1920
ctgagcgttt gggtcccggt tggtgcagac gagaatcagg acatccgtgt cagcgcagac  1980
accagcgcgt acaccgaggg tgaattgatc tatcaagcaa ccgcagcgct ggatagccaa  2040
gtgatctacg agggtttcag caacttccaa gatttcgtta cctctaacag cgagtacact  2100
aacaagctga tcgcggagaa cgtcgatctg tttaccagct ggggcattac gagctttgag  2160
atggcgccac agtatgtgag caccgatgac ggtacttttc tggatagcat cattcaaaac  2220
ggttatgcat ttgacgatcg ctacgacctg gcaatgagcc agaataacaa gtatggtagc  2280
gctgaagatt tgcgtaatgc catcaaggcc ctgcacgctg ctggcattca ggtcattgct  2340
gactgggtgc cggatcaaat ctattcgctg ccaggcgaag aagtcgttac ggcgactcgc  2400
gtgaatgact atggcgaaga aaccgaaggc gcgtacatta acaatacgtt gtatgtggcg  2460
aacagcaaaa gcagcggcga ggactaccag gcacagtatg gtggtgagtt cctggattac  2520
ttgcaagaaa cctacccgga aatgttcgaa gttgcgatga ttagcacggg tgagccgatt  2580
gatccgagca ccaagatcaa gatttggaaa gcagaatact ttaatggtac gaacattctg  2640
ggtaagggcg ctggttacgt gctgagcgat gccgcgactg gcacgtactt taccgtgact  2700
gagaatggca cgtttctgcc gaagcagctg accaccgact ccgccattac gggtttctat  2760
tacgacggta cgggtatgtc ttactttagc acctcgggtt atcgcgctaa agcgagcttc  2820
attgtttaca acggctacta ctactatttt gatgataacg gctacatggt cactggcacg  2880
gtggaaatca acggtaagac ctactatttc ctgccgaatg gtattcagct gcgtgatgcg  2940
atttacgaag acgagaacgg taatcagtac tatttcggtc cgttgggcaa ccagtatttc  3000
aacaactatt acagctttga cgttgaagag gtggtggacg gtgtaacgac tacggtaacg  3060
aagtggcgtc attttgacga gaacggcgtg atggcgcgtg gtttggtcga gattgatggt  3120
gtctaccagt attacgatga aaacggctac caggtcaaag gtgagctgat caccgatgct  3180
gatggtaatt tgcgttattt caaagaagat agcggtgaaa tggttgttag cgattttgtg  3240
aagatcggcg ataacaactg gtactacttt gacgaaaacg gtattgcagt cacgggtgcc  3300
caaaccattg ccggccagaa cttgtatttc gatgacaacg gtgtgcaggc gaaaggtgcc  3360
tttgtcacga acgccgatgg cacgcgcagc tattatgacg cggacagcgg tgagaagatc  3420
gtggcagatt tcttcactac gggcgataat gactggtatt atgcagatga aaatggcaat  3480
ctggtgactg gtagccaaac tatcaatggt caaaacctgt actttgctga ggacggtttg  3540
caggccaagg gtgtgtttgt taccgatacg gctggtaaca ttcactatta tgatgcgaac  3600
tctggcgagt tggcggttaa taccttcgtt ggtgatggcg acgactggta ttactttgat  3660
gagaatggca tcgcagttac cggcgcacaa gtcattaacg gtcaacacct gtatttcgca  3720
gacaacggca tccaagtgaa aggtgaaatc gtcaccgacg caaacggcaa ccgctattac  3780
tacgatgcag attccggcga aatggcagtt aacacctttg tggagattga cggtgtttgg  3840
tactattttg gtgccgatgg tatcgcggtg acgggtgcac aagtaattga tggtcagaat  3900
ttgtacttta acgcagacgg tagccaagtc aagggtgacg ttgtccgtat caacggtttg  3960
cgttactact acgacgctaa tagcggcgaa caggtgcgca atcagtgggt cacgctgccg  4020
gatggtactg ttgttttctt taatgcgcgt ggctatactt ggggctaa              4068

SEQ ID NO: 67          moltype = AA  length = 1355
FEATURE                Location/Qualifiers
source                 1..1355
                       mol_type = protein
                       organism = Streptococcus gallolyticus
SEQUENCE: 67
MIDGKYYYID EDGNVKKNFA ITVDGQLLYF DAETGALTST STYSFSEGLT NLVDNFSINN  60
QSYDSTEESF ELIDGYLTVN TWYRPTKILE NGETWVDSTE TDFRPLLMAW WPDVDTQIDY  120
LNYMSDYFDL GTTYSADDSQ ASLNLAAEAV QVKIEQEITR QENTAWLREI ISSFVTTQDK  180
WNINTENEGT DHLQGGALLY VNSDLTPWAN SDYRLLNRTP TYQTGETNYF KADRTGGYEF  240
LLANDVDNSN PVVQAEQLNQ LYYLMNWGSI VFGDDDANFD GVRVDAVDNV NADLLQIYTN  300
LFEAAYGVNE SEAQALAHIS ILEAWSYNDP DYNHDTNGAA LAIDNGLRLS FLYSLTRPTD  360
ERSGLEPLIT SEIGLTDRSE DSAYGDTMPS YVFVRAHDSE VQTIIASIIA EQINPETDGY  420
TFTLDELNQA FEIYNADMNS VDKEYTHYNI PAAYSLLLTN MESVPRVYYG DLYTDNGQYM  480
ATKSPYYDQI TTLLQARIRY AAGGQSMAVT YYTPASSMST DNADSVLNET GVLTSVRYGY  540
GIMTADQEAT DDSVLTSGIV TIISNNPNLQ LDDSEVIAVQ VGVAHAGQYY RPLLYPTADG  600
LQSYLNDSDT DITKLVDDNG YIYFTADEIK GYETVDMNGY LSVWVPVGAD ENQDIRVSAD  660
```

-continued

```
TSAYTEGELI YQATAALDSQ VIYEGFSNFQ DFVTSNSEYT NKLIAENVDL FTSWGITSFE  720
MAPQYVSTDD GTFLDSIIQN GYAFDDRYDL AMSQNNKYGS AEDLRNAIKA LHAAGIQVIA  780
DWVPDQIYSL PGEEVVTATR VNDYGEETEG AYINNTLYVA NSKSSGEDYQ AQYGGEFLDY  840
LQETYPEMFE VAMISTGEPI DPSTKIKIWK AEYFNGTNIL GKGAGYVLSD AATGTYFTVT  900
ENGTFLPKQL TTDSAITGFY YDGTGMSYFS TSGYRAKASF IVYNGYYYYF DDNGYMVTGT  960
VEINGKTYYF LPNGIQLRDA IYEDENGNQY YFGPLGNQYF NNYYSFDVEE VVDGVTTTVT  1020
KWRHFDENGV MARGLVEIDG VYQYYDENGY QVKGELITDA DGNLRYFKED SGEMVVSDFV  1080
KIGDNNWYYF DENGIAVTGA QTIAGQNLYF DDNGVQAKGA FVTNADGTRS YYDADSGEKI  1140
VADFFTTGDN DWYYADENGN LVTGSQTING QNLYFAEDGL QAKGVFVTDT AGNIHYYDAN  1200
SGELAVNTFV GDGDDWYYFD ENGIAVTGAQ VINGQHLYFA DNGIQVKGEI VTDANGNRYY  1260
YDADSGEMAV NTFVEIDGVW YYFGADGIAV TGAQVIDGQN LYFNADGSQV KGDVVRINGL  1320
RYYYDANSGE QVRNQWVTLP DGTVVFFNAR GYTWG                             1355

SEQ ID NO: 68           moltype = AA  length = 1772
FEATURE                 Location/Qualifiers
source                  1..1772
                        mol_type = protein
                        organism = Lactococcus reuteri
SEQUENCE: 68
MEIKKHFKLY KSGKQWVTAA VATVAVSTAL LYGGVAHADQ QVQSSTTQEQ TSTVNADTTK  60
TVNLDTNTDQ PAQTTDKNQV ANDTTTNQSK TDSTSTTVKN PTFIPVSTLS SSDNEKQSQN  120
YNKPDNGNYG NVDAAYFNNN QLHISGWHAT NASQGTDSRQ VIVRDITTKT ELGRTNVTNN  180
VLRPDVKNVH NVYNADNSGF DVNINIDFSK MKDYRDSIEI VSRYSGNGKS VDWWSQPITF  240
DKNNYAYLDT FEVKNGELHA TGWNATNKAI NYNHHFVILF DRTNGKEVTR QEVRDGQSRP  300
DVAKVYPQVV GANNSGFDVT FNIGDLDYTH QYQILSRYSN ADNGEGDYVT YWFAPQSIAP  360
ANQSNQGYLD SFDISKNGEV TVTGWNATDL SELQTNHYVI LFDQTAGQQV ASAKVDLISR  420
PDVAKAYPTV KTAETSGFKV TFKVSNLQPG HQYSVVSRFS ADENGNGNDK RHTDYWYSPV  480
TLNQTASNID TITMTSNGLH ITGWMASDNS INEATPYAII LNNGREVTRQ KLTLIARPDV  540
AAVYPSLYNS AVSGFDTTIK LTNAQYQALN GQLQVLLRFS KAVDGNPNGT NTVTDQFSKN  600
YATTGGNFDY VKVNGNQIEF SGWHATNQSN DKNSQWIIVL VNGKEVKRQL VNDTKDGAAG  660
FNRNDVYKVN PAIENSIMSG FQGIITLPVT VKDENVQLVH RFSNDAKTGE GNYVDFWSEV  720
MSVKDSFQKG NGPLNQFGLQ TINGQQYYID PTTGQPRKNF LLQNGNDWIY FDKDTGAGTN  780
ALKLQFDKGT ISADEQYRRG NEAYSYDDKS IENVNGYLTA DTWYRPKQIL KDGTTWTDSK  840
ETDMRPILMV WWPNTVTQAY YLNYMKQYGN LLPASLPSFS TDADSAELNH YSELVQQNIE  900
KRISETGSTD WLRTLMHEFV TKNSMWNKDS ENVDYGGLQL QGGFLKYVNS DLTKYANSDW  960
RLMNRTATNI DGKNYGGAEF LLANDIDNSN PVVQAEELNW LYYLMNFGTI TGNNPEANFD  1020
GIRVDAVDNV DVDLLSIARD YFNAAYNMEQ SDASANKHIN ILEDWGWDDP AYVNKIGNPQ  1080
LTMDDRLRNA IMDTLSGAPD KNQALNKLIT QSLVNRANDN TENAVIPSYN FVRAHDSNAQ  1140
DQIRQAIQAA TGKPYGEFNL DDEKKGMEAY INDQNSTNKK WNLYNMPSAY TILLTNKDSV  1200
PRVYYGDLYQ DGGQYMEHKT RYFDTITNLL KTRVKYVAGG QTMSVDKNGI LTNVRFGKGA  1260
MNATDTGTDE TRTEGIGVVI SNNTNLKLND GESVVLHMGA AHKNQKYRAV ILTTEDGVKN  1320
YTNDTDAPVA YTDANGDLHF TNTNLDGQQY TAVRGYANPD VTGYLAVWVP AGAADDQDAR  1380
TAPSDEAHTT KTAYRSNAAL DSNVIYEGFS NFIYWPTTES ERTNVRIAQN ADLFKSWGIT  1440
TFELAPQYNS SKDGTFLDSI IDNGYAFTDR YDLGMSTPNK YGSDEDLRNA LQALHKAGLQ  1500
AIADWVPDQI YNLPGKEAVT VTRSDDHGTT WEVSPIKNVV YITNTIGGGE YQKKYGGEFL  1560
DTLQKEYPQL FSQVYPVTQT TIDPSVKIKE WSAKYFNGTN ILHRGAGYVL RSNDGKYYNL  1620
GTSTQQFLPS QLSVQDNEGY GFVKEGNNYH YYDENKQMVK DAFIQDSVGN WYYFDKNGNM  1680
VANQSPVEIS SNGASGTYLF LNNGTSFRSG LVKTDAGTYY YDGDGRMVRN QTVSDGAMTY  1740
VLDENGKLVS ESFDSSATEA HPLKPGDLNG QK                                1772

SEQ ID NO: 69           moltype = DNA  length = 5208
FEATURE                 Location/Qualifiers
source                  1..5208
                        mol_type = unassigned DNA
                        organism = Lactobacillus reuteri
SEQUENCE: 69
atggatcagc aagtacaaag cagcaccacc caggagcaga cgagcacggt taacgcggac  60
acgactaaaa ccgtcaatct ggataccaac actgaccagc cggctcagac gaccgataag  120
aatcaggtcg cgaatgatac caccaccaac caaagcaaga cggacagcac cagcacgacg  180
gttaagaatc cgacgtttat tcctgttagc actttgtcca gctccgataa cgaaaagcag  240
agccagaatt acaataaacc agataacggt aattacggta atgttgatgc ggcctacttc  300
aataacaatc agctgcacat tagcggttgg cacgcaacca acgcgagcca gggtacggat  360
agccgccaag taatcgtacg cgacattacc accaagaccg agctgggtcg tactaatgtg  420
accaacaatg ttctgcgtcc ggacgtgaaa aatgttcaca acgtctacaa cgctgacaac  480
agcggctttg atgtgaatat caatattgat ttcagcaaga tgaaagacta tcgtgacagc  540
atcgagatcg tttctcgtta tagcggcaac ggcaagagcg ttgactggtg gtcgcagccg  600
atcacgtttg acaaaaacaa ttatgcttat ctggacactt tcgaggtgaa gaacggtgaa  660
ctgcatgcaa cgggctggaa tgccaccaac aaggctatca attacaatca ccacttcgtt  720
attctgtttg atcgtacgaa tggcaaagaa gtcacccgcc aagaggtgcg tgatggtcaa  780
agccgtccgg atgtggcgaa ggtataccccg caagtcgttg gcgcgaacaa tagcggtttt  840
gacgttacgt ttaacattgg tgatttggac tacacccatc agtaccagat cctgtctcgt  900
tacagcaacg cagacaacgg tgaaggcgat tatgtgacct attggtttgc gccgcagagc  960
atcgctccgg cgaatcaaag caaccaaggt tacctggaca gcttcgatat ttcgaaaaac  1020
ggtgaggtga ccgtgacggg ttggaatgcg acggatctga gcgagttgca aacgaatcac  1080
tacgtgatcc tgtttgatca gacggcgggt caacaggttg catccgctaa ggtcgacctg  1140
atcagccgtc cagacgtcgc gaaggcgtac cctaccgtta aaacggcaga aacctccggt  1200
ttcaaggtca cgtttaaggt tagcaatctg caaccgggcc accaatacag cgtcgttagc  1260
cgctttagcg ccgatgaaaa cggtaatggc aacgacaaac gccacacgga ctactggtac  1320
tctccggtta ccctgaacca aacggctagc aacattgaca ctatcaccat gacttccaac  1380
```

-continued

```
ggtctgcaca tcaccggctg gatggcgagc gataatagca ttaacgaagc gaccccgtac  1440
gcgattatcc tgaacaacgg tcgcgaggtg acgcgccaga aactgaccct gatcgcgcgt  1500
ccggatgttg cggcagtgta tccgagcctg tacaatagcg cggttagcgg cttcgacacc  1560
accatcaagc tgactaacgc gcaatatcaa gcattgaacg gccagctgca agtgctgctg  1620
cgctttagca aggcggtgga cggtaacccg aatggtacca ataccgtcac ggatcaattt  1680
agcaaaaact acgcaacgac cggtggtaat ttcgattacg tcaaggttaa tggtaaccaa  1740
attgagtttt ctggctggca cgcgacgaat cagagcaatg ataagaacag ccaatggatt  1800
atcgtcttgg ttaacggtaa agaggtcaaa cgccagctgg tcaatgacac gaaagacggc  1860
gcagccggct tcaatcgtaa tgatgtgtat aaagtgaacc cagcgatcga aaatagcatt  1920
atgtctggct tccagggcat tatcacgttg ccggttacgg tgaaagacga aaacgtgcag  1980
ctggtgcacc gcttctccaa tgacgcaaaa acgggtgagg gcaattatgt cgatttctgg  2040
agcgaggtga tgtctgtgaa ggactctttc caaaagggta atggtccgct gaaccagttt  2100
ggcctgcaaa ccatcaacgg ccaacaatac tatattgacc cgacgaccgg ccagccgcgt  2160
aagaatttcc tgctgcaaaa cggcaacgat tggatttact tcgacaaaga cactggcgca  2220
ggcaccaacg cgctgaaatt gcagtttgat aagggcacga ttagcgctga cgaacaatac  2280
cgtcgcggca acgaggcgta ctcctacgat gataagagca ttgaaaatgt caacggttac  2340
ttgacggcgg acacgtggta ccgcccgaag cagatcctga aggatggcac cacttggacc  2400
gattccaaag aaaccgatat gcgtccgatc ttgatggtct ggtggccaaa cacggtgact  2460
caggcgtact atctgaacta catgaaacaa tatggcaatc tgctgccggc gagcctgccg  2520
agctttagca ccgacgccga tagcgcggag ttgaatcatt attccgagct ggtccaacag  2580
aatatcgaga aacgtattag cgagactggt agcactgatt ggctgcgtac cctgatgcac  2640
gagttcgtga cgaagaatag catgtggaac aaagatagcg agaacgttga ctacggtggc  2700
ctgcaactgc aaggtggttt cctgaagtac gttaacagcg acctgacgaa gtacgcaaac  2760
tctgattggc gtctgatgaa ccgtaccgcg acgaacattg acggtaagaa ttacggtggt  2820
gccgagtttc tgctggcgaa tgacatcgac aactctaacc cggtggtgca ggccgaagaa  2880
ttgaattggc tgtattatct gatgaacttc ggtaccatca ccggtaacaa cccagaagct  2940
aacttcgacg gcatccgtgt cgacgcggtc gataatgtgg atgttgatct gctgagcatt  3000
gcccgtgact actttaatgc agcgtataac atggaacaaa gcgatgctag cgcgaataag  3060
cacatcaata ttctggaaga ttggggctgg gacgatccgg cgtacgtgaa caaaatcggc  3120
aatccacagt tgaccatgga tgaccgcctg cgtaatgcaa ttatggacac cctgagcggt  3180
gcgccggata agaaccaagc gctgaacaag ctgattactc agtctctggt gaatcgcgca  3240
aatgataata ctgaaaacgc ggtgatccct tcctacaact ttgtccgcgc tcatgacagc  3300
aatgcccagg accagatccg tcaagcgatc caggcggcaa ccggcaaacc ttatggcgag  3360
ttcaacttgg atgatgagaa aaagggtatg gaggcttaca tcaatgacca aaatagcacc  3420
aataagaaat ggaacctgta caacatgccg agcgcatata ccatcctgct gacgaataag  3480
gactcggtcc cgcgtgtcta ctatggcgac ttgtaccagg atggtggcca gtacatggaa  3540
cacaaaactc gttactttga caccatcacg aatctgctga aacccgcgt caagtatgtc  3600
gcaggcggcc agaccatgtc tgtggataag aatggcattt tgactaatgt ccgtttcggt  3660
aagggtgcga tgaacgcaac tgacacgggt accgatgaaa cccgcaccga aggtatcggc  3720
gttgttatca gcaacaatac gaatttgaaa ctgaatgacg gcgaaagcgt tgtgctgcac  3780
atgggcgctg cccataagaa tcagaagtat cgtgcagtga tcctgaccac ggaggacggt  3840
gtgaagaatt acaccaacga caccgatgcg ccggtcgcat acaccgacgc gaacggcgat  3900
ttgcatttca ccaatactaa cctggacggt cagcaatata ccgccgttcg tggctacgca  3960
aacccggacg ttacgggtta tctggccgtc tgggttcctg ctggtgccgc cgatgaccaa  4020
gacgcacgta ccgctccgag cgacgaggcc cacaccacga aaacggcgta tcgttccaat  4080
gcggcattgg actccaacgt catctacgaa ggcttttcga actttatcta ttggccgacg  4140
accgagagcg agcgcacgaa tgtccgcatc gcgcagaacg cggatctgtt caaatcgtgg  4200
ggtatcacca ccttcgagct ggcgccacag tacaatagca gcaaggacgg tacgtttctg  4260
gattcgatca ttgacaatgg ttacgcgttt accgatcgtt atgacctggg tatgtctacc  4320
ccgaacaagt acggtagcga tgaggatctg cgtaacgccc tgcaagcact gcacaaggcc  4380
ggtctgcaag ccatcgcaga ttgggttccg gaccaaatct acaatctgcc gggcaaagag  4440
gctgtcacgg ttactcgtag cgatgaccac ggcactacct gggaggttag cccgatcaag  4500
aatgtggtgt atatcactaa taccatcggt ggtggcgaat accagaaaaa gtatggtggt  4560
gaatttctgg acaccttgca aaaagaatat ccgcagctgt ttagccaagt ttacccggtg  4620
acccaaacga cgattgaccc tagcgttaag attaaagagt ggtccgcgaa gtacttcaat  4680
ggtactaata tcctgcatcg cggtgcgggt tacgtcctgc gtagcaatga tggtaagtat  4740
tacaacctgg gtactagcac ccagcagttc ctgccgagcc agctgagcgt tcaagataat  4800
gagggttacg gtttcgttaa agagggtaac aactatcact attatgacga gaacaaacaa  4860
atggttaagg acgcgtttat ccaggatagc gtcggcaatt ggtactattt tgataagaac  4920
ggcaatatgg ttgcaaacca aagcccggtt gaaatcagca gcaacggtgc gagcggcacc  4980
tacttgtttt tgaataatgg taccagcttc cgcagcggcc tggtcaaaac ggatgcaggc  5040
acctattact acgatggtga cggtcgcatg gttcgtaatc aaacggtttc tgacggtgcc  5100
atgacgtacg ttctggacga aaatggtaaa ctggtcagcg aatcttttga tagcagcgcg  5160
accgaggccc atccgctgaa accgggcgat ctgaacggtc aaaagtaa             5208
```

```
SEQ ID NO: 70           moltype = AA  length = 1735
FEATURE                 Location/Qualifiers
source                  1..1735
                        mol_type = protein
                        organism = Lactobacillus reuteri
SEQUENCE: 70
MDQQVQSSTT QEQTSTVNAD TTKTVNLDTN TDQPAQTTDK NQVANDTTTN QSKTDSTSTT  60
VKNPTFIPVS TLSSSDNEKQ SQNYNKPDNG NYGNVDAAYF NNNQLHISGW HATNASQGTD  120
SRQVIVRDIT TKTELGRTNV TNNVLRPDVK NVHNVYNADN SGFDVNINID FSKMKDYRDS  180
IEIVSRYSGN GKSVDWWSQP ITFDKNNYAY LDTFEVKNGE LHATGWNATN KAINYNHHFV  240
ILFDRTNGKE VTRQEVRDGQ SRPDVAKVYP QVVGANNSGF DVTFNIGDLD YTHQYQILSR  300
YSNADNGEGD YVTYWFAPQS IAPANQSNQG YLDSFDISKN GEVTVTGWNA TDLSELQTNH  360
YVILFDQTAG QQVASAKVDL ISRPDVAKAY PTVKTAETSG FKVTFKVSNL QPGHQYSVVS  420
RFSADENGNG NDKRHTDYWY SPVTLNQTAS NIDTITMTSN GLHITGWMAS DNSINEATPY  480
```

-continued

```
AIILNNGREV TRQKLTLIAR PDVAAVYPSL YNSAVSGFDT TIKLTNAQYQ ALNGQLQVLL  540
RFSKAVDGNP NGTNTVTDQF SKNYATTGGN FDYVKVNGNQ IEFSGWHATN QSNDKNSQWI  600
IVLVNGKEVK RQLVNDTKDG AAGFNRNDVY KVNPAIENSI MSGFQGIITL PVTVKDENVQ  660
LVHRFSNDAK TGEGNYVDFW SEVMSVKDSF QKGNGPLNQF GLQTINGQQY YIDPTTGQPR  720
KNFLLQNGND WIYFDKDTGA GTNALKLQFD KGTISADEQY RRGNEAYSYD DKSIENVNGY  780
LTADTWYRPK QILKDGTTWT DSKETDMRPI LMVWWPNTVT QAYYLNYMKQ YGNLLPASLP  840
SFSTDADSAE LNHYSELVQQ NIEKRISETG STDWLRTLMH EFVTKNSMWN KDSENVDYGG  900
LQLQGGFLKY VNSDLTKYAN SDWRLMNRTA TNIDGKNYGG AEFLLANDID NSNPVVQAEE  960
LNWLYYLMNF GTITGNNPEA NFDGIRVDAV DNVDVDLLSI ARDYFNAAYN MEQSDASANK  1020
HINILEDWGW DDPAYVNKIG NPQLTMDDRL RNAIMDTLSG APDKNQALNK LITQSLVNRA  1080
NDNTENAVIP SYNFVRAHDS NAQDQIRQAI QAATGKPYGE FNLDDEKKGM EAYINDQNST  1140
NKKWNLYNMP SAYTILLTNK DSVPRVYYGD LYQDGGQYME HKTRYFDTIT NLLKTRVKYV  1200
AGGQTMSVDK NGILTNVRFG KGAMNATDTG TDETRTEGIG VVISNNNTNLK LNDGESVVLH  1260
MGAAHKNQKY RAVILTTEDG VKNYTNDTDA PVAYTDANGD LHFTNTNLDG QQYTAVRGYA  1320
NPDVTGYLAV WVPAGAADDQ DARTAPSDEA HTTKTAYRSN AALDSNVIYE GFSNFIYWPT  1380
TESERTNVRI AQNADLFKSW GITTFELAPQ YNSSKDGTFL DSIIDNGYAF TDRYDLGMST  1440
PNKYGSDEDL RNALQALHKA GLQAIADWVP DQIYNLPGKE AVTVTRSDDH GTTWEVSPIK  1500
NVVYITNTIG GGEYQKKYGG EFLDTLQKEY PQLFSQVYPV TQTTIDPSVK IKEWSAKYFN  1560
GTNILHRGAG YVLRSNDGKY YNLGTSTQQF LPSQLSVQDN EGYGFVKEGN NYHYYDENKQ  1620
MVKDAFIQDS VGNWYYFDKN GNMVANQSPV EISSNGASGT YLFLNNGTSF RSGLVKTDAG  1680
TYYYDGDGRM VRNQTVSDGA MTYVLDENGK LVSESFDSSA TEAHPLKPGD LNGQK       1735

SEQ ID NO: 71          moltype = AA  length = 1365
FEATURE                Location/Qualifiers
source                 1..1365
                       mol_type = protein
                       organism = Streptococcus downei
SEQUENCE: 71
MEKNLRYKLH KVKKQWVAIG VTTVTLSFLA GGQVVAADTN NNDGTSVQVN KMVPSDPKFD  60
AQAQNGQLAQ AMFKAANQAD QTATSQVSPA TDGRVDNQVT PAANQPAANV ANQDVANPAT  120
DAGALNRQSA ADTSTDGKAV PQTSDQPGHL ETVDGKTYYV DANGQRLKNY SMVIDGKTYY  180
FDGQTGEAQT DLPKTGQANQ DNVPDSYQAN NQAYSNEASS FETVDNYLTA DSWYRPRKIL  240
KNGQSWQASS EGDLRPILMT WWPDAATKAA YANFWAKEGL ISGSYRQNSA NLDAATQNIQ  300
SAIEKKIASE GNTNWLRDKM SQFVKSQNQW SIASENETVY PNQDHMQGGA LLFSNSKDTE  360
HANSDWRLLN RNPTFQTGKQ KYFTTNYAGY ELLLANDVDN SNPVVQAEQL NHLHYLMNWG  420
DIVMGDKDAN FDGVRVDAVD NVNADLLQIQ RDYYKAKYGT DQNEKNAIDH LSILEAWSGN  480
DNDYVKDQNN FSLSIDNDQR SGMLKAFGYA SAYRGNLSNL ATAGLKNRSA NPDSDPVPNY  540
VFIRAHDSEV QTRIAKIIRE KLGKTNADGL TNLTLDDLNK AFDIYNQDMN ATDKVYYPNN  600
LPMAYAWMLQ NKDTVTRVYY GDMYTDNGQY MATKTPFYNA IETLLKGRIK YVAGGQAVSY  660
KQDWSSGILT SVRYGKGANS ASDAGNTETR NSGMALLINN RPNFRAYRNL TLNMGAAHKS  720
QAYRPLLLST KDGIATYLND SDVDSRQYKY TDSQGNLSFS ASELQSVANA QVSGMIQVWV  780
PVGAADNQDV RTSPSTQATK DGNIYHQSDA LDSQVIYEGF SNFQAFAQSP DQYTNAVIAK  840
NGDLFKSWGI TQFEMAPQYV SSEDGTFLDS VILNGYAFSD RYDLAMSKNN KYGSKQDLAN  900
AIKGLQSAGI KVLSDLVPNQ LYNLPGKEVV TATRVNQYGQ AKSGATINKT PYVANTRSYG  960
DYQEQYGGKF LDDLQKLYPR LFSTKQISTG KPIDPSVKIT NWSAKYFNGS NILGRGAKYV  1020
LSEGNKYLNL ADGKLFLPTV LNNTYGQPQV SANGFISKNG GIHYLDKNGQ EVKNRFKEIS  1080
GSWYYFDSDG KMATGKTKIG NDTYLFMPNG KQLKEGVWYD GKKAYYYDDN GRTWTNKGFV  1140
EFRVDGQDKW RYFNGDGTIA IGLVSLDNRT LYFDAYGYQV KGQTVTINGK SYTFDADQGD  1200
LVQTDNANPA PQGQAGWKLL GDNQWGYRKD GQLLTGEQTI DGQKVFFQDN GVQVKGGTAT  1260
DASGVLRFYD RDQGHQVGKG WYSTSDDNWV YVNESGQVLT GLQTIDGQTV YFDDKGIQAK  1320
GKAVWDENGN LRYFDADSGN MLRDRWKNVD GNWYYFNRNG LATRW                  1365

SEQ ID NO: 72          moltype = AA  length = 1338
FEATURE                Location/Qualifiers
source                 1..1338
                       mol_type = protein
                       organism = Streptococcus criceti
SEQUENCE: 72
MEKNLRYKLH KVKKQWVAIG VTTFAVGFLA GGQVVAADAT DGNGGNTQVA HLIPKEPTDY  60
KFDTPSGILT GLNFANAQTS PAGDNAGANQ PAGGIEPQTA ENAATDGQAV PQTSDQPGHL  120
ENVDGKTYYV DANGQRLKNY STVIDGKTYY FDAQTGQAQA ETPQINQNDN QVAPDTYAAN  180
NQAFTNDVSS FETVDNYVTA DSWYRPRKIL KNGESWQASA ESDMRPILMT WWPDAATKAA  240
YANYWVKEGL ISGSYSPNSA NLETAVQTIQ AAIEKKIASE GSTAWLRDKM SQFVKSQNQW  300
SLASENPTVY PNQDHLQGGA LLFSNNEATA HANSDWRLLN RNPTFQTGKQ KYFTTNYAGY  360
ELLLANDVDN SNPIVQAEQL NHFHYLMNWG EIVMGDKNAN FDGVRVDAVD NVNADLLQIQ  420
RDYYKAKYGV DQNEKNAIDH LSILEAWSGN DNDYVKDQNN FSLSIDNSQR SYMLAAFAYP  480
ASQRGNDYIS LLPKVGLKDR RYAKNGNPVP NYVFIRAHDS EVQTRIAKII RERLGKTNAD  540
GLTNITLDDL NKAFDIYNQD MKAVDKQYYP NNLPMAYAWM LQNKDTVTRV YYGDMYTDDG  600
QYMETKTPFH DAIETLLKAR IKYVAGGQTA GYVQGWGSGI LTSVRYGKGA DTAIDAGTAE  660
TRTSGMAVLI NNKPNFQSYN GLTLDMGAAH KNQAYRPLLL STKDGIATYL NDSDVSSNQY  720
KYTDGQGRLN FSASELRSVA NVQVSGMIQV WVPVGAADNQ DVRVAPNTNR NNSSNIYTQS  780
DALDSQVIYE GFSNFQAFAK TPEQYTNAVI AKNADLFKSW GITQFEMAPQ YVSSEDGTFL  840
DSVVLNGYAF SDRYDLAMSK NNKYGSKEDL ANAIKGLHNA GIKVLSDWVP DQMYNLPGKE  900
VVTATRVDQY GRPKAGATIN RTPYVVNTKT YGDYQEQYGG KFLDELQKLY PSLFTTKQIS  960
TGKPIDPSVK ITNWSAKYFN GSNILGRGAK YVLSDNNKYL NLGAGQFFLP TNLNNTYGQP  1020
QAPANGFISK NGGIHYIDNN GQEVKNQFKE IAGSWYYFDA NGKMATGQTK IGNTTYLFMP  1080
NGKQLKEGVW YDGKKAYYYD DNGRTWTNKG FVEFKVNGQD KWRYFNGDGS IAVGLVSLDN  1140
RTLYFDAYGY QVKGQTLTIN GKTYSFDANE GDLITGNTPS PEPNNQGAWE ALGDNQWGYR  1200
KDGKLLTGSQ TIAGQKVFFQ PNGVQVKGGT AKDEAGVLRF YDRDQGHLAG KGWYSTADNN  1260
```

-continued

```
WVYVDDAGRV VTGLQKIGSQ TLYFDDNGIQ AKGKAIWDKD GNLRYFAAGS GDMITNRWYN  1320
IGDNQWYWFN NQGIASRW                                                1338

SEQ ID NO: 73          moltype = AA  length = 1385
FEATURE                Location/Qualifiers
source                 1..1385
                       mol_type = protein
                       organism = Streptococcus criceti
SEQUENCE: 73
MRSKKLWISL LFALTLIFTM AFSNMSAQAA GKDSVVTSNA LSADQALVTS QTAVAEPQTV  60
AEQQVVQTAP AAQADVAQSE VEESADLSVN KGADQANVTS QVSQAPAEAE ESQLQTTQAA  120
VAQPRAARQV NRLVQTKPET VKTDVNRLVA ERPELTKPQL DNLNLSKLVQ TPSANDFATN  180
NQAYNNQASS FETVDNYLTA DSWYRPKAIL KDGQTWTLSG ENDFRPILMS WWPDTATKAA  240
YVNFWAKEGL VSGTYTQNSR NLDSAAQTIQ AAIEKRISSE GNTTWLRNKM SQFVQAQSQW  300
NIHSENPTAY PNQDHFQGGA LLFSNNNATA YANSDWRLLN RNPSQQDGRV NYHKSSYGGY  360
ELLLANDVDN SNPIVQAEQL NHFHYLMNWG EIVMGDKEAN FDGVRVDAVD NVDADLLQIQ  420
RDYYKAKYGV GQNEKNAIDH LSILEAWSGN DNDYVRDQDN FSLSIDNNQR SAMLRAFGYA  480
TAYRSDLSAL ATAGLKNRSK ANSGDPIPNY VFIRAHDSEV QTRIASIIRE RLGKANTDGL  540
TNITLDDLEK AFAIYNKDMY ATDKQYYINN LPMAYAWMLQ NKDTVTRVYY GDMYTDDGQY  600
MAAKTPFYNA IETMLKARIK YVAGGQTAAY NQDWNGGVLT SVRYGKGANS ATDRGTSETR  660
TSGMALLINN MPNFQAYRGV TLNMGAAHTN QAYRPLLLST STGIATYLND SDVKSSQYKY  720
TDSQGRLIFN ASELHGVANA QVSGMIQVWV PVGAADNQDV RIAPSTSRNK SSDIYTQSDA  780
LDSQVIYEGF SNFQAFAKTP EQYTNAVIAK NADLFKSWGI TQFEMAPQYV SSEDGTFLDS  840
VVLNGYAFSD RYDLAMSKNN KYGSKEDLAN AIKGLHKAGI KVLSDWVPDQ MYNLPGKEVV  900
TATRVDQYGR PKAGATINKT PYVVNTKTYG DYQEQYGGKF LDELQKLYPS LFTTKQISTG  960
KPIDASVKIT NWSAKYFNGS NILGRGAKYV LGDSKGYFNL TDSKLYLPTA LLSKSTNPSQ  1020
PSQPSQPSQP SKPSQPSKPS VSGISHDGKG YVYYKNGVQA KSSFITENNN LYYFDQKGYM  1080
VTGMQKINGA TYYFGKDGKA LKDGIYTDNA GKSYYFNSQG KRLENGYYPF GDKWRHFENG  1140
VMAVGLTQVK GKSKTYTQYY DAQGFQVKGE LVTDKDGKVR YFDKQYGNMA INQFITNAQG  1200
KKSYFTGDGT RYENGYYQFG NKWRHFTNGI MDVGLTQVKG KYKTYTQFYD SYGFQVKGSF  1260
ITDDNGKVRY FDKEYGNMVS NQFVKNSDGE TFYFDKNGTA VTGWQVIDGQ RLYFNANGVL  1320
VQRSRRSSNQ IYERPRHQNR YSLNGYFYRY PRHTERNYYD YGFRNYGFRG YGFFDLQNFF  1380
PWDRF                                                              1385

SEQ ID NO: 74          moltype = AA  length = 1385
FEATURE                Location/Qualifiers
source                 1..1385
                       mol_type = protein
                       organism = Streptococcus criceti
SEQUENCE: 74
MRSKKLWISL LFALTLIFTM AFSNMSAQAA GKDSVVTSNA LSADQALVTS QTAVAEPQTV  60
AEQQVVQTAP AAQADVAQSE VEESADLSVN KGADQANVTS QVSQAPAEAE ESQLQTTQAA  120
VAQPRAARQV NRLVQTKPET VKTDVNRLVA ERPELTKPQL DNLNLSKLVQ TPSANDFATN  180
NQAYNNQASS FETVDNYLTA DSWYRPKAIL KDGQTWTLSG ENDFRPILMS WWPDTATKAA  240
YVNFWAKEGL VSGTYTQNSR NLDSAAQTIQ AAIEKRISSE GNTTWLRNKM SQFVQAQSQW  300
NIHSENPTAY PNQDHFQGGA LLFSNNNATA YANSDWRLLN RNPSQQDGRV NYHKSSYGGY  360
ELLLANDVDN SNPIVQAEQL NHFHYLMNWG EIVMGDKEAN FDGVRVDAVD NVDADLLQIQ  420
RDYYKAKYGV GQNEKNAIDH LSILEAWSGN DNDYVRDQDN FSLSIDNNQR SAMLRAFGYA  480
TAYRSDLSAL ATAGLKNRSK ANSGDPIPNY VFIRAHDSEV QDRIASIIRE RLGKANTDGL  540
TNITLDDLEK AFAIYNKDMY ATDKQYYINN LPMAYAWMLQ NKDTVTRVYY GDMYTDDGQY  600
MAAKTPFYNA IETMLKARIK YVAGGQTAAY NQDWNGGVLT SVRYGKGANS ATDRGTSETR  660
TSGMALLINN MPNFQAYRGV TLNMGAAHTN QAYRPLLLST STGIATYLND SDVKSSQYKY  720
TDSQGRLIFN ASELHGVANA QVSGMIQVWV PVGAADNQDV RIAPSTSRNK SSDIYTQSDA  780
LDSQVIYEGF SNFQAFAKTP EQYTNAVIAK NADLFKSWGI TQFEMAPQYV SSEDGTFLDS  840
VVLNGYAFSD RYDLAMSKNN KYGSKEDLAN AIKGLHKAGI KVLSDWVPDQ MYNLPGKEVV  900
TATRVDQYGR PKAGATINKT PYVVNTKTYG DYQEQYGGKF LDELQKLYPS LFTTKQISTG  960
KPIDASVKIT NWSAKYFNGS NILGRGAKYV LGDSKGYFNL TDSKLYLPTA LLSKSTNPSQ  1020
PSQPSQPSQP SKPSQPSKPS VSGISHDGKG YVYYKNGVQA KSSFITENNN LYYFDQKGYM  1080
VTGMQKINGA TYYFGKDGKA LKDGIYTDNA GKSYYFNSQG KRLENGYYPF GDKWRHFENG  1140
VMAVGLTQVK GKSKTYTQYY DAQGFQVKGE LVTDKDGKVR YFDKQYGNMA INQFITNAQG  1200
KKSYFTGDGT RYENGYYQFG NKWRHFTNGI MDVGLTQVKG KYKTYTQFYD SYGFQVKGSF  1260
ITDDNGKVRY FDKEYGNMVS NQFVKNSDGE TFYFDKNGTA VTGWQVIDGQ RLYFNANGVL  1320
VQRSRRSSNQ IYERPRHQNR YSLNGYFYRY PRHTERNYYD YGFRNYGFRG YGFFDLQNFF  1380
PWDRF                                                              1385

SEQ ID NO: 75          moltype = AA  length = 1587
FEATURE                Location/Qualifiers
source                 1..1587
                       mol_type = protein
                       organism = Streptococcus salivarius
SEQUENCE: 75
MRSKKLWISL LFALTLIFTM AFSNMSASAE ETNNSNGSPS TTTVGENTNP VVEKEVGTTT  60
EVANTSNATT TERAEVTADK PAETTVQPNS GTTTSDRAVA VEVEAKPETT AKPEVATKPE  120
TATTSEVAAN AGVAAPTTEK SKELSEAEIK AAVSLDNIKK EKDGKYYYLL EDGSHKKNFA  180
ITVNGQVLYF DENGALSSTS TYSFTQETTN LVTDFTKNNA AYDSTKASFE LVDGYLTADS  240
WYRPKEILEA GTTWKASTEK DFRPLLMSWW PDKDTQVAYL NYMTKALSNG EETKDVFTIE  300
NSQASLNAAA QILQRKIEVK IAANKSTDWL RQSIEAFVKD QDKWNINSES PGKEHFQKGA  360
LLFVNSDSTK WANSDYRKLN QTATSYIKNH KIVNGSDGGY EFLLSNDIDN SNPVVQAEML  420
NQLYYFMNWG QIVFGDKDKD AHFDGIRVDA VDNVSVDMLQ LVSSYMKAAY KVNESEARAL  480
```

-continued

```
ANISILEAWS HNDPYYVNEH NTAALSMDNG LRLSIVHGLT RPVTNKGTGA RNASMKDLIN  540
GGYFGLSNRA EVTSYDQLGF ATYLFVRAHD SEVQTVIADI ISKKIDPTTD GFTFTLDQLK  600
QAFDIYNADM LKVDKEYTHS NIPAAYALML QTMGAATRVY YGDLYTDNGQ YMAKKSPYFD  660
QITTLLKARP KYVAGGQTSY IHNLAGDGVS SAKDNKEVLV SVRYGQDLMS KTDTEGGKYG  720
RNSGMLTLIA NNPDLKLADG ETITVNMGAA HKNQAYRPLL LGTDKGIVSS LNDSDTKVVK  780
YTDAQGNLVF TADEIKGFKT VDMSGYLSVW VPVGATDDQN VLAKPSTKAY KEGDKVYSSS  840
AALEAQVIYE GFSNFQDFVK EDSQYTNKLI AANADLFKSW GITSFEIAPQ YVSSKDGTFL  900
DSIIENGYAF TDRYDFAMSK NNKYGSKEDL RDALKALHKQ GIQVIADWVP DQLYTLPGKE  960
VVTATRTDTH GKVLDDTSLV NKLYVTNTKS SGNDFQAQYG GAFLDKLQKL YPEIFKEVME  1020
ASGKTIDPSV KIKQWEAKYF NGTNIQKRGS DYVLSDGKLY FTVNDKGTFL PAALTGDTKA  1080
KTGFAYDGTG VTYYTTSGTQ AKSQFVTYNG KQYYFNDKGY LVTGEQTIDG SNYFFLPNGV  1140
MFTDGVRKNA KGQSLVYGKS GKLTTQTGWK EVTVKDDSGK EEKFYQYFFK GGIMATGLTE  1200
VEGKEKYFYD NGYQAKGVFV PTKDGHLMFF CGDSGERKYS GFFEQDGNWY YANDKGYVAT  1260
GFTKVGKQNL YFNEKGVQVK NRFFQVGDAT YYANNEGDVL RGAQTINGDE LYFDESGKQV  1320
KGEFVNNPDG TTSYYDAITG VKLVDTSLVV DGQTFNVDAK GVVTKAHTPG FYTTGDNNWF  1380
YADSYGRNVT GAQVINGQHL YFDANGRQVK GGFVTNTDGS RSFYHWNTGD KLVSTFFTTG  1440
HDRWYYADDR GNVVTGAQVI NGQKLFFDTD GKQVKGAFAT NANGSRSYYH WNTGNKLVST  1500
FFTSGDNNWY YADAKGEVVV GEQTINGQHL YFDQTGKQVK GATATNPDGS ISYYDVHTGE  1560
KAINRWVKIP SGQWVYFNAQ GKGYVSN                                   1587

SEQ ID NO: 76          moltype = AA  length = 1646
FEATURE                Location/Qualifiers
source                 1..1646
                       mol_type = protein
                       organism = Lactobacillus animalis
SEQUENCE: 76
MRSKKLWISL LFALTLIFTM AFSNMSAQAA GKDETSSSNE TQTEQTLNTD ESTDTTTDVS  60
NEAKATEAQL TTQDADMASS EEKTTNVEKE VTTAETNKDT TVKNVESSEQ NTTTVADKNA  120
VDSTAQVNTA EKENKYTQEN VNGNWYLKDE QGNYLTGFQE IKDQNKTVYY NPDSKQMVYG  180
QQNINGNWYL FDTFNGAMQT GLQYIRDQKK LAYYNEQGQM QYGTVEIDGQ KYQADTFNGA  240
IKGKGQTKIA DNWYLFNNAG QVVDGWQWIN DQGKTVYYST KTAQMVHGQQ NINGHWYLFD  300
KTTGAMQRGF QNLKAYGDDK TVYYNQDGWM LYGQQKIDNK WYNFDTFNGA MKTGFVKIPE  360
QNKTVYYAPN GQMQYGWQWV DNATRYFDTF NGAMATGQKL ITGHWYLFDN NGAMQRGFQN  420
LKNYGDNKTV YYNQDGWMLY GWQWVNNATR YFDTFNGAMT TGQKKINDHW YLFDKDGAMQ  480
RGIQYIPEEN KLVYYNQDGW MLYGKQNING VDHNFNTFNG ALEAKGQVKV GNNWYLFNNS  540
GTIQTGFQDL KAYGQDKVVY YDPKTAAMVY GYQNIDGNWY LFSRANGSMQ RGLQNVNGVD  600
LLFDEKTGAL LTGVQNIKGN NYFVDKRSGN IKKNLVVLGA DNKWMYFDAK TGKGTNTLED  660
QYKKGVVSGN VEFITNNAAY SFDGNSFENI NGFLTADSWY RPKSILKDGS TWTATTETDL  720
RPLLMTWWPN EQIKANYLNY MKDKGFINNS GTYNAESDPN YMDFAAQEAQ RNIERKITKE  780
NDTTWLRDLI TDFIKTQDIW NEQSEGVSTE GLQKFQGGFL KYVNSELTPY ANSEWRKLGY  840
QPTMLTQNNV GAEFLLANDI DNSNPVVQAE QLNWLHFLMN FGTITANDPS ANFDGIRIDA  900
VDNVDASLLS IAGDYFKAAY KVGQNDATAN KHISILEDWN DKDPEYVNSI GNPQLTMDDY  960
IVQQLKFSLG QAPDKVDRMQ RFKEWYLVDR SKDNTENTAI PNYSFVRAHD ASVQEDILQL  1020
IQDTTGKPWG VYTNEELQQG LKDYMADQKL TNKKYNRYNI PSSYAILLTN KDTIPRVYYG  1080
DLYSDAGKYM AEKSIYFDAI DNLLKTRTKY VAGGQTLDVD GHDILTSVRF GKGALNVTDK  1140
GTSETRTQGM GLIISNNNSL KLNDGEKVVL HMGAAHKNQA YRAVMLSSAN GLINYTSDAN  1200
APVVYTNNDG DLIFTNKDVV TNGKVQANTA IKGVMNPYVS GYLAMWVPVG ASATQDARTA  1260
ASTKTTTDGS VFHSNAALDS NLIYEGFSNF QAFPENASEN ANAIIAQNVD LFNSWGVTSF  1320
QLAPQYVSSH DGSFLDSIID NGYAFTDRYD LAMSKNNKYG SYQDLVNVLK ALHAGGIQVI  1380
ADWVPDQIYS LPGKEVVSVV RSDEFGNKVD GTQIDNTLYV VNTIGGGQYQ KEYGGRYLEE  1440
LKQKYPELFK TKQPSTGVTI DPSEKITEWS AKYLNGTNIL HRGAEFVLRD GATYFRVAET  1500
SEVFLPSQLR GKITKNGFWK NDAGKVNYYN SEGEIMKNAF VKDGKNNWYY FDNDGNMVTN  1560
TALTIDSDAQ VADYYFLNNG ISLRDGFVQL ANGDIYYYDV NGRKLKNGKV TVNNVEYTTD  1620
KNGKVVGENV LKKLDEIITT GKTTLI                                    1646

SEQ ID NO: 77          moltype = AA  length = 1574
FEATURE                Location/Qualifiers
source                 1..1574
                       mol_type = protein
                       organism = Streptococcus gordonii
SEQUENCE: 77
MRSKKLWISL LFALTLIFTM AFSNMSAQAA GKLESGVIYA DDANQVTNVK EQSAVQSKDS  60
EQTTSDKATD SSQLEVKEQA SSSKETYQAS AATNPTANEQ TTQQDKEVET SRTDSRHELT  120
QKTSDDSSEK SGSSQEPKVA DQAESTDKTQ AALQAKQDSR ANDQEETTEN VAKATVSDKI  180
IATPKKERLP EPAQRKESIT EKMLAAQAQA APVNTEHDDD VLAHIKTIDG KKYYVQDDGT  240
VKKNFAVELN GKILYFDAET GALVDSNEYQ FQQGTSSLNN EFTQKNAFYG TTDKDIETVD  300
GYLTADSWYR PKFILKDGKT WTASTETDLR PLLMAWWPDK RTQINYLNYM NQENLGIGAF  360
ESKTEQVLLT NAVQQVQRKI EERISKEGDT KWLRTLMSAF VKTQPNWNIK TESETTGTNK  420
DHLQGGALLY TNSDKTSHAN SRYRLLNRTP TSQTGTPKYF IDKSNGGYEF LLANDFDNSN  480
PAVQAEQLNW LHYMMNFGSI VANDPTANFD GVRVDAVDNV NADLLQIASD YFKSRYKVGE  540
SEEEALKHLS ILEAWSDNDP DYNKDTKGAQ LAIDNKLRLS LLYSFMRKLS IRSGVEPTIT  600
NSLNDRSTEN KNGERTANYI FVRAHDSEVQ TVIADIIREN INPNTDGLTF TMDELKQAFK  660
IYNEDMRKAD KKYTQFNIPT AHALMLSNKD SITRVYYGDL YTDDGQYMEK KSPYHDAIDA  720
LLRARIKYVA GGQDMKVTYM GVPREADKWS YNGILTSVRY GTGANEATDE GTAETRTQGM  780
AVIASNNPNL KLNEWDKLQV NMGAAHKNQY YRPVLLTTKD GISRYLTDEE VPQSLWKKTD  840
ANGILTFDMN DIAGYSNVQV SGYLAVWVPV GAKENQDARV TASKKKNASG QVYESSPALD  900
SQLIYEGFSN FQDFATRDDQ YTNKVIAKNV NLFKEWGVTS FELPPQYVSS QDGTFLDSII  960
QNGYAFEDRY DMAMSKNNKY GSLDDLLNAL RALHSVNIQA IADWVPDQIY NLPGKEVVTA  1020
TRVNNYGTYR EGAEIKEKLY VANSKTNGTD YQGKYGGAFL DELKAKYPEI FERVQISNGQ  1080
```

```
KMTTDEKITK WSAKYFNGTN ILGRGAYYVL KDWGSKEYLS NKNGETALPK QLVNKEASTG  1140
FVKDTNGFKF YSTSGNQAKD TFIQDENGNW YYFDNQGYLV TGAREIDGKQ LYFMKNGVQL  1200
RDALQEDENG NQYYYDKTGA KVLNRYYTSD GQNWRYFDAK GVMARGLVKI GDGQQYFDQN  1260
GYQVKGKVVR AKDGKLRYFD KDSGNAVINR FAQGDNPSDW YYFGADGVAL TGLQKIGQQT  1320
LYFGQDGKQV KGQVVMLADK SIRYFDANSG EMAVNKFAEG AKNEWYYFDQ DGKAVTGLKT  1380
INNQVLYFDQ DGKQVKGQVV TLADKSIRYF DANSGEMAVN KFAEGAKNEW YYFDQDGKAV  1440
TGLQTINKQV LYFGQDGKQV KGQVVTLADK SIRYFDANSG EMAVNKFAEG AKNEWYYFDQ  1500
DGKAVTGLKT INNQVLYFGQ DGKQVKGQVV YVDGAERYFD PKSGDMVRNK WIRLEDGTWM  1560
YFDRNGRGRR FGRN                                                    1574

SEQ ID NO: 78          moltype = AA  length = 1414
FEATURE                Location/Qualifiers
source                 1..1414
                       mol_type = protein
                       organism = Streptococcus sobrinus
SEQUENCE: 78
MRSKKLWISL LFALTLIFTM AFSNMSASAI DGKYYYVQAD GSYKKNFAIT VNGQMLYFDS  60
DTGALSSTST YSFSQGTTNL VDDFSSHNKA YDSTAKSFEL VNGYLTANSW YRPAGILRNG  120
QTWEASNEND LRPVLMSWWP DKDTQVAYVN YMNKYLSANE TEVTNETSQV DLNKEAQSIQ  180
TKIEQKITSD NSTQWLRTAM EAFVAAQPKW NMSTENFNKG DHLQGGALLY TNSDLTPWAN  240
SDYRLLNRTP TQQDGTKKYF TEGGEGGYEF LLSNDVDNSN PVVQAEQLNQ LHYLMNWGDI  300
VMGDKDANFD GVRVDAVDNV NADLLQVYSN YFKDNYKVTD SEANALAHIS ILEAWSLNDN  360
QYNEDTNGTA LSIDNSSRLT SLAVLTKQPG QRIDLSNLIS ESVNKERAND TAYGDTIPTY  420
SFVRAHDSEV QTVIAKIVKE KIDTNSDGYT FTLDQLKDAF KIYNEDMAKV NKTYTHYNIP  480
AAYALLLSNM ESVPRVYYGD LYTDDGQYMA KKSPYYDAIA TMLQGRIAYV SGGQSEEVHK  540
VNGNNQILSS VRYGQDLMSA DDTQGTDLSR TSGLVTLVSN DPNLDLGGDS LTVNMGRAHA  600
NQAYRPLILG TKDGVQSYLK DSDTNIVKYT DANGNLTFTA DDIKGYSTVD MSGYLAVWVP  660
VGAKDGQDVR VAADTNQKAD GKSLKTSAAL DSQVIYEGFS NFQDFANNDA DYTNKKIAEN  720
ADFFKKLGIT SFEMAPQYVS ATDGSFLDSI IQNGYAFSDR YDLAMSKNNK YGSKDDLANA  780
LKALHANGIQ AIADWVPDQI YQLPGEEVVT AKRTNSYGNP TFDAYINNAL YATNTKSSGS  840
DYQAQYGGAF LDELKAKYPD MFTVNMISTG KPIDPSTKIK QWEAKYFNGT NVLGKGAGYV  900
LSDDATGKYF TVNENGDFLP ASFTGDQNAK TGFYYDGTGM AYYSTSGNKA VNSFIYEGGH  960
YYYFDKDGHM VTGSYKAEDG NDYYFLPNGI QMRDAIYQDA QGNSYYYGRT GILYKGDNWY  1020
PFVDPNNANK TVFRYFDANN VMAIGYRNMY GQTYYFDENG FQAKGQLLTD DKGTHYFDED  1080
NGAMAKNKFV NVGDDWYYMD GNGNAVKGQY PVNNQILYFN PETGVQVKGQ FITDAQGRTS  1140
YYDANSGALK SSGFFTPNGS DWYYAENGYV YKGFKQVAEN QDQWYYFDQT TGKQAKGAAK  1200
VDGRDLYFNP DSGVQVKGDF ATDESGNTSF YHGDNGDKVV GGFFTTGNNA WYYADNNGNL  1260
VKGFQEIDGK WYHFDEVTGQ QAKGAALVNG QQLYFDVDSG IQVKGDFVTD GQGNTSYYDV  1320
NSGDKKVNGF FTTGDNAWYY ADGQGNLAKG RKSIDNQDLY FDPATGKQVK GQLVSIDGRN  1380
YYFDSGSGNM AKNRFVRIGD QWIYFGNDGA ATNL                              1414

SEQ ID NO: 79          moltype = AA  length = 1597
FEATURE                Location/Qualifiers
source                 1..1597
                       mol_type = protein
                       organism = Streptococcus downei
SEQUENCE: 79
MEKNERFKMH KVKKRWVTIS VASATMLASA LGASVASADT ETVSEDSNQA VLTADQTTTN  60
QDTEQTSVAA TATSEQSAST DAATDQASAT DQASAAEQTQ GTTASTDTAA QTTTNANEAK  120
WVPTENENQV FTDEMLAEAK NVATAESNSI PSDLAKMSNV KQVDGKYYYY DQDGNVKKNF  180
AVSVGEKIYY FDETGAYKDT SKVEADKSGS DISKEETTFA ANNRAYSTSA ENFEAIDNYL  240
TADSWYRPKS ILKDGKTWTE SSKDDFRPLL MAWWPDTETK RNYVNYMNKV VGIDKTYTAE  300
TSQADLTAAA ELVQARIEQK ITTEQNTKWL REAISAFVKT QPQWNGESEK PYDDHLQNGA  360
LKFDNQSDLT PDTQSNYRLL NRTPTNQTGS LDSRFTYNAN DPLGGYELLL ANDVDNSNPI  420
VQAEQLNWLH YLLNFGTIYA KDADANFDSI RVDAVDNVDA DLLQISSDYL KAAYGIDKNN  480
KNANNHVSIV EAWSDNDTPY LHDDGDNLMN MDNKFRLSML WSLAKPLDKR SGLNPLIHNS  540
LVDREVDDRE VETVPSYSFA RAHDSEVQDL IRDIIKAEIN PNAFGYSFTQ DEIDQAFKIY  600
NEDLKKTDKK YTHYNVPLSY TLLLTNKGSI PRVYYGDMFT DDGQYMANKT VNYDAIESLL  660
KARMKYVAGG QAMQNYQIGN GEILTSVRYG KGALKQSDKG DATTRTSGVG VVMGNQPNFS  720
LDGKVVALNM GAAHANQEYR ALMVSTKDGV ATYATDADAS KAGLVKRTDE NGYLYFLNDD  780
LKGVANPQVS GFLQVWVPVG AADDQDIRVA ASDTASTDGK SLHQDAAMDS RVMFEGFSNF  840
QSFATKEEEY TNVVIANNVD KFVSWGITDF EMAPQYVSST DGQFLDSVIQ NGYAFTDRYD  900
LGMSKANKYG TADQLVKAIK ALHAKGLKVM ADWVPDQMYT FPKQEVVTVT RTDKFGKPIA  960
GSQINHSLYV TDTKSSGDDY QAKYGGAFLD ELKEKYPELF TKKQISTGQA IDPSVKIKQW  1020
SAKYFNGSNI LGRGADYVLS DQASNKYLNV SDDKLFLPKT LLGQVVESGI RFDGTGYVYN  1080
SSTTGEKVTD SFITEAGNLY YFGQDGYMVT GAQNIKGSNY YFLANGAALR NTVYTDAQGQ  1140
NHYYGNDGKR YENGYQQFGN DSWRYFKNGV MALGLTTVDG HVQYFDKDGV QAKDKIIVTR  1200
DGKVRYFDQH NGNAVTNTFV ADKTGHWYYL GKDGVAVTGA QTVGKQHLYF EANGQQVKGD  1260
FVTAKDGKLY FYDVDSGDMW TNTFIEDKAG NWFYLGKDGA AVTGAQTIKG QKLYFKANGQ  1320
QVKGDIVKDA DGKIRYYDAQ TGEQVFNKSV SVNGKTYYFG SDGTAQTQAN PKGQTFKDGS  1380
GVLRFYNLEG QYVSGSGWYE TAEHEWVYVK SGKVLTGAQT IGNQRVYFKD NGHQVKGQLV  1440
TGNDGKLRYY DANSGDQAFN KSVTVNGKTY YFGSDGTAQT QANPKGQTFK DGSGVLRFYN  1500
LEGQYVSGSG WYKNAQGQWL YVKDGKVLTG LQTVGNQKVY FDKNGIQAKG KAVRTSDGKV  1560
RYFDENSGSM ITNQWKFVYG QYYYFGSDGA AVYRGWN                           1597

SEQ ID NO: 80          moltype = DNA  length = 4311
FEATURE                Location/Qualifiers
source                 1..4311
                       mol_type = unassigned DNA
```

organism = Streptococcus downei
SEQUENCE: 80
atggttgacg gcaaatacta ctactacgat caggacggca acgtaaagaa aaacttcgcg 60
gttagcgtgg gcgagaaaat ctattacttt gacgaaactg gcgcctacaa agacaccagc 120
aaagttgagg cggacaaaag cggcagcgac attagcaagg aagagactac cttcgcggca 180
aacaaccgcg cctacagcac cagcgcggag aattttgagg cgatcgacaa ttatctgacc 240
gcggactcct ggtatcgtcc taaatccatc ctgaaggatg gcaaaacgtg gacggaaagc 300
agcaaagatg actttcgtcc gctgctgatg gcgtggtggc cggataccga aacgaagcgc 360
aattacgtga actacatgaa caaagttgtt ggcatcgaca agacctatac cgcggaaacc 420
agccaggccg acttgaccgc tgcggcggaa ctggtgcaag cacgcattga gcagaagatc 480
acgaccgaac agaacacgaa atggctgcgt gaggcaatct cggcatttgt taaaacgcaa 540
ccgcagtgga acggtgaaag cgagaagccg tacgacgatc acctgcaaaa cggtgctctg 600
aaatttgata atcagagcga cctgaccccg gatacgcaaa gcaactaccg tctgttgaac 660
cgtaccccga ctaatcagac gggtagcctg gacagccgct tcacttataa cgcgaacgac 720
cctttgggcg gttatgagct gctgctggca aatgacgtcg ataacagcaa tccgatcgtg 780
caggcggagc agctgaactg gctgcattac ctgctgaatt ttggtacgat ctacgccaaa 840
gatgccgacg ctaacttcga tagcattcgt gtggacgcgg ttgataacgt cgatgcggat 900
ctgctgcaaa ttagcagcga ttacctgaaa gcagcctacg gcattgataa gaataacaaa 960
aacgcgaaca accacgtgag cattgtcgaa gcctggagcg ataatgatac cccgtacctg 1020
catgacgatg gtgacaacct gatgaatatg gataacaaat ttcgcctgtc catgctgtgg 1080
tcgctggcca aaccgctgga caagcgtagc ggtctgaacc cgctgattca taacagcttg 1140
gtggatcgtg aagttgatga ccgcgaggtt gaaacggttc cgagctattc ttttgcacgt 1200
gcgcatgata gcgaggtcca ggacttgatc cgtgacatca tcaaggcaga gatcaatccg 1260
aacgcattcg gttatagctt tacccaagac gagattgacc aggcctttaa gatttacaat 1320
gaggatctga agaaaacgga taagaaatac acccactata atgtgccgtt gagctacacc 1380
ctgctgctga cgaataaggg tagcatccca cgtgtctact atggtgatat gtttaccgac 1440
gatggtcagt atatggcgaa caaaaccgtc aactatgacg ccattgaatc tctgctgaaa 1500
gcgcgtatga agtatgtcgc tggcggtcaa gcaatgcaga actaccaaat cggtaatggt 1560
gagatcctga ccagcgttcg ttatggtaag ggtgccctga aacagagcga caaaggtgat 1620
gcgaccacgc gcaccagcgg tgtcggtgtc gttatgggca atcagccaaa ctttagcttg 1680
gacggcaaag tggtggctct gaacatgggc gcagctcatg cgaatcagga gtatcgtgcg 1740
ctgatggtta gcacgaaaga cggtgttgcc acgtatgcga ccgatgcaga tgcgagcaaa 1800
gccggtctgg tcaaacgtac cgacgaaaac ggctacctgt atttcctgaa tgacgacctg 1860
aagggtgtgg ccaatcctca ggtgagcggt ttcttgcagg tgtgggttcc ggtgggtgcc 1920
gcggatgatc aagatatccg tgttgcagct agcgataccg catccaccga tggcaagagc 1980
ctgcaccaag acgccgcgat ggatagccgt gttatgtttg aaggcttctc taactttcag 2040
tcctttgcca cgaaagaaga ggaatatacc aacgtcgtta tcgccaacaa tgtggataag 2100
ttcgttagct ggggtatcac ggatttcgag atggccccac aatatgtttc cagcaccgac 2160
ggtcaattcc tggactctgt cattcagaac ggttatgctt ttacggaccg ttatgacttg 2220
ggcatgtcta aggcaaacaa atacggcacg gccgatcaac tggttaaggc cattaaggcc 2280
ctgcacgcga agggcctgaa ggttatggca gattgggtgc cggatcagat gtataccttc 2340
ccgaaacagg aagtcgtgac cgttacccgt accgacaaat ttggcaaacc gatcgcaggt 2400
tcccaaatca atcatagcct gtatgttacc gataccaagt ccagcggcga tgactatcag 2460
gccaaatatg gtggtgcgtt tctggacgag ctgaaggaga aatatccgga gctgttcacg 2520
aagaaacaaa tcagcacggg tcaagctatt gacccgagcg tgaaaatcaa acagtggtct 2580
gctaagtatt tcaatggctc caacatcctg ggtcgcggtg cggactacgt actgtcggat 2640
caggcgagca acaaatacct gaacgtgtct gacgataaac tgttcctgcc gaaaaccttg 2700
ctgggccaag ttgtcgagag cggtatccgc tttgacggca ctggttatgt gtacaactct 2760
agcactacgg gtgaaaaagt taccgattcc ttcattacgg aggcaggtaa tctgtactac 2820
ttcggtcaag acggctatat ggtgaccggc gcacagaaca ttaagggcag caactattac 2880
ttcctggcca atggtgcggc cctgcgtaac accgtttaca ccgatgcgca aggtcagaat 2940
cactattacg gcaacgacgg caagcgttat gagaatggtt accaacagtt cggcaacgat 3000
tcttggcgtt acttcaaaaa tggcgtgatg gcgctgggtc tgactacggt ggatggtcac 3060
gtgcagtatt tcgataaaga tggtgtccag gccaaggata agatcattgt cacccgcgat 3120
ggcaaagtcc gctatttcga ccagcacaac ggtaatgcgg ttactaacac gttcgttgcg 3180
gacaagacgg gtcactggta ctatctgggc aaagacggcg tcgcggttac cggtgcgcag 3240
actgtgggta aacagcattt gtactttgaa gcgaacggtc aacaagtcaa gggtgacttc 3300
gtgacggcta aagacggtaa actgtacttc tatgatgtgg acagcggcga catgtggacc 3360
aataccttta tcgaggataa agcgggtaat tggttctacc tgggtaagga cggtgcggcc 3420
gtcaccggtg cacagacgat caaaggccag aaattgtatt tcaaagccaa cggtcagcaa 3480
gttaaaggtg acattgtcaa ggacgcggac ggtaagatcc gttattacga cgctcagacc 3540
ggtgaacagg tctttaacaa gtccgttagc gtcaacggta agacctacta tttcggtagc 3600
gacggcaccg cgcaaaccca ggcgaatccg aaaggccaaa cctttaagga tggtagcggc 3660
gttctgcgtt tctacaattt ggagggccag tatgtctcgg gcagcggctg gtacgaaacg 3720
gccgagcacg agtgggtata tgtgaaatcc ggtaaagttc tgaccggtgc ccagacgatt 3780
ggtaatcaac gtgtttactt caaggacaat ggtcaccagg tgaaaggcca gctggtcacg 3840
ggtaatgacg gtaaattgcg ttactacgac gcgaacagcg gtgatcaagc attcaacaaa 3900
tccgtcacgg ttaacggtaa aacctactac tttggcagcg atggtacggc gcagacgcag 3960
gctaatccta agggtcagac cttcaaagat ggtagcggcg tgctgcgttt ttacaacttg 4020
gaaggccaat acgtgtctgg cagcggttgg tacaagaatg cgcagggcca gtggctgtac 4080
gtgaaagatg gcaaggtcct gaccggtctg caaacggtcg gcaatcagaa ggtctacttc 4140
gacaaaaatg gcatccaagc aaagggtaag gccgttcgca cgtccgatgg taaagtgcgc 4200
tactttgatg agaatagcgg tagcatgatt acgaaccaat ggaagttcgt ttacggtcaa 4260
tactattact tcggttctga cggcgcagcg gtttaccgtg gttggaacta a 4311

SEQ ID NO: 81 moltype = AA length = 1436
FEATURE Location/Qualifiers
source 1..1436
mol_type = protein

```
                      organism = Streptococcus downei
SEQUENCE: 81
MVDGKYYYYD QDGNVKKNFA VSVGEKIYYF DETGAYKDTS KVEADKSGSD ISKEETTFAA  60
NNRAYSTSAE NFEAIDNYLT ADSWYRPKSI LKDGKTWTES SKDDFRPLLM AWWPDTETKR  120
NYVNYMNKVV GIDKTYTAET SQADLTAAAE LVQARIEQKI TTEQNTKWLR EAISAFVKTQ  180
PQWNGESEKP YDDHLQNGAL KFDNQSDLTP DTQSNYRLLN RTPTNQTGSL DSRFTYNAND  240
PLGGYELLLA NDVDNSNPIV QAEQLNWLHY LLNFGTIYAK DADANFDSIR VDAVDNVDAD  300
LLQISSDYLK AAYGIDKNNK NANNHVSIVE AWSDNDTPYL HDDGDNLMNM DNKFRLSMLW  360
SLAKPLDKRS GLNPLIHNSL VDREVDDREV ETVPSYSFAR AHDSEVQDLI RDIIKAEINP  420
NAFGYSFTQD EIDQAFKIYN EDLKKTDKKY THYNVPLSYT LLLTNKGSIP RVYYGDMFTD  480
DGQYMANKTV NYDAIESLLK ARMKYVAGGQ AMQNYQIGNG EILTSVRYGK GALKQSDKGD  540
ATTRTSGVGV VMGNQPNFSL DGKVVALNMG AAHANQEYRA LMVSTKDGVA TYATDADASK  600
AGLVKRTDEN GYLYFLNDDL KGVANPQVSG FLQVWVPVGA ADDQDIRVAA SDTASTDGKS  660
LHQDAAMDSR VMFEGFSNFQ SFATKEEEYT NVVIANNVDK FVSWGITDFE MAPQYVSSTD  720
GQFLDSVIQN GYAFTDRYDL GMSKANKYGT ADQLVKAIKA LHAKGLKVMA DWVPDQMYTF  780
PKQEVVTVTR TDKFGKPIAG SQINHSLYVT DTKSSGDDYQ AKYGGAFLDE LKEKYPELFT  840
KKQISTGQAI DPSVKIKQWS AKYFNGSNIL GRGADYVLSD QASNKYLNVS DDKLFLPKTL  900
LGQVVESGIR FDGTGYVYNS STTGEKVTDS FITEAGNLYY FGQDGYMVTG AQNIKGSNYY  960
FLANGAALRN TVYTDAQGQN HYYGNDGKRY ENGYQQFGND SWRYFKNGVM ALGLTTVDGH  1020
VQYFDKDGVQ AKDKIIVTRD GKVRYFDQHN GNAVTNTFVA DKTGHWYYLG KDGVAVTGAQ  1080
TVGKQHLYFE ANGQQVKGDF VTAKDGKLYF YDVDSGDMWT NTFIEDKAGN WFYLGKDGAA  1140
VTGAQTIKGQ KLYFKANGQQ VKGDIVKDAD GKIRYYDAQT GEQVFNKSVS VNGKTYYFGS  1200
DGTAQTQANP KGQTFKDGSG VLRFYNLEGQ YVSGSGWYET AEHEWVYVKS GKVLTGAQTI  1260
GNQRVYFKDN GHQVKGQLVT GNDGKLRYYD ANSGDQAFNK SVTVNGKTYY FGSDGTAQTQ  1320
ANPKGQTFKD GSGVLRFYNL EGQYVSGSGW YKNAQGQWLY VKDGKVLTGL QTVGNQKVYF  1380
DKNGIQAKGK AVRTSDGKVR YFDENSGSMI TNQWKFVYGQ YYYFGSDGAA VYRGWN      1436

SEQ ID NO: 82         moltype = AA  length = 1597
FEATURE               Location/Qualifiers
source                1..1597
                      mol_type = protein
                      organism = Streptococcus dentrirousetti
SEQUENCE: 82
MEKNERFKMH KVKKRWVTIS VASATMLASA LGASVASADT ETVSEDSNQA VLTADQTTTN  60
QDTEQTSVAA TATSEQSAST DAATDQASAT DQASAAEQTQ GTTASTDTAA QTTTNANEAK  120
WVPTENENQV FTDEMLAEAK NVATAESNSI PSDLAKMSNV KQVDGKYYYY DQDGNVKKNF  180
AVSVGEKIYY FDETGAYKDT SKVEADKSGS DISKEETTFA ANNRAYSTSA ENFEAIDNYL  240
TADSWYRPKS ILKDGKTWTE SSKDDFRPLL MAWWPDTETK RNYVNYMNKV VGIDKTYTAE  300
TSQADLTAAA ELVQARIEQK ITTEQNTKWL REAISAFVKT QPQWNGESEK PYDDHLQNGA  360
LKFDNQSDLT PDTQSNYRLL NRTPTNQTGS LDSRFTYNAN DPLGGYELLL ANDVDNSNPI  420
VQAEQLNWLH YLLNFGTIYA KDADANFDSI RVDAVDNVDA DLLQISSDYL KAAYGIDKNN  480
KNANNHVSIV EAWSDNDTPY LHDDGDNLMN MDNKFRLSML WSLAKPLDKR SGLNPLIHNS  540
LVDREVDDRE VETVPSYSFA RAHDSEVQDL IRDIIKAEIN PNAFGYSFTQ DEIDQAFKIY  600
NEDLKKTDKK YTHYNVPLSY TLLLTNKGSI PRVYYGDMFT DDGQYMANKT VNYDAIESLL  660
KARMKYVAGG QAMQNYQIGN GEILTSVRYG KGALKQSDKG DATTRTSGVG VVMGNQPNFS  720
LDGKVVALNM GAAHANQEYR ALMVSTKDGV ATYATDADAS KAGLVKRTDE NGYLYFLNDD  780
LKGVANPQVS GFLQVWVPVG AADDQDIRVA ASDTASTDGK SLHQDAAMDS RVMFEGFSNF  840
QSFATKEEEY TNVVIANNVD KFVSWGITDF EMAPQYVSST DGQFLDSVIQ NGYAFTDRYD  900
LGMSKANKYG TADQLVKAIK ALHAKGLKVM ADWVPDQMYT FPKQEVVTVT RTDKFGKPIA  960
GSQINHSLYV TDTKSSGDDY QAKYGGAFLD ELKEKYPELF TKKQISTGQA IDPSVKIKQW  1020
SAKYFNGSNI LGRGADYVLS DQASNKYLNV SDDKLFLPKT LLGQVVESGI RFDGTGYVYN  1080
SSTTGEKVTD SFITEAGNLY YFGQDGYMVT GAQNIKGSNY YFLANGAALR NTVYTDAQGQ  1140
NHYYGNDGKR YENGYQQFGN DSWRYFKNGV MALGLTTVDG HVQYFDKDGV QAKDKIIVTR  1200
DGKVRYFDQH NGNAVTNTFV ADKTGHWYYL GKDGVAVTGA QTVGKQHLYF EANGQQVKGD  1260
FVTAKDGKLY FYDVDSGDMW TNTFIEDKAG NWFYLGKDGA AVTGAQTIKG QKLYFKANGQ  1320
QVKGDIVKDA DGKIRYYDAQ TGEQVFNKSV SVNGKTYYFG SDGTAQTQAN PKGQTFKDGS  1380
GVLRFYNLEG QYVSGSGWYE TAEHEWVYVK SGKVLTGAQT IGNQRVYFKD NGHQVKGQLV  1440
TGNDGKLRYY DANSGDQAFN KSVTVNGKTY YFGSDGTAQT QANPKGQTFK DGSGVLRFYN  1500
LEGQYVSGSG WYKNAQGQWL YVKDGKVLTG LQTVGNQKVY FDKNGIQAKG KAVRTSDGKV  1560
RYFDENSGSM ITNQWKFVYG QYYYFGSDGA AVYRGWN                           1597

SEQ ID NO: 83         moltype = DNA  length = 3972
FEATURE               Location/Qualifiers
source                1..3972
                      mol_type = unassigned DNA
                      organism = Streptococcus dentirousetti
SEQUENCE: 83
atggttgacg gcaaatacta ctactacgat gcagacggca acgtaaagaa aaacttcgcg  60
gttagcgttg gcgatgccat ttctatttt gatgaaacgg gtgcctacaa agataccagc  120
aaagttgatg cggataagac cagctctagc gtcaatcaga ccacggaaac gttcgcagcg  180
aataaccgtg cgtatagcac cgcagccgag aactttgaag cgattgataa ctacctgact  240
gcggatagct ggtatcgtcc gaagtctatc ttgaaagatg gtacgacgtg gaccgaaagc  300
accaaggatg attttcgccc gctgctgatg gcgtggtggc cggataccga aaccaaacgt  360
aactacgtga actatatgaa caaggtggtc ggtatcgaca aaacgtacac cgcggaaacg  420
tcccaagctg acctgacggc ggcagccgaa ctggtgcagg cgcgtatcga gcagaaaatc  480
actagcgaaa agaatacgaa gtggctgcgt gaggcgattt ccgcgttcgt taagactcaa  540
ccgcagtgga atggcgagag cgagaaacct tatgatgacc acctgcaaaa tggtgcgctg  600
aagttcgaca atgaaaccag cctgaccccg gatacgcaga gcggctatcg catcctgaac  660
cgtaccccga cgaatcaaac cggtagcctg gacccgcgct tcacctttaa tcagaatgac  720
```

```
ccgctgggtg gttatgagta tttgctggct aatgatgtcg ataacagcaa cccggtcgtt  780
caggccgaga gcctgaactg gctgcattac ctgctgaatt ttggtagcat ttacgcgaat  840
gatccggagg ccaatttcga cagcatccgt gtggacgcgg tggacaatgt tgacgcagac  900
ctgctgcaaa ttagctcgga ttacctgaaa tcggcgtaca aaattgacaa gaacaacaaa  960
aatgcgaacg accacgttag catcgtcgag gcgtggagcg acaatgatac cccgtacctg  1020
aatgatgatg gcgacaatct gatgaacatg gataacaagt ttcgtctgag catgctgtgg  1080
agcctggcga agccaaccaa tgtccgtagc ggcttgaatc cgctgatcca caacagcgtg  1140
gttgaccgtg aggtggacga ccgtgaagtt gaggctaccc cgaattacag ctttgcacgc  1200
gcacacgaca gcgaagttca agatttgatt cgcgacatca tcaaagctga gatcaaccca  1260
aacagcttcg gttatagctt tacccaagag gaaatcgacc aggccttcaa gatctacaat  1320
gaggatttga agaaaaccaa taagaagtat acccactaca acgtcccgct gagctacacc  1380
ctgctgctga cgaacaaggg cagcattcca cgcatttact acggtgacat gtttacggat  1440
gacggtcagt atatggccaa caaaaccgtt aactatgacg ccattgagag cctgctgaaa  1500
gcacgtatga agtatgttag cggtggccaa gcgatgcaga attacaacat cggcaacggc  1560
gagattctga ccagcgtccg ttacggtaag ggtgccctga aacagagcga caaaggcgat  1620
aagactactc gtaccagcgg tattggcgtt gtgatgggta accagagcaa tttcagcctg  1680
gagggcaagg tggtggccct gaatatgggt gcaacgcata ccaaacagaa gtatcgtgca  1740
ttgatggtgt ctacggaaac cggcgtggcg atttacaata gcgatgaaga agcagaggca  1800
gcaggcctga tcaaaacgac cgatgagaat ggttatttgt actttctgaa tgacgatctg  1860
aagggcgtgg ctaacccgca ggtcagcggc ttcctgcaag tgtgggttcc ggttggtgca  1920
ccggctgacc aggacattcg tgtggcggcg accgatgcgg cttctaccga cggtaagagc  1980
ctgcatcagg acgcagctct ggattctcgc gtcatgtttg aaggtttcag caacttccag  2040
agcttcgcaa ccaaggaaga ggaatacacc aacgttgtta ttgcaaagaa cgtggataag  2100
ttcgtgagct ggggtatcac cgacttcgag atggcaccgc agtacgttag ctctaccgat  2160
ggcacctttc tggatagcgt gattcaaaat ggctatgcct ttacggaccg ttacgacctg  2220
ggtatgagca aagcaaacaa gtatggtact gctgaccaac tggtggccgc gattaaagcg  2280
ctgcatgcga agggtctgcg tgtgatggcg gattgggtcc cagatcaaat gtacactttc  2340
cctaagaagg aagtggttac cgttacccgt acggacaaat ttggcaatcc agtggcaggc  2400
agccaaatca accacacctt gtacgtcact gatactaagg gtagcggtga cgactaccag  2460
gcgaagtacg gtggcgcatt cctggatgaa ctgaaagaaa agtacccgga gctgtttacc  2520
aagaagcaaa tcagcaccgg tcaggcaatc gacccgagcg tgaaaatcaa gcagtggagc  2580
gcgaagtact tcaacggtag caatatcttg ggtcgcggtg cgaactacgt gctgtccgac  2640
caggcgtcta acaagtactt taacgtggcc gaaggtaaag tctttctgcc agcggcgatg  2700
ctgggtaagg tcgtcgagag cggtatccgt ttcgacggta aaggttatat ctataacagc  2760
agcaccactg gcgaacaagt gaaggacagc ttcattaccg aagcgggtaa cttgtactat  2820
tttggcaaag atggttatat ggtcatgggt gcacagaata tccagggtgc taactactac  2880
ttcttggcga atggtgcggc cctgcgcaat agcatcctga cggatcagga tggcaaaagc  2940
cactattatg caaatgacgg caagcgttat gagaacggct actatcaatt cggtaacgac  3000
tcctggcgct attttgaaaa cggcgttatg gccgttggtt tgacgcgcgt tgcgggccac  3060
gaccaatact ttgataagga tggtatccaa gcgaagaata agatcattgt tacgcgtgac  3120
ggtaaggtcc gctacttcga cgaacacaac ggcaatgctg ccacgaatac gtttatcagc  3180
gatcaagccg gccattggta ctacctgggt aaagatggtg tcgccgtgac gggtgcgcag  3240
accgttggca agcaacacct gtacttcgag gctaacggcc aacaagtaaa aggcgatttt  3300
gttaccgcca aggacggtaa gttgtatttt ctggacggtg actctggcga catgtggacc  3360
gataccttcg tccaggataa ggctggtcat tggttctatc tgggcaaaga cggtgcggcg  3420
gtaaccggtg cccagaccgt ccgtggtcag aagctgtact tcaaagcgaa tggccagcag  3480
gttaagggtg acattgtgaa aggcgcggat ggtaaaatcc gttactatga tgcaaattcc  3540
ggtgaccagg tttacaatcg cacggtgaaa ggctccgacg gcaagaccta tatcattggt  3600
aatgacggcg tcgcaatcac gcaaaccatc gccaaaggcc agaccatcaa ggatggcagc  3660
gttctgcgct tctatagcat ggagggtcag ctggtgaccg gcagcggctg gtattccaac  3720
gcgaaaggtc aatggttgta tgtcaagaac ggtcaagtcc tgacgggttt gcagacggtg  3780
ggcagccagc gtgtgtactt tgacgcaaat ggtattcaag cgaaaggtaa agcagtgcgt  3840
acctccgatg gcaaactgcg ttacttcgat gcgaacagcg gcagcatgat caccaatcag  3900
tggaaagaag ttaatggtca gtactactat ttcgacaaca acggtgttgc gatctatcgc  3960
ggttggaact aa                                                  3972

SEQ ID NO: 84          moltype = AA  length = 1323
FEATURE                Location/Qualifiers
source                 1..1323
                       mol_type = protein
                       organism = Streptococcus dentirousetti
SEQUENCE: 84
MVDGKYYYYD ADGNVKKNFA VSVGDAIFYF DETGAYKDTS KVDADKTSSS VNQTTETFAA  60
NNRAYSTAAE NFEAIDNYLT ADSWYRPKSI LKDGTTWTES TKDDFRPLLM AWWPDTETKR  120
NYVNYMNKVV GIDKTYTAET SQADLTAAAE LVQARIEQKI TSEKNTKWLR EAISAFVKTQ  180
PQWNGESEKP YDDHLQNGAL KFDNETSLTP DTQSGYRILN RTPTNQTGSL DPRFTFNQND  240
PLGGYEYLLA NDVDNSNPVV QAESLNWLHY LLNFGSIYAN DPEANFDSIR VDAVDNVDAD  300
LLQISSDYLK SAYKIDKNNK NANDHVSIVE AWSDNDTPYL NDDGDNLMNM DNKFRLSMLW  360
SLAKPTNVRS GLNPLIHNSV VDREVDDREV EATPNYSFAR AHDSEVQDLI RDIIKAEINP  420
NSFGYSFTQE EIDQAFKIYN EDLKKTNKKY THYNVPLSYT LLLTNKGSIP RIYYGDMFTD  480
DGQYMANKTV NYDAIESLLK ARMKYVSGGQ AMQNYNIGNG EILTSVRYGK GALKQSDKGD  540
KTTRTSGIGV VMGNQSNFSL EGKVVALNMG ATHTKQKYRA LMVSTETGVA IYNSDEEAEA  600
AGLIKTTDEN GYLYFLNDDL KGVANPQVSG FLQVWVPVGA PADQDIRVAA TDAASTDGKS  660
LHQDAALDSR VMFEGFSNFQ SFATKEEEYT NVVIAKNVDK FVSWGITDFE MAPQYVSSTD  720
GTFLDSVIQN GYAFTDRYDL GMSKANKYGT ADQLVAAIKA LHAKGLRVMA DWVPDQMYTF  780
PKKEVVTVTR TDKFGNPVAG SQINHTLYVT DTKGSGDDYQ AKYGGAFLDE LKEKYPELFT  840
KKQISTGQAI DPSVKIKQWS AKYFNGSNIL GRGANYVLSD QASNKYFNVA EGKVFLPAAM  900
LGKVVESGIR FDGKGYIYNS STTGEQVKDS FITEAGNLYY FGKDGYMVMG AQNIQGANYY  960
FLANGAALRN SILTDQDGKS HYYANDGKRY ENGYYQFGND SWRYFENGVM AVGLTRVAGH  1020
```

-continued

```
DQYFDKDGIQ AKNKIIVTRD GKVRYFDEHN GNAATNTFIS DQAGHWYYLG KDGVAVTGAQ  1080
TVGKQHLYFE ANGQQVKGDF VTAKDGKLYF LDGDSGDMWT DTFVQDKAGH WFYLGKDGAA  1140
VTGAQTVRGQ KLYFKANGQQ VKGDIVKGAD GKIRYYDANS GDQVYNRTVK GSDGKTYIIG  1200
NDGVAITQTI AKGQTIKDGS VLRFYSMEGQ LVTGSGWYSN AKGQWLYVKN GQVLTGLQTV  1260
GSQRVYFDAN GIQAKGKAVR TSDGKLRYFD ANSGSMITNQ WKEVNGQYYY FDNNGVAIYR  1320
GWN                                                                1323

SEQ ID NO: 85           moltype = AA  length = 1284
FEATURE                 Location/Qualifiers
source                  1..1284
                        mol_type = protein
                        organism = Gluconobacter oxydans
SEQUENCE: 85
MADNSDEQFV ASDYTLLGDA TDDPNGMVDM PAGQEPATTN AVPSGVEYNF LAATAGYYTV  60
SFAYQNTANA AAYEQLSING QNEPGVVEFD QTSGASTGTA YASVYLKAGL NSVELNNQTT  120
DETNGLTPVP EDQLQASPAF QIGTSTVAAG ASPSQETSAQ SLAISNQTDM QAFVQGESMA  180
PKQQWTFGPS LSELHVGSND ELNQLDFNAV WFRNVTPGQQ AETYSPYFKS NESFDANGVL  240
HVNYGAYSPT GQALPVQIQA TYANVPNENL IVENLSLTNQ NASGTQPLVW DVMNATGINP  300
GEVSSTTWDP THNAWIVTED QGSGKSPLYL AIGDYQVSNS THAAGVDGVN VRGSYSLSSG  360
ASGNPSLNAP DQGVIGGFEN NGTMVGSSSG ASGTNLAVGT TDSDVTLNPG QTVDLSYYLS  420
TATSLSQLDA NLDKYTNTVG STTSSTPMTD ATGASAASSW TQQTATAWDD TLNQAYNLAG  480
STETSGQAAT AASGQTLDPT SSAAAQSAYR SSLINILQAQ SPEYGSFMAS TNPSYEYKVW  540
VRDSAATAIG LDDAGLTQPA DKFWRWMASV EQNGMNATYS GNASGTFSTN YGEFDQNLPI  600
GFVAPENDSQ GLFLIGSYRH YEQMLSEGQT QQAQSFISDP TVRQALVNSA NWIQENIGSN  660
GLGPADYSIW EDMYGYHTFT QVTYAEGLNA ASQLASAMGE GNQAQTWATG AETIKDAILR  720
PTTASTPGLW NAQEGHFVEM INPNGTIDNT IDADTNIAAV FGLVSPTSIY ATENAQAVEN  780
ALTQDNFGLS RYQNETFYQS SQWSPGGTYE AQGISPSWPQ MTAYDSIVSM DSGNTTQANN  840
DLSWIEQSYD NGGTPPGESY DWARGQPIES TSSEPVTASW YVQDLLNSTG QTSTLMPAIT  900
GQAPTATPQT DVSVNTGTTG FGSYTLGLDS VGNSQAQDMI VGTGNTSATS VAMVRNEAAA  960
GTPETIDNTN GVNDLLVFGN AGDTNVLAGQ NSTTTIMNNA AGDHGTVEYT GATGASATIL  1020
AGPLTEIQAA GTTNLIMGSQ SDTTTSDAYI TGGQYDSADQ TNITTEGPAG QLDAIDNQGN  1080
AHTTLQVASP TDLLYTGRDT TLNLGTDGQK STINSLGNDQ IHMNGSNVNV ASVTGGFDTF  1140
YGGTGTMTIN ASQSVGYTQE TYIGSQTSGG SLTYTGGNAA NQITLGDESS VAITAGAGAM  1200
NITANDSTGL WANLTNAASA DLNFGSSLGN SMIYGFNGST DSATMQGVTG TSFSGGNLMV  1260
SLADNHSITF FDVHTLQGMN IVGA                                         1284

SEQ ID NO: 86           moltype = DNA  length = 4179
FEATURE                 Location/Qualifiers
source                  1..4179
                        mol_type = unassigned DNA
                        organism = Streptococcus sp.
SEQUENCE: 86
atcaacggca aacaatacta tgtcaatagt gacggtagtg tgcgtaagaa cttcgttttt  60
gagcaagatg gtaagtcata ttactttgat gctgaaacag gggctcttgc gaccaagtca  120
caggatgaat tttcaacaga acctatcaag gcagctgtgg atttttcatc tggaaatcag  180
ctctacaaaa acgataacaa atctttggac caactcgaca ccttcatcac tgcggatgct  240
tggtaccgtc caaagagtat tctcaaggat ggtaagactt ggacagcttc aactgaagcg  300
gacaaacgtc ctctcttgat ggtttggtgg cctgacaaat cgactcaggt taactacctt  360
aactacatgc aaaatcaagg tcttggtgcg ggatcatttt caaccaactc tagccaggaa  420
agtctaaatc tagctgctaa agcggttcag actaagattg aagaacgtat tgcgcgtgaa  480
ggcaatacca actggttgcg tacaagtatc gaccagttca tcaagactca gccaggttgg  540
aatagtagca ctgaaaatag ttcttatgac cacttacaag gcggacagtt gctctttaac  600
aacagtaagg gtgatactgg taaccgtact agctacgcca actctgatta tcgtttgctt  660
aaccgcacac cgacaaacca gagtgggaca cgtaagtatt tcaaggataa ttctatcggt  720
ggtcttgagt tcttgcttgc caacgatatt gacaactcaa acccagctgt tcaggcggag  780
caacttaact ggctccactt tatgatgaat attggaagca tcatggccaa tgacccaaca  840
gccaactttg acggtttgcg tgtcgatgct ttggacaatg tggatgccga ccttctccaa  900
atcgcttcag attacttcaa agcagtctat ggtgttgaca agtccgaagc taatgcgatc  960
aaacacttgt catacttgga agcgtggtct gccaacgacc catactacaa caaggatact  1020
aagggggcac aactgccgat tgataatgcc cttcgtaatg ctcttaccaa ccttttgatg  1080
cgtgataaaa atacacgtat gcagcttggg gacatgactg cttttatgaa tagtagtttg  1140
aatccacgtg gtgctaacga taagaacggt gaacgtatgg ctaactatat tttcacccgt  1200
gcccacgata ctgaagcgca aaccattatc caacgtatca tccgtgatcg tatcaaccca  1260
aatctgtttg gttacaattt caccccgtgat gaaatcaaga aggctttcga gatttacaat  1320
gcggatatca atacagctca caagacttat gcgtcataca acttgccatc tgtctatgcc  1380
ctcatgttga ccaacaagga ctctgtgaca cgtgtttatt atggagacct ctaccgtgaa  1440
gacggtcact acatggccaa gaagacgcct tactttgatg ccatcgatac ccttttgcgt  1500
gcccgtatca agtatgtggc cggtggtcaa gacatggaag tgaagaaagt cggaaatgat  1560
ggacttttga cttctgttcg ttatggtaag ggtgccaata acagcactga ttggggaact  1620
actgaaaccc gtacgcaagg gatgggtgtc attttgacca ataactacga tttccgcttg  1680
ggtagcaatg aaactgtaac gatgaatatg ggtagagccc accgtaatca gctttaccgt  1740
ccattgcttt tgacgactaa ggatggtcta gcaacctacc tcaacgattc tgatgtacct  1800
tcaaaccttc ttaaacgtac cgactggaat gggaatttga ccttcaatgc caacgatgtt  1860
tttggtgtgg aaaatgtgca agtatcaggt tacctcggtg tctgggtacc agtcggggct  1920
aaggctaacc aagacgcacg tacacagcca agtaaccgtg ccaatagtga tggtcaagtt  1980
tacaagtctt cagcagccct tgattcgcaa gttatgtatg aagccttctc aaacttccaa  2040
gcgtttgcgg acgatcagcc agaactctac atgaaccgtg tcttggctaa gaacactgac  2100
ttgctcaaag cgtggggtgt tacatctgtt ggacttccac cacagtacgt ttcaagtaag  2160
gatggtacct tcctcgattc aacgattgac aatggttatg cctttgatga ccgttatgac  2220
```

```
atggccttga gtcaaaataa taaatatggc tcacttgagg acctccttaa cgtccttcgt  2280
gccctccaca aagatggtat tcaagccatt gctgactggg tgccagacca aatctataac  2340
cttccaggta aggaagtggt gaatgccaca cgtgttaacg gctacggtta tcaccaacaa  2400
ggttatcaaa ttgtggacca agcctatgtg gcaaataccc gtacagatgg tacagactat  2460
caaggtagat acggtggtgc cttccttgat gagctgaaag ctaagtaccc atctattttc  2520
aaccgtgtgc aaatctcaaa tggtaagcag ttgcctacga atgaaaagat tacaaaatgg  2580
tctgctaagt acttcaacgg aaccaacatc cttggacgag gcatcaatta tgtccttcgt  2640
gatgacaaga ccaaccagta ctttaatact tcagccaacg gccaactctt gccaacacca  2700
cttcgtgaca caggtgccat cacaagcact caagtcttcc aacgtcgtgg acaagatgtt  2760
tacttccttc gtgataatca agttatcaag aatgaatttg ttcaagacgg taacggtaac  2820
tggtattact tcggtgctga cggtaagatg accaagggtg cccaaaacat caatagcaag  2880
gattactatt tctttgataa tggtgttcaa ttgcgtaacg ctcttcgtcg tgcaagcaac  2940
ggctatactt actattacgg tttagatggt gccatgatta agaatgcctt tgttgatttt  3000
gatgacaaac atcagcaagt tcgtgccttt acgactcaag gaacaatggt agtgggtaac  3060
cttcattgga gtggtcacca tttctatttt gaccgtgaaa ctggtattca ggccaaggat  3120
cgcattgtcc gtaccgatga tggcaagttg cattactatg ttgcccaaac aggtgacatg  3180
ggacgcaatg tctttgcgac agatagcagg acaggcaaac gttattactt tgacgctgat  3240
ggtaacactg tgactggttc acgtgtcatt gacggtaaga cttattactt taaccaagat  3300
ggtagtgtcg gtacggccta cagcaatcgt gcagattcta ttatctttga aaatggtaag  3360
gctcgctata tcaccccagc aggtgagatc ggacgtagca tctttgtcta caacccagca  3420
acaaaggcat ggaactactt tgataaagaa ggtaaccgtg tcacaggtcg tcagtacatt  3480
gacggtaacc tctattactt caaggaagat ggtagtcagg ttaagggcgc tattgttgaa  3540
gaaaatggca tcaagtatta ctatgagccg ggctcaggta ttctcgcaag cggacgctac  3600
ctccaagtag gcgatgacca gtggatttac tttaaacatg acggttcact tgctatcggc  3660
caagttcgtg cagacggtgg ctacctcaaa tactttgata aaaatggtat ccaagtcaag  3720
gggcaaacta tcgtcgaaga tggtcacact tattactatg atgctgatag tggggctctt  3780
gtaacaagta gctttgctga gattgcacca aaccaatggg cttacttcaa cacggaaggc  3840
caagccctca aaggcaagtg gacgatcaat ggcaaggaat actactttga ccaaaatggt  3900
atccaataca agggcaaagc tgttaaggtc ggtagtcgtt acaagtacta tgacgaaaac  3960
gacggtcaac ctgtaaccaa ccgcttcgct caaatcgagc ctaacgtctg ggcttatttc  4020
ggagcagacg gatatgccgt aacgggcgaa caagttatca atggccaaca cctttacttt  4080
gaccaatcag gtcgccaagt taaaggggcc tacgtcacag tcaacggcca acgccgttac  4140
tatgatgcta acactggcga atatatccca ggaagataa                        4179
```

```
SEQ ID NO: 87          moltype = DNA  length = 4179
FEATURE                Location/Qualifiers
source                 1..4179
                       mol_type = unassigned DNA
                       organism = Streptococcus salivarius
SEQUENCE: 87
attaacggca aacaatacta tgtcaatagt gacggtagtg tgcgtaagaa cttcgtcttt  60
gagcaagatg ggaagtcata ttactttgat gctgaaacag gggctcttgc gaccaagtca  120
caggatgaat tttcaacaga acctatcaag gcagctgtgg atttttcatc tggaaatcag  180
ctctacaaaa acgataacaa atctttggac caactcgaca ccttcatcac agcagatgct  240
tggtaccgtc caaagagtat tctcaaggat ggtaagactt ggacagcttc aactgaagcg  300
gacaaacgtc cactcttgat ggtttggtgg cctgacaaat cgactcaggt taactaccta  360
aactacatgc aaaatcaagg tcttggtgcg ggatcatttt caactaactc tagccaagaa  420
agtctaaatc tagctgctaa agcggttcag actaagattg aagaacgtat tgcgcgtgaa  480
ggcaatacaa actggttgcg tacaagtatc gaccagttca tcaagactca gccaggttgg  540
aatagtagca ctgaaaatag ttcctacgac cacttgcaag gtggacagtt gctctttaac  600
aacagtaagg gtgatactgg taaccgtact agctacgcca actctgatta tcgtttgctt  660
aaccgcacac cgactaatca gacgggtaca cgtaagtact tcaaggacaa ttctatcggt  720
ggtcttgagt tcttgcttgc caacgatatt gataactcaa acccagctgt tcaggcggag  780
caacttaact ggctccactt catgatgaat atcggaagta tcatggcaaa tgacccaact  840
gctaactttg atggtttgcg tgtcgatgcc ttggataatg tggatgctga ccttctccaa  900
atcgcttctg attacttcaa agcagcctat ggtgttgaca agtctgaagc caatgcgatc  960
aaacacttgt catacttgga agcatggtct gccaacgacc catattacaa caaggacaat  1020
aagggggcac aactgccgat tgataatgcc cttcgtaatg ctcttaccaa cctttttgatg  1080
cgtgataaaa atacacgtat gcagcttgga gacatgactg cttttatgaa tagtagtttg  1140
aatccacgag gtgctaacga taagaacggt gaacgtatgg caaactatat tttcacccgt  1200
gcccacgata cggaagcgca aaccattatc caacgtatca tccgtgatcg tatcaaccca  1260
aatctgtttg gttacaattt cacccgtgat gaaatcaaga aggccttcga gatttacaat  1320
gcggatatca atacagctca caagacttat gcatcttaca acttgccatc tgtctatgcc  1380
ctcatgttga ccaacaagga ctctgtaaca cgtgtttatt acggtgacct ctaccgtgag  1440
gatggtcact acatggcgaa aaagacgcct tactttgatg ctatcgacac cctcttgcgt  1500
gcccgtatca agtatgtagc tggtggtcaa gacatggaag tgaagaaagt cggaaatgac  1560
ggcctcttga catcagttcg ttatggtaaa ggtgccaata acagaactga ttggggaact  1620
gctgaaaccc gtacgcaagg gatgggtgtc atcatgacca acaactatga tttccgattg  1680
ggtagcaatg aaactgtaac gatgaatatg ggtagagctc accgcaatca actttatcgc  1740
ccattgcttt tgacaacaaa agatggtata gcaacctacc tcaacgattc tgatgtgcct  1800
aaaaaccttc ttaaacgtac cgactggaat gggaacttga ccttcaatgc caatgatatt  1860
tttggtgtgg aaaatgtgca agtatcaggt tacctcggtg tctgggtacc agtcggggct  1920
aaggctaacc aagacgcacg tacacagcca agtaatcgtg ccaatagcga tggtcaagtt  1980
tacaagtctt cagcagccct tgattcgcaa gtcatgtatg aagccttctc aaacttccaa  2040
gcatttgcgg acgatcagcc agaactttac atgaaccgtg tcttggctaa gcacactgac  2100
ttgctcaaag catggggtgt tacgtctgtt ggacttccac cacagtacgt ttcaagtaag  2160
gatggtacct tccttgattc aacaattgac aatggttatg cctttgatga ccgttatgac  2220
atggccttga gtcaaaataa caagtatggc tcacttgagg acctccttaa tgtccttcgt  2280
gccctccaca aagatggtat tcaagccatt gctgactggg tgccagacca aatttataac  2340
```

-continued

```
cttccaggaa aagaagtagt taatgcgaca cgtgttaacg gctacggtta tcaccaacaa  2400
ggttatcaga ttgtggacca agcctatgtg gcaaataccc gtacagatgg tacagactat  2460
caaggtaaat atggtggtgc cttccttgat gagcttaaag ctaagtaccc atctattttc  2520
aaccgtgtgc aaatctcaaa tggtaagcaa ttgcctacga atgaaaagat taccaaatgg  2580
tctgctaagt acttcaacgg aactaacatc cttggacgag gcatcaactt tgtccttcgt  2640
gatgacaaga ccaaccagta ctttaatact tcagccaacg gccaactctt gccaacacca  2700
cttcgtgaca caggtgtcat tacaagcact caagtcttcc aacgtcgtgg acaagatgtt  2760
tacttccttc gtgataacca agccgttaag aatgaatttg ttcaagacgg taacggtaac  2820
tggtattact tcggtgctga cggtaagatg accaagggtg cccaaaacat caatagcaag  2880
gattactatt tctttgataa tggtgttcaa ttgcgtaacg cccttcgtcg tgctaacaac  2940
ggctatactt actattacgg tatagacggt gccatggtta agaatgcctt cgttgatttt  3000
gatgataaac gtaagcaagt ccgtgccttt acaacacaag gaaccatggt agtgggtaac  3060
cttcattgga gtggtcacca tttctacttt gaccgtgaaa ctggtcttca ggctaaggat  3120
cggattgtcc gtactgatga tggcaaattg cattactatg ctgcccaaac aggtgatatg  3180
ggacgcaatg tctttgcgac tgatagcagc acaggcaagc gttattactt cgatgctgat  3240
ggtaacactg tgacaggttc acgtgtcatt gacggtaaga cttattactt taaccaagat  3300
ggtagtgtcg gtacggccta cagcaatcgt gcagattcta ttatctttga aaatggtaag  3360
gctcgctaca tcaccccagc aggcgaaatc ggacgtagca tctttgtcta taacccagca  3420
actaaggcct ggaactactt tgataaagaa ggtaaccgtg tgacaggtcg tcaatacatt  3480
gatggtcacc tctattactt caaggaagat ggtagccaag ctaagggtga aattattgaa  3540
gaaaatggca tcaagtatta ctatgagcca gaatcaggta ttcttgcttc aggacgctac  3600
ctccaagttg gtgatgacca gtggatgtac ttcaaacaag acggttcact ggctatcggc  3660
caagttcgtg ctgatcatgg ataccttaag tactttgata aaaatggtat ccaagtcaag  3720
ggtaaaacca ttgttgaaga tggtaagact tattactatg atgcccacag tggagctctt  3780
gtaacaagca gctttgctga gattgcacca aaccaatggt cttacttcaa tactgatgga  3840
caagccctta aaggcaagtg gactatcaat ggcaaggaat actactttga ccaaaatggt  3900
atccaataca agggcaaagc cgttaaggtc ggtagtcgtt acaagtacta tgacgaaaac  3960
gatggtcaac ctgtaaccaa ccgcttcgct caaatcgagc ctaacgtctg ggcttatttc  4020
ggagctgatg gctatgccgt aacaggcgaa caagtcatca atggacaaca cctttacttt  4080
gaccaatcag gtcgccaagt taaaggtgcc tacgtcacag tcaacggcca acgccgttac  4140
tatgatgcta acactggcga atatatccca ggaagataa                        4179
```

```
SEQ ID NO: 88          moltype = AA  length = 1392
FEATURE                Location/Qualifiers
source                 1..1392
                       mol_type = protein
                       organism = Streptococcus salivarius
SEQUENCE: 88
INGKQYYVNS DGSVRKNFVF EQDGKSYYFD AETGALATKS QDEFSTEPIK AAVDFSSGNQ  60
LYKNDNKSLD QLDTFITADA WYRPKSILKD GKTWTASTEA DKRPLLMVWW PDKSTQVNYL  120
NYMQNQGLGA GSFSTNSSQE SLNLAAKAVQ TKIEERIARE GNTNWLRTSI DQFIKTQPGW  180
NSSTENSSYD HLQGGQLLFN NSKGDTGNRT SYANSDYRLL NRTPTNQTGT RKYFKDNSIG  240
GLEFLLANDI DNSNPAVQAE QLNWLHFMMN IGSIMANDPT ANFDGLRVDA LDNVDADLLQ  300
IASDYFKAAY GVDKSEANAI KHLSYLEAWS ANDPYYNKDN KGAQLPIDNA LRNALTNLLM  360
RDKNTRMQLG DMTAFMNSSL NPRGANDKNG ERMANYIFTR AHDTEAQTII QRIIRDRINP  420
NLFGYNFTRD EIKKAFEIYN ADINTAHKTY ASYNLPSVYA LMLTNKDSVT RVYYGDLYRE  480
DGHYMAKKTP YFDAIDTLLR ARIKYVAGGQ DMEVKKVGND GLLTSVRYGK GANNRTDWGT  540
AETRTQGMGV IMTNNYDFRL GSNETVTMNM GRAHRNQLYR PLLLTTKDGI ATYLNDSDVP  600
KNLLKRTDWN GNLTFNANDI FGVENVQVSG YLGVWVPVGA KANQDARTQP SNRANSDGQV  660
YKSSAALDSQ VMYEAFSNFQ AFADDQPELY MNRVLAKHTD LLKAWGVTSV GLPPQYVSSK  720
DGTFLDSTID NGYAFDDRYD MALSQNNKYG SLEDLLNVLR ALHKDGIQAI ADWVPDQIYN  780
LPGKEVVNAT RVNGYGYHQQ GYQIVDQAYV ANTRTDGTDY QGKYGGAFLD ELKAKYPSIF  840
NRVQISNGKQ LPTNEKITKW SAKYFNGTNI LGRGINFVLR DDKTNQYFNT SANGQLLPTP  900
LRDTGVITST QVFQRRGQDV YFLRDNQAVK NEFVQDGNGN WYYFGADGKM TKGAQNINSK  960
DYYFFDNGVQ LRNALRRANN GYTYYYGIDG AMVKNAFVDF DDKRKQVRAF TTQGTMVVGN  1020
LHWSGHHFYF DRETGLQAKD RIVRTDDGKL HYYAAQTGDM GRNVFATDSS TGKRYYFDAD  1080
GNTVTGSRVI DGKTYYFNQD GSVGTAYSNR ADSIIFENGK ARYITPAGEI GRSIFVYNPA  1140
TKAWNYFDKE GNRVTGRQYI DGHLYYFKED GSQAKGEIIE ENGIKYYYEP ESGILASGRY  1200
LQVGDDQWMY FKQDGSLAIG QVRADHGYLK YFDKNGIQVK GKTIVEDGKT YYYDAHSGAL  1260
VTSSFAEIAP NQWSYFNTDG QALKGKWTIN GKEYYFDQNG IQYKGKAVKV GSRYKYYDEN  1320
DGQPVTNRFA QIEPNVWAYF GADGYAVTGE QVINGQHLYF DQSGRQVKGA YVTVNGQRRY  1380
YDANTGEYIP GR                                                   1392
```

```
SEQ ID NO: 89          moltype = DNA  length = 4179
FEATURE                Location/Qualifiers
source                 1..4179
                       mol_type = unassigned DNA
                       organism = Streptococcus salivarius
SEQUENCE: 89
atcaatggca aacaatacta tgtcaatagt gacggtagtg tgcgtaagaa ctttgtcttt  60
gagcaagatg gtaagtcata ttactttgat gctgaaacag gggctcttgc gaccaagtca  120
caggatgaat tttcaacaga acctatcaag gcagctgtgg atttttcatc tggaaatcag  180
ctctacaaaa acgataacaa atctttggac caactcgaca ccttcatcac tgcggatgct  240
tggtaccgtc caaagagtat tctcaaggat gggaagactt ggacagcttc aactgaagcg  300
gacaaacgtc ctatcttgat ggtttggtgg cctgacaaat cgactcaggt taactacctt  360
aactacatgc aaaatcaagg tcttggtgca ggatcatttt caaccaactc tagtcaggaa  420
agtctaaatc aagctgctaa gatggttcag actaagattg aagaacgtat cgcgcgtgaa  480
ggcaatacca actggttgcg tacaagtatt gatcagttta tcaagactca gccaggttgg  540
aatagcagta ctgaaaatag ttcatacgac cacttgcaag gcggtcaatt gctctttaac  600
```

```
aacagtaagg gtgatacagg aaaccgtact agctacgcca actctgatta tcgtttgctt  660
aaccgcacac cgacgaacca gagtggaaca cgtaagtatt tcaaggacaa ttctatcggt  720
ggtcttgagt tcttgcttgc caacgatatt gataactcaa acccagctgt ccaggcggag  780
caacttaact ggctccactt catgatgaat atcggaagca tcatggcaaa tgacccaaca  840
gccaactttg acggtttgcg tgtcgatgct ttggacaatg tggatgctga ccttctccaa  900
atcgcctcag attacttcaa agcagcctat ggtgttgaca agtctgaagc caatgcgatc  960
aaacacttgt catacttgga agcatggtct gctaacgacc catactacaa caaggatact  1020
aagggggcac aactgccgat tgataatgcc cttcgtaatg cccttaccaa ccttttgatg  1080
cgtgataaaa atacacgtat gcagcttggg gacatgacgg ccttcatcaa cagtagtttg  1140
aatccacgtg gtgctaacga taagaacggt gagcgcatgg caaactatat tttcacccgt  1200
gcccacgata ctgaagcgca aaccattatc caacgtatca tccgtgatcg tatcaaccca  1260
aatctgtttg gttacaattt cactcgtgat gaaatcaaga aggccttcga gatttacaat  1320
gcggatattg ataaggctca taaaacttat gcgtcttaca acttgccatc tgtctatgct  1380
ctcatgttga ccaacaagga ctctgtgaca cgtgtttatt atggagacct ctatcgtgag  1440
gatggtcact acatggccca aaagacgcct tactttgatg ctattgacac ccttttgcgt  1500
gctcgtatca agtatgtggc cggtggtcaa gacatggaag tgaagaaagt cggaaatgac  1560
ggacttttga cttctgttcg ttatggtaaa ggtgccaata acagaactga ttggggaact  1620
gctgaaaccc gtacgcaagg gatgggtgtc atcatgacca acaactatga tttccgattg  1680
ggtagcaatg aaactgtaac gatgaatatg ggtagagccc accgcaatca gctttatcgc  1740
ccattgcttt tgacaacaaa agacggtata gcaacctacc tcaacgattc tgatgtgcct  1800
aaaaaccttc ttaaacgtac agatggctat gggaacttga ccttcaatgc caatgatgtt  1860
tttggtgtgg aaaatgtgca agtatcaggt tacctcggtg tttgggtacc agttggagct  1920
acgcctaacc aggacgcacg tacacagcca agtaaccgtg ccaacagtga tggtcaagtt  1980
tacaagtctt cagcagccct tgattcgcaa gtcatgtatg aagccttctc aaacttccaa  2040
gcctttgcgg acgatcagcc agaactctac atgaaccgtg tcttagctaa gaacactgac  2100
ttgctcaaag catggggtgt tacgtctgtt ggacttccac cacagtacgt ttcaagtaaa  2160
gacggtacct tccttgattc aacgattgac aatggttatg cctttgatga ccgttatgac  2220
atggccttga gtcaaaataa taaatacgga tcacttgagg accttcttaa cgtccttcgt  2280
gccctccaca aagatggtat ccaagctatc gctgactggg tgccagacca aatctataac  2340
cttccaggaa aagaagttgt gaatgcgaca cgtgttaacg gctacggtta tcaccaacaa  2400
ggttatcaaa ttgtggacca agcctatgtg gcaaataccc gtacagatgg tacagactat  2460
caaggtaagt acggtggtgc cttccttgat gagctaaaag ctaagtaccc atctattttc  2520
aaccgtgtgc aaatctcaaa tggtaaacag ttgcctacga atgaaaagat taccaaatgg  2580
tctgctaagt acttcaacgg aaccaacatc cttggacgag gcatcaactt tgtccttcgt  2640
gatgacaaga caaaccagta ctttaatact tcagccaacg gccaactctt gccaacacca  2700
cttcgtgata atggtgccat cacaagcact caagtcttcc aacgtcgtgg acaagatgtt  2760
tacttccttc gtgataatca agtcatcaag aatgaatttg ttcaagacgg tgacggcaac  2820
tggtactact tcggtgctga tggtaagatg actaagggta ttcaaaccat caatagcaag  2880
gattactatt tctttgacaa tggtgttcaa ttgcgtaatg cccttcgtcg tgccaacaac  2940
ggttatactt actattacgg tatagacggt gccatgatta agaatgcctt cgtcgatttt  3000
gatgacaaac atcagcaagt tcgtgccttt acgactcaag gaaccatggt agtgggtaac  3060
cttcattgga gtggtcacca tttctacttt gaccgtgaaa cgggtatcca ggccaaggat  3120
cgtattgttc gtacagatga tggcaaattg cattattatg ttgcccaaac aggtgacatg  3180
ggacgcaatg tctttgcgac agacagcagc acaggtaaac gttattactt cgatgctgat  3240
ggtaacactg tgacaggttc acgtgtcatt gacggtaaga cctattactt taaccaagat  3300
ggtagtgtcg gtacggccta cagcaaccga gcggattcta ttatctttga aaatggtaag  3360
gctcgctaca tcaccccagc aggtgaaatc ggacgcagta tctttgtcta taacccagca  3420
actaaggctt ggaactactt tgataaagaa ggtaaccgtg ttactggacg tcagtacatt  3480
gacggtaacc tctattactt caaggaagat ggtagtcagg ttaagggcgc tattgtcgaa  3540
gaaaatggca tcaaatatta ctatgagcca gattcaggta tccttgcgag aaaccgttac  3600
ctccaagtag gtgacgacca gtggatttac tttaaacatg atggttcact ggctatcggg  3660
caggttcgtg cagacggtgg ctacctcaaa tactttgata aaaatggtat ccaagtcaag  3720
ggtcaaacta tcatcgaaga tggtcacact tattactatg atgctaatag tggtgccctc  3780
gtcacaagta gctttgctga gattgcacca aaccaatggt cttatttcaa tactgaaggc  3840
caagccctta aaggcaattg gactatcaat ggcaaggaat actactttga ccaaaatggt  3900
atccagtaca agggcaaggc cgttaaggtc ggcagtcgtt acaagtacta tgacgaaaac  3960
gatggacaac ctgtaaccaa ccgcttcgct caaatcgagc ctaacgtctg ggcttacttt  4020
ggagcagatg gatatgccgt gacaggggaa caagtcatca atggacaaca cctttacttt  4080
gaccaatcag gtcgccaagt taaaggtgcc tacgtcacag tcaacggtca acgtcgttac  4140
tacgatgcca acactggcga atatgtccca ggaagataa                         4179
```

```
SEQ ID NO: 90          moltype = AA  length = 1392
FEATURE                Location/Qualifiers
source                 1..1392
                       mol_type = protein
                       organism = Streptococcus salivarius
SEQUENCE: 90
INGKQYYVNS DGSVRKNFVF EQDGKSYYFD AETGALATKS QDEFSTEPIK AAVDFSSGNQ  60
LYKNDNKSLD QLDTFITADA WYRPKSILKD GKTWTASTEA DKRPILMVWW PDKSTQVNYL  120
NYMQNQGLGA GSFSTNSSQE SLNQAAKMVQ TKIEERIARE GNTNWLRTSI DQFIKTQPGW  180
NSSTENSSYD HLQGGQLLFN NSKGDTGNRT SYANSDYRLL NRTPTNQSGT RKYFKDNSIG  240
GLEFLLANDI DNSNPAVQAE QLNWLHFMMN IGSIMANDPT ANFDGLRVDA LDNVDADLLQ  300
IASDYFKAAY GVDKSEANAI KHLSYLEAWS ANDPYYNKDT KGAQLPIDNA LRNALTNLLM  360
RDKNTRMQLG DMTAFINSSL NPRGANDKNG ERMANYIFTR AHDTEAQTII QRIIRDRINP  420
NLFGYNFTRD EIKKAFEIYN ADIDKAHKTY ASYNLPSVYA LMLTNKDSVT RVYYGDLYRE  480
DGHYMAQKTP YFDAIDTLLR ARIKYVAGGQ DMEVKKVGND GLLTSVRYGK GANNRTDWGT  540
AETRTQGMGV IMTNNYDFRL GSNETVTMNM GRAHRNQLYR PLLLTTKDGI ATYLNDSDVP  600
KNLLKRTDGY GNLTFNANDV FGVENVQVSG YLGVWVPVGA TPNQDARTQP SNRANSDGQV  660
YKSSAALDSQ VMYEAFSNFQ AFADDQPELY MNRVLAKNTD LLKAWGVTSV GLPPQYVSSK  720
```

-continued

```
DGTFLDSTID NGYAFDDRYD MALSQNNKYG SLEDLLNVLR ALHKDGIQAI ADWVPDQIYN  780
LPGKEVVNAT RVNGYGYHQQ GYQIVDQAYV ANTRTDGTDY QGKYGGAFLD ELKAKYPSIF  840
NRVQISNGKQ LPTNEKITKW SAKYFNGTNI LGRGINFVLR DDKTNQYFNT SANGQLLPTP  900
LRDNGAITST QVFQRRGQDV YFLRDNQVIK NEFVQDGDGN WYYFGADGKM TKGIQTINSK  960
DYYFFDNGVQ LRNALRRANN GYTYYYGIDG AMIKNAFVDF DDKHQQVRAF TTQGTMVVGN  1020
LHWSGHHFYF DRETGIQAKD RIVRTDDGKL HYYVAQTGDM GRNVFATDSS TGKRYYFDAD  1080
GNTVTGSRVI DGKTYYFNQD GSVGTAYSNR ADSIIFENGK ARYITPAGEI GRSIFVYNPA  1140
TKAWNYFDKE GNRVTGRQYI DGNLYYFKED GSQVKGAIVE ENGIKYYYEP DSGILARNRY  1200
LQVGDDQWIY FKHDGSLAIG QVRADGGYLK YFDKNGIQVK GQTIIEDGHT YYYDANSGAL  1260
VTSSFAEIAP NQWSYFNTEG QALKGNWTIN GKEYYFDQNG IQYKGKAVKV GSRYKYYDEN  1320
DGQPVTNRFA QIEPNVWAYF GADGYAVTGE QVINGQHLYF DQSGRQVKGA YVTVNGQRRY  1380
YDANTGEYVP GR                                                  1392

SEQ ID NO: 91          moltype = DNA  length = 4179
FEATURE                Location/Qualifiers
source                 1..4179
                       mol_type = unassigned DNA
                       organism = Streptococcus sp.
SEQUENCE: 91
attaacggca aacaatacta tgtcaatagt gacggtagtg tgcgtaagaa ctttgtcttt  60
gagcaagatg gtaagtcata ttactttgat gctgaaacag gggctcttgc gaccaagtca  120
caggatgaat tttcaacaga acctatcaag gcagctgtgg atttttcatc tggaaatcag  180
ctctacaaaa acgataacaa gtctttggac caactcgaca ccttcatcac agcggatgcc  240
tggtaccgtc caaagagtat tctcaaggat ggtaagactt ggacagcttc aactgaagcg  300
gacaaacggc ctctcttgat ggtttggtgg cctgataaat cgactcaggt taactacctt  360
aactacatgc aaaatcaagg tcttggtgca ggttcatttt caaccaactc tagccaggaa  420
agtctaaatc tagctgctaa agcggttcag actaagattg aagagcgtat tgcgcgtgaa  480
ggcaatacca actggttgca tacaagtatt gatcagttta tcaagactca gccaggttgg  540
aatagtagca ctgaaaatag ttcatacgac cacttgcaag gtggacagtt gctctttaac  600
aacagtaagg gtgatactgg taatcgtacc agctacgcca actctgacta tcgtctactt  660
aaccgcacac ctactaacca gacgggtaca cgtaagtact tcaaggacaa ttctatcggt  720
ggtcttgagt tcttgcttgc caacgatatt gataactcaa acccagctgt tcaggcggag  780
caacttaact ggctccactt tatgatgaat atcggaagca tcatggcaaa cgatccaaca  840
gccaactttg acggtttgcg tgtcgatgct ttggacaatg tggatgctga ccttctccaa  900
atcgcttcag attacttcaa agcagcctat ggtgttgaca agtctgaagc caatgcgatc  960
aaacacttgt catacttgga agcatggtct gccaacgacc catattacaa caaggacaat  1020
aagggggcac aactgccgat tgataatgcc cttcgtaatg ctcttaccaa ccttttgatg  1080
cgtgataaaa atacacgtat gcaacttggg gacatgactg cttttatgaa tagtagtttg  1140
aatccacgtg gtgctaatga taagaacggt gaacgtatgg caaactatat tttcacccgt  1200
ggacacgata ctgaagcgca aaccattatc caacgtatca ttcgtgatcg tatcaatcca  1260
aatctgtttg gttacaattt cacccgtgat gaaattaaga aggccttcga gatttacaat  1320
gaggatattg ataaggctca taaaacttat gcgtcttaca acttgccatc tgtctatgcc  1380
ctcatgttga ccaacaagga ctctgtaaca cgtgtttatt acggtgacct ctaccgtgag  1440
gatggtcact acatggcgaa aaagacgcct tactttgatg ctatcgacac cctcttgcgt  1500
gcccgtatca agtatgtagc tggtggtcaa gacatggaag tgaagaaagt cggaaatgac  1560
ggcctcttga catcagttcg ttatggtaaa ggtgccaata acagaactga ttggggaact  1620
gctgaaaccc gtacgcaagg gatgggtgtc atcatgacca acaactatga tttccgattg  1680
ggtagcaatg aaactgtaac gatgaatatg ggtagagccc accgtaatca gctttaccgt  1740
ccattgcttt tgacgactaa ggatggtcta gcaacctacc tcaacgattc tgatgtacct  1800
tcaaaccttc ttaaacgtac cgactggaat gggaacttga ccttcaatgc caacgatgtt  1860
tttggtgtgg aaaatgtgca agtatcaggt tacctcggtg tctgggtacc agtcggggct  1920
aaggctaacc aagacgcacg tacacagcca agtaaccgtg ccaatagcga tggacaagtt  1980
tacaagtctt cagcagccct tgattcgcaa gtcatgtatg aagccttctc aaacttccaa  2040
gcatttgcgg acgatcagcc agaactctac atgaaccgtg tcttggctaa gcacactgac  2100
ttgctcaaag catggggtgt tacgtctgtt ggacttccac cacagtacgt ttcaagtaaa  2160
gatggtacct tccttgattc aacaattgac aatggttatg cctttgatga ccgttatgac  2220
atggccttga gtcaaaataa caagtatggc tcacttgagg acctccttaa tgttcttcgt  2280
gccctccaca aagatggtat tcaagccatt gctgactggg tgccagacca aatttataac  2340
cttccaggaa aagaagtagt taatgccaca cgtgttaacg gctacggtta tcaccaacaa  2400
ggttatcaaa ttgtggacca agcctatgtg gcaaataccc gtacagatgg tacagactat  2460
caaggtaaat atggtggtgc cttccttgat gagcttaaag ctaagtaccc atctattttc  2520
aaccgtgtgc aaatctcaaa tggtaagcag ttgcctacga atgaaaagat taccaaatgg  2580
tctgctaagt acttcaatgg aaccaatatc cttggacgag gtatcaacta tgtccttcgt  2640
gatgacaaga ccaaccagta ctttaatacc tcagccaacg gccaactctt gccaacacca  2700
cttcgtgaca caggtgccat cacaagcact caagtcttcc aacgtcgtgg acaagacgtt  2760
tacttccttc gtgataacca aaccgttaag aatgaatttg ttcaagatgg taacggtaac  2820
tggtattact tcggtggtga cggtaagatg accaagggtg ctcgaaacat caataacaag  2880
gattactatt tctttgacaa tggtatccaa ttgcgtaacg cccttcgtcg tgcttcaaac  2940
ggctatacct actattacgg tctggacggt gccatggtta agaatgcctt cgttgatttt  3000
gatgacaaac ataagcaggt tcgtgccttt acgactcaag gaacaatggt agtaggtaac  3060
cttcattgga gtggacacca tttctacttt gaccgtgaaa ctggtattca ggctaaggat  3120
cgcattgtcc gtacagatga tggcaaattg cattactatg ttgctgaaac tggtgatatg  3180
ggacgtaacg tctttgcgac agacagcagc acaggtaaac gttattactt tgacgctgac  3240
ggtaatactg tgactggttc acgtgtcatt gatggtaaga cttattactt taaccaagat  3300
ggtagcgtcg gtacggccta cagcaatcgt gcagattcta ttatctttga aaatggtaag  3360
gctcgctaca tcacaccagc aggcgaaatc ggacgcagca tctttgtcta taatccagca  3420
actaaggctt ggaattactt tgataaagaa ggtaaccgtg ttacaggacg tcaatacatt  3480
gatggtcacc tttattactt caaggaagat ggtagccaag ctaagggtga aattatcgaa  3540
gaaaatggca tcaaatatta ttatgagcca gaatcaggta ttcttgcttc aggacgctat  3600
```

```
ctccaagtag gtgatgacca gtggatgtac ttcaaacacg atggttcact ggctatcggc  3660
caagttcgtg ctgatcatgg ataccttaag tactttgata aaaatggtat ccaagttaag  3720
gggaaaactg ttgtcgaaga tggtaagact tattactatg atgcccacag tggagctctt  3780
gtcacaagca gctttgctga gattgcacca aaccaatggt cttacttcaa tactgatgga  3840
caagccctta aaggcaagtg gactatcaat ggcaaggaat actactttga cgaaaatggt  3900
atccaataca aaggcaaggc cattaaggtc ggcagtcgtt acaagtacta tgacgaaaac  3960
gacggtcaac ctgtaaccaa ccgctttgct caaatcgagc ctaacgtctg ggcttacttc  4020
ggagcagatg gttatgccgt aacaggcgaa caagtcatca atggacaaca cctttacttt  4080
gatcaatcag gtcgccaagt taaaggtgcc tacgtcacag ttaacggtca acgccgttat  4140
tacgatgcta acactggcga atatgtccca gaaagataa                        4179

SEQ ID NO: 92          moltype = AA  length = 1392
FEATURE                Location/Qualifiers
source                 1..1392
                       mol_type = protein
                       organism = Streptococcus sp.
SEQUENCE: 92
INGKQYYVNS DGSVRKNFVF EQDGKSYYFD AETGALATKS QDEFSTEPIK AAVDFSSGNQ  60
LYKNDNKSLD QLDTFITADA WYRPKSILKD GKTWTASTEA DKRPLLMVWW PDKSTQVNYL  120
NYMQNQGLGA GSFSTNSSQE SLNLAAKAVQ TKIEERIARE GNTNWLHTSI DQFIKTQPGW  180
NSSTENSSYD HLQGGQLLFN NSKGDTGNRT SYANSDYRLL NRTPTNQTGT RKYFKDNSIG  240
GLEFLLANDI DNSNPAVQAE QLNWLHFMMN IGSIMANDPT ANFDGLRVDA LDNVDADLLQ  300
IASDYFKAAY GVDKSEANAI KHLSYLEAWS ANDPYYNKDN KGAQLPIDNA LRNALTNLLM  360
RDKNTRMQLG DMTAFMNSSL NPRGANDKNG ERMANYIFTR GHDTEAQTII QRIIRDRINP  420
NLFGYNFTRD EIKKAFEIYN EDIDKAHKTY ASYNLPSVYA LMLTNKDSVT RVYYGDLYRE  480
DGHYMAKKTP YFDAIDTLLR ARIKYVAGGQ DMEVKKVGND GLLTSVRYGK GANNRTDWGT  540
AETRTQGMGV IMTNNYDFRL GSNETVTMNM GRAHRNQLYR PLLLTTKDGL ATYLNDSDVP  600
SNLLKRTDWN GNLTFNANDV FGVENVQVSG YLGVWVPVGA KANQDARTQP SNRANSDGQV  660
YKSSAALDSQ VMYEAFSNFQ AFADDQPELY MNRVLAKHTD LLKAWGVTSV GLPPQYVSSK  720
DGTFLDSTID NGYAFDDRYD MALSQNNKYG SLEDLLNVLR ALHKDGIQAI ADWVPDQIYN  780
LPGKEVVNAT RVNGYGYHQQ GYQIVDQAYV ANTRTDGTDY QGKYGGAFLD ELKAKYPSIF  840
NRVQISNGKQ LPTNEKITKW SAKYFNGTNI LGRGINYVLR DDKTNQYFNT SANGQLLPTP  900
LRDTGAITST QVFQRRGQDV YFLRDNQTVK NEFVQDGNGN WYYFGGDGKM TKGARNINNK  960
DYYFFDNGIQ LRNALRRASN GYTYYYGLDG AMVKNAFVDF DDKHKQVRAF TTQGTMVVGN  1020
LHWSGHHFYF DRETGIQAKD RIVRTDDGKL HYYVAETGDM GRNVFATDSS TGKRYYFDAD  1080
GNTVTGSRVI DGKTYYFNQD GSVGTAYSNR ADSIIFENGK ARYITPAGEI GRSIFVYNPA  1140
TKAWNYFDKE GNRVTGRQYI DGHLYYFKED GSQAKGEIIE ENGIKYYYEP ESGILASGRY  1200
LQVGDDQWMY FKHDGSLAIG QVRADHGYLK YFDKNGIQVK GKTVVEDGKT YYYDAHSGAL  1260
VTSSFAEIAP NQWSYFNTDG QALKGKWTIN GKEYYFDENG IQYKGKAIKV GSRYKYYDEN  1320
DGQPVTNRFA QIEPNVWAYF GADGYAVTGE QVINGQHLYF DQSGRQVKGA YVTVNGQRRY  1380
YDANTGEYVP ER                                                     1392

SEQ ID NO: 93          moltype = DNA  length = 4179
FEATURE                Location/Qualifiers
source                 1..4179
                       mol_type = unassigned DNA
                       organism = Streptococcus sp.
SEQUENCE: 93
attaacggca aacaatacta tgtcaatagt gacggtagtg tgcgtaagaa ctttgtcttt  60
gagcaagatg gtaagtctta ttactttgat gctgaaacag gggctcttgc gactaagtca  120
caggatgaat tttcaacaga accaatcaag gcaaccgtcg atttttcatc tggaaaccag  180
ctctacaaaa acgatgataa atcgttggac cagctcgata ccttcatcac agcggatgct  240
tggtaccgtc caaagagcat tctcaaggat ggtaagactt ggacggcttc aactgaggct  300
gacaaacgtc cactcttgat ggtttggtgg cctgacaagt caactcaggt taactacctt  360
aactacatgc aaaatcaagg tcttggtgca ggctcatttt caaccaactc tagccaggaa  420
agtctggacc aagctgctaa agcggttcag actaagattg aagaacgtat cgctcgtgaa  480
ggcaatacca actggttgcg tacaagtatt gatcagttca tcaagactca gccaggttgg  540
aatagtagca ctgaaaatag ttcatacgac cacttgcaag gcggacagtt gctctttaac  600
aatagtaagg gtgatactgg taaccgtact agctacgcca actctgatta tcgtttgctt  660
aaccgcacac cgacaaacca gagtgggaca cgtaagtact tcaaggacaa ttctatcggt  720
ggtcttgagt tcttgcttgc caacgatatt gataactcaa acccagctgt tcaggcggag  780
caacttaact ggctccactt tatgatgaat atcggaagca tcatggcaaa cgacccaaca  840
gccaactttg acggtttgcg tgtcgatgcc ttggacaatg tggatgctga ccttctccaa  900
atcgcttcag attacttcaa agcagcctat ggtgttgaca agtctgaagc caatgcgatc  960
aaacacttgt catacttgga agcctggtct gccaacgacc catattacaa caaggacact  1020
aagggggcac aactgccgat tgataatgcc cttcgtaatg ctcttaccaa cctttttgatg  1080
cgtgataaaa atacacgtat gcagcttggg gacatgactg ccttcatcaa cagtagtttg  1140
aatccacgtg gtgccaacga taaaaatggt gagcgtatgg ctaactatat tttcacccgt  1200
gcccacgata ctgaagccca aaccattatc caacgtatca tccgtgatcg tatcaatcca  1260
aatctgtttg gctacaattt cacccgtgat gaaatcaaga aagccttcga gatttacaat  1320
gcggatatca atacagctca caagacttat gcgtcataca acttgccatc tgtctatgcc  1380
ctcatgttga ccaacaagga ctctataaca cgtgtttatt acggtgacct ctaccgtgag  1440
gatggtcact acatggcaaa gaagacgcct tactttgatg ccatcgacac cctcttgcgt  1500
gcccgtatca agtatgtagc tggtggtcaa gacatggaag tgaagaaagt cggaaatgac  1560
ggcctcttga catcagttcg ttatgggaaa ggtgccaata acagaactga ttggggaact  1620
gctgaaaccc gtacgcaagg gatgggtgtc atcatgacca ataactatga tttccgattg  1680
ggtagcaatg aaactgtaac gatgaatatg ggtagagccc accgtaatca gctttaccgt  1740
ccattgcttt tgacgactaa ggatggtata gcaacctacc tcaacgattc tgatgtacct  1800
tcaaaccttc ttaaacgtac cgactggaat gggaacttga ccttcaatac caatgatatt  1860
```

```
tttggtgtgg aaaatgtgca agtatcaggt tacctcggtg tctgggtacc agtcggggct  1920
aaggctaacc aagacgcacg tacacagcca agtaaccgtg ccaatagcga tggtcaagtt  1980
tacaagtctt cagcagccct tgattcgcaa gtcatgtatg aagcattctc aaacttccaa  2040
gcatttgcgg acgatcagcc agaactctac atgaaccgtg tcttggctaa gaacactgac  2100
ttgctcaaag catggggtgt tacatctgtt ggacttccac cacagtacgt ttcaagtaaa  2160
gatggtacct tcctcgattc aacgattgac aatggttatg cctttgatga ccgttatgac  2220
atggccttga gtcaaaataa caagtatggc tcacttgaag acctccttaa cgtccttcgt  2280
gccctccaca aagatggtat tcaggccatt gctgactggg tgccagacca aatctataac  2340
cttccaggta aggaagtggt gaatgccacg cgtgttaacg gctacggtta tcatcaacaa  2400
ggttatcaaa ttgtggacca agcctatgtg gcaaataccc gtacagatgg cacagactat  2460
caaggcaagt acggtggtac cttccttgat gagcttaaag ctaagtaccc atctattttc  2520
aaccgtgtgc aaatttcaaa tggtaagcag ttgcctacga atgaaaagat caccaaatgg  2580
tctgctaagt acttcaacgg aaccaacatc cttggacgag gcatcaatta tgttcttcgt  2640
gatgacaaga ccaatcagta ctttaatact tcagccaacg gccaactctt gccaacacca  2700
cttcgtgaca cgggtgccat cacaagcact caagtcttcc aacgtcgtgg acaagatgtt  2760
tacttccttc gtgataatca agttatcaaa aatgaatttg ttcaagacgg tgacggcaac  2820
tggtattact tcggtgctga cggtaagatg actaagggta ttcaaactat caatagcaag  2880
gattactatt tctttgacaa tggtatccaa ttgcgtaacg ctcttcgtcg tgcttcaaac  2940
ggttatactt actattacgg tctggacggt gccatgatta agaatgcctt tgttgatttt  3000
gatgacaaac atcagcaagt tcgtgccttt acgactcaag gaacaatggt agtgggtaac  3060
cttcattgga gtggtcacca tttctatttt gaccgtgaaa cgggtattca ggccaaggat  3120
cgcattgtcc gtaccgatga tggcaagttg cattactatg ctgcccaaac aggtgacatg  3180
ggacgcaatg tctttgcgac agatagcagg acaggcaaac gttattactt tgacgctgat  3240
ggtaacactg tgactggttc acgtgtcatt gacggtaaga cttattactt taaccaagat  3300
ggtagtgtcg gtacggccta cagcaatcgt gcagattcta ttatctttga aaatggtaag  3360
gctcgctaca tcacaccagc aggcgaaatc ggacgcagca tctttgtcta taatccagca  3420
actaaggctt ggaattactt tgataaagaa ggtaaccgtg ttacaggacg tcaatacatt  3480
gatggtcacc tttattactt caaggaagat ggtagccaag ctaagggtga aattatcgaa  3540
gaaaatggca tcaaatatta ttatgagcca gaatcaggta ttcttgcttc aggacgctac  3600
ctccaagttg gtgatgacca gtggatgtac ttcaaacaag acggttcact ggctatcggc  3660
caagttcgtg ctgatcatgg ataccttaag tactttgata aaaatggtat ccaagttaag  3720
gggaaaactg ttgtcgaaga tggtaagact tattactatg atgcccacag tggagctctt  3780
gtcacaagca gctttgctga gattgcacca aaccaatggt cttacttcaa tactgatgga  3840
caagccctta aaggcaagtg gactatcaat ggcaaggaat actactttga cgaaaatggt  3900
atccaatata aaggcaaggc cattaaggtc ggcagtcgtt acaagtacta tgacgaaaac  3960
gacggtcaac ctgtaaccaa ccgctttgct caaatcgagc ctaacgtctg ggcttacttc  4020
ggagcagatg gttatgccgt aacaggcgaa caagtcatca atggacaaca cctttacttt  4080
gatcaatcag gtcgtcaagt taaaggtgcc tacgtcacag ttaacggtca acgccgttat  4140
tacgatgcta acactggcga atatgtccca gaaagataa                         4179

SEQ ID NO: 94          moltype = AA  length = 1392
FEATURE                Location/Qualifiers
source                 1..1392
                       mol_type = protein
                       organism = Streptococcus sp.
SEQUENCE: 94
INGKQYYVNS DGSVRKNFVF EQDGKSYYFD AETGALATKS QDEFSTEPIK ATVDFSSGNQ  60
LYKNDDKSLD QLDTFITADA WYRPKSILKD GKTWTASTEA DKRPLLMVWW PDKSTQVNYL  120
NYMQNQGLGA GSFSTNSSQE SLDQAAKAVQ TKIEERIARE GNTNWLRTSI DQFIKTQPGW  180
NSSTENSSYD HLQGGQLLFN NSKGDTGNRT SYANSDYRLL NRTPTNQSGT RKYFKDNSIG  240
GLEFLLANDI DNSNPAVQAE QLNWLHFMMN IGSIMANDPT ANFDGLRVDA LDNVDADLLQ  300
IASDYFKAAY GVDKSEANAI KHLSYLEAWS ANDPYYNKDT KGAQLPIDNA LRNALTNLLM  360
RDKNTRMQLG DMTAFINSSL NPRGANDKNG ERMANYIFTR AHDTEAQTII QRIIRDRINP  420
NLFGYNFTRD EIKKAFEIYN ADINTAHKTY ASYNLPSVYA LMLTNKDSIT RVYYGDLYRE  480
DGHYMAKKTP YFDAIDTLLR ARIKYVAGGQ DMEVKKVGND GLLTSVRYGK GANNRTDWGT  540
AETRTQGMGV IMTNNYDFRL GSNETVTMNM GRAHRNQLYR PLLLTTKDGI ATYLNDSDVP  600
SNLLKRTDWN GNLTFNTNDI FGVENVQVSG YLGVWVPVGA KANQDARTQP SNRANSDGQV  660
YKSSAALDSQ VMYEAFSNFQ AFADDQPELY MNRVLAKNTD LLKAWGVTSV GLPPQYVSSK  720
DGTFLDSTID NGYAFDDRYD MALSQNNKYG SLEDLLNVLR ALHKDGIQAI ADWVPDQIYN  780
LPGKEVVNAT RVNGYGYHQQ GYQIVDQAYV ANTRTDGTDY QGKYGGTFLD ELKAKYPSIF  840
NRVQISNGKQ LPTNEKITKW SAKYFNGTNI LGRGINYVLR DDKTNQYFNT SANGQLLPTP  900
LRDTGAITST QVFQRRGQDV YFLRDNQVIK NEFVQDGDGN WYYFGADGKM TKGIQTINSK  960
DYYFFDNGIQ LRNALRRASN GYTYYYGLDG AMIKNAFVDF DDKHQQVRAF TTQGTMVVGN  1020
LHWSGHHFYF DRETGIQAKD RIVRTDDGKL HYYAAQTGDM GRNVFATDSR TGKRYYFDAD  1080
GNTVTGSRVI DGKTYYFNQD GSVGTAYSNR ADSIIFENGK ARYITPAGEI GRSIFVYNPA  1140
TKAWNYFDKE GNRVTGRQYI DGHLYYFKED GSQAKGEIIE ENGIKYYYEP ESGILASGRY  1200
LQVGDDQWMY FKQDGSLAIG QVRADHGYLK YFDKNGIQVK GKTVVEDGKT YYYDAHSGAL  1260
VTSSFAEIAP NQWSYFNTDG QALKGKWTIN GKEYYFDENG IQYKGKAIKV GSRYKYYDEN  1320
DGQPVTNRFA QIEPNVWAYF GADGYAVTGE QVINGQHLYF DQSGRQVKGA YVTVNGQRRY  1380
YDANTGEYVP ER                                                     1392

SEQ ID NO: 95          moltype = DNA  length = 4179
FEATURE                Location/Qualifiers
source                 1..4179
                       mol_type = unassigned DNA
                       organism = Streptococcus salivarius
SEQUENCE: 95
attaacggca aacaatacta tgtcaatagt gacggtagtg tgcgtaagaa cttcgtcttt  60
gagcaagatg gtaagtcata ttactttgat gccgaaacag ggctcttac gaccaagtca  120
```

-continued

```
caggatgaat tttcaactaa acctatcaag gcgaccgtag atttttcatc tggaaatcag  180
ctctacaaaa acgataacaa atctttggac caactcgaca ccttcatcac tgcggatgct  240
tggtaccgtc caaagagtat tctcaaggat ggtaagactt ggacagcttc aactgaagcg  300
gacaaacgtc cactcttgat ggtttggtgg cctgacaaat cgactcaggt taactaccta  360
aactacatgc aaaatcaagg tcttggtgcg ggatcatttt caaccaactc tagccaggaa  420
agtctaaatc tagctgctaa agcggttcag actaagattg aagagcgtat tgcgcgtgaa  480
ggcaatacca agtggttgag tacaagtatt aatcaattta tcaagactca gccaggttgg  540
aatagtagca ctgaaaatat ttcatacgac cacttgcaag gtggacagtt gctctttaac  600
aacagtaagg gtgatactgg taaccgtact agctacgcca actctgatta tcgtctactt  660
aaccgcacac ctactaacca gacgggtaca cgtaagtact tcaaggacaa ttctatcggt  720
ggtcttgagt tcttgcttgc caacgatatt gataactcaa acccagctgt tcaggcggag  780
caacttaact ggctccactt tatgatgaat atcggaagta tcatggcgaa tgacccaact  840
gctaactttg acggtttgcg tgtcgatgcc ttggacaatg tggatgctga ccttctccaa  900
atcgcttcag attacttcaa agcagcctat ggtgttgaca agtccgaagc taatgcgatc  960
aaacacttgt catacttgga agcgtggtct gccaacgacc catattacaa caaggacaat  1020
aagggggcac aactgccgat tgataatgcc cttcgtaatg ctcttaccaa ccttttgatg  1080
cgtgataaaa atacacgtat gcagcttggg gacatgactg cttttatgaa tagtagtttg  1140
aatccacgag gtgctaacga taagaacggt gaacgtatgg cgaactatat tttcacccgt  1200
gcccacgata cggaagcgca aaccattatc caacgtatca tccgtgatcg tatcaaccca  1260
aatctgtttg gttacaattt cacacgtgat gaaataaaga aggccttcga gatttacaat  1320
gcggatattg ataaggctca caagacttat gcgtcataca acttgccatc tgtctatgcc  1380
ctcatgttga ccaacaagga ctctgtaaca cgtgtttatt atggagacct ctaccgtgag  1440
gatggtcact acatggcgaa aaagacgcct tactttgatg ccattgacac cccttttgcgt  1500
gcccgtatca agtatgtagc tggtggtcaa gacatggaag tgaaaaaagt cggaaatgat  1560
ggacttttga cttctgttcg ttatggtaaa ggtgccaata acagaactga ttggggaact  1620
gctgaaaccc gtacgcaagg gatgggtgtc atcatgacca acaactatga tttccgattg  1680
ggtagtaatg aaactgtaac gatgaatatg ggtagagctc accgtaatca gctttatcgc  1740
ccattacttt tgacgactaa ggatggtcta gcaacctacc tcaacgattc tgatgtgcct  1800
aaaaaccttc ttaaacgtac cgactggaat gggaacttga ccttcaacgc caacgatgtt  1860
tttggtgttg aaaatgtcca agtctcaggt tatctcggtg tctgggtacc agtcggagct  1920
aaggctaacc aagacgcacg tacacagcca agtaaccgtg ccaatagcga tggtcaagtt  1980
tacaagtctt cagcagccct tgattcgcaa gttatgtatg aagccttctc aaacttccaa  2040
gcatttgcgg acaatcagcc agaactctac atgaaccgtg tcttggctaa gaacactaat  2100
ttgctcaaag catggggtgt tacgtctgtt ggacttccac cacagtacgt ttcaagtaag  2160
gatggtacct tccttgattc aacaattgac aatggttatg cctttgatga ccgttatgac  2220
atggccttga gtcaaaataa caagtatggc tcacttgagg acctccttaa tgtccttcgt  2280
gccctccaca aagatggtat tcaagccatt gctgactggg tgccagacca aatttataac  2340
cttccaggaa aagaagtagt taatgccaca cgtgttaacg gctacggtta tcaccaacaa  2400
ggttatcaaa ttgtggacca agcctatgtg gcaaataccc gtacagatgg tacagactat  2460
caaggtaaat atggtggtgc cttccttgat gagcttaaag ctaagtaccc atctattttc  2520
aaccgtgtgc aaatctcaaa tggtaagcag ttgcctacga atgaaaagat taccaaatgg  2580
tctgctaagt acttcaatgg aaccaatatc cttggacgag gtatcaacta tgtccttcgt  2640
gatgacaaga ccaaccagta ctttaatacc tcagccaacg gccaactctt gccaacacca  2700
cttcgtgaca caggtgccat cacaagcact caagtcttcc aacgtcgtgg acaagacgtt  2760
tacttccttc gtgataacca aaccgttaag aatgaatttg ttcaagatgg taacggtaac  2820
tggtattact tcggtggtga cggtaagatg accaagggtg ctcgaaacat caataacaag  2880
gattactatt tctttgacaa tggtatccaa ttgcgtaacg cccttcgtcg tgcaagcaac  2940
ggctatacct actattacgg tcttgacggt gccatggtta agaatgcctt cgttgatttt  3000
gatgacaaac ataagcaggt tcgtgccttt acgactcaag gaacaatggt agtaggtaac  3060
cttcattgga gtggacacca tttctacttt gaccgtgaaa ctggtattca ggctaaggat  3120
cgcattgtcc gtacagatga tggcaaattg cattactatg ttgctgaaac tggtgatatg  3180
ggacgtaacg tctttgcgac agacagcagc acaggtaaac gttattactt tgacgctgac  3240
ggtaatactg tgactggttc acgtgtcatt gatggtaaga cttattactt taaccaagat  3300
ggtagcgtcg gtacggccta cagcaatcgt gcagattcta ttatctttga aaatggtaag  3360
gctcgctaca tcacaccagc aggcgaaatc ggacgcagca tctttgtcta taatccagca  3420
actaaggctt ggaattactt tgataaagaa ggtaaccgtg ttacaggacg tcaatacatt  3480
gatggtcacc tttattactt caaggaagat ggtagccaag ctaagggtga aattatcgaa  3540
gaaaatggca tcaaatatta ttatgagcca gaatcaggta ttcttgcaag cggacgctat  3600
ctccaagtag gtgatgacca gtggatgtac ttcaaacacg atggttcact ggctatcggc  3660
caagttcgtg ctgatcatgg atacctttaag tactttgata aaaatggtat ccaagttaag  3720
ggtaaaacca ttgtcgaaga tggtaagact tattactatg atgcccacag tggagctctt  3780
gtaacaagca gctttgctga gattgcacca aaccaatggt cttacttcaa tactgatgga  3840
caagccctta aaggcaagtg gactatcaat ggcaaggaat actactttga ccaaaatggt  3900
atccaataca agggcaaagc tgttaaggtc ggtagtcgtt acaagtacta tgacgaaaac  3960
gatggacaac ctgtaaccaa ccgcttcgct caaatcgagc ctaacgtctg ggcttatttc  4020
ggagctgatg gctatgccgt aacaggcgaa caagtcatca atggacaaca cctttacttt  4080
gaccaatcag gtcgccaagt taaaggcgcc tacgtcacag tcaacggcca acgccgttac  4140
tacgatgcta acactggcga atatgtccca ggaagataa                        4179
```

```
SEQ ID NO: 96          moltype = AA  length = 1392
FEATURE                Location/Qualifiers
source                 1..1392
                       mol_type = protein
                       organism = Streptococcus salivarius
SEQUENCE: 96
INGKQYYVNS DGSVRKNFVF EQDGKSYYFD AETGALTTKS QDEFSTKPIK ATVDFSSGNQ  60
LYKNDNKSLD QLDTFITADA WYRPKSILKD GKTWTASTEA DKRPLLMVWW PDKSTQVNYL  120
NYMQNQGLGA GSFSTNSSQE SLNLAAKAVQ TKIEERIARE GNTKWLSTSI NQFIKTQPGW  180
NSSTENISYD HLQGGQLLFN NSKGDTGNRT SYANSDYRLL NRTPTNQTGT RKYFKDNSIG  240
```

-continued

```
GLEFLLANDI DNSNPAVQAE QLNWLHFMMN IGSIMANDPT ANFDGLRVDA LDNVDADLLQ  300
IASDYFKAAY GVDKSEANAI KHLSYLEAWS ANDPYYNKDN KGAQLPIDNA LRNALTNLLM  360
RDKNTRMQLG DMTAFMNSSL NPRGANDKNG ERMANYIFTR AHDTEAQTII QRIIRDRINP  420
NLFGYNFTRD EIKKAFEIYN ADIDKAHKTY ASYNLPSVYA LMLTNKDSVT RVYYGDLYRE  480
DGHYMAKKTP YFDAIDTLLR ARIKYVAGGQ DMEVKKVGND GLLTSVRYGK GANNRTDWGT  540
AETRTQGMGV IMTNNYDFRL GSNETVTMNM GRAHRNQLYR PLLLTTKDGL ATYLNDSDVP  600
KNLLKRTDWN GNLTFNANDV FGVENVQVSG YLGVWVPVGA KANQDARTQP SNRANSDGQV  660
YKSSAALDSQ VMYEAFSNFQ AFADNQPELY MNRVLAKNTN LLKAWGVTSV GLPPQYVSSK  720
DGTFLDSTID NGYAFDDRYD MALSQNNKYG SLEDLLNVLR ALHKDGIQAI ADWVPDQIYN  780
LPGKEVVNAT RVNGYGYHQQ GYQIVDQAYV ANTRTDGTDY QGKYGGAFLD ELKAKYPSIF  840
NRVQISNGKQ LPTNEKITKW SAKYFNGTNI LGRGINYVLR DDKTNQYFNT SANGQLLPTP  900
LRDTGAITST QVFQRRGQDV YFLRDNQTVK NEFVQDGNGN WYYFGGDGKM TKGARNINNK  960
DYYFFDNGIQ LRNALRRASN GYTYYYGLDG AMVKNAFVDF DDKHKQVRAF TTQGTMVVGN  1020
LHWSGHHFYF DRETGIQAKD RIVRTDDGKL HYYVAETGDM GRNVFATDSS TGKRYYFDAD  1080
GNTVTGSRVI DGKTYYFNQD GSVGTAYSNR ADSIIFENGK ARYITPAGEI GRSIFVYNPA  1140
TKAWNYFDKE GNRVTGRQYI DGHLYYFKED GSQAKGEIIE ENGIKYYYEP ESGILASGRY  1200
LQVGDDQWMY FKHDGSLAIG QVRADHGYLK YFDKNGIQVK GKTIVEDGKT YYYDAHSGAL  1260
VTSSFAEIAP NQWSYFNTDG QALKGKWTIN GKEYYFDQNG IQYKGKAVKV GSRYKYYDEN  1320
DGQPVTNRFA QIEPNVWAYF GADGYAVTGE QVINGQHLYF DQSGRQVKGA YVTVNGQRRY  1380
YDANTGEYVP GR                                                    1392

SEQ ID NO: 97          moltype = DNA  length = 4179
FEATURE                Location/Qualifiers
source                 1..4179
                       mol_type = unassigned DNA
                       organism = Streptococcus salivarius
SEQUENCE: 97
attaacggca aacaatacta tgtcaatagt gacggtagtg tacgtaaaaa cttcgttttt  60
gagcaagatg gtaagtctta ttactttgat gctgaaacag gggcacttgc gactaagtct  120
caggatgaat tttcaacaga acctatcaag gcaaccgtag atttttcatc tggaaaccag  180
ctctacaaaa acgatgacaa gtctttggac caactcgaca ccttcatcac agcggatgct  240
tggtaccgtc caaagagcat tctcaaggat ggtaagactt ggacagcttc aactgaagcg  300
gacaaacgtc ctctattgat ggtttggtgg cctgacaagt ctactcaggt caactacctt  360
aactacatgc aaaatcaagg tcttggagca gggtcatttt caaccaactc tagtcaggaa  420
agtctggacc aagctgctaa agcggttcag actaagattg aagaacgtat cgcgcgtgaa  480
ggcaacacaa actggttgcg tacaagtatc aaccagttca tcaagactca gccaggttgg  540
aatagtagca ctgaaaatag ttcctatgac cacttgcaag gtggacagtt gctctttaac  600
aacagtaagg gtgatactgg caaccgtacc agccacgcca actctgacta tcgtttgctt  660
aaccgcacac cgactaacca aacgggtaca cgtaagtact tcaaggacaa ttctatcggt  720
ggtctcgagt tcttgcttgc caacgatatt gataactcaa atccagcagt tcaggcagaa  780
caacttaact ggctccactt tatgatgaat atcggaagta tcatggcaaa tgacccaaca  840
gccaactttg acggtttgcg tgtcgatgcc ttggacaatg tggatgccga cctgctccaa  900
atcgcatcag actactttaa agcagcctat ggtgttgaca agtctgaagc caatgccatt  960
aaacacttgt catatttgga agcatggtct gccaacgatc cttactacaa caaggacact  1020
aagggggcac aacttccgat tgacaatgcc cttcgtaatg cccttaccaa cctcttgatg  1080
cgtgataaaa atacacgtat gcagcttggg gacatgactg ccttcatcaa tagtagtttg  1140
aacccacgtg gtgccaatga taaaaacggt gagcgtatgg ctaactatat tttcacccgt  1200
gcccacgata cagaagctca aacgattatt caacgtatca tccgtgatcg tattaaccca  1260
aatttgtttg gttataattt cactcgtgat gaaatcaaga aagccttcga gatttacaat  1320
caggatattg ataaggctca caagacttat gcgtcataca acttgccatc tgtctatgct  1380
ctcatgttga ccaacaagga ctctgtaaca cgtgtttatt acggagacct ctaccgtgaa  1440
aatggtcact acatggctaa gaagacaccg tactttgatg ctatcgacac cctcttgcgt  1500
gctcgtatca agtatgtagc tggtggtcaa gacatggaag ttaagaaagt cggaaatgac  1560
ggactcttga catctgttcg ttatggtaaa ggtgccaata atagaactga ttggggaact  1620
tcggaaaccc gtacgcaagg tatgggtgtc atcatgacca ataactatga tttccgattg  1680
ggtagcaatg aaaccgtaac gatgaacatg ggtagagctc accgtaatca gctttatcgc  1740
ccattgcttt tgacgacaaa ggatggtata gcaacctacc tcaacgattc tgatgtgcct  1800
aaaaaccttc ttaaacgcac cgactggaac gggaacttga ctttcaatgc caacgatgtt  1860
tttggtgtgg aaaatgtcca agtctcaggt tacctcggtg tctgggtacc agtcggagct  1920
aaggctaatc aagacgcacg tacacagcca agtaaccgta caaatagtga cggtcaagtt  1980
tacaagtctt cagcagccct tgattctcaa gttatgtatg aagccttctc aaacttccaa  2040
gcctttgcgg acgatcaacc agaactttac atgaaccgtg tcttggctaa aaacactgac  2100
ttgctcaaag catggggaat cacgtcagtc ggacttccac cacagtacgt ttcaagtaag  2160
gatggtacct tccttgactc aacaattgat aatggttatg cctttgatga ccgttacgat  2220
atggccttga gtcaaaataa taaatacgga tcacttgagg acctccttaa cgtccttcgt  2280
gccctccaca aagacggtat tcaagctatt gctgactggg tgccagacca aatctataac  2340
ctcccaggaa aagaagtggt aaatgcgaca cgtgttaacg gttatggtaa ccaccaaata  2400
ggctaccaaa tcattgacca agcctatgtg gctaataccc gtacagatgg tacagactat  2460
caaggtaaat acggtggtgc tttccttgat gagcttaaag ctaagtaccc atctattttc  2520
aaccgagtgc aaatctcaaa tggtaagcag ttgcctacga atgaaaagat taccaagtgg  2580
tctgctaagt acttcaacgg aactaacatc cttggacgag gcatcaatta tgtccttcgt  2640
gatgacaaga ccaaccagta ctttaatact tcagccaacg gccaactctt gccaacacca  2700
cttcgtgaca caggtgccat tacaagcact caagtcttcc aacgtcgtgg acaagatgtt  2760
tacttccttc gtgataatca agtcatcaag aatgaatttg ttcaagacgg taacggtaac  2820
tggtattact tcggtgctga cggtaagatg actaagggtg cccaaaacat caatagcaag  2880
gattactatt tctttgataa tggtgttcaa ttgcgtaatg ccctgcgtcg tgctaacaat  2940
ggttatactt actattacgg tttagacggt gctatggtta agaatgcttt tgttgatttt  3000
gacgacaagc gtaagcaggt gcgtgccttt acgactcaag gaaccatggt agtgggtaac  3060
cttcattgga gtggtcacca tttctacttt gaccgtgaaa ctggtattca ggccaaggat  3120
```

```
cgtattgtcc gtacagatga tggcaaattg cattactatg ttgcagaaac tggtgacatg  3180
ggacgcaatg tctttgcgac agatagtagc acaggtaaac gttattactt tgacgctgat  3240
ggtaacactg tgactggttc acgtgtcatt gacggtaaga cttattactt taaccaagat  3300
ggtagtgtcg gtacggccta cagcaaccga gctgattcta ttatctttga aaatggtaag  3360
gcccgttaca tcacaccagc aggcgaaatc ggacgtagca tctttgtcta caatccagcg  3420
actaaggctt ggaactactt tgataaagaa ggtaaccgtg tgacaggtcg tcaatacatt  3480
gatggtcacc tctattactt caaggaagat ggtagccaag ctaagggtga aattattgaa  3540
gaaaatggca tcaagtatta ctatgagcca gaatcaggta ttcttgcttc aggacgctac  3600
ctccaagttg gtgatgacca gtggatgtac ttcaaacaag acggttcact ggctatcggc  3660
caagttcgtg ctgatcatgg atatcttaag tactttgata aaaatggtat ccaagtcaag  3720
ggtaaaacca ttgtcgaaga tggtaagact tattactatg atgcccacag tggagctctt  3780
gtcacaagca gctttgctga gattgcacca aaccaatggt cttacttcaa tactgaaggc  3840
caagcactta aaggcaattg gactatcaat ggcaaggaat actactttga ccaaaatggg  3900
attcagtaca agggcaaggc cgttaaggtc ggcagtcgtt acaagtacta tgacgaaaac  3960
gatggacaac ctgtaaccaa ccgcttcgct caaatcgagc ctaacgtctg ggcttacttt  4020
ggagcagatg gttatgccgt gacaggggaa caagtcatca atggacaaca cctttacttt  4080
gaccaatcag gtcgccaagt taaaggtgcc tacgtcacag tcaacggtca acgtcgttac  4140
tacgatgtta acactggcga atatgtccca ggaagataa                        4179

SEQ ID NO: 98          moltype = AA  length = 1392
FEATURE                Location/Qualifiers
source                 1..1392
                       mol_type = protein
                       organism = Streptococcus salivarius
SEQUENCE: 98
INGKQYYVNS DGSVRKNFVF EQDGKSYYFD AETGALATKS QDEFSTEPIK ATVDFSSGNQ  60
LYKNDDKSLD QLDTFITADA WYRPKSILKD GKTWTASTEA DKRPLLMVWW PDKSTQVNYL  120
NYMQNQGLGA GSFSTNSSQE SLDQAAKAVQ TKIEERIARE GNTNWLRTSI NQFIKTQPGW  180
NSSTENSSYD HLQGGQLLFN NSKGDTGNRT SHANSDYRLL NRTPTNQTGT RKYFKDNSIG  240
GLEFLLANDI DNSNPAVQAE QLNWLHFMMN IGSIMANDPT ANFDGLRVDA LDNVDADLLQ  300
IASDYFKAAY GVDKSEANAI KHLSYLEAWS ANDPYYNKDT KGAQLPIDNA LRNALTNLLM  360
RDKNTRMQLG DMTAFINSSL NPRGANDKNG ERMANYIFTR AHDTEAQTII QRIIRDRINP  420
NLFGYNFTRD EIKKAFEIYN QDIDKAHKTY ASYNLPSVYA LMLTNKDSVT RVYYGDLYRE  480
NGHYMAKKTP YFDAIDTLLR ARIKYVAGGQ DMEVKKVGND GLLTSVRYGK GANNRTDWGT  540
SETRTQGMGV IMTNNYDFRL GSNETVTMNM GRAHRNQLYR PLLLTTKDGI ATYLNDSDVP  600
KNLLKRTDWN GNLTFNANDV FGVENVQVSG YLGVWVPVGA KANQDARTQP SNRTNSDGQV  660
YKSSAALDSQ VMYEAFSNFQ AFADDQPELY MNRVLAKNTD LLKAWGITSV GLPPQYVSSK  720
DGTFLDSTID NGYAFDDRYD MALSQNNKYG SLEDLLNVLR ALHKDGIQAI ADWVPDQIYN  780
LPGKEVVNAT RVNGYGNHQI GYQIIDQAYV ANTRTDGTDY QGKYGGAFLD ELKAKYPSIF  840
NRVQISNGKQ LPTNEKITKW SAKYFNGTNI LGRGINYVLR DDKTNQYFNT SANGQLLPTP  900
LRDTGAITST QVFQRRGQDV YFLRDNQVIK NEFVQDGNGN WYYFGADGKM TKGAQNINSK  960
DYYFFDNGVQ LRNALRRANN GYTYYYGLDG AMVKNAPFVDF DDKRKQVRAF TTQGTMVVGN  1020
LHWSGHHFYF DRETGIQAKD RIVRTDDGKL HYYVAETGDM GRNVFATDSS TGKRYYFDAD  1080
GNTVTGSRVI DGKTYYFNQD GSVGTAYSNR ADSIIFENGK ARYITPAGEI GRSIFVYNPA  1140
TKAWNYFDKE GNRVTGRQYI DGHLYYFKED GSQAKGEIIE ENGIKYYYEP ESGILASGRY  1200
LQVGDDQWMY FKQDGSLAIG QVRADHGYLK YFDKNGIQVK GKTIVEDGKT YYYDAHSGAL  1260
VTSSFAEIAP NQWSYFNTEG QALKGNWTIN GKEYYFDQNG IQYKGKAVKV GSRYKYYDEN  1320
DGQPVTNRFA QIEPNVWAYF GADGYAVTGE QVINGQHLYF DQSGRQVKGA YVTVNGQRRY  1380
YDVNTGEYVP GR                                                      1392

SEQ ID NO: 99          moltype = DNA  length = 4179
FEATURE                Location/Qualifiers
source                 1..4179
                       mol_type = unassigned DNA
                       organism = Streptococcus salivarius
SEQUENCE: 99
atcaacggca aacaatacta tgtcaatagt gacggtagtg tgcgtaagaa cttcgtcttt  60
gagcaagacg gtaagtctta ttactttgat gctgaaacag gggctcttgc gaccaagtca  120
caggatgaat tttcaacaga acctatcaag gcgactgtgg atttttcatc tggaaaccag  180
ctctacaaaa acgatgacaa atctttggac caactggaca ccttcatcac agcggatgct  240
tggtaccgtc caaagagtat tctcaaggat ggtaagactt ggacagcttc aaccgaggct  300
gacaaacgtc cacttttgat ggtttggtgg cctgacaaat cgactcaggt taattacctt  360
aactacatgc aaaatcaagg tcttggtgca ggatcatttt caactaactc tagtcaggaa  420
agtctggatc aagctgccaa gatggttcag actaagattg aagaacgtat cgcgcgtgaa  480
ggcaatacca actggttgcg tacaagtatc gaccagttca ttaaaactca accaggttgg  540
aatagcagta ctgaaaatag ttcatacgac cacttgcaac gtggacagtt gctctttaac  600
aatagtaagg gtgatactgg taaccgtacc agccatgcca actctgacta tcgtttgtta  660
aaccgcacac cgactaacca aacgggtaca cgtaagtact tcaaggacaa ttctatcggt  720
ggtcttgagt tcttgcttgc caacgatatt gataactcaa acccagctgt tcaggcagaa  780
caacttaact ggctccactt tatgatgaat atcggaagca tcatggctaa tgacccaaca  840
gctaactttg acggtttgcg tgtcgatgcc ttggacaatg tggatgccga cctgctccaa  900
atcgcatcag actacttcaa agcagcttat ggtgtggaca agtctgaagc taatgccatc  960
aaacacttgt catacttgga agcatggtct gccaacgacc catactataa caaggacact  1020
aagggagcac aacttccgat tgacaatgcc cttcgtaatg cccttaccaa cctcctgatg  1080
cgtgataaaa atacacgtat gcagcttggg gacatgactg ctttcatcaa cagtagtttg  1140
aatccacgtg gtgccaacga taagaacggt gagcgtatgg ctaactatat tttcacccgt  1200
gcccacgata ctgaggctca aacaattatt caacgtatca ttcgtgatcg tattaaccca  1260
aatttgtttg gttacaattt cacccgtgat gaaatcaaga aggccttcga gatttacaat  1320
gcggatattg ataaggctca taaaacttat gcgtcttaca acttgccatc tgtctatgcc  1380
```

-continued

```
ctcatgttga ccaacaagga ctctgtaaca cgtgtttatt acggtgacct ctaccgtgag  1440
gatggtcact acatggcgaa aaagacgcct tactttgatg ccattgacac ccttttgcgt  1500
gcccgtatca agtatgtagc tggtggtcaa gacatggaag tgaagaaagt cggaaatgac  1560
ggcctcttga catcagttcg ttatggtaaa ggtgccaata acagaactga ttggggaact  1620
gctgaaaccc gtacgcaagg gatgggtgtc atcatgacca acaactatga tttccgattg  1680
ggtagcaatg aaactataac gatgaatatg ggtagagccc accgtaatca gctttaccgt  1740
ccattgcttt tgacgactaa ggatggtcta gcaacctacc tcaacgattc tgacgtacct  1800
tcaaaccttc ttaaacgtac cgactggaat gggaacttga ccttcaatgc caatgatatt  1860
tttggtgtgg aaaatgtgca agtttcaggt tacctcggtg tctgggtacc agtcggggcg  1920
aaggctaacc aagacgcacg tacacagcca agtaaccgtg ccaatagcga tggtcaagtt  1980
tacaagtctt cagcagccct tgattcgcaa gtcatgtatg aagccttctc aaacttccaa  2040
gcatttgcgg acgatcagcc agaactctac atgaaccgtg tcttggctaa gaacactaat  2100
ttgctcaaag catggggtgt tacgtctgtt ggacttccac cacagtacgt ttcaagtaaa  2160
gatggtacct tcctcgattc aacgattgac aatggttatg cctttgacga ccgttatgac  2220
atggccttga gtcaaaataa caagtatggc tcacttgagg acctccttaa tgtccttcgt  2280
gccctccaca aagatggtat tcaagccatt gctgactggg tgccagacca aatttataac  2340
cttccaggaa aagaagtagt taatgccaca cgtgttaacg gctacggtta tcaccaacaa  2400
ggttatcaaa ttgtggacca agcctatgtg gcaaataccc gcacagatgg cacagactat  2460
caaggcaagt acggtggtgc cttccttgat gagctgaaag ctaagtaccc atctattttc  2520
aaccgtgtgc aaatctcaaa tggtaagcag ttgcctacga atgaaaagat taccaaatgg  2580
tctgctaagt acttcaacgg aaccaacatc cttggacgag gtatcaactt tgtccttcgt  2640
gatgacaaga ccaaccagta ctttaatacc tcagccaaaa gccaactctt gccaatacca  2700
cttcgtgata cgggtgccat cacaagcact caagtcttcc aacgtcgtgg acaagatgtt  2760
tacttccttc gcgataacca aaccgttaag aatgaatttg ttcaagacgg taacggtaac  2820
tggtattact tcggtgctga cggtaagatg accaagggtg cccaaaacat caatagcaag  2880
gattactatt tctttgacaa tggtatccaa ttgcgtaatg ctcttcgtcg tgcttcaaac  2940
ggctatactt actattacgg tctggacggt gctatggtta agaatgcctt cgttgatttt  3000
gatgacaaac gtaagcaagt ccgtgccttt acaacacaag gaaacatggt agtgggtaac  3060
cttcattgga gtggtcacca tttctacttt gaccgtgaaa cgggtatcca ggctaaggat  3120
cgcgttgttc gtacagatga tggcaaattg cattactatg ttgctgaaac tggtgacatg  3180
ggacgtaacg tctttgcgac agacagcagc acaggtaaac gttattactt tgacgctgat  3240
ggtaacactg tgactggctc acgtgtcatt gacggtaaga cttattactt taaccaagat  3300
ggtagtgtcg gtacggccta cagcaatcgt gcagattcta ttatctttga aaatggtaag  3360
gctcgctaca tcacaccagc aggcgaaatc ggacgtagca tctttgtcta caacccagca  3420
actaaggcat ggaactactt tgataaagaa ggtaaccgtg tcacaggacg ccaatacatt  3480
gatggtcacc tctattactt caaggaagat ggtagccaag ctaagggtga aattatcgag  3540
gaaaacggca ttaagtatta ctatgagcca gaatcaggta ttcttgcttc aggacgctac  3600
ctccaagttg gtgatgacca gtggatgtac ttcaaacaag acggttcact ggctatcggc  3660
caagttcgtg ctgatcatgg ataccttaag tactttgata aaaatggtat ccaagttaag  3720
gggaaaactg ttgtcgaaga tggtaagact tattactatg atgcccacag tggagctctt  3780
gtcacaagca gctttgctga gattgcgcca aaccaatggt cttacttcaa tactgatgga  3840
caagccctta aggcaagtgg gactatcaat ggcaaggaat actactttga cgaaaatggt  3900
atccaataca aaggcaaggc cattaaggtc ggcagtcgtt acaagtacta tgacgaaaac  3960
gacggtcaac ctgtaaccaa ccgctttgct caaatcgagc ctaacgtctg ggcttacttc  4020
ggagcagatg gttatgccgt aacaggcgaa caagtcatca atggacaaca cctttacttt  4080
gaccaatcag gtcgccaagt taaaggtgcc tacgtcacag tcaacggcca acgtcgttac  4140
tacgatgcca acactggcga atatgtccca ggaagataa                         4179

SEQ ID NO: 100          moltype = AA  length = 1392
FEATURE                 Location/Qualifiers
source                  1..1392
                        mol_type = protein
                        organism = Streptococcus salivarius
SEQUENCE: 100
INGKQYYVNS DGSVRKNFVF EQDGKSYYFD AETGALATKS QDEFSTEPIK ATVDFSSGNQ  60
LYKNDDKSLD QLDTFITADA WYRPKSILKD GKTWTASTEA DKRPLLMVWW PDKSTQVNYL  120
NYMQNQGLGA GSFSTNSSQE SLDQAAKMVQ TKIEERIARE GNTNWLRTSI DQFIKTQPGW  180
NSSTENSSYD HLQRGQLLFN NSKGDTGNRT SHANSDYRLL NRTPTNQTGT RKYFKDNSIG  240
GLEFLLANDI DNSNPAVQAE QLNWLHFMMN IGSIMANDPT ANFDGLRVDA LDNVDADLLQ  300
IASDYFKAAY GVDKSEANAI KHLSYLEAWS ANDPYYNKDT KGAQLPIDNA LRNALTNLLM  360
RDKNTRMQLG DMTAFINSSL NPRGANDKNG ERMANYIFTR AHDTEAQTII QRIIRDRINP  420
NLFGYNFTRD EIKKAFEIYN ADIDKAHKTY ASYNLPSVYA LMLTNKDSVT RVYYGDLYRE  480
DGHYMAKKTP YFDAIDTLLR ARIKYVAGGQ DMEVKKVGND GLLTSVRYGK GANNRTDWGT  540
AETRTQGMGV IMTNNYDFRL GSNETITMNM GRAHRNQLYR PLLLTTKDGL ATYLNDSDVP  600
SNLLKRTDWN GNLTFNANDI FGVENVQVSG YLGVWVPVGA KANQDARTQP SNRANSDGQV  660
YKSSAALDSQ VMYEAFSNFQ AFADDQPELY MNRVLAKNTN LLKAWGVTSV GLPPQYVSSK  720
DGTFLDSTID NGYAFDDRYD MALSQNNKYG SLEDLLNVLR ALHKDGIQAI ADWVPDQIYN  780
LPGKEVVNAT RVNGYGYHQQ GYQIVDQAYV ANTRTDGTDY QGKYGGAFLD ELKAKYPSIF  840
NRVQISNGKQ LPTNEKITKW SAKYFNGTNI LGRGINFVLR DDKTNQYFNT SAKSQLLPIP  900
LRDTGAITST QVFQRRGQDV YFLRDNQTVK NEFVQDGNGN WYYFGADGKM TKGAQNINSK  960
DYYFFDNGIQ LRNALRRASN GYTYYYGLDG AMVKNAFVDF DDKRKQVRAF TTQGNMVVGN  1020
LHWSGHHFYF DRETGIQAKD RVVRTDDGKL HYYVAETGDM GRNVFATDSS TGKRYYFDAD  1080
GNTVTGSRVI DGKTYYFNQD GSVGTAYSNR ADSIIFENGK ARYITPAGEI GRSIFVYNPA  1140
TKAWNYFDKE GNRVTGRQYI DGHLYYFKED GSQAKGEIIE ENGIKYYYEP ESGILASGRY  1200
LQVGDDQWMY FKQDGSLAIG QVRADHGYLK YFDKNGIQVK GKTVVEDGKT YYYDAHSGAL  1260
VTSSFAEIAP NQWSYFNTDG QALKGKWTIN GKEYYFDENG IQYKGKAIKV GSRYKYYDEN  1320
DGQPVTNRFA QIEPNVWAYF GADGYAVTGE QVINGQHLYF DQSGRQVKGA YVTVNGQRRY  1380
YDANTGEYVP GR                                                      1392
```

-continued

```
SEQ ID NO: 101          moltype = DNA  length = 4179
FEATURE                 Location/Qualifiers
source                  1..4179
                        mol_type = unassigned DNA
                        organism = Streptococcus sp.
SEQUENCE: 101
attaacggca aacaatacta tgtcaatagt gacggtagtg tgcgtaagaa cttcgttttt  60
gagcaagatg gtaagtcata ttactttgat gctgaaacag gggctcttgc gaccaagtca  120
caggatgaat tttcaactaa acctatcaag gcgactgtag atttttcatc tggaaatcag  180
ctctacaaaa acgataacaa atctttggac caactcgact ccttcatcac tgcggatgct  240
tggtaccgtc caaagagtat tctcaaggat ggtaagactt ggacagcttc aactgaagcg  300
gacaaacgtc cactcttgat ggtttggtgg cctgacaaat caactcaggt taactaccta  360
aactacatgc aaaatcaagg tcttggtgcg ggatcatttt caaccaactc tagccaggaa  420
agtctaaatc tagctgctaa aacggttcag actaagattg aagaacgtat tgcgcgtgaa  480
ggcaatacca actggttgcg tacaagtatt gatcagttta tcaagactca gcctggttgg  540
aatagtagca ctgaaaatag ttcatacgac cacttgcaag gtggacagtt gctctttaac  600
aacagtaagg gtgatactgg taaccgtact agctacgcca actctgacta tcgtttgctt  660
aaccgcacac cgactaatca gacgggtaca cgtaagtact tcaaggacaa ttctatcggt  720
ggtcttgagt tcttgcttgc caacgatatt gataactcaa acccagctgt tcaggcggag  780
caacttaact ggctccactt tatgatgaat atcggaagta tcatggcaaa tgacccaact  840
gctaactttg acggtttgcg tgtcgatgcc ttggacaatg tggatgctga ccttctccaa  900
atcgcttcag attacttcaa agcagcctat ggtgttgaca agtccgaagc taatgcgatc  960
aaacacttgt catacttgga agcgtggtct gccaacgacc catattacaa caaggacaat  1020
aagggggcac aactgccgat tgataatgcc cttcgtaatg ctcttaccaa cctttttgatg  1080
cgtgataaaa atacacgtat gcagcttggg gacatgactg cttttatgaa tagtagtttg  1140
aatccacgag gtgctaacga taagaacggt gaacgtatgg caaactatat tttcacccgt  1200
gcccacgata cggaagcgca aaccattatc caacgtatca tccgtgatcg tatcaaccca  1260
aatctgtttg gttacaattt cacccgtgat gaaataaaga aggccttcga gatttacaat  1320
gcggatattg ataaggctca caagacttat gcgtcataca acttgccatc tgtctatgcc  1380
ctcatgttga ccaacaagga ctctgtaaca cgtgtttatt acggggacct ctaccgtgag  1440
gatggtcact acatggcgaa aaagacgcct tactttgatg ctatcgacac cctcttgcgt  1500
gcccgtatca agtatgtagc tggcggtcaa gacatggaag tgaagaaagt cggaaatgac  1560
ggcctcttga catcagttcg ttatggtaaa ggtgccaata acagaactga ttggggaact  1620
gctgaaaccc gtacgcaagg gatgggtgtc atcatgacca acaactatga tttccgattg  1680
ggtagcaatg aaactgtaac gatgaatatg ggtagagccc accgtaatca gctttatcgc  1740
ccattacttt tgacaacaaa agatggtata gcaacctacc tcaacgattc tgatgtgcct  1800
aaaaaccttc ttaaacgtac cgactggaat gggaacttga ccttcaacgc caacgatgtt  1860
tttggtgttg aaaatgtcca agtctcaggt tatctcggtg tctgggtacc agtcggggct  1920
aaggctaacc aagacgcacg tacacagcca agtaaccgtg ccaatagcga tggtcaagtt  1980
tacaagtctt cagcagccct tgattcgcaa gttatgtatg aagccttctc aaacttccaa  2040
gcatttgcgg acaatcagcc agaactctac atgaaccgtg tcttggctaa gaacactaat  2100
ttgctcaaag catggggtgt tacgtctgtt ggacttccac cacagtacgt ttcaagtaag  2160
gatggtacct tccttgattc aacaattgac aatggttatg cctttgatga ccgttacgat  2220
atggccttga gtcaaaataa taaatacggc tcacttgagg acctccttaa cgttcttcgt  2280
gccctccata aagacggtat tcaagccatt gctgattggg tgccagacca aatctataac  2340
cttccaggaa aagaagtggt aaatgcgaca cgtgttaacg gctacggaaa ccatcaagga  2400
ggctaccaaa ttattgacca agcctatgtg gcaaataccc gtacagatgg tacagactat  2460
caaggtaaat acggtggtgc cttccttgat gagcttaaag ctaagtaccc atctattttc  2520
aaccgtgttc aaatctcaaa tggtaagcag ttgccaacga atgaaaagat taccaaatgg  2580
tctgctaagt acttcaacgg aactaacatc cttggacgag gcatcaacta tgtccttcgt  2640
gatgacaaga ccaaccagta cttcaatact tcagccaacg gccaactctt gccaacacca  2700
cttcgtgaca caggtgccat cacaagcact caagtcttcc aacgtcgtgg acaagacgtt  2760
tacttccttc gtgataacca aaccgttaag aatgaatttg ttcaagatgg tagtggtaac  2820
tggtattact tcggtggtga cggtaagatg accaagggtg ctcgaaacat caataacaag  2880
gattactatt tctttgacaa tggtatccaa ttgcgtaacg cccttcgtcg tgcttcaaac  2940
ggctatacct actattacgg tctggacggt gccatggtta agaatgcctt cgttgatttt  3000
gatgacaagc ataagcaggt ccgtgccttt acgactcaag gaacaatggt agtgggtaac  3060
cttcattgga gtagccacca tttctacttt gaccgtgaaa cgggtatcca ggctaaggat  3120
cgcgttgttc gtacagatga tggcaaattg cattactatg ttgctgaaac tggtgacatg  3180
ggacgtaacg tctttgcgac agacagcagc acaggtaaac gttattactt tgacgctgat  3240
ggtaacactg tgactggctc acgtgtcatt gacggtaaga cttattactt taaccaagat  3300
ggtagtgtcg gtacggccta cagcaatcgt gcagattcta ttatctttga aaatggtaag  3360
gctcgctaca tcacaccagc aggcgaaatc ggacgtagca tctttgtcta caacccagca  3420
actaaggcat ggaactactt tgataaagaa ggtaaccgtg tcacaggacg ccaatacatt  3480
gatggtcacc tctattactt caaggaagat ggtagccaag ctaagggtga aattatcgag  3540
gaaaacggca ttaagtatta ctatgagcca gaatcaggta ttcttgcttc aggacgctac  3600
ctccaagttg gtgatgacca gtggatgtac ttcaaacaag acggttcact ggctatcggc  3660
caagttcgtg ctgatcatgg ataccttaag tactttgata aaaatggtat ccaagtcaag  3720
ggtaaaacca ttgttgaaga tggtaagact tattactatg atgcccacag tggagctctt  3780
gtcacaagca gctttgctga gattgcacca aaccaatggt cttacttcaa tactgatgga  3840
caagccctta aaggcaagtg gactatcaat ggcaaggaat actactttga ccaaaatggt  3900
atccaataca agggcaaagc cgttaaggtc ggtagtcgtt acaagtacta tgacgaaaac  3960
gatggtcaac ctgtaaccaa ccgctttgct caaatcgagc caaacgtttg ggcttatttc  4020
ggagctgatg gctatgccgt aacaggcgaa caagtcatca atggacaaca cctttacttt  4080
gaccaatcag gtcgccaagt taaaggagcc tacgtcacag tcaatggaca acgccgttat  4140
tacgatgcca acactggcga atatgtccca ggaagataa                        4179

SEQ ID NO: 102          moltype = AA  length = 1392
FEATURE                 Location/Qualifiers
```

-continued

```
source                   1..1392
                         mol_type = protein
                         organism = Streptococcus sp.
SEQUENCE: 102
INGKQYYVNS DGSVRKNFVF EQDGKSYYFD AETGALATKS QDEFSTKPIK ATVDFSSGNQ  60
LYKNDNKSLD QLDSFITADA WYRPKSILKD GKTWTASTEA DKRPLLMVWW PDKSTQVNYL  120
NYMQNQGLGA GSFSTNSSQE SLNLAAKTVQ TKIEERIARE GNTNWLRTSI DQFIKTQPGW  180
NSSTENSSYD HLQGGQLLFN NSKGDTGNRT SYANSDYRLL NRTPTNQTGT RKYFKDNSIG  240
GLEFLLANDI DNSNPAVQAE QLNWLHFMMN IGSIMANDPT ANFDGLRVDA LDNVDADLLQ  300
IASDYFKAAY GVDKSEANAI KHLSYLEAWS ANDPYYNKDN KGAQLPIDNA LRNALTNLLM  360
RDKNTRMQLG DMTAFMNSSL NPRGANDKNG ERMANYIFTR AHDTEAQTII QRIIRDRINP  420
NLFGYNFTRD EIKKAFEIYN ADIDKAHKTY ASYNLPSVYA LMLTNKDSVT RVYYGDLYRE  480
DGHYMAKKTP YFDAIDTLLR ARIKYVAGGQ DMEVKKVGND GLLTSVRYGK GANNRTDWGT  540
AETRTQGMGV IMTNNYDFRL GSNETVTMNM GRAHRNQLYR PLLLTTKDGI ATYLNDSDVP  600
KNLLKRTDWN GNLTFNANDV FGVENVQVSG YLGVWVPVGA KANQDARTQP SNRANSDGQV  660
YKSSAALDSQ VMYEAFSNFQ AFADNQPELY MNRVLAKNTN LLKAWGVTSV GLPPQYVSSK  720
DGTFLDSTID NGYAFDDRYD MALSQNNKYG SLEDLLNVLR ALHKDGIQAI ADWVPDQIYN  780
LPGKEVVNAT RVNGYGNHQG GYQIIDQAYV ANTRTDGTDY QGKYGGAFLD ELKAKYPSIF  840
NRVQISNGKQ LPTNEKITKW SAKYFNGTNI LGRGINYVLR DDKTNQYFNT SANGQLLPTP  900
LRDTGAITST QVFQRRGQDV YFLRDNQTVK NEFVQDGSGN WYYFGGDGKM TKGARNINNK  960
DYYFFDNGIQ LRNALRRASN GYTYYYGLDG AMVKNAPVDF DDKHKQVRAF TTQGTMVVGN  1020
LHWSSHHFYF DRETGIQAKD RVVRTDDGKL HYYVAETGDM GRNVFATDSS TGKRYYFDAD  1080
GNTVTGSRVI DGKTYYFNQD GSVGTAYSNR ADSIIFENGK ARYITPAGEI GRSIFVYNPA  1140
TKAWNYFDKE GNRVTGRQYI DGHLYYFKED GSQAKGEIIE ENGIKYYYEP ESGILASGRY  1200
LQVGDDQWMY FKQDGSLAIG QVRADHGYLK YFDKNGIQVK GKTIVEDGKT YYYDAHSGAL  1260
VTSSFAEIAP NQWSYFNTDG QALKGKWTIN GKEYYFDQNG IQYKGKAVKV GSRYKYYDEN  1320
DGQPVTNRFA QIEPNVWAYF GADGYAVTGE QVINGQHLYF DQSGRQVKGA YVTVNGQRRY  1380
YDANTGEYVP GR                                                    1392

SEQ ID NO: 103           moltype = DNA  length = 4179
FEATURE                  Location/Qualifiers
source                   1..4179
                         mol_type = unassigned DNA
                         organism = Streptococcus salivarius
SEQUENCE: 103
attaacggca aacaatacta tgtcaatagt gacggtagtg tgcgtaagaa ctttgtcttt  60
gagcaagatg gtaagtctta ttactttgat gctgaaacag gggctcttgc gactaagtca  120
caggatgaat tttcaacaga accaatcaag gcaaccgtcg atttttcatc tggaaaccag  180
ctctacaaaa acgatgataa atcgttggac cagctcgata ccttcatcac agcggatgct  240
tggtaccgtc caaagagcat tctcaaggat ggtaagactt ggacggcttc aactgaggct  300
gacaaacgtc cactcttgat ggtttggtgg cctgacaagt caactcaggt taactacctt  360
aactacatgc aaaatcaagg tcttggtgca ggctcatttt caaccaactc tagccaggaa  420
agtctggacc aagctgctaa agcggttcag actaagattg aagaacgtat cgctcgtgaa  480
ggcaacacaa actggttgcg tacaagtatc gaccagttca tcaagactca gccaggttgg  540
aatagtagca ctgaaaatag ttcatacgac cacttgcaag gcggacagtt gctctttaac  600
aacagtaagg gtgatactgg caaccgtacc agccacgcca actctgacta tcgtttgctt  660
aaccgcacac cgactaacca gacgggtaca cgtaagtact tcaaggacaa ttctatcggt  720
ggtcttgagt tcttgcttgc caacgatatt gataactcaa acccagctgt tcaggcagag  780
caacttaact ggctccactt tatgatgaat attggaagca tcatggcaaa tgacccaaca  840
gctaactttg acggtttgcg tgtcgatgcc ttggacaatg tggatgctga ccttctccaa  900
atcgcatcag actacttcaa agcagcctat ggtgttgaca agtctgaagc caatgccatt  960
aagcacttgt catacttgga agcatggtct gccaacgacc catactacaa taaggacact  1020
aagggggcac aacttccgat tgacaatgcc ctccgtaatg cccttaccaa cctcttgatg  1080
cgtgataaga atacacgtat gcagcttggg gacatgactg ccttcatcaa cagtagtttg  1140
aatccacgtg gtgccaacga taaaaacggt gaacgtatgg caaactatat tttcacccgt  1200
gctcacgata cggaagctca aacgattatt caacgtatca tccgtgatcg tatcaaccca  1260
aatttgtttg gttacaattt cactcgtgat gaaatcaaga aagccttcga gatttacaat  1320
gaggatattg ataaggctca caagacttat gcgtcataca acttaccatc tgtttatgct  1380
ctcatgttga ccaacaagga ctctgtaaca cgagtttatt acggagacct ctaccgtgaa  1440
gatggtcact acatggctaa aaagacaccg tactttgatg ccattgacac cctcttgcgt  1500
gctcgtatca agtatgtagc tggtggtcaa gacatggaag tgaagaaagt cggaaatgac  1560
ggcctcttga catctgttcg ttatggtaaa ggtgccaata acagaacaga tttgggaact  1620
tcagaaactc gtacgcaagg tatgggtgtc atcatgacca acaactatga tttccgcttg  1680
ggtagcaatg aaactgtaac gatgaacatg ggtagagcac accgtaatca gctttatcgc  1740
ccattgcttt tgacgacaaa ggatggtata gcaacctact tcaacgattc tgatgtgcct  1800
aaaaaccttc tgaaacgtac tgactggaat gggaacttga ccttcaatgc caatgatgtt  1860
tttggtgtgg aaaatgtcca agtatcaggt taccttggtg tctgggtacc agtcggggct  1920
aaggctaacc aagacgcacg tacacagcca agtaaccgtg ccaatagcga tggtcaagtt  1980
tacaagtctt cagcagccct tgattcgcaa gtcatgtatg aagccttctc aaacttccaa  2040
gcatttgcgg acgatcagcc agaactctac atgaaccgtg tcttggctaa gaacactgac  2100
ttgctcaaag catggggtgt tacgtctgtt ggacttccac cacagtacgt ttcaagtaag  2160
gatggtacct tccttgattc aacaattgac aatggttatg cctttgatga ccgttatgac  2220
atggccttga gtcaaaataa caagtatggc tcacttgagg acctccttaa tgttcttcgt  2280
gccctccaca aagatggtat tcaagccatt gctgactggg tgccagacca aatttataac  2340
cttccaggaa aagaagtagt taatgccaca cgtgttaacg gctacggtta tcaccaacaa  2400
ggttatcaaa ttgtggacca agcctatgtg gcaaataccc gtacagatgg tacagactat  2460
caaggtaaat acggtggagc cttccttgat gagcttaaag ctaagtaccc atctattttc  2520
aaccgtgtgc aaatctcaaa tggtaagcag ttacctacga atgaaaagat tactaaatgg  2580
tctgctaagt acttcaacgg aactaatatc cttggacgag gtatcaacta tgtccttcgt  2640
```

-continued

```
gatgacaaga ccaaccagta ctttaatacc tcagctaaca gccaactctt gccaacacca  2700
cttcgtgaca caggtgccat tacaagcact caagtcttcc aacgtcgtgg acaagatgtt  2760
tacttccttc gtgataacca agccgttaag aatgaatttg ttcaagacgg taacggcaac  2820
tggtattact tcggtgctga cggtaagatg accaagggtg ctcaaaccat caataaaaag  2880
gattactatt tctttgacaa tggtatccaa ttgcgtaacg cccttcgtcg tgctaacaac  2940
ggttatactt actattacgg tttagacggt gctatggtta agaatgcctt tgttgatttt  3000
gacgacaagc gtaagcaggt gcgtgccttt acgacacaag gaaccatggt agtgggtaac  3060
cttcattgga gtggacacca tttctacttt gaccgtgaaa ctggtattca agccaaggat  3120
cgcattgtcc gtacagatga tggcaaattg cattactatg ttgctggaac cggtgatatg  3180
ggacgtaacg tctttgcgac agatagtagc acaggcaaac gttattactt tgacgcagat  3240
ggtaatactg tgactggttc acgtgtcatt gacggtaaga cttattactt taaccaagat  3300
ggtagtgtcg gtacggccta cagcaaccga gctgattcta ttatctttga aaatggtaag  3360
gctcgctaca tcacaccagc aggcgaaatc ggacgtagca tctttgtcta caacccagca  3420
actaaggctt ggaattactt tgataaagaa gggaaccgtg tcacaggacg tcaatacatt  3480
gatggtcacc tctattactt caaggaagat ggtagccaag ctaagggtga aattatcgag  3540
gaaaacggca ttaagtatta ctatgagcca gaatcaggta ttcttgcttc aggacgctac  3600
ctccaagttg gtgatgacca gtggatgtac ttcaaacaag acggttcact ggcaatcgga  3660
caagttcgtg ctgatcatgg ataccttaag tactttgata aaaatggtat ccaagtcaag  3720
ggtaaaacca ttgttgaaga tggtaagact tattactatg atgctcatag tggagctctt  3780
gtcacaagca gctttgctga gattgcacca aaccaatggt cttacttcaa tactgatgga  3840
caagccctta aaggcaagtg gactatcaat ggcaaggaat actactttga ccaaaatggt  3900
atccaataca agggcaaagc cgttaaggtc ggtagtcgtt acaagtacta tgacgaaaac  3960
gatggtcaac ctgtaaccaa ccgcttcgct caaatcgagc ctaacgtctg ggcttatttc  4020
ggagctgatg gctatgccgt gacaggcgaa caagtcatca atggacaaca cctttacttt  4080
gaccaatcag gtcgccaagt taaaggtgcc tacgtcacag tcaatggaca acgtcgttac  4140
tacgatgcca acactggtga atatgtacca ggaagataa                        4179

SEQ ID NO: 104         moltype = AA  length = 1392
FEATURE                Location/Qualifiers
source                 1..1392
                       mol_type = protein
                       organism = Streptococcus salivarius
SEQUENCE: 104
INGKQYYVNS DGSVRKNFVF EQDGKSYYFD AETGALATKS QDEFSTEPIK ATVDFSSGNQ  60
LYKNDDKSLD QLDTFITADA WYRPKSILKD GKTWTASTEA DKRPLLMVWW PDKSTQVNYL  120
NYMQNQGLGA GSFSTNSSQE SLDQAAKAVQ TKIEERIARE GNTNWLRTSI DQFIKTQPGW  180
NSSTENSSYD HLQGGQLLFN NSKGDTGNRT SHANSDYRLL NRTPTNQTGT RKYFKDNSIG  240
GLEFLLANDI DNSNPAVQAE QLNWLHFMMN IGSIMANDPT ANFDGLRVDA LDNVDADLLQ  300
IASDYFKAAY GVDKSEANAI KHLSYLEAWS ANDPYYNKDT KGAQLPIDNA LRNALTNLLM  360
RDKNTRMQLG DMTAFINSSL NPRGANDKNG ERMANYIFTR AHDTEAQTII QRIIRDRINP  420
NLFGYNFTRD EIKKAFEIYN EDIDKAHKTY ASYNLPSVYA LMLTNKDSVT RVYYGDLYRE  480
DGHYMAKKTP YFDAIDTLLR ARIKYVAGGQ DMEVKKVGND GLLTSVRYGK GANNRTDLGT  540
SETRTQGMGV IMTNNYDFRL GSNETVTMNM GRAHRNQLYR PLLLTTKDGI ATYFNDSDVP  600
KNLLKRTDWN GNLTFNANDV FGVENVQVSG YLGVWVPVGA KANQDARTQP SNRANSDGQV  660
YKSSAALDSQ VMYEAFSNFQ AFADDQPELY MNRVLAKNTD LLKAWGVTSV GLPPQYVSSK  720
DGTFLDSTID NGYAFDDRYD MALSQNNKYG SLEDLLNVLR ALHKDGIQAI ADWVPDQIYN  780
LPGKEVVNAT RVNGYGYHQQ GYQIVDQAYV ANTRTDGTDY QGKYGGAFLD ELKAKYPSIF  840
NRVQISNGKQ LPTNEKITKW SAKYFNGTNI LGRGINYVLR DDKTNQYFNT SANSQLLPTP  900
LRDTGAITST QVFQRRGQDV YFLRDNQAVK NEFVQDGNGN WYYFGADGKM TKGAQTINKK  960
DYYFFDNGIQ LRNALRRANN GYTYYYGLDG AMVKNAFVDF DDKRKQVRAF TTQGTMVVGN  1020
LHWSGHHFYF DRETGIQAKD RIVRTDDGKL HYYVAGTGDM GRNVFATDSS TGKRYYFDAD  1080
GNTVTGSRVI DGKTYYFNQD GSVGTAYSNR ADSIIFENGK ARYITPAGEI GRSIFVYNPA  1140
TKAWNYFDKE GNRVTGRQYI DGHLYYFKED GSQAKGEIIE ENGIKYYYEP ESGILASGRY  1200
LQVGDDQWMY FKQDGSLAIG QVRADHGYLK YFDKNGIQVK GKTIVEDGKT YYYDAHSGAL  1260
VTSSFAEIAP NQWSYFNTDG QALKGKWTIN GKEYYFDQNG IQYKGKAVKV GSRYKYYDEN  1320
DGQPVTNRFA QIEPNVWAYF GADGYAVTGE QVINGQHLYF DQSGRQVKGA YVTVNGQRRY  1380
YDANTGEYVP GR                                                     1392

SEQ ID NO: 105         moltype = DNA  length = 4179
FEATURE                Location/Qualifiers
source                 1..4179
                       mol_type = unassigned DNA
                       organism = Streptococcus salivarius
SEQUENCE: 105
atcaacggca aacaatacta tgtcaatagt gacggtagtg tgcgtaagaa ctttgttttt  60
gagcaagatg gtaagtctta ttactttgat gctgaaacag gggctcttgc gactaagtca  120
caggatgaat tttcaacaga acctatcaag gcaaccgtag atttttcatc tggtaaccag  180
ctctacaaaa acgatgacaa atctttggac caacttgaca ccttcatcac agcggatgct  240
tggtaccgtc caaagagcat tctcaaggat ggtaagactt ggacagcttc aactgaagct  300
gacaaacgtc ctctcttgat ggtttggtgg cctgacaagt ctactcaggt caactacctt  360
aactacatgc aaaatcaagg tcttggtgca gggtcatttt caaccaactc tagccaggaa  420
agtctggacc aagctgctaa agcggttcag actaagattg aagaacgtat cgcgcgtgag  480
ggcaatacca actggttgcg tacaagtatc gaccagttca tcaagacaca gccaggttgg  540
aatagtagca ctgaaaatag ttcatacgac cacttgcaag gcggacagtt gctctttaac  600
aacagtaagg gtgatactgg caaccgtacc agccacgcca actctgacta tcgtttgtta  660
aaccgcacac cgactaacca gacgggtaca cgtaagtact tcaaggataa ttctatcggt  720
ggtcttgagt tcttgcttgc caacgatatt gataactcaa acccagctgt tcaggcagag  780
caacttaact ggctccactt tatgatgaat atcggaagca tcatggctaa tgacccaact  840
gccaactttg acggtttgcg tgtcgatgcc ttggacaatg tggatgccga cctgctccaa  900
```

-continued

```
atcgcatcag actacttcaa agcagcctat ggtgttgaca agtctgaagc caatgccatc  960
aagcacttgt catacttgga agcatggtct gccaacgacc catactacaa caaggacact  1020
aagggagcac aacttccgat tgacaatgcc cttcgtaatg ccctcaccaa cctcttgatg  1080
cgtgataaaa atacacgtat gcagcttgga gacatgactg ctttcatcaa cagtagtttg  1140
aacccacgag gtgccaacga taaaaacggt gaacgtatgg caaactatat tttcacccgt  1200
gcccatgata cagaagctca aaccattatt caacgtatca ttcgtgatcg tattaaccca  1260
aatttgtttg gttataattt cacacgtgat gaaatcaaga aagccttcga gatttacaat  1320
gaggatattg ataaggctca caagacttat gcgtcataca acttgccatc tgtctatgcc  1380
ctcatgttga ccaataagga ctctgtaaca cgtgtttatt acggagacct ctaccgtgaa  1440
gatggtcact acatggctaa gaagacgcct tactttgatg ccatcgacac cctcttgcgt  1500
gcccgtatca agtatgtagc tggtggtcaa gacatggaag tgaagaaagt cggaaatgac  1560
ggcctcttga catcagttcg ttatggtaaa ggtgccaata acagaactga tttgggaact  1620
tctgaaactc gtacgcaagg tatgggtgtc atcatgacca acaactatga tttccgcttg  1680
ggtagcaatg aaactgtaac gatgaacatg ggtagagctc accgtaatca gctttatcga  1740
ccattgcttt tgacgacaaa ggatggtata gcaacctacc tcaacgattc tgatgtgcct  1800
aaaaaccttc tgaaacgtac tgactggaat gggaacttga ccttcaatgc caacgatgtt  1860
ttcggtgtag aaaatgtcca agtctcaggt tacctcggtg tctgggtacc atacggagct  1920
aaggctaatc aagatgcacg tacacagcca agtaatcgtg ccaatagcga cggtcaagtt  1980
tacaagtctt cagcagccct tgattcgcaa gtcatgtatg aagccttctc aaacttccaa  2040
gcctttgcgg acgatcaacc tgaactttac atgaaccgtg tcttggctaa gaacactgac  2100
ttgctcaaag catgggggat cacgtcagtc ggacttccac cacagtacgt ttcaagtaag  2160
gatggcacct tccttgactc aataattgat aatggttatg cctttgatga ccgttacgat  2220
atggccttga gtcaaaataa taaatacgga tcacttgagg acctccttaa cgttcttcgt  2280
gccctccata aagacggtat tcaagccatt gctgactggg taccagacca aatctataac  2340
ctcccaggaa aagaagtggt aaatgcgaca cgtgttaacg gctacggtta tcaccaacaa  2400
ggttatcaaa ttgtggacca agcctatgtg gcaaataccc gtacagatgg tacagactat  2460
caaggcaagt acggtggtgc cttccttgat gagctgaaag ctaagtaccc atctattttc  2520
aaccgtgtgc aaatctcaaa tggtaagcaa ttgcctacga atgaaaagat tacaaaatgg  2580
tctgctaagt acttcaacgg aaccaacatc cttggacgag gcatcaactt tgtccttcgt  2640
gatgacaaga ccaaccagta ctttaatact tcagctaaca gccaactctt gccaacacca  2700
cttcgtgata cgggtgccat cacaagcact caagtcttcc aacgtcgtgg acaagatgtt  2760
tacttccttc gcgataacca aaccgttaag aatgaatttg ttcaagacgg taacggtaac  2820
tggtattact tcggtggtga cggtaagatg accaagggtg cccaaaacat caatagcaag  2880
gattactatt tctttgataa tggtgttcaa ttgcgtaatg ccctgcgtcg tgcttcaaac  2940
ggctatactt actattacgg tctggacggt gctatggtta agaatgcctt cgttgatttt  3000
gatgacaagc ataagcaggt ccgtgccttt acgactcaag gaacaatggt agtgggtaac  3060
cttcattgga gtggacacca tttctacttt gaccgtgaaa cgggtatcca ggctaaggat  3120
cgcgttgttc gtacagatga tggcaaattg cattactatg ttgctgaaac tggtgacatg  3180
ggacgtaacg tctttgcgac agacagcagc acaggtaaac gttattactt tgacgctgat  3240
ggtaacactg tgactggctc acgtgtcatt gacggtaaga cttattactt taaccaagat  3300
ggtagtgtcg gtacggccta cagcaatcgt gcagattcta ttatctttga aaatggtaag  3360
gctcgctaca tcacaccagc aggcgaaatc ggacgtagca tctttgtcta caacccagca  3420
actaaggcat ggaactactt tgataaagaa ggtaaccgtg tcacaggacg tcaatacatt  3480
gatggtcacc tctattactt caaggaagat ggtagccaag ctaagggcga aattatcgag  3540
gaaaacggca ttaagtatta ctatgagcca gaatcaggta ttcttgcttc aggacgctac  3600
ctccaagttg gtgatgacca gtggatgtac ttcaaacaag acggttcact ggctatcggc  3660
caagttcgtg ctgatcatgg ataccttaag tactttgata aaaatggtat ccaagttaag  3720
gggaaaaactg ttgtcgaaga tggtaagact tattactatg atgcccacag tggagctctt  3780
gtcacaagca gctttgctga gattgcacca aaccaatggt cttacttcaa tactgatgga  3840
caagccctta aaggcaagtg gacgatcaat ggcaaggaat actactttga cgaaaatggt  3900
atccaataca aaggcaaggc cattaaggtc ggtagtcgtt acaagtacta tgacgaaaac  3960
gacggtcaac ctgtaactaa tcgctttgct caaatcgagc ctaacgtctg ggcatacttc  4020
ggagcagatt gctatgccgt aacaggcgaa caagtcatca atggacaaca cctttacttt  4080
gatgaaaatg gtcgccaagt taagggtgcc tacgttacag tcaacggcca acgccgttac  4140
tacgatgcta acactggcga atatgtccca ggaagataa                        4179
```

```
SEQ ID NO: 106         moltype = AA  length = 1392
FEATURE                Location/Qualifiers
source                 1..1392
                       mol_type = protein
                       organism = Streptococcus salivarius
SEQUENCE: 106
INGKQYYVNS DGSVRKNFVF EQDGKSYYFD AETGALATKS QDEFSTEPIK ATVDFSSGNQ  60
LYKNDDKSLD QLDTFITADA WYRPKSILKD GKTWTASTEA DKRPLLMVWW PDKSTQVNYL  120
NYMQNQGLGA GSFSTNSSQE SLDQAAKAVQ TKIEERIARE GNTNWLRTSI DQFIKTQPGW  180
NSSTENSSYD HLQGGQLLFN NSKGDTGNRT SHANSDYRLL NRTPTNQTGT RKYFKDNSIG  240
GLEFLLANDI DNSNPAVQAE QLNWLHFMMN IGSIMANDPT ANFDGLRVDA LDNVDADLLQ  300
IASDYFKAAY GVDKSEANAI KHLSYLEAWS ANDPYYNKDT KGAQLPIDNA LRNALTNLLM  360
RDKNTRMQLG DMTAFINSSL NPRGANDKNG ERMANYIFTR AHDTEAQTII QRIIRDRINP  420
NLFGYNFTRD EIKKAFEIYN EDIDKAHKTY ASYNLPSVYA LMLTNKDSVT RVYYGDLYRE  480
DGHYMAKKTP YFDAIDTLLR ARIKYVAGGQ DMEVKKVGND GLLTSVRYGK GANNRTDLGT  540
SETRTQGMGV IMTNNYDFRL GSNETVTMNM GRAHRNQLYR PLLLTTKDGI ATYLNDSDVP  600
KNLLKRTDWN GNLTFNANDV FGVENVQVSG YLGVWVPYGA KANQDARTQP SNRANSDGQV  660
YKSSAALDSQ VMYEAFSNFQ AFADDQPELY MNRVLAKNTD LLKAWGITSV GLPPQYVSSK  720
DGTFLDSIID NGYAFDDRYD MALSQNNKYG SLEDLLNVLR ALHKDGIQAI ADWVPDQIYN  780
LPGKEVVNAT RVNGYGYHQQ GYQIVDQAYV ANTRTDGTDY QGKYGGAFLD ELKAKYPSIF  840
NRVQISNGKQ LPTNEKITKW SAKYFNGTNI LGRGINFVLR DDKTNQYFNT SANSQLLPTP  900
LRDTGAITST QVFQRRGQDV YFLRDNQTVK NEFVQDGNGN WYYFGGDGKM TKGAQNINSK  960
DYYFFDNGVQ LRNALRRASN GYTYYYGLDG AMVKNAFVDF DDKHKQVRAF TTQGTMVVGN  1020
```

```
LHWSGHHFYF DRETGIQAKD RVVRTDDGKL HYYVAETGDM GRNVFATDSS TGKRYYFDAD  1080
GNTVTGSRVI DGKTYYFNQD GSVGTAYSNR ADSIIFENGK ARYITPAGEI GRSIFVYNPA  1140
TKAWNYFDKE GNRVTGRQYI DGHLYYFKED GSQAKGEIIE ENGIKYYYEP ESGILASGRY  1200
LQVGDDQWMY FKQDGSLAIG QVRADHGYLK YFDKNGIQVK GKTVVEDGKT YYYDAHSGAL  1260
VTSSFAEIAP NQWSYFNTDG QALKGKWTIN GKEYYFDENG IQYKGKAIKV GSRYKYYDEN  1320
DGQPVTNRFA QIEPNVWAYF GADCYAVTGE QVINGQHLYF DENGRQVKGA YVTVNGQRRY  1380
YDANTGEYVP GR                                                       1392

SEQ ID NO: 107          moltype = DNA  length = 4179
FEATURE                 Location/Qualifiers
source                  1..4179
                        mol_type = unassigned DNA
                        organism = Streptococcus sp.
SEQUENCE: 107
attaacggca aacaatacta tgtcaatagt gacggtagtg tgcgtaagaa ctttgtcttt  60
gagcaagatg gtaagtctta ttactttgat gctgaaacag gggctcttgc gaccaagtca  120
caggatgaat tttcaacaga acctatcaag gcaaccgtag atttttcatc tggaaaccag  180
ctctacaaaa acgatgacaa gtctttggac caactcgaca ccttcatcac agcggatgct  240
tggtaccgtc caaagagcat tctcaaggat ggtaagactt ggacagcttc aactgaagcg  300
gacaaacgtc cactcttgat ggtttggtgg cctgacaagt caactcaggt taactacctc  360
aactatatgc aaaatcaagg tcttggtgca ggctcattct caaccaactc tagccaggaa  420
tcactagacc aagctgccaa gatggttcag actaagattg aagaacgtat cgctcgtgaa  480
ggaaacacaa actggttgcg tacaagtatc gaccagttca tcaagactca gccaggttgg  540
aatagtagca ctgaaaatag ttcatacgac cacttgcaag gtggacagtt gctctttaac  600
aacagtaagg gtgatactgg caaccgtacg agtcacgcca actctgacta tcgtttgctt  660
aaccgcacac cgactaacca gacgggtacg cgtaagtact tcaaggacaa ttctatcggt  720
ggtcttgagt tcttgcttgc caacgatatt gataactcaa acccagcagt tcaggcagag  780
caacttaact ggcttcactt tatgatgaat atcggaagca tcatggcgaa tgacccaaca  840
gcaaactttg acggtttgcg tgtcgatgcc ttggacaatg tggatgccga ccttctccaa  900
atcgcttcag attacttcaa agcagcctat ggtgtggaca agtctgaagc caatgccatt  960
aagcacttgt catacttgga agcatggtct gccaacgacc catactataa caaggacact  1020
aagggggcac aacttccgat tgataatgcc cttcgtaatg cccttaccaa cctcttgatg  1080
cgtgataaaa atacacgtat gcagcttggg gacatgactg ctttcatcaa cagtagtttg  1140
aatccacgtg gtgctaacga taaaaatggt gaacgtatgg ctaactatat tttcacccgt  1200
gcccacgata cggaagctca aacgattatc caacgtatca tccgtgatcg tatcaatcca  1260
aatttgtttg gctacaattt cactcgtgat gaaatcaaga aagccttcga gatttacaat  1320
gaggatattg ataaggctca caagacttat gcgtcataca acttgccatc tgtttatgct  1380
ctcatgttga ccaacaagga ctctgtaaca cgtgtttatt acggagacct ctatcgtgag  1440
gatggtcact acatggctaa aaagacgcct tactttgatg ccatcgacac cctcttgcgt  1500
gctcgtatca agtatgtagc tggtggtcaa gacatggaag tgaagaaagt cggaaatgat  1560
ggcctcttga catctgttcg ttatggtaaa ggtgccaata acagaactga tttgggaact  1620
tcagaaactc gtacgcaagg tatgggtgtc atcatgacca acaactatga tttccgcttg  1680
ggtagcaatg aaactgtaac gatgaacatg ggtagagcac accgtaatca gctttatcgc  1740
ccattgcttt tgacaacaaa agatggtata gcaacctacc tcaacgattc tgatgtgcct  1800
aaaaaccttc ttaaacgcac tgactggaat gggaacttga ccttcaatgc caacgatgtt  1860
ttcggtgtag aaaatgtcca agtctcaggt tacctcggtg tctgggtacc atacggagct  1920
aaggctaatc aagatgcacg tacacagcca agtaatcgtg ccaatagcga cggtcaagtt  1980
tacaagtctt cagcagccct tgattcgcaa gtcatgtatg aagccttctc aaacttccaa  2040
gcatttgcgg acgatcagcc agaactctac atgaaccgtg tcttggctaa gaacactgac  2100
ttgctcaaag catggggaat cacgtcggtc ggacttccac cacagtatgt ttcaagtaaa  2160
gatggcactt tccttgactc aacaattgat aatggttatg cctttgatga ccgttacgat  2220
atggccttga gtcaaaataa taaatacgga tcacttgagg acctccttaa cgttcttcgt  2280
gccctccata aagacggtat tcaagccatt gctgactggg tgccagacca aatctataac  2340
ctcccaggaa aagaagtggt aaatgcgaca cgtgttaatg gttatggtaa ccaccaagta  2400
ggctaccaaa tcattgacca agcctatgtg gctaatactc gtacagatgg tacagactat  2460
caaggtaaat acggtggtgc cttccttgat gagcttaaag ctaagtaccc atctattttc  2520
aaccgtgtgc aaatctcaaa tggaaaacag ttgcctacga atgaaaagat tactaaatgg  2580
tctgctaagt acttcaacgg aactaatatc cttggacgag gtatcaacta tgtccttcgt  2640
gatgacaaga ctaaccagta ctttaatact tcagccaaca gccaactctt gccaacacca  2700
cttcgtgata ctggtgccat cacaagcact caagtcttcc aacgtcgtgg acaagatgtt  2760
tatttcctac gtgataacca agctgttaag aatgaatttg ttcaagatgg taacggcaac  2820
tggtattact ttggtggtga tggtaagatg accaagggtg cccaaaacat caataacaag  2880
gattactatt tctttgacaa tggtatccaa ttgcgtaacg cccttcgtcg tgcaagcaac  2940
ggctatacct actattacgg tctggacggc gcaatggtta agaatgcctt cgttgatttt  3000
gatgacaaac ataagcaggt tcgtgccttt acgactcaag gaacaatggt agtaggtaac  3060
cttcattgga gtggtcacca tttctacttt gaccgtgaaa ctggtatcca ggctaaggat  3120
cgcgttgttc gtacagatga tggcaaattg cattactatg ttgctgaaac gggtgacatg  3180
ggacgtaacg tctttgcgac agacagcagc acaggtaaac gttattactt tgacgctgat  3240
ggtaacactg tgactggctc acgtgtcatt gacggtaaga cttattactt taaccaagat  3300
ggtagtgtcg gtacggccta cagcaatcgt gcagattcta ttatctttga aaatggtaag  3360
gctcgctaca tcacaccagc aggcgaaatc ggacgcagca tctttgtcta taacccagca  3420
actaaggctt ggaactactt tgataaagaa ggtaaccgtg tcacaggacg tcaatacatt  3480
gatggtcacc tctattactt caaggaagat ggtagccaag ctaagggtga aattatcgag  3540
gaaaacggca ttaagtatta ctatgagcca gaatcaggta ttcttgcaag cggacgctac  3600
ctccaagttg gtgatgacca gtggatgtac ttcaaacaag acggttcact ggctatcggc  3660
caagttcgtg ctgatcatgg ataccttaag tactttgata aaaatggtat ccaagttaag  3720
gggaaaactg ttgtcgaaga tggtaagact tattactatg atgcccacag tggagctctt  3780
gtcacaagca gctttgctga gattgcacca aaccaatggt cttacttcaa tactgatgga  3840
caagccctta aaggcaagtg gactatcaat ggcaaggaat actactttga cgaaaatggt  3900
```

```
atccaataca aaggcaaggc cattaaggtc ggcagtcgtt acaagtacta tgacgaaaac  3960
gacggtcaac ctgtaaccaa ccgcttcgct caaatcgagc ctaatgtctg ggcttacttt  4020
ggagcagatg gttatgcagt gacaggggaa caagtcatca atggacaaca cctttacttt  4080
gaccaatcag gtcgccaagt taaaggagcc tacgtcacag tcaatggaca acgccgttac  4140
tacgatgcca acactggcga atatgtccca ggaagataa                         4179

SEQ ID NO: 108          moltype = AA  length = 1392
FEATURE                 Location/Qualifiers
source                  1..1392
                        mol_type = protein
                        organism = Streptococcus sp.
SEQUENCE: 108
INGKQYYVNS DGSVRKNFVF EQDGKSYYFD AETGALATKS QDEFSTEPIK ATVDFSSGNQ  60
LYKNDDKSLD QLDTFITADA WYRPKSILKD GKTWTASTEA DKRPLLMVWW PDKSTQVNYL  120
NYMQNQGLGA GSFSTNSSQE SLDQAAKMVQ TKIEERIARE GNTNWLRTSI DQFIKTQPGW  180
NSSTENSSYD HLQGGQLLFN NSKGDTGNRT SHANSDYRLL NRTPTNQTGT RKYFKDNSIG  240
GLEFLLANDI DNSNPAVQAE QLNWLHFMMN IGSIMANDPT ANFDGLRVDA LDNVDADLLQ  300
IASDYFKAAY GVDKSEANAI KHLSYLEAWS ANDPYYNKDT KGAQLPIDNA LRNALTNLLM  360
RDKNTRMQLG DMTAFINSSL NPRGANDKNG ERMANYIFTR AHDTEAQTII QRIIRDRINP  420
NLFGYNFTRD EIKKAFEIYN EDIDKAHKTY ASYNLPSVYA LMLTNKDSVT RVYYGDLYRE  480
DGHYMAKKTP YFDAIDTLLR ARIKYVAGGQ DMEVKKVGND GLLTSVRYGK GANNRTDLGT  540
SETRTQGMGV IMTNNYDFRL GSNETVTMNM GRAHRNQLYR PLLLTTKDGI ATYLNDSDVP  600
KNLLKRTDWN GNLTFNANDV FGVENVQVSG YLGVWVPYGA KANQDARTQP SNRANSDGQV  660
YKSSAALDSQ VMYEAFSNFQ AFADDQPELY MNRVLAKNTD LLKAWGITSV GLPPQYVSSK  720
DGTFLDSTID NGYAFDDRYD MALSQNNKYG SLEDLLNVLR ALHKDGIQAI ADWVPDQIYN  780
LPGKEVVNAT RVNGYGNHQV GYQIIDQAYV ANTRTDGTDY QGKYGGAFLD ELKAKYPSIF  840
NRVQISNGKQ LPTNEKITKW SAKYFNGTNI LGRGINYVLR DDKTNQYFNT SANSQLLPTP  900
LRDTGAITST QVFQRRGQDV YFLRDNQAVK NEFVQDGNGN WYYFGGDGKM TKGAQNINNK  960
DYYFFDNGIQ LRNALRRASN GYTYYYGLDG AMVKNAFVDF DDKHKQVRAF TTQGTMVVGN  1020
LHWSGHHFYF DRETGIQAKD RVVRTDDGKL HYYVAETGDM GRNVFATDSS TGKRYYFDAD  1080
GNTVTGSRVI DGKTYYFNQD GSVGTAYSNR ADSIIFENGK ARYITPAGEI GRSIFVYNPA  1140
TKAWNYFDKE GNRVTGRQYI DGHLYYFKED GSQAKGEIIE ENGIKYYYEP ESGILASGRY  1200
LQVGDDQWMY FKQDGSLAIG QVRADHGYLK YFDKNGIQVK GKTVVEDGKT YYYDAHSGAL  1260
VTSSFAEIAP NQWSYFNTDG QALKGKWTIN GKEYYFDENG IQYKGKAIKV GSRYKYYDEN  1320
DGQPVTNRFA QIEPNVWAYF GADGYAVTGE QVINGQHLYF DQSGRQVKGA YVTVNGQRRY  1380
YDANTGEYVP GR                                                      1392

SEQ ID NO: 109          moltype = DNA  length = 4179
FEATURE                 Location/Qualifiers
source                  1..4179
                        mol_type = unassigned DNA
                        organism = Streptococcus salivarius
SEQUENCE: 109
attaacggca aacaatacta tgtcaatagt gacggtagtg tacgtaaaaa cttcgttttt  60
gagcaagatg gtaagtctta ttactttgat gctgaaacag gggcacttgc gactaagtct  120
caggatgaat tttcaacaga acctatcaag gcaaccgtag atttttcatc tggaaaccag  180
ctctacaaaa acgatgacaa gtctttggac caactcgaca ccttcatcac agcggatgct  240
tggtaccgtc caaagagcat tctcaaggat ggtaagactt ggacagcttc aactgaagcg  300
gacaaacgtc ctctattgat ggtttggtgg cctgacaagt ctactcaggt caactacctt  360
aactacatgc aaaatcaagg tcttggagca gggtcatttt caaccaactc tagtcaggaa  420
agtctggacc aagctgctaa agcggttcag actaagattg aagaacgtat cgcgcgtgag  480
ggcaatacca actggttacg tacaagtatc gaccagttca tcaagactca gccaggttgg  540
aatagtagca ctgaaaatag ttcatacgac cacttgcaag gcggacagtt gctctttaac  600
aacagtaagg gtgatactgg caaccgtacc agccacgcca actctgacta tcgtttgctt  660
aaccgcacac cgacaaacca aacgggtaca cgtaagtact tcaaggacaa ttctatcggt  720
ggtcttgagt tcttgcttgc caacgatatt gataactcaa acccagctgt tcaggcagaa  780
caacttaact ggctccactt tatgatgaat atcggaagta tcatggcaaa tgacccaact  840
gccaactttg acggtttgcg tgtcgacgcc ttggacaatg tggatgccga ccttctccaa  900
atcgcttcag attactttaa agcagcctat ggggttgaca agtctgaagc caatgctatt  960
aagcacttgt catatttgga agcatggtct gccaacgacc catactacaa caaggacact  1020
aagggagcac aacttccgat tgataatgcc cttcgtaacg cccttaccaa cctcttgatg  1080
cgtgataaaa atacacgtat gcagcttggg gacatgactg ccttcatcaa tagtagtttg  1140
aatccacgtg gtgccaacga taaaaacggt gaacgtatgg ctaactatat tttcactcgt  1200
gcccatgata cagaagctca aacgattatt caacgtatca tccgtgatcg tattaaccca  1260
aatttatttg gttacaattt cactcgtgat gaaatcaaga aagccttcga gatttacaat  1320
gaggatattg ataaggctca caagacttat gcgtcataca acttaccatc tgtctatgcc  1380
ctcatgttga ccaacaagga ctctgtaaca cgtgtttatt acggagacct ctatcgtgaa  1440
gatggtcact acatggctaa aaagacaccg tactttgatg ccatcgacac cctcttgcgt  1500
gctcgcatca agtatgtagc tggtggtcaa gacatggaag tgaagaaagt cggaaatgat  1560
ggactcttga catctgttcg ttatggtaaa ggtgccaata acagaactga tttgggaact  1620
tctgaaaccc gtacgcaagg gatgggtgtc atcatgacca acaactatga tttccgcttg  1680
ggtagcaatg aaaccgtaac gatgaacatg ggtagagctc accgtaatca gctttatcgc  1740
ccattgcttt tgacgacaaa ggatggtata gcaacctacc tcaacgattc tgatgtgcct  1800
aaaaaacttc tgaaacgtac tgactggaat gggaacttga ccttcaatgc caacgatgtt  1860
ttcggtgtag aaaatgtcca agtctcaggt tacctcggtg tctgggtacc atacggagct  1920
aaggctaatc aagatgcacg tacacagcca agtaatcgtg ccaatagcga cggtcaagtt  1980
tacaagtctt cagcagccct tgattcgcaa gtcatgtatg aagccttctc aaacttccaa  2040
gcctttgcgg acgatcaacc tgaactttac atgaaccgtg tcttggctaa gaacactgac  2100
ttgctcaaag catgggggat cacgtcagtc ggacttccac cacagtacgt ttcaagtaag  2160
```

-continued

```
gatggcacct tccttgactc aacaattgat aatggttatg cctttgatga ccgttacgat  2220
atggccttga gtcaaaataa taaatacgga tcacttgagg acctccttaa cgttcttcgt  2280
gctctccaca aagacggtat tcaagccatt gctgactggg tgccagacca aatctataac  2340
ctcccaggaa aagaagtggt aaatgcgaca cgtgttaatg gttatggtaa ccaccaagta  2400
ggctaccaaa tcattgacca agcctatgtg gctaatactc gtacagatgg tacagactat  2460
caaggtaaat acggtggagc cttccttgat gagcttaaag ctaagtaccc atctattttc  2520
aaccgtgtgc aaatctcaaa tggaaaacag ttgcctacga atgaaaagat tactaaatgg  2580
tctgctaagt acttcaacgg aactaatatc cttggacgag gtatcaacta tgtccttcgt  2640
gatgacaaga ctaaccagta ctttaatact tcagccaaca gccaactctt gccaacacca  2700
cttcgcgata caggtgccat cacaagcact caagtcttcc aacgtcgtgg acaagatgtt  2760
tatttcctac gtgataacca agctgttaag aatgaatttg ttcaagacgg aaacggtaac  2820
tggtattact tcggtggtga cggtaagatg accaagggtg cccaaaacat caataacaag  2880
gattactatt tctttgacaa tggtatccaa ttgcgtaacg cccttcgtcg tgcttcaaac  2940
ggctatacct actattacgg tctggacggt gccatggtta agaatgcctt cgttgatttt  3000
gatgacaaac ataagcaggt tcgtgccttt acgactcaag gaacaatggt agtaggtaac  3060
cttcattgga gtggacacca tttctacttt gaccgtgaaa cgggtattca ggctaaggat  3120
cgcgttgtcc gtaccgatga tggcaaattg cattactatg ttgctgagac aggtgacatg  3180
ggacgtaacg tctttgcgac agacagcagc acaggtaaac gttattactt tgacgctgac  3240
ggtaacactg tgactggctc acgtgtcatt gatggtaaga cttattactt taaccaagat  3300
ggtagcgtcg gtacggccta cagcaatcgt gcagattcta ttatctttga aaatggtaag  3360
gctcgctaca tcacaccagc aggtgaaatc ggacgtagca tctttgtcta taacccagaa  3420
actaaggctt ggaactactt tgataaagaa ggtaaccgtg tcacaggacg ccaatacatt  3480
gatggtcacc tttattactt caaggaagat ggtagccaag ctaagggtga aattatcgaa  3540
gaaaatggcg tcaaatatta ttatgagcca gaatcaggta ttcttgcttc aggacgctac  3600
ctccaagttg gtgatgacca gtggatgtac ttcaaacaag acggttcact ggctatcggc  3660
caagttcgtg ctgatcatgg ataccttaag tactttgata aaaatggtat ccaagttaag  3720
gggaaaactg ttgtcgaaga tggtaagact tattactatg atgcccacag tggagctctt  3780
gtcacaagca gctttgctga gattgcacca aaccaatggt cttacttcaa tactgatgga  3840
caagccctta aaggcaagtg gactatcaat ggcaaggaat actactttga cgaaaatggt  3900
atccaataca aaggcaaggc cattaaggtc ggcagtcgtt acaagtacta tgacgaaaac  3960
gacggtcaac ctgtaaccaa ccgctttgct caaatcgagc ctaacgtctg ggcttacttc  4020
ggagcagatg gttatgccgt aacaggcgaa caagtcatca atggacaaca cctttacttt  4080
gaccaatcag gtcgccaagt taaaggtgcc tacgtcacag tcaacggcca acgtcgttac  4140
tacgatgcca acactggcga atatgtccca ggaagataa                        4179
```

```
SEQ ID NO: 110         moltype = AA  length = 1392
FEATURE                Location/Qualifiers
source                 1..1392
                       mol_type = protein
                       organism = Streptococcus salivarius
SEQUENCE: 110
INGKQYYVNS DGSVRKNFVF EQDGKSYYFD AETGALATKS QDEFSTEPIK ATVDFSSGNQ  60
LYKNDDKSLD QLDTFITADA WYRPKSILKD GKTWTASTEA DKRPLLMVWW PDKSTQVNYL  120
NYMQNQGLGA GSFSTNSSQE SLDQAAKAVQ TKIEERIARE GNTNWLRTSI DQFIKTQPGW  180
NSSTENSSYD HLQGGQLLFN NSKGDTGNRT SHANSDYRLL NRTPTNQTGT RKYFKDNSIG  240
GLEFLLANDI DNSNPAVQAE QLNWLHFMMN IGSIMANDPT ANFDGLRVDA LDNVDADLLQ  300
IASDYFKAAY GVDKSEANAI KHLSYLEAWS ANDPYYNKDT KGAQLPIDNA LRNALTNLLM  360
RDKNTRMQLG DMTAFINSSL NPRGANDKNG ERMANYIFTR AHDTEAQTII QRIIRDRINP  420
NLFGYNFTRD EIKKAFEIYN EDIDKAHKTY ASYNLPSVYA LMLTNKDSVT RVYYGDLYRE  480
DGHYMAKKTP YFDAIDTLLR ARIKYVAGGQ DMEVKKVGND GLLTSVRYGK GANNRTDLGT  540
SETRTQGMGV IMTNNYDFRL GSNETVTMNM GRAHRNQLYR PLLLTTKDGI ATYLNDSDVP  600
KKLLKRTDWN GNLTFNANDV FGVENVQVSG YLGVWVPYGA KANQDARTQP SNRANSDGQV  660
YKSSAALDSQ VMYEAFSNFQ AFADDQPELY MNRVLAKNTD LLKAWGITSV GLPPQYVSSK  720
DGTFLDSTID NGYAFDDRYD MALSQNNKYG SLEDLLNVLR ALHKDGIQAI ADWVPDQIYN  780
LPGKEVVNAT RVNGYGNHQV GYQIIDQAYV ANTRTDGTDY QGKYGGAFLD ELKAKYPSIF  840
NRVQISNGKQ LPTNEKITKW SAKYFNGTNI LGRGINYVLR DDKTNQYFNT SANSQLLPTP  900
LRDTGAITST QVFQRRGQDV YFLRDNQAVK NEFVQDGNGN WYYFGGDGKM TKGAQNINNK  960
DYYFFDNGIQ LRNALRRASN GYTYYYGLDG AMVKNAFVDF DDKHKQVRAF TTQGTMVVGN  1020
LHWSGHHFYF DRETGIQAKD RVVRTDDGKL HYYVAETGDM GRNVFATDSS TGKRYYFDAD  1080
GNTVTGSRVI DGKTYYFNQD GSVGTAYSNR ADSIIFENGK ARYITPAGEI GRSIFVYNPE  1140
TKAWNYFDKE GNRVTGRQYI DGHLYYFKED GSQAKGEIIE ENGVKYYYEP ESGILASGRY  1200
LQVGDDQWMY FKQDGSLAIG QVRADHGYLK YFDKNGIQVK GKTVVEDGKT YYYDAHSGAL  1260
VTSSFAEIAP NQWSYFNTDG QALKGKWTIN GKEYYFDENG IQYKGKAIKV GSRYKYYDEN  1320
DGQPVTNRFA QIEPNVWAYF GADGYAVTGE QVINGQHLYF DQSGRQVKGA YVTVNGQRRY  1380
YDANTGEYVP GR                                                     1392
```

```
SEQ ID NO: 111         moltype = DNA  length = 4179
FEATURE                Location/Qualifiers
source                 1..4179
                       mol_type = unassigned DNA
                       organism = Streptococcus sp.
SEQUENCE: 111
atcaacggca aacaatatta tgtcaatagt gacggtagtg tgcgtaagaa cttcgttttt  60
gagcaagacg gtaagtctta ttactttgat gctgaaactg ggctcttgc gactaagtca  120
caggatgaat tttcaacaga acctatcaag gcaaccgtcg atttttcatc tggaaaccag  180
ctctacaaaa acgatgacaa gtctttagac caacttgaca ccttcatcac agccgatgct  240
tggtatcgtc caaagagcat tctcaaggat ggtaagactt ggacagcttc aactgaagcg  300
gacaaacgtc ctctattgat ggtttggtgg cctgacaagt ctactcaggt taactacctt  360
aactacatgc aaaatcaagg tcttggagca gggtcctttt caaccaactc tagccaggaa  420
```

-continued

```
agtctggacc aagctgctaa agcagttcag actaagattg aagaacgtat cgctcgtgaa  480
ggcaacacaa actggttgcg tacaagtatc gaccagttca tcaagactca gccaggttgg  540
aatagtagca ctgaaaatag tagctatgac cacttgcaag gtggacagtt gctctttaac  600
aacagtaagg gtgatactgg caaccgtacc agtcacgcca actctgacca tcgtttgctt  660
aaccgcacac cgactaacca gacgggaaca cgtaagtact tcaaggacaa ttcaatcggt  720
ggtcttgagt tcttgcttgc caacgatatt gataactcaa acccagctgt tcaggcagaa  780
caacttaact ggctccactt tatgatgaat atcggaagta tcatggcgaa tgacccaaca  840
gctaactttg acggtttgcg tgtcgatgcc ttggacaatg tggatgccga ccttctccaa  900
atcgcttcag attacttcaa agcagcctat ggtgttgaca agtctgaagc caatgcaatc  960
aagcatttgt catacttgga agcatggtct gccaacgacc catactacaa caaggacact  1020
aagggagcac aacttccgat tgacaatgcc cttcgtaatg ctcttaccaa cctcttgatg  1080
cgtgataaaa atacacgtat gcagcttggg gacatgactg ctttcatcaa cagtagtttg  1140
aatccacgtg gtgccaacga taaaaacggt gaacgtatgg caaactatat tttcacccgt  1200
gctcacgata cggaagccca aacgattatt caacgtatta tccgtgatcg tattaaccca  1260
aatttgtttg gttacaattt cactcgtgat gaaatcaaga aagccttcga gatttacaat  1320
gaggatattg ataaggctca caagacttat gcgtcataca acttgccatc tgtctatgct  1380
cttatgttga ccaacaagga ctctgtaaca cgtgtttatt acggagacct ctatcgtgaa  1440
gatggtcact acatggctaa aaagacaccg tactttgatg ccatcgacac cctcttgcgt  1500
gctcgtatca agtatgtagc tggtggtcaa gatatggaag tgaagaaagt cggaaatgac  1560
ggactcttga catctgttcg ttatggtaaa ggtgccaata acagaacaga tttggggact  1620
tctgaaactc gtacgcaagg tatgggtgtc atcatgacca acaactatga tttccgattg  1680
ggtagcaatg aaaccgtaac gatgaacatg ggtagagctc accgcaatca gctttatcgc  1740
ccattgcttt tgacgacaaa ggatggtata gcaacctacc tcaacgattc tgatgtacct  1800
aaaaaccttc tgaaacgtac tgactggaat gggaacttga ccttcaatgc caacgatgtt  1860
tttggtgtag aaaatgtcca agtctcaggt tacctcggtg tctgggtacc atacggagct  1920
aaggctaatc aagatgcacg tacacagcca agtaatcgtg ccaatagcga cggtcaagtt  1980
tacaagtctt cagcagccct tgattcgcaa gtcatgtatg aagccttctc aaacttccaa  2040
gcctttgcgg atgatcaacc tgaactctat atgaaccgtg tcttggctaa gaacactgac  2100
ttgctcaaag catggggaat cacgtcagtc ggacttccac cacagtatgt ttcaagtaaa  2160
gatggcactt tccttgactc aacgattgac aatggttatg ccttcgatga ccgttacgat  2220
atggccttga gtcaaaataa caagtacggc tcacttgagg acctccttaa cgtccttcgt  2280
gccctccaca aagacggtat tcaagccatt gctgactggg tgccagacca aatctataac  2340
ctcccaggaa aagaagtggt taatgcgaca cgtgttaatg gttatggtaa ccaccaagta  2400
ggctaccaaa tcattgacca agcctatgtg gctaatactc gtacagatgg tacagactat  2460
caaggtaaat acggtggagc cttccttgat gagcttaaag ctaagtaccc atctattttc  2520
aaccgtgtgc aaatctcaaa tggtaagcag ttgcctacga atgaaaagat taccaaatgg  2580
tctgctaagt acttcaatgg aactaacatc cttggacgag gtatcaacta tgtccttcgt  2640
gatgacaaga ccaaccagta ctttaatact tcagccaaca gccaactctt gccaacacca  2700
cttcgtgata ctggtgccat cacaagcact caaatcttcc aacgtcgtgg acaagatgtt  2760
tacttcctac gtgataacaa aactgttaag aatgaatttg ttcaagatgg taacggcaac  2820
tggtattact ttggtggtga tggtaagatg accaagggtg cccaaaacat caataacaag  2880
gattactatt tctttgacaa tggtatccaa ttgcgtaacg cccttcgtcg tgcttcaaac  2940
ggctatacct actattacgg tctggacggt gccatggtta agaatgcctt cgttgatttt  3000
gatgacaagc ataagcaggt ccgtgccttt acgactcaag gaacaatggt agtgggtaac  3060
cttcattgga gtggacacca tttctacttt gaccgtgaaa cgggtatcca ggctaagggt  3120
cgtattgtcc gtacagatga tggcaaattg cattactatg ttgctgaaac tggtgacatg  3180
ggacgtaacg tctttgcgac agacagcagc acaggtaaac gttattactt tgacgctgat  3240
ggtaacactg tgactggctc acgtgtcatt gacggtaaga cttattactt taaccaagat  3300
ggtagtgtcg gtacggccta cagcaatcgt gcagattcta ttatctttga aaatggtaag  3360
gctcgctaca tcacaccagc aggcgaaatc ggacgtagca tctttgtcta caacccagca  3420
actaaggcat ggaactactt tgataaagag gggaaccgtg tcacaggacg ccaatacatt  3480
gatggtcacc tctattactt caaggaagat ggtagccaag ctaagggtga aattatcgag  3540
gaaaacggca ttaagtatta ctatgagcca gaatcaggta ttcttgcttc aggacgctac  3600
ctccaagttg gtgatgacca gtggatgtac ttcaaacaag acggttcact ggctatcggc  3660
caagttcgtg ctgatcatgg ataccttaag tactttgatg aaaatggtat ccaagtcaag  3720
ggaaaaactg ttgtcgaaga tggtaagact tattactatg atgctcacag tggagctctt  3780
gtaacaagta gctttactga gattgcacca aaccaatggt cttatttcaa tactgaaggt  3840
caagccctta aaggcaattg gactatcaat ggcaaggaat actactttga ccaaaatggg  3900
attcagtaca agggcaaggc cgttaaggtc ggcagtcgtt acaagtacta tgacgaaaac  3960
gatggacaac ctgtaaccaa ccgcttcgct caaatcgagc ctaacgtctg ggcttacttt  4020
ggagcagatg gttatgctgt gacaggggaa caagtcatca atggacaaca cctttacttt  4080
gaccaatcag gtcgccaagt taaaggtgcc tacgtcacag tcaatggaca acgtcgttac  4140
tacgatgcca acactggtga atatgtccca ggaagataa                        4179
```

```
SEQ ID NO: 112          moltype = AA  length = 1392
FEATURE                 Location/Qualifiers
source                  1..1392
                        mol_type = protein
                        organism = Streptococcus sp.
SEQUENCE: 112
INGKQYYVNS DGSVRKNFVF EQDGKSYYFD AETGALATKS QDEFSTEPIK ATVDFSSGNQ  60
LYKNDDKSLD QLDTFITADA WYRPKSILKD GKTWTASTEA DKRPLLMVWW PDKSTQVNYL  120
NYMQNQGLGA GSFSTNSSQE SLDQAAKAVQ TKIEERIARE GNTNWLRTSI DQFIKTQPGW  180
NSSTENSSYD HLQGGQLLFN NSKGDTGNRT SHANSDHRLL NRTPTNQTGT RKYFKDNSIG  240
GLEFLLANDI DNSNPAVQAE QLNWLHFMMN IGSIMANDPT ANFDGLRVDA LDNVDADLLQ  300
IASDYFKAAY GVDKSEANAI KHLSYLEAWS ANDPYYNKDT KGAQLPIDNA LRNALTNLLM  360
RDKNTRMQLG DMTAFINSSL NPRGANDKNG ERMANYIFTR AHDTEAQTII QRIIRDRINP  420
NLFGYNFTRD EIKKAFEIYN EDIDKAHKTY ASYNLPSVYA LMLTNKDSVT RVYYGDLYRE  480
DGHYMAKKTP YFDAIDTLLR ARIKYVAGGQ DMEVKKVGND GLLTSVRYGK GANNRTDLGT  540
```

```
SETRTQGMGV IMTNNYDFRL GSNETVTMNM GRAHRNQLYR PLLLTTKDGI ATYLNDSDVP  600
KNLLKRTDWN GNLTFNANDV FGVENVQVSG YLGVWVPYGA KANQDARTQP SNRANSDGQV  660
YKSSAALDSQ VMYEAFSNFQ AFADDQPELY MNRVLAKNTD LLKAWGITSV GLPPQYVSSK  720
DGTFLDSTID NGYAFDDRYD MALSQNNKYG SLEDLLNVLR ALHKDGIQAI ADWVPDQIYN  780
LPGKEVVNAT RVNGYGNHQV GYQIIDQAYV ANTRTDGTDY QGKYGGAFLD ELKAKYPSIF  840
NRVQISNGKQ LPTNEKITKW SAKYFNGTNI LGRGINYVLR DDKTNQYFNT SANSQLLPTP  900
LRDTGAITST QIFQRRGQDV YFLRDNKTVK NEFVQDGNGN WYYFGGDGKM TKGAQNINNK  960
DYYFFDNGIQ LRNALRRASN GYTYYYGLDG AMVKNAFVDF DDKHKQVRAF TTQGTMVVGN  1020
LHWSGHHFYF DRETGIQAKG RIVRTDDGKL HYYVAETGDM GRNVFATDSS TGKRYYFDAD  1080
GNTVTGSRVI DGKTYYFNQD GSVGTAYSNR ADSIIFENGK ARYITPAGEI GRSIFVYNPA  1140
TKAWNYFDKE GNRVTGRQYI DGHLYYFKED GSQAKGEIIE ENGIKYYYEP ESGILASGRY  1200
LQVGDDQWMY FKQDGSLAIG QVRADHGYLK YFDENGIQVK GKTVVEDGKT YYYDAHSGAL  1260
VTSSFTEIAP NQWSYFNTEG QALKGNWTIN GKEYYFDQNG IQYKGKAVKV GSRYKYYDEN  1320
DGQPVTNRFA QIEPNVWAYF GADGYAVTGE QVINGQHLYF DQSGRQVKGA YVTVNGQRRY  1380
YDANTGEYVP GR                                                    1392

SEQ ID NO: 113          moltype = DNA  length = 3396
FEATURE                 Location/Qualifiers
source                  1..3396
                        mol_type = unassigned DNA
                        organism = Streptococcus salivarius
SEQUENCE: 113
cgtccattgc tgactgtttg gtggccgagc aaggctatcc aagccagcta cctcaactac  60
atgagagaag aaggtttggg aacaaaccaa acctttacct catatagttc acagacacag  120
atggaccaag cagcccttga agtgcaaaaa cgtattgaag aacgtattgc gcgtgaaggg  180
aacacggact ggttgcgcac aactatcaaa aattttgtca aaacacaacc aggttggaac  240
tcaacttctg aaaaccttga taacagcgac cacttgcaag gtggtgccct tctttacaac  300
aacagtaatc gcacaagtta tgctaattca gactatcgcc tcttgaatcg cacaccgacg  360
caacaagatg gcacacgtcg ctactttaaa gataattcat caggtggttt tgaatttctt  420
ctagcaaacg atattgataa ctcaaaccca gccgttcaag ctgaacaatt gaactggctt  480
cactatatca tgaacattgg taccettaca ggtggtaatt ctgatgaaaa cttcgatggt  540
gttcgtgttg atgctgtgga taatgttaac gctgaccttc tccaaattgc ttcagattat  600
ttcaaagcta aatacggcgt tgaaaagagt gaagaggaag ctattaagca cctttcaatc  660
cttgaagcat ggtctcataa tgatgcatac tacaatgaag atactaaggg tgctcaatta  720
ccgatggatg atccattgcg tttagccatg gtattttctt tcctacgccc aattggaaac  780
cgttcaggtc ttgaaccact tattaccaat agtctgaatg accgttcaga aagtaagaaa  840
aatacaaaac gtatggcaaa ctatactttt gttcgtgccc acgactcaga agttcaatca  900
gttattggac aaatcatcaa aaatgaaatc aacccacaat caactgggaa taccttcact  960
cttgatgaaa tgaagaaggc cttcgaaatc tacaatgcag atatgcgaag cgccaataag  1020
agatatacac agtacaatat cccatctgct tatgccttca tgttaacgaa taaggacact  1080
gttcctcgtg tttattatgg tgatttgtat actgatgacg gtcaatacat ggcccaaaaa  1140
tcaccatatc atgatgctat ttctacgctc ttgcaagctc gtattcgtta tgcggctggt  1200
ggtcaagaca tgaagatgag ctacgtaggt tcaggaaata ccaatggttg ggatgcttca  1260
ggtatcttaa catcagtccg ttatggtaaa ggagctaaca acgcttcaga tgctggtact  1320
gctgaaactc gtaaccaagg gatggctgtc attctttcca accaacctgc ccttcgtttg  1380
aatagcaatt tgacaatcaa catgggtgca gctcacagaa accaagccta tcgtccattg  1440
cttttgacaa cctctaatgg tgttgcctct tacttgaatg atggcgatgc taacggtatt  1500
gttaagtata ctgatggcaa cggtaatttg accttcaatc caggtgaaat cagtggtgtt  1560
cgtaatgctc aagttgatgg ctatttagcc gtttgggtac cattaggtgc ttctgaaaat  1620
caagacgtgc gtgtggcagc aagcaaatct aagaatagca gtggtttggt ctatgattct  1680
tcagctgcct tggattcaca agttatctac gaaggcttct caaacttcca agacttcgtc  1740
caagacccat cacaatacac taacaagaag attgctgaaa atgctaacct cttcaagaaa  1800
tggggaatca catcattcga atttgctcca caatacgttt caagtgatga cggtaccttc  1860
cttgactcag ttattcaaaa tggttatgcc ttctcagacc gttatgacat tggtatgagt  1920
aaggacaaca agtatggttc attagcagac ttgaaagcag cgcttaagtc actccacgct  1980
gtaggtatct cagccattgc tgactgggtt ccagaccaaa tctacaacct tccgggtgat  2040
gaagtggtca ctgcaactcg tgttaataac tacggagaaa ctaaagacgg tgctatcatc  2100
gaccatagcc tttatgttgc taaaacacgt acctttggta acgactacca aggtaaatat  2160
ggtggtgcct accttgacga attaaaacgt ctttacccac aaatctttga ccgtgttcaa  2220
atctctactg gtaaacgctt gacaaccgat gagaagatta caaaatggtc tgctaaatat  2280
atgaatggta ccaatattct tgaccgtgga tcagagtatg tcctcaagaa tggtcttagc  2340
ggttactatg gaaccaatgg tggtaaagtt agccttccaa aagtagtagg aagcaaccaa  2400
tcaacgaaca ataacaacca aaatggtgat ggtagcggta ggttcgaaaa gagctggggc  2460
agcgtttact atcgttacaa cgatggtcaa cgtgctagaa atgcctttat caaagataat  2520
gatggcaatg tttactactt tgataacaca ggccgtatgg caatcggtga aaagactatc  2580
gatggcaaac aatacttctt cctcgctaat ggggtgcaat tgcgtgatgg ctatcgtcaa  2640
aaccgtagag gtcaagtctt ctactatgat gaaaatggta tcatgagtca aaccggtaaa  2700
ccaagtccaa aaccagaacc aaaaccagat aataatatct ctagccgtaa ccaatttgtc  2760
caaatcggta acaacgtttg ggcatactat gatggtaatg gtaaacgtgt gactggtcat  2820
caaaacatca acggtcaaga actcttcttt gataacaatg gtgttcaagt caaaggtcgt  2880
acagcccagg ttgatggtgt tactcgttac tttgatgcca attcaggtga aatggcacgc  2940
aaccgattcg ctgaagttga accaggtgtt tgggcatact ttaacaatga tggagctgcc  3000
gtaacaggtt cacaaaacat caatggtcaa accctctact ttgatcataa tggtcatcaa  3060
gtcaaaggag ctttggtaac tgttaatggc aaccttcgct actatgatgc caactcagga  3120
gatctttatc gtaatcgttt ccaagaagtt aatggtagct ggtattactt tgatggtaat  3180
ggtaatgcgg tcaaaggcat ggtcaacatc aatggtcaaa acctcctctt tgataatgat  3240
ggaaaacaag tcaaaggtca tttggtccgt gtaaatggtg tcattcgtta ttatgatcca  3300
aattcaggtg aaatggcagt taatcgttgg gttgaaatca gctcaggatg gtgggtttac  3360
tttgatggtg aaggtcgagg ccaaatccaa atctaa                            3396
```

```
SEQ ID NO: 114         moltype = AA  length = 1131
FEATURE                Location/Qualifiers
source                 1..1131
                       mol_type = protein
                       organism = Streptococcus salivarius
SEQUENCE: 114
RPLLTVWWPS KAIQASYLNY MREEGLGTNQ TFTSYSSQTQ MDQAALEVQK RIEERIAREG  60
NTDWLRTTIK NFVKTQPGWN STSENLDNSD HLQGGALLYN NSNRTSYANS DYRLLNRTPT  120
QQDGTRRYFK DNSSGGFEFL LANDIDNSNP AVQAEQLNWL HYIMNIGTLT GGNSDENFDG  180
VRVDAVDNVN ADLLQIASDY FKAKYGVEKS EEEAIKHLSI LEAWSHNDAY YNEDTKGAQL  240
PMDDPLRLAM VFSFLRPIGN RSGLEPLITN SLNDRSESKK NTKRMANYTF VRAHDSEVQS  300
VIGQIIKNEI NPQSTGNTFT LDEMKKAFEI YNADMRSANK RYTQYNIPSA YAFMLTNKDT  360
VPRVYYGDLY TDDGQYMAQK SPYHDAISTL LQARIRYAAG GQDMKMSYVG SGNTNGWDAS  420
GILTSVRYGK GANNASDAGT AETRNQGMAV ILSNQPALRL NSNLTINMGA AHRNQAYRPL  480
LLTTSNGVAS YLNDGDANGI VKYTDGNGNL TFNPGEISGV RNAQVDGYLA VWVPLGASEN  540
QDVRVAASKS KNSSGLVYDS SAALDSQVIY EGFSNFQDFV QDPSQYTNKK IAENANLFKK  600
WGITSFEFAP QYVSSDDGTF LDSVIQNGYA FSDRYDIGMS KDNKYGSLAD LKAALKSLHA  660
VGISAIADWV PDQIYNLPGD EVVTATRVNN YGETKDGAII DHSLYVAKTR TFGNDYQGKY  720
GGAYLDELKR LYPQIFDRVQ ISTGKRLTTD EKITKWSAKY MNGTNILDRG SEYVLKNGLS  780
GYYGTNGGKV SLPKVVGSNQ STNNNNQNGD GSGRFEKSWG SVYYRYNDGQ RARNAFIKDN  840
DGNVYYFDNT GRMAIGEKTI DGKQYFFLAN GVQLRDGYRQ NRRGQVFYYD ENGIMSQTGK  900
PSPKPEPKPD NNISSRNQFV QIGNNVWAYY DGNGKRVTGH QNINGQELFF DNNGVQVKGR  960
TAQVDGVTRY FDANSGEMAR NRFAEVEPGV WAYFNNDGAA VTGSQNINGQ TLYFDHNGHQ  1020
VKGALVTVNG NLRYYDANSG DLYRNRFQEV NGSWYYFDGN GNAVKGMVNI NGQNLLFDND  1080
GKQVKGHLVR VNGVIRYYDP NSGEMAVNRW VEISSGWWVY FDGEGRGQIQ I           1131

SEQ ID NO: 115         moltype = DNA  length = 3939
FEATURE                Location/Qualifiers
source                 1..3939
                       mol_type = unassigned DNA
                       organism = Streptococcus mutans
SEQUENCE: 115
attgatggta agtattatta ttatgacaat aacggcaaag ttcgtactaa ttttacatta  60
attgctgatg gcaaaatttt acattttgat gaaactggcg cttatactga tacatcaatt  120
gacactgtaa ataaagatat cgtcacaaca agaagtaatc tatacaaaaa atataatcaa  180
gtttatgatc gctctgcaca gagctttgag catgttgatc attatttgac agctgagagt  240
tggtatcgtc ctaagtacat cttgaaggat ggcaaaacat ggacacagtc aacagaaaaa  300
gatttccgtc ccttattgat gacatggtgg cctgaccaag aaacgcagcg tcaatatgtt  360
aactacatga atgcacagct tggcattaac aagacttatg atgatacaag taatcaattg  420
caattaaata ttgcagctgc aactattcaa gcaaaaattg aggccaaaat tacaacttta  480
aagaatactg attggctgcg tcagactatt tccgcatttg ttaagacaca gtcagcttgg  540
aacagtgaca gcgaaaaacc gtttgatgat catttacaaa atggagcagt gctttacgat  600
aatgaaggaa aattaacgcc ttatgctaat tccaactacc gtatcttaaa tcgcaccccg  660
accaatcaaa ccggaaagaa agatccaagg tatacagctg ataacactat cggcggttat  720
gaatttcttt tggcaaacga tgtggataat tctaatcctg tcgtgcaggc cgaacaattg  780
aactggctac attttctcat gaactttggt aacatttatg ccaatgatcc ggatgctaac  840
tttgattcca ttcgtgttga tgcggtagat aatgtggatg ctgacttgct ccaaattgct  900
ggggattacc tcaaagctgc taaggggatt cataaaaatg ataaagctgc taatgatcat  960
ttgtctattt tagaggcatg gagtgacaac gacactcctt accttcatga tgatggcgac  1020
aatatgatta atatggataa taagctgcgt ttgtctctat tattttcatt agctaaaccc  1080
ttaaatcaac gttcaggcat gaatcctctc atcactaaca gtttggtgaa tcgaactgat  1140
gataatgctg aaactgccgc agtcccttct tattccttca tccgtgccca tgacagtgaa  1200
gtgcaggatt tgattcgtga tatcatcaag gcagaaatca atcctaatgt tgtcgggtat  1260
tcattcacta tggaggaaat caagaaggct ttcgagattt acaacaaaga cttattagct  1320
acagagaaga aatacacaca ctataatacg gcactttctt atgccctgct tttaaccaac  1380
aaatccagtg tgccgcgtgt ctattatggg gatatgttta cagatgacgg gcaatacatg  1440
gctcataaga cgatcaatta cgaagccatc gaaaccctgc ttaaagctcg tattaagtat  1500
gtttcaggcg gtcaagccat gcgcaatcaa caggttggca attctgaaat cattacgtct  1560
gtccgctatg gtaaaggtgc tttgaaagca acggatacag gggaccgcac cacacggact  1620
tcaggagtgg ccgtgattga aggcaataac ccttctttac gtttgaaggc ttctgatcgc  1680
gtggttgtca atatgggagc agcccataag aaccaagcat accgaccttt actcttgacc  1740
acagataacg gtatcaaggc ttatcattcc gatcaagaag cggctggttt ggtgcgctac  1800
accaatgaca gaggggaatt gatcttcaca gcggctgata ttaaaggcta tgccaaccct  1860
caagtttctg gctatttagg tgtctgggtt ccagtaggcg ctgccgctga tcaagatgtt  1920
cgcgttgcgg cttcaacggc cccatcaaca gatggcaagt ctgtgcatca aaatgcggcc  1980
cttgattcac gcgtcatgtt tgaaggtttc tctaatttcc aagcattcgc cactaaaaaa  2040
gaggaatata ccaatgttgt ggttgctaag aatgtggata agtttgcgga atggggggtc  2100
acagactttg aaatggcacc gcagtatgtg tcttcaacgg atggttcttt cttggattct  2160
gtgatccaaa acggctatgc ttttacggac cgttatgatt tgggaatttc caaacctaat  2220
aaatacggga cagccgatga tttggtgaaa gccatcaaag cgttacacag caagggcatt  2280
aaggtaatgg ctgactgggt gcctgatcaa atgtatgctt tccctgaaaa agaagtggta  2340
actgcaaccc gtgttgataa gtatgggact cctgttgcag gaagtcagat caaaaacacc  2400
ctttatgtag ttgatggtaa gagttctggt aaagatcaac aagccaagta tgggggagct  2460
ttcttagagg agctgcaagc gaagtatccg gagcttttttg cgagaaaaca aatttccaca  2520
ggggttccga tggacccttc tgttaagatt aagcaatggt ctgccaagta ctttaatggg  2580
acaaatattt tagggcgcgg agcaggctat gtcttaaaag atcaggcaac taatacttac  2640
tttaatattt cagataataa agaaataaac ttccttccta aaacattgtt aaaccaagat  2700
agtcaagttg gtttctctta tgacggtaaa ggttatgttt attattcaac gagtggttac  2760
```

```
caagccaaaa atactttcat cagcgaaggt gataaatggt attattttga taataacggt  2820
tatatggtca ctggtgctca atcaattaac ggtgttaatt attatttctt atcaaatggc  2880
ctacagctca gagatgctat tcttaagaat gaagatggaa cttacgctta ttatggaaat  2940
gacggtcgcc gttatgaaaa tggttattat caattcatga gtggtgtatg gcgtcacttc  3000
aataatggtg aaatgagtgt tggattaact gtaattgatg gtcaggttca atactttgat  3060
gaaatgggct atcaagccaa aggaaaattt gtaacaactg ccgatggtaa aataagatat  3120
tttgataagc aatctgggaa catgtaccgt aatcgtttta ttgaaaacga agaaggtaaa  3180
tggctgtatc tcggtgaaga tggtgcagca gtgacaggat ctcaaaccat taacggtcaa  3240
cacctgtact ttagagcaaa cggtgttcag gtcaagggtg aatttgtcac tgaccaccac  3300
ggccgtatca gctattacga cggcaattca ggggatcaaa tccgcaaccg ctttgtccgc  3360
aatgctcagg gtcaatggtt ctactttgat aacaatggct atgccgtaac cggtgccaga  3420
accattaacg gtcaacacct atactttaga gcaaacggtg ttcaggtcaa gggtgaattt  3480
gtcactgacc gctacggccg tatcagctat tacgacggca attcagggga tcaaatccgc  3540
aaccgctttg tccgcaatgc tcagggtcaa tggttctact ttgataacaa tggctatgcc  3600
gtaaccggtg ccagaaccat taacggtcaa cacctatact ttagagcaaa cggtgttcag  3660
gtcaagggtg aatttgtcac tgaccgccac ggccgtatca gctattacga cggcaattca  3720
ggggatcaaa tccgcaaccg ctttgtccgc aatgctcagg gtcaatggtt ctactttgat  3780
aacaatggct atgccgtaac cggtgccaga accattaacg gtcaacacct atactttaga  3840
gcaaacggtg ttcaggtcaa gggtgaattt gtcactgacc gctacggccg tatcagttat  3900
tacgatgcta actctggaga acgagttcgg attaactaa                         3939

SEQ ID NO: 116          moltype = AA  length = 1312
FEATURE                 Location/Qualifiers
source                  1..1312
                        mol_type = protein
                        organism = Streptococcus mutans
SEQUENCE: 116
IDGKYYYYDN NGKVRTNFTL IADGKILHFD ETGAYTDTSI DTVNKDIVTT RSNLYKKYNQ  60
VYDRSAQSFE HVDHYLTAES WYRPKYILKD GKTWTQSTEK DFRPLLMTWW PDQETQRQYV  120
NYMNAQLGIN KTYDDTSNQL QLNIAAATIQ AKIEAKITTL KNTDWLRQTI SAFVKTQSAW  180
NSDSEKPFDD HLQNGAVLYD NEGKLTPYAN SNYRILNRTP TNQTGKKDPR YTADNTIGGY  240
EFLLANDVDN SNPVVQAEQL NWLHFLMNFG NIYANDPDAN FDSIRVDAVD NVDADLLQIA  300
GDYLKAAKGI HKNDKAANDH LSILEAWSDN DTPYLHDDGD NMINMDNKLR LSLLFSLAKP  360
LNQRSGMNPL ITNSLVNRTD DNAETAAVPS YSFIRAHDSE VQDLIRDIIK AEINPNVVGY  420
SFTMEEIKKA FEIYNKDLLA TEKKYTHYNT ALSYALLLTN KSSVPRVYYG DMFTDDGQYM  480
AHKTINYEAI ETLLKARIKY VSGGQAMRNQ QVGNSEIITS VRYGKGALKA TDTGDRTTRT  540
SGVAVIEGNN PSLRLKASDR VVVNMGAAHK NQAYRPLLLT TDNGIKAYHS DQEAAGLVRY  600
TNDRGELIFT AADIKGYANP QVSGYLGVWV PVGAAADQDV RVAASTAPST DGKSVHQNAA  660
LDSRVMFEGF SNFQAFATKK EEYTNVVVAK NVDKFAEWGV TDFEMAPQYV SSTDGSFLDS  720
VIQNGYAFTD RYDLGISKPN KYGTADDLVK AIKALHSKGI KVMADWVPDQ MYAFPEKEVV  780
TATRVDKYGT PVAGSQIKNT LYVVDGKSSG KDQQAKYGGA FLEELQAKYP ELFARKQIST  840
GVPMDPSVKI KQWSAKYFNG TNILGRGAGY VLKDQATNTY FNISDNKEIN FLPKTLLNQD  900
SQVGFSYDGK GYVYYSTSGY QAKNTFISEG DKWYYFDNNG YMVTGAQSIN GVNYYFLSNG  960
LQLRDAILKN EDGTYAYYGN DGRRYENGYY QFMSGVWRHF NNGEMSVGLT VIDGQVQYFD  1020
EMGYQAKGKF VTTADGKIRY FDKQSGNMYR NRFIENEEGK WLYLGEDGAA VTGSQTINGQ  1080
HLYFRANGVQ VKGEFVTDHH GRISYYDGNS GDQIRNRFVR NAQGQWFYFD NNGYAVTGAR  1140
TINGQHLYFR ANGVQVKGEF VTDRYGRISY YDGNSGDQIR NRFVRNAQGQ WFYFDNNGYA  1200
VTGARTINGQ HLYFRANGVQ VKGEFVTDRH GRISYYDGNS GDQIRNRFVR NAQGQWFYFD  1260
NNGYAVTGAR TINGQHLYFR ANGVQVKGEF VTDRYGRISY YDANSGERVR IN          1312

SEQ ID NO: 117          moltype = DNA  length = 3021
FEATURE                 Location/Qualifiers
misc_feature            1..3021
                        note = T5 C-terminal truncation of GTF0974
source                  1..3021
                        mol_type = other DNA
                        organism = synthetic construct
SEQUENCE: 117
attaacggca aacaatacta tgtcaatagt gacggtagtg tacgtaaaaa cttcgttttt  60
gagcaagatg gtaagtctta ttactttgat gctgaaacag ggcacttgc gactaagtct  120
caggatgaat tttcaacaga acctatcaag gcaaccgtag atttttcatc tggaaaccag  180
ctctacaaaa acgatgacaa gtctttggac caactcgaca ccttcatcac agcggatgct  240
tggtaccgtc caaagagcat tctcaaggat ggtaagactt ggacagcttc aactgaagcg  300
gacaaacgtc ctctattgat ggtttggtgg cctgacaagt ctactcaggt caactacctt  360
aactacatgc aaaatcaagg tcttggagca gggtcatttt caaccaactc tagtcaggaa  420
agtctggacc aagctgctaa agcggttcag actaagattg aagaacgtat cgcgcgtgag  480
ggcaatacca actggttacg tacaagtatc gaccagttca tcaagactca gccaggttgg  540
aatagtagca ctgaaaatag ttcatacgac cacttgcaag gcggacagtt gctctttaac  600
aacagtaagg gtgatactgg caaccgtacc agccacgcca actctgacta tcgtttgctt  660
aaccgcacac cgacaaacca aacgggtaca cgtaagtact tcaaggacaa ttctatcggt  720
ggtcttgagt tcttgcttgc caacgatatt gataactcaa acccagctgt tcaggcagaa  780
caacttaact ggctccactt tatgatgaat atcggaagta tcatggcaaa tgacccaact  840
gccaactttg acggtttgcg tgtcgacgcc ttggacaatg tggatgccga ccttctccaa  900
atcgcttcag attactttaa agcagcctat ggggttgaca agtctgaagc caatgctatt  960
aagcacttgt catatttgga agcatggtct gccaacgacc catactacaa caaggacact  1020
aagggagcac aacttccgat tgataatgcc cttcgtaacg cccttaccaa cctcttgatg  1080
cgtgataaaa atacacgtat gcagcttggg gacatgactg ccttcatcaa tagtagtttg  1140
aatccacgtg gtgccaacga taaaaacggt gaacgtatgg ctaactatat tttcactcgt  1200
gcccatgata cagaagctca aacgattatt caacgtatca tccgtgatcg tattaaccca  1260
```

-continued

```
aatttatttg gttacaattt cactcgtgat gaaatcaaga aagccttcga gatttacaat  1320
gaggatattg ataaggctca caagacttat gcgtcataca acttaccatc tgtctatgcc  1380
ctcatgttga ccaacaagga ctctgtaaca cgtgtttatt acggagacct ctatcgtgaa  1440
gatggtcact acatggctaa aaagacaccg tactttgatg ccatcgacac cctcttgcgt  1500
gctcgcatca agtatgtagc tggtggtcaa gacatggaag tgaagaaagt cggaaatgat  1560
ggactcttga catctgttcg ttatggtaaa ggtgccaata acagaactga tttgggaact  1620
tctgaaaccc gtacgcaagg gatgggtgtc atcatgacca acaactatga tttccgcttg  1680
ggtagcaatg aaaccgtaac gatgaacatg ggtagagctc accgtaatca gctttatcgc  1740
ccattgcttt tgacgacaaa ggatggtata gcaacctacc tcaacgattc tgatgtgcct  1800
aaaaaacttc tgaaacgtac tgactggaat gggaacttga ccttcaatgc caacgatgtt  1860
ttcggtgtag aaaatgtcca agtctcaggt tacctcggtg tctgggtacc atacggagct  1920
aaggctaatc aagatgcacg tacacagcca agtaatcgtg ccaatagcga cggtcaagtt  1980
tacaagtctt cagcagccct tgattcgcaa gtcatgtatg aagccttctc aaacttccaa  2040
gcctttgcgg acgatcaacc tgaactttac atgaaccgtg tcttggctaa gaacactgac  2100
ttgctcaaag catgggggat cacgtcagtc ggacttccac cacagtacgt ttcaagtaag  2160
gatggcacct tccttgactc aacaattgat aatggttatg cctttgatga ccgttacgat  2220
atggccttga gtcaaaataa taaatacgga tcacttgagg acctccttaa cgttcttcgt  2280
gctctccaca aagacggtat tcaagccatt gctgactggg tgccagacca aatctataac  2340
ctcccaggaa aagaagtggt aaatgcgaca cgtgttaatg gttatggtaa ccaccaagta  2400
ggctaccaaa tcattgacca agcctatgtg gctaatactc gtacagatgg tacagactat  2460
caaggtaaat acggtggagc cttccttgat gagcttaaag ctaagtaccc atctattttc  2520
aaccgtgtgc aaatctcaaa tggaaaacag ttgcctacga atgaaaagat tactaaatgg  2580
tctgctaagt acttcaacgg aactaatatc cttggacgag gtatcaacta tgtccttcgt  2640
gatgacaaga ctaaccagta ctttaatact tcagccaaca gccaactctt gccaacacca  2700
cttcgcgata caggtgccat cacaagcact caagtcttcc aacgtcgtgg acaagatgtt  2760
tatttcctac gtgataacca agctgttaag aatgaatttg ttcaagacgg aaacggtaac  2820
tggtattact tcggtggtga cggtaagatg accaagggtg cccaaaacat caataacaag  2880
gattactatt tctttgacaa tggtatccaa ttgcgtaacg cccttcgtcg tgcttcaaac  2940
ggctatacct actattacgg tctggacggt gccatggtta agaatgcctt cgttgatttt  3000
gatgacaaac ataagcagta a                                            3021
```

```
SEQ ID NO: 118          moltype = AA  length = 1006
FEATURE                 Location/Qualifiers
REGION                  1..1006
                        note = T5 C-terminal truncation of GTF0974
source                  1..1006
                        mol_type = protein
                        organism = synthetic construct
SEQUENCE: 118
INGKQYYVNS DGSVRKNFVF EQDGKSYYFD AETGALATKS QDEFSTEPIK ATVDFSSGNQ  60
LYKNDDKSLD QLDTFITADA WYRPKSILKD GKTWTASTEA DKRPLLMVWW PDKSTQVNYL  120
NYMQNQGLGA GSFSTNSSQE SLDQAAKAVQ TKIEERIARE GNTNWLRTSI DQFIKTQPGW  180
NSSTENSSYD HLQGGQLLFN NSKGDTGNRT SHANSDYRLL NRTPTNQTGT RKYFKDNSIG  240
GLEFLLANDI DNSNPAVQAE QLNWLHFMMN IGSIMANDPT ANFDGLRVDA LDNVDADLLQ  300
IASDYFKAAY GVDKSEANAI KHLSYLEAWS ANDPYYNKDT KGAQLPIDNA LRNALTNLLM  360
RDKNTRMQLG DMTAFINSSL NPRGANDKNG ERMANYIFTR AHDTEAQTII QRIIRDRINP  420
NLFGYNFTRD EIKKAFEIYN EDIDKAHKTY ASYNLPSVYA LMLTNKDSVT RVYYGDLYRE  480
DGHYMAKKTP YFDAIDTLLR ARIKYVAGGQ DMEVKKVGND GLLTSVRYGK GANNRTDLGT  540
SETRTQGMGV IMTNNYDFRL GSNETVTMNM GRAHRNQLYR PLLLTTKDGI ATYLNDSDVP  600
KKLLKRTDWN GNLTFNANDV FGVENVQVSG YLGVWVPYGA KANQDARTQP SNRANSDGQV  660
YKSSAALDSQ VMYEAFSNFQ AFADDQPELY MNRVLAKNTD LLKAWGITSV GLPPQYVSSK  720
DGTFLDSTID NGYAFDDRYD MALSQNNKYG SLEDLLNVLR ALHKDGIQAI ADWVPDQIYN  780
LPGKEVVNAT RVNGYGNHQV GYQIIDQAYV ANTRTDGTDY QGKYGGAFLD ELKAKYPSIF  840
NRVQISNGKQ LPTNEKITKW SAKYFNGTNI LGRGINYVLR DDKTNQYFNT SANSQLLPTP  900
LRDTGAITST QVFQRRGQDV YFLRDNQAVK NEFVQDGNGN WYYFGGDGKM TKGAQNINNK  960
DYYFFDNGIQ LRNALRRASN GYTYYYGLDG AMVKNAFVDF DDKHKQ                 1006
```

```
SEQ ID NO: 119          moltype = DNA  length = 3021
FEATURE                 Location/Qualifiers
misc_feature            1..3021
                        note = T5 C-terminal truncation of GTF4336
source                  1..3021
                        mol_type = other DNA
                        organism = synthetic construct
SEQUENCE: 119
attaacggca aacaatacta tgtcaatagt gacggtagtg tgcgtaagaa ctttgtcttt  60
gagcaagatg gtaagtctta ttactttgat gctgaaacag ggctcttgc gactaagtca   120
caggatgaat tttcaacaga accaatcaag gcaaccgtcg atttttcatc tggaaaccag  180
ctctacaaaa acgatgataa atcgttggac cagctcgata ccttcatcac agcggatgct  240
tggtaccgtc caaagagcat tctcaaggat ggtaagactt ggacggcttc aactgaggct  300
gacaaacgtc cactcttgat ggtttggtgg cctgacaagt caactcaggt taactacctt  360
aactacatgc aaaatcaagg tcttggtgca ggctcatttt caaccaactc tagccaggaa  420
agtctggacc aagctgctaa agcggttcag actaagattg aagaacgtat cgctcgtgaa  480
ggcaacacaa actggttgcg tacaagtatc gaccagttca tcaagactca gccaggttgg  540
aatagtagca ctgaaaatag ttcatacgac cacttgcaag gcggacagtt gctctttaac  600
aacagtaagg gtgatactgg caaccgtacc agccacgcca actctgacta tcgtttgctt  660
aaccgcacac cgactaacca gacgggtaca cgtaagtact tcaaggacaa ttctatcggt  720
ggtcttgagt tcttgcttgc caacgatatt gataactcaa acccagctgt tcaggcagag  780
caacttaact ggctccactt tatgatgaat attggaagca tcatggcaaa tgacccaaca  840
```

-continued

```
gctaactttg acggtttgcg tgtcgatgcc ttggacaatg tggatgctga ccttctccaa  900
atcgcatcag actacttcaa agcagcctat ggtgttgaca agtctgaagc caatgccatt  960
aagcacttgt catacttgga agcatggtct gccaacgacc catactacaa taaggacact  1020
aagggggcac aacttccgat tgacaatgcc ctccgtaatg cccttaccaa cctcttgatg  1080
cgtgataaga atacacgtat gcagcttggg gacatgactg ccttcatcaa cagtagtttg  1140
aatccacgtg gtgccaacga taaaaacggt gaacgtatgg caaactatat tttcacccgt  1200
gctcacgata cggaagctca aacgattatt caacgtatca tccgtgatcg tatcaaccca  1260
aatttgtttg gttacaattt cactcgtgat gaaatcaaga aagccttcga gatttacaat  1320
gaggatattg ataaggctca caagacttat gcgtcataca acttaccatc tgtttatgct  1380
ctcatgttga ccaacaagga ctctgtaaca cgagtttatt acggagacct ctaccgtgaa  1440
gatggtcact acatggctaa aaagacaccg tactttgatg ccattgacac cctcttgcgt  1500
gctcgtatca agtatgtagc tggtggtcaa gacatggaag tgaagaaagt cggaaatgac  1560
ggcctcttga catctgttcg ttatggtaaa ggtgccaata acagaacaga tttgggaact  1620
tcagaaactc gtacgcaagg tatgggtgtc atcatgacca acaactatga tttccgcttg  1680
ggtagcaatg aaactgtaac gatgaacatg ggtagagcac accgtaatca gctttatcgc  1740
ccattgcttt tgacgacaaa ggatggtata gcaacctact tcaacgattc tgatgtgcct  1800
aaaaaccttc tgaaacgtac tgactggaat gggaacttga ccttcaatgc caatgatgtt  1860
tttggtgtgg aaaatgtcca agtatcaggt taccttggtg tctgggtacc agtcggggct  1920
aaggctaacc aagacgcacg tacacagcca agtaaccgtg ccaatagcga tggtcaagtt  1980
tacaagtctt cagcagccct tgattcgcaa gtcatgtatg aagccttctc aaacttccaa  2040
gcatttgcgg acgatcagcc agaactctac atgaaccgtg tcttggctaa gaacactgac  2100
ttgctcaaag catggggtgt tacgtctgtt ggacttccac cacagtacgt ttcaagtaag  2160
gatggtacct tccttgattc aacaattgac aatggttatg cctttgatga ccgttatgac  2220
atggccttga gtcaaaataa caagtatggc tcacttgagg acctccttaa tgttcttcgt  2280
gccctccaca aagatggtat tcaagccatt gctgactggg tgccagacca aatttataac  2340
cttccaggaa aagaagtagt taatgccaca cgtgttaacg gctacggtta tcaccaacaa  2400
ggttatcaaa ttgtggacca agcctatgtg gcaaataccc gtacagatgg tacagactat  2460
caaggtaaat acggtggagc cttccttgat gagcttaaag ctaagtaccc atctattttc  2520
aaccgtgtgc aaatctcaaa tggtaagcag ttacctacga atgaaaagat tactaaatgg  2580
tctgctaagt acttcaacgg aactaatatc cttggacgag gtatcaacta tgtccttcgt  2640
gatgacaaga ccaaccagta ctttaatacc tcagctaaca gccaactctt gccaacacca  2700
cttcgtgaca caggtgccat tacaagcact caagtcttcc aacgtcgtgg acaagatgtt  2760
tacttccttc gtgataacca agccgttaag aatgaatttg ttcaagacgg taacggcaac  2820
tggtattact tcggtgctga cggtaagatg accaagggtg ctcaaaccat caataaaaag  2880
gattactatt tctttgacaa tggtatccaa ttgcgtaacg cccttcgtcg tgctaacaac  2940
ggttatactt actattacgg tttagacggt gctatggtta agaatgcctt tgttgatttt  3000
gacgacaagc gtaagcagta a                                            3021

SEQ ID NO: 120         moltype = AA  length = 1006
FEATURE                Location/Qualifiers
REGION                 1..1006
                       note = T5 C-terminal truncation of GTF4336
source                 1..1006
                       mol_type = protein
                       organism = synthetic construct
SEQUENCE: 120
INGKQYYVNS DGSVRKNFVF EQDGKSYYFD AETGALATKS QDEFSTEPIK ATVDFSSGNQ  60
LYKNDDKSLD QLDTFITADA WYRPKSILKD GKTWTASTEA DKRPLLMVWW PDKSTQVNYL  120
NYMQNQGLGA GSFSTNSSQE SLDQAAKAVQ TKIEERIARE GNTNWLRTSI DQFIKTQPGW  180
NSSTENSSYD HLQGGQLLFN NSKGDTGNRT SHANSDYRLL NRTPTNQTGT RKYFKDNSIG  240
GLEFLLANDI DNSNPAVQAE QLNWLHFMMN IGSIMANDPT ANFDGLRVDA LDNVDADLLQ  300
IASDYFKAAY GVDKSEANAI KHLSYLEAWS ANDPYYNKDT KGAQLPIDNA LRNALTNLLM  360
RDKNTRMQLG DMTAFINSSL NPRGANDKNG ERMANYIFTR AHDTEAQTII QRIIRDRINP  420
NLFGYNFTRD EIKKAFEIYN EDIDKAHKTY ASYNLPSVYA LMLTNKDSVT RVYYGDLYRE  480
DGHYMAKKTP YFDAIDTLLR ARIKYVAGGQ DMEVKKVGND GLLTSVRYGK GANNRTDLGT  540
SETRTQGMGV IMTNNYDFRL GSNETVTMNM GRAHRNQLYR PLLLTTKDGI ATYFNDSDVP  600
KNLLKRTDWN GNLTFNANDV FGVENVQVSG YLGVWVPVGA KANQDARTQP SNRANSDGQV  660
YKSSAALDSQ VMYEAFSNFQ AFADDQPELY MNRVLAKNTD LLKAWGVTSV GLPPQYVSSK  720
DGTFLDSTID NGYAFDDRYD MALSQNNKYG SLEDLLNVLR ALHKDGIQAI ADWVPDQIYN  780
LPGKEVVNAT RVNGYGYHQQ GYQIVDQAYV ANTRTDGTDY QGKYGGAFLD ELKAKYPSIF  840
NRVQISNGKQ LPTNEKITKW SAKYFNGTNI LGRGINYVLR DDKTNQYFNT SANSQLLPTP  900
LRDTGAITST QVFQRRGQDV YFLRDNQAVK NEFVQDGNGN WYYFGADGKM TKGAQTINKK  960
DYYFFDNGIQ LRNALRRANN GYTYYYGLDG AMVKNAFVDF DDKRKQ                 1006

SEQ ID NO: 121         moltype = DNA  length = 3021
FEATURE                Location/Qualifiers
misc_feature           1..3021
                       note = T5 C-terminal truncation of GTF4491
source                 1..3021
                       mol_type = other DNA
                       organism = synthetic construct
SEQUENCE: 121
atcaacggca aacaatacta tgtcaatagt gacggtagtg tgcgtaagaa ctttgttttt  60
gagcaagatg gtaagtctta ttactttgat gctgaaacag ggctcttgc gactaagtca   120
caggatgaat tttcaacaga acctatcaag gcaaccgtag atttttcatc tggtaaccag  180
ctctacaaaa acgatgacaa atctttggac caacttgaca ccttcatcac agcggatgct  240
tggtaccgtc caaagagcat tctcaaggat ggtaagactt ggacagcttc aactgaagct  300
gacaaacgtc ctctcttgat ggtttggtgg cctgacaagt ctactcaggt caactacctt  360
aactacatgc aaaatcaagg tcttggtgca gggtcatttt caaccaactc tagccaggaa  420
```

```
agtctggacc aagctgctaa agcggttcag actaagattg aagaacgtat cgcgcgtgag  480
ggcaatacca actggttgcg tacaagtatc gaccagttca tcaagacaca gccaggttgg  540
aatagtagca ctgaaaatag ttcatacgac cacttgcaag gcggacagtt gctctttaac  600
aacagtaagg gtgatactgg caaccgtacc agccacgcca actctgacta tcgtttgtta  660
aaccgcacac cgactaacca gacgggtaca cgtaagtact tcaaggataa ttctatcggt  720
ggtcttgagt tcttgcttgc caacgatatt gataactcaa acccagctgt tcaggcagag  780
caacttaact ggctccactt tatgatgaat atcggaagca tcatggctaa tgacccaact  840
gccaactttg acggtttgcg tgtcgatgcc ttggacaatg tggatgccga cctgctccaa  900
atcgcatcag actacttcaa agcagcctat ggtgttgaca agtctgaagc caatgccatc  960
aagcacttgt catacttgga agcatggtct gccaacgacc catactacaa caaggacact  1020
aagggagcac aacttccgat tgacaatgcc cttcgtaatg ccctcaccaa cctcttgatg  1080
cgtgataaaa atacacgtat gcagcttgga gacatgactg ctttcatcaa cagtagtttg  1140
aacccacgag gtgccaacga taaaaacggt gaacgtatgg caaactatat tttcacccgt  1200
gcccatgata cagaagctca aaccattatt caacgtatca ttcgtgatcg tattaaccca  1260
aatttgtttg gttataattt cacacgtgat gaaatcaaga aagccttcga gatttacaat  1320
gaggatattg ataaggctca caagacttat gcgtcataca acttgccatc tgtctatgcc  1380
ctcatgttga ccaataagga ctctgtaaca cgtgtttatt acggagacct ctaccgtgaa  1440
gatggtcact acatggctaa gaagacgcct tactttgatg ccatcgacac cctcttgcgt  1500
gcccgtatca agtatgtagc tggtggtcaa gacatggaag tgaagaaagt cggaaatgac  1560
ggcctcttga catcagttcg ttatggtaaa ggtgccaata acagaactga tttgggaact  1620
tctgaaactc gtacgcaagg tatgggtgtc atcatgacca acaactatga tttccgcttg  1680
ggtagcaatg aaactgtaac gatgaacatg ggtagagctc accgtaatca gctttatcga  1740
ccattgcttt tgacgacaaa ggatggtata gcaacctacc tcaacgattc tgatgtgcct  1800
aaaaaccttc tgaaacgtac tgactggaat gggaacttga ccttcaatgc caacgatgtt  1860
ttcggtgtag aaaatgtcca agtctcaggt tacctcggtg tctgggtacc atacggagct  1920
aaggctaatc aagatgcacg tacacagcca agtaatcgtg ccaatagcga cggtcaagtt  1980
tacaagtctt cagcagccct tgattcgcaa gtcatgtatg aagccttctc aaacttccaa  2040
gcctttgcgg acgatcaacc tgaactttac atgaaccgtg tcttggctaa gaacactgac  2100
ttgctcaaag catgggggat cacgtcagtc ggacttccac cacagtacgt ttcaagtaag  2160
gatggcacct tccttgactc aataattgat aatggttatg cctttgatga ccgttacgat  2220
atggccttga gtcaaaataa taaatacgga tcacttgagg acctccttaa cgttcttcgt  2280
gccctccata aagacggtat tcaagccatt gctgactggg taccagacca aatctataac  2340
ctcccaggaa aagaagtggt aaatgcgaca cgtgttaacg gctacggtta tcaccaacaa  2400
ggttatcaaa ttgtggacca agcctatgtg gcaaataccc gtacagatgg tacagactat  2460
caaggcaagt acggtggtgc cttccttgat gagctgaaag ctaagtaccc atctattttc  2520
aaccgtgtgc aaatctcaaa tggtaagcaa ttgcctacga atgaaaagat tacaaaatgg  2580
tctgctaagt acttcaacgg aaccaacatc cttggacgag gcatcaactt tgtccttcgt  2640
gatgacaaga ccaaccagta ctttaatact tcagctaaca gccaactctt gccaacacca  2700
cttcgtgata cgggtgccat cacaagcact caagtcttcc aacgtcgtgg acaagatgtt  2760
tacttccttc gcgataacca aaccgttaag aatgaatttg ttcaagacgg taacggtaac  2820
tggtattact tcggtggtga cggtaagatg accaagggtg cccaaaacat caatagcaag  2880
gattactatt tctttgataa tggtgttcaa ttgcgtaatg ccctgcgtcg tgcttcaaac  2940
ggctatactt actattacgg tctggacggt gctatggtta agaatgcctt cgttgatttt  3000
gatgacaagc ataagcagta a                                            3021
```

```
SEQ ID NO: 122          moltype = AA  length = 1006
FEATURE                 Location/Qualifiers
REGION                  1..1006
                        note = T5 C-terminal truncation of GTF4491
source                  1..1006
                        mol_type = protein
                        organism = synthetic construct
SEQUENCE: 122
INGKQYYVNS DGSVRKNFVF EQDGKSYYFD AETGALATKS QDEFSTEPIK ATVDFSSGNQ  60
LYKNDDKSLD QLDTFITADA WYRPKSILKD GKTWTASTEA DKRPLLMVWW PDKSTQVNYL  120
NYMQNQGLGA GSFSTNSSQE SLDQAAKAVQ TKIEERIARE GNTNWLRTSI DQFIKTQPGW  180
NSSTENSSYD HLQGGQLLFN NSKGDTGNRT SHANSDYRLL NRTPTNQTGT RKYFKDNSIG  240
GLEFLLANDI DNSNPAVQAE QLNWLHFMMN IGSIMANDPT ANFDGLRVDA LDNVDADLLQ  300
IASDYFKAAY GVDKSEANAI KHLSYLEAWS ANDPYYNKDT KGAQLPIDNA LRNALTNLLM  360
RDKNTRMQLG DMTAFINSSL NPRGANDKNG ERMANYIFTR AHDTEAQTII QRIIRDRINP  420
NLFGYNFTRD EIKKAFEIYN EDIDKAHKTY ASYNLPSVYA LMLTNKDSVT RVYYGDLYRE  480
DGHYMAKKTP YFDAIDTLLR ARIKYVAGGQ DMEVKKVGND GLLTSVRYGK GANNRTDLGT  540
SETRTQGMGV IMTNNYDFRL GSNETVTMNM GRAHRNQLYR PLLLTTKDGI ATYLNDSDVP  600
KNLLKRTDWN GNLTFNANDV FGVENVQVSG YLGVWVPYGA KANQDARTQP SNRANSDGQV  660
YKSSAALDSQ VMYEAFSNFQ AFADDQPELY MNRVLAKNTD LLKAWGITSV GLPPQYVSSK  720
DGTFLDSIID NGYAFDDRYD MALSQNNKYG SLEDLLNVLR ALHKDGIQAI ADWVPDQIYN  780
LPGKEVVNAT RVNGYGYHQQ GYQIVDQAYV ANTRTDGTDY QGKYGGAFLD ELKAKYPSIF  840
NRVQISNGKQ LPTNEKITKW SAKYFNGTNI LGRGINFVLR DDKTNQYFNT SANSQLLPTP  900
LRDTGAITST QVFQRRGQDV YFLRDNQTVK NEFVQDGNGN WYYFGGDGKM TKGAQNINSK  960
DYYFFDNGVQ LRNALRRASN GYTYYYGLDG AMVKNAFVDF DDKHKQ                 1006
```

```
SEQ ID NO: 123          moltype = DNA  length = 3021
FEATURE                 Location/Qualifiers
misc_feature            1..3021
                        note = T5 C-terminal truncation of GTF3808
source                  1..3021
                        mol_type = other DNA
                        organism = synthetic construct
SEQUENCE: 123
```

```
attaacggca aacaatacta tgtcaatagt gacggtagtg tgcgtaagaa ctttgtcttt  60
gagcaagatg gtaagtctta ttactttgat gctgaaacag gggctcttgc gaccaagtca  120
caggatgaat tttcaacaga acctatcaag gcaaccgtag atttttcatc tggaaaccag  180
ctctacaaaa acgatgacaa gtctttggac caactcgaca ccttcatcac agcggatgct  240
tggtaccgtc caaagagcat tctcaaggat ggtaagactt ggacagcttc aactgaagcg  300
gacaaacgtc cactcttgat ggtttggtgg cctgacaagt caactcaggt taactacctc  360
aactatatgc aaaatcaagg tcttggtgca ggctcattct caaccaactc tagccaggaa  420
tcactagacc aagctgccaa gatggttcag actaagattg aagaacgtat cgctcgtgaa  480
ggaaacacaa actggttgcg tacaagtatc gaccagttca tcaagactca gccaggttgg  540
aatagtagca ctgaaaatag ttcatacgac cacttgcaag gtggacagtt gctctttaac  600
aacagtaagg gtgatactgg caaccgtacg agtcacgcca actctgacta tcgtttgctt  660
aaccgcacac cgactaacca gacgggtacg cgtaagtact tcaaggacaa ttctatcggt  720
ggtcttgagt tcttgcttgc caacgatatt gataactcaa acccagcagt tcaggcagag  780
caacttaact ggcttcactt tatgatgaat atcggaagca tcatggcgaa tgacccaaca  840
gcaaactttg acggtttgcg tgtcgatgcc ttggacaatg tggatgccga ccttctccaa  900
atcgcttcag attacttcaa agcagcctat ggtgtggaca agtctgaagc caatgccatt  960
aagcacttgt catacttgga agcatggtct gccaacgacc catactataa caaggacact  1020
aagggggcac aacttccgat tgataatgcc cttcgtaatg cccttaccaa cctcttgatg  1080
cgtgataaaa atacacgtat gcagcttggg gacatgactg ctttcatcaa cagtagtttg  1140
aatccacgtg gtgctaacga taaaaatggt gaacgtatgg ctaactatat tttcacccgt  1200
gcccacgata cggaagctca aacgattatc caacgtatca tccgtgatcg tatcaatcca  1260
aatttgtttg gctacaattt cactcgtgat gaaatcaaga aagccttcga gatttacaat  1320
gaggatattg ataaggctca caagacttat gcgtcataca acttgccatc tgtttatgct  1380
ctcatgttga ccaacaagga ctctgtaaca cgtgtttatt acggagacct ctatcgtgag  1440
gatggtcact acatggctaa aaagacgcct tactttgatg ccatcgacac cctcttgcgt  1500
gctcgtatca agtatgtagc tggtggtcaa gacatggaag tgaagaaagt cggaaatgat  1560
ggcctcttga catctgttcg ttatggtaaa ggtgccaata acagaactga tttgggaact  1620
tcagaaactc gtacgcaagg tatgggtgtc atcatgacca acaactatga tttccgcttg  1680
ggtagcaatg aaactgtaac gatgaacatg ggtagagcac accgtaatca gctttatcgc  1740
ccattgcttt tgacaacaaa agatggtata gcaacctacc tcaacgattc tgatgtgcct  1800
aaaaaccttc ttaaacgcac tgactggaat gggaacttga ccttcaatgc caacgatgtt  1860
ttcggtgtag aaaatgtcca agtctcaggt tacctcggtg tctgggtacc atacggagct  1920
aaggctaatc aagatgcacg tacacagcca agtaatcgtg ccaatagcga cggtcaagtt  1980
tacaagtctt cagcagccct tgattcgcaa gtcatgtatg aagccttctc aaacttccaa  2040
gcatttgcgg acgatcagcc agaactctac atgaaccgtg tcttggctaa gaacactgac  2100
ttgctcaaag catggggaat cacgtcggtc ggacttccac cacagtatgt ttcaagtaaa  2160
gatggcactt tccttgactc aacaattgat aatggttatg cctttgatga ccgttacgat  2220
atggccttga gtcaaaataa taaatacgga tcacttgagg acctccttaa cgttcttcgt  2280
gccctccata aagacggtat tcaagccatt gctgactggg tgccagacca aatctataac  2340
ctcccaggaa aagaagtggt aaatgcgaca cgtgttaatg gttatggtaa ccaccaagta  2400
ggctaccaaa tcattgacca agcctatgtg gctaatactc gtacagatgg tacagactat  2460
caaggtaaat acggtggtgc cttccttgat gagcttaaag ctaagtaccc atctattttc  2520
aaccgtgtgc aaatctcaaa tggaaaaacag ttgcctacga atgaaaagat tactaaatgg  2580
tctgctaagt acttcaacgg aactaatatc cttggacgag gtatcaacta tgtccttcgt  2640
gatgacaaga ctaaccagta ctttaatact tcagccaaca gccaactctt gccaacacca  2700
cttcgtgata ctggtgccat cacaagcact caagtcttcc aacgtcgtgg acaagatgtt  2760
tatttcctac gtgataacca agctgttaag aatgaatttg ttcaagatgg taacggcaac  2820
tggtattact ttggtggtga tggtaagatg accaagggtg cccaaaacat caataacaag  2880
gattactatt tctttgacaa tggtatccaa ttgcgtaacg cccttcgtcg tgcaagcaac  2940
ggctatacct actattacgg tctggacggc gcaatggtta agaatgcctt cgttgatttt  3000
gatgacaaac ataagcagta a                                           3021

SEQ ID NO: 124         moltype = AA  length = 1006
FEATURE                Location/Qualifiers
REGION                 1..1006
                       note = T5 C-terminal truncation of GTF3808
source                 1..1006
                       mol_type = protein
                       organism = synthetic construct
SEQUENCE: 124
INGKQYYVNS DGSVRKNFVF EQDGKSYYFD AETGALATKS QDEFSTEPIK ATVDFSSGNQ  60
LYKNDDKSLD QLDTFITADA WYRPKSILKD GKTWTASTEA DKRPLLMVWW PDKSTQVNYL  120
NYMQNQGLGA GSFSTNSSQE SLDQAAKMVQ TKIEERIARE GNTNWLRTSI DQFIKTQPGW  180
NSSTENSSYD HLQGGQLLFN NSKGDTGNRT SHANSDYRLL NRTPTNQTGT RKYFKDNSIG  240
GLEFLLANDI DNSNPAVQAE QLNWLHFMMN IGSIMANDPT ANFDGLRVDA LDNVDADLLQ  300
IASDYFKAAY GVDKSEANAI KHLSYLEAWS ANDPYYNKDT KGAQLPIDNA LRNALTNLLM  360
RDKNTRMQLG DMTAFINSSL NPRGANDKNG ERMANYIFTR AHDTEAQTII QRIIRDRINP  420
NLFGYNFTRD EIKKAFEIYN EDIDKAHKTY ASYNLPSVYA LMLTNKDSVT RVYYGDLYRE  480
DGHYMAKKTP YFDAIDTLLR ARIKYVAGGQ DMEVKKVGND GLLTSVRYGK GANNRTDLGT  540
SETRTQGMGV IMTNNYDFRL GSNETVTMNM GRAHRNQLYR PLLLTTKDGI ATYLNDSDVP  600
KNLLKRTDWN GNLTFNANDV FGVENVQVSG YLGVWVPYGA KANQDARTQP SNRANSDGQV  660
YKSSAALDSQ VMYEAFSNFQ AFADDQPELY MNRVLAKNTD LLKAWGITSV GLPPQYVSSK  720
DGTFLDSTID NGYAFDDRYD MALSQNNKYG SLEDLLNVLR ALHKDGIQAI ADWVPDQIYN  780
LPGKEVVNAT RVNGYGNHQV GYQIIDQAYV ANTRTDGTDY QGKYGGAFLD ELKAKYPSIF  840
NRVQISNGKQ LPTNEKITKW SAKYFNGTNI LGRGINYVLR DDKTNQYFNT SANSQLLPTP  900
LRDTGAITST QVFQRRGQDV YFLRDNQAVK NEFVQDGNGN WYYFGGDGKM TKGAQNINNK  960
DYYFFDNGIQ LRNALRRASN GYTYYYGLDG AMVKNAFVDF DDKHKQ                1006

SEQ ID NO: 125         moltype = DNA  length = 3018
```

```
FEATURE                Location/Qualifiers
misc_feature           1..3018
                       note = T5 C-terminal truncation of GTF0459
source                 1..3018
                       mol_type = other DNA
                       organism = synthetic construct
SEQUENCE: 125
atcaacggca aacaatacta tgtcaatagt gacggtagtg tgcgtaagaa cttcgttttt  60
gagcaagatg gtaagtcata ttactttgat gctgaaacag gggctcttgc gaccaagtca  120
caggatgaat tttcaacaga acctatcaag gcagctgtgg atttttcatc tggaaatcag  180
ctctacaaaa acgataacaa atctttggac caactcgaca ccttcatcac tgcggatgct  240
tggtaccgtc caaagagtat tctcaaggat ggtaagactt ggacagcttc aactgaagcg  300
gacaaacgtc ctctcttgat ggtttggtgg cctgacaaat cgactcaggt taactacctt  360
aactacatgc aaaatcaagg tcttggtgcg ggatcatttt caaccaactc tagccaggaa  420
agtctaaatc tagctgctaa agcggttcag actaagattg aagaacgtat tgcgcgtgaa  480
ggcaatacca actggttgcg tacaagtatc gaccagttca tcaagactca gccaggttgg  540
aatagtagca ctgaaaatag ttcttatgac cacttacaag gcggacagtt gctctttaac  600
aacagtaagg gtgatactgg taaccgtact agctacgcca actctgatta tcgtttgctt  660
aaccgcacac cgacaaacca gagtgggaca cgtaagtatt tcaaggataa ttctatcggt  720
ggtcttgagt tcttgcttgc caacgatatt gacaactcaa acccagctgt tcaggcggag  780
caacttaact ggctccactt tatgatgaat attggaagca tcatggccaa tgacccaaca  840
gccaactttg acggtttgcg tgtcgatgct ttggacaatg tggatgccga ccttctccaa  900
atcgcttcag attacttcaa agcagtctat ggtgttgaca agtccgaagc taatgcgatc  960
aaacacttgt catacttgga agcgtggtct gccaacgacc catactacaa caaggatact  1020
aagggggcac aactgccgat tgataatgcc cttcgtaatg ctcttaccaa ccttttgatg  1080
cgtgataaaa atacacgtat gcagcttggg gacatgactg cttttatgaa tagtagtttg  1140
aatccacgtg gtgctaacga taagaacggt gaacgtatgg ctaactatat tttcacccgt  1200
gcccacgata ctgaagcgca aaccattatc caacgtatca tccgtgatcg tatcaaccca  1260
aatctgtttg gttacaattt cacccgtgat gaaatcaaga aggctttcga gatttacaat  1320
gcggatatca atacagctca caagacttat gcgtcataca acttgccatc tgtctatgcc  1380
ctcatgttga ccaacaagga ctctgtgaca cgtgtttatt atggagacct ctaccgtgaa  1440
gacggtcact acatggccaa gaagacgcct tactttgatg ccatcgatac ccttttgcgt  1500
gcccgtatca agtatgtggc cggtggtcaa gacatggaag tgaagaaagt cggaaatgat  1560
ggacttttga cttctgttcg ttatggtaag ggtgccaata acagcactga ttggggaact  1620
actgaaaccc gtacgcaagg gatgggtgtc attttgacca ataactacga tttccgcttg  1680
ggtagcaatg aaactgtaac gatgaatatg ggtagagccc accgtaatca gctttaccgt  1740
ccattgcttt tgacgactaa ggatggtcta gcaacctacc tcaacgattc tgatgtacct  1800
tcaaaccttc ttaaacgtac cgactggaat gggaatttga ccttcaatgc caacgatgtt  1860
tttggtgtgg aaaatgtgca agtatcaggt tacctcggtg tctgggtacc agtcggggct  1920
aaggctaacc aagacgcacg tacacagcca agtaaccgtg ccaatagtga tggtcaagtt  1980
tacaagtctt cagcagccct tgattcgcaa gttatgtatg aagccttctc aaacttccaa  2040
gcgtttgcgg acgatcagcc agaactctac atgaaccgtg tcttggctaa gaacactgac  2100
ttgctcaaag cgtggggtgt tacatctgtt ggacttccac cacagtacgt ttcaagtaag  2160
gatggtacct tcctcgattc aacgattgac aatggttatg cctttgatga ccgttatgac  2220
atggccttga gtcaaaataa taaatatggc tcacttgagg acctccttaa cgtccttcgt  2280
gccctccaca aagatggtat tcaagccatt gctgactggg tgccagacca aatctataac  2340
cttccaggta aggaagtggt gaatgccaca cgtgttaacg gctacggtta tcaccaacaa  2400
ggttatcaaa ttgtggacca agcctatgtg gcaaataccc gtacagatgg tacagactat  2460
caaggtagat acggtggtgc cttccttgat gagctgaaag ctaagtaccc atctattttc  2520
aaccgtgtgc aaatctcaaa tggtaagcag ttgcctacga atgaaaagat tacaaaatgg  2580
tctgctaagt acttcaacgg aaccaacatc cttggacgag gcatcaatta tgtccttcgt  2640
gatgacaaga ccaaccagta ctttaatact tcagccaacg gccaactctt gccaacacca  2700
cttcgtgaca caggtgccat cacaagcact caagtcttcc aacgtcgtgg acaagatgtt  2760
tacttccttc gtgataatca agttatcaag aatgaatttg ttcaagacgg taacggtaac  2820
tggtattact tcggtgctga cggtaagatg accaagggtg cccaaaacat caatagcaag  2880
gattactatt tctttgataa tggtgttcaa ttgcgtaacg ctcttcgtcg tgcaagcaac  2940
ggctatactt actattacgg tttagatggt gccatgatta agaatgcctt tgttgatttt  3000
gatgacaaac atcagtaa                                                3018

SEQ ID NO: 126         moltype = AA  length = 1005
FEATURE                Location/Qualifiers
REGION                 1..1005
                       note = T5 C-terminal truncation of GTF0459
source                 1..1005
                       mol_type = protein
                       organism = synthetic construct
SEQUENCE: 126
INGKQYYVNS DGSVRKNFVF EQDGKSYYFD AETGALATKS QDEFSTEPIK AAVDFSSGNQ  60
LYKNDNKSLD QLDTFITADA WYRPKSILKD GKTWTASTEA DKRPLLMVWW PDKSTQVNYL  120
NYMQNQGLGA GSFSTNSSQE SLNLAAKAVQ TKIEERIARE GNTNWLRTSI DQFIKTQPGW  180
NSSTENSSYD HLQGGQLLFN NSKGDTGNRT SYANSDYRLL NRTPTNQSGT RKYFKDNSIG  240
GLEFLLANDI DNSNPAVQAE QLNWLHFMMN IGSIMANDPT ANFDGLRVDA LDNVDADLLQ  300
IASDYFKAVY GVDKSEANAI KHLSYLEAWS ANDPYYNKDT KGAQLPIDNA LRNALTNLLM  360
RDKNTRMQLG DMTAFMNSSL NPRGANDKNG ERMANYIFTR AHDTEAQTII QRIIRDRINP  420
NLFGYNFTRD EIKKAFEIYN ADINTAHKTY ASYNLPSVYA LMLTNKDSVT RVYYGDLYRE  480
DGHYMAKKTP YFDAIDTLLR ARIKYVAGGQ DMEVKKVGND GLLTSVRYGK GANNSTDWGT  540
TETRTQGMGV ILTNNYDFRL GSNETVTMNM GRAHRNQLYR PLLLTTKDGL ATYLNDSDVP  600
SNLLKRTDWN GNLTFNANDV FGVENVQVSG YLGVWVPVGA KANQDARTQP SNRANSDGQV  660
YKSSAALDSQ VMYEAFSNFQ AFADDQPELY MNRVLAKNTD LLKAWGVTSV GLPPQYVSSK  720
```

```
DGTFLDSTID NGYAFDDRYD MALSQNNKYG SLEDLLNVLR ALHKDGIQAI ADWVPDQIYN  780
LPGKEVVNAT RVNGYGYHQQ GYQIVDQAYV ANTRTDGTDY QGRYGGAFLD ELKAKYPSIF  840
NRVQISNGKQ LPTNEKITKW SAKYFNGTNI LGRGINYVLR DDKTNQYFNT SANGQLLPTP  900
LRDTGAITST QVFQRRGQDV YFLRDNQVIK NEFVQDGNGN WYYFGADGKM TKGAQNINSK  960
DYYFFDNGVQ LRNALRRASN GYTYYYGLDG AMIKNAFVDF DDKHQ                 1005

SEQ ID NO: 127          moltype = DNA  length = 3018
FEATURE                 Location/Qualifiers
misc_feature            1..3018
                        note = T4 C-terminal truncation of GTF0974
source                  1..3018
                        mol_type = other DNA
                        organism = synthetic construct
SEQUENCE: 127
attaacggca aacaatacta tgtcaatagt gacggtagtg tacgtaaaaa cttcgttttt  60
gagcaagatg gtaagtctta ttactttgat gctgaaacag gggcacttgc gactaagtct  120
caggatgaat ttcaacaga acctatcaag gcaaccgtag atttttcatc tggaaaccag  180
ctctacaaaa acgatgacaa gtctttggac caactcgaca ccttcatcac agcggatgct  240
tggtaccgtc caaagagcat tctcaaggat ggtaagactt ggacagcttc aactgaagcg  300
gacaaacgtc ctctattgat ggtttggtgg cctgacaagt ctactcaggt caactacctt  360
aactacatgc aaaatcaagg tcttggagca gggtcatttt caaccaactc tagtcaggaa  420
agtctggacc aagctgctaa agcggttcag actaagattg aagaacgtat cgcgcgtgag  480
ggcaatacca actggttacg tacaagtatc gaccagttca tcaagactca gccaggttgg  540
aatagtagca ctgaaaatag ttcatacgac cacttgcaag gcggacagtt gctctttaac  600
aacagtaagg gtgatactgg caaccgtacc agccacgcca actctgacta tcgtttgctt  660
aaccgcacac cgacaaacca aacgggtaca cgtaagtact tcaaggacaa ttctatcggt  720
ggtcttgagt tcttgcttgc caacgatatt gataactcaa acccagctgt tcaggcagaa  780
caacttaact ggctccactt tatgatgaat atcggaagta tcatggcaaa tgacccaact  840
gccaactttg acggtttgcg tgtcgacgcc ttggacaatg tggatgccga ccttctccaa  900
atcgcttcag attactttaa agcagcctat ggggttgaca agtctgaagc caatgctatt  960
aagcacttgt catatttgga agcatggtct gccaacgacc catactacaa caaggacact  1020
aagggagcac aacttccgat tgataatgcc cttcgtaacg cccttaccaa cctcttgatg  1080
cgtgataaaa atacacgtat gcagcttggg gacatgactg ccttcatcaa tagtagtttg  1140
aatccacgtg gtgccaacga taaaaacggt gaacgtatgg ctaactatat tttcactcgt  1200
gcccatgata cagaagctca aacgattatt caacgtatca tccgtgatcg tattaaccca  1260
aatttatttg gttacaattt cactcgtgat gaaatcaaga aagccttcga gatttacaat  1320
gaggatattg ataaggctca caagacttat gcgtcataca acttaccatc tgtctatgcc  1380
ctcatgttga ccaacaagga ctctgtaaca cgtgtttatt acggagacct ctatcgtgaa  1440
gatggtcact acatggctaa aaagacaccg tactttgatg ccatcgacac cctcttgcgt  1500
gctcgcatca agtatgtagc tggtggtcaa gacatggaag tgaagaaagt cggaaatgat  1560
ggactcttga catctgttcg ttatggtaaa ggtgccaata acagaactga tttgggaact  1620
tctgaaaccc gtacgcaagg gatgggtgtc atcatgacca acaactatga tttccgcttg  1680
ggtagcaatg aaaccgtaac gatgaacatg ggtagagctc accgtaatca gctttatcgc  1740
ccattgcttt tgacgacaaa ggatggtata gcaacctacc tcaacgattc tgatgtgcct  1800
aaaaaacttc tgaaacgtac tgactggaat gggaacttga ccttcaatgc caacgatgtt  1860
ttcggtgtag aaaatgtcca agtctcaggt tacctcggtg tctgggtacc atacggagct  1920
aaggctaatc aagatgcacg tacacagcca agtaatcgtg ccaatagcga cggtcaagtt  1980
tacaagtctt cagcagccct tgattcgcaa gtcatgtatg aagccttctc aaacttccaa  2040
gcctttgcgg acgatcaacc tgaactttac atgaaccgtg tcttggctaa gaacactgac  2100
ttgctcaaag catgggggat cacgtcagtc ggacttccac cacagtacgt ttcaagtaag  2160
gatggcacct tccttgactc aacaattgat aatggttatg cctttgatga ccgttacgat  2220
atggccttga gtcaaaataa taaatacgga tcacttgagg acctccttaa cgttcttcgt  2280
gctctccaca aagacggtat tcaagccatt gctgactggg tgccagacca aatctataac  2340
ctcccaggaa aagaagtggt aaatgcgaca cgtgttaatg gttatggtaa ccaccaagta  2400
ggctaccaaa tcattgacca agcctatgtg gctaatactc gtacagatgg tacagactat  2460
caaggtaaat acggtggagc cttccttgat gagcttaaag ctaagtaccc atctattttc  2520
aaccgtgtgc aaatctcaaa tggaaaacag ttgcctacga atgaaaagat tactaaatgg  2580
tctgctaagt acttcaacgg aactaatatc cttggacgag gtatcaacta tgtccttcgt  2640
gatgacaaga ctaaccagta ctttaatact tcagccaaca gccaactctt gccaacacca  2700
cttcgcgata caggtgccat cacaagcact caagtcttcc aacgtcgtgg acaagatgtt  2760
tatttcctac gtgataacca agctgttaag aatgaatttg ttcaagacgg aaacggtaac  2820
tggtattact tcggtggtga cggtaagatg accaagggtg cccaaaacat caataacaag  2880
gattactatt tctttgacaa tggtatccaa ttgcgtaacg cccttcgtcg tgcttcaaac  2940
ggctatacct actattacgg tctggacggt gccatggtta agaatgcctt cgttgatttt  3000
gatgacaaac ataagtaa                                               3018

SEQ ID NO: 128          moltype = AA  length = 1005
FEATURE                 Location/Qualifiers
REGION                  1..1005
                        note = T4 C-terminal truncation of GTF0974
source                  1..1005
                        mol_type = protein
                        organism = synthetic construct
SEQUENCE: 128
INGKQYYVNS DGSVRKNFVF EQDGKSYYFD AETGALATKS QDEFSTEPIK ATVDFSSGNQ  60
LYKNDDKSLD QLDTFITADA WYRPKSILKD GKTWTASTEA DKRPLLMVWW PDKSTQVNYL  120
NYMQNQGLGA GSFSTNSSQE SLDQAAKAVQ TKIEERIARE GNTNWLRTSI DQFIKTQPGW  180
NSSTENSSYD HLQGGQLLFN NSKGDTGNRT SHANSDYRLL NRTPTNQTGT RKYFKDNSIG  240
GLEFLLANDI DNSNPAVQAE QLNWLHFMMN IGSIMANDPT ANFDGLRVDA LDNVDADLLQ  300
```

-continued

```
IASDYFKAAY GVDKSEANAI KHLSYLEAWS ANDPYYNKDT KGAQLPIDNA LRNALTNLLM  360
RDKNTRMQLG DMTAFINSSL NPRGANDKNG ERMANYIFTR AHDTEAQTII QRIIRDRINP  420
NLFGYNFTRD EIKKAFEIYN EDIDKAHKTY ASYNLPSVYA LMLTNKDSVT RVYYGDLYRE  480
DGHYMAKKTP YFDAIDTLLR ARIKYVAGGQ DMEVKKVGND GLLTSVRYGK GANNRTDLGT  540
SETRTQGMGV IMTNNYDFRL GSNETVTMNM GRAHRNQLYR PLLLTTKDGI ATYLNDSDVP  600
KKLLKRTDWN GNLTFNANDV FGVENVQVSG YLGVWVPYGA KANQDARTQP SNRANSDGQV  660
YKSSAALDSQ VMYEAFSNFQ AFADDQPELY MNRVLAKNTD LLKAWGITSV GLPPQYVSSK  720
DGTFLDSTID NGYAFDDRYD MALSQNNKYG SLEDLLNVLR ALHKDGIQAI ADWVPDQIYN  780
LPGKEVVNAT RVNGYGNHQV GYQIIDQAYV ANTRTDGTDY QGKYGGAFLD ELKAKYPSIF  840
NRVQISNGKQ LPTNEKITKW SAKYFNGTNI LGRGINYVLR DDKTNQYFNT SANSQLLPTP  900
LRDTGAITST QVFQRRGQDV YFLRDNQAVK NEFVQDGNGN WYYFGGDGKM TKGAQNINNK  960
DYYFFDNGIQ LRNALRRASN GYTYYYGLDG AMVKNAFVDF DDKHK                  1005

SEQ ID NO: 129          moltype = DNA  length = 3018
FEATURE                 Location/Qualifiers
misc_feature            1..3018
                        note = T4 C-terminal truncation of GTF4336
source                  1..3018
                        mol_type = other DNA
                        organism = synthetic construct
SEQUENCE: 129
attaacggca aacaatacta tgtcaatagt gacggtagtg tgcgtaagaa ctttgtcttt  60
gagcaagatg gtaagtctta ttactttgat gctgaaacag gggctcttgc gactaagtca  120
caggatgaat tttcaacaga accaatcaag gcaaccgtcg atttttcatc tggaaaccag  180
ctctacaaaa acgatgataa atcgttggac cagctcgata ccttcatcac agcggatgct  240
tggtaccgtc caaagagcat tctcaaggat ggtaagactt ggacggcttc aactgaggct  300
gacaaacgtc cactcttgat ggtttggtgg cctgacaagt caactcaggt taactacctt  360
aactacatgc aaaatcaagg tcttggtgca ggctcatttt caaccaactc tagccaggaa  420
agtctggacc aagctgctaa agcggttcag actaagattg aagaacgtat cgctcgtgaa  480
ggcaacacaa actggttgcg tacaagtatc gaccagttca tcaagactca gccaggttgg  540
aatagtagca ctgaaaatag ttcatacgac cacttgcaag gcggacagtt gctctttaac  600
aacagtaagg gtgatactgg caaccgtacc agccacgcca actctgacta tcgtttgctt  660
aaccgcacac cgactaacca gacgggtaca cgtaagtact tcaaggacaa ttctatcggt  720
ggtcttgagt tcttgcttgc caacgatatt gataactcaa acccagctgt tcaggcagag  780
caacttaact ggctccactt tatgatgaat attggaagca tcatggcaaa tgacccaaca  840
gctaactttg acggtttgcg tgtcgatgcc ttggacaatg tggatgctga ccttctccaa  900
atcgcatcag actacttcaa agcagcctat ggtgttgaca agtctgaagc caatgccatt  960
aagcacttgt catacttgga agcatggtct gccaacgacc catactacaa taaggacact  1020
aagggggcac aacttccgat tgacaatgcc ctccgtaatg cccttaccaa cctcttgatg  1080
cgtgataaga atacacgtat gcagcttggg gacatgactg ccttcatcaa cagtagtttg  1140
aatccacgtg gtgccaacga taaaaacggt gaacgtatgg caaactatat tttcacccgt  1200
gctcacgata cggaagctca aacgattatt caacgtatca tccgtgatcg tatcaaccca  1260
aatttgtttg gttacaattt cactcgtgat gaaatcaaga aagccttcga gatttacaat  1320
gaggatattg ataaggctca caagacttat gcgtcataca acttaccatc tgtttatgct  1380
ctcatgttga ccaacaagga ctctgtaaca cgagtttatt acggagacct ctaccgtgaa  1440
gatggtcact acatggctaa aaagacaccg tactttgatg ccattgacac cctcttgcgt  1500
gctcgtatca agtatgtagc tggtggtcaa gacatggaag tgaagaaagt cggaaatgac  1560
ggcctcttga catctgttcg ttatggtaaa ggtgccaata acagaacaga tttgggaact  1620
tcagaaactc gtacgcaagg tatgggtgtc atcatgacca acaactatga tttccgcttg  1680
ggtagcaatg aaactgtaac gatgaacatg ggtagagcac accgtaatca gctttatcgc  1740
ccattgcttt tgacgacaaa ggatggtata gcaacctact tcaacgattc tgatgtgcct  1800
aaaaaccttc tgaaacgtac tgactggaat gggaacttga ccttcaatgc caatgatgtt  1860
tttggtgtgg aaaatgtcca agtatcaggt taccttggtg tctgggtacc agtcggggct  1920
aaggctaacc aagacgcacg tacacagcca agtaaccgtg ccaatagcga tggtcaagtt  1980
tacaagtctt cagcagccct tgattcgcaa gtcatgtatg aagccttctc aaacttccaa  2040
gcatttgcgg acgatcagcc agaactctac atgaaccgtg tcttggctaa gaacactgac  2100
ttgctcaaag catggggtgt tacgtctgtt ggacttccac cacagtacgt ttcaagtaag  2160
gatggtacct tccttgattc aacaattgac aatggttatg cctttgatga ccgttatgac  2220
atggccttga gtcaaaataa caagtatggc tcacttgagg acctccttaa tgttcttcgt  2280
gccctccaca aagatggtat tcaagccatt gctgactggg tgccagacca aatttataac  2340
cttccaggaa aagaagtagt taatgccaca cgtgttaacg gctacggtta tcaccaacaa  2400
ggttatcaaa ttgtggacca agcctatgtg gcaaataccc gtacagatgg tacagactat  2460
caaggtaaat acggtggagc cttccttgat gagcttaaag ctaagtaccc atctattttc  2520
aaccgtgtgc aaatctcaaa tggtaagcag ttacctacga atgaaaagat tactaaatgg  2580
tctgctaagt acttcaacgg aactaatatc cttggacgag gtatcaacta tgtccttcgt  2640
gatgacaaga ccaaccagta ctttaatacc tcagctaaca gccaactctt gccaacacca  2700
cttcgtgaca caggtgccat tacaagcact caagtcttcc aacgtcgtgg acaagatgtt  2760
tacttccttc gtgataacca agccgttaag aatgaatttg ttcaagacgg taacggcaac  2820
tggtattact tcggtgctga cggtaagatg accaagggtg ctcaaaccat caataaaaag  2880
gattactatt tctttgacaa tggtatccaa ttgcgtaacg cccttcgtcg tgctaacaac  2940
ggttatactt actattacgg tttagacggt gctatggtta agaatgcctt tgttgatttt  3000
gacgacaagc gtaagtaa                                                3018

SEQ ID NO: 130          moltype = AA  length = 1005
FEATURE                 Location/Qualifiers
REGION                  1..1005
                        note = T4 C-terminal truncation of GTF4336
source                  1..1005
                        mol_type = protein
```

```
                         organism = synthetic construct
SEQUENCE: 130
INGKQYYVNS DGSVRKNFVF EQDGKSYYFD AETGALATKS QDEFSTEPIK ATVDFSSGNQ  60
LYKNDDKSLD QLDTFITADA WYRPKSILKD GKTWTASTEA DKRPLLMVWW PDKSTQVNYL  120
NYMQNQGLGA GSFSTNSSQE SLDQAAKAVQ TKIEERIARE GNTNWLRTSI DQFIKTQPGW  180
NSSTENSSYD HLQGGQLLFN NSKGDTGNRT SHANSDYRLL NRTPTNQTGT RKYFKDNSIG  240
GLEFLLANDI DNSNPAVQAE QLNWLHFMMN IGSIMANDPT ANFDGLRVDA LDNVDADLLQ  300
IASDYFKAAY GVDKSEANAI KHLSYLEAWS ANDPYYNKDT KGAQLPIDNA LRNALTNLLM  360
RDKNTRMQLG DMTAFINSSL NPRGANDKNG ERMANYIFTR AHDTEAQTII QRIIRDRINP  420
NLFGYNFTRD EIKKAFEIYN EDIDKAHKTY ASYNLPSVYA LMLTNKDSVT RVYYGDLYRE  480
DGHYMAKKTP YFDAIDTLLR ARIKYVAGGQ DMEVKKVGND GLLTSVRYGK GANNRTDLGT  540
SETRTQGMGV IMTNNYDFRL GSNETVTMNM GRAHRNQLYR PLLLTTKDGI ATYFNDSDVP  600
KNLLKRTDWN GNLTFNANDV FGVENVQVSG YLGVWVPVGA KANQDARTQP SNRANSDGQV  660
YKSSAALDSQ VMYEAFSNFQ AFADDQPELY MNRVLAKNTD LLKAWGVTSV GLPPQYVSSK  720
DGTFLDSTID NGYAFDDRYD MALSQNNKYG SLEDLLNVLR ALHKDGIQAI ADWVPDQIYN  780
LPGKEVVNAT RVNGYGYHQQ GYQIVDQAYV ANTRTDGTDY QGKYGGAFLD ELKAKYPSIF  840
NRVQISNGKQ LPTNEKITKW SAKYFNGTNI LGRGINYVLR DDKTNQYFNT SANSQLLPTP  900
LRDTGAITST QVFQRRGQDV YFLRDNQAVK NEFVQDGNGN WYYFGADGKM TKGAQTINKK  960
DYYFFDNGIQ LRNALRRANN GYTYYYGLDG AMVKNAFVDF DDKRK                1005

SEQ ID NO: 131           moltype = DNA  length = 3018
FEATURE                  Location/Qualifiers
misc_feature             1..3018
                         note = T4 C-terminal truncation of GTF4491
source                   1..3018
                         mol_type = other DNA
                         organism = synthetic construct
SEQUENCE: 131
atcaacggca aacaatacta tgtcaatagt gacggtagtg tgcgtaagaa ctttgttttt  60
gagcaagatg gtaagtctta ttactttgat gctgaaacag ggctcttgc  gactaagtca  120
caggatgaat tttcaacaga acctatcaag gcaaccgtag atttttcatc tggtaaccag  180
ctctacaaaa acgatgacaa atctttggac caacttgaca ccttcatcac agcggatgct  240
tggtaccgtc caaagagcat tctcaaggat ggtaagactt ggacagcttc aactgaagct  300
gacaaacgtc ctctcttgat ggtttggtgg cctgacaagt ctactcaggt caactacctt  360
aactacatgc aaaatcaagg tcttggtgca gggtcatttt caaccaactc tagccaggaa  420
agtctggacc aagctgctaa agcggttcag actaagattg aagaacgtat cgcgcgtgag  480
ggcaatacca actggttgcg tacaagtatc gaccagttca tcaagacaca gccaggttgg  540
aatagtagca ctgaaaatag ttcatacgac cacttgcaag gcggacagtt gctctttaac  600
aacagtaagg gtgatactgg caaccgtacc agccacgcca actctgacta tcgtttgtta  660
aaccgcacac cgactaacca gacgggtaca cgtaagtact tcaaggataa ttctatcggt  720
ggtcttgagt tcttgcttgc caacgatatt gataactcaa acccagctgt tcaggcagag  780
caacttaact ggctccactt tatgatgaat atcggaagca tcatggctaa tgacccaact  840
gccaactttg acggtttgcg tgtcgatgcc ttggacaatg tggatgccga cctgctccaa  900
atcgcatcag actacttcaa agcagcctat ggtgttgaca agtctgaagc caatgccatc  960
aagcacttgt catacttgga agcatggtct gccaacgacc catactacaa caaggacact  1020
aagggagcac aacttccgat tgacaatgcc cttcgtaatg ccctcaccaa cctcttgatg  1080
cgtgataaaa atacacgtat gcagcttgga gacatgactg ctttcatcaa cagtagtttg  1140
aacccacgag gtgccaacga taaaaacggt gaacgtatgg caaactatat tttcacccgt  1200
gcccatgata cagaagctca aaccattatt caacgtatca ttcgtgatcg tattaaccca  1260
aatttgtttg gttataattt cacacgtgat gaaatcaaga aagccttcga gatttacaat  1320
gaggatattg ataaggctca caagacttat gcgtcataca acttgccatc tgtctatgcc  1380
ctcatgttga ccaataagga ctctgtaaca cgtgtttatt acggagacct ctaccgtgaa  1440
gatggtcact acatggctaa gaagacgcct tactttgatg ccatcgacac cctcttgcgt  1500
gcccgtatca agtatgtagc tggtggtcaa gacatggaag tgaagaaagt cggaaatgac  1560
ggcctcttga catcagttcg ttatggtaaa ggtgccaata acagaactga tttgggaact  1620
tctgaaactc gtacgcaagg tatgggtgtc atcatgacca acaactatga tttccgcttg  1680
ggtagcaatg aaactgtaac gatgaacatg ggtagagctc accgtaatca gctttatcga  1740
ccattgcttt tgacgacaaa ggatggtata gcaacctacc tcaacgattc tgatgtgcct  1800
aaaaaccttc tgaaacgtac tgactggaat gggaacttga ccttcaatgc caacgatgtt  1860
ttcggtgtag aaaatgtcca agtctcaggt tacctcggtg tctgggtacc atacggagct  1920
aaggctaatc aagatgcacg tacacagcca agtaatcgtg ccaatagcga cggtcaagtt  1980
tacaagtctt cagcagccct tgattcgcaa gtcatgtatg aagccttctc aaacttccaa  2040
gcctttgcgg acgatcaacc tgaactttac atgaaccgtg tcttggctaa gaacactgac  2100
ttgctcaaag catgggggat cacgtcagtc ggacttccac cacagtacgt ttcaagtaag  2160
gatggcacct tccttgactc aataattgat aatggttatg cctttgatga ccgttacgat  2220
atggccttga gtcaaaataa taaatacgga tcacttgagg acctccttaa cgttcttcgt  2280
gccctccata aagacggtat tcaagccatt gctgactggg taccagacca aatctataac  2340
ctcccaggaa aagaagtggt aaatgcgaca cgtgttaacg gctacggtta tcaccaacaa  2400
ggttatcaaa ttgtggacca agcctatgtg gcaaataccc gtacagatgg tacagactat  2460
caaggcaagt acggtggtgc cttccttgat gagctgaaag ctaagtaccc atctattttc  2520
aaccgtgtgc aaatctcaaa tggtaagcaa ttgcctacga atgaaaagat tacaaaatgg  2580
tctgctaagt acttcaacgg aaccaacatc cttggacgag gcatcaactt tgtccttcgt  2640
gatgacaaga ccaaccagta ctttaatact tcagctaaca gccaactctt gccaacacca  2700
cttcgtgata cgggtgccat cacaagcact caagtcttcc aacgtcgtgg acaagatgtt  2760
tacttccttc gcgataacca aaccgttaag aatgaatttg ttcaagacgg taacggtaac  2820
tggtattact tcggtggtga cggtaagatg accaagggtg cccaaaacat caatagcaag  2880
gattactatt tctttgataa tggtgttcaa ttgcgtaatg ccctgcgtcg tgcttcaaac  2940
ggctatactt actattacgg tctggacggt gctatggtta agaatgcctt cgttgatttt  3000
gatgacaagc ataagtaa                                               3018
```

```
SEQ ID NO: 132          moltype = AA  length = 1005
FEATURE                 Location/Qualifiers
REGION                  1..1005
                        note = T4 C-terminal truncation of GTF4491
source                  1..1005
                        mol_type = protein
                        organism = synthetic construct
SEQUENCE: 132
INGKQYYVNS DGSVRKNFVF EQDGKSYYFD AETGALATKS QDEFSTEPIK ATVDFSSGNQ  60
LYKNDDKSLD QLDTFITADA WYRPKSILKD GKTWTASTEA DKRPLLMVWW PDKSTQVNYL  120
NYMQNQGLGA GSFSTNSSQE SLDQAAKAVQ TKIEERIARE GNTNWLRTSI DQFIKTQPGW  180
NSSTENSSYD HLQGGQLLFN NSKGDTGNRT SHANSDYRLL NRTPTNQTGT RKYFKDNSIG  240
GLEFLLANDI DNSNPAVQAE QLNWLHFMMN IGSIMANDPT ANFDGLRVDA LDNVDADLLQ  300
IASDYFKAAY GVDKSEANAI KHLSYLEAWS ANDPYYNKDT KGAQLPIDNA LRNALTNLLM  360
RDKNTRMQLG DMTAFINSSL NPRGANDKNG ERMANYIFTR AHDTEAQTII QRIIRDRINP  420
NLFGYNFTRD EIKKAFEIYN EDIDKAHKTY ASYNLPSVYA LMLTNKDSVT RVYYGDLYRE  480
DGHYMAKKTP YFDAIDTLLR ARIKYVAGGQ DMEVKKVGND GLLTSVRYGK GANNRTDLGT  540
SETRTQGMGV IMTNNYDFRL GSNETVTMNM GRAHRNQLYR PLLLTTKDGI ATYLNDSDVP  600
KNLLKRTDWN GNLTFNANDV FGVENVQVSG YLGVWVPYGA KANQDARTQP SNRANSDGQV  660
YKSSAALDSQ VMYEAFSNFQ AFADDQPELY MNRVLAKNTD LLKAWGITSV GLPPQYVSSK  720
DGTFLDSIID NGYAFDDRYD MALSQNNKYG SLEDLLNVLR ALHKDGIQAI ADWVPDQIYN  780
LPGKEVVNAT RVNGYGYHQQ GYQIVDQAYV ANTRTDGTDY QGKYGGAFLD ELKAKYPSIF  840
NRVQISNGKQ LPTNEKITKW SAKYFNGTNI LGRGINFVLR DDKTNQYFNT SANSQLLPTP  900
LRDTGAITST QVFQRRGQDV YFLRDNQTVK NEFVQDGNGN WYYFGGDGKM TKGAQNINSK  960
DYYFFDNGVQ LRNALRRASN GYTYYYGLDG AMVKNAFVDF DDKHK                 1005

SEQ ID NO: 133          moltype = DNA  length = 3042
FEATURE                 Location/Qualifiers
misc_feature            1..3042
                        note = T6 C-terminal truncation of GTF0459
source                  1..3042
                        mol_type = other DNA
                        organism = synthetic construct
SEQUENCE: 133
atcaacggca aacaatacta tgtcaatagt gacggtagtg tgcgtaagaa cttcgttttt  60
gagcaagatg gtaagtcata ttactttgat gctgaaacag gggctcttgc gaccaagtca  120
caggatgaat tttcaacaga acctatcaag gcagctgtgg atttttcatc tggaaatcag  180
ctctacaaaa acgataacaa atctttggac caactcgaca ccttcatcac tgcggatgct  240
tggtaccgtc caaagagtat tctcaaggat ggtaagactt ggacagcttc aactgaagcg  300
gacaaacgtc ctctcttgat ggtttggtgg cctgacaaat cgactcaggt taactacctt  360
aactacatgc aaaatcaagg tcttggtgcg ggatcatttt caaccaactc tagccaggaa  420
agtctaaatc tagctgctaa agcggttcag actaagattg aagaacgtat tgcgcgtgaa  480
ggcaatacca actggttgcg tacaagtatc gaccagttca tcaagactca gccaggttgg  540
aatagtagca ctgaaaatag ttcttatgac cacttacaag gcggacagtt gctctttaac  600
aacagtaagg gtgatactgg taaccgtact agctacgcca actctgatta tcgtttgctt  660
aaccgcacac cgacaaacca gagtgggaca cgtaagtatt tcaaggataa ttctatcggt  720
ggtcttgagt tcttgcttgc caacgatatt gacaactcaa acccagctgt tcaggcggag  780
caacttaact ggctccactt tatgatgaat attggaagca tcatggccaa tgacccaaca  840
gccaactttg acggtttgcg tgtcgatgct ttggacaatg tggatgccga ccttctccaa  900
atcgcttcag attacttcaa agcagtctat ggtgttgaca agtccgaagc taatgcgatc  960
aaacacttgt catacttgga agcgtggtct gccaacgacc catactacaa caaggatact  1020
aagggggcac aactgccgat tgataatgcc cttcgtaatg ctcttaccaa cctttttgatg  1080
cgtgataaaa atacacgtat gcagcttggg gacatgactg cttttatgaa tagtagtttg  1140
aatccacgtg gtgctaacga taagaacggt gaacgtatgg ctaactatat tttcacccgt  1200
gcccacgata ctgaagcgca aaccattatc caacgtatca tccgtgatcg tatcaaccca  1260
aatctgtttg gttacaattt cacccgtgat gaaatcaaga aggctttcga gatttacaat  1320
gcggatatca atacagctca caagacttat gcgtcataca acttgccatc tgtctatgcc  1380
ctcatgttga ccaacaagga ctctgtgaca cgtgtttatt atggagacct ctaccgtgaa  1440
gacggtcact acatggccaa gaagacgcct tactttgatg ccatcgatac ccttttgcgt  1500
gcccgtatca agtatgtggc cggtggtcaa gacatggaag tgaagaaagt cggaaatgat  1560
ggacttttga cttctgttcg ttatggtaag ggtgccaata acagcactga ttggggaact  1620
actgaaaccc gtacgcaagg gatgggtgtc attttgacca ataactacga tttccgcttg  1680
ggtagcaatg aaactgtaac gatgaatatg ggtagagccc accgtaatca gctttaccgt  1740
ccattgcttt tgacgactaa ggatggtcta gcaacctacc tcaacgattc tgatgtacct  1800
tcaaaccttc ttaaacgtac cgactggaat gggaatttga ccttcaatgc caacgatgtt  1860
tttggtgtgg aaaatgtgca agtatcaggt tacctcggtg tctgggtacc agtcggggct  1920
aaggctaacc aagacgcacg tacacagcca agtaaccgtg ccaatagtga tggtcaagtt  1980
tacaagtctt cagcagccct tgattcgcaa gttatgtatg aagccttctc aaacttccaa  2040
gcgtttgcgg acgatcagcc agaactctac atgaaccgtg tcttggctaa gaacactgac  2100
ttgctcaaag cgtggggtgt tacatctgtt ggacttccac cacagtacgt ttcaagtaag  2160
gatggtacct tcctcgattc aacgattgac aatggttatg cctttgatga ccgttatgac  2220
atggccttga gtcaaaataa taaatatggc tcacttgagg acctccttaa cgtccttcgt  2280
gccctccaca aagatggtat tcaagccatt gctgactggg tgccagacca aatctataac  2340
cttccaggta aggaagtggt gaatgccaca cgtgttaacg gctacggtta tcaccaacaa  2400
ggttatcaaa ttgtggacca agcctatgtg gcaaataccc gtacagatgg tacagactat  2460
caaggtagat acggtggtgc cttccttgat gagctgaaag ctaagtaccc atctattttc  2520
aaccgtgtgc aaatctcaaa tggtaagcag ttgcctacga atgaaaagat tacaaaatgg  2580
tctgctaagt acttcaacgg aaccaacatc cttggacgag gcatcaatta tgtccttcgt  2640
```

```
gatgacaaga ccaaccagta ctttaatact tcagccaacg gccaactctt gccaacacca  2700
cttcgtgaca caggtgccat cacaagcact caagtcttcc aacgtcgtgg acaagatgtt  2760
tacttccttc gtgataatca agttatcaag aatgaatttg ttcaagacgg taacggtaac  2820
tggtattact tcggtgctga cggtaagatg accaagggtg cccaaaacat caatagcaag  2880
gattactatt tctttgataa tggtgttcaa ttgcgtaacg ctcttcgtcg tgcaagcaac  2940
ggctatactt actattacgg tttagatggt gccatgatta agaatgcctt tgttgatttt  3000
gatgacaaac atcagcaagt tcgtgccttt acgactcaat aa                    3042

SEQ ID NO: 134          moltype = AA  length = 1013
FEATURE                 Location/Qualifiers
REGION                  1..1013
                        note = T6 C-terminal truncation of GTF0459
source                  1..1013
                        mol_type = protein
                        organism = synthetic construct
SEQUENCE: 134
INGKQYYVNS DGSVRKNFVF EQDGKSYYFD AETGALATKS QDEFSTEPIK AAVDFSSGNQ  60
LYKNDNKSLD QLDTFITADA WYRPKSILKD GKTWTASTEA DKRPLLMVWW PDKSTQVNYL  120
NYMQNQGLGA GSFSTNSSQE SLNLAAKAVQ TKIEERIARE GNTNWLRTSI DQFIKTQPGW  180
NSSTENSSYD HLQGGQLLFN NSKGDTGNRT SYANSDYRLL NRTPTNQSGT RKYFKDNSIG  240
GLEFLLANDI DNSNPAVQAE QLNWLHFMMN IGSIMANDPT ANFDGLRVDA LDNVDADLLQ  300
IASDYFKAVY GVDKSEANAI KHLSYLEAWS ANDPYYNKDT KGAQLPIDNA LRNALTNLLM  360
RDKNTRMQLG DMTAFMNSSL NPRGANDKNG ERMANYIFTR AHDTEAQTII QRIIRDRINP  420
NLFGYNFTRD EIKKAFEIYN ADINTAHKTY ASYNLPSVYA LMLTNKDSVT RVYYGDLYRE  480
DGHYMAKKTP YFDAIDTLLR ARIKYVAGGQ DMEVKKVGND GLLTSVRYGK GANNSTDWGT  540
TETRTQGMGV ILTNNYDFRL GSNETVTMNM GRAHRNQLYR PLLLTTKDGL ATYLNDSDVP  600
SNLLKRTDWN GNLTFNANDV FGVENVQVSG YLGVWVPVGA KANQDARTQP SNRANSDGQV  660
YKSSAALDSQ VMYEAFSNFQ AFADDQPELY MNRVLAKNTD LLKAWGVTSV GLPPQYVSSK  720
DGTFLDSTID NGYAFDDRYD MALSQNNKYG SLEDLLNVLR ALHKDGIQAI ADWVPDQIYN  780
LPGKEVVNAT RVNGYGYHQQ GYQIVDQAYV ANTRTDGTDY QGRYGGAFLD ELKAKYPSIF  840
NRVQISNGKQ LPTNEKITKW SAKYFNGTNI LGRGINYVLR DDKTNQYFNT SANGQLLPTP  900
LRDTGAITST QVFQRRGQDV YFLRDNQVIK NEFVQDGNGN WYYFGADGKM TKGAQNINSK  960
DYYFFDNGVQ LRNALRRASN GYTYYYGLDG AMIKNAFVDF DDKHQQVRAF TTQ         1013

SEQ ID NO: 135          moltype = DNA  length = 2727
FEATURE                 Location/Qualifiers
misc_feature            1..2727
                        note = T1 C-terminal truncation of GTF0974
source                  1..2727
                        mol_type = other DNA
                        organism = synthetic construct
SEQUENCE: 135
attaacggca aacaatacta tgtcaatagt gacggtagtg tacgtaaaaa cttcgttttt  60
gagcaagatg gtaagtctta ttactttgat gctgaaacag gggcacttgc gactaagtct  120
caggatgaat tttcaacaga acctatcaag gcaaccgtag atttttcatc tggaaaccag  180
ctctacaaaa acgatgacaa gtctttggac caactcgaca ccttcatcac agcggatgct  240
tggtaccgtc caaagagcat tctcaaggat ggtaagactt ggacagcttc aactgaagcg  300
gacaaacgtc ctctattgat ggtttggtgg cctgacaagt ctactcaggt caactacctt  360
aactacatgc aaaatcaagg tcttggagca gggtcatttt caaccaactc tagtcaggaa  420
agtctggacc aagctgctaa agcggttcag actaagattg aagaacgtat cgcgcgtgag  480
ggcaatacca actggttacg tacaagtatc gaccagttca tcaagactca gccaggttgg  540
aatagtagca ctgaaaatag ttcatacgac cacttgcaag gcggacagtt gctctttaac  600
aacagtaagg gtgatactgg caaccgtacc agccacgcca actctgacta tcgtttgctt  660
aaccgcacac cgacaaacca aacgggtaca cgtaagtact tcaaggacaa ttctatcggt  720
ggtcttgagt tcttgcttgc caacgatatt gataactcaa acccagctgt tcaggcagaa  780
caacttaact ggctccactt tatgatgaat atcggaagta tcatggcaaa tgacccaact  840
gccaactttg acggtttgcg tgtcgacgcc ttggacaatg tggatgccga ccttctccaa  900
atcgcttcag attactttaa agcagcctat ggggttgaca agtctgaagc caatgctatt  960
aagcacttgt catatttgga agcatggtct gccaacgacc catactacaa caaggacact  1020
aagggagcac aacttccgat tgataatgcc cttcgtaacg cccttaccaa cctcttgatg  1080
cgtgataaaa atacacgtat gcagcttggg gacatgactg ccttcatcaa tagtagtttg  1140
aatccacgtg gtgccaacga taaaaacggt gaacgtatgg ctaactatat tttcactcgt  1200
gcccatgata cagaagctca aacgattatt caacgtatca tccgtgatcg tattaaccca  1260
aatttatttg gttacaattt cactcgtgat gaaatcaaga aagccttcga gatttacaat  1320
gaggatattg ataaggctca caagacttat gcgtcataca acttaccatc tgtctatgcc  1380
ctcatgttga ccaacaagga ctctgtaaca cgtgtttatt acggagacct ctatcgtgaa  1440
gatggtcact acatggctaa aaagacaccg tactttgatg ccatcgacac cctcttgcgt  1500
gctcgcatca agtatgtagc tggtggtcaa gacatggaag tgaagaaagt cggaaatgat  1560
ggactcttga catctgttcg ttatggtaaa ggtgccaata acagaactga tttgggaact  1620
tctgaaaccc gtacgcaagg gatgggtgtc atcatgacca acaactatga tttccgcttg  1680
ggtagcaatg aaaccgtaac gatgaacatg ggtagagctc accgtaatca gctttatcgc  1740
ccattgcttt tgacgacaaa ggatggtata gcaacctacc tcaacgattc tgatgtgcct  1800
aaaaaacttc tgaaacgtac tgactggaat gggaacttga ccttcaatgc caacgatgtt  1860
ttcggtgtag aaaatgtcca agtctcaggt tacctcggtg tctgggtacc atacggagct  1920
aaggctaatc aagatgcacg tacacagcca agtaatcgtg ccaatagcga cggtcaagtt  1980
tacaagtctt cagcagccct tgattcgcaa gtcatgtatg aagccttctc aaacttccaa  2040
gcctttgcgg acgatcaacc tgaactttac atgaaccgtg tcttggctaa gaacactgac  2100
ttgctcaaag catgggggat cacgtcagtc ggacttccac cacagtacgt ttcaagtaag  2160
gatggcacct tccttgactc aacaattgat aatggttatg cctttgatga ccgttacgat  2220
```

-continued

```
atggccttga gtcaaaataa taaatacgga tcacttgagg acctccttaa cgttcttcgt  2280
gctctccaca aagacggtat tcaagccatt gctgactggg tgccagacca aatctataac  2340
ctcccaggaa aagaagtggt aaatgcgaca cgtgttaatg gttatggtaa ccaccaagta  2400
ggctaccaaa tcattgacca agcctatgtg gctaatactc gtacagatgg tacagactat  2460
caaggtaaat acggtggagc cttccttgat gagcttaaag ctaagtaccc atctattttc  2520
aaccgtgtgc aaatctcaaa tggaaaacag ttgcctacga atgaaaagat tactaaatgg  2580
tctgctaagt acttcaacgg aactaatatc cttggacgag gtatcaacta tgtccttcgt  2640
gatgacaaga ctaaccagta ctttaatact tcagccaaca gccaactctt gccaacacca  2700
cttcgcgata caggtgccat cacataa                                        2727

SEQ ID NO: 136          moltype = AA  length = 908
FEATURE                 Location/Qualifiers
REGION                  1..908
                        note = T1 C-terminal truncation of GTF0974
source                  1..908
                        mol_type = protein
                        organism = synthetic construct
SEQUENCE: 136
INGKQYYVNS DGSVRKNFVF EQDGKSYYFD AETGALATKS QDEFSTEPIK ATVDFSSGNQ  60
LYKNDDKSLD QLDTFITADA WYRPKSILKD GKTWTASTEA DKRPLLMVWW PDKSTQVNYL  120
NYMQNQGLGA GSFSTNSSQE SLDQAAKAVQ TKIEERIARE GNTNWLRTSI DQFIKTQPGW  180
NSSTENSSYD HLQGGQLLFN NSKGDTGNRT SHANSDYRLL NRTPTNQTGT RKYFKDNSIG  240
GLEFLLANDI DNSNPAVQAE QLNWLHFMMN IGSIMANDPT ANFDGLRVDA LDNVDADLLQ  300
IASDYFKAAY GVDKSEANAI KHLSYLEAWS ANDPYYNKDT KGAQLPIDNA LRNALTNLLM  360
RDKNTRMQLG DMTAFINSSL NPRGANDKNG ERMANYIFTR AHDTEAQTII QRIIRDRINP  420
NLFGYNFTRD EIKKAFEIYN EDIDKAHKTY ASYNLPSVYA LMLTNKDSVT RVYYGDLYRE  480
DGHYMAKKTP YFDAIDTLLR ARIKYVAGGQ DMEVKKVGND GLLTSVRYGK GANNRTDLGT  540
SETRTQGMGV IMTNNYDFRL GSNETVTMNM GRAHRNQLYR PLLLTTKDGI ATYLNDSDVP  600
KKLLKRTDWN GNLTFNANDV FGVENVQVSG YLGVWVPYGA KANQDARTQP SNRANSDGQV  660
YKSSAALDSQ VMYEAFSNFQ AFADDQPELY MNRVLAKNTD LLKAWGITSV GLPPQYVSSK  720
DGTFLDSTID NGYAFDDRYD MALSQNNKYG SLEDLLNVLR ALHKDGIQAI ADWVPDQIYN  780
LPGKEVVNAT RVNGYGNHQV GYQIIDQAYV ANTRTDGTDY QGKYGGAFLD ELKAKYPSIF  840
NRVQISNGKQ LPTNEKITKW SAKYFNGTNI LGRGINYVLR DDKTNQYFNT SANSQLLPTP  900
LRDTGAIT                                                             908

SEQ ID NO: 137          moltype = DNA  length = 2847
FEATURE                 Location/Qualifiers
misc_feature            1..2847
                        note = T2 C-terminal truncation of GTF0974
source                  1..2847
                        mol_type = other DNA
                        organism = synthetic construct
SEQUENCE: 137
attaacggca aacaatacta tgtcaatagt gacggtagtg tacgtaaaaa cttcgttttt  60
gagcaagatg gtaagtctta ttactttgat gctgaaacag gggcacttgc gactaagtct  120
caggatgaat tttcaacaga acctatcaag gcaaccgtag atttttcatc tggaaaccag  180
ctctacaaaa acgatgacaa gtctttggac caactcgaca ccttcatcac agcggatgct  240
tggtaccgtc caaagagcat tctcaaggat ggtaagactt ggacagcttc aactgaagcg  300
gacaaacgtc ctctattgat ggtttggtgg cctgacaagt ctactcaggt caactacctt  360
aactacatgc aaaatcaagg tcttggagca gggtcatttt caaccaactc tagtcaggaa  420
agtctggacc aagctgctaa agcggttcag actaagattg aagaacgtat cgcgcgtgag  480
ggcaatacca actggttacg tacaagtatc gaccagttca tcaagactca gccaggttgg  540
aatagtagca ctgaaaatag ttcatacgac cacttgcaag gcggacagtt gctctttaac  600
aacagtaagg gtgatactgg caaccgtacc agccacgcca actctgacta tcgtttgctt  660
aaccgcacac cgacaaacca aacgggtaca cgtaagtact tcaaggacaa ttctatcggt  720
ggtcttgagt tcttgcttgc caacgatatt gataactcaa acccagctgt tcaggcagaa  780
caacttaact ggctccactt tatgatgaat atcggaagta tcatggcaaa tgacccaact  840
gccaactttg acggtttgcg tgtcgacgcc ttggacaatg tggatgccga ccttctccaa  900
atcgcttcag attactttaa agcagcctat ggggttgaca agtctgaagc caatgctatt  960
aagcacttgt catatttgga agcatggtct gccaacgacc catactacaa caaggacact  1020
aagggagcac aacttccgat tgataatgcc cttcgtaacg cccttaccaa cctcttgatg  1080
cgtgataaaa atacacgtat gcagcttggg gacatgactg ccttcatcaa tagtagtttg  1140
aatccacgtg gtgccaacga taaaaacggt gaacgtatgg ctaactatat tttcactcgt  1200
gcccatgata cagaagctca aacgattatt caacgtatca tccgtgatcg tattaaccca  1260
aatttatttg gttacaattt cactcgtgat gaaatcaaga aagccttcga gatttacaat  1320
gaggatattg ataaggctca caagacttat gcgtcataca acttaccatc tgtctatgcc  1380
ctcatgttga ccaacaagga ctctgtaaca cgtgtttatt acggagacct ctatcgtgaa  1440
gatggtcact acatggctaa aaagacaccg tactttgatg ccatcgacac cctcttgcgt  1500
gctcgcatca agtatgtagc tggtggtcaa gacatggaag tgaagaaagt cggaaatgat  1560
ggactcttga catctgttcg ttatggtaaa ggtgccaata acagaactga tttgggaact  1620
tctgaaaccc gtacgcaagg gatgggtgtc atcatgacca acaactatga tttccgcttg  1680
ggtagcaatg aaaccgtaac gatgaacatg ggtagagctc accgtaatca gctttatcgc  1740
ccattgcttt tgacgacaaa ggatggtata gcaacctacc tcaacgattc tgatgtgcct  1800
aaaaaacttc tgaaacgtac tgactggaat gggaacttga ccttcaatgc caacgatgtt  1860
ttcggtgtag aaaatgtcca agtctcaggt tacctcggtg tctgggtacc atacggagct  1920
aaggctaatc aagatgcacg tacacagcca agtaatcgtg ccaatagcga cggtcaagtt  1980
tacaagtctt cagcagccct tgattcgcaa gtcatgtatg aagccttctc aaacttccaa  2040
gcctttgcgg acgatcaacc tgaactttac atgaaccgtg tcttggctaa gaacactgac  2100
ttgctcaaag catgggggat cacgtcagtc ggacttccac cacagtacgt ttcaagtaag  2160
```

```
gatggcacct tccttgactc aacaattgat aatggttatg cctttgatga ccgttacgat  2220
atggccttga gtcaaaataa taaatacgga tcacttgagg acctccttaa cgttcttcgt  2280
gctctccaca aagacggtat tcaagccatt gctgactggg tgccagacca aatctataac  2340
ctcccaggaa aagaagtggt aaatgcgaca cgtgttaatg gttatggtaa ccaccaagta  2400
ggctaccaaa tcattgacca agcctatgtg gctaatactc gtacagatgg tacagactat  2460
caaggtaaat acggtggagc cttccttgat gagcttaaag ctaagtaccc atctattttc  2520
aaccgtgtgc aaatctcaaa tggaaaacag ttgcctacga atgaaaagat tactaaatgg  2580
tctgctaagt acttcaacgg aactaatatc cttggacgag gtatcaacta tgtccttcgt  2640
gatgacaaga ctaaccagta ctttaatact tcagccaaca gccaactctt gccaacacca  2700
cttcgcgata caggtgccat cacaagcact caagtcttcc aacgtcgtgg acaagatgtt  2760
tatttcctac gtgataacca agctgttaag aatgaatttg ttcaagacgg aaacggtaac  2820
tggtattact tcggtggtga cggttaa                                      2847

SEQ ID NO: 138          moltype = AA  length = 948
FEATURE                 Location/Qualifiers
REGION                  1..948
                        note = T2 C-terminal truncation of GTF0974
source                  1..948
                        mol_type = protein
                        organism = synthetic construct
SEQUENCE: 138
INGKQYYVNS DGSVRKNFVF EQDGKSYYFD AETGALATKS QDEFSTEPIK ATVDFSSGNQ  60
LYKNDDKSLD QLDTFITADA WYRPKSILKD GKTWTASTEA DKRPLLMVWW PDKSTQVNYL  120
NYMQNQGLGA GSFSTNSSQE SLDQAAKAVQ TKIEERIARE GNTNWLRTSI DQFIKTQPGW  180
NSSTENSSYD HLQGGQLLFN NSKGDTGNRT SHANSDYRLL NRTPTNQTGT RKYFKDNSIG  240
GLEFLLANDI DNSNPAVQAE QLNWLHFMMN IGSIMANDPT ANFDGLRVDA LDNVDADLLQ  300
IASDYFKAAY GVDKSEANAI KHLSYLEAWS ANDPYYNKDT KGAQLPIDNA LRNALTNLLM  360
RDKNTRMQLG DMTAFINSSL NPRGANDKNG ERMANYIFTR AHDTEAQTII QRIIRDRINP  420
NLFGYNFTRD EIKKAFEIYN EDIDKAHKTY ASYNLPSVYA LMLTNKDSVT RVYYGDLYRE  480
DGHYMAKKTP YFDAIDTLLR ARIKYVAGGQ DMEVKKVGND GLLTSVRYGK GANNRTDLGT  540
SETRTQGMGV IMTNNYDFRL GSNETVTMNM GRAHRNQLYR PLLLTTKDGI ATYLNDSDVP  600
KKLLKRTDWN GNLTFNANDV FGVENVQVSG YLGVWVPYGA KANQDARTQP SNRANSDGQV  660
YKSSAALDSQ VMYEAFSNFQ AFADDQPELY MNRVLAKNTD LLKAWGITSV GLPPQYVSSK  720
DGTFLDSTID NGYAFDDRYD MALSQNNKYG SLEDLLNVLR ALHKDGIQAI ADWVPDQIYN  780
LPGKEVVNAT RVNGYGNHQV GYQIIDQAYV ANTRTDGTDY QGKYGGAFLD ELKAKYPSIF  840
NRVQISNGKQ LPTNEKITKW SAKYFNGTNI LGRGINYVLR DDKTNQYFNT SANSQLLPTP  900
LRDTGAITST QVFQRRGQDV YFLRDNQAVK NEFVQDGNGN WYYFGGDG                948

SEQ ID NO: 139          moltype = DNA  length = 3045
FEATURE                 Location/Qualifiers
misc_feature            1..3045
                        note = T6 C-terminal truncation of GTF0974
source                  1..3045
                        mol_type = other DNA
                        organism = synthetic construct
SEQUENCE: 139
attaacggca aacaatacta tgtcaatagt gacggtagtg tacgtaaaaa cttcgttttt  60
gagcaagatg gtaagtctta ttactttgat gctgaaacag ggcacttgc gactaagtct  120
caggatgaat tttcaacaga acctatcaag gcaaccgtag atttttcatc tggaaaccag  180
ctctacaaaa acgatgacaa gtctttggac caactcgaca ccttcatcac agcggatgct  240
tggtaccgtc caaagagcat tctcaaggat ggtaagactt ggacagcttc aactgaagcg  300
gacaaacgtc ctctattgat ggtttggtgg cctgacaagt ctactcaggt caactacctt  360
aactacatgc aaaatcaagg tcttggagca gggtcatttt caaccaactc tagtcaggaa  420
agtctggacc aagctgctaa agcggttcag actaagattg aagaacgtat cgcgcgtgag  480
ggcaatacca actggttacg tacaagtatc gaccagttca tcaagactca gccaggttgg  540
aatagtagca ctgaaaatag ttcatacgac cacttgcaag gcggacagtt gctctttaac  600
aacagtaagg gtgatactgg caaccgtacc agccacgcca actctgacta tcgtttgctt  660
aaccgcacac cgacaaacca aacgggtaca cgtaagtact tcaaggacaa ttctatcggt  720
ggtcttgagt tcttgcttgc caacgatatt gataactcaa acccagctgt tcaggcagaa  780
caacttaact ggctccactt tatgatgaat atcggaagta tcatggcaaa tgacccaact  840
gccaactttg acggtttgcg tgtcgacgcc ttggacaatg tggatgccga ccttctccaa  900
atcgcttcag attactttaa agcagcctat ggggttgaca agtctgaagc caatgctatt  960
aagcacttgt catatttgga agcatggtct gccaacgacc catactacaa caaggacact  1020
aagggagcac aacttccgat tgataatgcc cttcgtaacg cccttaccaa cctcttgatg  1080
cgtgataaaa atacacgtat gcagcttggg gacatgactg ccttcatcaa tagtagtttg  1140
aatccacgtg gtgccaacga taaaaacggt gaacgtatgg ctaactatat tttcactcgt  1200
gcccatgata cagaagctca aacgattatt caacgtatca tccgtgatcg tattaaccca  1260
aatttatttg gttacaattt cactcgtgat gaaatcaaga aagccttcga gatttacaat  1320
gaggatattg ataaggctca caagacttat gcgtcataca acttaccatc tgtctatgcc  1380
ctcatgttga ccaacaagga ctctgtaaca cgtgtttatt acggagacct ctatcgtgaa  1440
gatggtcact acatggctaa aaagacaccg tactttgatg ccatcgacac cctcttgcgt  1500
gctcgcatca agtatgtagc tggtggtcaa gacatggaag tgaagaaagt cggaaatgat  1560
ggactcttga catctgttcg ttatggtaaa ggtgccaata acagaactga tttgggaact  1620
tctgaaaccc gtacgcaagg gatgggtgtc atcatgacca acaactatga tttccgcttg  1680
ggtagcaatg aaaccgtaac gatgaacatg ggtagagctc accgtaatca gctttatcgc  1740
ccattgcttt tgacgacaaa ggatggtata gcaacctacc tcaacgattc tgatgtgcct  1800
aaaaaacttc tgaaacgtac tgactggaat gggaacttga ccttcaatgc caacgatgtt  1860
ttcggtgtag aaaatgtcca agtctcaggt tacctcggtg tctgggtacc atacggagct  1920
aaggctaatc aagatgcacg tacacagcca agtaatcgtg ccaatagcga cggtcaagtt  1980
```

```
tacaagtctt cagcagccct tgattcgcaa gtcatgtatg aagccttctc aaacttccaa  2040
gcctttgcgg acgatcaacc tgaactttac atgaaccgtg tcttggctaa gaacactgac  2100
ttgctcaaag catgggggat cacgtcagtc ggacttccac cacagtacgt ttcaagtaag  2160
gatggcacct tccttgactc aacaattgat aatggttatg cctttgatga ccgttacgat  2220
atggccttga gtcaaaataa taaatacgga tcacttgagg acctccttaa cgttcttcgt  2280
gctctccaca aagacggtat tcaagccatt gctgactggg tgccagacca aatctataac  2340
ctcccaggaa aagaagtggt aaatgcgaca cgtgttaatg gttatggtaa ccaccaagta  2400
ggctaccaaa tcattgacca agcctatgtg gctaatactc gtacagatgg tacagactat  2460
caaggtaaat acggtggagc cttccttgat gagcttaaag ctaagtaccc atctattttc  2520
aaccgtgtgc aaatctcaaa tggaaaacag ttgcctacga atgaaaagat tactaaatgg  2580
tctgctaagt acttcaacgg aactaatatc cttggacgag gtatcaacta tgtccttcgt  2640
gatgacaaga ctaaccagta ctttaatact tcagccaaca gccaactctt gccaacacca  2700
cttcgcgata caggtgccat cacaagcact caagtcttcc aacgtcgtgg acaagatgtt  2760
tatttcctac gtgataacca agctgttaag aatgaatttg ttcaagacgg aaacggtaac  2820
tggtattact tcggtggtga cggtaagatg accaagggtg cccaaaacat caataacaag  2880
gattactatt tctttgacaa tggtatccaa ttgcgtaacg cccttcgtcg tgcttcaaac  2940
ggctatacct actattacgg tctggacggt gccatggtta agaatgcctt cgttgatttt  3000
gatgacaaac ataagcaggt tcgtgccttt acgactcaag gataa                   3045

SEQ ID NO: 140         moltype = AA  length = 1014
FEATURE                Location/Qualifiers
REGION                 1..1014
                       note = T6 C-terminal truncation of GTF0974
source                 1..1014
                       mol_type = protein
                       organism = synthetic construct
SEQUENCE: 140
INGKQYYVNS DGSVRKNFVF EQDGKSYYFD AETGALATKS QDEFSTEPIK ATVDFSSGNQ  60
LYKNDDKSLD QLDTFITADA WYRPKSILKD GKTWTASTEA DKRPLLMVWW PDKSTQVNYL  120
NYMQNQGLGA GSFSTNSSQE SLDQAAKAVQ TKIEERIARE GNTNWLRTSI DQFIKTQPGW  180
NSSTENSSYD HLQGGQLLFN NSKGDTGNRT SHANSDYRLL NRTPTNQTGT RKYFKDNSIG  240
GLEFLLANDI DNSNPAVQAE QLNWLHFMMN IGSIMANDPT ANFDGLRVDA LDNVDADLLQ  300
IASDYFKAAY GVDKSEANAI KHLSYLEAWS ANDPYYNKDT KGAQLPIDNA LRNALTNLLM  360
RDKNTRMQLG DMTAFINSSL NPRGANDKNG ERMANYIFTR AHDTEAQTII QRIIRDRINP  420
NLFGYNFTRD EIKKAFEIYN EDIDKAHKTY ASYNLPSVYA LMLTNKDSVT RVYYGDLYRE  480
DGHYMAKKTP YFDAIDTLLR ARIKYVAGGQ DMEVKKVGND GLLTSVRYGK GANNRTDLGT  540
SETRTQGMGV IMTNNYDFRL GSNETVTMNM GRAHRNQLYR PLLLTTKDGI ATYLNDSDVP  600
KKLLKRTDWN GNLTFNANDV FGVENVQVSG YLGVWVPYGA KANQDARTQP SNRANSDGQV  660
YKSSAALDSQ VMYEAFSNFQ AFADDQPELY MNRVLAKNTD LLKAWGITSV GLPPQYVSSK  720
DGTFLDSTID NGYAFDDRYD MALSQNNKYG SLEDLLNVLR ALHKDGIQAI ADWVPDQIYN  780
LPGKEVVNAT RVNGYGNHQV GYQIIDQAYV ANTRTDGTDY QGKYGGAFLD ELKAKYPSIF  840
NRVQISNGKQ LPTNEKITKW SAKYFNGTNI LGRGINYVLR DDKTNQYFNT SANSQLLPTP  900
LRDTGAITST QVFQRRGQDV YFLRDNQAVK NEFVQDGNGN WYYFGGDGKM TKGAQNINNK  960
DYYFFDNGIQ LRNALRRASN GYTYYYGLDG AMVKNAFVDF DDKHKQVRAF TTQG        1014

SEQ ID NO: 141         moltype = DNA  length = 2727
FEATURE                Location/Qualifiers
misc_feature           1..2727
                       note = T1 C-terminal truncation of GTF4336
source                 1..2727
                       mol_type = other DNA
                       organism = synthetic construct
SEQUENCE: 141
attaacggca aacaatacta tgtcaatagt gacggtagtg tgcgtaagaa ctttgtcttt  60
gagcaagatg gtaagtctta ttactttgat gctgaaacag ggctcttgc gactaagtca  120
caggatgaat tttcaacaga accaatcaag gcaaccgtcg atttttcatc tggaaaccag  180
ctctacaaaa acgatgataa atcgttggac cagctcgata ccttcatcac agcggatgct  240
tggtaccgtc caaagagcat tctcaaggat ggtaagactt ggacggcttc aactgaggct  300
gacaaacgtc cactcttgat ggtttggtgg cctgacaagt caactcaggt taactacctt  360
aactacatgc aaaatcaagg tcttggtgca ggctcatttt caaccaactc tagccaggaa  420
agtctggacc aagctgctaa agcggttcag actaagattg aagaacgtat cgctcgtgaa  480
ggcaacacaa actggttgcg tacaagtatc gaccagttca tcaagactca gccaggttgg  540
aatagtagca ctgaaaatag ttcatacgac cacttgcaag gcggacagtt gctctttaac  600
aacagtaagg gtgatactgg caaccgtacc agccacgcca actctgacta tcgtttgctt  660
aaccgcacac cgactaacca gacgggtaca cgtaagtact tcaaggacaa ttctatcggt  720
ggtcttgagt tcttgcttgc caacgatatt gataactcaa acccagctgt tcaggcagag  780
caacttaact ggctccactt tatgatgaat attggaagca tcatggcaaa tgacccaaca  840
gctaactttg acggtttgcg tgtcgatgcc ttggacaatg tggatgctga ccttctccaa  900
atcgcatcag actacttcaa agcagcctat ggtgttgaca agtctgaagc caatgccatt  960
aagcacttgt catacttgga agcatggtct gccaacgacc catactacaa taaggacact  1020
aagggggcac aacttccgat tgacaatgcc ctccgtaatg cccttaccaa cctcttgatg  1080
cgtgataaga atacacgtat gcagcttggg gacatgactg ccttcatcaa cagtagtttg  1140
aatccacgtg gtgccaacga taaaaacggt gaacgtatgg caaactatat tttcacccgt  1200
gctcacgata cggaagctca aacgattatt caacgtatca tccgtgatcg tatcaaccca  1260
aatttgtttg gttacaattt cactcgtgat gaaatcaaga aagccttcga gatttacaat  1320
gaggatattg ataaggctca caagacttat gcgtcataca acttaccatc tgtttatgct  1380
ctcatgttga ccaacaagga ctctgtaaca cgagtttatt acggagacct ctaccgtgaa  1440
gatggtcact acatggctaa aaagacaccg tactttgatg ccattgacac cctcttgcgt  1500
gctcgtatca agtatgtagc tggtggtcaa gacatggaag tgaagaaagt cggaaatgac  1560
```

-continued

```
ggcctcttga catctgttcg ttatggtaaa ggtgccaata acagaacaga tttgggaact  1620
tcagaaactc gtacgcaagg tatgggtgtc atcatgacca acaactatga tttccgcttg  1680
ggtagcaatg aaactgtaac gatgaacatg ggtagagcac accgtaatca gctttatcgc  1740
ccattgcttt tgacgacaaa ggatggtata gcaacctact tcaacgattc tgatgtgcct  1800
aaaaaccttc tgaaacgtac tgactggaat gggaacttga ccttcaatgc caatgatgtt  1860
tttggtgtgg aaaatgtcca agtatcaggt taccttggtg tctgggtacc agtcggggct  1920
aaggctaacc aagacgcacg tacacagcca agtaaccgtg ccaatagcga tggtcaagtt  1980
tacaagtctt cagcagccct tgattcgcaa gtcatgtatg aagccttctc aaacttccaa  2040
gcatttgcgg acgatcagcc agaactctac atgaaccgtg tcttggctaa gaacactgac  2100
ttgctcaaag catggggtgt tacgtctgtt ggacttccac cacagtacgt ttcaagtaag  2160
gatggtacct tccttgattc aacaattgac aatggttatg cctttgatga ccgttatgac  2220
atggccttga gtcaaaataa caagtatggc tcacttgagg acctccttaa tgttcttcgt  2280
gccctccaca aagatggtat tcaagccatt gctgactggg tgccagacca aatttataac  2340
cttccaggaa aagaagtagt taatgccaca cgtgttaacg gctacggtta tcaccaacaa  2400
ggttatcaaa ttgtggacca agcctatgtg gcaaataccc gtacagatgg tacagactat  2460
caaggtaaat acggtggagc cttccttgat gagcttaaag ctaagtaccc atctattttc  2520
aaccgtgtgc aaatctcaaa tggtaagcag ttacctacga atgaaaagat tactaaatgg  2580
tctgctaagt acttcaacgg aactaatatc cttggacgag gtatcaacta tgtccttcgt  2640
gatgacaaga ccaaccagta ctttaatacc tcagctaaca gccaactctt gccaacacca  2700
cttcgtgaca caggtgccat tacataa                                    2727

SEQ ID NO: 142          moltype = AA  length = 908
FEATURE                 Location/Qualifiers
REGION                  1..908
                        note = T1 C-terminal truncation of GTF4336
source                  1..908
                        mol_type = protein
                        organism = synthetic construct
SEQUENCE: 142
INGKQYYVNS DGSVRKNFVF EQDGKSYYFD AETGALATKS QDEFSTEPIK ATVDFSSGNQ  60
LYKNDDKSLD QLDTFITADA WYRPKSILKD GKTWTASTEA DKRPLLMVWW PDKSTQVNYL  120
NYMQNQGLGA GSFSTNSSQE SLDQAAKAVQ TKIEERIARE GNTNWLRTSI DQFIKTQPGW  180
NSSTENSSYD HLQGGQLLFN NSKGDTGNRT SHANSDYRLL NRTPTNQTGT RKYFKDNSIG  240
GLEFLLANDI DNSNPAVQAE QLNWLHFMMN IGSIMANDPT ANFDGLRVDA LDNVDADLLQ  300
IASDYFKAAY GVDKSEANAI KHLSYLEAWS ANDPYYNKDT KGAQLPIDNA LRNALTNLLM  360
RDKNTRMQLG DMTAFINSSL NPRGANDKNG ERMANYIFTR AHDTEAQTII QRIIRDRINP  420
NLFGYNFTRD EIKKAFEIYN EDIDKAHKTY ASYNLPSVYA LMLTNKDSVT RVYYGDLYRE  480
DGHYMAKKTP YFDAIDTLLR ARIKYVAGGQ DMEVKKVGND GLLTSVRYGK GANNRTDLGT  540
SETRTQGMGV IMTNNYDFRL GSNETVTMNM GRAHRNQLYR PLLLTTKDGI ATYFNDSDVP  600
KNLLKRTDWN GNLTFNANDV FGVENVQVSG YLGVWVPVGA KANQDARTQP SNRANSDGQV  660
YKSSAALDSQ VMYEAFSNFQ AFADDQPELY MNRVLAKNTD LLKAWGVTSV GLPPQYVSSK  720
DGTFLDSTID NGYAFDDRYD MALSQNNKYG SLEDLLNVLR ALHKDGIQAI ADWVPDQIYN  780
LPGKEVVNAT RVNGYGYHQQ GYQIVDQAYV ANTRTDGTDY QGKYGGAFLD ELKAKYPSIF  840
NRVQISNGKQ LPTNEKITKW SAKYFNGTNI LGRGINYVLR DDKTNQYFNT SANSQLLPTP  900
LRDTGAIT                                                        908

SEQ ID NO: 143          moltype = DNA  length = 2847
FEATURE                 Location/Qualifiers
misc_feature            1..2847
                        note = T2 C-terminal truncation of GTF4336
source                  1..2847
                        mol_type = other DNA
                        organism = synthetic construct
SEQUENCE: 143
attaacggca aacaatacta tgtcaatagt gacggtagtg tgcgtaagaa ctttgtcttt  60
gagcaagatg gtaagtctta ttactttgat gctgaaacag ggctcttgc gactaagtca  120
caggatgaat tttcaacaga accaatcaag gcaaccgtcg atttttcatc tggaaaccag  180
ctctacaaaa acgatgataa atcgttggac cagctcgata ccttcatcac agcggatgct  240
tggtaccgtc caaagagcat tctcaaggat ggtaagactt ggacggcttc aactgaggct  300
gacaaacgtc cactcttgat ggtttggtgg cctgacaagt caactcaggt taactacctt  360
aactacatgc aaaatcaagg tcttggtgca ggctcatttt caaccaactc tagccaggaa  420
agtctggacc aagctgctaa agcggttcag actaagattg aagaacgtat cgctcgtgaa  480
ggcaacacaa actggttgcg tacaagtatc gaccagttca tcaagactca gccaggttgg  540
aatagtagca ctgaaaatag ttcatacgac cacttgcaag gcggacagtt gctctttaac  600
aacagtaagg gtgatactgg caaccgtacc agccacgcca actctgacta tcgtttgctt  660
aaccgcacac cgactaacca gacgggtaca cgtaagtact tcaaggacaa ttctatcggt  720
ggtcttgagt tcttgcttgc caacgatatt gataactcaa acccagctgt tcaggcagag  780
caacttaact ggctccactt tatgatgaat attggaagca tcatggcaaa tgacccaaca  840
gctaactttg acggtttgcg tgtcgatgcc ttggacaatg tggatgctga ccttctccaa  900
atcgcatcag actacttcaa agcagcctat ggtgttgaca agtctgaagc caatgccatt  960
aagcacttgt catacttgga agcatggtct gccaacgacc catactacaa taaggacact  1020
aagggggcac aacttccgat tgacaatgcc ctccgtaatg cccttaccaa cctcttgatg  1080
cgtgataaga atacacgtat gcagcttggg gacatgactg ccttcatcaa cagtagtttg  1140
aatccacgtg gtgccaacga taaaaacggt gaacgtatgg caaactatat tttcacccgt  1200
gctcacgata cggaagctca aacgattatt caacgtatca tccgtgatcg tatcaaccca  1260
aatttgtttg gttacaattt cactcgtgat gaaatcaaga aagccttcga gatttacaat  1320
gaggatattg ataaggctca caagacttat gcgtcataca acttaccatc tgtttatgct  1380
ctcatgttga ccaacaagga ctctgtaaca cgagtttatt acggagacct ctaccgtgaa  1440
gatggtcact acatggctaa aaagacaccg tactttgatg ccattgacac cctcttgcgt  1500
```

```
gctcgtatca agtatgtagc tggtggtcaa gacatggaag tgaagaaagt cggaaatgac  1560
ggcctcttga catctgttcg ttatggtaaa ggtgccaata acagaacaga tttgggaact  1620
tcagaaactc gtacgcaagg tatgggtgtc atcatgacca acaactatga tttccgcttg  1680
ggtagcaatg aaactgtaac gatgaacatg ggtagagcac accgtaatca gctttatcgc  1740
ccattgcttt tgacgacaaa ggatggtata gcaacctact tcaacgattc tgatgtgcct  1800
aaaaaccttc tgaaacgtac tgactggaat gggaacttga ccttcaatgc caatgatgtt  1860
tttggtgtgg aaaatgtcca agtatcaggt taccttggtg tctgggtacc agtcggggct  1920
aaggctaacc aagacgcacg tacacagcca agtaaccgtg ccaatagcga tggtcaagtt  1980
tacaagtctt cagcagccct tgattcgcaa gtcatgtatg aagccttctc aaacttccaa  2040
gcatttgcgg acgatcagcc agaactctac atgaaccgtg tcttggctaa gaacactgac  2100
ttgctcaaag catggggtgt tacgtctgtt ggacttccac cacagtacgt ttcaagtaag  2160
gatggtacct tccttgattc aacaattgac aatggttatg cctttgatga ccgttatgac  2220
atggccttga gtcaaaataa caagtatggc tcacttgagg acctccttaa tgttcttcgt  2280
gccctccaca aagatggtat tcaagccatt gctgactggg tgccagacca aatttataac  2340
cttccaggaa aagaagtagt taatgccaca cgtgttaacg gctacggtta tcaccaacaa  2400
ggttatcaaa ttgtggacca agcctatgtg gcaaataccc gtacagatgg tacagactat  2460
caaggtaaat acggtggagc cttccttgat gagcttaaag ctaagtaccc atctattttc  2520
aaccgtgtgc aaatctcaaa tggtaagcag ttacctacga atgaaaagat tactaaatgg  2580
tctgctaagt acttcaacgg aactaatatc cttggacgag gtatcaacta tgtccttcgt  2640
gatgacaaga ccaaccagta ctttaatacc tcagctaaca gccaactctt gccaacacca  2700
cttcgtgaca caggtgccat tacaagcact caagtcttcc aacgtcgtgg acaagatgtt  2760
tacttccttc gtgataacca agccgttaag aatgaatttg ttcaagacgg taacggcaac  2820
tggtattact tcggtgctga cggttaa                                       2847

SEQ ID NO: 144          moltype = AA  length = 948
FEATURE                 Location/Qualifiers
REGION                  1..948
                        note = T2 C-terminal truncation of GTF4336
source                  1..948
                        mol_type = protein
                        organism = synthetic construct
SEQUENCE: 144
INGKQYYVNS DGSVRKNFVF EQDGKSYYFD AETGALATKS QDEFSTEPIK ATVDFSSGNQ  60
LYKNDDKSLD QLDTFITADA WYRPKSILKD GKTWTASTEA DKRPLLMVWW PDKSTQVNYL  120
NYMQNQGLGA GSFSTNSSQE SLDQAAKAVQ TKIEERIARE GNTNWLRTSI DQFIKTQPGW  180
NSSTENSSYD HLQGGQLLFN NSKGDTGNRT SHANSDYRLL NRTPTNQTGT RKYFKDNSIG  240
GLEFLLANDI DNSNPAVQAE QLNWLHFMMN IGSIMANDPT ANFDGLRVDA LDNVDADLLQ  300
IASDYFKAAY GVDKSEANAI KHLSYLEAWS ANDPYYNKDT KGAQLPIDNA LRNALTNLLM  360
RDKNTRMQLG DMTAFINSSL NPRGANDKNG ERMANYIFTR AHDTEAQTII QRIIRDRINP  420
NLFGYNFTRD EIKKAFEIYN EDIDKAHKTY ASYNLPSVYA LMLTNKDSVT RVYYGDLYRE  480
DGHYMAKKTP YFDAIDTLLR ARIKYVAGGQ DMEVKKVGND GLLTSVRYGK GANNRTDLGT  540
SETRTQGMGV IMTNNYDFRL GSNETVTMNM GRAHRNQLYR PLLLTTKDGI ATYFNDSDVP  600
KNLLKRTDWN GNLTFNANDV FGVENVQVSG YLGVWVPVGA KANQDARTQP SNRANSDGQV  660
YKSSAALDSQ VMYEAFSNFQ AFADDQPELY MNRVLAKNTD LLKAWGVTSV GLPPQYVSSK  720
DGTFLDSTID NGYAFDDRYD MALSQNNKYG SLEDLLNVLR ALHKDGIQAI ADWVPDQIYN  780
LPGKEVVNAT RVNGYGYHQQ GYQIVDQAYV ANTRTDGTDY QGKYGGAFLD ELKAKYPSIF  840
NRVQISNGKQ LPTNEKITKW SAKYFNGTNI LGRGINYVLR DDKTNQYFNT SANSQLLPTP  900
LRDTGAITST QVFQRRGQDV YFLRDNQAVK NEFVQDGNGN WYYFGADG                948

SEQ ID NO: 145          moltype = DNA  length = 3045
FEATURE                 Location/Qualifiers
misc_feature            1..3045
                        note = T6 C-terminal truncation of GTF4336
source                  1..3045
                        mol_type = other DNA
                        organism = synthetic construct
SEQUENCE: 145
attaacggca aacaatacta tgtcaatagt gacggtagtg tgcgtaagaa ctttgtcttt  60
gagcaagatg gtaagtctta ttactttgat gctgaaacag gggctcttgc gactaagtca  120
caggatgaat tttcaacaga accaatcaag gcaaccgtcg atttttcatc tggaaaccag  180
ctctacaaaa acgatgataa atcgttggac cagctcgata ccttcatcac agcggatgct  240
tggtaccgtc caaagagcat tctcaaggat ggtaagactt ggacggcttc aactgaggct  300
gacaaacgtc cactcttgat ggtttggtgg cctgacaagt caactcaggt taactacctt  360
aactacatgc aaaatcaagg tcttggtgca ggctcatttt caaccaactc tagccaggaa  420
agtctggacc aagctgctaa agcggttcag actaagattg aagaacgtat cgctcgtgaa  480
ggcaacacaa actggttgcg tacaagtatc gaccagttca tcaagactca gccaggttgg  540
aatagtagca ctgaaaatag ttcatacgac cacttgcaag gcggacagtt gctctttaac  600
aacagtaagg gtgatactgg caaccgtacc agccacgcca actctgacta tcgtttgctt  660
aaccgcacac cgactaacca gacgggtaca cgtaagtact tcaaggacaa ttctatcggt  720
ggtcttgagt tcttgcttgc caacgatatt gataactcaa acccagctgt tcaggcagag  780
caacttaact ggctccactt tatgatgaat attggaagca tcatggcaaa tgacccaaca  840
gctaactttg acggtttgcg tgtcgatgcc ttggacaatg tggatgctga ccttctccaa  900
atcgcatcag actacttcaa agcagcctat ggtgttgaca agtctgaagc caatgccatt  960
aagcacttgt catacttgga agcatggtct gccaacgacc catactacaa taaggacact  1020
aaggggggcac aacttccgat tgacaatgcc ctccgtaatg cccttaccaa cctcttgatg  1080
cgtgataaga atacacgtat gcagcttggg gacatgactg ccttcatcaa cagtagtttg  1140
aatccacgtg gtgccaacga taaaaacggt gaacgtatgg caaactatat tttcacccgt  1200
gctcacgata cggaagctca aacgattatt caacgtatca tccgtgatcg tatcaaccca  1260
aatttgtttg gttacaattt cactcgtgat gaaatcaaga aagccttcga gatttacaat  1320
```

-continued

```
gaggatattg ataaggctca caagacttat gcgtcataca acttaccatc tgtttatgct  1380
ctcatgttga ccaacaagga ctctgtaaca cgagtttatt acggagacct ctaccgtgaa  1440
gatggtcact acatggctaa aaagacaccg tactttgatg ccattgacac cctcttgcgt  1500
gctcgtatca agtatgtagc tggtggtcaa gacatggaag tgaagaaagt cggaaatgac  1560
ggcctcttga catctgttcg ttatggtaaa ggtgccaata acagaacaga tttgggaact  1620
tcagaaactc gtacgcaagg tatgggtgtc atcatgacca acaactatga tttccgcttg  1680
ggtagcaatg aaactgtaac gatgaacatg ggtagagcac accgtaatca gctttatcgc  1740
ccattgcttt tgacgacaaa ggatggtata gcaacctact tcaacgattc tgatgtgcct  1800
aaaaaccttc tgaaacgtac tgactggaat gggaacttga ccttcaatgc caatgatgtt  1860
tttggtgtgg aaaatgtcca agtatcaggt taccttggtg tctgggtacc agtcggggct  1920
aaggctaacc aagacgcacg tacacagcca agtaaccgtg ccaatagcga tggtcaagtt  1980
tacaagtctt cagcagccct tgattcgcaa gtcatgtatg aagccttctc aaacttccaa  2040
gcatttgcgg acgatcagcc agaactctac atgaaccgtg tcttggctaa gaacactgac  2100
ttgctcaaag catggggtgt tacgtctgtt ggacttccac cacagtacgt ttcaagtaag  2160
gatggtacct tccttgattc aacaattgac aatggttatg cctttgatga ccgttatgac  2220
atggccttga gtcaaaataa caagtatggc tcacttgagg acctccttaa tgttcttcgt  2280
gccctccaca aagatggtat tcaagccatt gctgactggg tgccagacca aatttataac  2340
cttccaggaa aagaagtagt taatgccaca cgtgttaacg gctacggtta tcaccaacaa  2400
ggttatcaaa ttgtggacca agcctatgtg gcaaataccc gtacagatgg tacagactat  2460
caaggtaaat acggtggagc cttccttgat gagcttaaag ctaagtaccc atctattttc  2520
aaccgtgtgc aaatctcaaa tggtaagcag ttacctacga atgaaaagat tactaaatgg  2580
tctgctaagt acttcaacgg aactaatatc cttggacgag gtatcaacta tgtccttcgt  2640
gatgacaaga ccaaccagta ctttaatacc tcagctaaca gccaactctt gccaacacca  2700
cttcgtgaca caggtgccat tacaagcact caagtcttcc aacgtcgtgg acaagatgtt  2760
tacttccttc gtgataacca agccgttaag aatgaatttg ttcaagacgg taacggcaac  2820
tggtattact tcggtgctga cggtaagatg accaagggtg ctcaaaccat caataaaaag  2880
gattactatt tctttgacaa tggtatccaa ttgcgtaacg cccttcgtcg tgctaacaac  2940
ggttatactt actattacgg tttagacggt gctatggtta agaatgcctt tgttgatttt  3000
gacgacaagc gtaagcaggt gcgtgccttt acgacacaag gataa                 3045

SEQ ID NO: 146         moltype = AA  length = 1014
FEATURE                Location/Qualifiers
REGION                 1..1014
                       note = T6 C-terminal truncation of GTF4336
source                 1..1014
                       mol_type = protein
                       organism = synthetic construct
SEQUENCE: 146
INGKQYYVNS DGSVRKNFVF EQDGKSYYFD AETGALATKS QDEFSTEPIK ATVDFSSGNQ  60
LYKNDDKSLD QLDTFITADA WYRPKSILKD GKTWTASTEA DKRPLLMVWW PDKSTQVNYL  120
NYMQNQGLGA GSFSTNSSQE SLDQAAKAVQ TKIEERIARE GNTNWLRTSI DQFIKTQPGW  180
NSSTENSSYD HLQGGQLLFN NSKGDTGNRT SHANSDYRLL NRTPTNQTGT RKYFKDNSIG  240
GLEFLLANDI DNSNPAVQAE QLNWLHFMMN IGSIMANDPT ANFDGLRVDA LDNVDADLLQ  300
IASDYFKAAY GVDKSEANAI KHLSYLEAWS ANDPYYNKDT KGAQLPIDNA LRNALTNLLM  360
RDKNTRMQLG DMTAFINSSL NPRGANDKNG ERMANYIFTR AHDTEAQTII QRIIRDRINP  420
NLFGYNFTRD EIKKAFEIYN EDIDKAHKTY ASYNLPSVYA LMLTNKDSVT RVYYGDLYRE  480
DGHYMAKKTP YFDAIDTLLR ARIKYVAGGQ DMEVKKVGND GLLTSVRYGK GANNRTDLGT  540
SETRTQGMGV IMTNNYDFRL GSNETVTMNM GRAHRNQLYR PLLLTTKDGI ATYFNDSDVP  600
KNLLKRTDWN GNLTFNANDV FGVENVQVSG YLGVWVPVGA KANQDARTQP SNRANSDGQV  660
YKSSAALDSQ VMYEAFSNFQ AFADDQPELY MNRVLAKNTD LLKAWGVTSV GLPPQYVSSK  720
DGTFLDSTID NGYAFDDRYD MALSQNNKYG SLEDLLNVLR ALHKDGIQAI ADWVPDQIYN  780
LPGKEVVNAT RVNGYGYHQQ GYQIVDQAYV ANTRTDGTDY QGKYGGAFLD ELKAKYPSIF  840
NRVQISNGKQ LPTNEKITKW SAKYFNGTNI LGRGINYVLR DDKTNQYFNT SANSQLLPTP  900
LRDTGAITST QVFQRRGQDV YFLRDNQAVK NEFVQDGNGN WYYFGADGKM TKGAQTINKK  960
DYYFFDNGIQ LRNALRRANN GYTYYYGLDG AMVKNAFVDF DDKRKQVRAF TTQG        1014

SEQ ID NO: 147         moltype = DNA  length = 2727
FEATURE                Location/Qualifiers
misc_feature           1..2727
                       note = T1 C-terminal truncation of GTF4491
source                 1..2727
                       mol_type = other DNA
                       organism = synthetic construct
SEQUENCE: 147
atcaacggca aacaatacta tgtcaatagt gacggtagtg tgcgtaagaa ctttgttttt  60
gagcaagatg gtaagtctta ttactttgat gctgaaacag ggctcttgc gactaagtca  120
caggatgaat tttcaacaga acctatcaag gcaaccgtag atttttcatc tggtaaccag  180
ctctacaaaa acgatgacaa atctttggac caacttgaca ccttcatcac agcggatgct  240
tggtaccgtc caaagagcat tctcaaggat ggtaagactt ggacagcttc aactgaagct  300
gacaaacgtc ctctcttgat ggtttggtgg cctgacaagt ctactcaggt caactacctt  360
aactacatgc aaaatcaagg tcttggtgca gggtcatttt caaccaactc tagccaggaa  420
agtctggacc aagctgctaa agcggttcag actaagattg aagaacgtat cgcgcgtgag  480
ggcaatacca actggttgcg tacaagtatc gaccagttca tcaagacaca gccaggttgg  540
aatagtagca ctgaaaatag ttcatacgac cacttgcaag gcggacagtt gctctttaac  600
aacagtaagg gtgatactgg caaccgtacc agccacgcca actctgacta tcgtttgtta  660
aaccgcacac cgactaacca gacgggtaca cgtaagtact tcaaggataa ttctatcggt  720
ggtcttgagt tcttgcttgc caacgatatt gataactcaa acccagctgt tcaggcagag  780
caacttaact ggctccactt tatgatgaat atcggaagca tcatggctaa tgacccaact  840
gccaactttg acggtttgcg tgtcgatgcc ttggacaatg tggatgccga cctgctccaa  900
```

```
atcgcatcag actacttcaa agcagcctat ggtgttgaca agtctgaagc caatgccatc  960
aagcacttgt catacttgga agcatggtct gccaacgacc catactacaa caaggacact  1020
aagggagcac aacttccgat tgacaatgcc cttcgtaatg ccctcaccaa cctcttgatg  1080
cgtgataaaa atacacgtat gcagcttgga gacatgactg ctttcatcaa cagtagtttg  1140
aacccacgag gtgccaacga taaaaacggt gaacgtatgg caaactatat tttcacccgt  1200
gcccatgata cagaagctca aaccattatt caacgtatca ttcgtgatcg tattaaccca  1260
aatttgtttg gttataattt cacacgtgat gaaatcaaga aagccttcga gatttacaat  1320
gaggatattg ataaggctca caagacttat gcgtcataca acttgccatc tgtctatgcc  1380
ctcatgttga ccaataagga ctctgtaaca cgtgtttatt acggagacct ctaccgtgaa  1440
gatggtcact acatggctaa gaagacgcct tactttgatg ccatcgacac cctcttgcgt  1500
gcccgtatca agtatgtagc tggtggtcaa gacatggaag tgaagaaagt cggaaatgac  1560
ggcctcttga catcagttcg ttatggtaaa ggtgccaata acagaactga tttgggaact  1620
tctgaaactc gtacgcaagg tatgggtgtc atcatgacca acaactatga tttccgcttg  1680
ggtagcaatg aaactgtaac gatgaacatg ggtagagctc accgtaatca gctttatcga  1740
ccattgcttt tgacgacaaa ggatggtata gcaacctacc tcaacgattc tgatgtgcct  1800
aaaaaccttc tgaaacgtac tgactggaat gggaacttga ccttcaatgc caacgatgtt  1860
ttcggtgtag aaaatgtcca agtctcaggt tacctcggtg tctgggtacc atacggagct  1920
aaggctaatc aagatgcacg tacacagcca agtaatcgtg ccaatagcga cggtcaagtt  1980
tacaagtctt cagcagccct tgattcgcaa gtcatgtatg aagccttctc aaacttccaa  2040
gcctttgcgg acgatcaacc tgaactttac atgaaccgtg tcttggctaa gaacactgac  2100
ttgctcaaag catgggggat cacgtcagtc ggacttccac cacagtacgt ttcaagtaag  2160
gatggcacct tccttgactc aataattgat aatggttatg cctttgatga ccgttacgat  2220
atggccttga gtcaaaataa taaatacgga tcacttgagg acctccttaa cgttcttcgt  2280
gccctccata aagacggtat tcaagccatt gctgactggg taccagacca aatctataac  2340
ctcccaggaa aagaagtggt aaatgcgaca cgtgttaacg gctacggtta tcaccaacaa  2400
ggttatcaaa ttgtggacca agcctatgtg gcaaataccc gtacagatgg tacagactat  2460
caaggcaagt acggtggtgc cttccttgat gagctgaaag ctaagtaccc atctattttc  2520
aaccgtgtgc aaatctcaaa tggtaagcaa ttgcctacga atgaaaagat tacaaaatgg  2580
tctgctaagt acttcaacgg aaccaacatc cttggacgag gcatcaactt tgtccttcgt  2640
gatgacaaga ccaaccagta ctttaatact tcagctaaca gccaactctt gccaacacca  2700
cttcgtgata cgggtgccat cacataa                                      2727

SEQ ID NO: 148         moltype = AA  length = 908
FEATURE                Location/Qualifiers
REGION                 1..908
                       note = T1 C-terminal truncation of GTF4491
source                 1..908
                       mol_type = protein
                       organism = synthetic construct
SEQUENCE: 148
INGKQYYVNS DGSVRKNFVF EQDGKSYYFD AETGALATKS QDEFSTEPIK ATVDFSSGNQ  60
LYKNDDKSLD QLDTFITADA WYRPKSILKD GKTWTASTEA DKRPLLMVWW PDKSTQVNYL  120
NYMQNQGLGA GSFSTNSSQE SLDQAAKAVQ TKIEERIARE GNTNWLRTSI DQFIKTQPGW  180
NSSTENSSYD HLQGGQLLFN NSKGDTGNRT SHANSDYRLL NRTPTNQTGT RKYFKDNSIG  240
GLEFLLANDI DNSNPAVQAE QLNWLHFMMN IGSIMANDPT ANFDGLRVDA LDNVDADLLQ  300
IASDYFKAAY GVDKSEANAI KHLSYLEAWS ANDPYYNKDT KGAQLPIDNA LRNALTNLLM  360
RDKNTRMQLG DMTAFINSSL NPRGANDKNG ERMANYIFTR AHDTEAQTII QRIIRDRINP  420
NLFGYNFTRD EIKKAFEIYN EDIDKAHKTY ASYNLPSVYA LMLTNKDSVT RVYYGDLYRE  480
DGHYMAKKTP YFDAIDTLLR ARIKYVAGGQ DMEVKKVGND GLLTSVRYGK GANNRTDLGT  540
SETRTQGMGV IMTNNYDFRL GSNETVTMNM GRAHRNQLYR PLLLTTKDGI ATYLNDSDVP  600
KNLLKRTDWN GNLTFNANDV FGVENVQVSG YLGVWVPYGA KANQDARTQP SNRANSDGQV  660
YKSSAALDSQ VMYEAFSNFQ AFADDQPELY MNRVLAKNTD LLKAWGITSV GLPPQYVSSK  720
DGTFLDSIID NGYAFDDRYD MALSQNNKYG SLEDLLNVLR ALHKDGIQAI ADWVPDQIYN  780
LPGKEVVNAT RVNGYGYHQQ GYQIVDQAYV ANTRTDGTDY QGKYGGAFLD ELKAKYPSIF  840
NRVQISNGKQ LPTNEKITKW SAKYFNGTNI LGRGINFVLR DDKTNQYFNT SANSQLLPTP  900
LRDTGAIT                                                          908

SEQ ID NO: 149         moltype = DNA  length = 2847
FEATURE                Location/Qualifiers
misc_feature           1..2847
                       note = T2 C-terminal truncation of GTF4491
source                 1..2847
                       mol_type = other DNA
                       organism = synthetic construct
SEQUENCE: 149
atcaacggca aacaatacta tgtcaatagt gacggtagtg tgcgtaagaa ctttgttttt  60
gagcaagatg gtaagtctta ttactttgat gctgaaacag gggctcttgc gactaagtca  120
caggatgaat tttcaacaga acctatcaag gcaaccgtag atttttcatc tggtaaccag  180
ctctacaaaa acgatgacaa atctttggac caacttgaca ccttcatcac agcggatgct  240
tggtaccgtc caaagagcat tctcaaggat ggtaagactt ggacagcttc aactgaagct  300
gacaaacgtc ctctcttgat ggtttggtgg cctgacaagt ctactcaggt caactacctt  360
aactacatgc aaaatcaagg tcttggtgca gggtcatttt caaccaactc tagccaggaa  420
agtctggacc aagctgctaa agcggttcag actaagattg aagaacgtat cgcgcgtgag  480
ggcaatacca actggttgcg tacaagtatc gaccagttca tcaagacaca gccaggttgg  540
aatagtagca ctgaaaatag ttcatacgac cacttgcaag gcggacagtt gctctttaac  600
aacagtaagg gtgatactgg caaccgtacc agccacgcca actctgacta tcgtttgtta  660
aaccgcacac cgactaacca gacgggtaca cgtaagtact tcaaggataa ttctatcggt  720
ggtcttgagt tcttgcttgc caacgatatt gataactcaa acccagctgt tcaggcagag  780
caacttaact ggctccactt tatgatgaat atcggaagca tcatggctaa tgacccaact  840
```

-continued

```
gccaactttg acggtttgcg tgtcgatgcc ttggacaatg tggatgccga cctgctccaa  900
atcgcatcag actacttcaa agcagcctat ggtgttgaca agtctgaagc caatgccatc  960
aagcacttgt catacttgga agcatggtct gccaacgacc catactacaa caaggacact  1020
aagggagcac aacttccgat tgacaatgcc cttcgtaatg ccctcaccaa cctcttgatg  1080
cgtgataaaa atacacgtat gcagcttgga gacatgactg ctttcatcaa cagtagtttg  1140
aacccacgag gtgccaacga taaaaacggt gaacgtatgg caaactatat tttcacccgt  1200
gcccatgata cagaagctca aaccattatt caacgtatca ttcgtgatcg tattaaccca  1260
aatttgtttg gttataattt cacacgtgat gaaatcaaga aagccttcga gatttacaat  1320
gaggatattg ataaggctca caagacttat gcgtcataca acttgccatc tgtctatgcc  1380
ctcatgttga ccaataagga ctctgtaaca cgtgtttatt acggagacct ctaccgtgaa  1440
gatggtcact acatggctaa gaagacgcct tactttgatg ccatcgacac cctcttgcgt  1500
gccccgtatca agtatgtagc tggtggtcaa gacatggaag tgaagaaagt cggaaatgac  1560
ggcctcttga catcagttcg ttatggtaaa ggtgccaata acagaactga tttgggaact  1620
tctgaaactc gtacgcaagg tatgggtgtc atcatgacca acaactatga tttccgcttg  1680
ggtagcaatg aaactgtaac gatgaacatg ggtagagctc accgtaatca gctttatcga  1740
ccattgcttt tgacgacaaa ggatggtata gcaacctacc tcaacgattc tgatgtgcct  1800
aaaaaccttc tgaaacgtac tgactggaat gggaacttga ccttcaatgc caacgatgtt  1860
ttcggtgtag aaaatgtcca agtctcaggt tacctcggtg tctgggtacc atacggagct  1920
aaggctaatc aagatgcacg tacacagcca agtaatcgtg ccaatagcga cggtcaagtt  1980
tacaagtctt cagcagccct tgattcgcaa gtcatgtatg aagccttctc aaacttccaa  2040
gcctttgcgg acgatcaacc tgaactttac atgaaccgtg tcttggctaa gaacactgac  2100
ttgctcaaag catgggggat cacgtcagtc ggacttccac cacagtacgt ttcaagtaag  2160
gatggcacct tccttgactc aataattgat aatggttatg cctttgatga ccgttacgat  2220
atggccttga gtcaaaataa taaatacgga tcacttgagg acctccttaa cgttcttcgt  2280
gccctccata aagacggtat tcaagccatt gctgactggg taccagacca aatctataac  2340
ctcccaggaa aagaagtggt aaatgcgaca cgtgttaacg gctacggtta tcaccaacaa  2400
ggttatcaaa ttgtggacca agcctatgtg gcaaataccc gtacagatgg tacagactat  2460
caaggcaagt acggtggtgc cttccttgat gagctgaaag ctaagtaccc atctattttc  2520
aaccgtgtgc aaatctcaaa tggtaagcaa ttgcctacga atgaaaagat tacaaaatgg  2580
tctgctaagt acttcaacgg aaccaacatc cttggacgag gcatcaactt tgtccttcgt  2640
gatgacaaga ccaaccagta ctttaatact tcagctaaca gccaactctt gccaacacca  2700
cttcgtgata cgggtgccat cacaagcact caagtcttcc aacgtcgtgg acaagatgtt  2760
tacttccttc gcgataacca aaccgttaag aatgaatttg ttcaagacgg taacggtaac  2820
tggtattact tcggtggtga cggttaa                                       2847
```

```
SEQ ID NO: 150          moltype = AA  length = 948
FEATURE                 Location/Qualifiers
REGION                  1..948
                        note = T2 C-terminal truncation of GTF4491
source                  1..948
                        mol_type = protein
                        organism = synthetic construct
SEQUENCE: 150
INGKQYYVNS DGSVRKNFVF EQDGKSYYFD AETGALATKS QDEFSTEPIK ATVDFSSGNQ  60
LYKNDDKSLD QLDTFITADA WYRPKSILKD GKTWTASTEA DKRPLLMVWW PDKSTQVNYL  120
NYMQNQGLGA GSFSTNSSQE SLDQAAKAVQ TKIEERIARE GNTNWLRTSI DQFIKTQPGW  180
NSSTENSSYD HLQGGQLLFN NSKGDTGNRT SHANSDYRLL NRTPTNQTGT RKYFKDNSIG  240
GLEFLLANDI DNSNPAVQAE QLNWLHFMMN IGSIMANDPT ANFDGLRVDA LDNVDADLLQ  300
IASDYFKAAY GVDKSEANAI KHLSYLEAWS ANDPYYNKDT KGAQLPIDNA LRNALTNLLM  360
RDKNTRMQLG DMTAFINSSL NPRGANDKNG ERMANYIFTR AHDTEAQTII QRIIRDRINP  420
NLFGYNFTRD EIKKAFEIYN EDIDKAHKTY ASYNLPSVYA LMLTNKDSVT RVYYGDLYRE  480
DGHYMAKKTP YFDAIDTLLR ARIKYVAGGQ DMEVKKVGND GLLTSVRYGK GANNRTDLGT  540
SETRTQGMGV IMTNNYDFRL GSNETVTMNM GRAHRNQLYR PLLLTTKDGI ATYLNDSDVP  600
KNLLKRTDWN GNLTFNANDV FGVENVQVSG YLGVWVPYGA KANQDARTQP SNRANSDGQV  660
YKSSAALDSQ VMYEAFSNFQ AFADDQPELY MNRVLAKNTD LLKAWGITSV GLPPQYVSSK  720
DGTFLDSIID NGYAFDDRYD MALSQNNKYG SLEDLLNVLR ALHKDGIQAI ADWVPDQIYN  780
LPGKEVVNAT RVNGYGYHQQ GYQIVDQAYV ANTRTDGTDY QGKYGGAFLD ELKAKYPSIF  840
NRVQISNGKQ LPTNEKITKW SAKYFNGTNI LGRGINFVLR DDKTNQYFNT SANSQLLPTP  900
LRDTGAITST QVFQRRGQDV YFLRDNQTVK NEFVQDGNGN WYYFGGDG                948
```

```
SEQ ID NO: 151          moltype = DNA  length = 3045
FEATURE                 Location/Qualifiers
misc_feature            1..3045
                        note = T6 C-terminal truncation of GTF4491
source                  1..3045
                        mol_type = other DNA
                        organism = synthetic construct
SEQUENCE: 151
atcaacggca aacaatacta tgtcaatagt gacggtagtg tgcgtaagaa ctttgttttt  60
gagcaagatg gtaagtctta ttactttgat gctgaaacag ggctcttgc gactaagtca  120
caggatgaat tttcaacaga acctatcaag gcaaccgtag atttttcatc tggtaaccag  180
ctctacaaaa acgatgacaa atctttggac caacttgaca ccttcatcac agcggatgct  240
tggtaccgtc caaagagcat tctcaaggat ggtaagactt ggacagcttc aactgaagct  300
gacaaacgtc ctctcttgat ggtttggtgg cctgacaagt ctactcaggt caactacctt  360
aactacatgc aaaatcaagg tcttggtgca gggtcatttt caaccaactc tagccaggaa  420
agtctggacc aagctgctaa agcggttcag actaagattg aagaacgtat cgcgcgtgag  480
ggcaatacca actggttgcg tacaagtatc gaccagttca tcaagacaca gccaggttgg  540
aatagtagca ctgaaaatag ttcatacgac cacttgcaag gcggacagtt gctctttaac  600
aacagtaagg gtgatactgg caaccgtacc agccacgcca actctgacta tcgtttgtta  660
```

-continued

```
aaccgcacac cgactaacca gacgggtaca cgtaagtact tcaaggataa ttctatcggt  720
ggtcttgagt tcttgcttgc caacgatatt gataactcaa acccagctgt tcaggcagag  780
caacttaact ggctccactt tatgatgaat atcggaagca tcatggctaa tgacccaact  840
gccaactttg acggtttgcg tgtcgatgcc ttggacaatg tggatgccga cctgctccaa  900
atcgcatcag actacttcaa agcagcctat ggtgttgaca agtctgaagc caatgccatc  960
aagcacttgt catacttgga agcatggtct gccaacgacc catactacaa caaggacact  1020
aagggagcac aacttccgat tgacaatgcc cttcgtaatg ccctcaccaa cctcttgatg  1080
cgtgataaaa atacacgtat gcagcttgga gacatgactg ctttcatcaa cagtagtttg  1140
aacccacgag gtgccaacga taaaaacggt gaacgtatgg caaactatat tttcacccgt  1200
gcccatgata cagaagctca aaccattatt caacgtatca ttcgtgatcg tattaaccca  1260
aatttgtttg gttataattt cacacgtgat gaaatcaaga aagccttcga gatttacaat  1320
gaggatattg ataaggctca caagactaat gcgtcataca acttgccatc tgtctatgcc  1380
ctcatgttga ccaataagga ctctgtaaca cgtgtttatt acggagacct ctaccgtgaa  1440
gatggtcact acatggctaa gaagacgcct tactttgatg ccatcgacac cctcttgcgt  1500
gcccgtatca agtatgtagc tggtggtcaa gacatggaag tgaagaaagt cggaaatgac  1560
ggcctcttga catcagttcg ttatggtaaa ggtgccaata acagaactga tttgggaact  1620
tctgaaactc gtacgcaagg tatgggtgtc atcatgacca acaactatga tttccgcttg  1680
ggtagcaatg aaactgtaac gatgaacatg ggtagagctc accgtaatca gctttatcga  1740
ccattgcttt tgacgacaaa ggatggtata gcaacctacc tcaacgattc tgatgtgcct  1800
aaaaaccttc tgaaacgtac tgactggaat gggaacttga ccttcaatgc caacgatgtt  1860
ttcggtgtag aaaatgtcca agtctcaggt tacctcggtg tctgggtacc atacggagct  1920
aaggctaatc aagatgcacg tacacagcca agtaatcgtg ccaatagcga cggtcaagtt  1980
tacaagtctt cagcagccct tgattcgcaa gtcatgtatg aagccttctc aaacttccaa  2040
gcctttgcgg acgatcaacc tgaactttac atgaaccgtg tcttggctaa gaacactgac  2100
ttgctcaaag catgggggat cacgtcagtc ggacttccac cacagtacgt ttcaagtaag  2160
gatggcacct tccttgactc aataattgat aatggttatg cctttgatga ccgttacgat  2220
atggccttga gtcaaaataa taaatacgga tcacttgagg acctccttaa cgttcttcgt  2280
gccctccata aagacggtat tcaagccatt gctgactggg taccagacca aatctataac  2340
ctcccaggaa aagaagtggt aaatgcgaca cgtgttaacg gctacggtta tcaccaacaa  2400
ggttatcaaa ttgtggacca agcctatgtg gcaaataccc gtacagatgg tacagactat  2460
caaggcaagt acggtggtgc cttccttgat gagctgaaag ctaagtaccc atctattttc  2520
aaccgtgtgc aaatctcaaa tggtaagcaa ttgcctacga atgaaaagat tacaaaatgg  2580
tctgctaagt acttcaacgg aaccaacatc cttggacgag gcatcaactt tgtccttcgt  2640
gatgacaaga ccaaccagta ctttaatact tcagctaaca gccaactctt gccaacacca  2700
cttcgtgata cgggtgccat cacaagcact caagtcttcc aacgtcgtgg acaagatgtt  2760
tacttccttc gcgataacca aaccgttaag aatgaatttg ttcaagacgg taacggtaac  2820
tggtattact tcggtggtga cggtaagatg accaagggtg cccaaaacat caatagcaag  2880
gattactatt tctttgataa tggtgttcaa ttgcgtaatg ccctgcgtcg tgcttcaaac  2940
ggctatactt actattacgg tctggacggt gctatggtta agaatgcctt cgttgatttt  3000
gatgacaagc ataagcaggt ccgtgccttt acgactcaag gataa                   3045

SEQ ID NO: 152          moltype = AA  length = 1014
FEATURE                 Location/Qualifiers
REGION                  1..1014
                        note = T6 C-terminal truncation of GTF4491
source                  1..1014
                        mol_type = protein
                        organism = synthetic construct
SEQUENCE: 152
INGKQYYVNS DGSVRKNFVF EQDGKSYYFD AETGALATKS QDEFSTEPIK ATVDFSSGNQ  60
LYKNDDKSLD QLDTFITADA WYRPKSILKD GKTWTASTEA DKRPLLMVWW PDKSTQVNYL  120
NYMQNQGLGA GSFSTNSSQE SLDQAAKAVQ TKIEERIARE GNTNWLRTSI DQFIKTQPGW  180
NSSTENSSYD HLQGGQLLFN NSKGDTGNRT SHANSDYRLL NRTPTNQTGT RKYFKDNSIG  240
GLEFLLANDI DNSNPAVQAE QLNWLHFMMN IGSIMANDPT ANFDGLRVDA LDNVDADLLQ  300
IASDYFKAAY GVDKSEANAI KHLSYLEAWS ANDPYYNKDT KGAQLPIDNA LRNALTNLLM  360
RDKNTRMQLG DMTAFINSSL NPRGANDKNG ERMANYIFTR AHDTEAQTII QRIIRDRINP  420
NLFGYNFTRD EIKKAFEIYN EDIDKAHKTY ASYNLPSVYA LMLTNKDSVT RVYYGDLYRE  480
DGHYMAKKTP YFDAIDTLLR ARIKYVAGGQ DMEVKKVGND GLLTSVRYGK GANNRTDLGT  540
SETRTQGMGV IMTNNYDFRL GSNETVTMNM GRAHRNQLYR PLLLTTKDGI ATYLNDSDVP  600
KNLLKRTDWN GNLTFNANDV FGVENVQVSG YLGVWVPYGA KANQDARTQP SNRANSDGQV  660
YKSSAALDSQ VMYEAFSNFQ AFADDQPELY MNRVLAKNTD LLKAWGITSV GLPPQYVSSK  720
DGTFLDSIID NGYAFDDRYD MALSQNNKYG SLEDLLNVLR ALHKDGIQAI ADWVPDQIYN  780
LPGKEVVNAT RVNGYGYHQQ GYQIVDQAYV ANTRTDGTDY QGKYGGAFLD ELKAKYPSIF  840
NRVQISNGKQ LPTNEKITKW SAKYFNGTNI LGRGINFVLR DDKTNQYFNT SANSQLLPTP  900
LRDTGAITST QVFQRRGQDV YFLRDNQTVK NEFVQDGNGN WYYFGGDGKM TKGAQNINSK  960
DYYFFDNGVQ LRNALRRASN GYTYYYGLDG AMVKNAFVDF DDKHKQVRAF TTQG        1014
```